US005969490A

United States Patent [19]

Gotou

[11] Patent Number: 5,969,490

[45] Date of Patent: Oct. 19, 1999

[54] BRUSHLESS MOTOR FOR PROVIDING PRECISE DRIVING SIGNAL IN PRESENCE OF VARIATIONS IN OUTPUT AMPLITUDE OF POSITION DETECTING SIGNAL

[75] Inventor: Makoto Gotou, Nishinomiya, Japan

[73] Assignee: Matsushita Electric Industrial Co., Ltd., Osaka-Fu, Japan

[21] Appl. No.: 09/007,253

[22] Filed: Jan. 14, 1998

Related U.S. Application Data

[63] Continuation of application No. 08/718,076, Sep. 17, 1996, Pat. No. 5,767,640.

[30] Foreign Application Priority Data

| | | | |
|---|---|---|---|
| Sep. 20, 1995 | [JP] | Japan | 7-241118 |
| Oct. 26, 1995 | [JP] | Japan | 7-278815 |
| Mar. 15, 1996 | [JP] | Japan | 8-87193 |

[51] Int. Cl.[6] .......... H02P 6/08

[52] U.S. Cl. .......... 318/254; 318/724

[58] Field of Search .......... 318/138, 254, 318/439, 700, 702, 720, 721, 722, 724

[56] References Cited

U.S. PATENT DOCUMENTS

| | | | |
|---|---|---|---|
| 3,581,173 | 5/1971 | Hood et al. | 318/254 |
| 4,295,085 | 10/1981 | Lafuze . | |
| 4,353,016 | 10/1982 | Born . | |
| 4,636,697 | 1/1987 | Kunikawa | 318/436 |
| 4,651,068 | 3/1987 | Meshkat-Razavi | 318/254 |
| 4,658,190 | 4/1987 | Miyazaki et al. . | |
| 5,140,232 | 8/1992 | Naito . | |
| 5,155,419 | 10/1992 | Naito . | |
| 5,160,871 | 11/1992 | Tukiyama et al. . | |
| 5,182,500 | 1/1993 | Shimada . | |
| 5,270,622 | 12/1993 | Krause . | |
| 5,382,853 | 1/1995 | von der Heide et al. . | |
| 5,384,527 | 1/1995 | Rozman et al. | 322/10 |
| 5,418,416 | 5/1995 | Müller . | |

FOREIGN PATENT DOCUMENTS

| | | | |
|---|---|---|---|
| 189676 | 8/1986 | European Pat. Off. . |
| 63-124791 | 5/1988 | Japan . |
| 1-126193 | 5/1989 | Japan . |
| 1-252197 | 10/1989 | Japan . |
| 6-054582 | 2/1994 | Japan . |

*Primary Examiner*—Bentsu Ro
*Attorney, Agent, or Firm*—Akin, Gump, Strauss, Hauer & Feld, L.L.P.

[57] ABSTRACT

In a brushless motor having a field permanent-magnet part, an altering signal producing circuit produces altering signals which vary analogously with output signals of a position detector. Then, at least one distributing circuit distributes current to first and/or second three-phase distributed current signals which vary analogously with the output signals of the altering signals. The first and/or second distributed current signals may be composed by a distributing composer to produce three-phase distributed signals. A driving block uses the three-phase distributed signals to produce driving signals for the three-phase coils.

6 Claims, 132 Drawing Sheets

F I G. 129
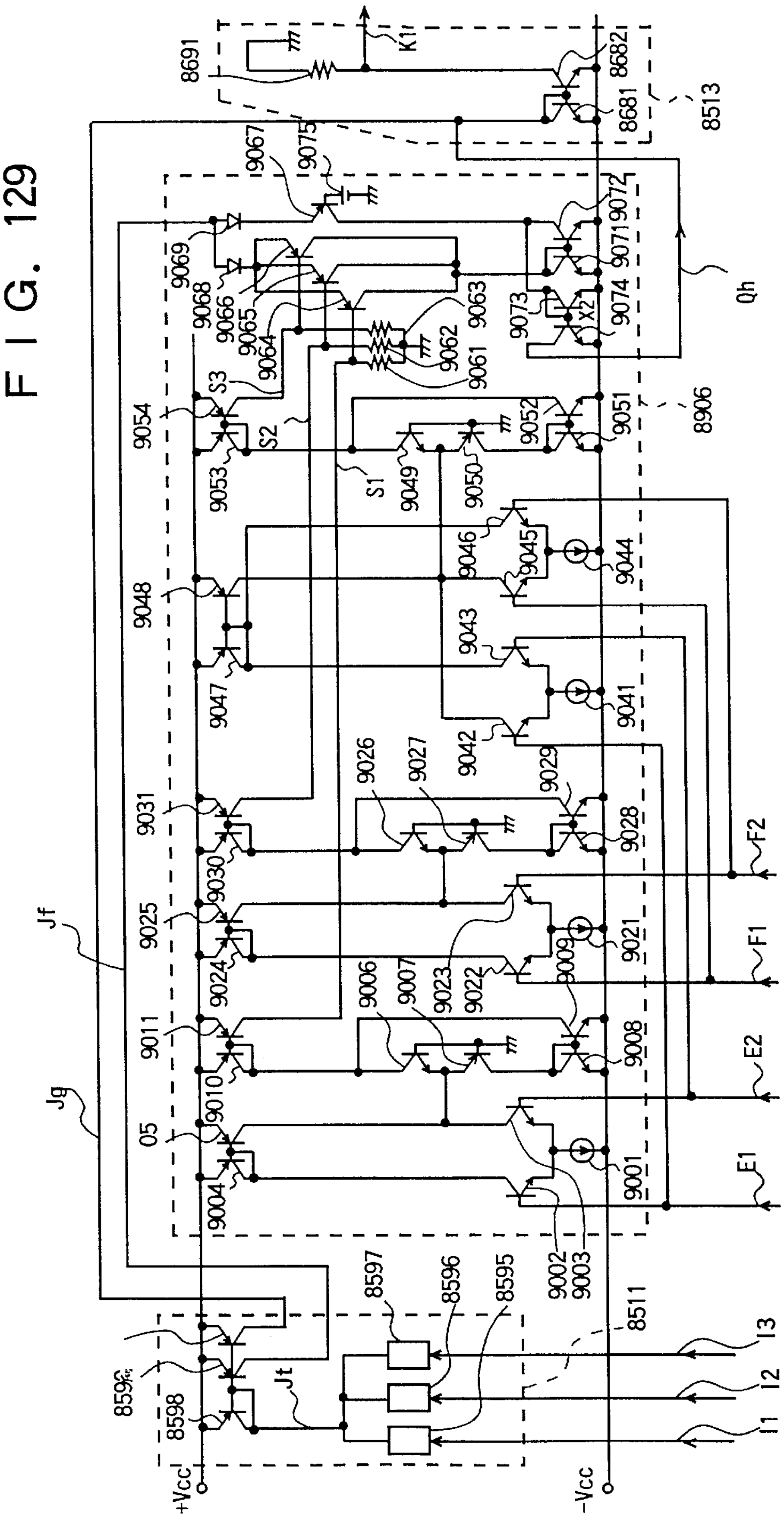

F I G. 131
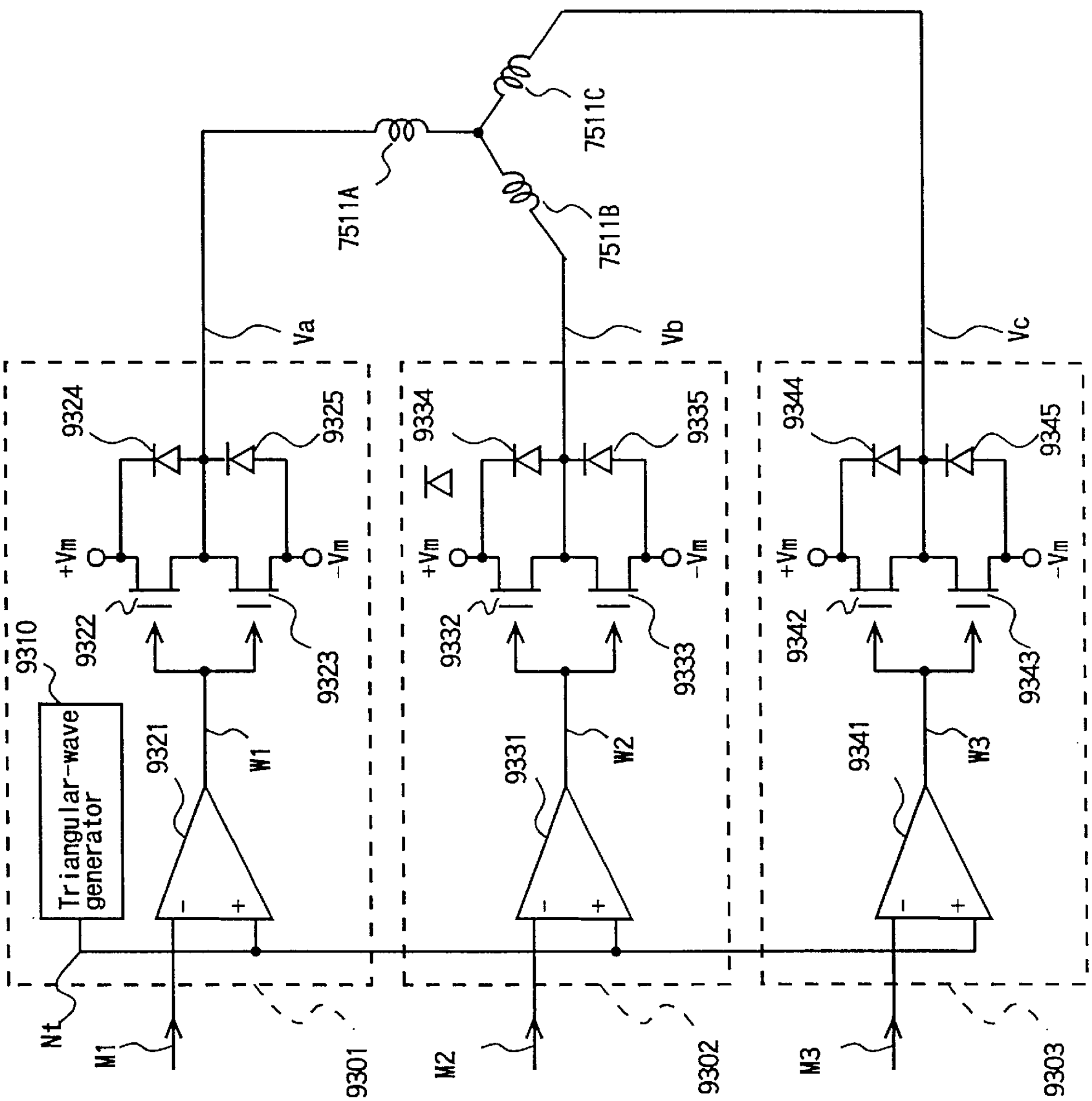

BRUSHLESS MOTOR FOR PROVIDING PRECISE DRIVING SIGNAL IN PRESENCE OF VARIATIONS IN OUTPUT AMPLITUDE OF POSITION DETECTING SIGNAL

CROSS REFERENCE TO RELATED APPLICATION

This application is a continuation of application Ser. No. 08/718,076, filed Sep. 17, 1996, entitled "BRUSHLESS MOTOR", now U.S. Pat. No. 5,767,640, the entire disclosure of which is incorporated herein by reference.

FIELD OF THE INVENTION AND RELATED ART STATEMENT

1. Field of the Invention

The invention relates to a brushless motor in which the currents to the three-phase coils are distributed electronically.

2. Description of the Related Art

Recently, a brushless motor, in which the currents to three-phase coils are distributed electronically, is widely used. FIG. 132 shows the configuration of such a prior art brushless motor.

Hall elements 9911, 9912, and 9913 detect magnetic poles of a rotor rotary magnet 9901 and output three-phase detecting signals which correspond to the rotational position. The outputs of the Hall elements 9911, 9912, and 9913 are amplified by a predetermined factor by amplifiers 9921, 9922, and 9923, respectively. Multipliers 9931, 9932, and 9933 respectively multiply the outputs of the amplifiers 9921, 9922, and 9923 by a command signal of a command circuit 9950 and obtain three-phase multiplied signals, each of which has an amplitude corresponding to the command signal. Power amplifiers 9941, 9942, and 9943 amplify the outputs of the multipliers 9931, 9932, and 9933 and apply the amplified outputs to three-phase coils 9902, 9903, and 9904, respectively.

As a result, three-phase driving signals which vary in accordance with the rotation of the rotor magnet 9901 are supplied to the three-phase coils 9902, 9903, and 9904, so that the rotor magnet 9901 continues to rotate in a predetermined direction.

However, the configuration of the prior art such as that shown in FIG. 132 has the following problems.

The amplitudes of the driving signals are proportional to the results of the multiplications of the command signal of the command circuit 9950 and the outputs of the Hall elements 9911, 9912, and 9913. Due to variations in the sensitivities of the Hall elements and in the magnetic field of the rotor magnet 9901, there appear variations in the amplitudes of the detecting signals of the Hall elements 9911, 9912, and 9913. This causes the variation or difference of the amplitudes of the driving signals. Particularly, the sensitivity-variation of a Hall element is very large.

Conventionally, in order to reduce the variation or difference of the sensitivities between the Hall elements, matching of the three Hall elements of each motor is performed in such a manner that the sensitivity ranges of the Hall elements are coincident with each other. However, there remain large variation of the amplitudes of the driving signals due to the variation of the sensitivities of Hall elements among motors in mass production. This makes the variation of the torque with respect to the command signal of the command circuit 9950, thereby producing a large problem in mass production.

It is an object of the invention to solve the problems of the prior art and provide a brushless motor which, even when there occur variation of Hall elements or the like, is hardly affected by the variation.

In order to attain the object, the brushless motor of the invention comprises:

field permanent-magnet means for obtaining field magnetic fluxes;

three-phase coils which cross the field magnetic fluxes;

position detecting means for detecting relative position between the field permanent-magnet means and the three-phase coils;

altering signal producing means for obtaining altering signals analoguely varying in correspondence with output signals of the position detecting means;

command means for generating current signals corresponding to a command signal;

first distributing means for distributing a first output current signal of the command means to three-phase first distributed current signals analoguely varying in correspondence with output signals of the altering signal producing means;

second distributing means for distributing a second output current signal of the command means to three-phase second distributed current signals analoguely varying in correspondence with output signals of the altering signal producing means;

composing means for composing the first distributed current signals of the first distributing means and the second distributed current signals of the second distributing means, thereby obtaining three-phase distributed signals; and driving means for supplying driving signals, corresponding to the three-phase distributed signals of the composing means, to terminals of the three-phase coils.

In the configuration of the brushless motor of the invention: the first output current signal corresponding to the command signal is distributed to the three-phase first distributed current signals by the altering signals corresponding to the position detection signals, the second output current signal corresponding to the command signal is distributed to the three-phase second distributed current signals by the altering signals corresponding to the position detection signals; the first and second distributed current signals are composed together so as to produce the three-phase distributed signals; and the driving signals corresponding to the distributed signals of the composing means are supplied to the three-phase coils. Consequently, influences due to variation in sensitivities of position detecting elements and that in gains of processing circuits are very small so that variation of driving gains of brushless motors in mass production are reduced remarkably.

As a result, also the driving signals supplied to the terminals of the three-phase coils are not affected by the variation in the detection outputs of the position detecting means so that accurate driving signals corresponding to the command signal is given. Therefore, variation of the generated torque is very small.

The brushless motor of another aspect of the invention comprises:

field permanent-magnet means for obtaining field magnetic fluxes poles;

three-phase coils which cross the field magnetic fluxes;

position means for obtaining detection signals corresponding to relative position of the field means with the three-phase coils;

command means for generating an output current signal by using a multiplication signal of a higher harmonic signal corresponding to the detection signal of the position means by a command signal, said output current signal being proportional to the command signal and containing higher harmonic components corresponding to the multiplication signal, at a predetermined percentage;

distributing means for obtaining three-phase distributed signals corresponding to results of multiplications of the output current signal of the command means by the output signals of the position means; and driving means for supplying driving signals corresponding to the three-phase distributed signals of the distributing means, to terminals of the three-phase coils.

In this configuration: the output current signal which is proportional to the command signal and contains a higher harmonic component at a predetermined percentage is produced by using the multiplication signal of a higher harmonic signal corresponding to the detection signals of the position means by the command signal; the three-phase distributed signals corresponding to results of multiplication of the output current signal by the output signals of a position detector are produced; and the driving signals corresponding to the three-phase distributed signals are supplied to the three-phase coils. Consequently, the distributed signals (and the driving signals) have a waveform which corresponds to the detection signal and which is less distorted or smooth, and it is possible to obtain a driving force which is less varied or uniform.

The brushless motor of still other aspect of the invention comprises:

field permanent-magnet means for obtaining field magnetic fluxes;

three-phase coils which cross the field magnetic fluxes;

position detecting means for detecting relative positions of the field permanent-magnet means with the three-phase coils, and obtaining two-phase detection signals which are electrically different in phase from each other;

altering signal producing means for obtaining at least one set of three-phase altering signals analoguely varying in correspondence with the two-phase detection signals obtained by the position detecting means;

command means for generating a current signal corresponding to a command signal;

first distributing means for distributing a first output current signal of the command means to three-phase first distributed current signals analoguely varying in correspondence with the three-phase altering signals of the altering signal producing means;

second distributing means for distributing a second output current signal of the command means to three-phase second distributed current signals analoguely varying in correspondence with the three-phase altering signals of the altering signal producing means;

composing means for composing the first distributed current signals and the second distributed current signals, thereby obtaining three-phase distributed signals; and driving means for supplying driving signals corresponding to the three-phase distributed signals obtained by the composing means, to terminals of the three-phase coils.

According to this brushless motor, the three-phase altering signals are produced by using only the two-phase detection signals, the first output current signal corresponding to the command signal is distributed to the three-phase first distributed current signals by the three-phase altering signals, and the second output current signal corresponding to the command signal is distributed to the three-phase second distributed current signals by the three-phase altering signals. The first and second distributed current signals are composed together so as to produce the three-phase distributed signals. The driving signals corresponding to the distributed signals are supplied to the three-phase coils.

In this configuration, the position detecting elements for obtaining the two-phase detection signals are only two. Thus, each motor is simplified in configuration.

The brushless motor of another aspect of the invention comprises:

field permanent-magnet means for obtaining field magnetic fluxes;

three-phase coils which cross the field magnetic fluxes;

position detecting means for detecting relative positions between the field permanent-magnet means and the three-phase coils;

altering signal producing means for obtaining three-phase output signals analoguely varying in correspondence with output signals of the position detecting means;

altering adjusting means for generating an adjusting signal which varies in proportion to amplitudes of detection signals of the position detecting means, comparing the adjusting signal with a predetermined signal, and adjusting amplitudes of the output signals of the altering signal producing means;

command means for obtaining an output signal corresponding to a command signal;

distributing means for obtaining three-phase distributed signals analoguely varying in correspondence with results of multiplications of the output signal of the command means by the output signals of the altering signal producing means; and driving means for supplying driving signals to the three-phase coils, the driving signals corresponding to the three-phase distributed signals of the distributing means.

In the configuration of the brushless motor: an adjusting signal which varies in proportion to amplitudes of detection signals of a position detector is produced; the adjusting signal is compared with a predetermined signal, thereby adjusting amplitudes of output signals of an altering signal producing circuit; three-phase distributed signals corresponding to results of multiplications of an output current signal of a command block by the output signals of the altering signal producing circuit are produced; and driving signals corresponding to the distributed signals are supplied to three-phase coils. Consequently, influences due to variation in sensitivities of position detecting elements and that in gains of processing circuits becomes reduced remarkably. Thus, variation in driving gains of brushless motors in mass production are very small.

The brushless motor of another aspect of the invention comprises:

field permanent-magnet means for obtaining field magnetic fluxes;

three-phase coils which cross the field magnetic fluxes;

position detecting means for detecting relative position between the field means and the three-phase coils;

altering signal producing means for obtaining three-phase current signals analoguely varying in correspondence with output signal of the position detecting means;

altering adjusting means for generating an adjusting signal which varies responding with a sum of single polarity values or absolute values of the three-phase current signals of the altering signal producing means, comparing the adjusting signal with a predetermined signal, and adjusting amplitudes of output signals of the altering signal producing means;

command means for obtaining an output signal corresponding to a command signal;

distributing means for obtaining three-phase distributed signals analoguely varying in correspondence with results of multiplications of the output signal of the command means by the output signals of the altering signal producing means; and driving means for supplying driving signals to the three-phase coils, the driving signals corresponding to the three-phase distributed signals of the distributing means.

In the configuration of the brushless motor, an adjusting signal which varies responding with a sum of single polarity values or absolute values of three-phase current signals corresponding to a detection signal of a position detector is produced, the adjusting signal is compared with a predetermined signal, so that amplitudes of output signals of an altering signal producing circuit are adjusted, three-phase distributed signals corresponding to results of multiplications of an output current signal of a command block by the output signals of the altering signal producing circuit are produced, and driving signals corresponding to the distributed signals are supplied to three-phase coils. Consequently, influences due to variation in sensitivities of position detecting elements and that in gains of processing circuits become reduced remarkably. Thus, variation in driving gains of brushless motors in mass production are very small.

In the brushless motor of the immediately previous two other aspects, the adjusting signal which varies in proportion to the amplitude of the detection signal of the position detecting means is produced, and the amplitudes of the output signals of the altering signal producing means are adjusted in accordance with a result of comparison between the adjusting signal and a predetermined signal. The distributed signals are produced in accordance with results of multiplications of the adjusted output signals of the altering signal producing means by the output signal of the command means. Therefore, the amplitudes of the output signals of the altering signal producing means, and those of the distributed signals of the distributing means are not affected by the amplitude of the detection signal of the position detecting means. As a result, the driving signals supplied to the three-phase coils are not affected by variation of the position detecting means, so that variation of the relationship between the command signal and the generated torque in mass production becomes reduced remarkably.

The brushless motor of a further aspect of the invention comprises:

field permanent-magnet means for obtaining field magnetic fluxes;

three-phase coils which cross the field magnetic fluxes;

position detecting means for detecting relative position between the field means and the three-phase coils;

command means for obtaining an output signal corresponding to a command signal;

distributed signal producing means for obtaining three-phase distributed signals analoguely varying in correspondence with output signals of the position detecting means, and corresponding to the output signal of the command means;

distributing adjusting means for generating an adjusting signal which varies in proportion to amplitudes of detection signals of the position detecting means, substantially comparing the adjusting signal with the output signal of the command means, and adjusting amplitudes of the distributed signals of the distributed signal producing means; and driving means for supplying driving signals to the three-phase coils, the driving signals corresponding to the three-phase distributed signals of the distributing means.

In the above-mentioned configuration of the brushless motor, an adjusting signal which varies responding with amplitudes of detection signals of a position detector is produced, the adjusting signal is compared with an output signal of a command block, so that amplitudes of distributed signals of an altering signal producing circuit are adjusted, and driving signals corresponding to the distributed signals are supplied to three-phase coils. Consequently, influences due to variation in sensitivities of position detecting elements and that in gains of processing circuits become reduced remarkably. Thus, variation in driving gains of brushless motors in mass production is very small.

The brushless motor of a further aspect of the invention comprises:

field permanent-magnet means for obtaining field magnetic fluxes;

three-phase coils which cross the field magnetic fluxes;

position detecting means for detecting relative positions between the field means and the three-phase coils;

command means for obtaining an output signal corresponding to a command signal;

distributed signal producing means for obtaining three-phase distributed signals analoguely varying in correspondence with output signals of the position detecting means, and corresponding to the output signal of the command means;

distributing adjusting means for generating an adjusting signal which varies responding with a sum of single polarity values or absolute values of the three-phase current signals corresponding to detection signals of the position detecting means, substantially comparing the adjusting signal with the output signal of the command means and adjusting amplitudes of the distributed signals; and driving means for supplying driving signals corresponding to the distributed signals to the three-phase coils.

In the configuration of the brushless motor: an adjusting signal which varies responding with a sum of single polarity values or absolute values of three-phase current signals corresponding to detection signals of a position detector is produced; the adjusting signal is compared with a signal of a command block thereby adjusting amplitudes of distributed signals, and driving signals corresponding to the distributed signals are supplied to three-phase coils. Consequently, influences due to variations in sensitivities of position detecting elements and that in gains of processing circuits become reduced remarkably. Thus, variation in driving gains of brushless motors in mass production is very small.

In many principal configurations of the brushless motor of the invention, improvements are done, so that distributed signals and driving signals have a sinusoidal waveform which corresponds to detection signals and which is less distorted or smooth, thereby minimizing fluctuation of the driving force.

In the brushless motor of the immediately previous two further aspects, the adjusting signal which varies in proportion to the amplitude of the detection signal of the position detecting means is produced, and the amplitudes of the output signals of the distributing signal producing means are adjusted in accordance with a result of comparison between the adjusting signal and a signal of a command block. Therefore, the amplitudes of the distributed signals of the distributing means are not affected by the amplitude of the detection signal of the position detecting means. As a result, the driving signals supplied to the three-phase coils are not affected by variation of the position detecting means, so that variation of the relationship between the command signal and the generated torque in mass production becomes reduced remarkably.

These and other configurations and operations will be described in detail in the description of embodiments.

BRIEF DESCRIPTION OF THE DRAWINGS

FIG. 120 is a circuit diagram showing a first driving circuit 8041, a second driving circuit 8042, and a third driving circuit 8043 of Embodiment 23.

FIG. 121 is a block diagram of Embodiment 24 of the invention.

FIG. 122 is a circuit diagram showing a position detector 7521, a distributed signal producing circuit 8331, and a distributing adjusting circuit 8332 of Embodiment 24.

FIG. 123 is a circuit diagram showing an adjusting signal producing circuit 8510 as labeled in FIG. 122 of Embodiment 24.

FIG. 124 is a block diagram of Embodiment 25 of the invention.

FIG. 125 is a circuit diagram showing a position detector 8701, a distributed signal producing circuit 8702, and a distributing adjusting circuit 8703 of Embodiment 25.

FIG. 126 is a circuit diagram showing a multiplied command current circuit 8705 of Embodiment 25.

FIG. 127 is a block diagram of Embodiment 26 of the invention.

FIG. 128 is a circuit diagram showing a position detector 8701, a distributed signal producing circuit 8902, and a distributing adjusting circuit 8903 of Embodiment 26.

FIG. 129 is a circuit diagram showing an adjusting signal producing circuit 8905 as labeled in FIG. 128 of Embodiment 26.

FIG. 130 is a block diagram of Embodiment 27 of the invention.

FIG. 131 is a circuit diagram showing a first driving circuit 9301, a second driving circuit 9302, and a third driving circuit 9303 of Embodiment 27.

Figure 132:
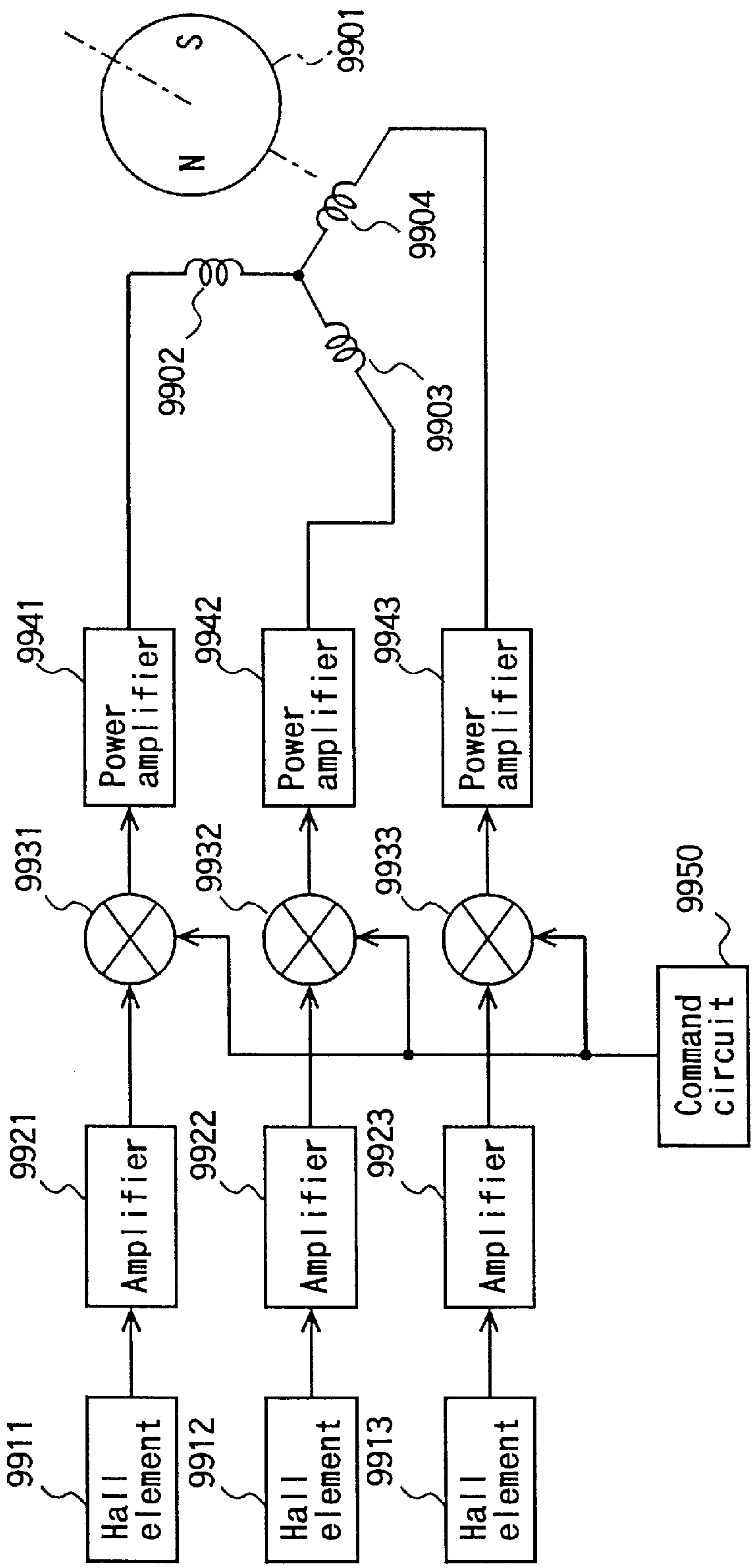

FIG. 132 is a diagram showing the structure of a prior art motor.

DESCRIPTION OF THE PREFERRED EMBODIMENT

Hereinafter, the invention in detail will be described on its embodiments with reference to the accompanying drawings.

Embodiment 1

Figure 1:
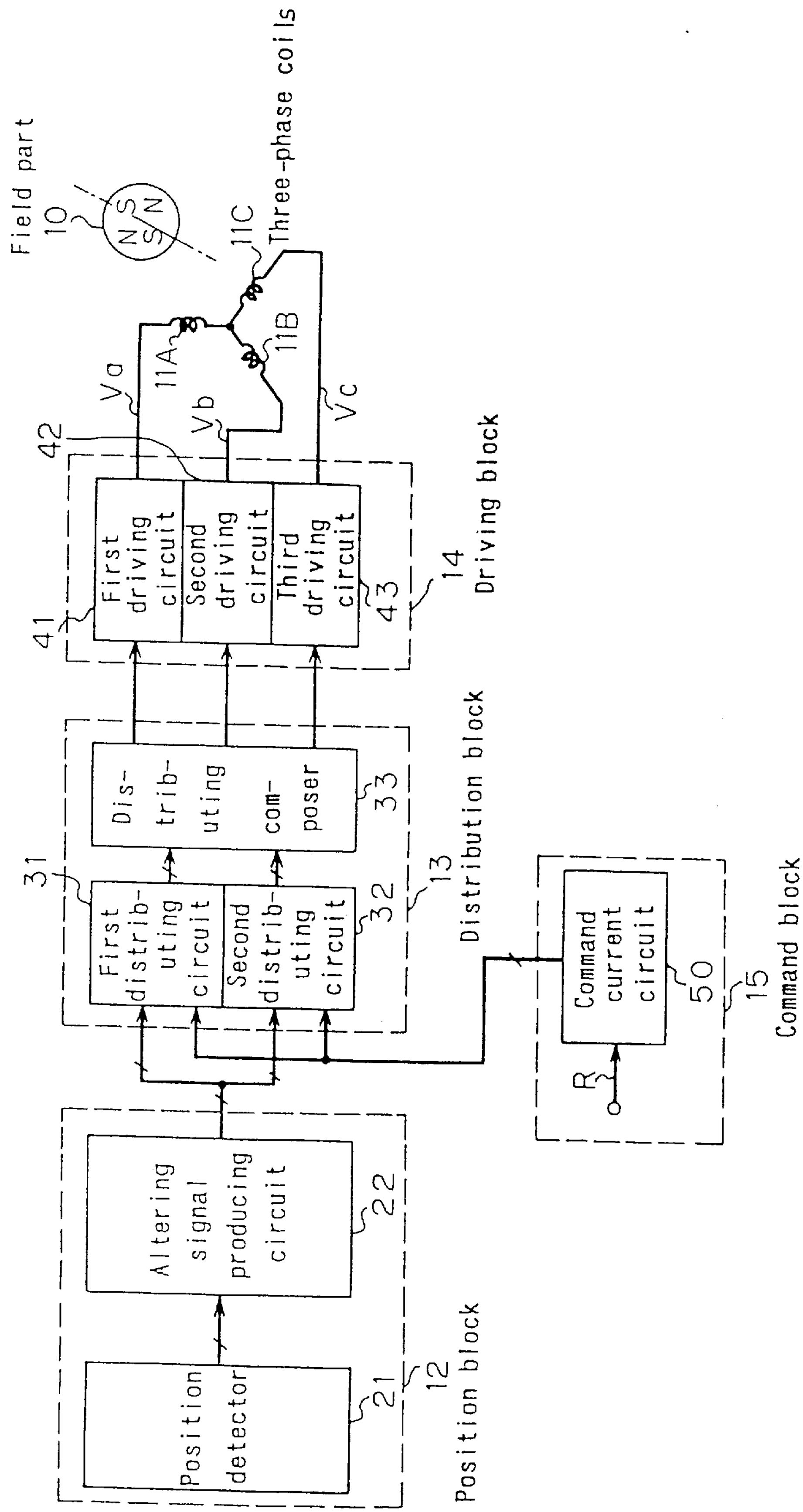
FIG. 1 is a block diagram of Embodiment 1 of the invention.

FIGS. 1 to 6 show a brushless motor of a first embodiment of the invention. FIG. 1 shows the whole configuration of the motor.

In the circuit block diagrams, a connection line to or from circuit block with oblique short bar crossing therewith represents plural connection lines or a connection line for aggregate signals.

A field part 10 as the field means shown in FIG. 1 is mounted on a rotor or a movable body of the motor and forms plural magnetic field poles by a permanent magnet. And the field part 10 generates field magnetic fluxes. Three-phase coils 11A, 11B, and 11C are mounted on the stator or a stationary body and arranged so as to be electrically shifted by a predetermined angle (120 electrical deg.) with respect to the magnetic fluxes of the field part 10.

Figure 2:
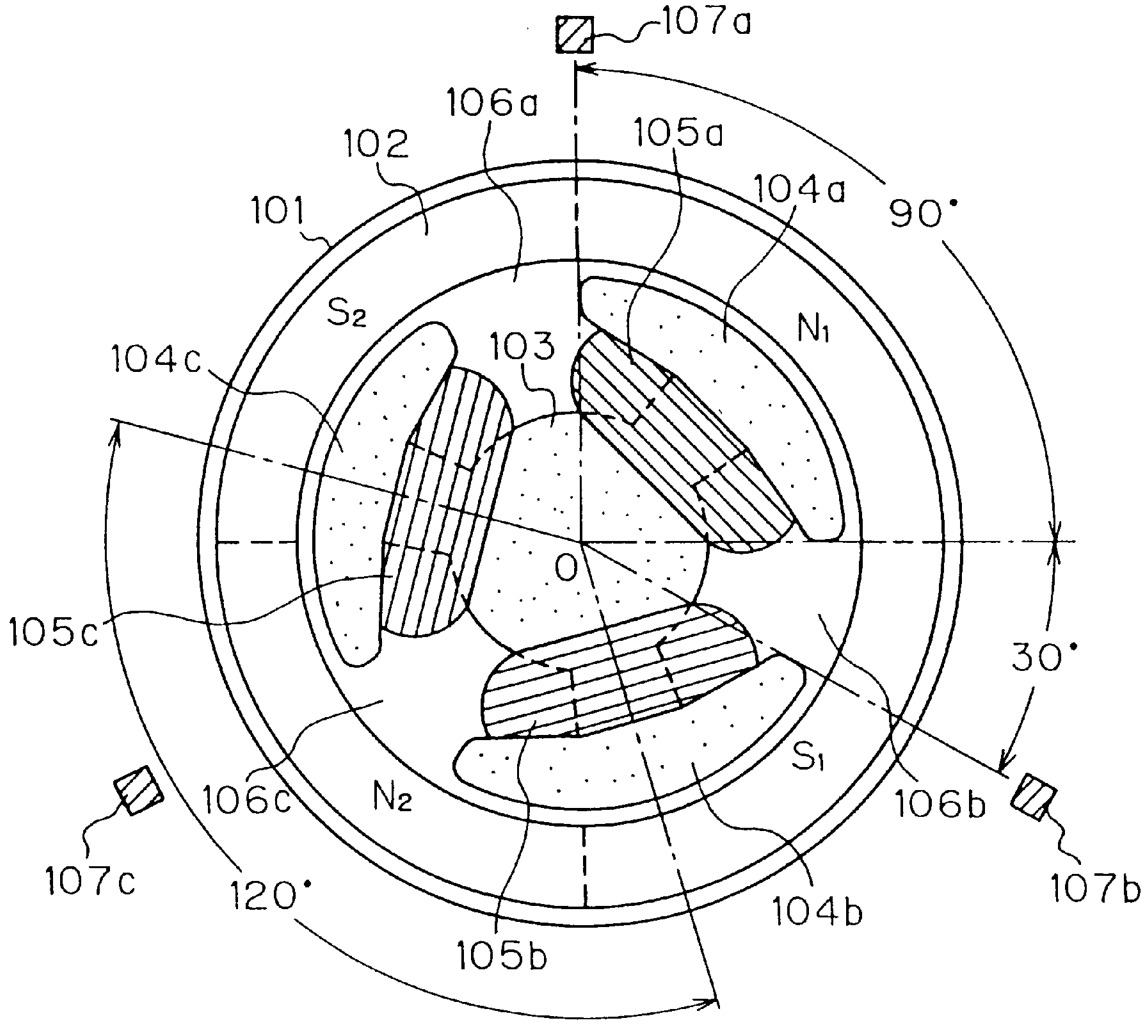
FIG. 2 is a diagram showing the structure of a motor of the embodiment.

FIG. 2 specifically shows the configuration of the field part 10 and the three-phase coils 11A, 11B, and 11C. In an annular permanent magnet 102 attached to the inner side of the rotor 101, the inner and end faces are magnetized so as to form four poles (N, S, N and S in turn), thereby constituting the field part 10 shown in FIG. 1. An armature core 103 is placed at a position of the stator which opposes the poles of the permanent magnet 102. Three salient poles 104*a*, 104*b*, and 104*c* are disposed in the armature core 103 at intervals of 120 deg. Three-phase coils 105*a*, 105*b*, and 105*c* (corresponding to the three-phase coils 11A, 11B, and 11C shown in FIG. 1) are wound on the salient poles 104*a*, 104*b*, and 104*c* using winding slots 106*a*, 106*b*, and 106*c* formed between the salient poles, respectively. Among the coils 105*a*, 105*b*, and 105*c*, phase differences of 120 deg. in electric angle are established with respect to intercrossing magnetic fluxes from the permanent magnet 102 (one set of N and S poles corresponds to an electric angle of 360 deg.). Three position detecting elements 107*a*, 107*b*, and 107*c* (for example, Hall elements which are magnetoelectrical converting elements) are arranged oh the stator and detect the poles of the end face of the permanent magnet 102, thereby obtaining three-phase detection signals corresponding to relative positions of the field part and the coils. In the embodiment, the center of the coils and that of the position detecting elements are shifted in phase by an electric angle of 90 deg. When driving signals which are in phase with the detection signals of the position detecting elements are applied to the coils, a rotation force in a predetermined direction can be obtained.

A command block shown in FIG. 1 comprises a command current circuit 50, and outputs first and second output current signals corresponding to a command signal R. The first and second output current signals are supplied to first and second distributing circuits 31 and 32 of a distribution block 13, respectively.

Figure 3:
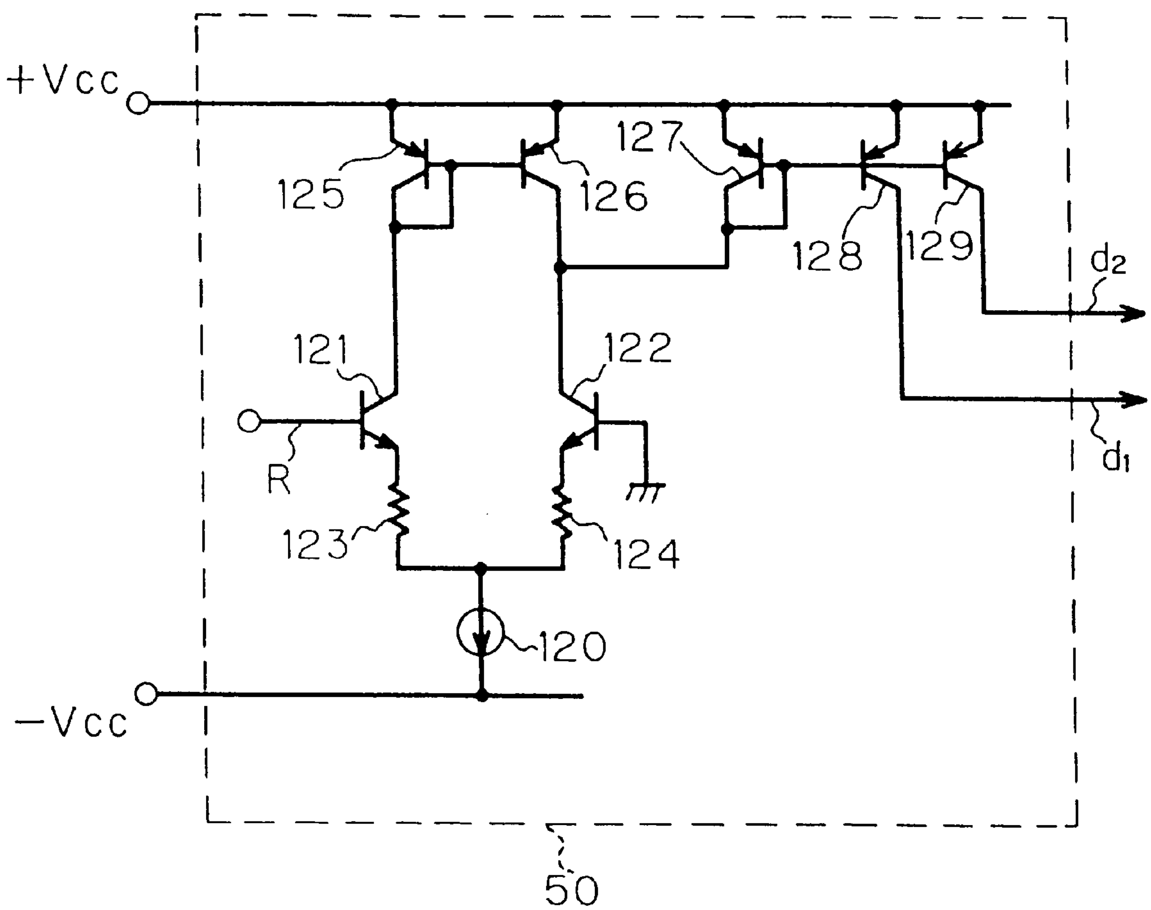
FIG. 3 is a specific circuit diagram of a command current circuit 50 of Embodiment 1.

FIG. 3 specifically shows the command current circuit 50. In the circuit to which +Vcc and −Vcc (+Vcc=9 V and −Vcc=−9 V) are applied, transistors 121 and 122, and resistors 123 and 124 constitute a differential circuit which operates in correspondence with the command signal R to distribute the current of a constant current source 120 to the collectors of the transistors 121 and 122. The collector currents of the transistors 121 and 122 are compared with each other by a current mirror circuit consisting of transistors 125 and 126, and the difference current is output through a current mirror circuit consisting of transistors 127, 128, and 129. As a result, first and second output current signals d1 and d2 are obtained (d1 and d2 are outflow currents). Therefore, the output current signals d1 and d2 maintain the same current value corresponding to the command signal R (when the command signal R is lower than the ground level 0 V, d1 and d2 are increased). The first output current signal d1 is supplied to the first distributing circuit 31 of the distribution block 13, and the second output current signal d2 to the second distributing circuit 32 of the distribution block 13.

A position block 12 shown in FIG. 1 comprises the position detector 21 and an altering signal producing circuit 22, produces altering signals from detection signals of position detecting elements of the position detector 21, and supplied the altering signals to the first and second distributing circuits 31 and 32 of the distribution block 13.

Figure 4:
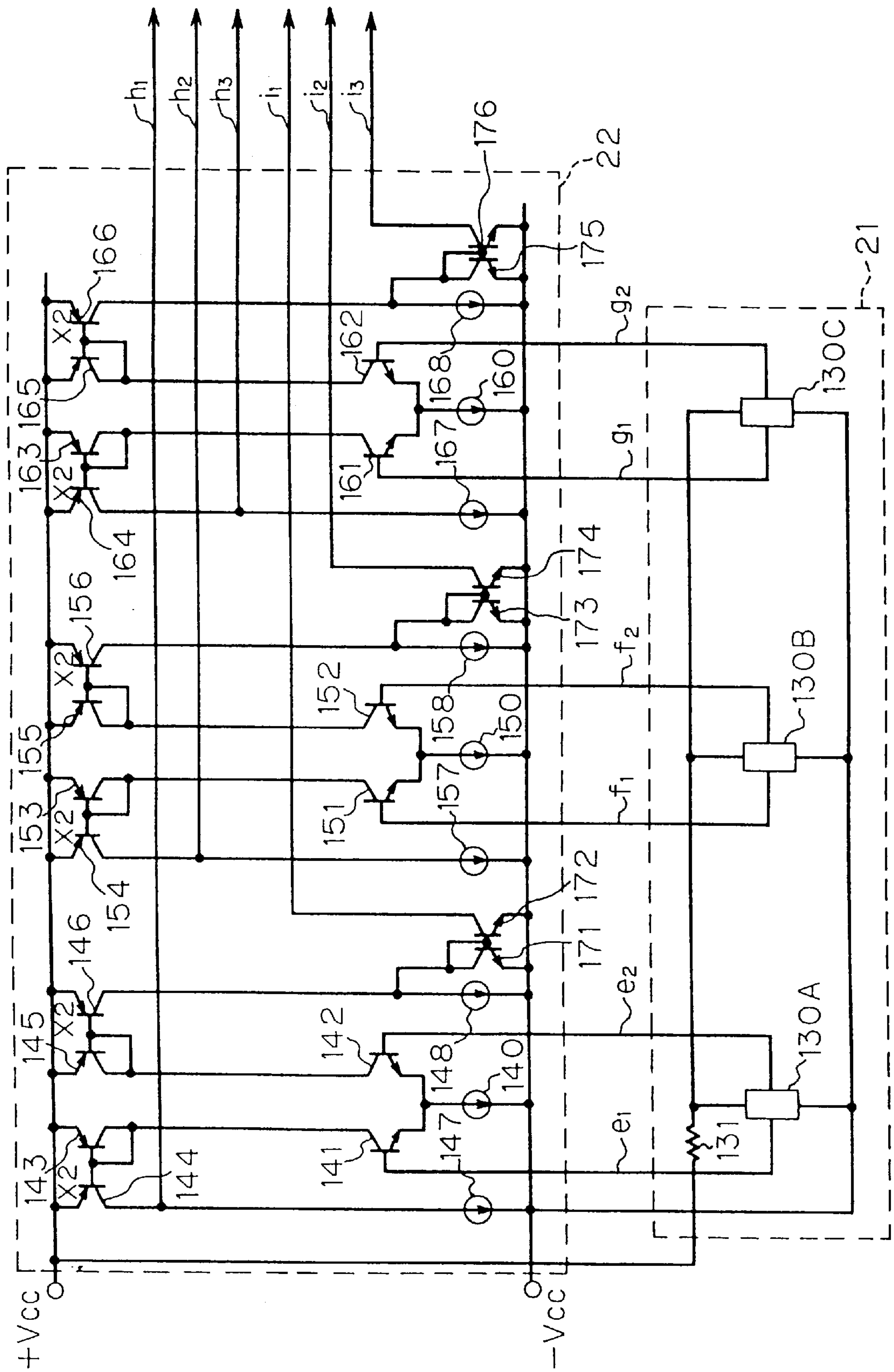
FIG. 4 is a specific circuit diagram of a position detector 21 and an altering signal producing circuit 22 of the embodiment.

FIG. 4 specifically shows the position detector 21 and the altering signal producing circuit 22. The position detecting elements 130A, 130B, and 130C of the position detector 21 correspond to the position detecting elements 107*a*, 107*b*, and 107*c* of FIG. 2. The voltage is applied in parallel to the position detecting elements via a resistor 131.

Differential detection signals e1 and e2 corresponding to the detected magnetic field of the field part 10 (corresponding to the permanent magnet 102 of FIG. 2) are output from output terminals of the position detecting element 130A (e1 and e2 vary in reversed phase), and then supplied to the bases of differential transistors 141 and 142 of the altering signal producing circuit 22.

Differential detection signals f1 and f2 corresponding to the detected magnetic field of the field part 10 are output from output terminals of the position detecting element 130B and then supplied to the bases of differential transistors 151 and 152.

Differential detection signals g1 and g2 corresponding to the detected magnetic field of the field part 10 are output from output terminals of the position detecting element 130C and then supplied to the bases of differential transistors 161 and 162.

As the rotational movement of the field part 10 proceeds, the detection signals e1, f1, and g1 (and e2, f2, and g2) smoothly vary so as to function as three-phase signals which are electrically separated in phase from each other by 120 deg.

Constant current sources 140, 147, 148, 150, 157, 158, 160, 167, and 168 of the altering signal producing circuit 22 supply a current of the same constant value. In correspondence with the detection signals e1 and e2, differential transistors 141 and 142 distribute the value of the current of the constant current source 140 to the collectors. The collector current of the transistor 141 is amplified two times by a current mirror circuit consisting of transistors 143 and 144. An altering signal h1 is obtained from the junction of the collector output of the transistor 144 and the constant current source 147. The collector current of the transistor 142 is amplified two times by a current mirror circuit consisting of transistors 145 and 146. An altering signal i1 is obtained via a current mirror circuit which consists of transistors 171 and 172 and which is connected to the junction of the collector output of the transistor 146 and the constant current source 148. Similarly, in correspondence with the detection signals f1 and f2, differential transistors 151 and 152 distribute the current of the constant current source 150 to the collectors. The collector current of the transistor 151 is amplified two times by a current mirror circuit consisting of transistors 153 and 154. An altering signal h2 is obtained from the junction of the collector output of the transistor 154 and the constant current source 157. The collector current of the transistor 152 is amplified two times by a current mirror circuit consisting of transistors 155 and 156. An altering signal i2 is obtained via a current mirror circuit which consists of transistors 173 and 174 and which is connected to the junction of the collector output of the transistor 156 and the constant current source 158. Furthermore, in correspondence with the detection signals g1 and g2, differential transistors 161 and 162 distribute the current of the constant current source 160 to the collectors. The collector current of the transistor 161 is amplified two times by a current mirror circuit consisting of transistors 163 and 164. An altering signal h3 is obtained from the junction of the collector output of the transistor 164 and the constant current source 167. The collector current of the transistor 162 is amplified two times by a current mirror circuit consisting of transistors 165 and 166. An altering signal i3 is obtained via a current mirror circuit which consists of transistors 175 and 176 and which is connected to the junction of the collector output of the transistor 166 and the constant current source 168.

The altering signals h1, h2, and h3 are three-phase signals which analoguely vary in correspondence with the detection signals, and are supplied to the first distributing circuit 31 (because of the configuration of the first distributing circuit 31 which will be described later, the altering signals h1, h2, and h3 function as outflow currents as seen from the altering signal producing circuit 22). The altering signals i1, i2, and i3 are three-phase signals which analoguely vary in correspondence with the detection signals, and supplied to the second distributing circuit 32 (because of the configuration of the second distributing circuit 32 which will be described later, the altering signals i1, i2, and i3 function as inflow currents as seen from the altering signal producing circuit 22). The altering signals h1 and i1 are alternatingly increased in level, the altering signals h2 and i2 are alternatingly increased in level, and the altering signals h3 and i3 are alternatingly increased in level.

The first distributing circuit 31 of the distribution block 13 of FIG. 1 obtains three-phase first distributed current signals to which the first output current signal d1 is distributed in correspondence with the altering signals h1, h2, and h3 of the altering signal producing circuit 22. The second distributing circuit 32 obtains three-phase second distributed current signals to which the second output current signal d2 is distributed in correspondence with the altering signals i1, i2, and i3 of the altering signal producing circuit 22. A distributing composer 33 composes the first and second distributed current signals into three-phase distributed signals, and supplies the distributed signals to a driving block 14.

Figure 5:
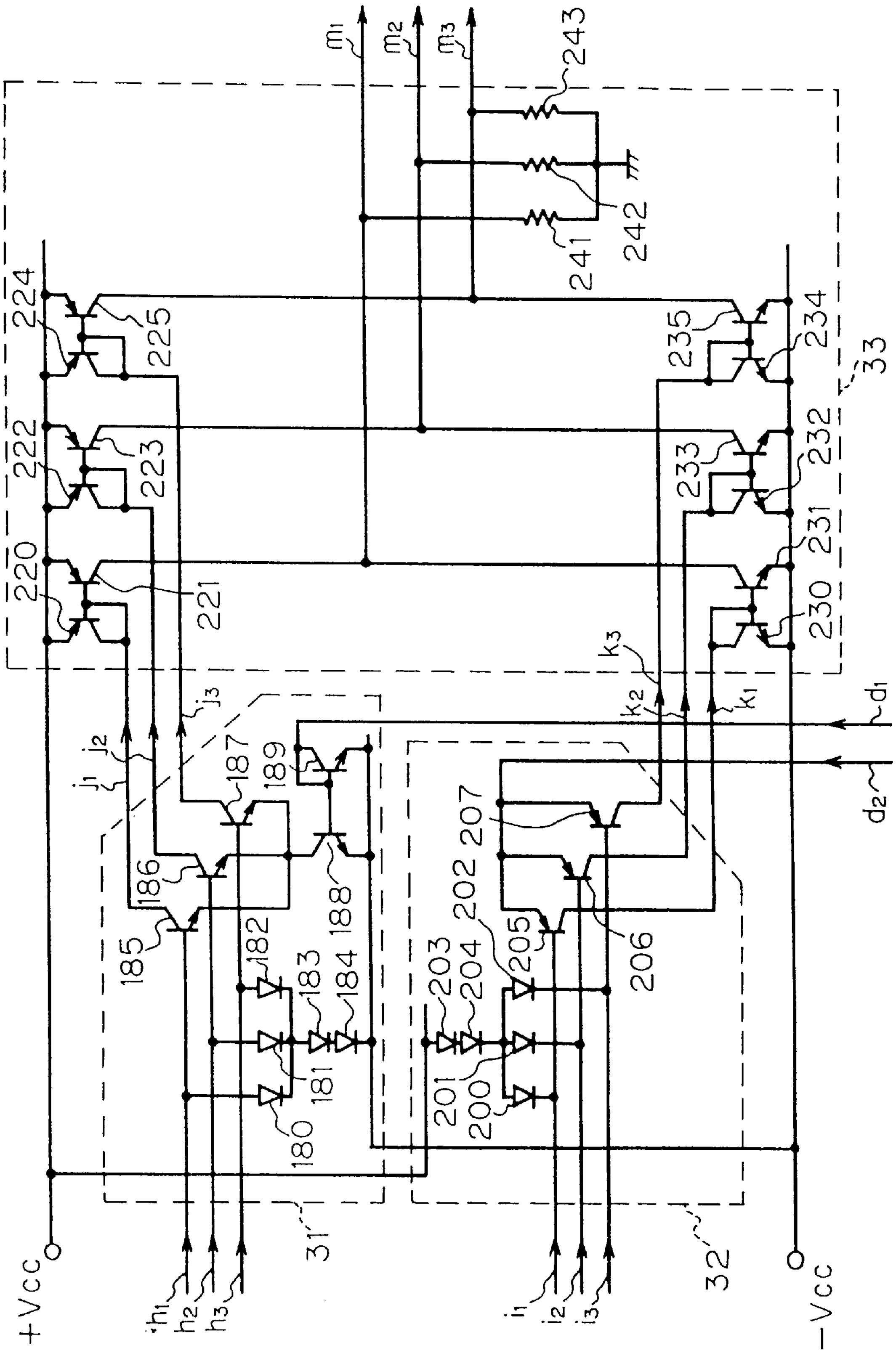
FIG. 5 is a specific circuit diagram of a first distributing circuit 31, a second distributing circuit 32, and a distributing composer 33 of the embodiment.

FIG. 5 specifically shows the configuration of the first distributing circuit 31, the second distributing circuit 32, and the distributing composer 33 of the distribution block 13. The altering signals h1, h2, and h3 which are input to the first distributing circuit 31 cause currents to flow into first diodes 180, 181, and 182, so that voltage signals corresponding to the inflow current values of the signals h1, h2, and h3 are generated. In the first diodes 180, 181, and 182, the ends of one side are connected to each other and the other ends are connected to the bases of first distributing transistors 185, 186, and 187, respectively. The first output current signal d1 of a command block 15 is supplied via a current mirror circuit consisting of transistors 188 and 189, to the emitters of the first distributing transistors 185, 186, and 187 which are connected to each other. In correspondence with the altering signals h1, h2, and h3, therefore, the first distributing transistors 185, 186, and 187 distribute the first output current signal d1 so as to generate the three-phase first distributed current signals j1, j2, and j3 (inflow currents) which analoguely vary. Diodes 183 and 184 produce a voltage bias.

The first distributed current signal j1 of the first distributing circuit 31 varies responding with a result h1·d1 of a multiplication of the altering signal h1 (the inflow current value) and the first output current signal d1 (the current value) of the command block 15, the first distributed current signal j2 varies responding with a result h2·d1 of a multiplication of the altering signal h2 and the first output current signal d1, and the first distributed current signal j3 varies responding with a result h3·d1 of a multiplication of the altering signal h3 and the first output current signal d1 (the value of the composed current j1+j2+j3 of the first distributed current signals is equal to the first output current signal d1).

The altering signals i1, i2, and i3 which are input to the second distributing circuit 32 cause currents to flow out from second diodes 200, 201, and 202, so that voltage signals corresponding to the outflow current values of the signals i1, i2, and i3 are generated. In the second diodes 200, 201, and 202, the ends of one side are connected to each other and the other ends are connected to the bases of second distributing transistors 205, 206, and 207, respectively. The second output current signal d2 of the command block 15 is supplied to the emitters of the second distributing transistors 205, 206, and 207 which are connected to each other. In correspondence with the altering signals i1, i2, and i3, therefore, the second distributing transistors and 205, 206, and 207 distribute the second output current signal d2 so as to generate the three-phase second distributed current signals k1, k2, and k3 (outflow currents) which analoguely vary. Diodes 203 and 204 produce a voltage bias.

The second distributed current signal k1 of the second distributing circuit 32 varies responding with a result i1·d2 of a multiplication of the altering signal i1 (the outflow current value) and the second output current signal d2 (the current value) of the command block 15, the second distributed current signal k2 varies responding with a result i2·d2 of a multiplication of the altering signal i2 and the second output current signal d2, and the second distributed current signal k3 varies responding with a result i3·d2 of a multiplication of the altering signal i3 and the second output current signal d2 (the value of the composed current k1+k2+k3 of the second distributed current signals is equal to the second output current signal d2).

Three current mirror circuits respectively consisting of transistors 220 and 221, 222 and 223, and 224 and 225 of the distributing composer 33 invert the first distributed current signals j1, j2, and j3 and output the inverted signals. Three current mirror circuits respectively consisting of transistors 230 and 231, 232 and 233, and 234 and 235 of the distributing composer 33 invert the second distributed current signals k1, k2, and k3 and output the inverted signals. The first and second distributed current signals j1 and k1 are composed together at the junction of the respective current mirror circuits, and a composed distributed current signal corresponding to a difference current (j1−k1) is generated. The composed distributed current signal is supplied to a resistor 241 so as to produce a distributed signal m1 appearing in the form of the voltage drop of the resistor 241. Similarly, the first and second distributed current signals j2 and k2 are composed together at the junction of the respective current mirror circuits, and a composed distributed current signal corresponding to a difference current (j2−k2) is generated. The composed distributed current signal is supplied to a resistor 242 so as to produce a distributed signal m2 appearing in the form of the voltage drop of the resistor 242. Furthermore, the first and second distributed current signals j3 and k3 are composed together at the junction of the respective current mirror circuits, and a composed distributed current signal corresponding to a difference current (j3−k3) is generated. The composed distributed current signal is supplied to a resistor 243 so as to produce a distributed signal m3 appearing in the form of the voltage drop of the resistor 243.

In this way, the distributed signals m1, m2, and m3 appear as three-phase voltage signals corresponding to the altering signals and have a predetermined amplitude which depends on the current values of the output current signals d1 and d2 of the command block 15 (the amplitudes are not affected by the amplitudes of the detection signals and the altering signals).

The driving block 14 of FIG. 1 comprises a first driving circuit 41, a second driving circuit 42, and a third driving circuit 43, and supplies driving signals Va, Vb, and Vc, which are power-amplified signals corresponding to the distributed signals m1, m2, and m3 of the distribution block 13, to the terminals of the three-phase coils 11A, 11B, and 11C.

Figure 6:
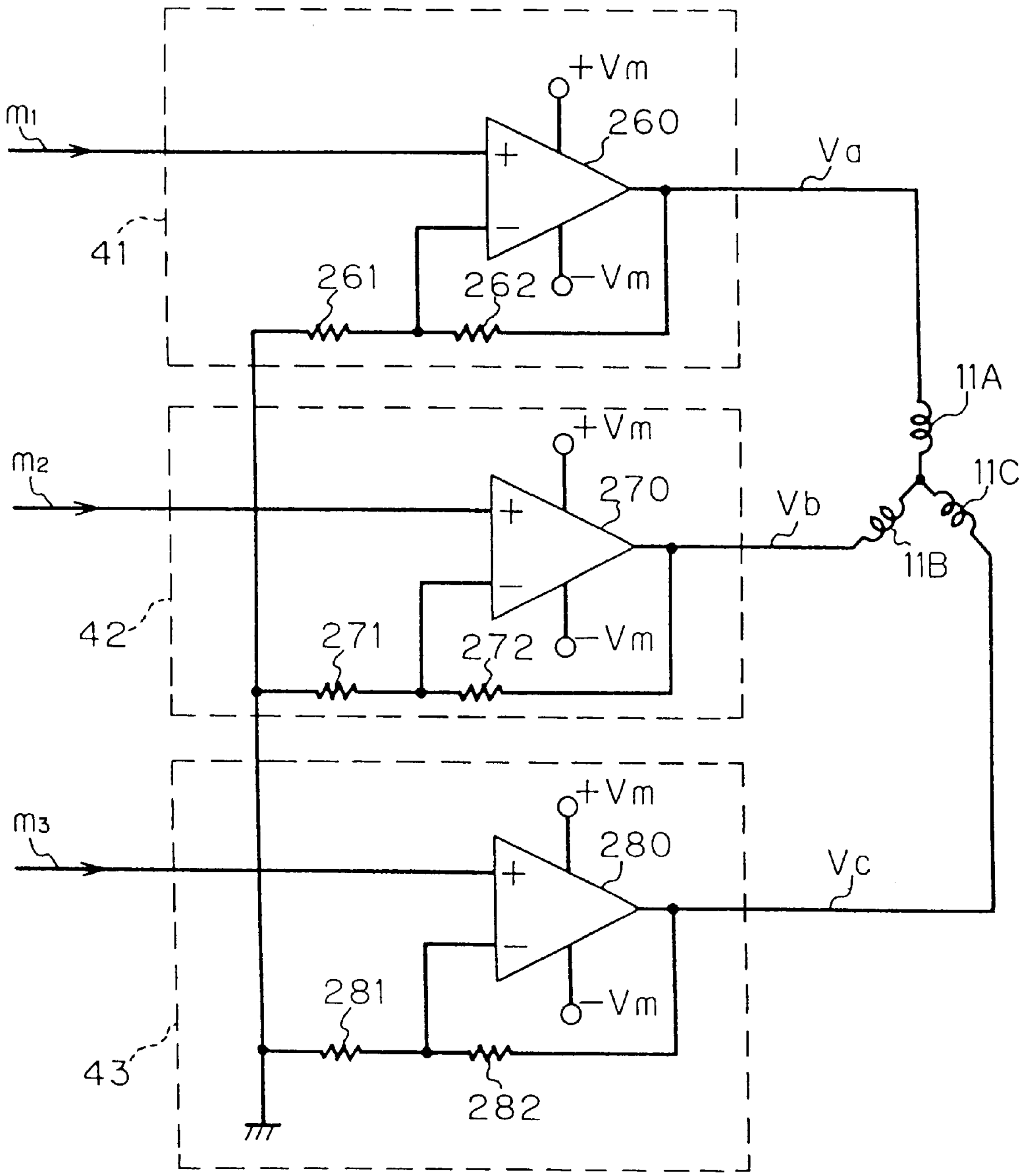
FIG. 6 is a specific circuit diagram of a first driving circuit 41, a second driving circuit 42, and a third driving circuit 43 of the embodiment.

FIG. 6 specifically shows the configuration of the first driving circuit 41, the second driving circuit 42, and the third driving circuit 43. The distributed signal m1 is input to the noninverting terminal of an amplifier 260 of the first driving circuit 41 and amplified with an amplification factor defined by resistors 261 and 262, thereby producing the driving signal Va. The driving signal is supplied to the power input terminal of the coil 11A. Similarly, the distributed signal m2 is input to the noninverting terminal of an amplifier 270 of the second driving circuit 42 and amplified with an amplification factor defined by resistors 271 and 272, thereby producing the driving signal Vb. The driving signal is supplied to the power input terminal of the coil 11B. Furthermore, the distributed signal m3 is input to the noninverting terminal of an amplifier 280 of the second driving circuit 43 and amplified with an amplification factor defined by resistors 281 and 282, thereby producing the driving signal Vc. The driving signal is supplied to the power input terminal of the coil 11C. The amplifiers 260, 270, and 280 are supplied with power source voltages +Vm and −Vm (+Vm=15 V, −Vm=−15 V).

As a result of the supply of the driving signals Va, Vb, and Vc, three-phase driving currents are supplied to the three-phase coils 11A, 11B, and 11C, so that a driving force is generated in a predetermined direction by electromagnetic interaction between the currents of the coils and the magnetic field of the field part 10.

Figure 7:
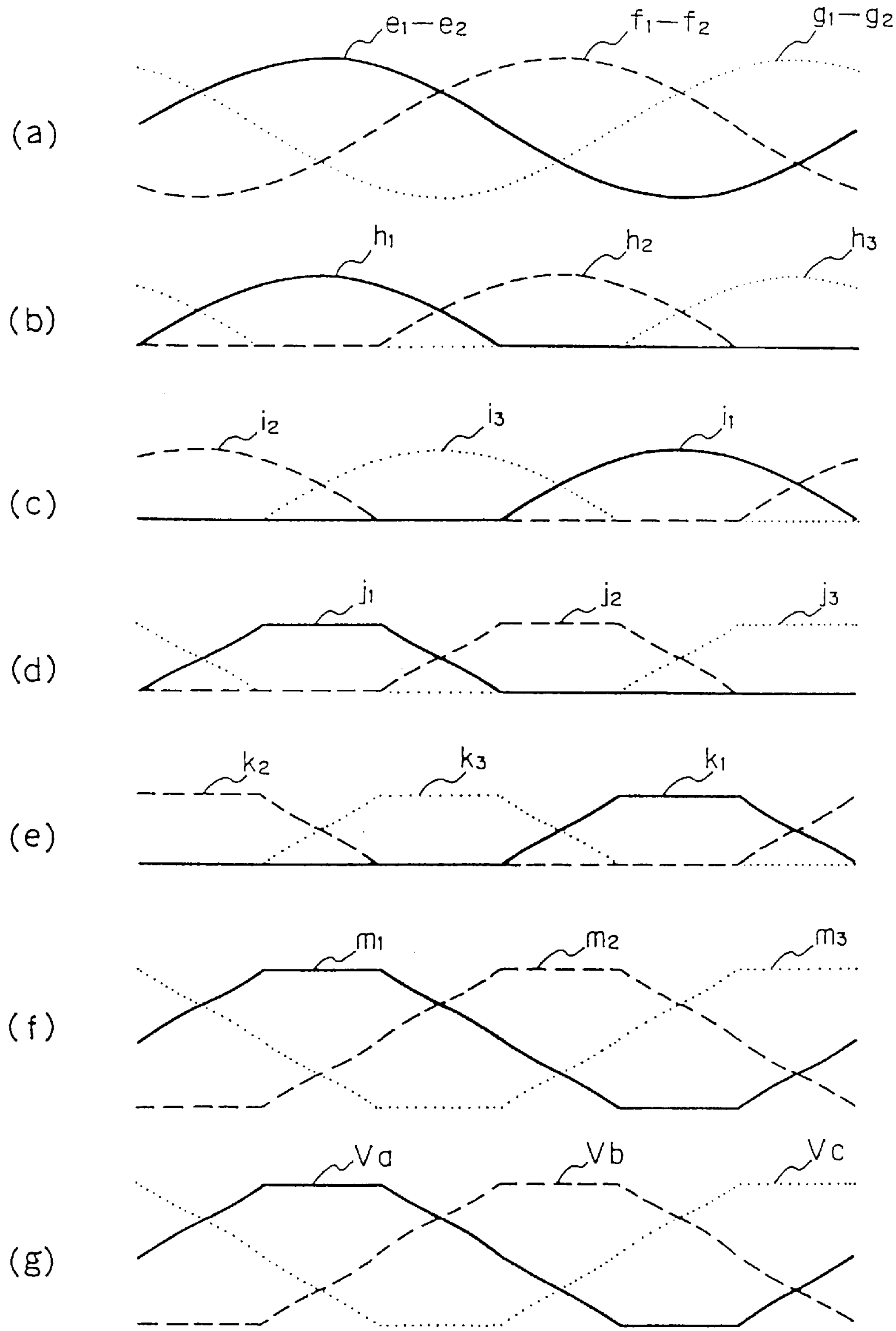
FIG. 7 is a waveform chart illustrating the operation of the embodiment.

FIG. 7 is a waveform chart illustrating the operation of the embodiment. As the rotational movement (or a relative movement with respect to the three-phase coils) of the field part 10 proceeds, the position detecting elements 130A, 130B, and 130C which detects the magnetic field of the field part 10 produce sinusoidal detection signals e1−e2, f1−f2, and g1−g2 (see (a) of FIG. 7 wherein the horizontal axis indicates the rotational position). The altering signal producing circuit 22 produces the three-phase altering signals h1, h2, and h3 (the currents supplied to the first diodes, (b) of FIG. 7), and il, i2, and i3 (the currents supplied to the second diodes, (c) of FIG. 7) which analoguely vary in correspondence with the detection signals. In the first distributing circuit 31, the first output current signal d1 is distributed by the first distributing transistors 185, 186, and 187 in correspondence with the values of the altering signals h1, h2, and h3 (the values of the currents supplied to the first diodes 180, 181, and 182), thereby obtaining the three-phase first distributed current signals j1, j2, and j3 ((d) of FIG. 7). The first distributed current signals j1, j2, and j3 are three-phase current signals which vary in correspondence with the results h1·d1, h2·d1, and h3·d1 of multiplications of the altering signals h1, h2, and h3 by the first output current signal d1, respectively, and which are distributed in such a manner that a sum of the results h1·d1+h2·d1+h3·d1 is equal to the first output current signal d1. Similarly, in the second distributing circuit 32, the second output current signal d2 is distributed by the second distributing transistors 205, 206, and 207 in correspondence with the values of the altering signals i1, i2, and i3 (the values of the currents supplied to the second diodes 200, 201, and 202), thereby obtaining the three-phase second distributed current signals k1, k2, and k3 ((e) of FIG. 7). The second distributed current signals k1, k2, and k3 are three-phase current signals which vary in correspondence with the results i1·d2, i2·d2, and i3·d2 of multiplications of the altering signals i1, i2, and i3 by the second output current signal d2, respectively, and which are distributed in such a manner that a sum of the results i1·d2+i2·d2+i3·d2 is equal to the second output current signal d2. The distributing composer 33 composes the first distributed current signals j1, j2, and j3 and the second distributed current signals k1, k2, and k3, and obtains the three-phase distributed signals m1, m2, and m3 ((f) of FIG. 7). The distributed signals m1, m2, and m3 vary in correspondence with differential currents j1−k1, j2−k2, and j3−k3 between the first and second distributed current signals for each phase. The first driving circuit 41, the second driving circuit 42, and the third driving circuit 43 of the driving block 14 supplies the driving signals Va, Vb, and Vc ((g) of FIG. 7) which are respectively obtained by amplifying the distributed signals m1, m2, and m3, to the three-phase coils 11A, 11B, and 11C.

In the thus configured embodiment, even when the altering signals h1, h2, h3, i1, i2, and i3 corresponding to the detection signals of the position detector 21 are large or small in amplitude, the first and second distributed signals of the first and second distributing circuit 31 and 32 are surely limited to amplitudes corresponding to the first and second output current signal d1 and d2 of the command block 15. Therefore, the distributed signals m1, m2, and m3 (or the driving signals Va, Vb, and Vc) are not affected by the amplitudes of the detection signals and the altering signals. In other words, the signals are free from influences due to variation in the sensitivities of the position detecting elements 130A, 130B, and 130C of the position detector 21, variation in the magnetic field of the field part 10, and variation in the gains of the altering signal producing circuit 22. Therefore, when the brushless motor of the embodiment is used to a speed control or a torque control, variation in speed control gains or torque control gains in mass production is reduced, and hence the control properties of motors in mass production are extremely unified (control instability due to variation in the gains of motors does not occur).

In the embodiment, even when the detection signals of the position detector vary analoguely sinusoidally, the distributed signals and the driving signals are distorted into a trapezoidal shape. In many uses, such distortion is allowable. In order to realize higher performance, however, it is preferable to eliminate such distortion. Next, an embodiment which is improved in this point will be described.

Embodiment 2

Hereinafter, a second embodiment of the invention will be described with reference to the accompanying drawings.

Figure 8:
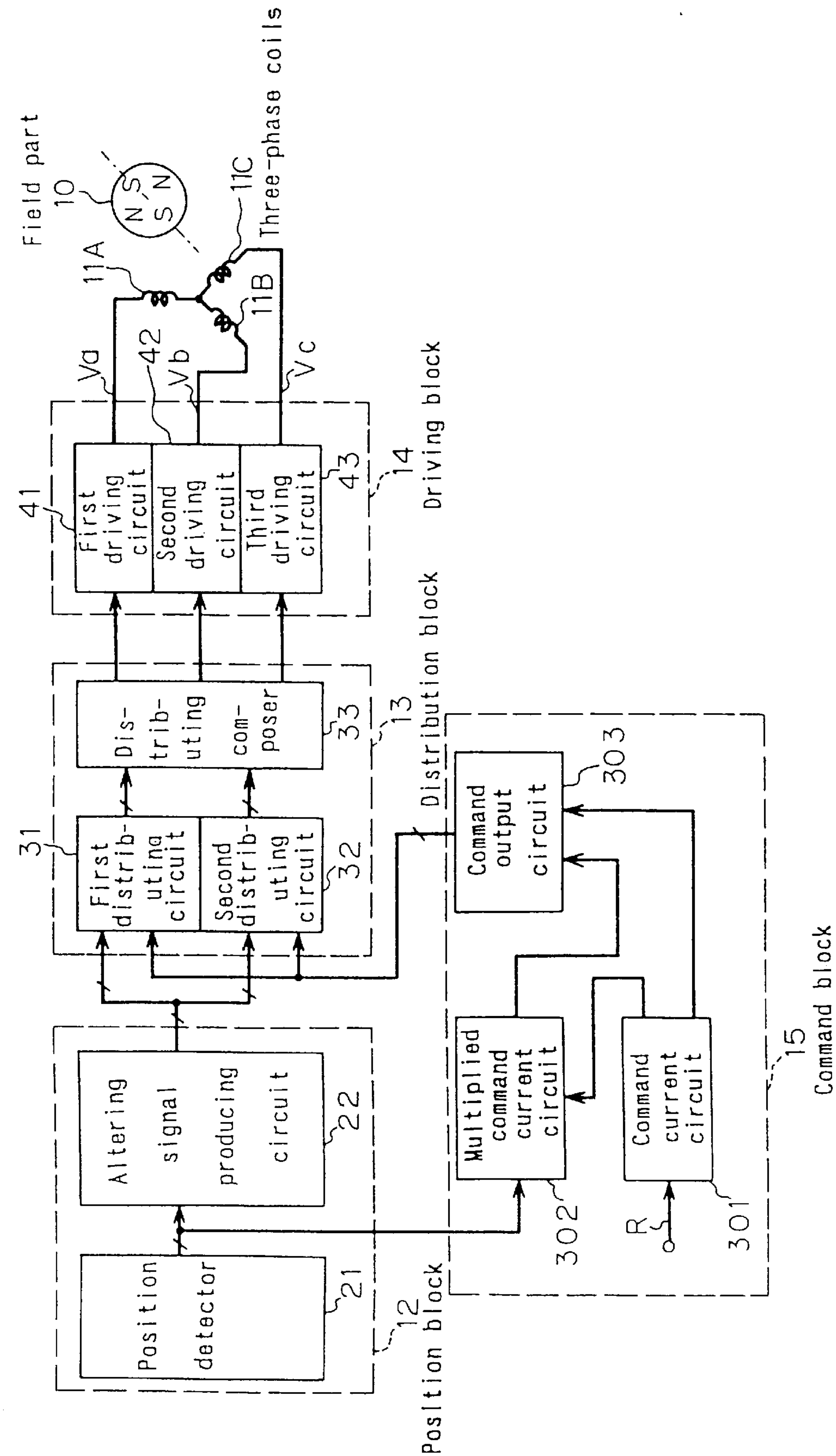
FIG. 8 is a block diagram of Embodiment 2 of the invention.

FIGS. 8 to 11 show a brushless motor of the second embodiment of the invention. FIG. 8 shows the whole configuration of the motor.

In the circuit block diagrams, a connection line to or from circuit block with oblique short bar crossing therewith represents plural connection lines or a connection line for aggregate signals.

In the embodiment, a command block 15 comprises a command current circuit 301, a multiplied command current circuit 302, and a command output circuit 303, and produces distributed signals and driving signals which vary analoguely. The components which are identical with those of the first embodiment are designated by the same reference numerals.

Figure 9:
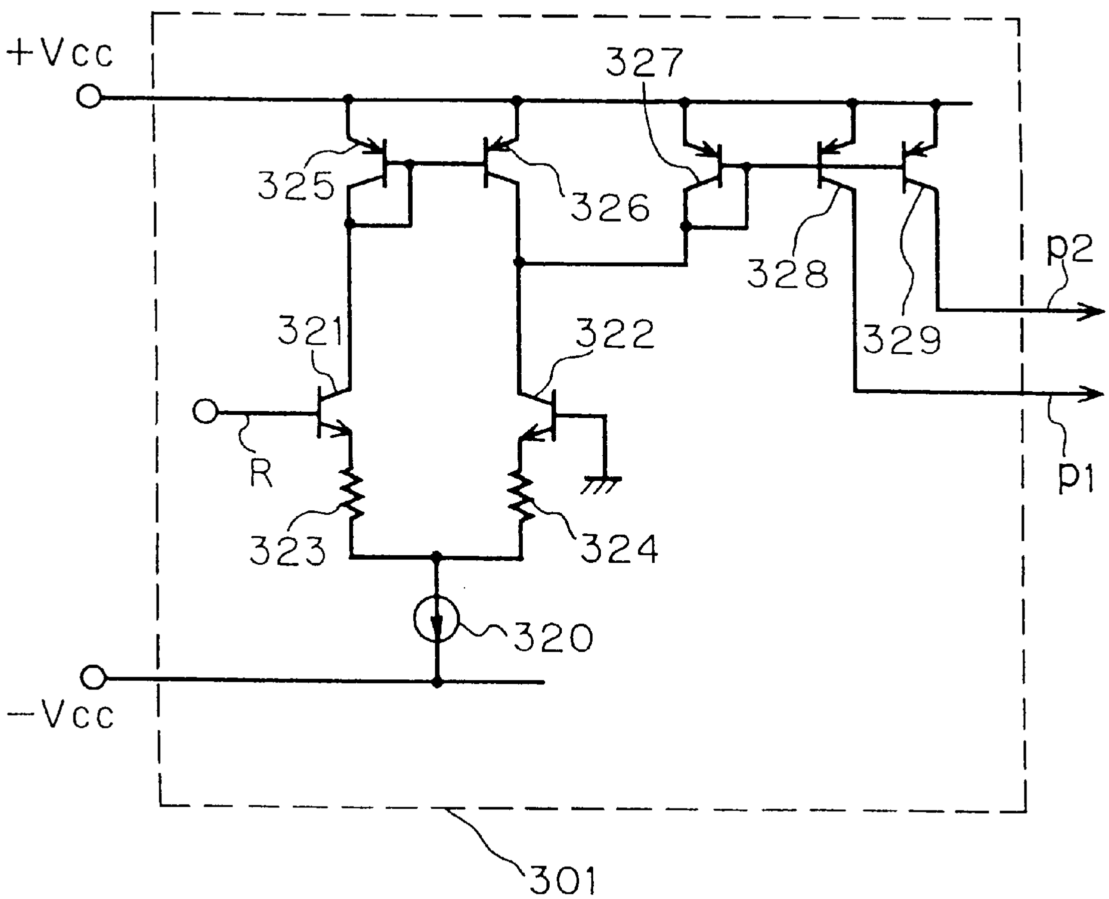
FIG. 9 is a specific circuit diagram of a command current circuit 301 of Embodiment 2.

FIG. 9 specifically shows the configuration of the command current circuit 301 of the command block 15. In correspondence with the command signal R, transistors 321 and 322, and resistors 323 and 324 distribute the current of a constant current source 320 to the collectors of the transistors 321 and 322. The collector currents are compared with each other by a current mirror circuit consisting of transistors 325 and 326, and the difference current is output as command current signals p1 and p2 through a current mirror circuit consisting of transistors 327, 328, and 329. Therefore, the command current circuit 301 produces two command current signals p1 and p2 (p1 and p2 are proportional to each other) corresponding to the command signal R. The first command current signal p1 is supplied to the command output circuit 303, and the second command current signal p2 to the multiplied command current circuit 302.

Figure 10:
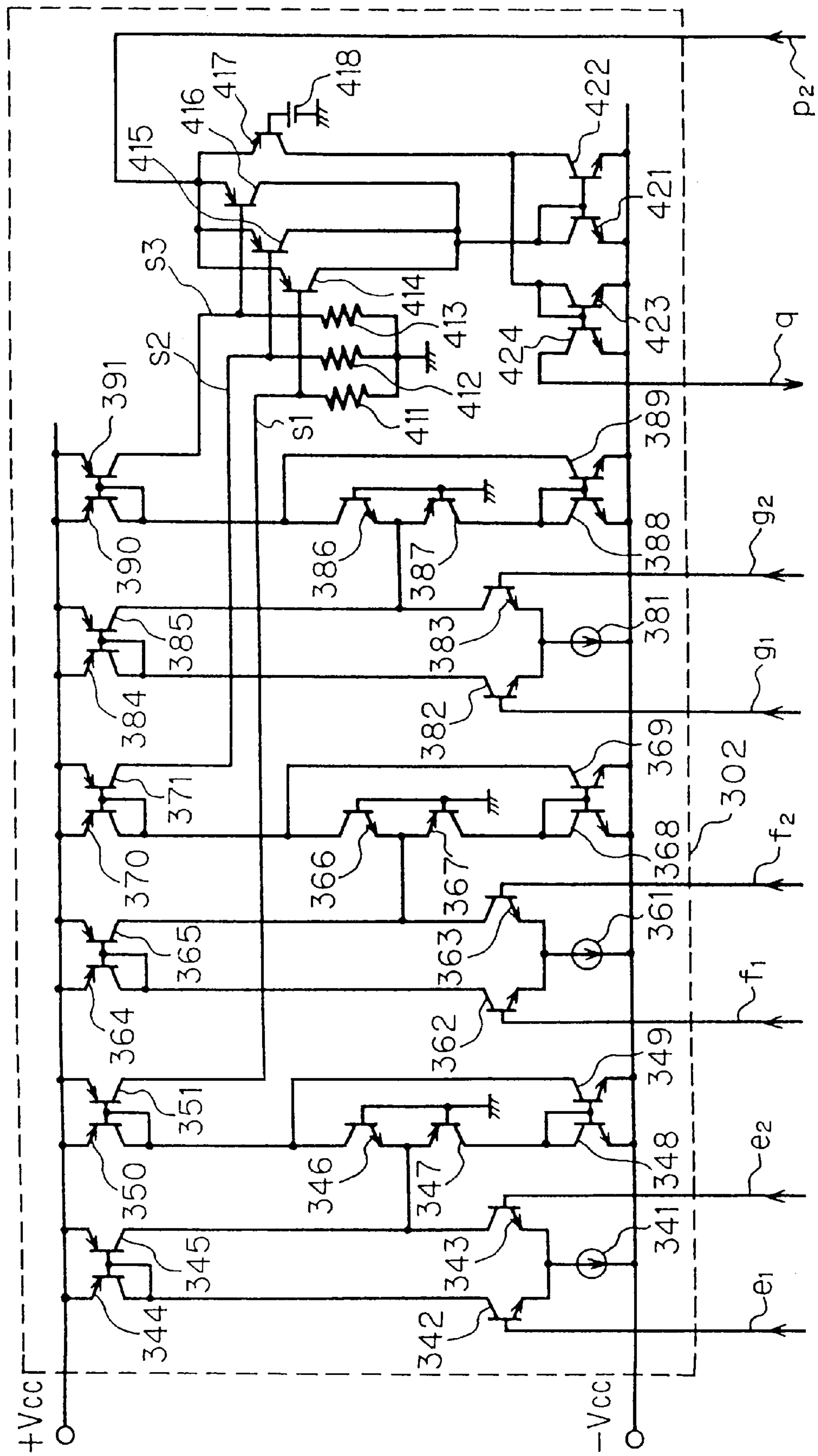
FIG. 10 is a specific circuit diagram of a multiplied command current circuit 302 of the embodiment.

FIG. 10 specifically shows the configuration of the multiplied command current circuit 302 of the command block 15. In correspondence with the detection signals e1 and e2, transistors 342 and 343 distribute the value of the current of a constant current source 341 to the collectors. The difference current is obtained by a current mirror circuit consisting of transistors 344 and 345, and a voltage signal s1 corresponding to the absolute value of the difference current is obtained by transistors 346, 347, 348, 349, 350, and 351, and a resistor 411. In other words, the voltage signal s1 corresponding to the absolute value of a detection signal e1−e2 is produced. Similarly, a voltage signal s2 corresponding to the absolute value of a detection signal f1−f2 is produced at a resistor 412, and a voltage signal s3 corresponding to the absolute value of a detection signal g1−g2 is produced at a resistor 413. In other words, the voltage signals s1, s2, and s3 at the resistors 411, 412, and 413 are absolute signals of the three-phase detection signals e1−e2, f1−f2, and g1−g2. Transistors 414, 415, 416, and 417 compares the voltage signals s1, s2, and s3 with a predetermined voltage value (including 0 V) of a constant voltage source 418. In correspondence with the difference voltages, the command current signal p2 is distributed to the collectors of the transistors. The collector currents of the transistors 414, 415, and 416 are composed together. A current mirror circuit consisting of transistors 421 and 422 compares the composed current with the collector current of the transistor 417, and the resultant difference current is output as a multiplied command current signal q (inflow current) via a current mirror circuit consisting of transistors 423 and 424. The multiplied command current signal q varies responding with results of multiplications of the voltage signals s1, s2, and s3 corresponding to the detections signals by the command current signal p2 corresponding to the command signal. Particularly, because of the configuration of the transistors 414, 415, 416, and 417, the multiplied command current signal q varies responding with a result of multiplication between the minimum value of the voltage signals s1, s2, and s3 (three-phase absolute signals) and the command current signal p2. The minimum value of the voltage signals s1, s2, and s3 (three-phase absolute signals) corresponding to the absolute values of the detection signals is a higher harmonic signal which is synchronized with the detection signals and which varies 6 times for a change of every one period of the detection signals. Therefore, the multiplied command current signal q is a higher harmonic signal which has an amplitude proportional to the command current signal p2 and which varies 6 times every one period of the detection signals.

Figure 11:
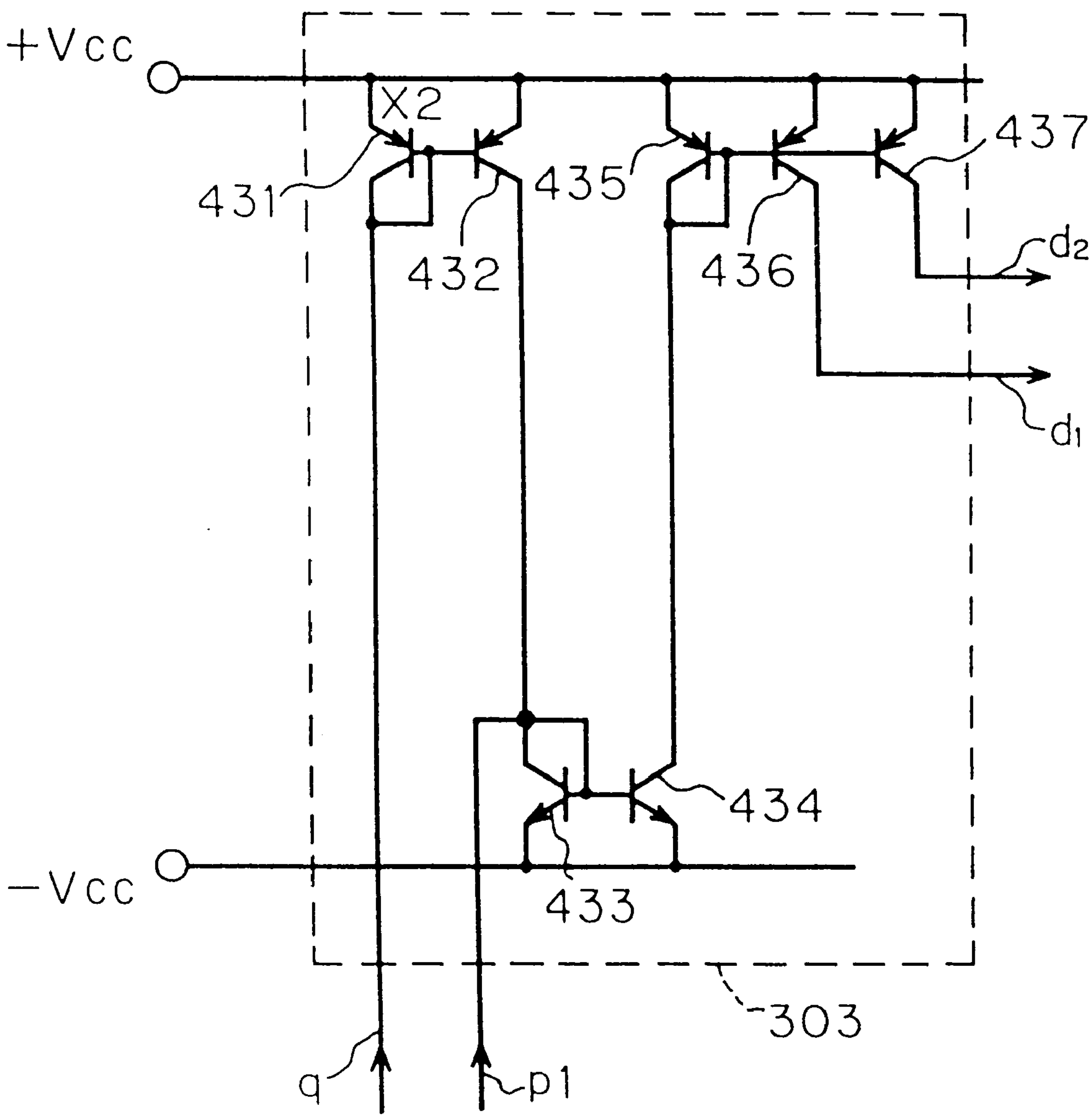
FIG. 11 is a specific circuit diagram of a command output circuit 303 of the embodiment.

FIG. 11 specifically shows the configuration of the command output circuit 303 of the command block 15. The multiplied command current signal q of the multiplied command output circuit 302 is input to a current mirror circuit consisting of transistors 431 and 432 and reduced in current value to approximately one half. Thereafter, the signal and the first command current signal p1 of the command current circuit 301 are composed together by addition. The composed command current signal is output as the two output current signals d1 and d2 via a current mirror circuit consisting of transistors 433 and 434, and that of transistors 435, 436, and 437. As a result, the first and second output current signals d1 and d2 of the command block 15 become output current signals which vary in correspondence with the command signal and which contain the higher harmonic signal component at a predetermined percentage. The first output current signal d1 is supplied to the first distributing circuit 31 of the distribution block 13, and the second output current signal d2 to the second distributing circuit 32.

The specific configurations and operations of the position block 12 (the position detector 21 and the altering signal producing circuit 22), the distribution block 13 (the first distributing circuit 31, the second distributing circuit 32, and the distributing composer 33), and the driving block 14 (the first driving circuit 41, the second driving circuit 42, and the third driving circuit 43) are the same as those shown in FIGS. 4, 5, and 6. Therefore, their detailed description is omitted.

Figure 12:
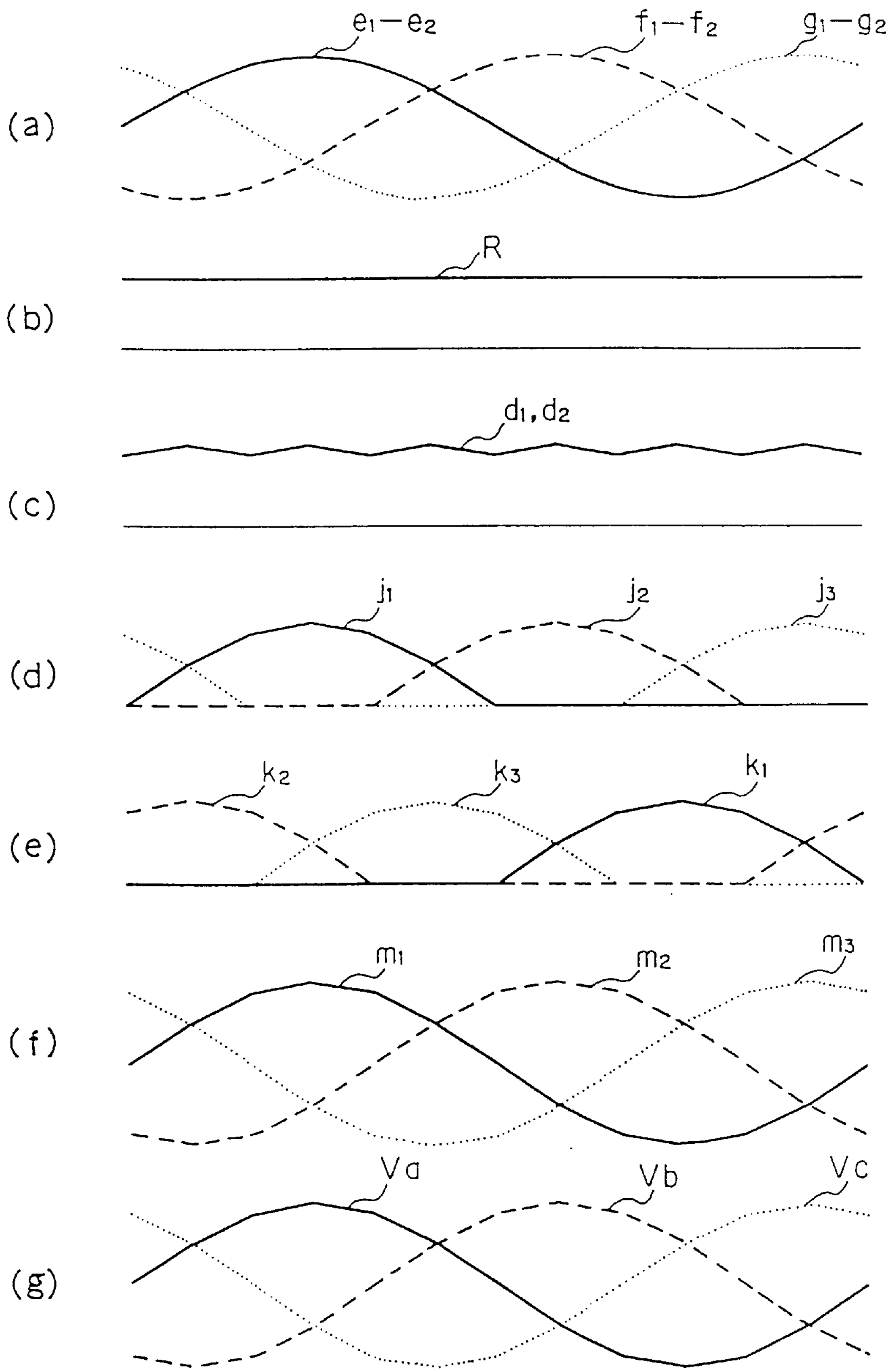
FIG. 12 is a waveform chart illustrating the operation of Embodiment 2.

FIG. 12 is a waveform chart of the embodiment. As the rotational movement (or a relative movement with respect to the three-phase coils) of the field part 10 proceeds, the position detecting elements 130A, 130B, and 130C which detect the magnetic field of the field part 10 produce sinusoidal detection signals e1–e2, f1–f2, and g1–g2 (see (a) of FIG. 12 wherein the horizontal axis indicates the rotational position). In response to the command signal R of a predetermined value ((b) of FIG. 12), the multiplied command current circuit 302 and the command output circuit 303 of the command block 15 produce the first and second output current signals d1 and d2 of the command block 15, each of which contains the higher harmonic signal component at a predetermined percentage in correspondence with the detection signals ((c) of FIG. 12). The altering signal producing circuit 22 produces the three-phase altering signals h1, h2, and h3, and i1, i2, and i3 which analoguely vary in correspondence with the detection signals. In the first distributing circuit 31, the first output current signal d1 of the command block 15 is distributed by the first distributing transistors 185, 186, and 187 in correspondence with the values of the altering signals h1, h2, and h3 (the values of the currents supplied to the first diodes 180, 181, and 182), thereby obtaining the three-phase first distributed current signals j1, j2, and j3 ((d) of FIG. 12). The first distributed current signals j1, j2, and j3 are current signals which vary in correspondence with the results h1·d1, h2·d1, and h3·d1 of multiplications of the altering signals h1, h2, and h3 by the first output current signal d1, respectively, and which are distributed in such a manner that a sum of the results h1·d1+h2·d1+h3·d1 is equal to the first output current signal d1. Similarly, in the second distributing circuit 32, the second output current signal d2 of the command block 15 is distributed by the second distributing transistors 205, 206, and 207 in correspondence with the values of the altering signals i1, i2, and i3 (the values of the currents supplied to the second diodes 200, 201, and 202), thereby obtaining the three-phase second distributed current signals k1, k2, and k3 ((e) of FIG. 12). The second distributed current signals k1, k2, and k3 are current signals which vary in correspondence with the results i1·d2, i2·d2, and i3·d2 of multiplications of the altering signals i1, i2, and i3 by the second output current signal d2, respectively, and which are distributed in such a manner that a sum of the results i1·d2+i2·d2+i3·d2 is equal to the second output current signal d2. The distributing composer 33 composes the first distributed current signals j1, j2, and j3 and the second distributed current signals k1, k2, and k3 together, thereby obtaining the three-phase distributed signals m1, m2, and m3 ((f) of FIG. 12). The distributed signals m1, m2, and m3 vary in correspondence with differential currents j1–k1, j2–k2, and j3–k3 between the first and second distributed current signals for each phase. The first driving circuit 41, the second driving circuit 42, and the third driving circuit 43 of the driving block 14 supply the driving signals Va, Vb, and Vc ((g) of FIG. 12) which are respectively obtained by amplifying the distributed signals m1, m2, and m3, to the three-phase coils 11A, 11B, and 11C.

In the thus configured embodiment, the distributed signals m1, m2, and m3 (or the driving signals Va, Vb, and Vc) are not affected by variation in the sensitivities of the position detecting elements 130A, 130B, and 130C of the position detector 21, variation in the magnetic field of the field part 10, and variation in the gain of the altering signal producing circuit 22, and have amplitudes corresponding to the command signal.

When, in the command block, the output current signals which are proportional to the command signal and which contain the higher harmonic signal component at a predetermined percentage in accordance with the detection signals are produced, and the distributed signals which vary in correspondence with results of multiplications of the output currents by the altering signal (signals corresponding to the detection signals) are produced, then the distributed signals m1, m2, and m3 (or the driving signals Va, Vb, and Vc) can be formed as three-phase sinusoidal signals analoguely varying in correspondence with the detection signals. Therefore, distortions of the distributed signals and the driving signals are reduced to a very low level, and a uniform torque is generated, so that the motor is smoothly driven.

When the command current circuit produces two command current signals corresponding to the command signal, the multiplied command current circuit produces the multiplied command current signal which is obtained by multiplying one of the command current signals with the higher harmonic signal produced by the detection signals, and the command output circuit produces the output current signals by composing the other command current signal and the multiplied command current signal, variation in amplitude of the multiplied command current signal can be reduced even when the detection signals vary in amplitude. Because the transistors 414, 415, and 416 in the multiplied command current circuit are nonlinearly operated. So, variation in the percentages of the higher harmonic signal component contained in the output current signals d1 and d2 of the command block can be reduced. In other words, the motor is very resistant to variation in the sensitivities of the position detecting elements and variation in the magnetic field of the field part. When the motor is configured so as to obtain three-phase absolute signals corresponding to the detection signals and a higher harmonic signal corresponding to a minimum value of the three-phase absolute signals, a higher harmonic signal which is synchronized with the detection signals and which varies 6 times for a change of every one period can be accurately produced by a simple configuration.

Embodiment 3

Hereinafter, a third embodiment of the invention will be described with reference to the accompanying drawings.

FIGS. 13 to 21 show the third embodiment of the brushless motor of the invention.

In the circuit block diagrams, a connection line to or from circuit block with oblique short bar crossing therewith represents plural connection lines or a connection line for aggregate signals.

In the embodiment, the positional relationships between coils and position detecting elements are shifted from each other by an electric angle of about 30 deg., additionally. So, the detecting elements are positioned between the coils, thereby facilitating the production of the motor. Since the position detecting elements and the coils are arranged with separating their phase relationships from each other by about 30 deg. in electric angle, driving signals which are shifted by 30 deg. as seen from the detection signals of the position detecting elements are applied to the coils, respectively.

Figure 13:
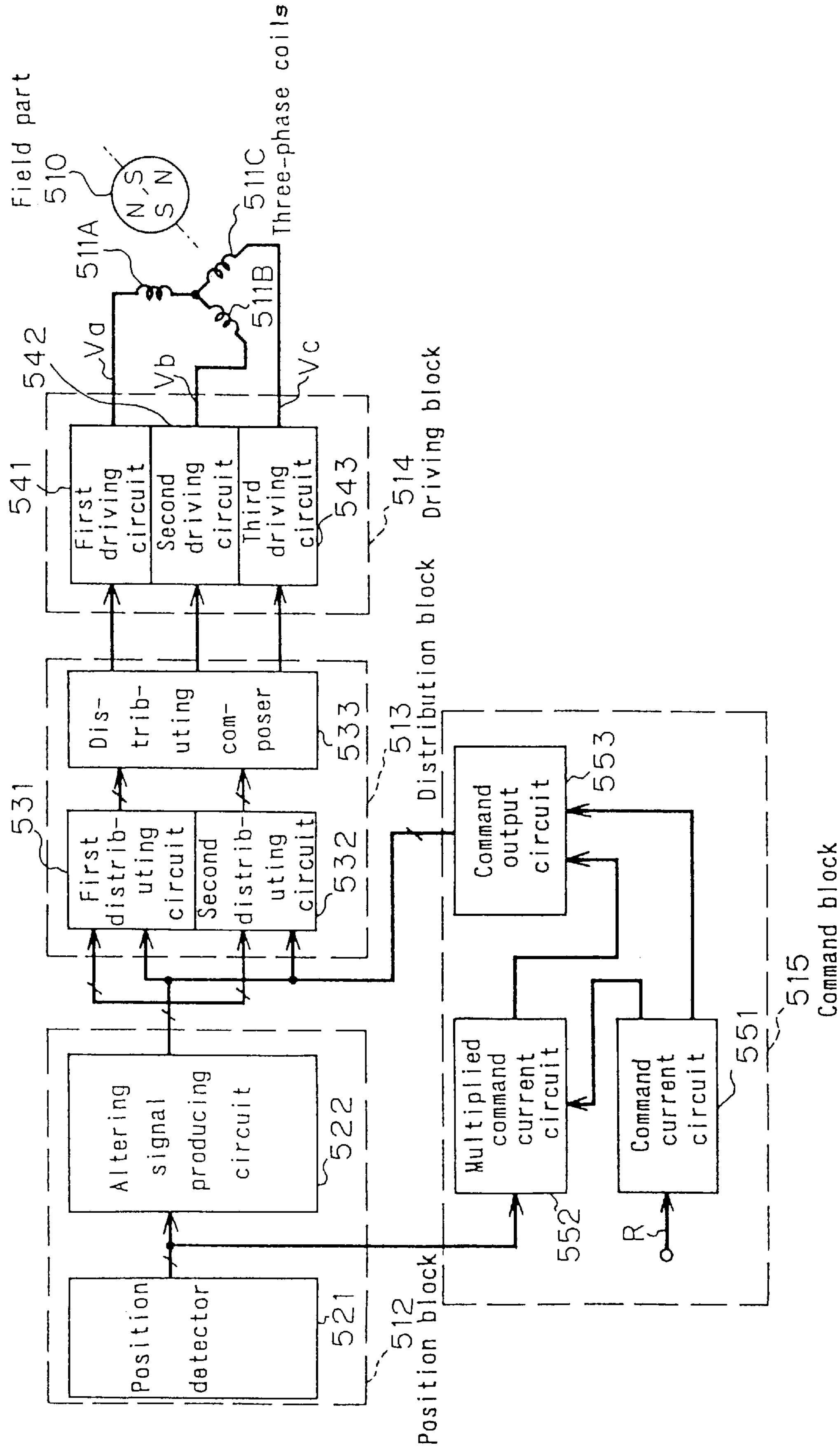
FIG. 13 is a block diagram of Embodiment 3 of the invention.

FIG. 13 shows the whole configuration of the motor. A field part 510 shown in FIG. 13 is mounted on the rotor or a movable body and forms plural magnetic field poles by a permanent magnet, thereby generating field magnetic fluxes. Three-phase coils 511A, 511B, and 511C are mounted on the stator or a stationary body and arranged so as to be electrically separated from each other by a predetermined angle (corresponding to 120 deg.) with respect to intercrossing with the magnetic fluxes generated by the field part 510.

Figure 14:
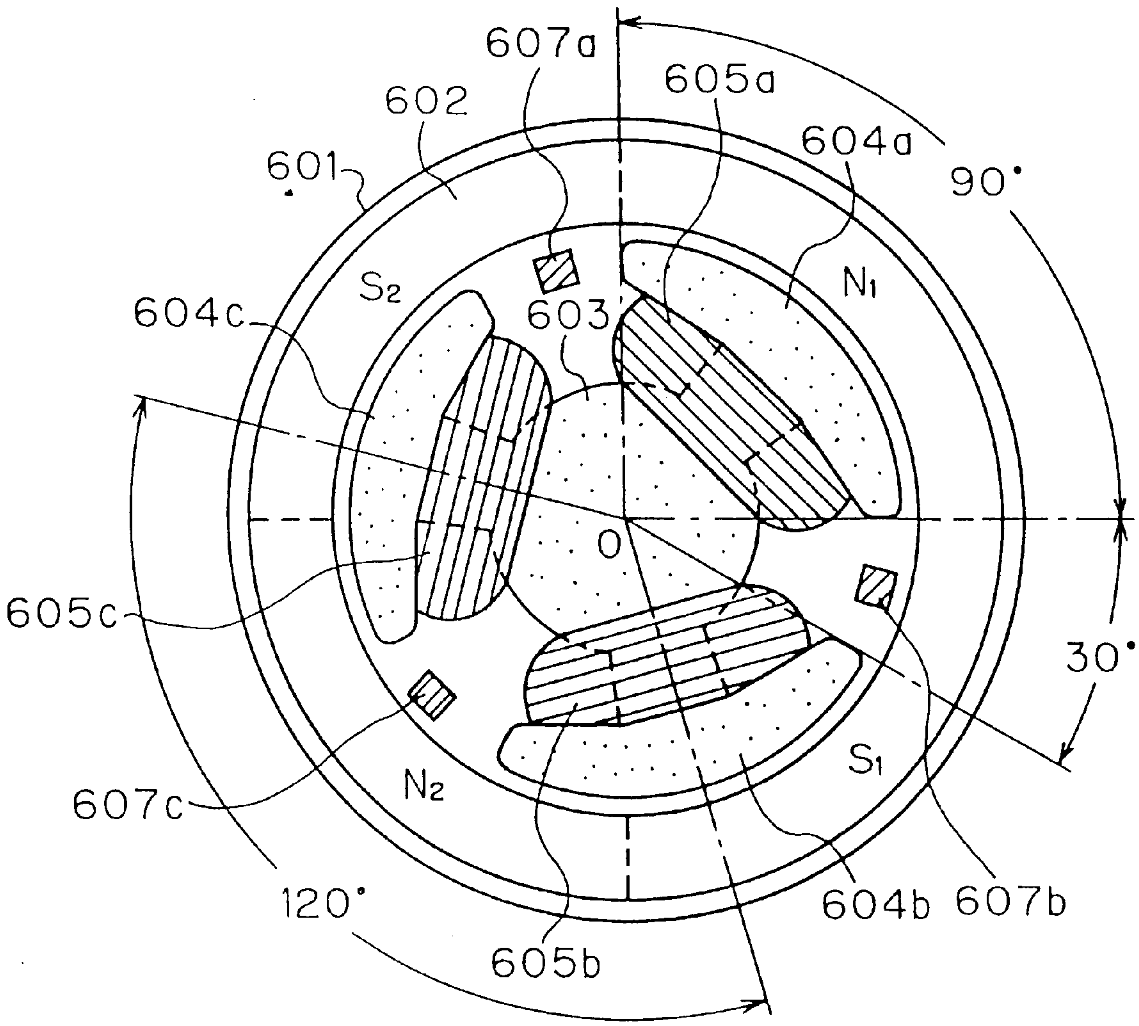
FIG. 14 is a diagram showing the structure of a motor of Embodiment 3.

FIG. 14 specifically shows the configuration of the field part 510 and the three-phase coils 511A, 511B, and 511C. In an annular permanent magnet 602 attached to the inner side of the rotor 601, the inner and end faces are magnetized so as to form four poles, thereby constituting the field part 510 shown in FIG. 13. An armature core 603 is placed at a position of the stator which opposes the poles of the permanent magnet 602. Three salient poles 604*a*, 604*b*, and 604*c* are disposed in the armature core 603 at intervals of 120 deg. Three-phase coils 605*a*, 605*b*, and 605*c* (corresponding to the three-phase coils 511A, 511B, and 511C shown in FIG. 13) are wound on the salient poles 604*a*, 604*b*, and 604*c*, respectively. Among the coils 605*a*, 605*b*, and 605*c*, phase differences of 120 deg. in electric angle are established with respect to intercrossing magnetic fluxes from the permanent magnet 602 (one set of N and S poles corresponds to an electric angle of 360 deg.). Three position detecting elements 607*a*, 607*b*, and 607*c* (for example, Hall elements which are magnetoelectrical converting elements) are arranged on the stator and detect the poles of the permanent magnet 602, thereby obtaining three-phase detection signals corresponding to relative positions of the field part and the coils. In the embodiment, the center of the coils and that of the position detecting elements are shifted in phase by an electric angle of 120 deg. According to this configuration, the position detecting elements can be disposed in winding slots of the armature core so as to detect the magnetic field of the inner face portion of the permanent magnet, whereby the motor structure can be miniaturized.

A command block 515 shown in FIG. 13 comprises a command current circuit 551, a multiplied command current circuit 552, and a command output circuit 553, and produces output current signals which contain a higher harmonic signal component at a predetermined percentage in correspondence with the detection signals.

Figure 19:
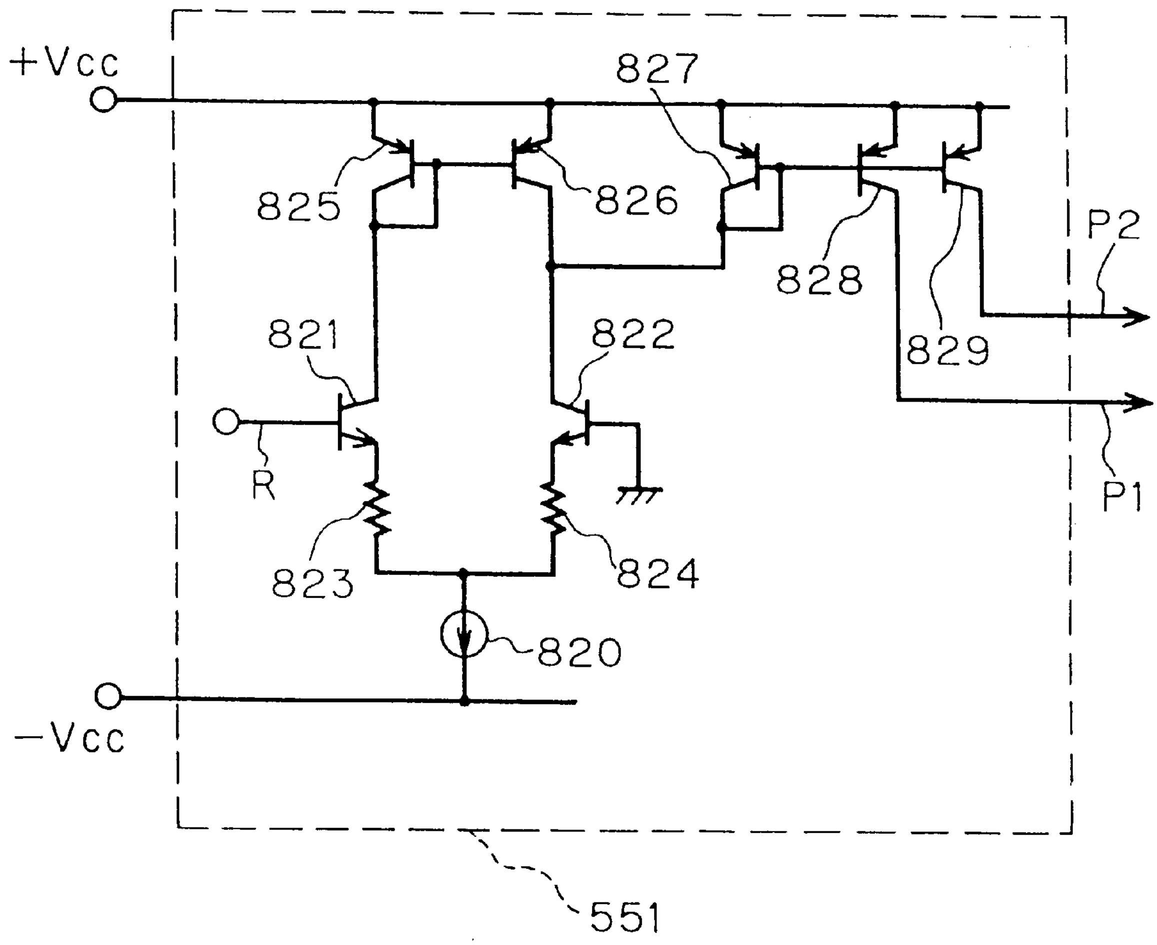
FIG. 19 is a specific circuit diagram of a command current circuit 551.

FIG. 19 specifically shows the configuration of the command current circuit 551 of the command block 515. In correspondence with a command signal R, transistors 821 and 822, and resistors 823 and 824 distribute the value of the current of a constant current source 820 to the collectors of the transistors 821 and 822. The collector currents are compared with each other by a current mirror circuit consisting of transistors 825 and 826, and the difference current is output as command current signals P1 and P2 through a current mirror circuit consisting of transistors 827, 828, and 829. Therefore, the command current circuit 551 produces the two command current signals P1 and P2 (P1 and P2 are proportional to each other) corresponding to the command signal R. The first command current signal P1 is supplied to the command output circuit 553, and the second command current signal P2 to the multiplied command current circuit 552.

Figure 20:
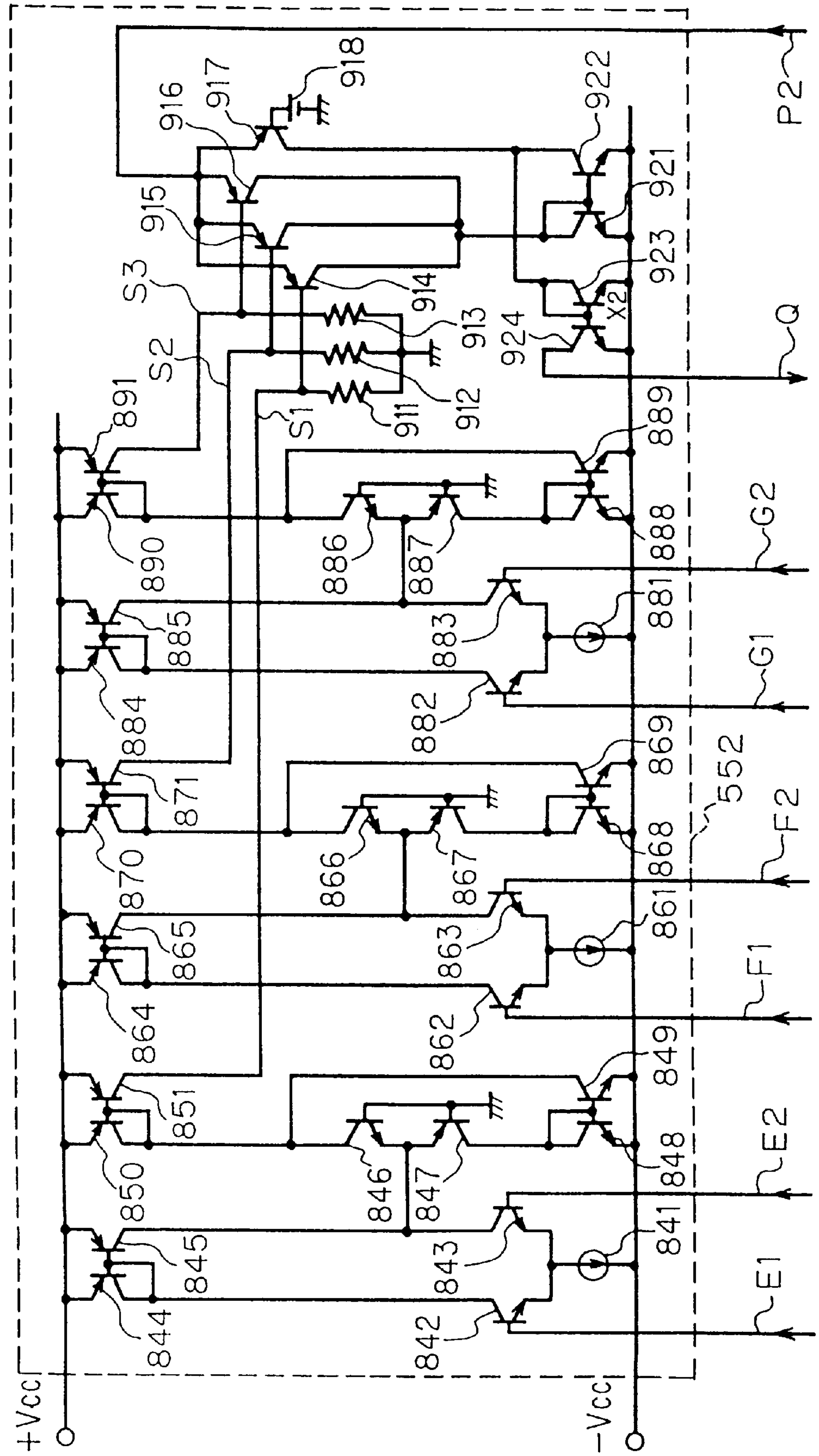
FIG. 20 is a specific circuit diagram of a multiplied command current circuit 552 of the embodiment.

FIG. 20 specifically shows the configuration of the multiplied command current circuit 552 of the command block 515. In correspondence with detection signals E1 and E2 of the position detecting elements, transistors 842 and 843 distribute the value of the current of a constant current source 841 to the collectors. The difference current is obtained by a current mirror circuit consisting of transistors 844 and 845, and a voltage signal S1 corresponding to the absolute value of the difference current is obtained by transistors 846, 847, 848, 849, 850, and 851, and a resistor 911. In other words, the voltage signal S1 corresponding to the absolute value of a detection signal E1–E2 is produced. Similarly, a voltage signal S2 corresponding to the absolute value of a detection signal F1–F2 is produced at a resistor 912, and a voltage signal S3 corresponding to the absolute value of a detection signal G1–G2 is produced at a resistor 913. In other words, the voltage signals S1, S2, and S3 at the resistors 911, 912, and 913 are three-phase absolute signals of the detection signals E1–E2, F1–F2, and G1–G2. Transistors 914, 915, 916, and 917 compare the three-phase absolute signals S1, S2, and S3 with a predetermined voltage value (including 0 V) of a constant voltage source 918. In correspondence with the difference voltages, the command current signal P2 is distributed to the collectors of the transistors. The collector currents of the transistors 914, 915, and 916 are composed together. A current mirror circuit consisting of transistors 921 and 922 compares the composed current with the collector current of the transistor 917.

The difference current is input to a current mirror circuit consisting of transistors 923 and 924 and reduced in current value to approximately one half. The reduced current is output as a multiplied command current signal Q (inflow current). The multiplied command current signal Q varies responding with results of multiplications of the voltage signals S1, S2, and S3 corresponding to the detection signals by the command current signal P2 corresponding to the command signal R. Particularly, because of the configuration of the transistors 914, 915, 916, and 917, the multiplied command current signal Q varies responding with a result of a multiplication of the minimum value of the voltage signals S1, S2, and S3 (three-phase absolute signals) by the command current signal P2. The minimum value of the voltage signals S1, S2, and S3 (three-phase absolute signals) corresponding to the absolute values of the detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals.

Figure 21:
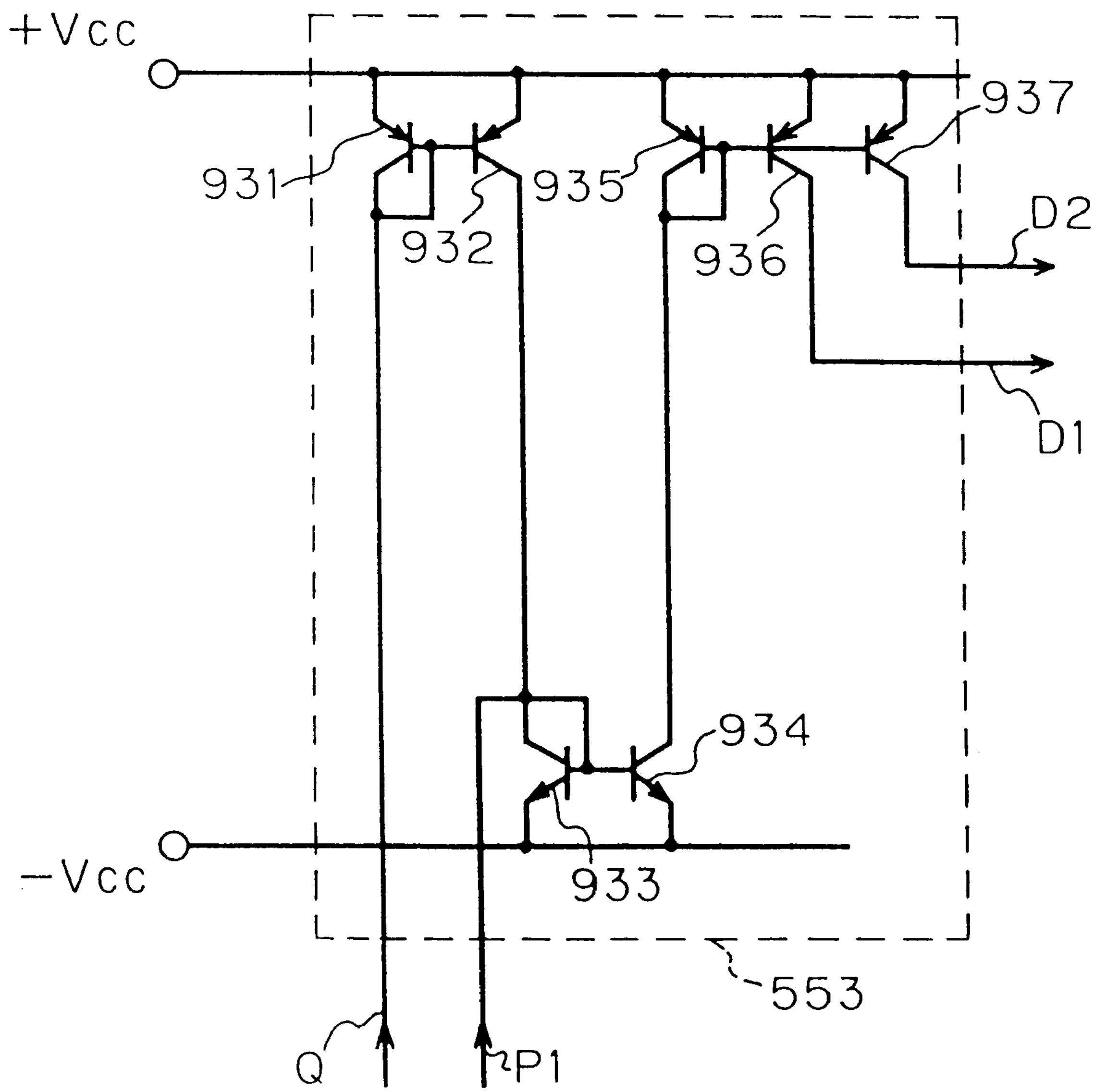
FIG. 21 is a specific circuit diagram of a command output circuit 553 of the embodiment.

FIG. 21 specifically shows the configuration of the command output circuit 553 of the command block 515. The multiplied command current signal Q of the multiplied command output circuit 552 is input to a current mirror circuit consisting of transistors 931 and 932 and inverted in current direction. Thereafter, the signal and the first command current signal P1 of the command current circuit 551 are composed together by addition. The composed command current signal is output as two output current signals D1 and D2 via a current mirror circuit consisting of transistors 933 and 934, and that of transistors 935, 936, and 937. As a result, the first and second output current signals D1 and D2 of the command block 515 become current signals which vary in correspondence with the command signal and which contain the higher harmonic signal component at a predetermined percentage. The first output current signal D1 is supplied to a first distributing circuit 531 of a distribution block 513, and the second output current signal D2 to a second distributing circuit 532.

A position block 512 shown in FIG. 13 comprises a position detector 521 and an altering signal producing circuit 522, produces altering signals from detection signals of position detecting elements of the position detector 521, and supplies the altering signals to the first and second distributing circuits 531 and 532 of the distribution block 513.

Figure 15:
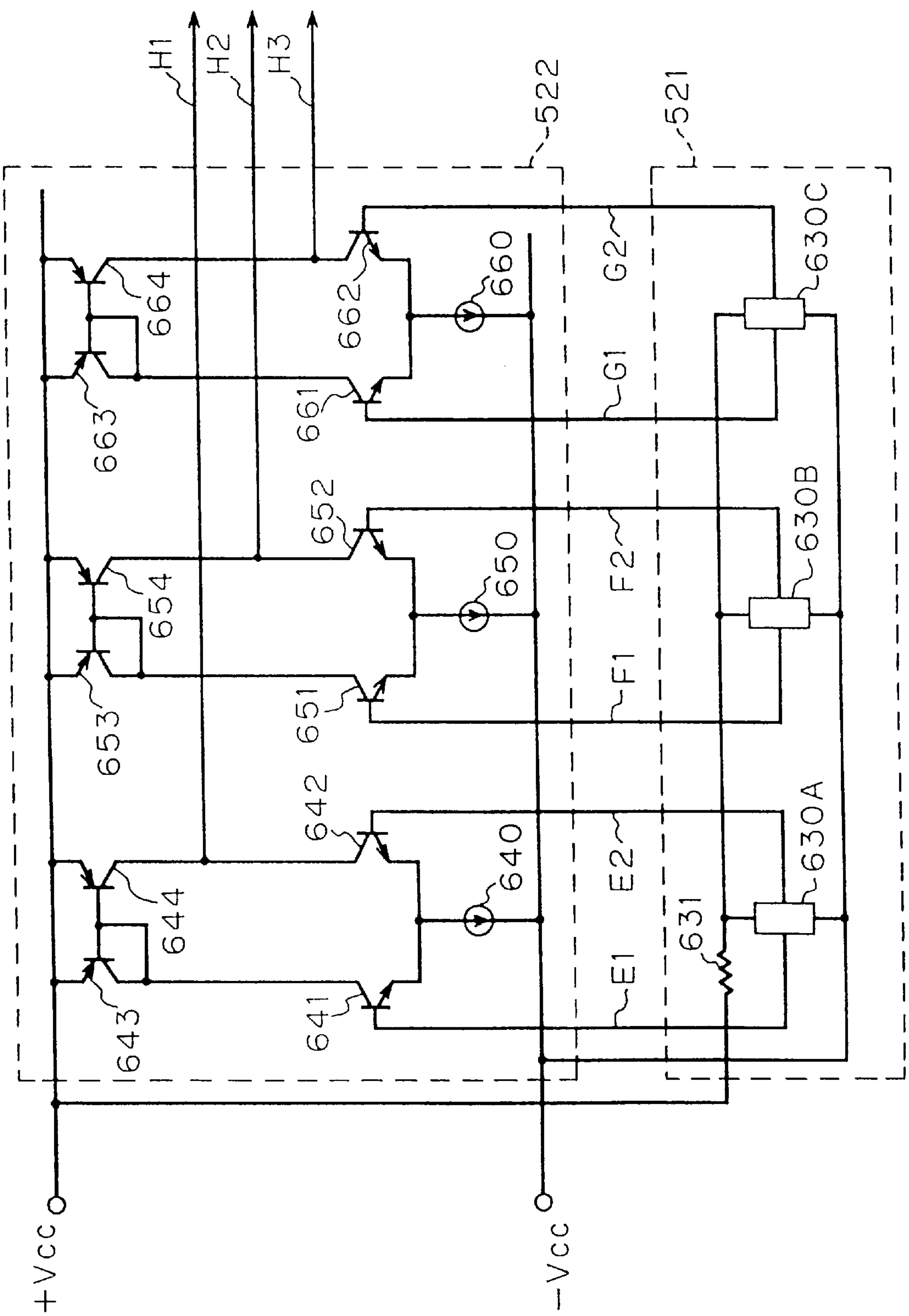
FIG. 15 is a specific circuit diagram of a position detector 521 and an altering signal producing circuit 522 of the embodiment.

FIG. 15 specifically shows the configuration of the position detector 521 and the altering signal producing circuit 522. Position detecting elements 630A, 630B, and 630C of the position detector 521 correspond to the position detecting elements 607*a*, 607*b*, and 607*c* of FIG. 14. The voltage is applied in parallel to the position detecting elements via a resistor 631. The differential detection signals E1 and E2 corresponding to the detected magnetic field of the field part 510 (corresponding to the permanent magnet 602 of FIG. 14) are output from output terminals of the position detecting element 630A (E1 and E2 vary in reversed phase relationships) and then supplied to the bases of differential transistors 641 and 642 of the altering signal producing circuit 522. Differential detection signals F1 and F2 corresponding to the detected magnetic field are output from output terminals of the position detecting element 630B and then supplied to the bases of differential transistors 651 and 652 of the altering signal producing circuit 522. Differential detection signals G1 and G2 corresponding to the detected magnetic field are output from output terminals of the position detecting element 630C and then supplied to the bases of differential transistors 661 and 662 of the altering signal producing circuit 522. As the rotational movement of the field part 510 proceeds, the detection signals E1, F1, and G1 (and E2, F2, and G2) analoguely vary so as to function as three-phase signals which are electrically separated in phase from each other by 120 deg.

Constant current sources 640, 650, and 660 of the altering signal producing circuit 522 supply a current of the same constant value. In correspondence with the detection signals E1 and E2, the differential transistors 641 and 642 distribute the value of the current of the constant current source 640 to the collectors. The collector currents of the transistors 641 and 642 are compared with each other by a current mirror circuit consisting of transistors 643 and 644, and the difference current is output as an altering signal H1. Similarly, in correspondence with the detection signals F1 and F2, the differential transistors 651 and 652 distribute the value of the current of the constant current source 650 to the collectors. The collector currents of the transistors 651 and 652 are compared with each other by a current mirror circuit consisting of transistors 653 and 654, and the difference current is output as an altering signal H2. Furthermore, in correspondence with the detection signals G1 and G2, the differential transistors 661 and 662 distribute the value of the current of the constant current source 660 to the collectors. The collector currents of the transistors 661 and 662 are compared with each other by a current mirror circuit consisting of transistors 663 and 664, and the difference current is output as an altering signal H3.

The altering signals H1, H2, and H3 are three-phase current signals (inflow/outflow signals) which analoguely vary in correspondence with the detection signals, and supplied to the first and second distributing circuits 531 and 532.

The first distributing circuit 531 of the distribution block 513 of FIG. 13 obtains three-phase first distributed current signals to which the first output current signal D1 is distributed in correspondence with the altering signals H1, H2, and H3 of the altering signal producing circuit 522. The second distributing circuit 532 obtains three-phase second distributed current signals to which the second output current signal D2 is distributed in correspondence with the altering signals H1, H2, and H3 of the altering signal producing circuit 522. A distributing composer 533 composes the first and second distributed current signals together into three-phase distributed signals, and supplies the distributed signals to a driving block 514.

Figure 16:
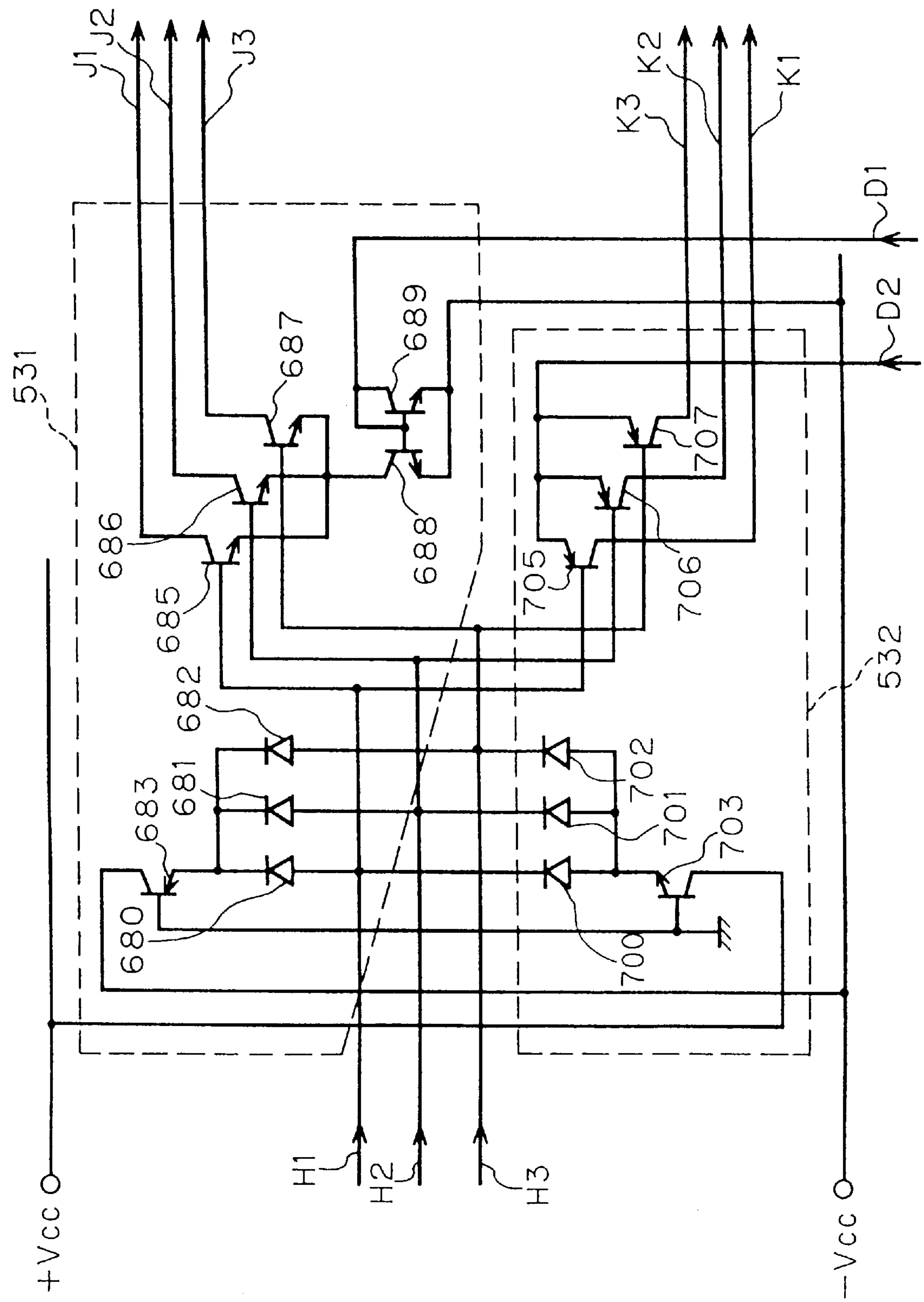
FIG. 16 is a specific circuit diagram of a first distributing circuit 531 and a second distributing circuit 532 of the embodiment.

FIG. 16 specifically shows the configuration of the first and second distributing circuits 531 and 532 of the distribution block 513. The inflow currents of the altering signals H1, H2, and H3 flow into first diodes 680, 681, and 682 of the first distributing circuit 531, so that voltage signals corresponding to the inflow current values of the signals H1, H2, and H3 are generated at the terminals of the first diodes 680, 681, and 682. In the first diodes 680, 681, and 682, the ends of one side are connected to each other and the other ends are connected to the bases of first distributing transistors 685, 686, and 687, respectively. A transistor 683 supplies a bias of a predetermined voltage to the first diodes. The first output current signal D1 of the command block 515 is supplied via a current mirror circuit consisting of transistors 688 and 689, to the emitters of the first distributing transistors 685, 686, and 687 which are connected to each other. In correspondence with the values of the altering signals H1, H2, and H3 which flow into the first diodes 680, 681, and 682, therefore, the first distributing transistors 685, 686, and 687 distribute the first output current signal D1 so as to generate three-phase first distributed current signals J1, J2, and J3 (inflow currents) which analoguely vary.

The first distributed current signal J1 of the first distributing circuit 531 varies responding with a result H1P·D1 of a multiplication of the inflow current value H1P of the altering signal H1 (the inflow current to the first diode 680) by the first output current signal D1 (the current value) of the command block 515, the first distributed current signal J2 varies responding with a result H2P·D1 of a multiplication of the inflow current value H2P of the altering signal H2 by the first output current signal D1, and the first distributed current signal J3 varies responding with a result H3P·D1 of a multiplication of the inflow current value H3P of the altering signal H3 by the first output current signal D1 (the value of the composed current J1+J2+J3 of the first distributed current signals is equal to the first output current signal D1).

The outflow currents of the altering signals H1, H2, and H3 flow into second diodes 700, 701, and 702 of the second distributing circuit 532 so that voltage signals corresponding to the current values of the signals H1, H2, and H3 are generated at the terminals of the second diodes 700, 701, and 702. In the second diodes 700, 701, and 702, the ends of one side are connected to each other and the other ends (the current outflow side) are connected to the bases of second distributing transistors 705, 706, and 707, respectively. A transistor 703 supplies a bias of a predetermined voltage to the second diodes. The second output current signal D2 of the command block 515 is supplied to the emitters of the second distributing transistors 705, 706, and 707 which are connected to each other. In correspondence with the values of the currents of the altering signals H1, H2, and H3 which flow out into the second diodes 700, 701, and 702, therefore, the second distributing transistors 705, 706, and 707 distribute the second output current signal D2 so as to generate three-phase second distributed current signals K1, K2, and K3 (outflow currents) which analoguely vary.

The second distributed current signal K1 of the second distributing circuit 532 varies responding with a result H1N·D2 of a multiplication of the outflow current value H1N of the altering signal H1 (the outflow current from the second diode 700) and the second output current signal D2 (the current value) of the command block 515, the second distributed current signal K2 varies responding with a result H2N·D2 of a multiplication of the outflow current value H2N of the altering signal H2 and the second output current signal D2, and the second distributed current signal K3 varies responding with a result H3N·d2 of a multiplication of the outflow current value H3N of the altering signal H3 and the second output current signal D2 (the value of the composed current K1+K2+K3 of the second distributed current signals is equal to the second output current signal D2).

Figure 17:
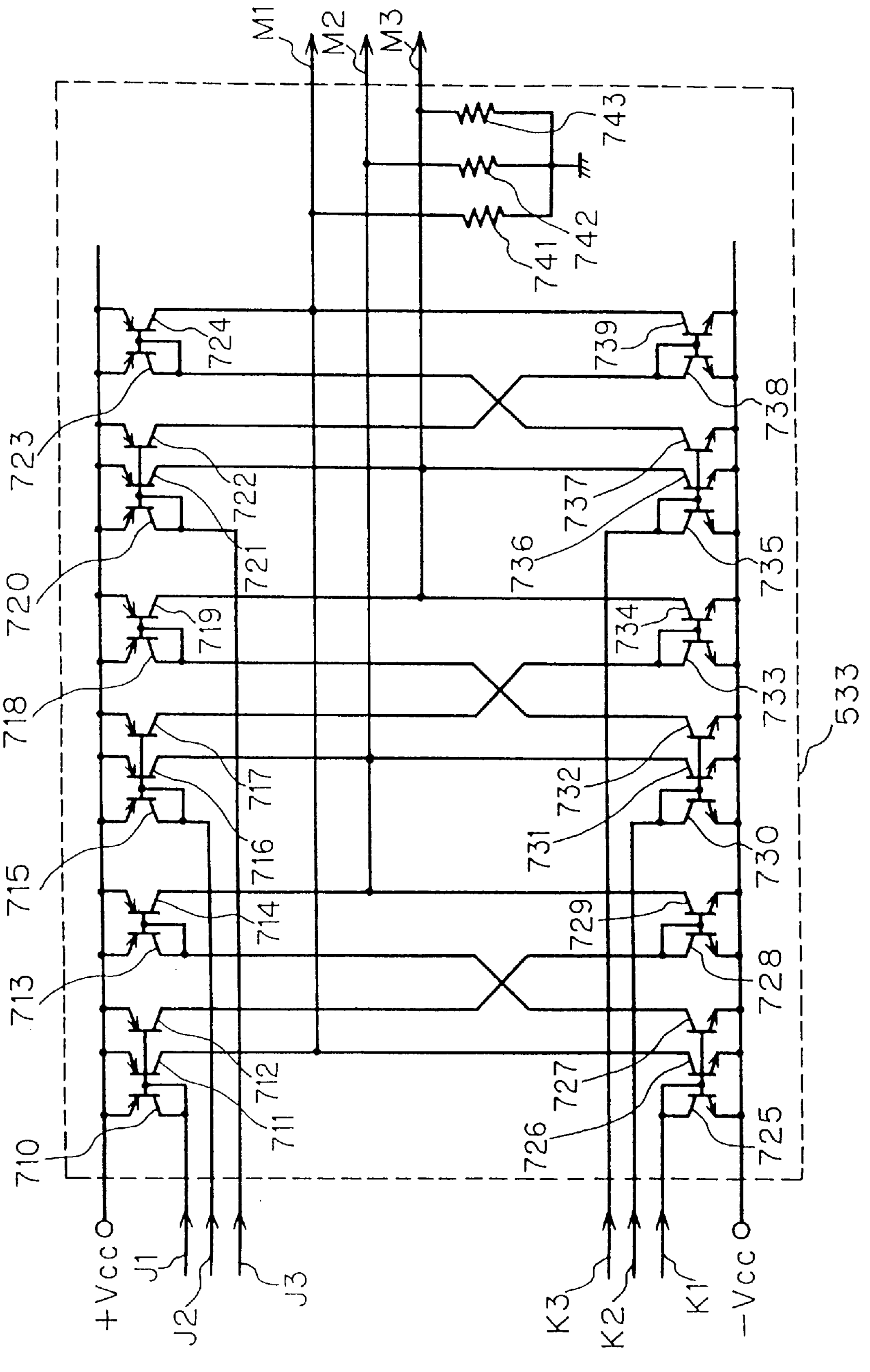
FIG. 17 is a specific circuit diagram of a distributing composer 533 of the embodiment.

FIG. 17 specifically shows the configuration of the distributing composer 533 of the distribution block 513. The currents of the first distributed current signals J1, J2, and J3 are inverted by a current mirror circuit consisting of transistors 710, 711, and 712, that consisting of transistors 715, 716, and 717, and that consisting of transistors 720, 721, and 722, respectively. The currents of the second distributed current signals K1, K2, and K3 are inverted by a current mirror circuit consisting of transistors 725, 726, and 727, that consisting of transistors 730, 731, and 732, and that consisting of transistors 735, 736, and 737, respectively. For each phase, the output terminals of one side of the current mirror circuits are connected to each other so as to produce a difference current for the phase. The other output currents of these current mirror circuits are inverted by a current mirror circuit consisting of transistors 713 and 714, that consisting of transistors 718 and 719, that consisting of transistors 723 and 724, that consisting of transistors 728 and 729, that consisting of transistors 733 and 734, and that consisting of transistors 738 and 739, respectively. For each phase, the output terminals of the current mirror circuits are connected to each other so as to produce a difference current for the phase. A difference current (J1–K1) between the currents J1 and K1, and a difference current (J3–K3) between the currents J3 and K3 are composed together by addition so as to produce a composed distributed current signal. The composed distributed current signal is supplied to a resistor 741 so as to produce a distributed signal M1 at the terminals of the resistor 741. Similarly, a difference current (J2–K2) between the currents J2 and K2, and the difference current (J1–K1) between the currents J1 and K1 are composed together by addition so as to produce a composed distributed current signal. The composed distributed current signal is supplied to a resistor 742 so as to produce a distributed signal M2 at the terminals of the resistor 742. Furthermore, the difference current (J3–K3) between the currents J3 and K3, and the difference current (J2–K2) between the currents J2 and K2 are composed together by addition so as to produce a composed distributed current signal. The composed distributed current signal is supplied to a resistor 743 so as to produce a distributed signal M3 at the terminals of the resistor 743. In this way, the distributed signals M1, M2, and M3 are produced as three-phase voltage signals corresponding to the altering signals and have a predetermined amplitude which depends on the current values of the output current signals D1 and D2 of the command block 515 (the signals are not affected by the amplitudes of the altering signals).

The driving block 514 of FIG. 13 comprises a first driving circuit 541, a second driving circuit 542, and a third driving circuit 543, and supplies driving signals Va, Vb, and Vc, which are obtained by power-amplifying the distributed signals M1, M2, and M3 of the distribution block 513, to the terminals of the three-phase coils 511A, 511B, and 511C.

Figure 18:
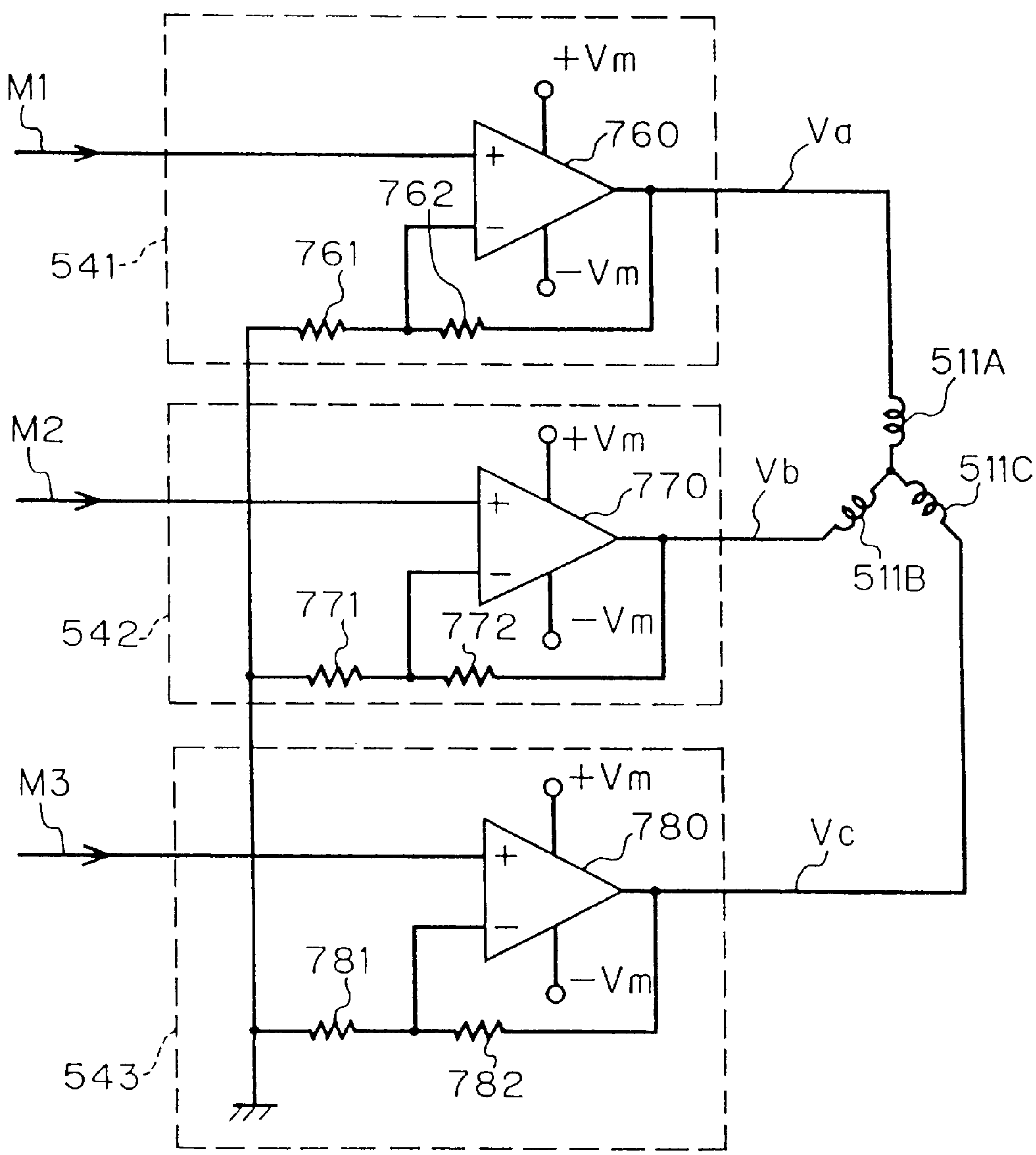
FIG. 18 is a specific circuit diagram of a first driving circuit 541, a second driving circuit 542, and a third driving circuit 543 of the embodiment.

FIG. 18 specifically shows the configuration of the first driving circuit 541, the second driving circuit 542, and the third driving circuit 543 of the driving block 514. The distributed signal M1 is input to the noninverting terminal of an amplifier 760 of the first driving circuit 541 and then subjected to voltage amplification which depends on resistors 761 and 762, thereby producing the driving signal Va. The driving signal is supplied to the power input terminal of the coil 511A. Similarly, the distributed signal M2 is input to the noninverting terminal of an amplifier 770 of the second driving circuit 542 and then subjected to voltage amplification which depends on resistors 771 and 772, thereby producing the driving signal Vb. The driving signal is supplied to the power input terminal of the coil 511B. Furthermore, the distributed signal M3 is input to the noninverting terminal of an amplifier 780 of the third driving circuit 543 and then subjected to voltage amplification which depends on resistors 781 and 782, thereby producing the driving signal Vc. The driving signal is supplied to the power input terminal of the coil 511C. The amplifiers 760, 770, and 780 are supplied with power source voltages +Vm and –Vm (+Vm=15 V, –Vm=–15 V).

As a result of the supply of the driving signals Va, Vb, and Vc, three-phase driving currents are supplied to the three-phase coils 511A, 511B, and 511C so that a driving force is generated in a predetermined direction by electromagnetic interaction between the currents of the coils and the magnetic fluxes of the field part 510.

Figure 22:
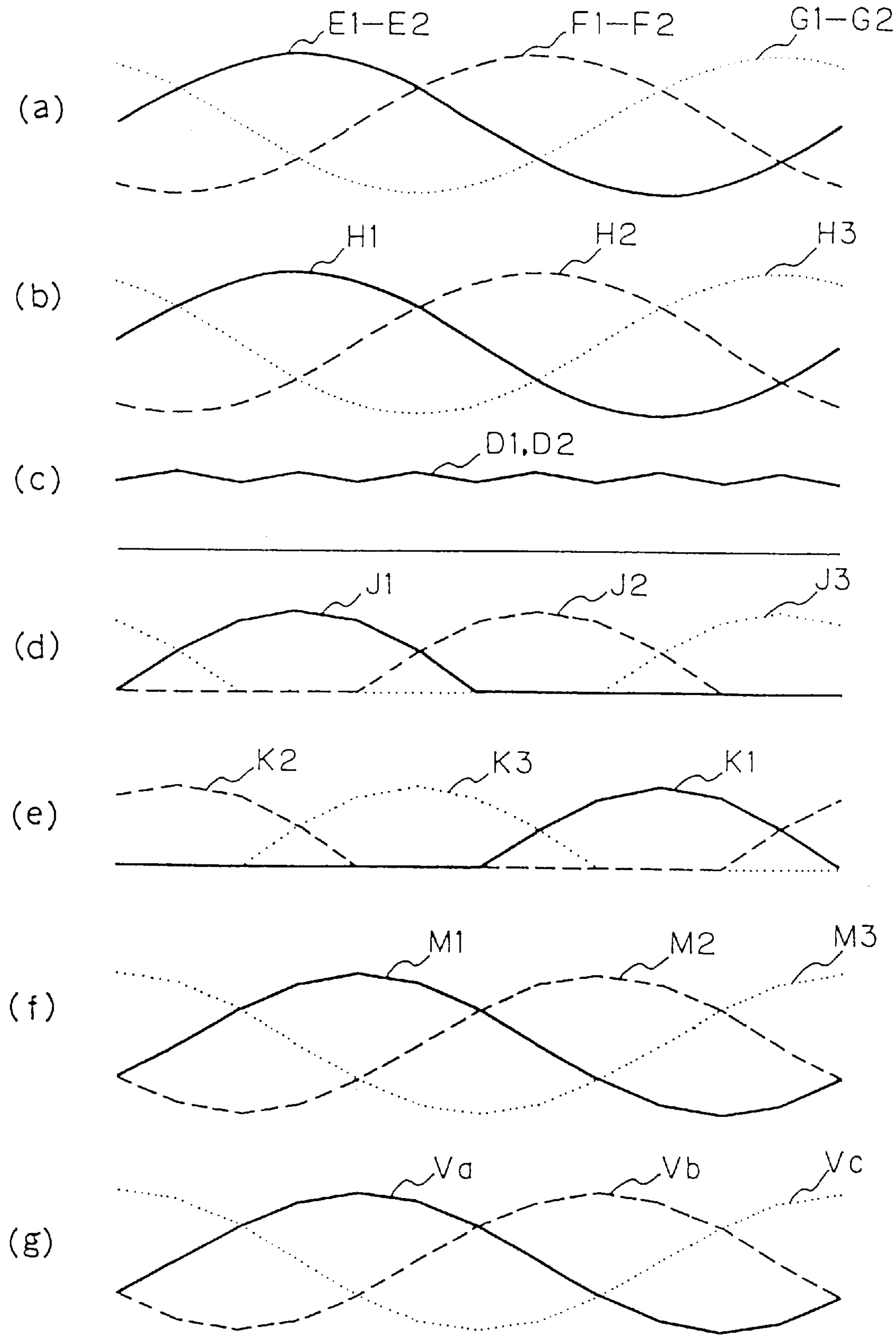
FIG. 22 is a waveform chart illustrating the operation of Embodiment 3.

FIG. 22 is a waveform chart illustrating the operation of the embodiment. As the rotational movement (or a relative movement with respect to the three-phase coils) of the field part 510 proceeds, the position detecting elements 630A, 630B, and 630C which detect the magnetic field of the field part 510 produce sinusoidal detection signals E1–E2, F1–F2, and G1–G2 (see (a) of FIG. 22 wherein the horizontal axis indicates the rotational position). The altering signal producing circuit 522 produces the three-phase altering signals H1, H2, and H3 (outflow/inflow currents, (b) of FIG. 22) which analoguely vary in correspondence with the detection signals. In the first distributing circuit 531, the first output current signal D1 ((c) of FIG. 22) of the command block 515 is distributed by the first distributing transistors 685, 686, and 687 in correspondence with the values of the positive sides of the altering signals H1, H2, and H3 (the values of the currents flown into the first diodes 680, 681, and 682), thereby obtaining the three-phase first distributed current signals J1, J2, and J3 ((d) of FIG. 22). The first distributed current signals J1, J2, and J3 are current signals which vary in correspondence with the results H1P·D1, H2P·D1, and H3P·D1 of multiplications of signals H1P, H2P, and H3P of the positive sides of the altering signals H1, H2, and H3 by the first output current signal D1, respectively, and which are distributed in such a manner that a sum of the results H1P·D1+H2P·D1+H3P·D1 is equal to the first output current signal D1. Similarly, in the second distributing circuit 532, the second output current signal D2 of the command block 515 is distributed by the second distributing transistors 705, 706, and 707 in correspondence with the values of the negative sides of the altering signals H1, H2, and H3 (the values of the currents flown out from the second diodes 700, 701, and 702), thereby obtaining the three-phase second distributed current signals K1, K2, and K3 ((e) of FIG. 22). The second distributed current signals K1, K2, and K3 are current signals which vary in correspondence with the results H1N·D2, H2N·D2, and H3N·D2 of multiplications between signals H1N, H2N, and H3N of the negative sides of the altering signals H1, H2, and H3 and the second output current signal D2, respectively, and which are distributed in such a manner that a sum of the results H1N·D2+H2N·D2+H3N·D2 is equal to the second output current signal D2. The distributing composer 533 composes the first distributed current signals J1, J2, and J3 and the second distributed current signals K1, K2, and K3 together, thereby obtaining the three-phase distributed signals M1, M2, and M3 ((f) of FIG. 22). The distributed signals M1, M2, and M3 are produced by composing together two phases of J1–K1, J2–K2, and J3–K3 between the first and second distributed current signals for each phase, respectively. Specifically, the distributed signal M1 is produced by composing (J1–K1) and (K3–J3), the distributed signal M2 by composing (J2–K2) and (K1–J1), and the distributed signal M3 by composing (J3–K3) and (K2–J2). The first driving circuit 541, the second driving circuit 542, and the third driving circuit 543 of the driving block 514 supply the driving signals Va, Vb, and Vc ((g) of FIG. 22), which are respectively obtained by amplifying the distributed signals M1, M2, and M3, to the three-phase coils 511A, 511B, and 511C.

In the thus configured embodiment, even when the altering signals H1, H2, and h3 corresponding to the detection signals of the position detector 521 are large or small in amplitude, the first and second distributed signals of the first and second distributing circuits 531 and 532 have amplitudes surely corresponding to the first and second output current signal D1 and D2 of the command block 515. Therefore, the distributed signals M1, M2, and M3 (or the driving signals Va, Vb, and Vc) are not affected by the amplitudes of the detection signals and the altering signals. In other words, the signals are free from influences due to variation in the sensitivities of the position detecting elements 630A, 630B, and 630C of the position detector 521, variation in the magnetic field of the field part 510, and variation in the gain of the altering signal producing circuit 522. When the brushless motor of the embodiment is used in speed control or a torque control, therefore, variation in speed control gains or torque control gains among motors are reduced remarkably and hence the control properties of motors in mass production are extremely stabilized (control instability due to variation in the gains of motors does not occur).

In the thus configured embodiment, furthermore, the distributed signals M1, M2, and M3 (or the driving signals Va, Vb, and Vc) vary analoguely sinusoidally in correspondence with the detection signals. Therefore, the distributed signals and the driving signals of a reduced distortion level can be obtained, and that a uniform torque is generated, so that the motor is smoothly driven.

In the thus configured embodiment, furthermore, as the position detecting elements are disposed between the salient poles of the armature core, the motor structure can be miniaturized.

Embodiment 4

Hereinafter, a fourth embodiment of the invention will be described with reference to the accompanying drawings.

FIGS. 23 to 26 show the fourth embodiment of the brushless motor of the invention.

In the circuit block diagrams, a connection line to or from circuit block with oblique short bar crossing therewith represents plural connection lines or a connection line for aggregate signals.

Also in the embodiment, the positional relationships between coils and attached positions of position detecting elements are shifted from each other by an electric angle of about 30 deg., additionally. the detecting elements are positioned between the coils, thereby facilitating the production of the motor.

Figure 23:
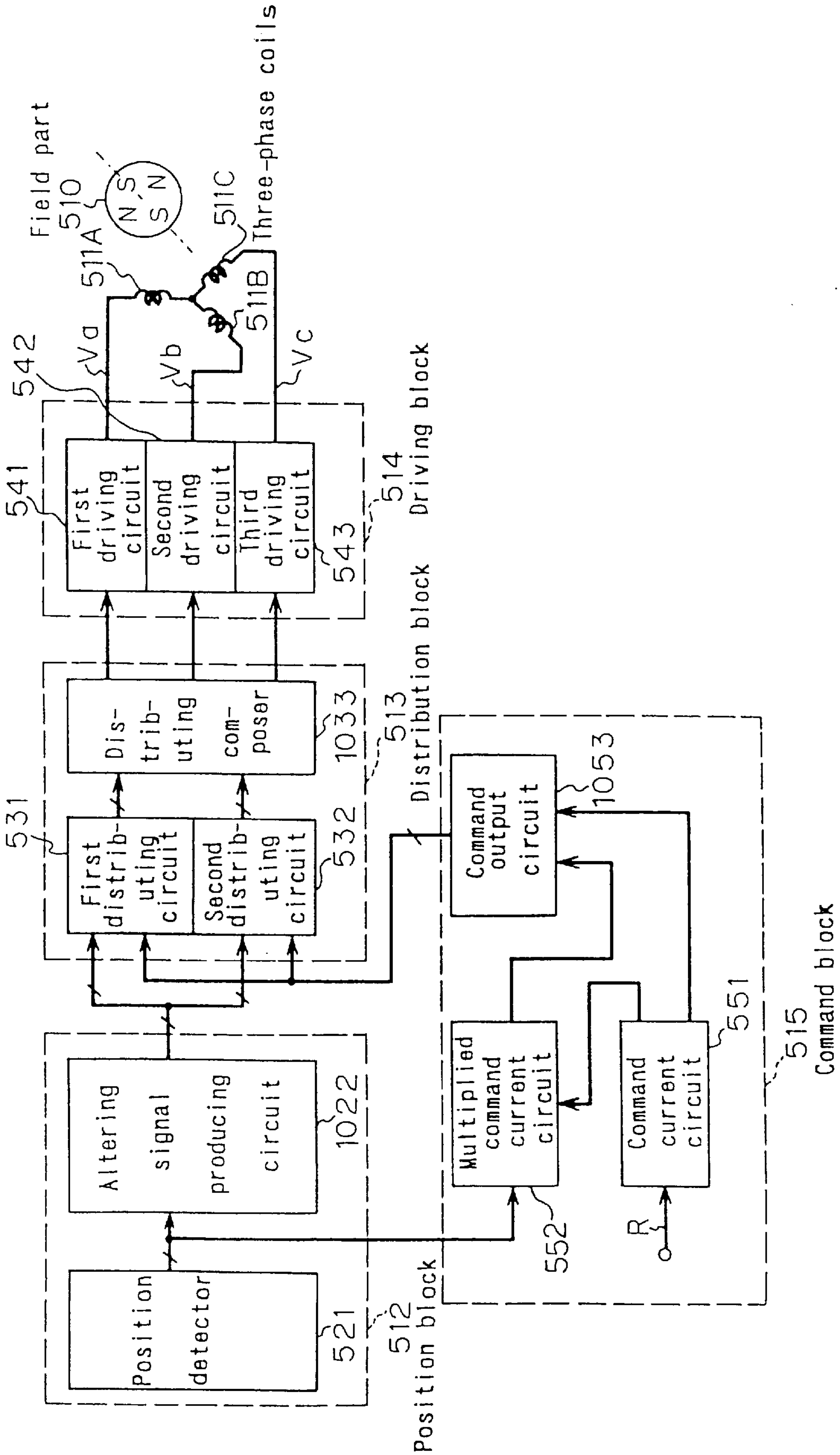
FIG. 23 is a block diagram of Embodiment 4 of the invention.

FIG. 23 shows the whole configuration of the motor. In the embodiment, altering signals which are shifted by about 30 deg. in electric angle from the detection signals of the position detecting elements are produced by an altering signal producing circuit 1022, and a distributing composer 1033 of a distribution block 513 does not conduct the phase shifting operation. A command output circuit 1053 of a command block 515 is configured so as to compose command current signals and a multiplied command current signal together by subtraction. The components which are identical with those of the third embodiment are designated by the same reference numerals.

Figure 24:
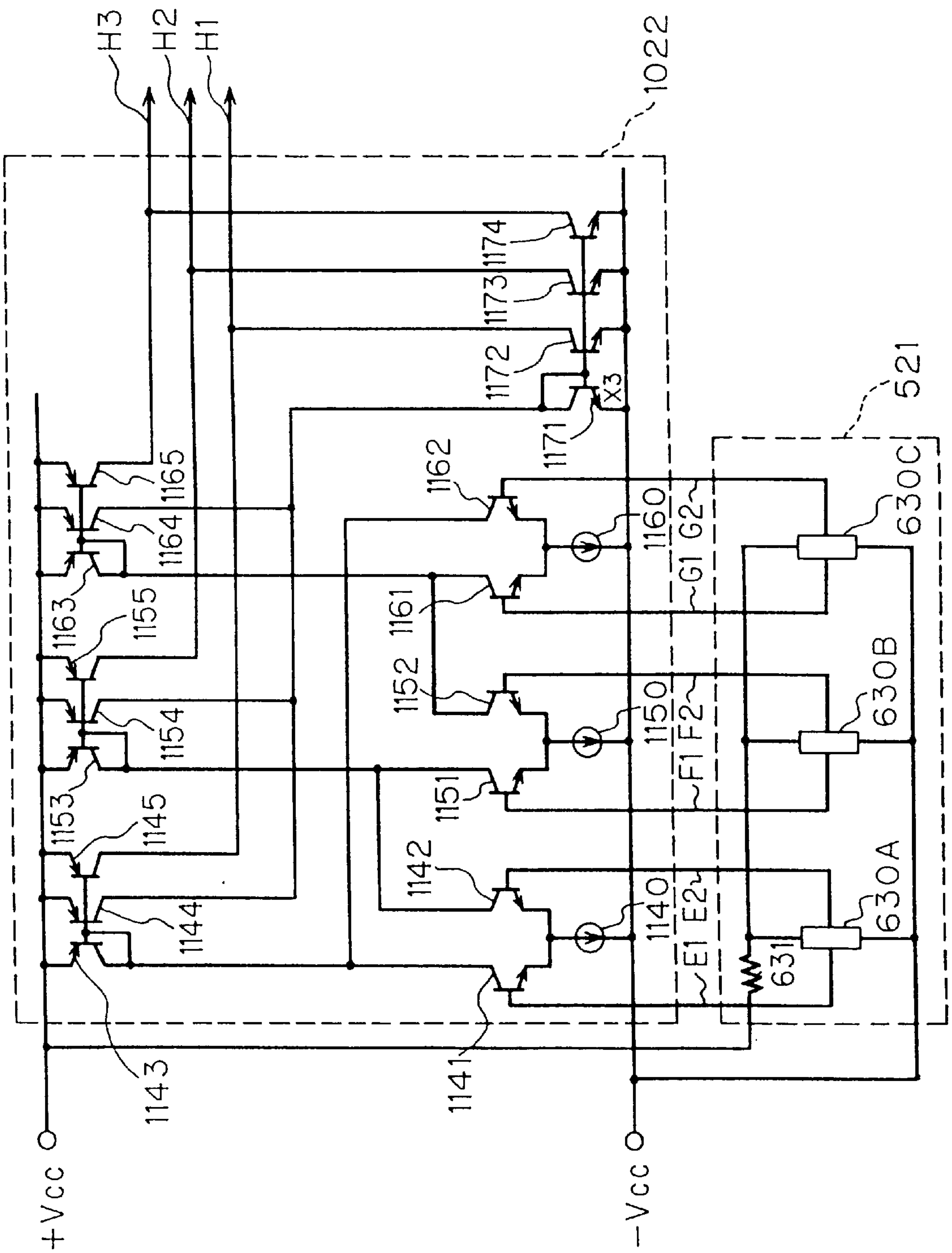
FIG. 24 is a specific circuit diagram of a position detector 521 and an altering signal producing circuit 1022 of the embodiment.

FIG. 24 specifically shows the configuration of the position detector 521 and the altering signal producing circuit 1022 of the position block 512. The position detecting elements 630A, 630B, and 630C of the position detector 521 correspond to the position detecting elements 607*a*, 607*b*, and 607*c* of FIG. 14. The voltage is applied in parallel to the position detecting elements via the resistor 631. The differential detection signals E1 and E2 corresponding to the detected magnetic field of the field part 510 (the permanent magnet 602 of FIG. 14) are output from the output terminals of the position detecting element 630A (E1 and E2 vary in reversed phase relationships) and then supplied to the bases of differential transistors 1141 and 1142 of the altering signal producing circuit 1022. Differential detection signals F1 and F2 corresponding to the detected magnetic field are output from the output terminals of the position detecting element 630B and then supplied to the bases of differential transistors 1151 and 1152. Differential detection signals G1 and G2 corresponding to the detected magnetic field are output from the output terminals of the position detecting element 630C and then supplied to the bases of differential transistors 1161 and 1162. As the rotational movement of the field part 510 proceeds, the detection signals E1, F1, and G1 (and E2, F2, and G2) analoguely vary so as to function as three-phase signals which are electrically separated in phase from each other by 120 deg.

Constant current sources 1140, 1150, and 1160 of the altering signal producing circuit 1022 supply a current of the same constant value. In correspondence with the detection signals E1 and E2, the differential transistors 1141 and 1142 distribute the value of the current of the constant current source 1140 to the collectors. Similarly, in correspondence with the detection signals F1 and F2, the differential transistors 1151 and 1152 distribute the value of the current of the constant current source 1150 to the collectors. Furthermore, in correspondence with the detection signals G1 and G2, the differential transistors 1161 and 1162 distribute the value of the current of the constant current source 1160 to the collectors. The collector currents of the transistors 1141 and 1162 are composed together and then output with being inverted by a current mirror circuit consisting of transistors 1143, 1144, and 1145. The collector currents of the transistors 1151 and 1142 are composed together and then output with being inverted by a current mirror circuit consisting of transistors 1153, 1154, and 1155. The collector currents of the transistors 1161 and 1152 are composed together and then output with being inverted by a current mirror circuit consisting of transistors 1163, 1164, and 1165. The output currents of the transistors 1144, 1154, and 1164 are composed together, and currents, each of which is about one third of the composed current, are output by a current mirror circuit consisting of transistors 1171, 1172, 1173, and 1174. The difference current between the transistors 1145 and 1172 is output as the altering signal H1 (outflow/inflow current). Similarly, the difference current between the transistors 1155 and 1173 is output as the altering signal H2 (outflow/inflow current). Furthermore, the difference current between the transistors 1165 and 1174 is output as the altering signal H3 (outflow/inflow current). Therefore, the altering signal H1 varies responding with the difference signal of the two-phase detection signals (E1–E2) and (G1–G2), the altering signal H2 in correspondence with the difference signal of the two-phase detection signals (F1–F2) and (E1–E2), and the altering signal H3 in correspondence with the difference signal of the two-phase detection signals (G1–G2) and (F1–F2). As a result, the altering signals H1, H2, and H3 are shifted in phase from the detection signals E1, F1, and G1 by about 30 deg.

The first distributing circuit 531 of the distribution block 513 of FIG. 23 obtains three-phase first distributed current signals to which the first output current signal D1 of the command output circuit 1053 is distributed in correspondence with the altering signals H1, H2, and H3 of the altering signal producing circuit 1022. The second distributing circuit 532 obtains three-phase second distributed current signals to which the second output current signal D2 of the command output circuit 1053 is distributed in correspondence with the altering signals H1, H2, and H3 of the altering signal producing circuit 1022. The distributing composer 1033 composes the first and second distributed current signals together into three-phase distributed signals, and supplies the distributed signals to the driving block 514. The specific configurations of the first distributing circuit 531 and the second distributing circuit 532 are the same as those shown in FIG. 16. Therefore, their description is omitted.

Figure 25:
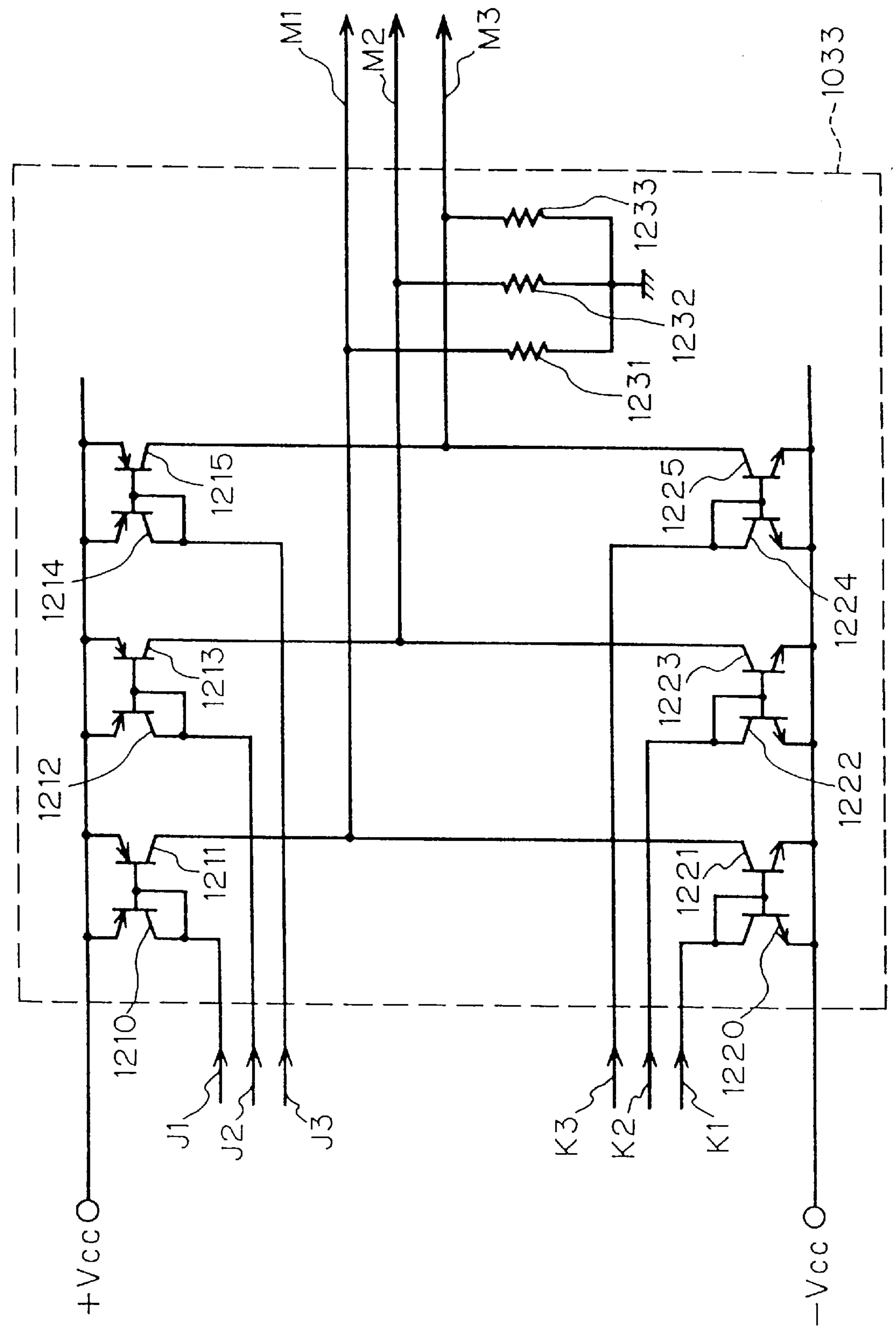
FIG. 25 is a specific circuit diagram of a distributing composer 1033 of the embodiment.

FIG. 25 specifically shows the configuration of the distributing composer 1033 of the distribution block 513. The currents of the first distributed current signals J1, J2, and J3 are inverted by a current mirror circuit consisting of transistors 1210 and 1211, that consisting of transistors 1212 and 1213, and that consisting of transistors 1214 and 1215, respectively. The currents of the second distributed current signals K1, K2, and K3 are inverted by a current mirror circuit consisting of transistors 1220 and 1221, that consisting of transistors 1222 and 1223, and that consisting of transistors 1224 and 1225, respectively. For each phase, the output terminals of these current mirror circuits are connected to each other so as to produce a difference current for the phase. A difference current (J1–K1) between the currents J1 and K1 is supplied to a resistor 1231, so that a distributed signal M1 appears across the terminals of the resistor 1231. Similarly, a difference current (J2–K2) between the currents J2 and K2 is supplied to a resistor 1232, so that a distributed signal M2 appears across the terminals of the resistor 1232. Furthermore, a difference current (J3–K3) between the currents J3 and K3 is supplied to a resistor 1233, so that a distributed signal M3 appears across the terminals of the resistor 1233.

The driving block 514 of FIG. 23 comprises a first driving circuit 541, a second driving circuit 542, and a third driving circuit 543, and supplies driving signals Va, Vb, and Vc, which are obtained by amplifying the distributed signals M1, M2, and M3 of the distribution block 513, to the terminals of the three-phase coils 511A, 511B, and 511C. The configurations of the first driving circuit 541, the second driving circuit 542, and the third driving circuit 543 are the same as those shown in FIG. 18. Therefore, their description is omitted.

Figure 26:
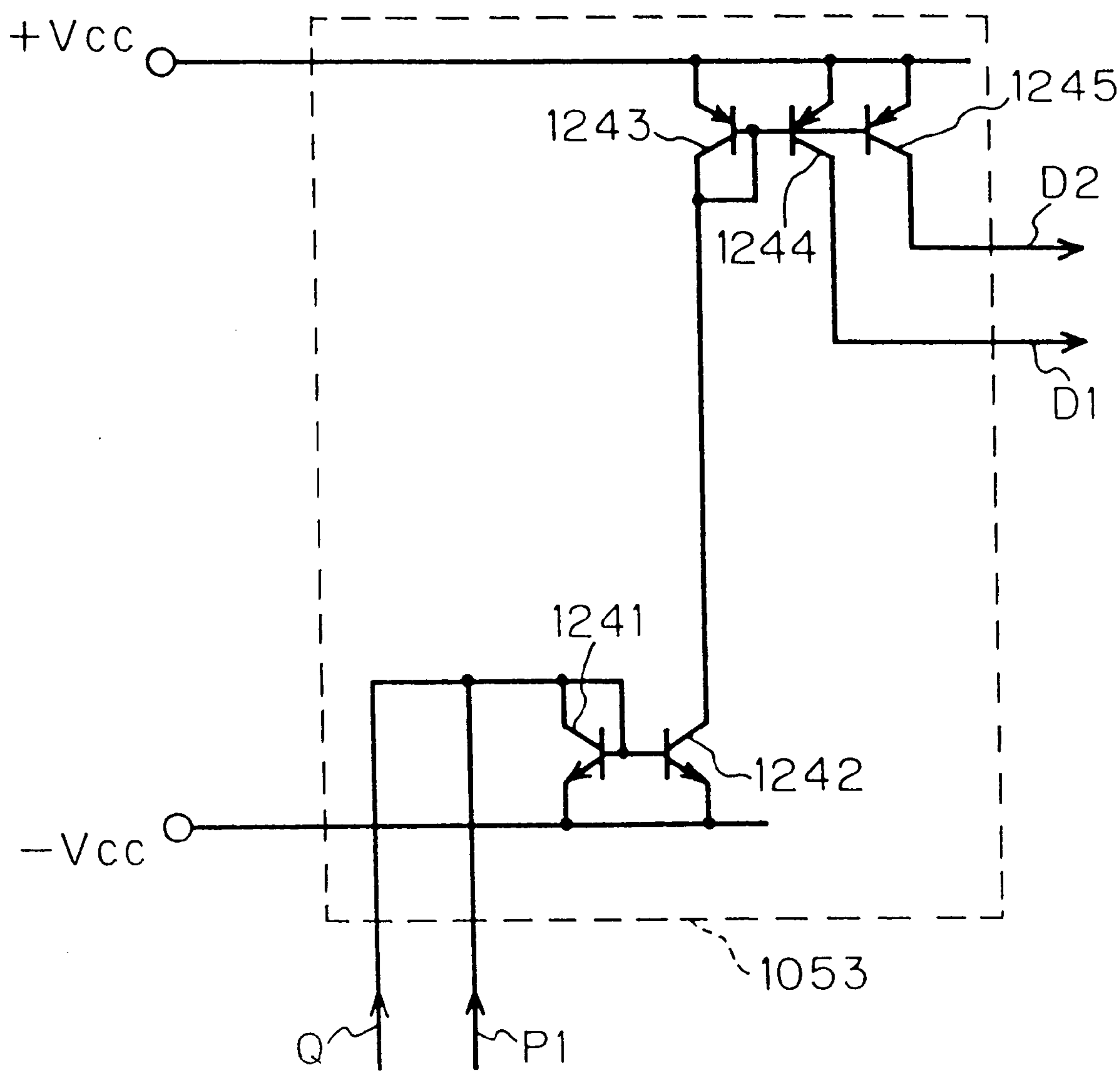
FIG. 26 is a specific circuit diagram of a command output circuit 1053 of Embodiment 4.

FIG. 26 specifically shows the configuration of the command output circuit 1053 of the command block 515. The first command current signal P1 of the command current circuit 551 and the multiplied command current signal Q of the multiplied command output circuit 552 are composed together to produce a composed command current signal. The first and second output current signals D1 and D2 which vary in correspondence with the composed command current signal are produced by a current mirror circuit consisting of transistors 1241 and 1242, and that consisting of transistors 1243, 1244, and 1245. The first output current signal D1 is supplied to the first distributing circuit 531 of the distribution block 513, and the second output current signal D2 to the second distributing circuit 532. The configurations of the command current circuit 551 and the multiplied command output circuit 552 are the same as those shown in FIGS. 19 and 20. Therefore, their description is omitted.

Also in the thus configured embodiment, the distributed signals M1, M2, and M3 (or the driving signals Va, Vb, and Vc) are not affected by the amplitudes of the detection signals and the altering signals. In other words, the signals are free from influences due to variation in the sensitivities of the position detecting elements 630A, 630B, and 630C of the position detector 521, variation in the magnetic field of the field part 510, and variation in the gain of the altering signal producing circuit 1022, The distributed signals M1, M2, and M3 (or the driving signals Va, Vb, and Vc) vary analoguely sinusoidally in correspondence with the detection signals. Therefore, the distributed signals and the driving signals of a reduced distortion level can be obtained, with the result that a uniform torque is generated, so that the motor is smoothly driven. Furthermore, as the position detecting elements are disposed between the salient poles of the armature core, the motor structure can be miniaturized.

The configurations of the first to fourth embodiments described above may be modified in various manners. For example, the coil for each phase may be configured by connecting a plurality of coils in series or in parallel. Each coil may consist of a concentrated winding, or a distributed winding, or may be an air-core coil having no salient pole. The connection of the three-phase coils is not restricted to the Y-connection and the coils may be Δ-connected. The position detecting elements are not restricted to Hall elements and other magnetoelectrical converting elements. The relative positional relationships among the coils and the position detecting elements may be variously modified. In the embodiments, the phase shifting operation is achieved by one of the distributing composer and the altering signal producing circuit. The execution of the phase shifting operation is not restricted to the above, and may be shared by both the composer and the circuit. The structure of the motor is not restricted to the one wherein the field part has a plurality of poles (the number of poles is not limited to four), and may have any one as far as magnetic field fluxes generated by permanent magnet poles cross a coil and the intercrossing magnetic fluxes of the coil vary as the relative movement between the field part and the coil proceeds. For example, the motor may have a structure in which a bias magnetic field is applied by a permanent magnet and rotation or movement is realized while tooth of a field unit oppose those of salient poles on which coils are wound. The motor is not restricted to a rotary brushless motor, and may be a linear brushless motor in which the field part or the coils are linearly moved.

It is a matter of course that the invention may be variously modified without departing from the spirit of the invention, and such modifications are within the scope of the invention.

Embodiment 5

Hereinafter, Embodiment 5 of the invention will be described with reference to the accompanying drawings.

Figure 27:
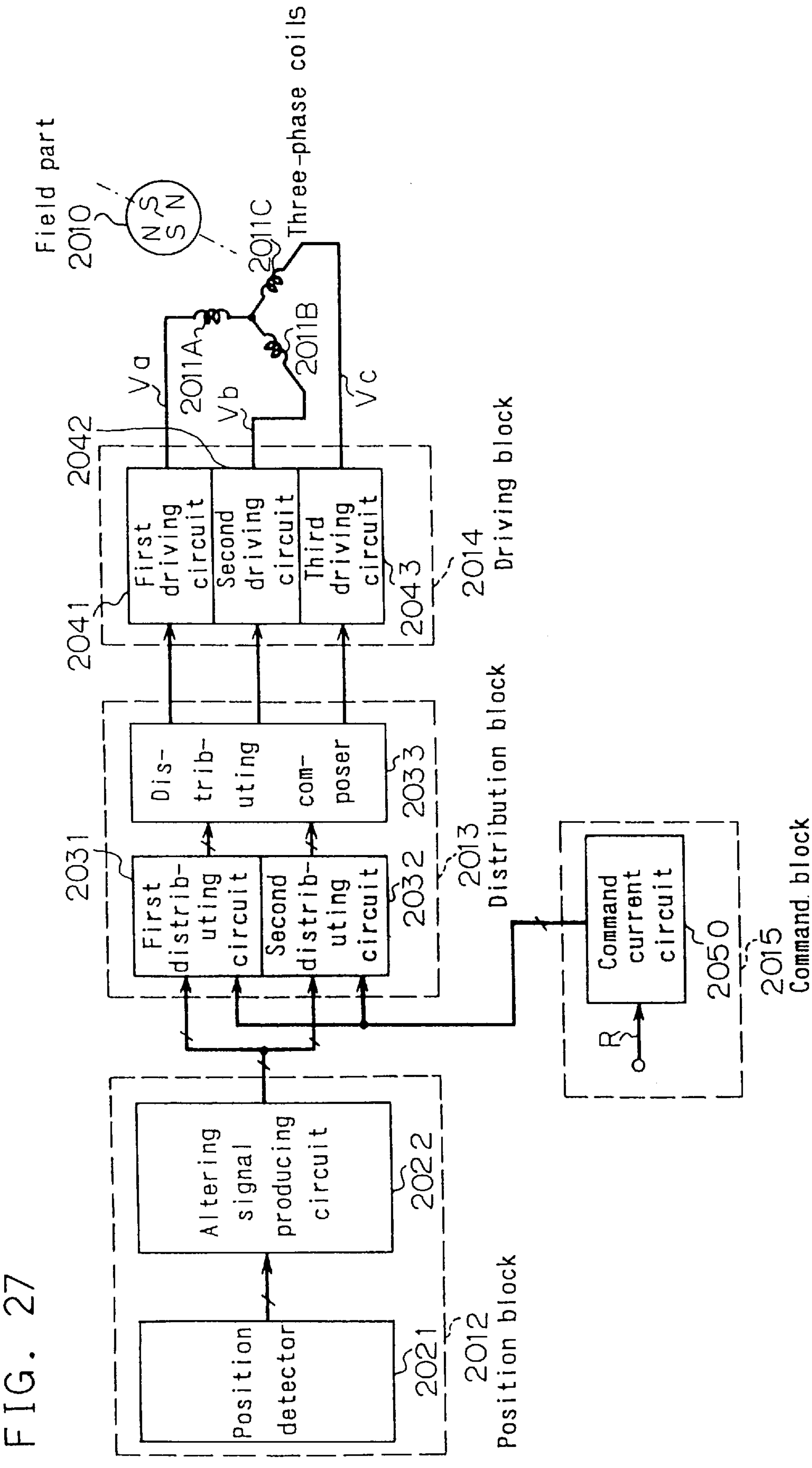
FIG. 27 is a block diagram of Embodiment 5 of the invention.

FIGS. 27 to 32 are drawings for a brushless motor of Embodiment 5. In the circuit block diagrams, a connection line to or from circuit block with oblique short bar crossing therewith represents plural connection lines or a connection line for aggregate signals. FIG. 27 is a block diagram showing the whole configuration of the motor. A field part 2010 shown in FIG. 27 is mounted on the rotor or a movable body and forms plural magnetic field poles by means of magnetic fluxes generated by poles of a permanent magnet, thereby generating field magnetic fluxes. Three-phase coils 2011A, 2011B, and 2011C are mounted on the stator or a stationary body and arranged so as to be electrically separated from each other by a predetermined angle (corresponding to 120 deg.) with respect to intercrossing with the magnetic fluxes generated by the field part 2010.

Figure 28:
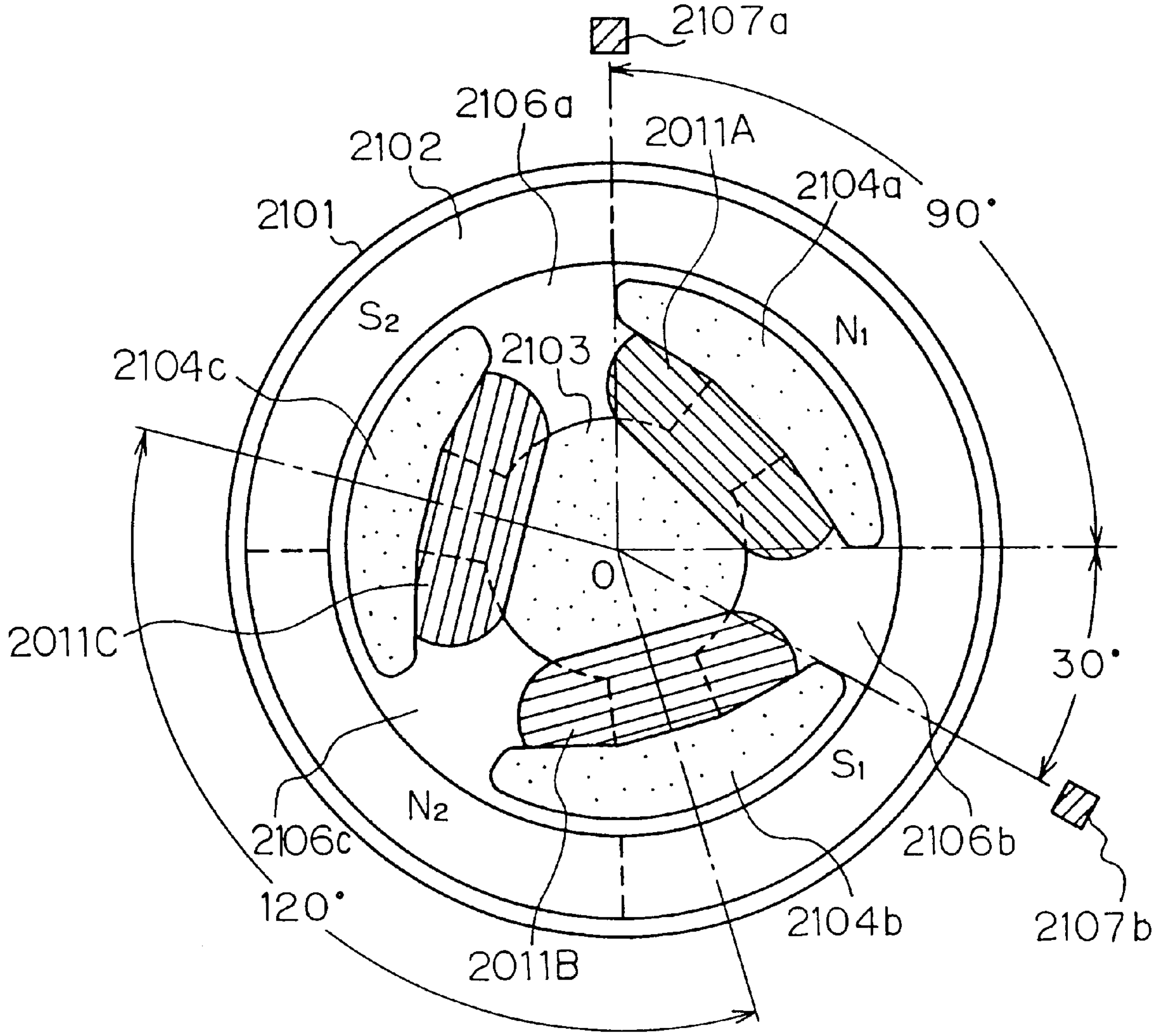
FIG. 28 is a diagram showing the structure of a motor of Embodiment 5.

FIG. 28 specifically shows the configuration of the field part 2010 and the three-phase coils 2011A, 2011B, and 2011C. In an annular permanent magnet 2102 attached to the inner side of the rotor 2101, the inner and end faces are magnetized so as to form four poles, thereby constituting the field part 2010 shown in FIG. 27. An armature core 2103 is placed at a position of the stator which opposes the poles of the permanent magnet 2102. Three salient poles 2104*a*, 2104*b*, and 2104*c* are disposed in the armature core 2103 at intervals of 120 deg. Three-phase coils 2011A, 2011B, and 2011C are wound on the salient poles 2104*a*, 2104*b*, and 2104*c*, respectively. Winding slots 2106*a*, 2106*b*, and 2106*c* formed between the salient poles 2104*a*, 2104*b*, and 2104*c* are used as working spaces when the winding operation is conducted. Among the coils 2011A, 2011B, and 2011C, phase differences of 120 deg. in electric angle are established with respect to intercrossing magnetic fluxes from the permanent magnet 2102 (one set of N and S poles corresponds to an electric angle of 360 deg.).

Two position detecting elements 2107*a* and 2107*b* (for example, Hall elements which are magnetoelectrical converting elements) are arranged on the stator and detect the poles of the end face of the permanent magnet 2102, thereby obtaining two-phase detection signals corresponding to relative positions of the field part and the coils. In the embodiment, the center of the coils and that of the position detecting elements are shifted in phase by an electric angle of 90 deg.

A command block 2015 shown in FIG. 27 comprises a command current circuit 2050, and outputs first and second output current signals corresponding to a command signal R. The first and second output current signals are supplied to first and second distributing circuits 2031 and 2032 of a distribution block 2013.

Figure 29:
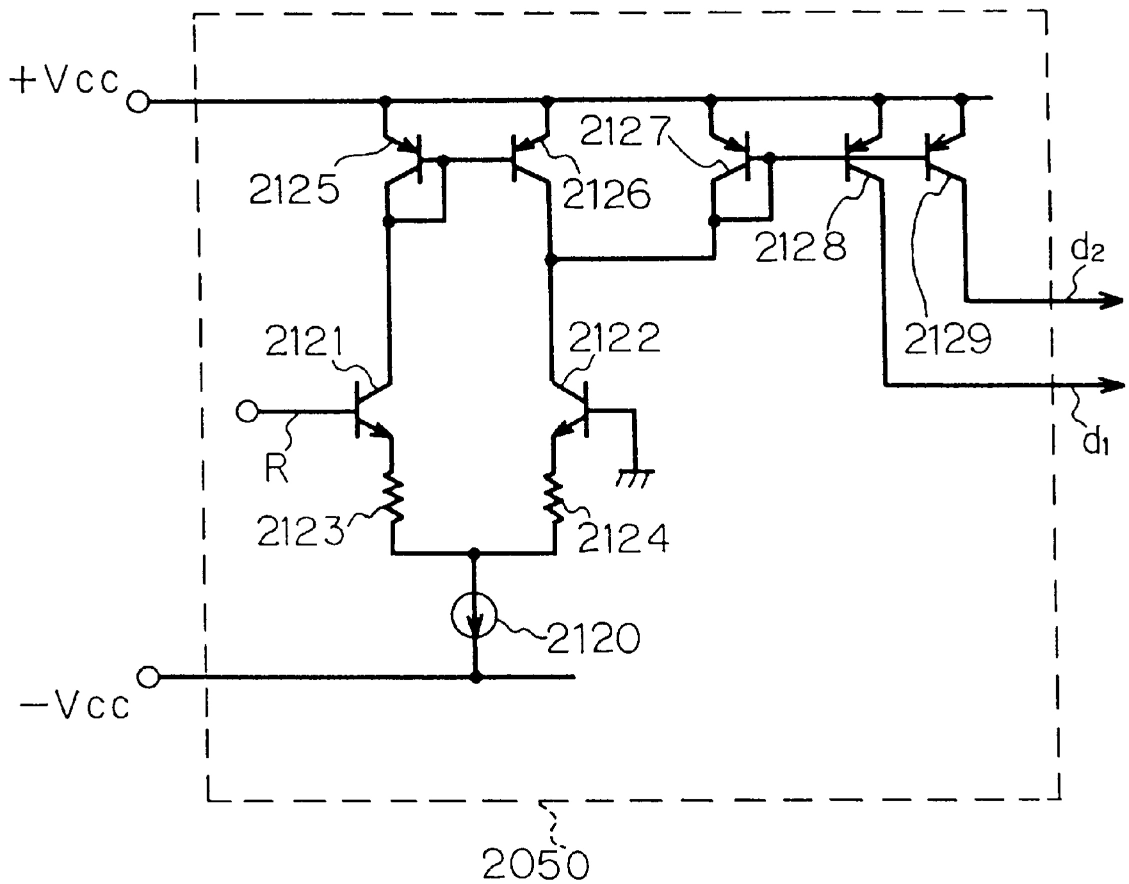
FIG. 29 is a specific circuit diagram of a command current circuit 2050 of Embodiment 5.

FIG. 29 is a circuit diagram specifically showing the command current circuit 2050. In the circuit to which +Vcc (=9 V) and −Vcc (=−9 V) are applied, transistors 2121 and 2122, and resistors 2123 and 2124 constitute a differential circuit which distributes the current of a constant current source 2120 to the collectors of the transistors 2121 and 2122 in correspondence with the command signal R. The collector currents of the transistors 2121 and 2122 are compared with each other by a current mirror circuit consisting of transistors 2125 and 2126, and the difference current is output through a current mirror circuit consisting of transistors 2127, 2128, and 2129. As a result, first and second output current signals d1 and d2 are obtained (d1 and d2 are outflow currents). Therefore, the output current signals d1 and d2 maintain the same current value corresponding to the command signal R. When the command signal R becomes lower than the ground level or 0 V, the output current signals d1 and d2 are increased. The first output current signal d1 is supplied to the first distributing circuit 2031 of the distribution block 2013 of FIG. 27, and the second output current signal d2 to the second distributing circuit 2032.

A position block 2012 shown in FIG. 27 comprises the position detector 2021 and an altering signal producing circuit 2022. The position block 2021 produces three-phase altering signals as described later by using the two-phase detection signals of the two position detecting elements 2107*a* and 2107*b* of the position detector 2021 shown in FIG. 28, and supplies the altering signals to the first and second distributing circuits 2031 and 2032 of the distribution block 2013.

Figure 30:
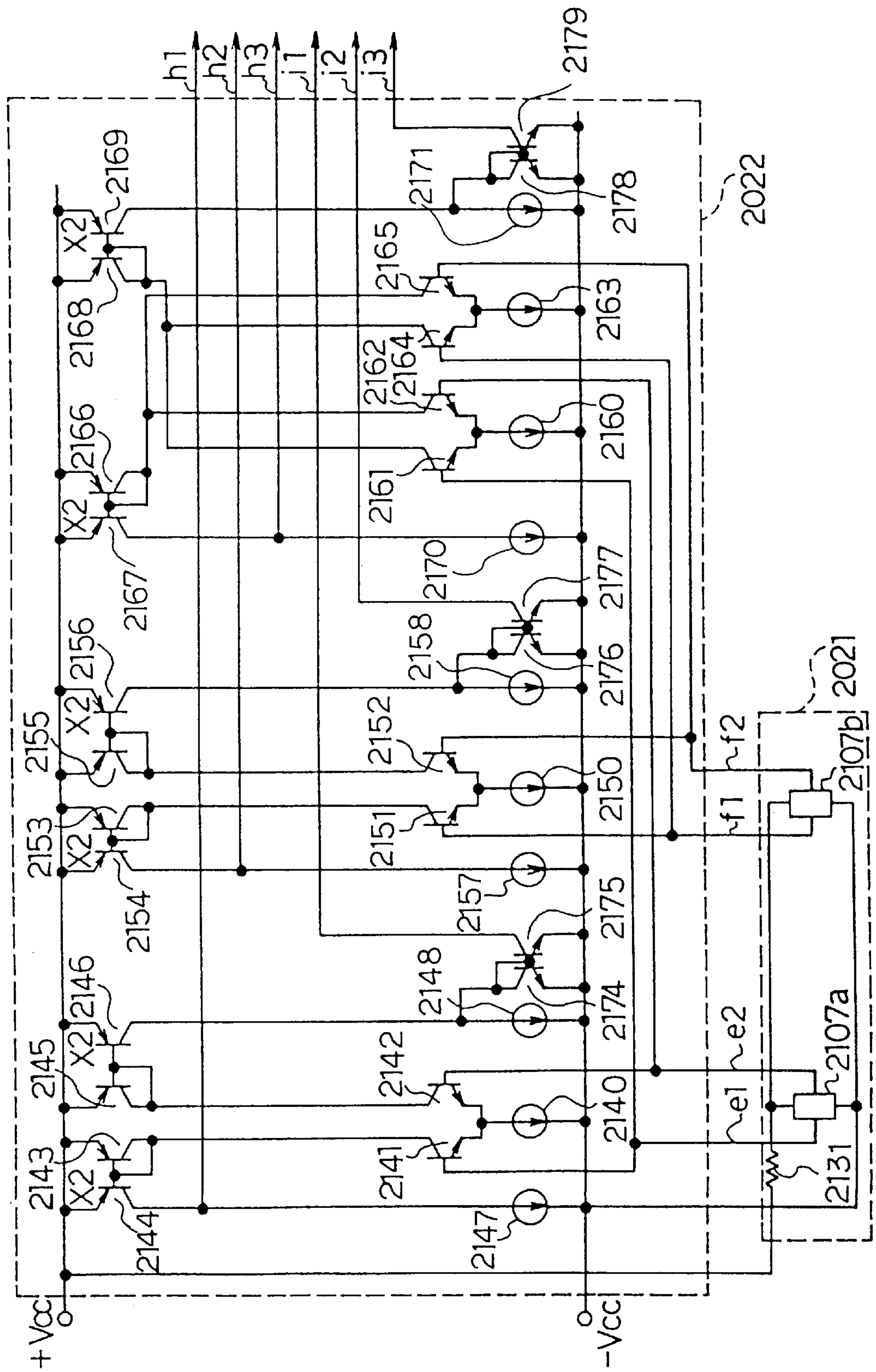
FIG. 30 is a specific circuit diagram of a position detector 2021 and an altering signal producing circuit 2022 of Embodiment 5.

FIG. 30 is a circuit diagram specifically showing the position detector 2021 and the altering signal producing circuit 2022. The two position detecting elements 2107*a* and 2107*b* of the position detector 2021 are connected in parallel with each other. The voltage is supplied to the elements via a resistor 2131. Differential detection signals e1 and e2 corresponding to the magnetic field detected from the field part 2010 (corresponding to the permanent magnet 2102 of FIG. 28) are output from output terminals of the position detecting element 2107*a* (e1 and e2 vary in reversed phase relationships). The detection signals e1 and e2 are then supplied to the bases of differential transistors 2141 and 2142 of the altering signal producing circuit 2022, and those of differential transistors 2161 and 2162, respectively. Similarly, differential detection signals f1 and f2 corresponding to the magnetic field detected from the field part 2010 are output from output terminals of the position detecting element 2107*b*, and then supplied to the bases of differential transistors 2151 and 2152, and those of differential transistors 2164 and 2165, respectively.

The two position detecting elements 2107*a* and 2107*b* output the two-phase detection signals e1 and f1, and e2 and f2 which are electrically separated in phase from each other by 120 deg. As the rotational movement of the field part 2010 proceeds, the two-phase detection signals e1 and e2, or f1 and f2 vary analoguely and sinusoidally or substantially sinusoidally. The detection signals e1 and f1, or e2 and f2 are in reversed phase relationships. In the operation of the motor, therefore, there exist two phases which are substantially independent from each other.

Constant current sources 2140, 2147, 2148, 2150, 2157, 2158, 2160, 2163, 2170, and 2171 of the altering signal producing circuit 2022 supply a current of the same constant value to the circuits. In correspondence with the detection signals e1 and e2, the differential transistors 2141 and 2142 distribute the value of the current of the constant current source 2140 to the collectors. The collector current of the transistor 2141 is amplified two times by a current mirror circuit consisting of transistors 2143 and 2144, thereby obtaining an altering signal h1 from the junction of the collector output of the transistor 2144 and the constant current source 2147.

The collector current of the transistor 2142 is amplified two times by a current mirror circuit consisting of transistors 2145 and 2146. An altering signal i1 is obtained via a current mirror circuit which consists of transistors 2174 and 2175 and which is connected to the junction of the collector output of the transistor 2146 and the constant current source 2148.

Similarly, in correspondence with the detection. signals f1 and f2, differential transistors 2151 and 2152 distribute the current of the constant current source 2150 to the collectors. The collector current of the transistor 2151 is amplified two times by a current mirror circuit consisting of transistors 2153 and 2154. An altering signal h2 is obtained from the junction of the collector output of the transistor 2154 and the constant current source 2157.

The collector current of the transistor 2152 is amplified two times by a current mirror circuit consisting of transistors 2155 and 2156. An altering signal i2 is obtained via a current mirror circuit which consists of transistors 2176 and 2177 and which is connected to the junction of the collector output of the transistor 2156 and the constant current source 2158.

In correspondence with the detection signals e1 and e2, differential transistors 2161 and 2162 distribute the current of the constant current source 2160 to the collectors. In correspondence with the detection signals f1 and f2, differential transistors 2164 and 2165 distribute the current of the constant current source 2163 to the collectors. The collector currents of the transistors 2162 and 2165 are composed together, and the composed current is amplified two times by a current mirror circuit consisting of transistors 2166 and 2167. An altering signal h3 is obtained from the junction of the collector output of the transistor 2167 and the constant current source 2170.

The collector currents of the transistors 2161 and 2164 are composed together, and the composed current is amplified two times by a current mirror circuit consisting of transistors 2168 and 2169. An altering signal i3 is obtained via a current mirror circuit consisting of transistors 2178 and 2179 which is connected to the junction of the collector output of the transistor 2169 and the constant current source 2171.

The constant current sources 2140, 2147, 2148, 2150, 2157, 2158, 2160, and 2163 supply a current of the same constant value. The constant current sources 2170 and 2171 are set to supply a current the value of which is two times that of the above-mentioned current sources.

Figure 31:
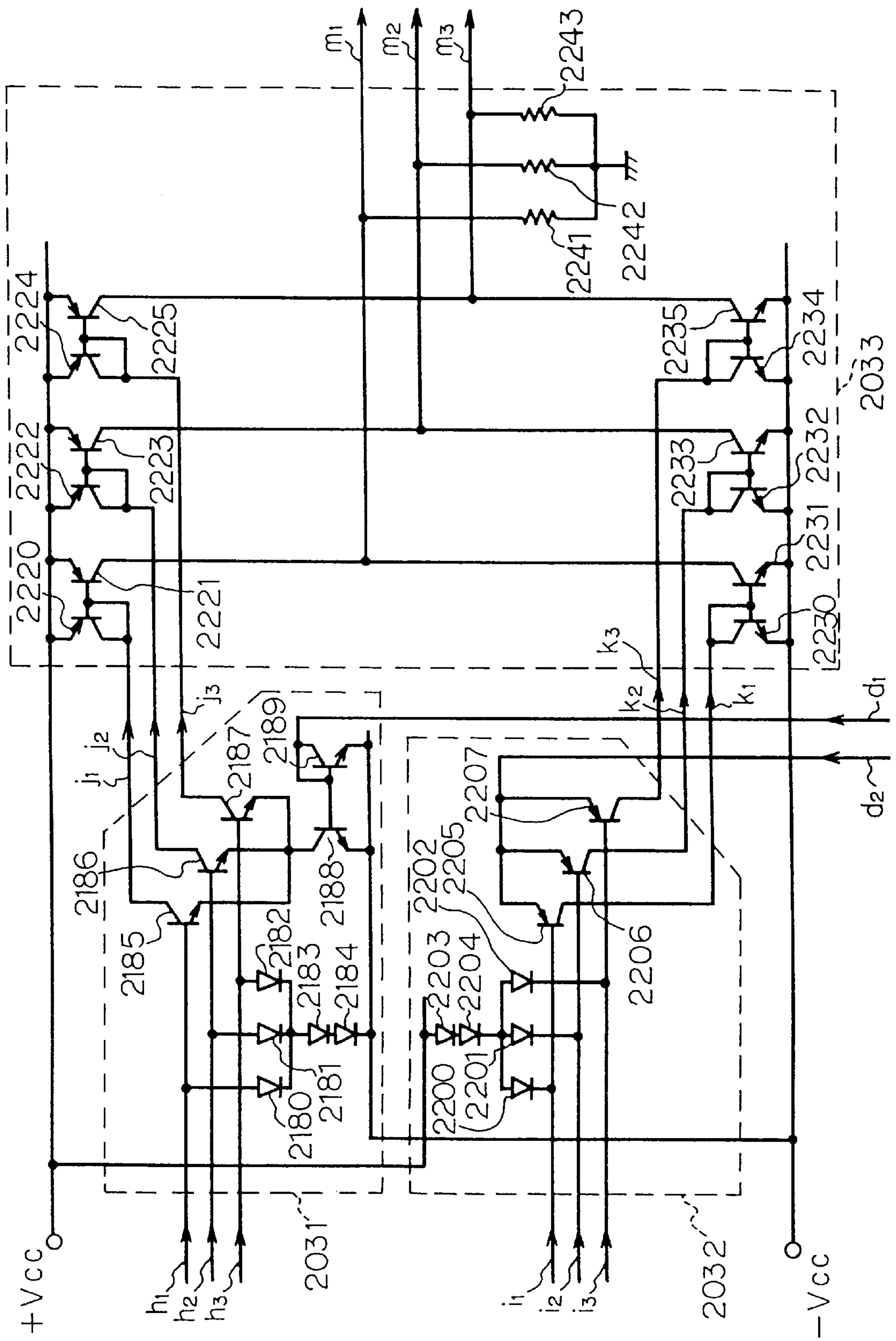
FIG. 31 is a specific circuit diagram of a first distributing circuit 2031, a second distributing circuit 2032, and a distributing composer 2033 of Embodiment 5.

The altering signals h1, h2, and h3 which are supplied from the right end of FIG. 30 to the left end of FIG. 31 are three-phase current signals (altering current signals) which analoguely vary responding with the two-phase detection signals, and supplied to the first distributing circuit 2031 of FIG. 27. Because of the configuration of the first distributing circuit 2031 which will be described later, the altering signals h1, h2, and h3 function as outflow currents as seen from the altering signal producing circuit 2022.

The altering signals i1, i2, and i3 are three-phase altering current signals (current signals) which analoguely vary responding with the two-phase detection signals, and supplied to the second distributing circuit 2032 of FIG. 31. Because of the configuration of the second distributing circuit 2032 which will be described later, the altering signals i1, 12, and 13 function as inflow currents as seen from the altering signal producing circuit 2022.

The altering signals h1 and i1 are alternatingly increased in level. Similarly, the altering signals h2 and i2 are alternatingly increased in level, and the altering signals h3 and i3 are alternatingly increased in level (see waveforms (b) and (c) of FIG. 33 which will be described later).

In this way, the altering signal producing circuit 2022 of the position block 2012 compose two-phase detection signals together by calculation so as to produce two sets of three-phase altering current signals which are electrically separated in phase from each other by 120 deg. or by about 120 deg.

The first distributing circuit 2031 of the distribution block 2013 of FIG. 27 obtains three-phase first distributed current signals to which the first output current signal d1 is distributed in correspondence with the altering signals h1, h2, and h3 of the altering signal producing circuit 2022. The second distributing circuit 2032 obtains three-phase second distributed current signals to which the second output current signal d2 is distributed in correspondence with the altering signals i1, i2, and i3 of the altering signal producing circuit 2022. A distributing composer 2033 composes the first and second distributed current signals together into three-phase distributed signals, and supplies the distributed signals to a driving block 2014.

FIG. 31 is a circuit diagram specifically showing the configuration of the first distributing circuit 2031, the second distributing circuit 2032, and the distributing composer 2033 of the distribution block 2013. In FIG. 31, the altering signals h1, h2, and h3 which are input to the first distributing circuit 2031 cause currents to flow into first diodes 2180, 2181, and 2182 so that voltage signals corresponding to the inflow current values of the signals h1, h2, and h3 are generated. In the first diodes 2180, 2181, and 2182, the ends of one side are connected to each other and the other ends are connected to the bases of first distributing transistors 2185, 2186, and 2187, respectively.

The first output current signal d1 of the command block 2015 (FIG. 27) is supplied via a current mirror circuit consisting of transistors 2188 and 2189, to the emitters of the first distributing transistors 2185, 2186, and 2187 which are connected to each other. In correspondence with the altering signals h1, h2, and h3, therefore, the first distributing transistors 2185, 2186, and 2187 distribute the first output current signal d1 so as to generate three-phase first distributed current signals j1, j2, and j3 (inflow currents to the circuit 2031) which analoguely vary. Diodes 2183 and 2184 produce a voltage bias.

The first distributed current signal j1 of the first distributing circuit 2031 varies responding with a result h1·d1 of a multiplication of the altering signal h1 (the inflow current value) by the first output current signal d1 (the current value) of the command block 2015. Similarly, the first distributed current signal j2 varies responding with a result h2·d1 of a multiplication of the altering signal h2 and the first output current signal d1, and the first distributed current signal j3 varies responding with a result h3·d1 of a multiplication of the altering signal h3 by the first output current signal d1. The value of the composed current j1+j2+j3 of the first distributed current signals is equal to the first output current signal d1.

The altering signals i1, i2, and i3 which are input to the second distributing circuit 2032 cause currents to flow out from second diodes 2200, 2201, and 2202, so that voltage signals corresponding to the outflow current values of the signals i1, i2, and i3 are generated. In the second diodes 2200, 2201, and 2202, the ends of one side are connected to each other and the other ends are connected to the bases of second distributing transistors 2205, 2206, and 2207, respectively. The second output current signal d2 of the command block 2015 is supplied to the emitters of the second distributing transistors 2205, 2206, and 2207 which are connected to each other. In correspondence with the altering signals i1, i2, and i3, therefore, the second distributing transistors 2205, 2206, and 2207 distribute the second output current signal d2 so as to generate the three-phase second distributed current signals k1, k2, and k3 (outflow currents) which analoguely vary. Diodes 2203 and 2204 produce a voltage bias.

The second distributed current signal k1 of the second distributing circuit 2032 varies responding with a result i1·d2 of a multiplication of the altering signal i1 (the outflow current value) by the second output current signal d2 (the current value) of the command block 2015. Similarly, the second distributed current signal k2 varies responding with a result i2·d2 of a multiplication of the altering signal i2 by the second output current signal d2, and the second distributed current signal k3 varies responding with a result i3·d2 of a multiplication of the altering signal i3 by the second output current signal d2. The value of the composed current k1+k2+k3 of the second distributed current signals is equal to the second output current signal d2.

In FIG. 31, three current mirror circuits respectively consisting of transistors 2220 and 2221, 2222 and 2223, and 2224 and 2225 of the distributing composer 2033 invert the first distributed current signals j1, j2, and j3 and output the inverted signals, respectively. Three current mirror circuits respectively consisting of transistors 2230 and 2231, 2232 and 2233, and 2234 and 2235 of the distributing composer 33 invert the second distributed current signals k1, k2, and k3 and output the inverted signals. The first and second distributed current signals j1 and k1 are composed together at the junction of the respective current mirror circuits (the junction of the collectors of the transistors 2221 and 2231), and a composed distributed current signal corresponding to a difference current (j1−k1) is generated. The composed distributed current signal is supplied to a resistor 2241 so as to produce a distributed signal m1 appearing in the form of the voltage drop of the resistor 2241.

Similarly, the first and second distributed current signals j2 and k2 are composed together at the junction of the respective current mirror circuits, and a composed distributed current signal corresponding to a difference current (j2−k2) is generated. The composed distributed current signal is supplied to a resistor 2242 so as to produce a distributed signal m2 appearing in the form of the voltage drop of the resistor 2242.

Furthermore, the first and second distributed current signals j3 and k3 are composed together at the junction of the respective current mirror circuits, and a composed distributed current signal corresponding to a difference current (j3−k3) is generated. The composed distributed current signal is supplied to a resistor 2243 so as to produce a distributed signal m3 appearing in the form of the voltage drop of the resistor 2243.

In this way, the distributed signals m1, m2, and m3 appear as three-phase voltage signals which respectively correspond to the altering signals h1 and i1, h2 and i2, and h3 and i3, and have a predetermined amplitude which depends on the stabilized current values of the output current signals d1 and d2 of the command block 2015. In other word, the amplitudes of the distributed signals m1, m2, and m3 are not affected by the amplitudes of the detection signals and the altering signals.

The driving block 2014 of FIG. 27 comprises a first driving circuit 2041, a second driving circuit 2042, and a third driving circuit 2043, and supplies driving signals Va, Vb, and Vc which are obtained by amplifying the distributed signals m1, m2, and m3 from the distribution block 2013, to the terminals of the three-phase coils 2011A, 2011B, and 2011C.

Figure 32:
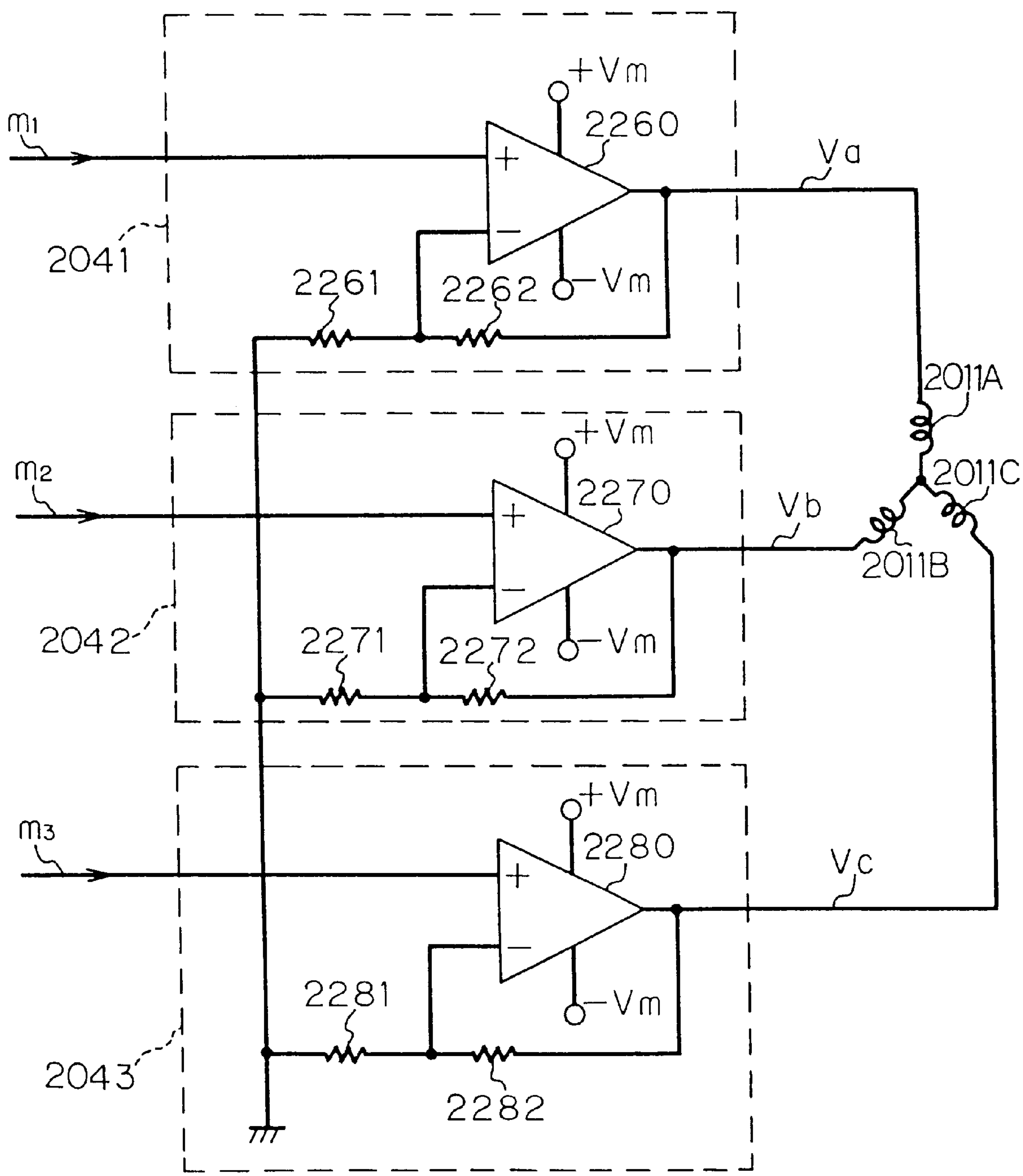
FIG. 32 is a specific circuit diagram of a first driving circuit 2041, a second driving circuit 2042, and a third driving circuit 2043 of Embodiment 5.

FIG. 32 is a circuit diagram specifically showing the configuration of the first driving circuit 2041, the second driving circuit 2042, and the third driving circuit 2043 of the driving block 2014. The distributed signal m1 is input to the noninverting terminal of an amplifier 2260 of the first driving circuit 2041 and then amplified at an amplification factor defined by resistors 2261 and 2262. The driving signal Va which is produced as a result of the voltage amplification is supplied to the power input terminal of the coil 2011A.

Similarly, the distributed signal m2 is input to the noninverting terminal of an amplifier 2270 of the second driving circuit 2042 and then amplified at an amplification factor defined by resistors 2271 and 2272, thereby producing the driving signal Vb. The driving signal is supplied to the power input terminal of the coil 2011B.

Furthermore, the distributed signal m3 is input to the noninverting terminal of an amplifier 2280 of the third driving circuit 2043 and then amplified at an amplification factor defined by resistors 2281 and 2282, thereby producing the driving signal Vc. The driving signal is supplied to the power input terminal of the coil 2011C.

The amplifiers 2260, 2270, and 2280 are supplied with power source voltages +Vm (=+15 V) and −Vm (=−15 V).

As a result of the supply of the driving signals Va, Vb, and Vc, three-phase driving currents are supplied to the three-phase coils 2011A, 2011B, and 2011C, so that a driving force is generated in a predetermined direction by electromagnetic interaction between the coils and the field part 2010.

Figure 33:
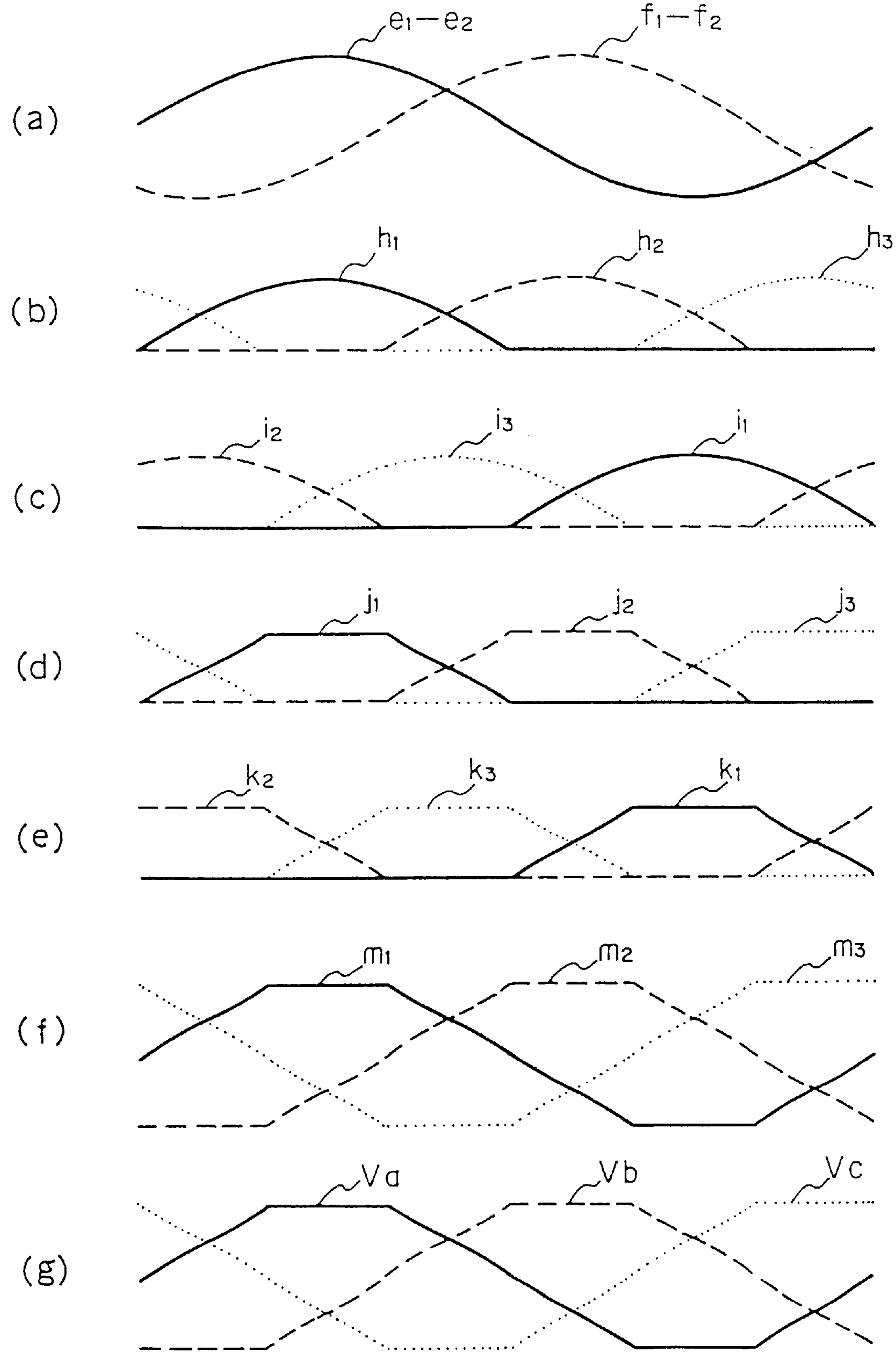
FIG. 33 is a chart showing the waveforms of signals of Embodiment 5.

FIG. 33 is a graph showing waveforms relating to the operation of the brushless motor of the embodiment. The horizontal axis of the graph indicates the rotation position.

As the rotational movement (or a relative movement with respect to the three-phase coils) of the field part 2010 proceeds, the two position detecting elements 2107*a* and 2107*b* which detect the magnetic field of the field part 2010 produce two-phase sinusoidal detection signals (e1–e2) and (f1–f2) ((a) of FIG. 33).

The altering signal producing circuit 2022 produces a first set of the altering signals, i.e., the three-phase altering signals h1, h2, and h3 (the currents supplied to the first diodes 2180 to 2182, (b) of FIG. 33), and a second set of the altering signals, i.e., the three-phase altering signals i1, i2, and i3 (the currents supplied to the second diodes 2200 to 2202, (c) of FIG. 33) which analoguely vary responding with the two-phase detection signals.

In the first distributing circuit 2031, the first output current signal d1 of the command block 2015 is distributed by the first distributing transistors 2185, 2186, and 2187 in correspondence with the values of the altering signals h1, h2, and h3 (the values of the currents supplied to the first diodes 2180, 2181, and 2182), thereby obtaining the three-phase first distributed current signals j1, j2, and j3 ((d) of FIG. 33).

The first distributed current signals j1, j2, and j3 are three-phase current signals which, in accordance with the results h1·d1, h2·d1, and h3·d1 of multiplications of the altering signals h1, h2, and h3 by the first output current signal d1, are distributed in such a manner that a sum of the results h1·d1+h2·d1+h3·d1 is equal to the first output current signal d1. Similarly, in the second distributing circuit 2032, the second output current signal d2 of the command block 2015 is distributed by the second distributing transistors 2205, 2206, and 2207 in correspondence with the values of the altering signals i1, i2, and i3 (the values of the currents supplied to the second diodes 2200, 2201, and 2202), thereby obtaining the three-phase second distributed current signals k1, k2, and k3 ((e) of FIG. 33).

The second distributed current signals k1, k2, and k3 are three-phase current signals which, in accordance with the results i1·d2, i2·d2, and i3·d2 of multiplications of the altering signals i1, i2, and i3 by the second output current signal d2, are distributed in such a manner that a sum of the results i1·d2+i2·d2+i3·d2 is equal to the second output current signal d2. The distributing composer 2033 composes the first distributed current signals j1, j2, and j3 and the second distributed current signals k1, k2, and k3 together, thereby obtaining the three-phase distributed signals m1, m2, and m3 ((f) of FIG. 33). The distributed signals m1, m2, and m3 vary responding with differential currents j1–k1, j2–k2, and j3–k3 between the first and second distributed current signals for each phase. The first driving circuit 2041, the second driving circuit 2042, and the third driving circuit 2043 of the driving block 2014 supply the driving signals Va, Vb, and Vc ((g) of FIG. 33) of waveforms respectively corresponding to the distributed signals m1, m2, and m3, to the three-phase coils 2011A, 2011B, and 2011C.

In the thus configured embodiment, it is possible to produce three-phase altering signals by using two-phase detection signals which are obtained by the two position detecting elements. Even when the altering signals corresponding to the detection signals vary in amplitude, the first and second distributed signals of the first and second distributing circuits 2031 and 2032 are surely limited to amplitudes corresponding to the first and second output current signal d1 and d2 of the command block 2015.

Therefore, the distributed signals m1, m2, and m3 (or the driving signals Va, Vb, and Vc) are not affected by the amplitudes of the detection signals and the altering signals. In other words, variations in the sensitivities of the position detecting elements 2107*a* and 2107*b* of the position detector 2021, variations in the magnetic field of the field part 2010, and variations in the gain of the altering signal producing circuit 2022 exert very small influences on the amplitudes. The amplitudes are substantially free from influences due to such variations.

In the brushless motor of the embodiment, therefore, the number of components of the position detecting elements is so small that the motor is simplified in configuration. When a speed control or a torque control of the brushless motor of the embodiment is made, variations in speed control gains or torque control gains among motors are eliminated and hence the control properties of motors of mass production are extremely stabilized (a phenomenon of control instability due to variations in the gains of motors does not occur). In other words, since the first and second distributing circuits conduct nonlinear multiplication distribution, even when the detection signals and the altering signals are distorted or varied, the driving signals are substantially free from influences due to such distortion or variation.

In the embodiment, even when the detection signals of the position detector vary analoguely sinusoidally, the distributed signals and the driving signals are distorted into a trapezoidal shape as shown in FIG. 33. In many uses, such distortion is allowable. In order to realize a brushless motor of higher performance, however, it is preferable to eliminate such distortion. Next, an embodiment which is improved in this point will be described.

Embodiment 6

Hereinafter, a sixth embodiment of the invention will be described with reference to the accompanying drawings.

Figure 34:
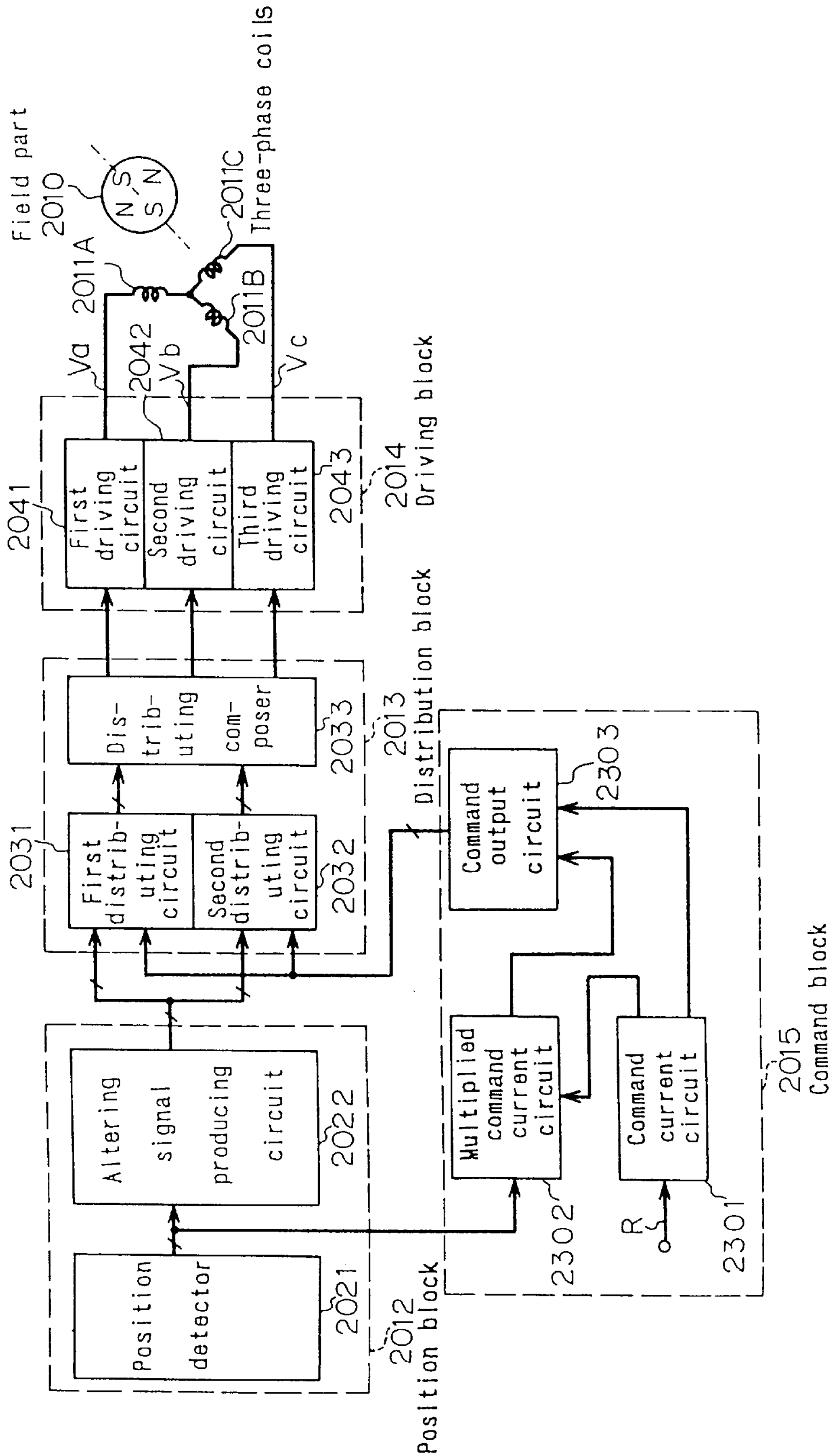
FIG. 34 is a block diagram of Embodiment 6 of the invention.

FIGS. 34 to 37 show the configuration a brushless motor of the sixth embodiment. In the circuit block diagrams, a connection line to or from circuit block with oblique short bar crossing therewith represents plural connection lines or a connection line for aggregate signals. FIG. 34 is a block diagram showing the whole configuration of the motor. As compared with Embodiment 5, Embodiment 6 is characterized in that a command block 2015 of FIG. 34 comprises a command current circuit 2301, a multiplied command current circuit 2302, and a command output circuit 2303 and produces distributed signals and driving signals which vary analoguely. The components which are identical with those of Embodiment 5 are designated by the same reference numerals.

Figure 35:
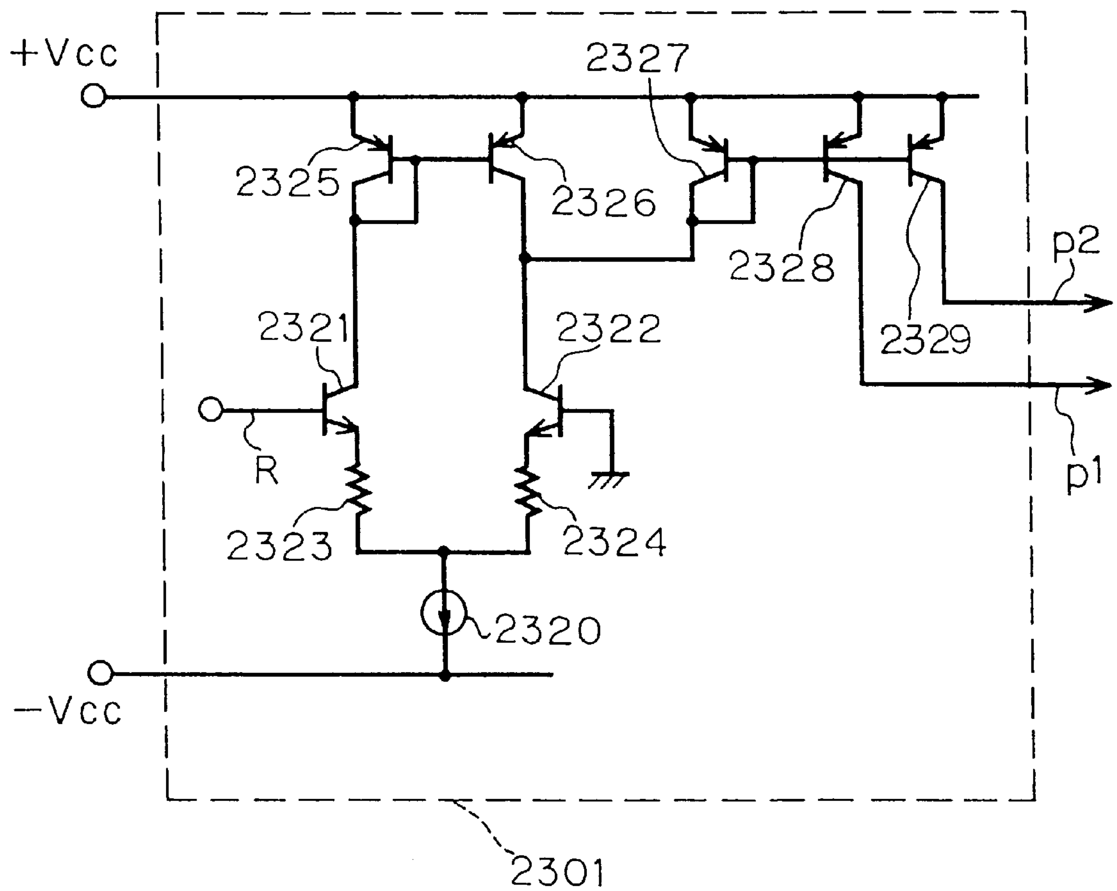
FIG. 35 is a specific circuit diagram of a command current circuit 2301 of Embodiment 6.

FIG. 35 is a circuit diagram specifically showing the configuration of the command current circuit 2301 of the command block 2015. In correspondence with the command signal R, transistors 2321 and 2322, and resistors 2323 and 2324 distribute the current of a constant current source 2320 to the collectors of the transistors 2321 and 2322. The collector currents are compared with each other by a current mirror circuit consisting of transistors 2325 and 2326, and the difference current is output as command current signals p1 and p2 through a current mirror circuit consisting of transistors 2327, 2328, and 2329. Therefore, the command current circuit 2301 produces the two command current signals p1 and p2 (p1 and p2 are proportional to each other) corresponding to the command signal R. The first command current signal p1 is supplied to the command output circuit 2303, and the second command current signal p2 to the multiplied command current circuit 2302.

Figure 36:
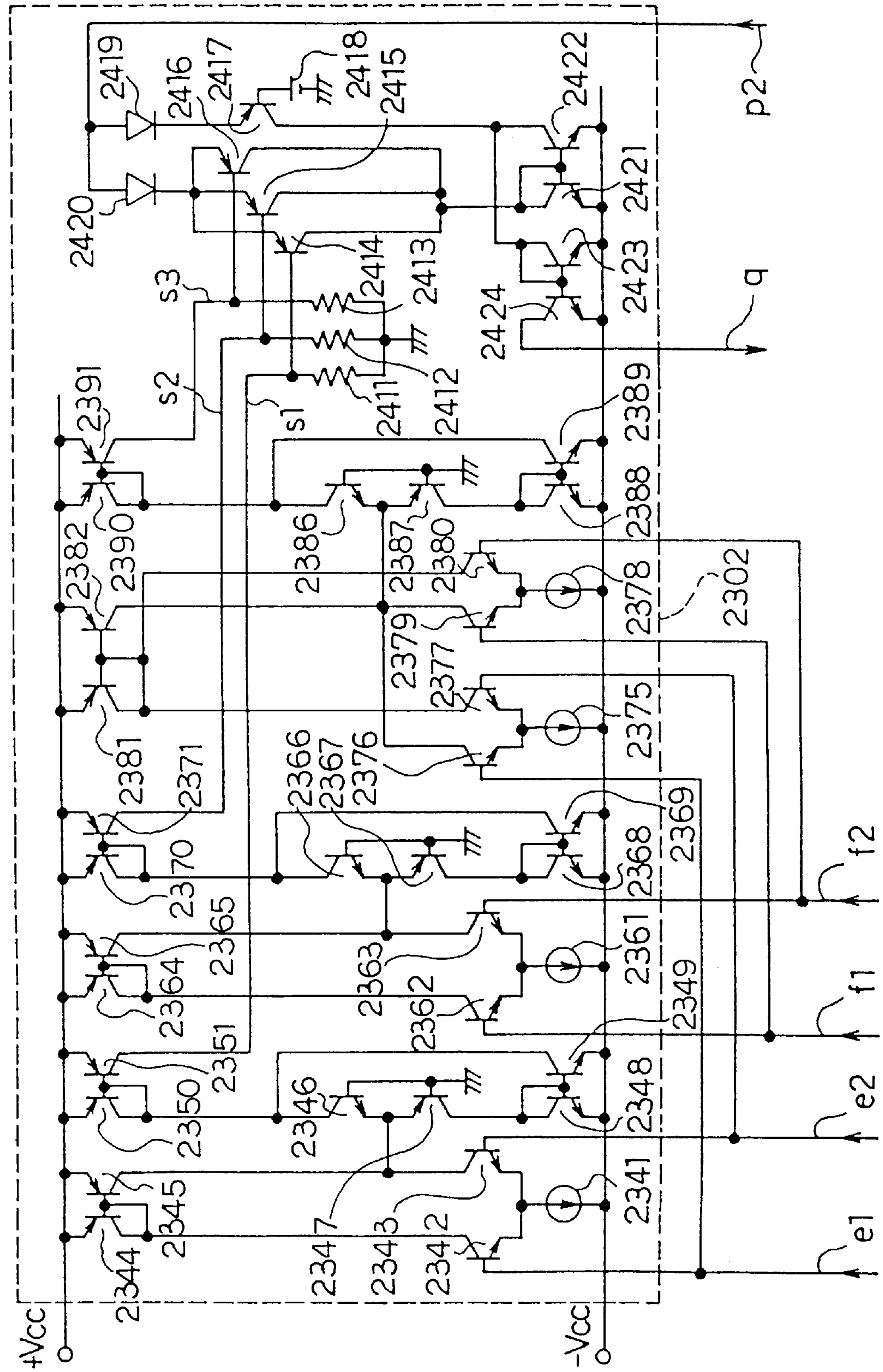
FIG. 36 is a specific circuit diagram of a multiplied command current circuit 2302 of Embodiment 6.

FIG. 36 is a circuit diagram specifically showing the configuration of the multiplied command current circuit 2302 of the command block 2015. In correspondence with the detection signals e1 and e2 of the position detecting elements, transistors 2342 and 2343 distribute the value of the current of a constant current source 2341 to the collectors. The difference current is obtained by a current mirror circuit consisting of transistors 2344 and 2345, and a voltage signal s1 corresponding to the absolute value of the difference current is obtained by a combination of transistors 2346, 2347, 2348, 2349, 2350, and 2351, and a resistor 2411. In other words, the voltage signal s1 (absolute signal) corresponding to the absolute value of the detection signal e1–e2 is produced.

Similarly, in correspondence with the detection signals f1 and f2 of the position detecting elements, transistors 2362 and 2363 distribute the value of the current of a constant current source 2361 to the collectors. The difference current is obtained by a current mirror circuit consisting of transistors 2364 and 2365, and a voltage signal s2 corresponding to the absolute value of the difference current is obtained by a combination of transistors 2366, 2367, 2368, 2369, 2370 and 2371, and a resistor 2412. In other words, the voltage signal s2 (an absolute signal) corresponding to the absolute value of a detection signal f1–f2 is produced.

In correspondence with the detection signals e1 and e2, transistors 2376 and 2377 distribute the value of the current of a constant current source 2375 to the collectors. In correspondence with the detection signals f1 and f2, transistors 2379 and 2380 distribute the value of the current of a constant current source 2378 to the collectors. The collector currents of the transistors 2377 and 2380 are composed together, and the composed current is output via a current mirror circuit consisting of transistors 2381 and 2382. The difference current of the composed collector currents of the transistors 2376 and 2379 and the output current of the transistor 2382 is obtained, and a voltage signal s3 corresponding to the absolute value of the difference current is produced by a combination of transistors 2386, 2387, 2388, 2389, 2390, and 2391, and a resistor 2413. In other words, the voltage signal s3 (absolute signal) corresponding to the absolute value of the composed signal which is obtained by composing two-phase detection signals e1–e2 and f1–f2 together is produced. Therefore, the voltage signals s1, s2, and s3 are three-phase absolute signals corresponding to the two-phase detection signals, and synchronized with the three-phase altering signals. The current sources 2341, 2361, 2375, and 2378 are set to a predetermined current value.

Transistors 2414, 2415, 2416, and 2417, and diodes 2419 and 2420 compare the three-phase absolute signals s1, s2, and s3 with a predetermined voltage value (including 0 V) of a constant voltage source 2418. In correspondence with the difference voltages, the command current signal p2 of the command current circuit 2301 (FIG. 35) is distributed to the collectors. The collector currents of the transistors 2414, 2415, and 2416 are composed together. A current mirror circuit consisting of transistors 2421 and 2422 compares the composed current with the collector current of the transistor 2417, and the difference current is output as a multiplied command current signal q (inflow current) via a current mirror circuit consisting of transistors 2423 and 2424. The multiplied command current signal q corresponds to results of multiplications of the three-phase absolute signals s1, s2, and s3 corresponding to the detection signals by the command current signal p2 corresponding to the command signal. Particularly, because of the configuration of the transistors 2414, 2415, 2416, and 2417, and the diodes 2419 and 2420, the multiplied command current signal q varies responding with a result of a multiplication of the minimum value of the three-phase absolute signals s1, s2, and s3 by the command current signal p2. The minimum value of the three-phase absolute signals s1, s2, and s3 corresponding to the two-phase detection signals is a higher harmonic signal which is synchronized with the detection signals and which varies 6 times for a change of every one period of the detection signals. Therefore, the multiplied command current signal q is a higher harmonic signal which has an amplitude proportional to the command current signal p2 and which varies 6 times every one period of the detection signals.

Figure 37:
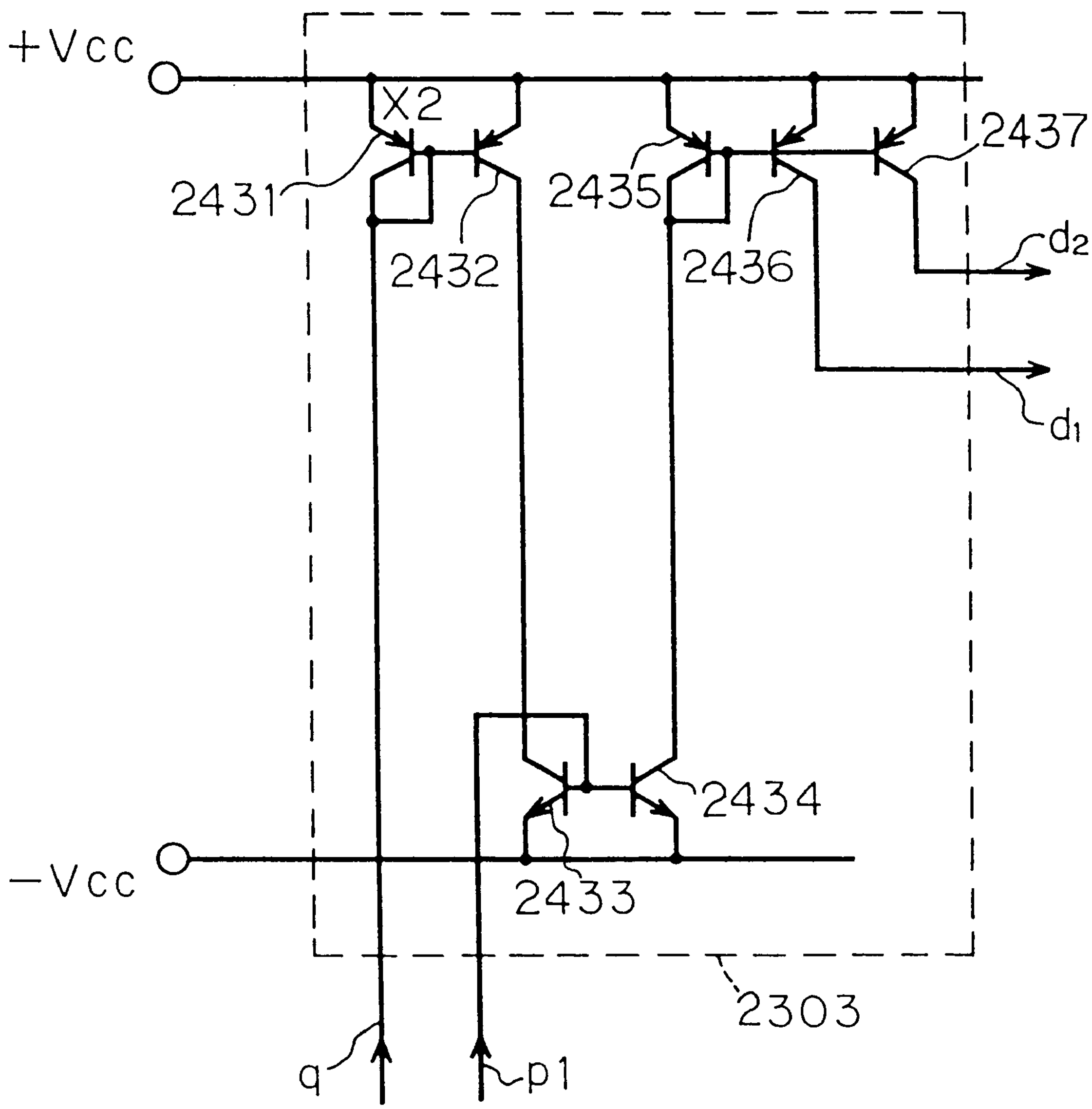
FIG. 37 is a specific circuit diagram of a command output circuit 2303 of Embodiment 6.

FIG. 37 is a circuit diagram specifically showing the configuration of the command output circuit 2303 of the command block 2015. The multiplied command current signal q of the multiplied command output circuit 2302 is input to a current mirror circuit consisting of transistors 2431 and 2432 and reduced in current value to approximately one half. Thereafter, the resulting signal and the first command current signal p1 of the command current circuit 2301 are composed together by addition. The resulting composed command current signal is output as the two output current signals d1 and d2 via a current mirror circuit consisting of transistors 2433 and 2434, and that consisting of transistors 2435, 2436, and 2437. As a result, the first and second output current signals d1 and d2 of the command block 2015 become current signals which vary responding with the command signal and which contain higher harmonic signal components at a predetermined percentage. The first output current signal d1 is supplied to the first distributing circuit 2031 of the distribution block 2013 (FIG. 34), and the second output current signal d2 to the second distributing circuit 2032.

The configuration and operation of the position block 2012 (the position detector 2021 and the altering signal producing circuit 2022), the distribution block 2013 (the first distributing circuit 2031, the second distributing circuit 2032, and the distributing composer 2033), and the driving block 2014 (the first driving circuit 2041, the second driving circuit 2042, and the third driving circuit 2043) which are shown in FIG. 34 are the same as those shown in FIGS. 30, 31, and 32. Therefore, their detailed description is omitted.

Figure 38:
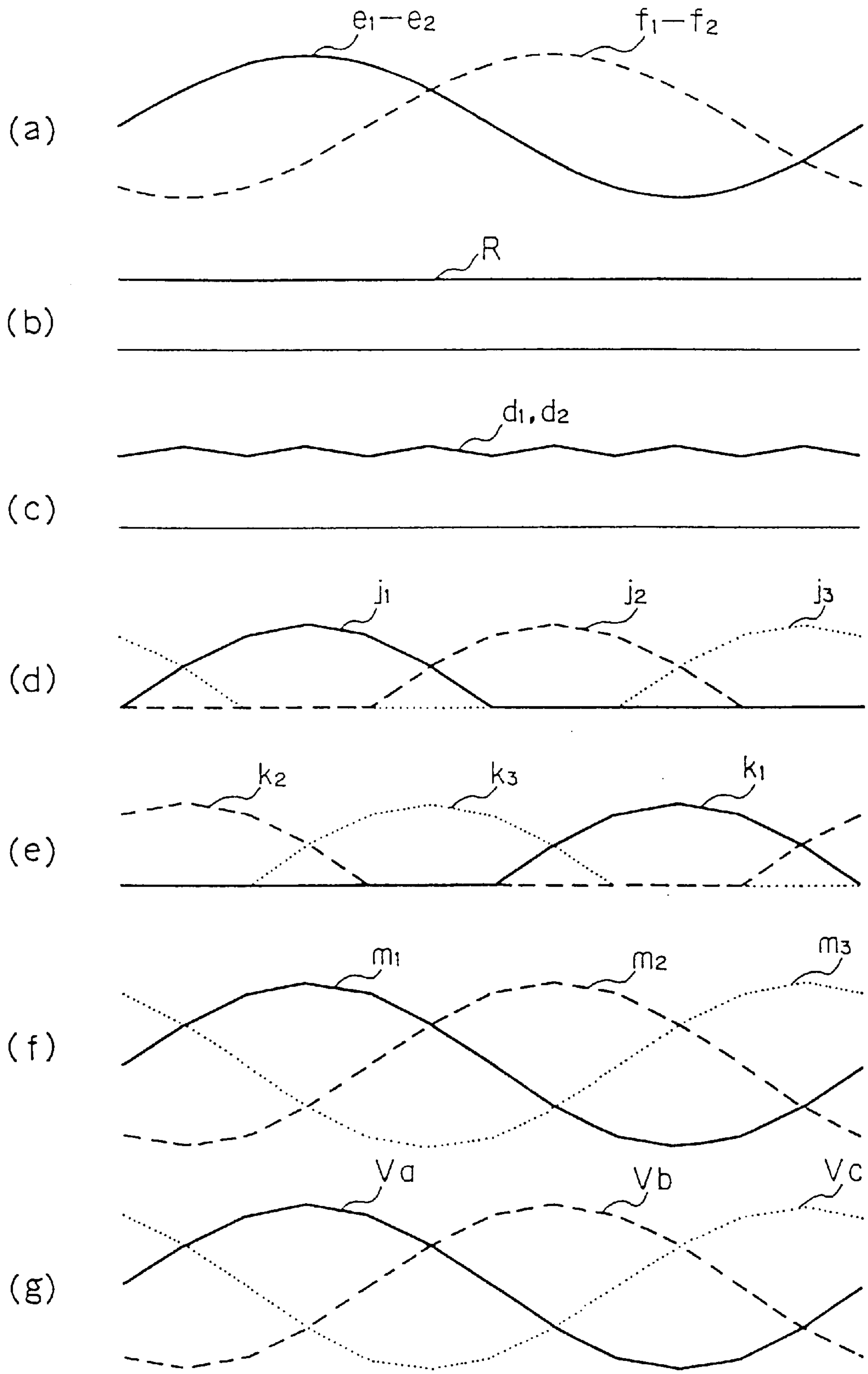
FIG. 38 is a chart showing the waveforms of signals of Embodiment 6.

FIG. 38 is a graph showing the waveforms of the signals of the embodiment. The horizontal axis of the graph indicates the rotation position. As the rotational movement (or a relative movement with respect to the three-phase coils) of the field part 2010 (FIG. 34) proceeds, the position detecting elements 2107*a* and 2107*b* which detect the magnetic field of the field part 2010 produce two-phase sinusoidal detection signals e1–e2 and f1–f2 (see (a) of FIG. 38).

In response to the command signal R of a predetermined value ((b) of FIG. 38), by operation of the multiplied command current circuit 2302 and the command output circuit 2303 of the command block 2015, the first and second output current signals d1 and d2 of the command block 2015 becomes to contain higher harmonic signal components corresponding to the detection signals, at a given percentage ((c) of FIG. 38). The altering signal producing circuit 2022 produces the three-phase altering signals h1, h2, and h3, and i1, i2, and i3 which analoguely vary responding with the detection signals. In the first distributing circuit 2031, the first output current signal d1 of the command block 2015 is distributed by the first distributing transistors 2185, 2186, and 2187 in correspondence with the values of the altering signals h1, h2, and h3 (the values of the currents supplied to the first diodes 2180, 2181, and 2182), thereby obtaining the three-phase first distributed current signals j1, j2, and j3 ((d) of FIG. 38).

The first distributed current signals j1, j2, and j3 are current signals which are distributed in correspondence with results h1·d1, h2·d1, and h3·d1 of multiplications of the altering signals h1, h2, and h3 by the first output current signal d1, respectively, in such a manner that a sum of the results h1·d1+h2·d1+h3·d1 is equal to the first output current signal d1.

Similarly, in the second distributing circuit 2032, the second output current signal d2 of the command block 2015 is distributed by the second distributing transistors 2205, 2206, and 2207 in correspondence with the values of the altering signals i1, i2, and i3 (the values of the currents supplied to the second diodes 2200, 2201, and 2202), thereby obtaining the three-phase second distributed current signals k1, k2, and k3 ((e) of FIG. 38).

The second distributed current signals k1, k2, and k3 are current signals which are distributed in correspondence with results i1·d2, i2·d2, and i3·d2 of multiplications of the altering signals i1, i2, and i3 by the second output current signal d2, respectively, in such a manner that a sum of the results il·d2+i2·d2+i3·d2 is equal to the second output current signal d2.

The distributing composer 2033 composes the first distributed current signals j1, j2, and j3 and the second distributed current signals k1, k2, and k3 together, thereby obtaining the three-phase distributed signals m1, m2, and m3 ((f) of FIG. 38).

The distributed signals m1, m2, and m3 are signals which vary responding with differential currents j1–k1, j2–k2, and j3–k3 between the first and second distributed current signals for each phase. The first driving circuit 2041, the second driving circuit 2042, and the third driving circuit 2043 of the driving block 2014 supply the driving signals Va, Vb, and Vc ((g) of FIG. 38) which are respectively obtained by amplification of the distributed signals m1, m2, and m3, to the three-phase coils 2011A, 2011B, and 2011C.

In the thus configured embodiment, the three-phase distributed signals m1, m2, and m3 (or the driving signals Va, Vb, and Vc) which are produced by using the two-phase detection signals are not affected by variations in the sensitivities of the position detecting elements 2107*a* and 2107*b* of the position detector 2021, variations in the magnetic field of the field part 2010, and variations in the gain of the altering signal producing circuit 2022 (influences are very small), and are limited to amplitudes corresponding to the command signal.

When, in the command block, the output current signals which are proportional to the command signal and which contain higher harmonic signal components corresponding to a higher harmonic signal of the detection signals at a predetermined percentage are produced, and the distributed signals which vary responding with results of multiplications of the output currents by the altering signal (signals corresponding to the detection signals) are produced, the distributed signals m1, m2, and m3 (or the driving signals Va, Vb, and Vc) can be formed as three-phase sinusoidal signals analoguely varying in correspondence with the detection signals.

Therefore, distortions of the distributed signals and the driving signals are reduced to a very low level, with the result that a uniform torque is generated, so that the motor is smoothly driven. When the command current circuit produces two command current signals corresponding to the command signal, the multiplied command current circuit produces the multiplied command current signal which is obtained by multiplying one of the command current signals with a higher harmonic signal of the detection signals, and the command output circuit produces the output current signals which are obtained by composing the other command current signal and the multiplied command current signal together, variations in amplitude of the multiplied command current signal can be made small even when the detection signals (and a higher harmonic signal) vary in amplitude (in the multiplied command current circuit, the transistors 2414, 2415, and 2416 are nonlinearly differentially operated), and variations in the percentages of higher harmonic signal components contained in the output current signals d1 and d2 of the command block can be reduced. In other words, the motor is very resistant to variations in the sensitivities of the position detecting elements and variations in the magnetic field of the field part. When the motor is configured as the embodiment so as to obtain three-phase absolute signals corresponding to the detection signals and a higher harmonic signal corresponding to the minimum value of the three-phase absolute signals, a higher harmonic signal which is synchronized with the detection signals and which varies 6 times every one period can be accurately produced by a very simple configuration.

Embodiment 7

Hereinafter, a seventh embodiment of the invention will be described with reference to the accompanying drawings.

FIGS. 39 to 47 show a brushless motor of Embodiment 7. In the circuit block diagrams, a connection line to or from circuit block with oblique short bar crossing therewith represents plural connection lines or a connection line for aggregate signals. In the embodiment, the positional relationships between coils and attached positions of position detecting elements are shifted from each other by an electric angle of about 30 deg. and the detecting elements are positioned between the coils, thereby facilitating the production of the motor. Since the position detecting elements and the coils are arranged with separating their phase relationships from each other by about 30 deg. in electric angle, driving signals which are shifted by 30 deg. as seen from the detection signals of the position detecting elements are applied to the coils, respectively.

Figure 39:
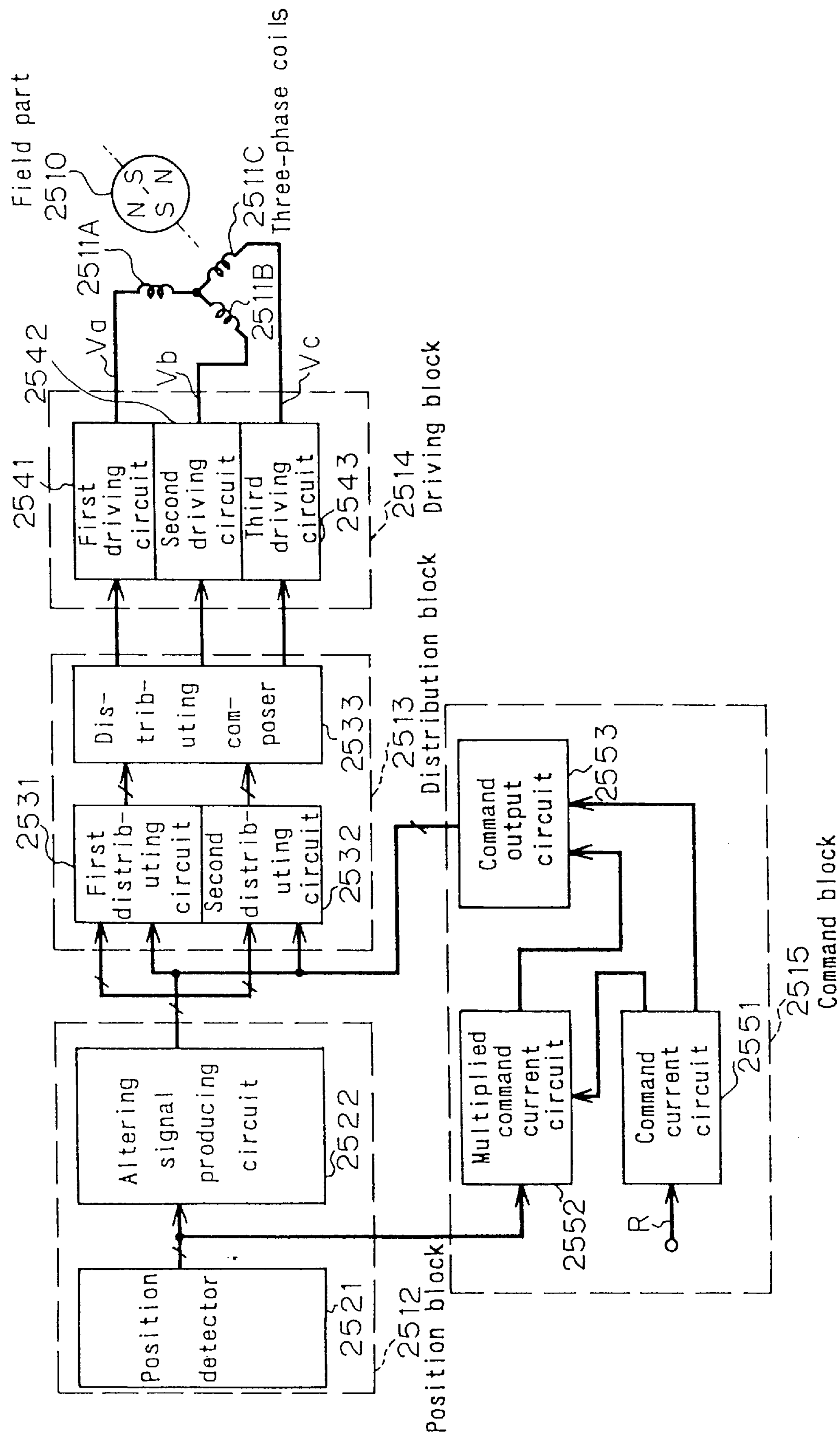
FIG. 39 is a block diagram of Embodiment 7 of the invention.

FIG. 39 is a block diagram showing the whole configuration of the motor. A field part 2510 shown in FIG. 39 is mounted on the rotor or a movable body and forms plural magnetic field poles by means of magnetic fluxes generated by poles of a permanent magnet, thereby generating field magnetic fluxes. Three-phase coils 2511A, 2511B, and 2511C are mounted on the stator or a stationary body and arranged so as to be electrically separated from each other by a predetermined angle (corresponding to 120 deg.) with respect to intercrossing with the magnetic fluxes generated by the field part 2510.

Figure 40:
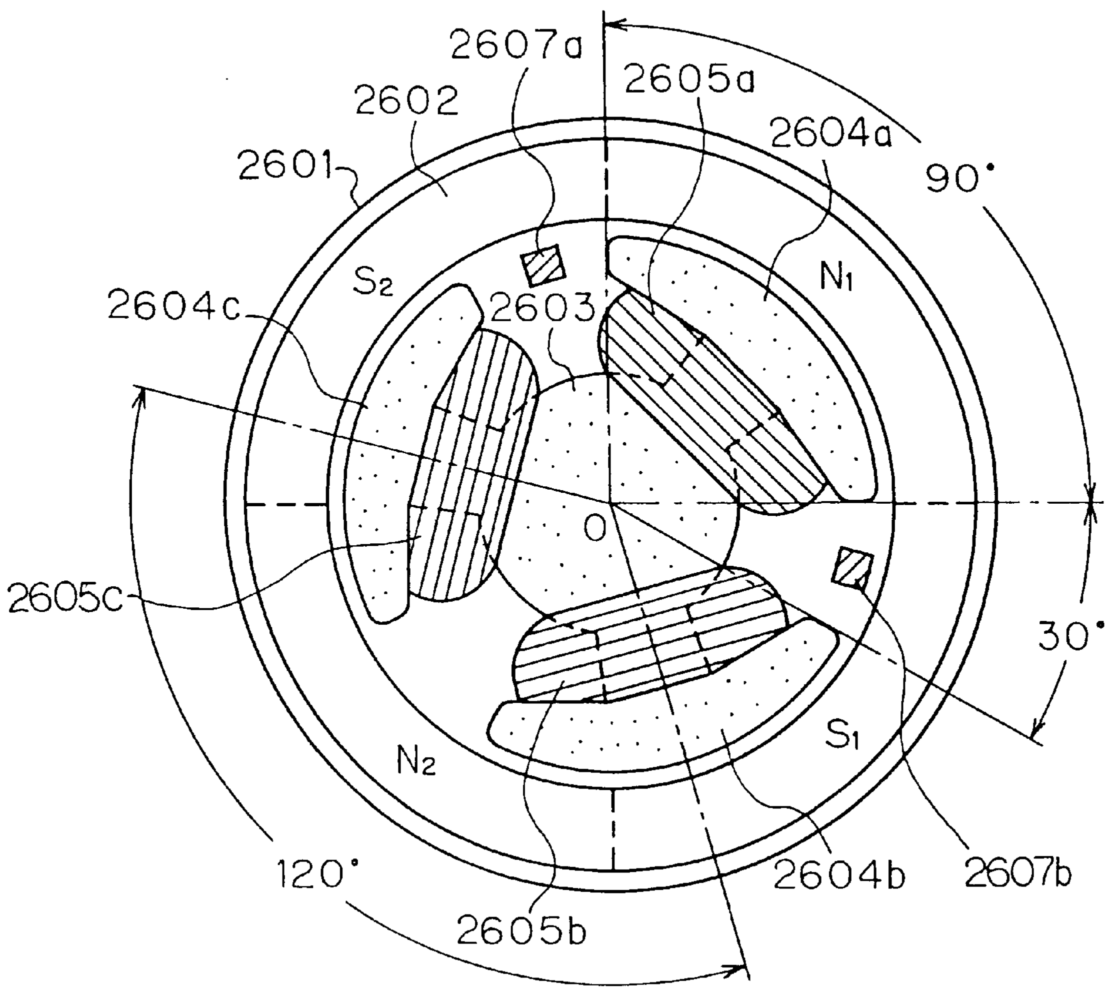
FIG. 40 is a diagram showing the structure of a motor of Embodiment 7.

FIG. 40 is a diagram specifically showing the configuration of the field part 2510 and the three-phase coils 2511A, 25.11B, and 2511C. In an annular permanent magnet 2602 attached to the inner side of the rotor 2601, the inner face is magnetized so as to form four poles, thereby constituting the field part 2510 shown in FIG. 39. An armature core 2603 is placed at a position of the stator which opposes the poles of the permanent magnet 2602. Three salient poles 2604*a*, 2604*b*, and 2604*c* are disposed in the armature core 2603 at intervals of 120 deg. Three-phase coils 2511A, 2511B, and 2511C are wound on the salient poles 2604*a*, 2604*b*, and 2604*c*, respectively. The coils 2604*a*, 2604*b*, and 2604*c* are disposed with electric phase differences of 120 deg. with respect to intercrossing magnetic fluxes from the permanent magnet 2602 (one set of N and S poles corresponds to an electric angle of 360 deg.). Two position detecting elements 2607*a* and 2607*b* (for example, Hall elements which are magnetoelectrical converting elements) are arranged on the stator and detect the poles of the permanent magnet 2602, thereby obtaining three-phase detection signals corresponding to relative positions of the field part and the coils. In the embodiment, the center of the coils and that of the position detecting elements are shifted in phase by an electric angle of 120 deg. According to this configuration, the position detecting elements can be disposed in winding slots of the armature core so as to detect the magnetic field of the inner face portion of the permanent magnet, whereby the motor structure can be miniaturized.

A command block 2515 shown in FIG. 39 comprises a command current circuit 2551, a multiplied command current circuit 2552, and a command output circuit 2553, and produces output current signals which contain higher harmonic signal components corresponding to higher harmonic components of the detection signals, at a predetermined percentage.

Figure 45:
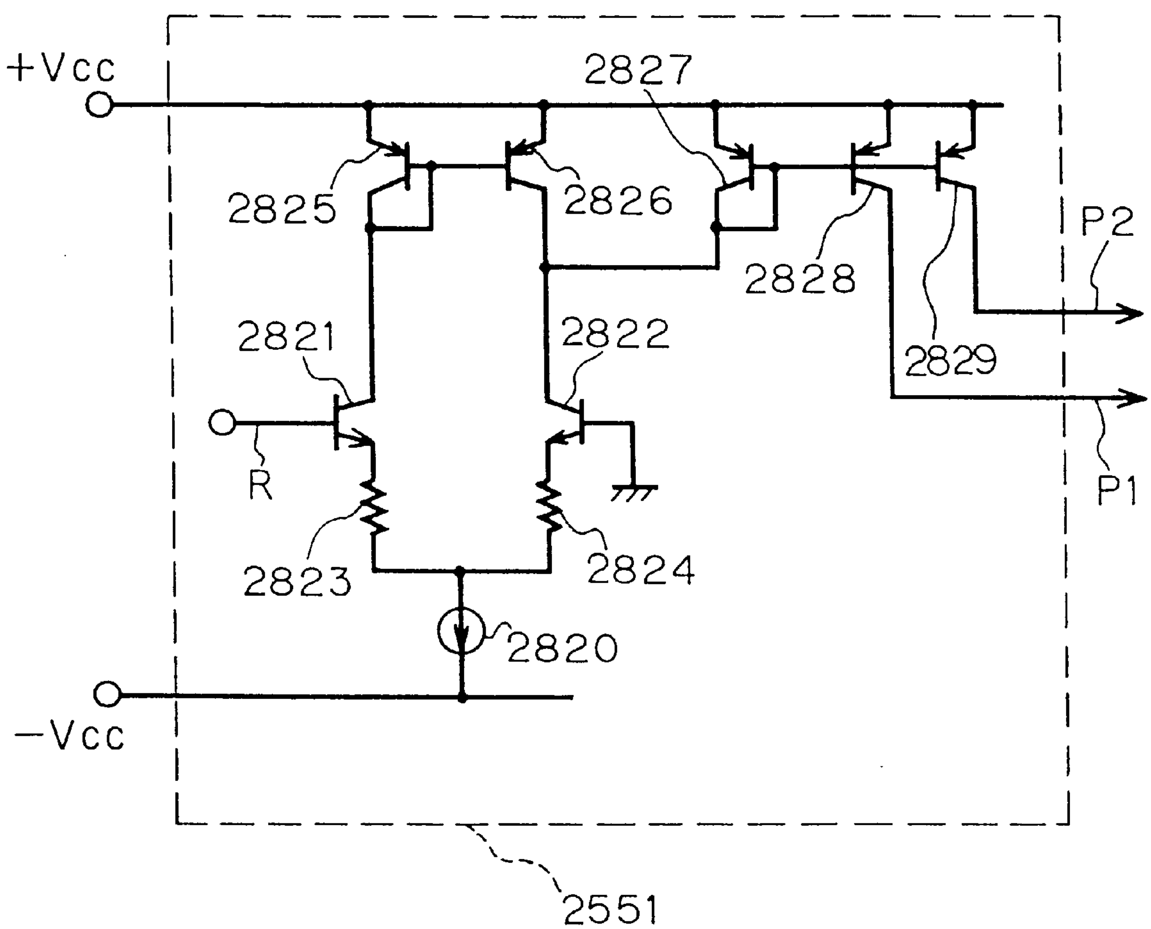
FIG. 45 is a specific circuit diagram of a command current circuit 2551 of Embodiment 7.

FIG. 45 is a circuit diagram specifically showing the configuration of the command current circuit 2551 of the command block 2515. In correspondence with a command signal R, transistors 2821 and 2822, and resistors 2823 and 2824 distribute the value of the current of a constant current source 2820 to the collectors of the transistors 2821 and 2822. The collector currents are compared with each other by a current mirror circuit consisting of transistors 2825 and 2826, and the difference current is output as command current signals P1 and P2 through a current mirror circuit consisting of transistors 2827, 2828, and 2829. Therefore, the command current circuit 2551 produces the two command current signals P1 and P2 (P1 and P2 are proportional to the command signal R) corresponding to the command signal R. The first command current signal P1 is supplied to the command output circuit 2553, and the second command current signal P2 to the multiplied command current circuit 2552.

Figure 46:
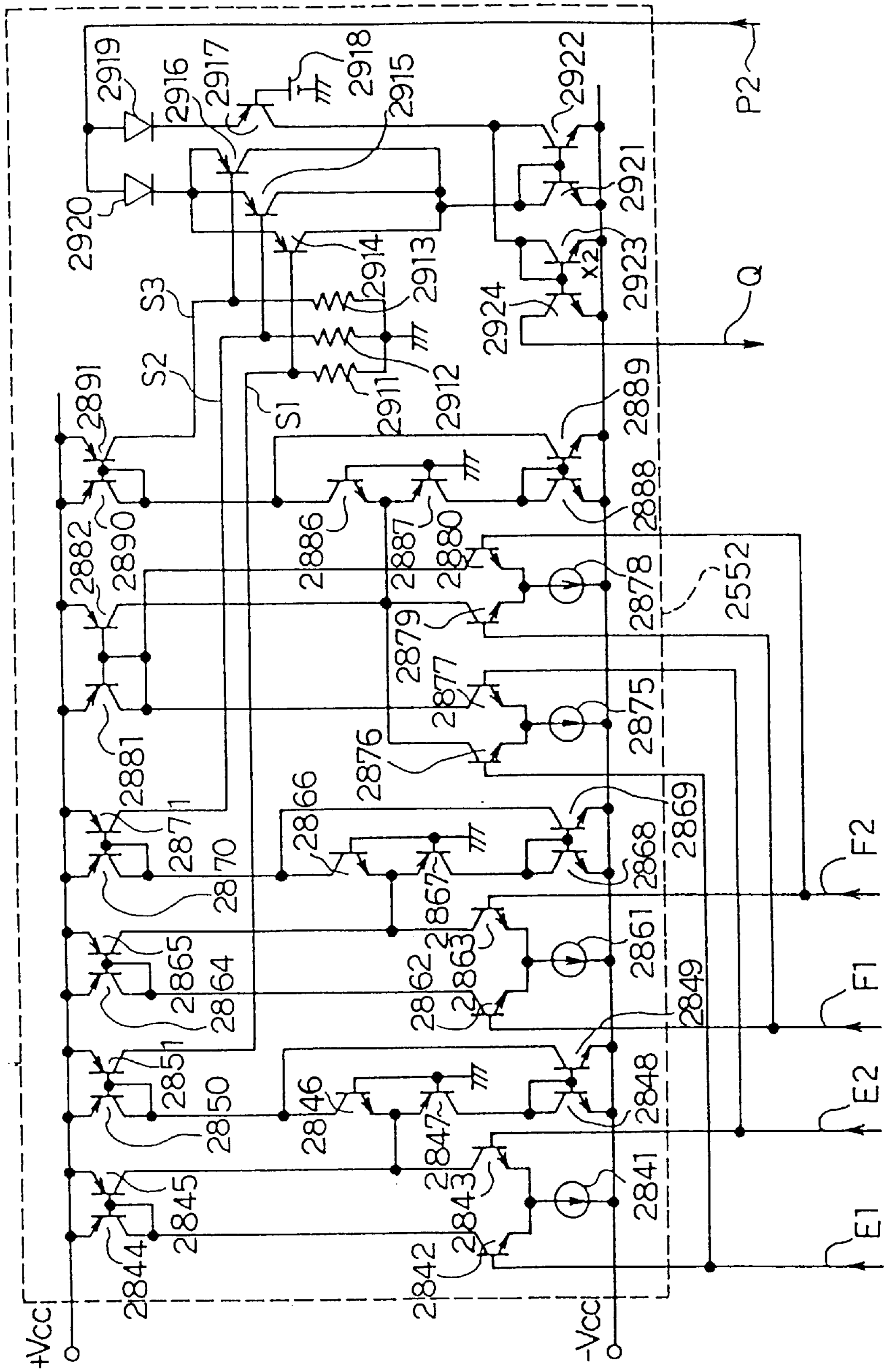
FIG. 46 is a specific circuit diagram of a multiplied command current circuit 2552 of Embodiment 7.

FIG. 46 specifically shows the configuration of the multiplied command current circuit 2552 of the command block 2515. In correspondence with detection signals E1 and E2 of the position detecting elements, transistors 2842 and 2843 distribute the value of the current of a constant current source 2841 to the collectors. The difference current is obtained by a combination of a current mirror circuit consisting of transistors 2844 and 2845, and a voltage signal S1 corresponding to the absolute value of the difference current is obtained by transistors 2846, 2847, 2848, 2849, 2850, and 2851, and a resistor 2911. In other words, the voltage signal S1 (absolute signal) corresponding to the absolute value of the detection signal E1–E2 is produced.

Similarly, in correspondence with detection signals F1 and F2 of the position detecting elements, transistors 2862 and 2863 distribute the value of the current of a constant current source 2861 to the collectors. The difference current is obtained by a combination of a current mirror circuit consisting of transistors 2864 and 2865, and a voltage signal S2 corresponding to the absolute value of the difference current is obtained by transistors 2866, 2867, 2868, 2869, 2870 and 2871, and a resistor 2912. In other words, the voltage signal S2 (absolute signal) corresponding to the absolute value of the detection signal F1–F2 is produced.

Furthermore, in correspondence with detection signals E1 and E2, transistors 2876 and 2877 distribute the value of the current of a constant current source 2875 to the collectors. In correspondence with detection signals F1 and F2, transistors 2879 and 2880 distribute the value of the current of a constant current source 2878 to the collectors. The collector currents of the transistors 2877 and 2880 are composed together and the composed current is output via a current mirror circuit consisting of transistors 2881 and 2882. The difference current of the composed value of the collector currents of the transistors 2876 and 2879 and the output current of the transistor 2882 is obtained, and a voltage signal S3 corresponding to the absolute value of the difference current is obtained by a combination of transistors 2886, 2887, 2888, 2889, 2890, and 2891, and a resistor 2913.

In other words, the voltage signal S3 (absolute signal) corresponding to the absolute value of the composed signal which is obtained by composing the two-phase detection signals E1–E2 and F1–F2 together is produced. Therefore, the voltage signals S1, S2, and S3 are three-phase absolute signals corresponding to the two-phase detection signals, and synchronized with the three-phase altering signals. The current sources 2841, 2861, 2875, and 2878 are set to a predetermined currnet value.

Transistors 2914, 2915, 2916, and 2917, and diodes 2919 and 2920 compare the three-phase absolute signals S1, S2, and S3 with a predetermined voltage value (including 0 V) of a constant voltage source 2918. In correspondence with the difference voltages, the command current signal P2 of the command current circuit 2551 is distributed to the collectors.

The collector currents of the transistors 2914, 2915, and 2916 are composed together. A current mirror circuit consisting of transistors 2921 and 2922 compares the composed current with the collector current of the transistor 2917. The difference current is multiplied by ½ by a current mirror circuit consisting of transistors 2923 and 2924 and then output as a multiplied command current signal Q (inflow current). The multiplied command current signal Q varies responding with results of multiplications of the voltage signals S1, S2, and S3 corresponding to the detection signals by the command current signal P2 corresponding to the command signal.

Particularly, because of the configuration of the transistors 2914, 2915, 2916, and 2917, and the diodes 2919 and 2920, the multiplied command current signal Q varies responding with a result of a multiplication of the minimum value of the three-phase absolute signals S1, S2, and S3 by the command current signal P2. The minimum value of the three-phase absolute signals S1, S2, and S3 corresponding to the two-phase detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals.

Figure 47:
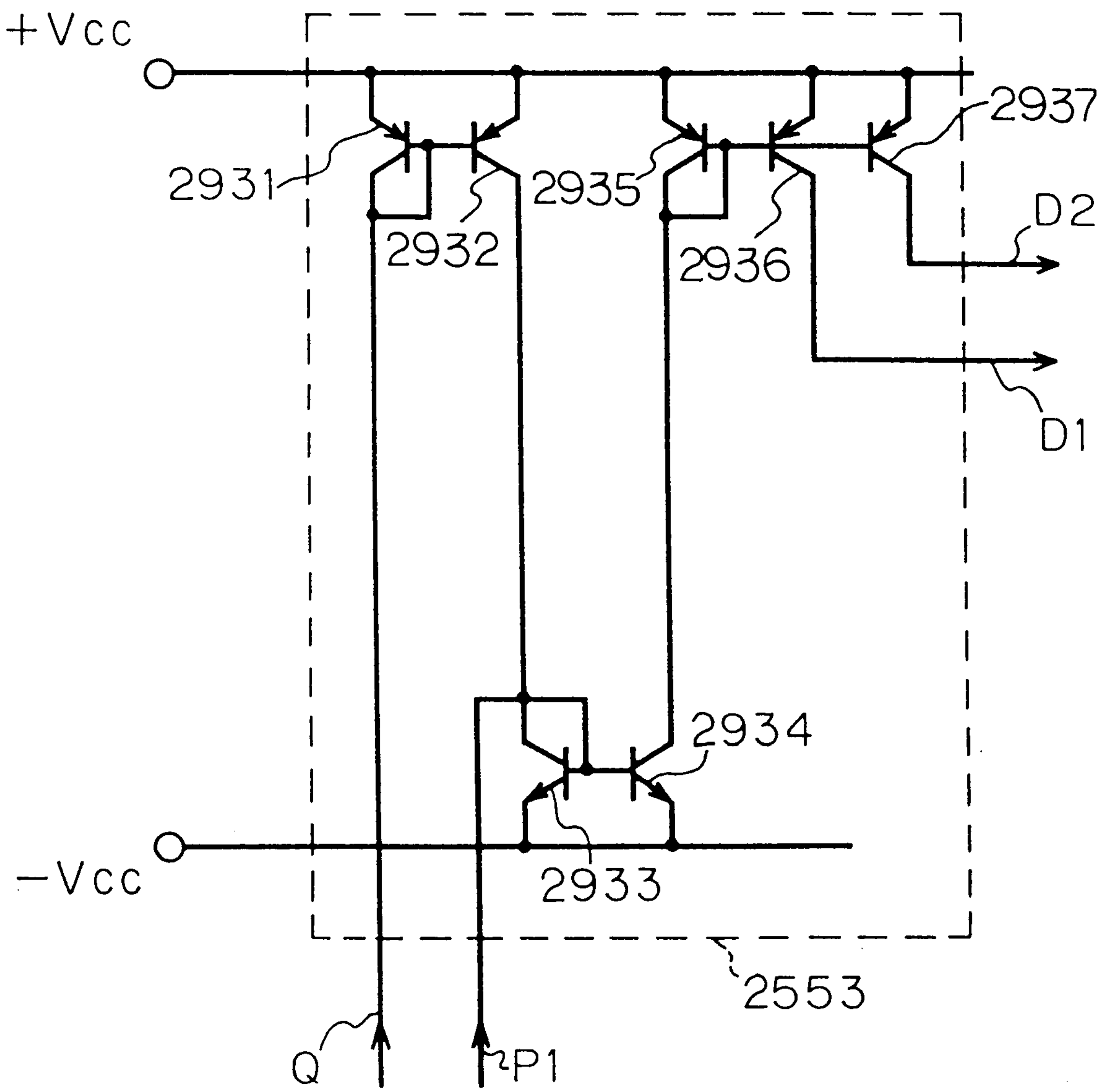
FIG. 47 is a specific circuit diagram of a command output circuit 2553 of Embodiment 7.

FIG. 47 is a circuit diagram specifically showing the configuration of the command output circuit 2553 of the command block 2015. The multiplied command current signal Q of the multiplied command output circuit 2552 (FIG. 39) is input to a current mirror circuit consisting of transistors 2931 and 2932 and inverted in current direction. Thereafter, the resulting signal and the first command current signal P1 of the command current circuit 2551 are composed together by addition. The resulting composed command current signal is output as two output current signals D1 and D2 via a current mirror circuit consisting of transistors 2933 and 2934, and that consisting of transistors 2935, 2936, and 2937. As a result, the first and second output current signals D1 and D2 of the command block 2515 become current signals which vary responding with the command signal and which contain higher harmonic signal components at a predetermined percentage. The first output current signal D1 is supplied to a first distributing circuit 2531 of a distribution block 2513, and the second output current signal D2 to a second distributing circuit 2532.

A position block 2512 shown in FIG. 39 comprises a position detector 2521 and an altering signal producing circuit 2522, produces three-phase altering signals from two-phase detection signals of the position detecting elements constituting the position detector 2521, and supplies the altering signals to the first and second distributing circuits 2531 and 2532 of the distribution block 2513.

Figure 41:
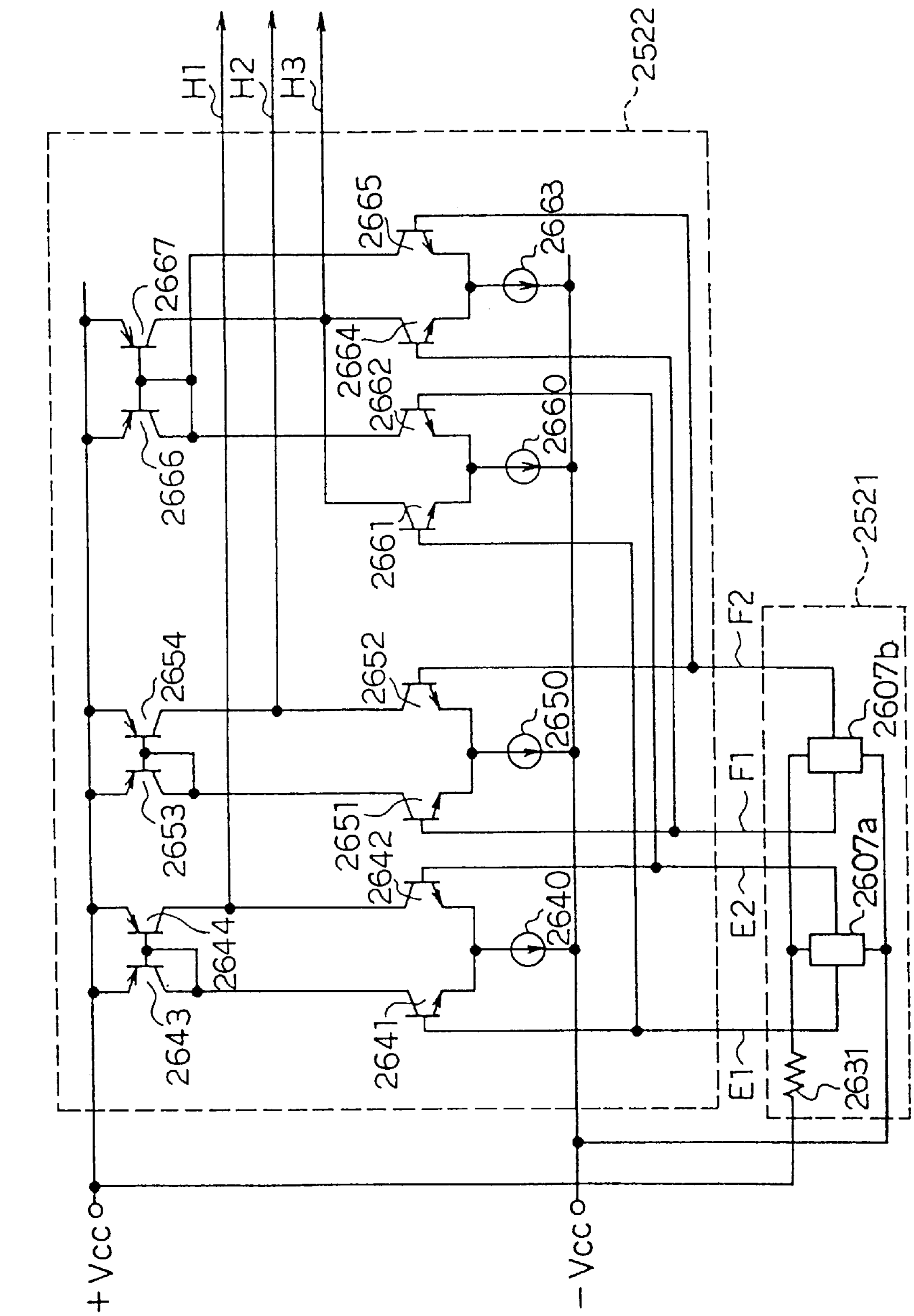
FIG. 41 is a specific circuit diagram of a position detector 2521 and an altering signal producing circuit 2522 of Embodiment 7.

FIG. 41 is a circuit diagram specifically showing the configuration of the position detector 2521 and the altering signal producing circuit 2522. The two position detecting elements 2607*a* and 2607*b* constituting the position detector 2521 are connected in parallel. The voltage is supplied to the elements via a resistor 2631. Differential detection signals E1 and E2 corresponding to the magnetic field detected from the field part 2510 (corresponding to the permanent magnet 2602 of FIG. 40) are output from output terminals of the position detecting element 2607*a* (E1 and E2 vary in reversed phase relationships), and then supplied to the bases of differential transistors 2641 and 2642 of the altering signal producing circuit 2522 and the bases of differential transistors 2661 and 2662, respectively.

Differential detection signals F1 and F2 corresponding to the detected magnetic field are output from output terminals of the position detecting element 2607*b*, and then supplied to the bases of differential transistors 2651 and 2652 of the altering signal producing circuit 2522 and those of differential transistors 2664 and 2665, respectively. The two position detecting elements 2607*a* and 2607*b* output the two-phase detection signals E1 and F1 (and E2 and F2) which are electrically separated in phase from each other by 120 deg. As the rotational movement of the field part 2510 proceeds, the two-phase detection signals E1 and F1 vary analoguely and sinusoidally or substantially sinusoidally. The detection signals E1 and E2, or F1 and F2 are in reversed phase relationships. In the operation of the motor, therefore, there exist two phases which are substantially independent from each other.

Constant current sources 2640, 2650, 2660, and 2663 of the altering signal producing circuit 2522 supply a current of the same constant value. In correspondence with the detection signals E1 and E2, the differential transistors 2641 and 2642 distribute the value of the current of the constant current source 2640 to the collectors. The collector currents of the transistors 2641 and 2642 are compared with each other by a current mirror circuit consisting of transistors 2643 and 2644, and the difference current is output as an altering signal H1.

Similarly, in correspondence with the detection signals F1 and F2, the differential transistors 2651 and 2652 distribute the value of the current of the constant current source 2650 to the collectors. The collector currents of the transistors 2651 and 2652 are compared with each other by a current mirror circuit consisting of transistors 2653 and 2654, and the difference current is output as an altering signal H2.

In correspondence with the detection signals E1 and E2, the differential transistors 2661 and 2662 distribute the value of the current of the constant current source 2660 to the collectors, and, in correspondence with the detection signals F1 and F2, the differential transistors 2664 and 2665 distribute the value of the current of the constant current source 2663 to the collectors. The collector currents of the transistors 2662 and 2665 are composed together, and the composed current is output via a current mirror circuit consisting of transistors 2666 and 2667. The composed current of the collector currents of the transistors 2661 and 2664 is compared with the output current of the transistor 2667, and the difference current is output as an altering signal H3. The current sources 2640, 2650, 2660, and 2663 are set to a predetermined currnet value.

The altering signals H1, H2, and H3 are three-phase current signals (altering current signals) which analoguely vary responding with the two-phase detection signals, and supplied to the first and second distributing circuits 2531 and 2532 of FIG. 39.

The first distributing circuit 2531 of the distribution block 2513 of FIG. 39 obtains three-phase first distributed current signals to which the first output current signal D1 is distributed in correspondence with the altering signals H1, H2, and H3 of the altering signal producing circuit 2522. The second distributing circuit 2532 obtains three-phase second distributed current signals to which the second output current signal D2 is distributed in correspondence with the altering signals H1, H2, and H3 of the altering signal producing circuit 2522. A distributing composer 2533 composes the first and second distributed current signals together into three-phase distributed signals, and supplies the distributed signals to a driving block 2514.

Figure 42:
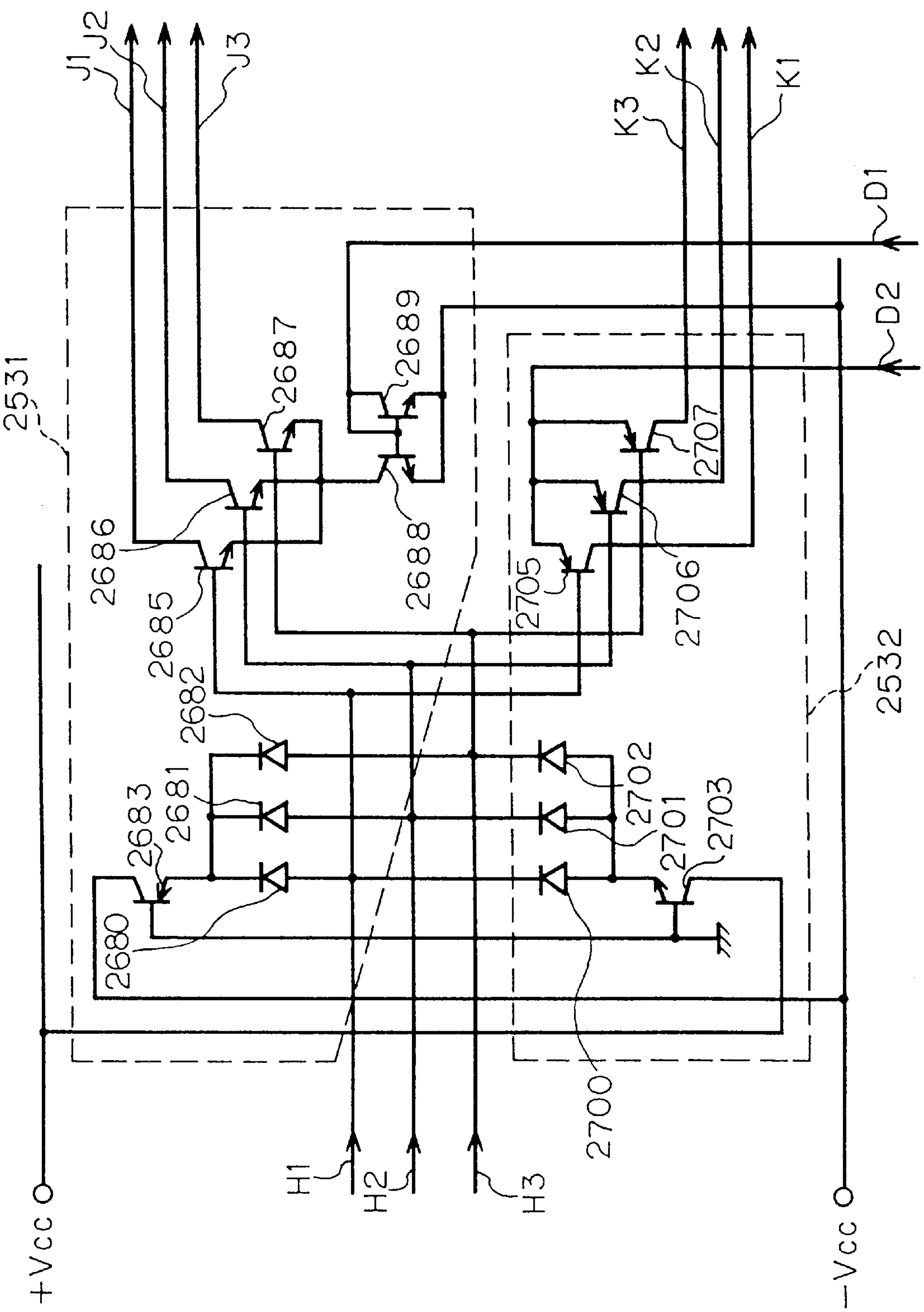
FIG. 42 is a specific circuit diagram of a first distributing circuit 2531 and a second distributing circuit 2532 of Embodiment 7.

FIG. 42 specifically shows the configuration of the first and second distributing circuits 2531 and 2532 of the distribution block 2513. The inflow currents of the altering signals H1, H2, and H3 flow into first diodes 2680, 2681, and 2682 of the first distributing circuit 2531, so that voltage signals corresponding to the inflow current values of the signals H1, H2, and H3 are generated at the terminals of the diodes 2680 to 2682. In the first diodes 2680, 2681, and 2682, the ends of one side are connected to each other and the other ends (the current inflow side) are connected to the bases of first distributing transistors 2685, 2686, and 2687, respectively. A transistor 2683 supplies a bias of a predetermined voltage to the first diodes. The first output current signal D1 of the command block 2515 is supplied via a current mirror circuit consisting of transistors 2688 and 2689, to the emitters of the first distributing transistors 2685, 2686, and 2687 which are connected to each other. In correspondence with the values of the altering signals H1, H2, and H3 which flow into the first diodes 2680, 2681, and 2682, therefore, the first distributing transistors 2685, 2686, and 2687 distribute the first output current signal D1 so as to generate three-phase first distributed current signals J1, J2, and J3 (inflow currents) which analoguely vary.

The first distributed current signal J1 of the first distributing circuit 2531 varies responding with a result H1P·D1 of a multiplication of the inflow current value H1P of the altering signal H1 (the inflow current to the first diode 2680) by the first output current signal D1 (the current value) of the command block 2515.

The first distributed current signal J2 varies responding with a result H2P·D1 of a multiplication of the inflow current value H2P of the altering signal H2 by the first output current signal D1, and the first distributed current signal J3 varies responding with a result H3P·D1 of a multiplication of the inflow current value H3P of the altering signal H3 by the first output current signal D1 (the value of the composed current J1+J2+J3 of the first distributed current signals is equal to the first output current signal D1).

The outflow currents of the altering signals H1, H2, and H3 flow into second diodes 2700, 2701, and 2702 of the second distributing circuit 2532, so that voltage signals corresponding to the current values of the signals H1, H2, and H3 are generated at the terminals of the second diodes 2700, 2701, and 2702. In the second diodes 2700, 2701, and 2702, the ends of one side are connected to each other and the other side ends (the current outflow side) are connected to the bases of second distributing transistors 2705, 2706, and 2707, respectively. A transistor 2703 supplies a bias of a predetermined voltage to the second diodes. The second output current signal D2 of the command block 2515 is supplied to the emitters of the second distributing transistors 2705, 2706, and 2707 which are connected to each other. In correspondence with the values of the currents of the altering signals H1, H2, and H3 which flow out into the second diodes 2700, 2701, and 2702, therefore, the second distributing transistors 2705, 2706, and 2707 distribute the second output current signal D2 so as to generate three-phase second distributed current signals K1, K2, and K3 (outflow currents) which analoguely vary.

The second distributed current signal K1 of the second distributing circuit 2532 varies responding with a result H1N·D2 of a multiplication of the outflow current value H1N of the altering signal H1 (the outflow current from the second diode 2700) by the second output current signal D2 (the current value) of the command block 2515.

The second distributed current signal K2 varies responding with a result H2N·D2 of a multiplication of the outflow current value H2N of the altering signal H2 by the second output current signal D2.

The second distributed current signal K3 varies responding with a result H3N·d2 of a multiplication of the outflow current value H3N of the altering signal H3 by the second output current signal D2 (the value of the composed current K1+K2+K3 of the second distributed current signals is equal to the second output current signal D2).

Figure 43:
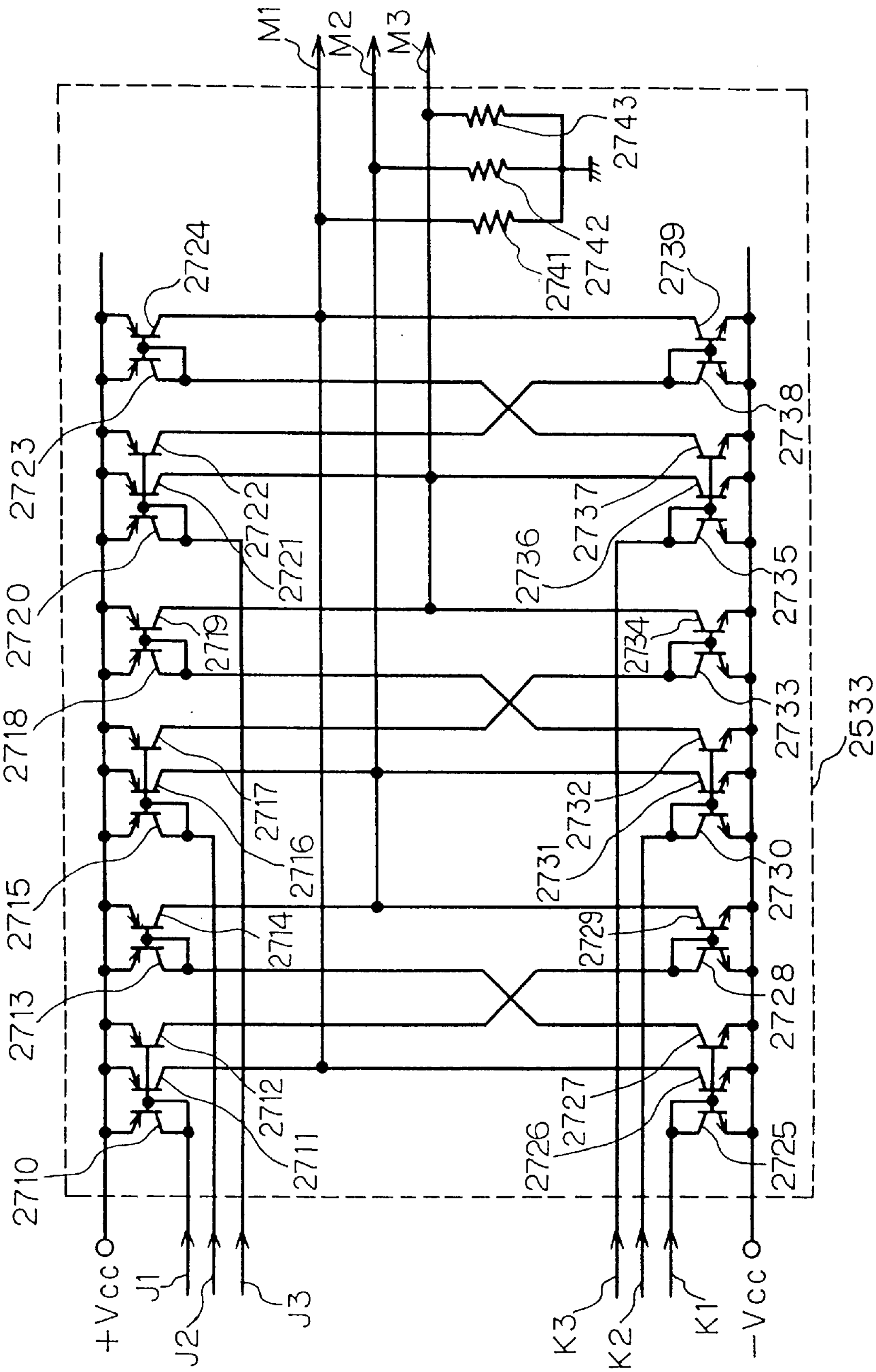
FIG. 43 is a specific circuit diagram of a distributing composer 2533 of Embodiment 7.

FIG. 43 is a circuit diagram specifically showing the configuration of the distributing composer 2533 of the distribution block 2513. The currents of the first distributed current signals J1, J2, and J3 are inverted by a current mirror circuit consisting of transistors 2710, 2711, and 2712, that consisting of transistors 2715, 2716, and 2717, and that consisting of transistors 2720, 2721, and 2722, respectively.

The currents of the second distributed current signals K1, K2, and K3 are inverted by a current mirror circuit consisting of transistors 2725, 2726, and 2727, that consisting of transistors 2730, 2731, and 2732, and that consisting of transistors 2735, 2736, and 2737, respectively.

For each phase, the output terminals of one side of the current mirror circuits are connected to each other so as to produce a difference current for the phase. The other output currents of these current mirror circuits are inverted by a current mirror circuit consisting of transistors 2713 and 2714, that consisting of transistors 2718 and 2719, that consisting of transistors 2723 and 2724, that consisting of transistors 2728 and 2729, that consisting of transistors 2733 and 2734, and that consisting of transistors 2738 and 2739, respectively. For each phase, the output terminals of the current mirror circuits are connected to each other so as to produce a difference current for the phase.

A difference current (J1−K1) of the currents J1 and K1, and a difference current (J3−K3) of the currents J3 and K3 are composed together by addition so as to produce a composed distributed current signal. The composed distributed current signal is supplied to a resistor 2741, so that a distributed signal M1 appears at the terminal of the resistor 2741.

Similarly, a difference current (J2−K2) of the currents J2 and K2, and the difference current (J1−K1) of the currents J1 and K1 are composed together by addition so as to produce a composed distributed current signal. The composed distributed current signal is supplied to a resistor 2742, so that a distributed signal M2 appears at the terminal of the resistor 2742.

Furthermore, the difference current (J3−K3) of the currents J3 and K3, and the difference current (J2−K2) of the currents J2 and K2 are composed together by addition so as to produce a composed distributed current signal. The composed distributed current signal is supplied to a resistor 2743, so that a distributed signal M3 appears at the terminal of the resistor 2743.

In this way, the distributed signals M1, M2, and M3 appear as three-phase voltage signals corresponding to the altering signals and have a predetermined amplitude which depends on the current values of the output current signals D1 and D2 of the command block 2515 (the signals are not affected by the amplitudes of the altering signals).

The driving block 2514 of FIG. 39 comprises a first driving circuit 2541, a second driving circuit 2542, and a third driving circuit 2543, and supplies driving signals Va, Vb, and Vc, which are obtained by amplifying the distributed signals M1, M2, and M3 of the distribution block 2513, to the terminals of the three-phase coils 2511A, 2511B, and 2511C.

Figure 44:
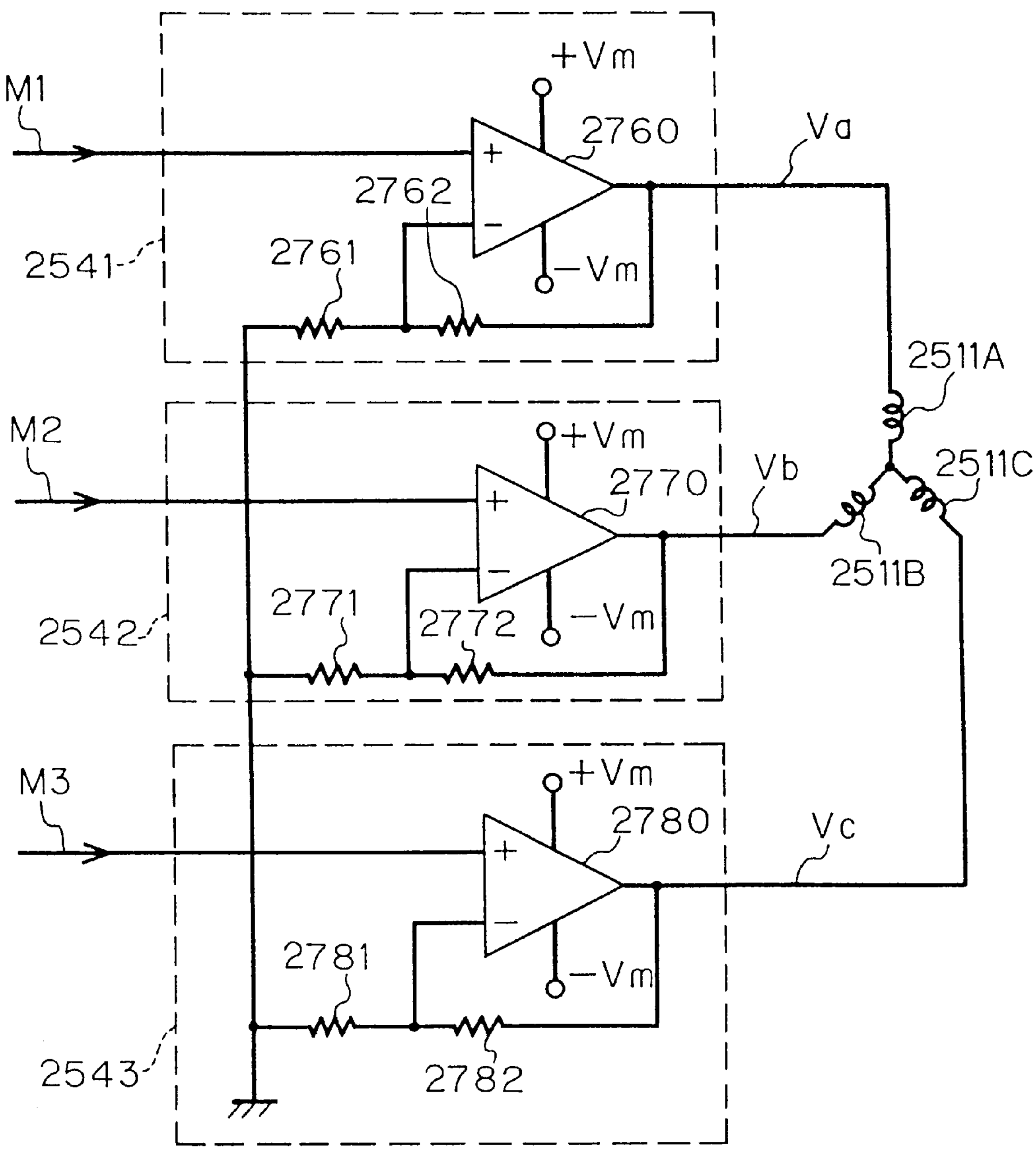
FIG. 44 is a specific circuit diagram of a first driving circuit 2541; a second driving circuit 2542, and a third driving circuit 2543 of Embodiment 7.

FIG. 44 is a circuit diagram specifically showing the configuration of the first driving circuit 2541, the second driving circuit 2542, and the third driving circuit 2543 of the driving block 2514. The distributed signal M1 is input to the noninverting terminal of an amplifier 2760 of the first driving circuit 2541 and then amplified at an amplification factor defined by resistors 2761 and 2762, thereby producing the driving signal Va. The driving signal is supplied to the power input terminal of the coil 2511A.

Similarly, the distributed signal M2 is input to the noninverting terminal of an amplifier 2770 of the second driving circuit 2542 and then amplified at an amplification factor defined by resistors 2771 and 2772, thereby producing the driving signal Vb. The driving signal is supplied to the power input terminal of the coil 2511B.

Furthermore, the distributed signal M3 is input to the noninverting terminal of an amplifier 2780 of the third driving circuit 2543 and then amplified at an amplification factor defined by resistors 2781 and 2782, thereby producing the driving signal Vc. The driving signal is supplied to the power input terminal of the coil 2511C.

The amplifiers 2760, 2770, and 2780 are supplied with power source voltages +Vm (=15 V) and −Vm (=−15 V).

As a result of the supply of the driving signals Va, Vb, and Vc, three-phase driving currents are supplied to the three-phase coils 2511A, 2511B, and 2511C, so that a driving force is generated in a predetermined direction by electromagnetic interaction between the coils and the field part 2510.

Figure 48:
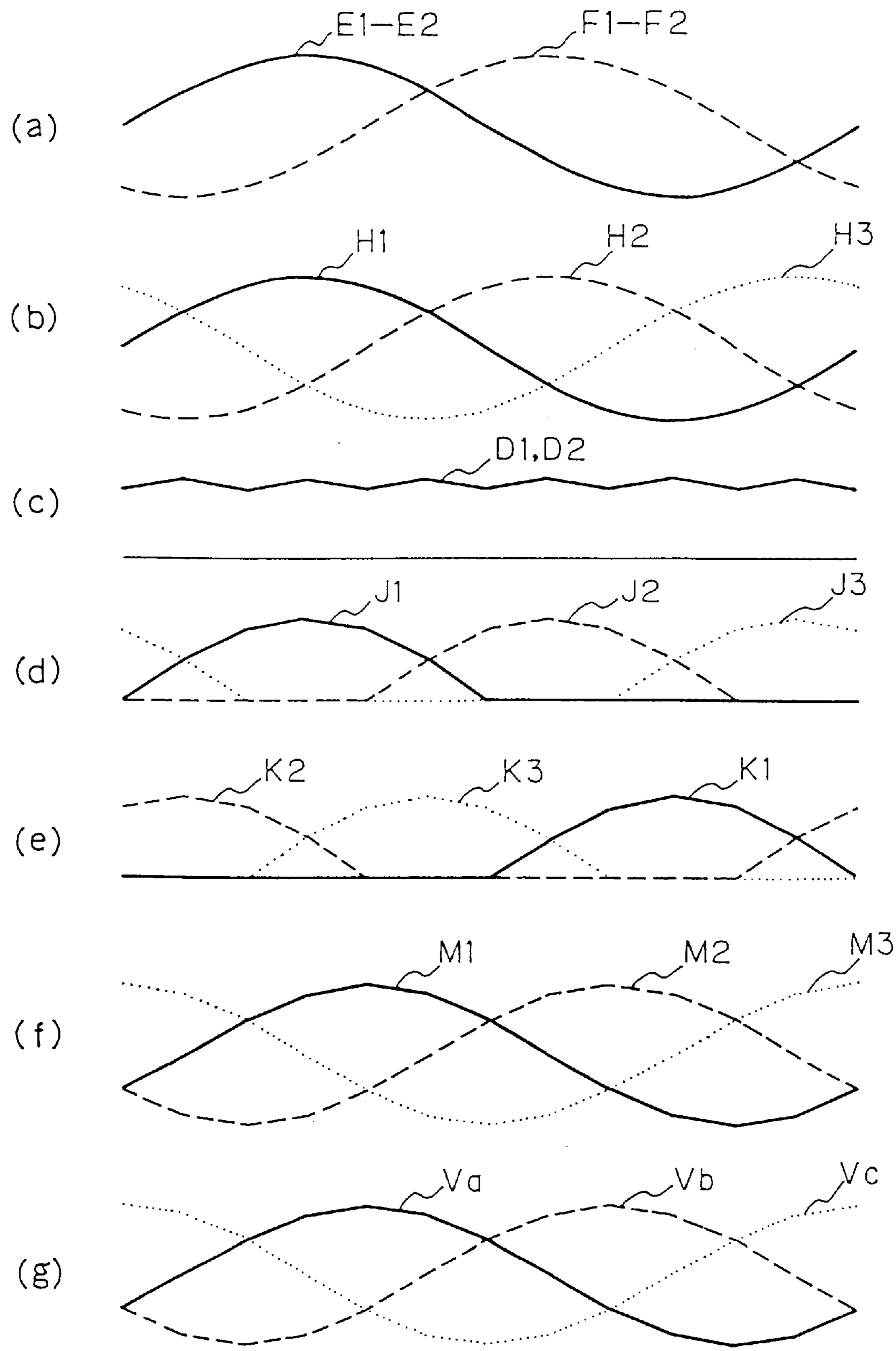
FIG. 48 is a chart showing the waveforms of signals of Embodiment 7.

FIG. 48 is a graph showing the waveforms of the signals of the embodiment. The horizontal axis of the graph indicates the rotation position. As the rotational movement (or a relative movement with respect to the three-phase coils) of the field part 2510 proceeds, the position detecting elements 2607*a* and 2607*b* which detect the magnetic field of the field part 2510 produce two-phase detection signals E1–E2 and F1–F2 which analoguely vary (see (a) of FIG. 48).

The altering signal producing circuit 2522 produces the three-phase altering signals H1, H2, and H3 (outflow/inflow currents, (b) of FIG. 48) which analoguely vary responding with the two-phase detection signals.

In the first distributing circuit 2531, the first output current signal D1 ((c) of FIG. 48) of the command block 2515 is distributed by the first distributing transistors 2685, 2686, and 2687 in correspondence with the values of the positive sides of the altering signals H1, H2, and H3 (the values of the currents flowing into the first diodes 2680, 2681, and 2682), thereby obtaining the three-phase first distributed current signals J1, J2, and J3 ((d) of FIG. 48).

The first distributed current signals J1, J2, and J3 are current signals which, in correspondence with the results H1P·D1, H2P·D1, and H3P·D1 of multiplications of signals H1P, H2P, and H3P of the positive sides of the altering signals H1, H2, and H3 by the first output current signal D1, are distributed in such a manner that a sum of the results H1P·D1+H2P·D1+H3P·D1 is equal to the first output current signal D1.

Similarly, in the second distributing circuit 2532, the second output current signal D2 of the command block 2515 is distributed by the second distributing transistors 2705, 2706, and 2707 in correspondence with the values of the negative sides of the altering signals H1, H2, and H3 (the values of the currents flowing out from the second diodes 2700, 2701, and 2702), thereby obtaining the three-phase second distributed current signals K1, K2, and K3 ((e) of FIG. 48).

The second distributed current signals K1, K2, and K3 are current signals which, in correspondence with the results H1N·D2, H2N·D2, and H3N·D2 of multiplications of signals H1N, H2N, and H3N of the negative sides of the altering signals H1, H2, and H3 by the second output current signal D2, are distributed in such a manner that a sum of the results H1N·D2+H2N·D2+H3N·D2 is equal to the second output current signal D2. The distributing composer 2533 composes the first distributed current signals J1, J2, and J3 and the second distributed current signals K1, K2, and K3 together, thereby obtaining the three-phase distributed signals M1, M2, and M3 ((f) of FIG. 48).

The distributed signals M1, M2, and M3 are produced by composing together two phases of difference currents J1–K1, J2–K2, and J3–K3 between the first and second distributed current signals for each phase, respectively. Specifically, the distributed signal M1 is produced by composing (J1–K1) and (K3–J3) together, the distributed signal M2 by composing (J2–K2) and (K1–J1) together, and the distributed signal M3 by composing (J3–K3) and (K2–J2) together. The first driving circuit 2541, the second driving circuit 2542, and the third driving circuit 2543 of the driving block 2514 supply the driving signals Va, Vb, and Vc ((g) of FIG. 48), which are respectively obtained by amplifying the distributed signals M1, M2, and M3, to the three-phase coils 2511A, 2511B, and 2511C.

In the thus configured embodiment, three-phase altering signals can be produced by using the two-phase detection signals. Even when the three-phase altering signals H1, H2, and h3 corresponding to the detection signals are large or small in amplitude, the first and second distributed signals of the first and second distributing circuits 2531 and 2532 are surely limited to amplitudes corresponding to the first and second output current signal D1 and D2 of the command block 2515. Therefore, the distributed signals M1, M2, and M3 (or the driving signals Va, Vb, and Vc) are not affected by the amplitudes of the detection signals and the altering signals. In other words, variations in the sensitivities of the position detecting elements 2607*a* and 2607*b* of the position detector 2521, variations in the magnetic field of the field part 2510, and variations in the gain of the altering signal producing circuit 2522 exert very small influences on the amplitudes. The amplitudes are substantially free from influences due to such variations. In the brushless motor of the embodiment, therefore, the number of components of the position detecting elements is so small that the motor is simplified in configuration. When a speed control or a torque control of the brushless motor of the embodiment is made, variations in speed control gains or torque control gains among motors are eliminated and hence the control properties of motors of mass production are extremely stabilized (a phenomenon of control instability due to variations in the gains of motors does not occur). In other words, since the first and second distributing circuits conduct nonlinear multiplication distribution, even when the detection signals and the altering signals are distorted or varied, the driving signals are substantially free from influences due to such distortion or variation.

In the thus configured embodiment, furthermore, the distributed signals M1, M2, and M3 (or the driving signals Va, Vb, and Vc) vary analoguely sinusoidally in correspondence with the two-phase detection signals. Therefore, it is possible to obtain the distributed signals and the driving signals of a reduced distortion level, with the result that a uniform torque is generated, so that the motor is smoothly driven.

In the thus configured embodiment, furthermore, the position detecting elements can be reduced in number and arranged in a somewhat free manner. Consequently, the position detecting elements can be disposed between the salient poles of the armature core and the number of wirings can be reduced, with the result that the motor structure can be miniaturized.

Embodiment 8

Hereinafter, an eighth embodiment of the invention will be described with reference to the accompanying drawings.

FIGS. 49 to 52 are views relating to a brushless motor of Embodiment 8. In the circuit block diagrams, a connection line to or from circuit block with oblique short bar crossing therewith represents plural connection lines or a connection line for aggregate signals. In the embodiment, the positional relationships between coils and attached positions of position detecting elements are shifted from each other by an electric angle of 30 deg. and the detecting elements are positioned between the coils, thereby facilitating the production of the motor.

Figure 49:
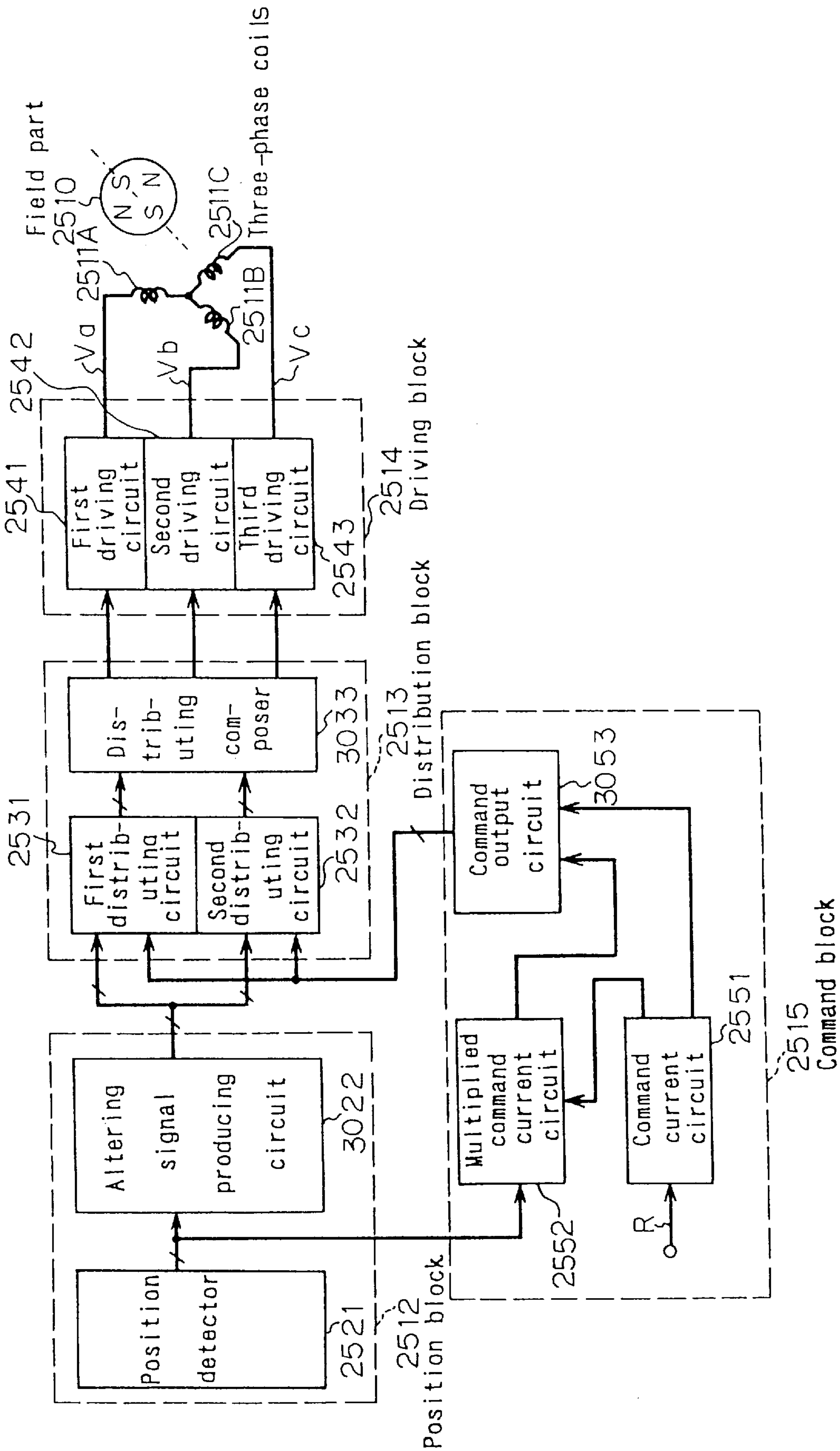
FIG. 49 is a block diagram of Embodiment 8 of the invention.

FIG. 49 is a block diagram showing the whole configuration of the motor. In the embodiment, altering signals which are shifted by about 30 deg. in electric angle from the detection signals of the position detecting elements are produced by an altering signal producing circuit 3022, and a distributing composer 3033 of a distribution block 2513 does not conduct the phase shifting operation. A command output circuit 3053 of a command block 2515 is configured so as to compose command current signals and a multiplied command current signal together by subtraction. The components which are identical with those of Embodiment 7 described above are designated by the same reference numerals.

Figure 50:
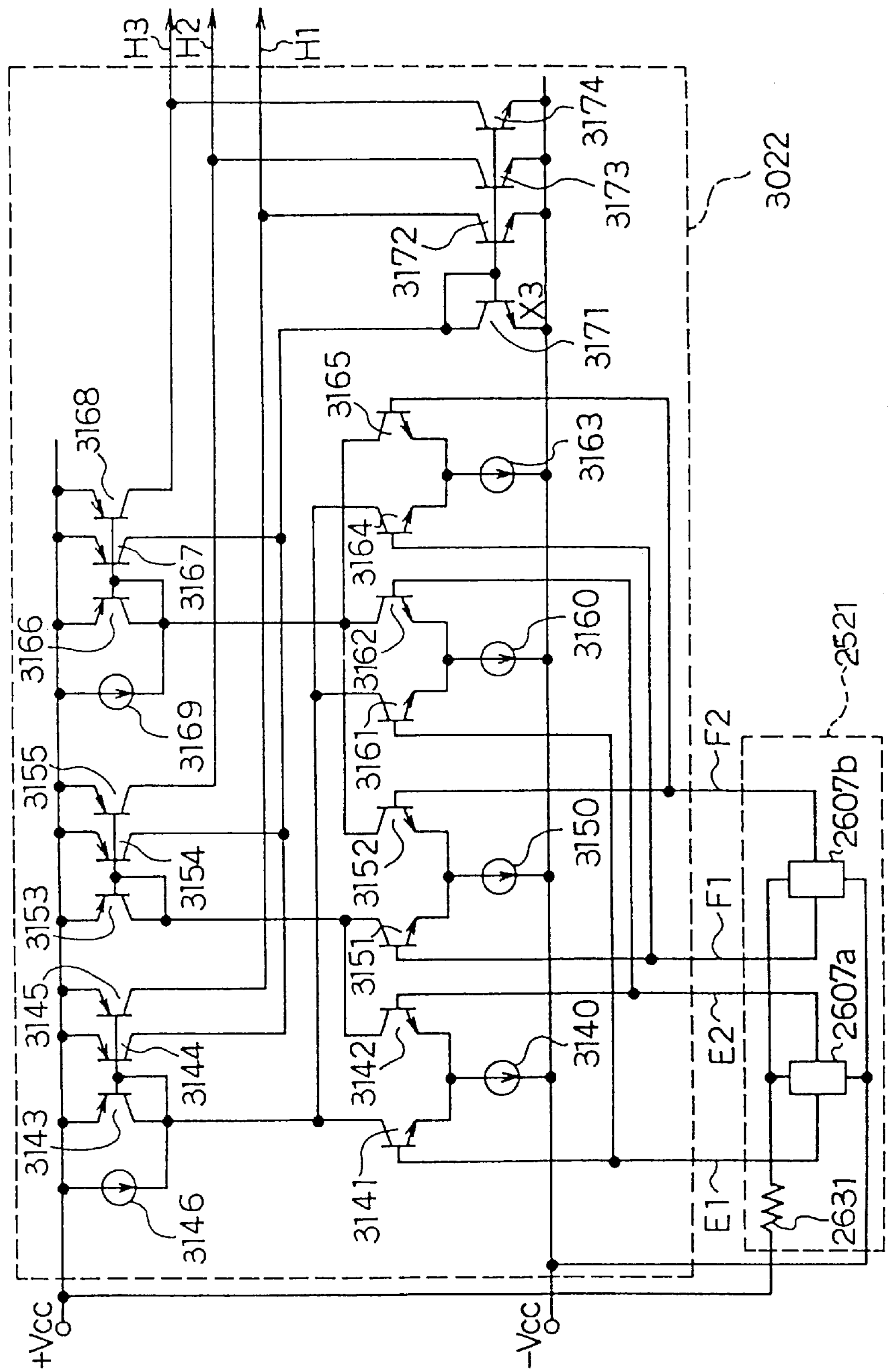
FIG. 50 is a specific circuit diagram of a position detector 2521 and an altering signal producing circuit 3022 of Embodiment 8.

FIG. 50 is a circuit diagram specifically showing the configuration of the position detector 2521 and the altering signal producing circuit 3022 of the position block 2512. The position detecting elements 2607*a* and 2607*b* of the position detector 2521 are connected in parallel. The voltage is supplied to the elements via a resistor 2631. Differential detection signals E1 and E2 corresponding to the detected magnetic field of the field part 2510 (corresponding to the permanent magnet 2602 of FIG. 40) are output from output terminals of the position detecting element 2607*a* (E1 and E2 vary in reversed phase relationships), and then supplied to the bases of differential transistors 3141 and 3142 of the altering signal producing circuit 3022 and the bases of differential transistors 3164 and 3165, respectively.

The two position detecting elements 2607*a* and 2607*b* output the two-phase detection signals E1 and F1 (and E2 and F2) which are electrically separated in phase from each other by 120 deg. As the rotational movement of the field part 2510 proceeds, the two-phase detection signals E1 and F1 vary analoguely.

Constant current sources 3140, 3150, 3160, and 3163 of the altering signal producing circuit 3022 supply a current of the same constant value. In correspondence with the detection signals E1 and E2, the differential transistors 3141 and 3142 distribute the value of the current of the constant current source 3140 to the collectors. In correspondence with the detection signals F1 and F2, the differential transistors 3151 and 3152 distribute the value of the current of the constant current source 3150 to the collectors. In correspondence with the detection signals E1 and E2, the differential transistors 3161 and 3162 distribute the value of the current of the constant current source 3160 to the collectors, and, in correspondence with the detection signals F1 and F2, the differential transistors 3164 and 3165 distribute the value of the current of the constant current source 3163 to the collectors.

The collector currents of the transistors 3141, 3161, and 3164 are composed together. The difference current of the composed current and a constant current source 3146 is output with being inverted by a current mirror circuit consisting of transistors 3143, 3144 and 3145.

The collector currents of the transistors 3151 and 3142 are composed together, and the composed current is output with being inverted by a current mirror circuit consisting of transistors 3153, 3154, and 3155. The collector currents of the transistors 3152, 3162, and 3165 are composed together. The difference current of the composed current and the constant current source 3169 is output with being inverted by a current mirror circuit consisting of transistors 3166, 3167, and 3168.

The output currents of the transistors 3144, 3154, and 3167 are composed together. A current mirror circuit consisting of transistors 3171, 3172, and 3174 outputs a current in which the level of the composed current is reduced to about one third.

The difference current of the transistors 3145 and 3172 is output as the altering signal H1 (outflow/inflow current). Similarly, the difference current of the transistors 3155 and 3173 is output as the altering signal H2 (outflow/inflow current). Furthermore, the difference current of the transistors 3168 and 3174 is output as the altering signal H3 (outflow/inflow current). The values of the current sources 3146 and 3169 are one half of the value of the current of the current source 3160.

In this configuration, the two-phase detection signals (E1–E2) and (F1–F2) are composed together by calculation so as to produce the three-phase altering signals H1, H2, and H3 (altering current signals) which are electrically separated in phase from each other by 120 deg. or by about 120 deg. and which are signals obtained by shifting the detection signals E1 and F1 by a predetermined phase (about 30 deg.).

The first distributing circuit 2531 of the distribution block 2513 of FIG. 49 obtains three-phase first distributed current signals to which the first output current signal D1 of the command output circuit 3053 is distributed in correspondence with the altering signals H1, H2, and H3 of the altering signal producing circuit 3022. The second distributing circuit 2532 obtains three-phase second distributed current signals to which the second output current signal D2 of the command output circuit 3053 is distributed in correspondence with the altering signals H1, H2, and H3 of the altering signal producing circuit 3022.

The distributing composer 3033 composes the first and second distributed current signals together into three-phase distributed signals, and supplies the distributed signals to a driving block 2514. The the first distributing circuit 2531 and the second distributing circuit 2532 are configured in the same manner as those shown in FIG. 42. Therefore, their description is omitted.

Figure 51:
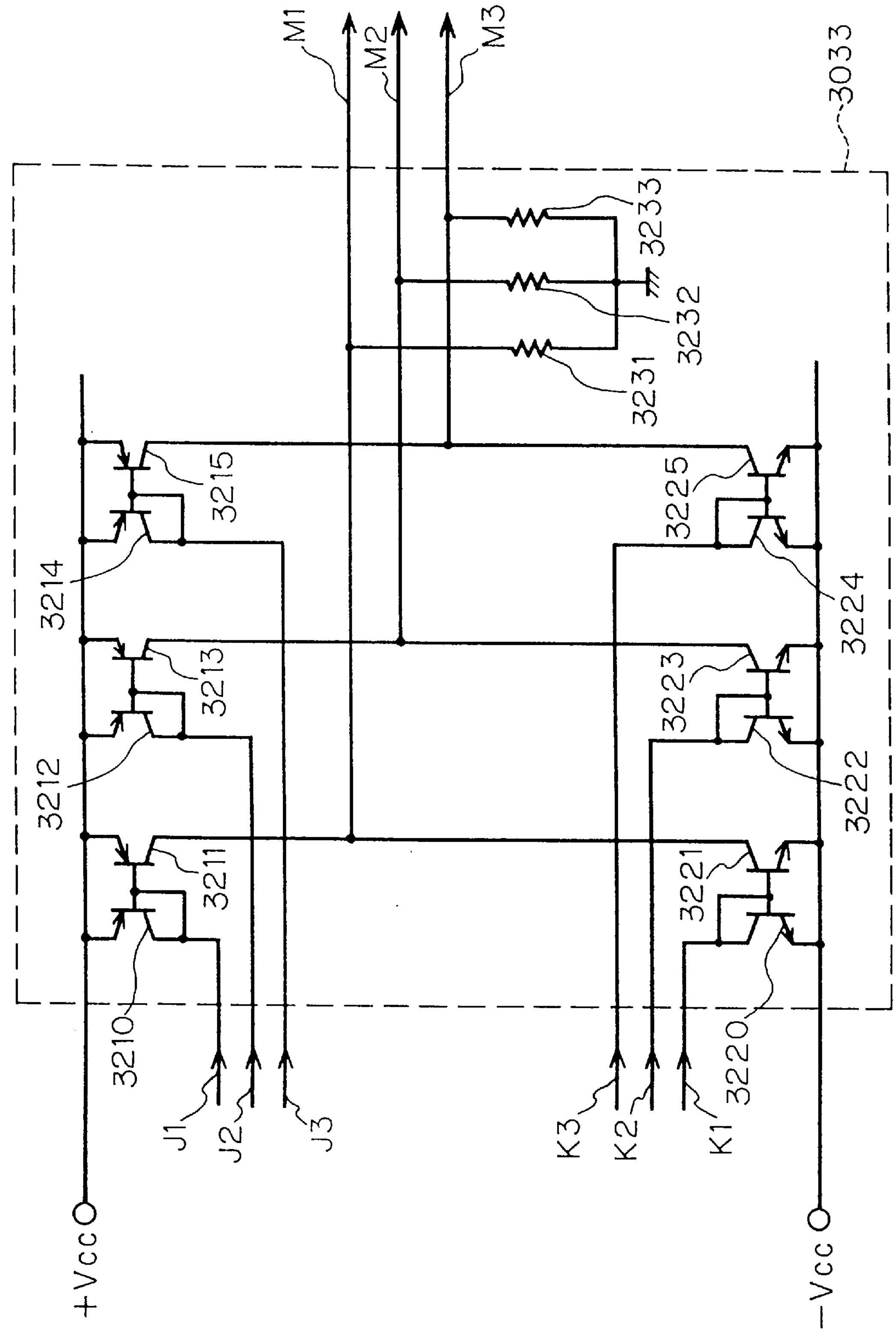
FIG. 51 is a specific circuit diagram of a distributing composer 3033 of Embodiment 8.

FIG. 51 is a circuit diagram specifically showing the configuration of the distributing composer 3033 of the distribution block 2513. The currents of the first distributed current signals J1, J2, and J3 are inverted by a current mirror circuit consisting of transistors 3210 and 3211, that consisting of transistors 3212 and 3213, and that consisting of transistors 3214 and 3215, respectively.

The currents of the second distributed current signals K1, K2, and K3 are inverted by a current mirror circuit consisting of transistors 3220 and 3221, that consisting of transistors 3222 and 3223, and that consisting of transistors 3224 and 3225, respectively. For each phase, the output terminals of these current mirror circuits are connected to each other so as to produce a difference current for the phase.

A difference current (J1–K1) of the currents J1 and K1 is supplied to a resistor 3231, so that a distributed signal M1 appears at the terminal of the resistor 3231. Similarly, a difference current (J2–K2) of the currents J2 and K2 is supplied to a resistor 3232, so that a distributed signal M2 appears at the terminal of the resistor 3232. Furthermore, a difference current (J3–K3) of the currents J3 and K3 is supplied to a resistor 3233, so that a distributed signal M3 appears at the terminal of the resistor 3233.

The driving block 2514 of FIG. 49 comprises a first driving circuit 2541, a second driving circuit 2542, and a third driving circuit 2543, and supplies the driving signals Va, Vb, and Vc, which are obtained by amplifying the distributed signals M1, M2, and M3 of the distribution block 2513, to the terminals of the three-phase coils 2511A, 2511B, and 2511C. The first driving circuit 2541, the second driving circuit 2542, and the third driving circuit 2543 are configured in the same as those shown in FIG. 44. Therefore, their description is omitted.

Figure 52:
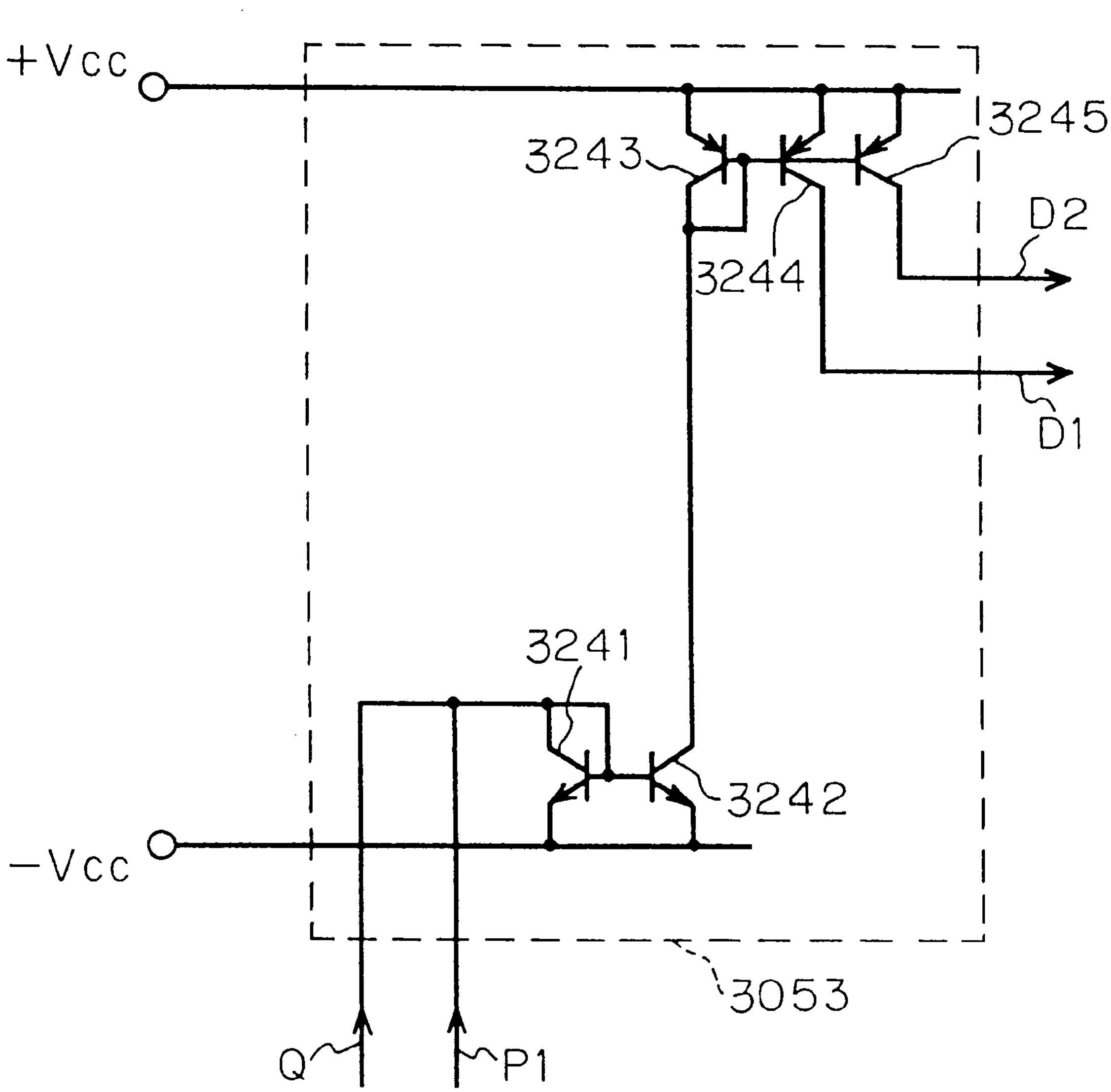
FIG. 52 is a specific circuit diagram of a command output circuit 3053 of Embodiment 8.

FIG. 52 is a circuit diagram specifically showing the configuration of the command output circuit 3053 of the command block 2515. The first command current signal P1 of the command current circuit 2551 and the multiplied command current signal Q of the multiplied command output circuit 2552 are composed together to produce a composed command current signal. The first and second output current signals D1 and D2 which vary responding with the composed command current signal are produced by a current mirror circuit consisting of transistors 3241 and 3242, and that consisting of transistors 3243, 3244, and 3245. The first output current signal D1 is supplied to the first distributing circuit 2531, and the second output current signal D2 to the second distributing circuit 2532.

The command current circuit 2551 and the multiplied command output circuit 2552 shown in FIG. 49 are configured in the same manner as those shown in FIGS. 45 and 46. Therefore, their description is omitted.

Also in the thus configured embodiment, the distributed signals M1, M2, and M3 (or the driving signals Va, Vb, and Vc) are not affected by the amplitudes of the detection signals and the altering signals. In other words, the signals are free from influences due to variations in the sensitivities of the position detecting elements 2607*a* and 2607*b* of the position detector 2521, variations in the magnetic field of the field part 2510, and variations in the gain of the altering signal producing circuit 3022 (influences are very small). The distributed signals M1, M2, and M3 (or the driving signals Va, Vb, and Vc) vary analoguely sinusoidally in correspondence with the detection signals. Therefore, it is possible to obtain the distributed signals and the driving signals of a reduced distortion level, with the result that a uniform torque is generated, so that the motor is smoothly driven. Furthermore, the position detecting elements can be reduced in number and arranged in a free manner, and the position detecting elements can be disposed between the salient poles of the armature core, with the result that the motor structure can be miniaturized.

Embodiment 9

Hereinafter, a ninth embodiment of the invention will be described with reference to the accompanying drawings.

Figure 53:
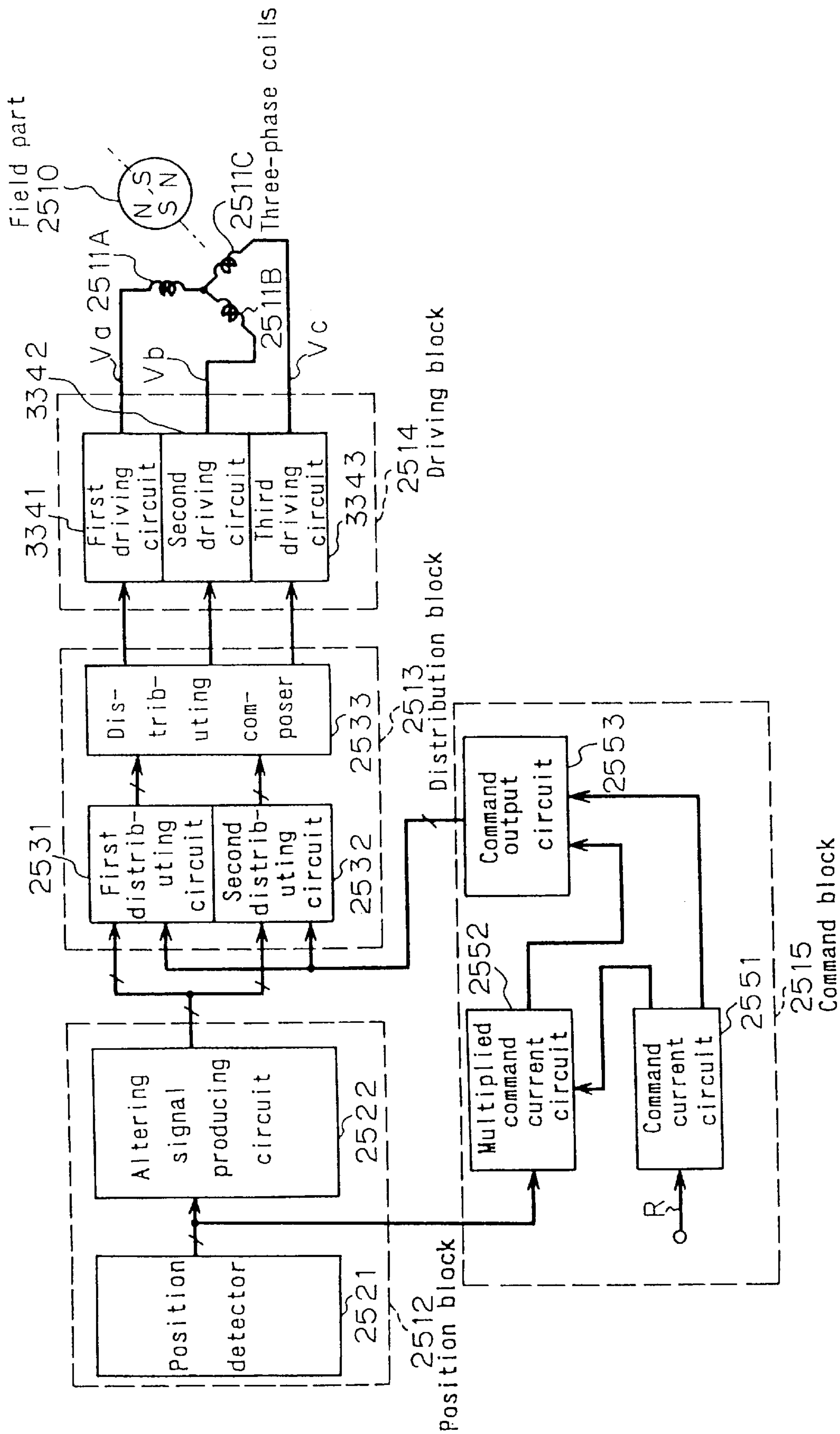
FIG. 53 is a block diagram of Embodiment 9 of the invention.
Figure 54:
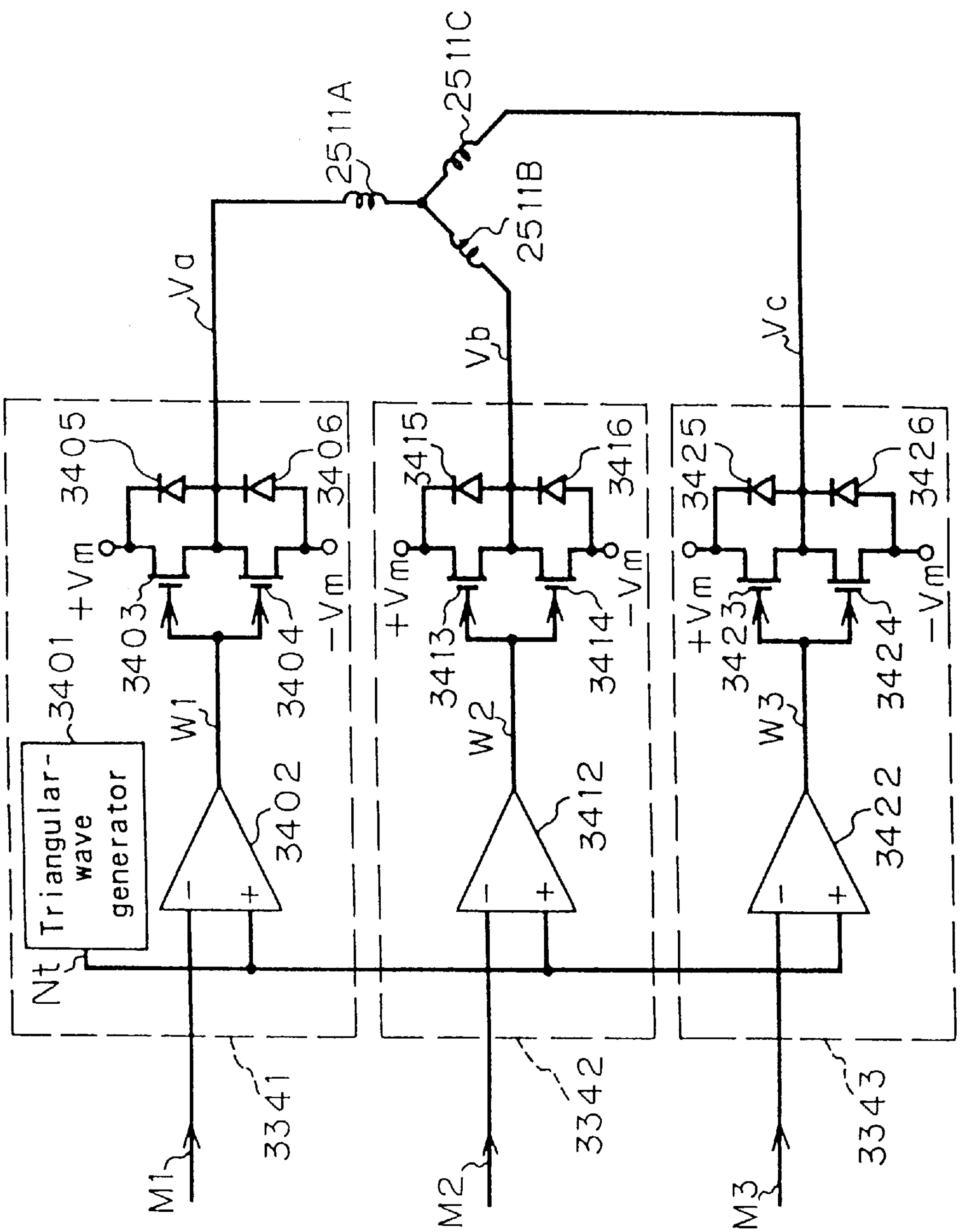
FIG. 54 is a specific circuit diagram of a first driving circuit 3341, a second driving circuit 3342, and a third driving circuit 3343 of Embodiment 9.

FIGS. 53 and 54 are views relating to a brushless motor of Embodiment 9. FIG. 53 is a block diagram showing the whole configuration of the motor. In the circuit block diagrams, a connection line to or from circuit block with oblique short bar crossing therewith represents plural connection lines or a connection line for aggregate signals. In the embodiment, a first driving circuit 3341, a second driving circuit 3342, and a third driving circuit 3343 of a driving block 2514 are configured in a PWM system (Pulse-Width Modulation driving), thereby reducing the power consumption of the driving block 2514. The components which are identical with those of the seventh embodiment described above are designated by the same reference numerals.

FIG. 54 specifically shows the configuration of the first driving circuit 3341, the second driving circuit 3342, and the third driving circuit 3343 of the driving block 2514. A comparator 3402 of the first driving circuit 3341 compares a triangular wave signal Nt generated by a triangular wave generator 3401 with the distributed signal M1, and produces a PWM signal W1 of a pulse width corresponding to the distributed signal M1. In correspondence with the level of the PWM signal W1, driving transistors 3403 and 3404 are complementarily turned on or off. A driving signal Va which digitally varies responding with the PWM signal W1 is supplied to the power supply terminal of the coil 2511A by a combination of the driving transistors 3403 and 3404, and driving diodes 3405 and 3406.

Similarly, a comparator 3412 of the second driving circuit 3342 compares the triangular wave signal Nt generated by the triangular wave generator 3401 with the distributed signal M2, and produces a PWM signal W2 of a pulse width corresponding to the distributed signal M2. In correspondence with the level of the PWM signal W2, driving transistors 3413 and 3414 are complementarily turned on or off. A driving signal Vb which digitally varies responding with the PWM signal W2 is supplied to the power supply terminal of the coil 2511B by a combination of the driving transistors 3413 and 3414, and driving diodes 3415 and 3416.

Furthermore, a comparator 3422 of the third driving circuit 3343 compares the triangular wave signal Nt generated by the triangular wave generator 3401 with the distributed signal M3, and produces a PWM signal W3 of a pulse width corresponding to the distributed signal M3. In correspondence with the level of the PWM signal W3, driving transistors 3423 and 3424 are complementarily turned on or off. A driving signal Vc which digitally varies responding with the PWM signal W3 is supplied to the power supply terminal of the coil 2511C by a combination of the driving transistors 3423 and 3424, and driving diodes 3425 and 3426.

When the driving signals Va, Vb, and Vc of a voltage waveform which conducts the PWM operation in correspondence with the distributed signal M1, M2, or M3 as described above are respectively supplied to the three-phase coils 2511A, 2511B, and 2511C, the power loss of the driving block 2514 (the driving transistors 3403, 3404, 3413, 3414, 3423, and 3424, and the driving diodes 3405, 3406, 3415, 3416, 3425, and 3426) are greatly reduced.

The configuration and operation of the portions other than the first driving circuit 3341, the second driving circuit 3342, and the third driving circuit 3343 of the driving block 2514 shown in FIG. 53 are the same as those of the seventh embodiment described above, and hence their description is omitted.

The configuration of the embodiments described above may be modified in various manners. For example, the configuration of the driving block of Embodiment 9 may be used as the driving block of either of Embodiments 1 to 8. The coil for each phase may be configured by connecting a plurality of coils in series or in parallel. Each coil may consist of a concentrated winding, or a distributed winding, or may be an air-core coil having no salient pole. The connection of the three-phase coils is not restricted to the Y-connection and the coils may be Δ-connected. The position detecting elements are not restricted to Hall elements and other magnetoelectrical converting elements.

The relative positional relationships among the coils and the position detecting elements may be variously modified. The phase difference among the position detecting elements is not restricted to 120 deg. and may have any value as far as three-phase altering signals can be produced from two-phase detection signals. In the embodiments, the phase shifting operation is conducted as required by one of the distributing composer and the altering signal producing circuit. The manner of executing the phase shifting operation is not restricted to the above, and may be shared by both the composer and the circuit. In order to obtain two-phase detection signals, preferably, two or less position detecting elements are used. However, any configuration may be used in which two-phase detection signals are obtained by the position detector and three-phase altering signals are composed from the two-phase detection signals by calculation.

The structure of the motor is not restricted to the above-described one wherein the field part has a plurality of poles (the number of poles is not limited to four), and may have anyone as far as magnetic field fluxes generated by a permanent magnet cross a coil and the intercrossing magnetic fluxes of the coil vary as the relative movement of the field part and the coil proceeds. For example, the motor may have a structure in which a bias magnetic field is applied by a permanent magnet and rotation or movement is realized while tooth of a field unit oppose those of salient poles on which coils are wound. The motor is not restricted to a rotary brushless motor, and may be a linear brushless motor in which the field part or the coils are linearly moved.

It is a matter of course that the invention may be variously modified without departing from the spirit of the invention, and such modifications are within the scope of the invention.

Hereinafter, embodiments of the invention will be described with reference to the accompanying drawings.

Embodiment 10

Figure 55:
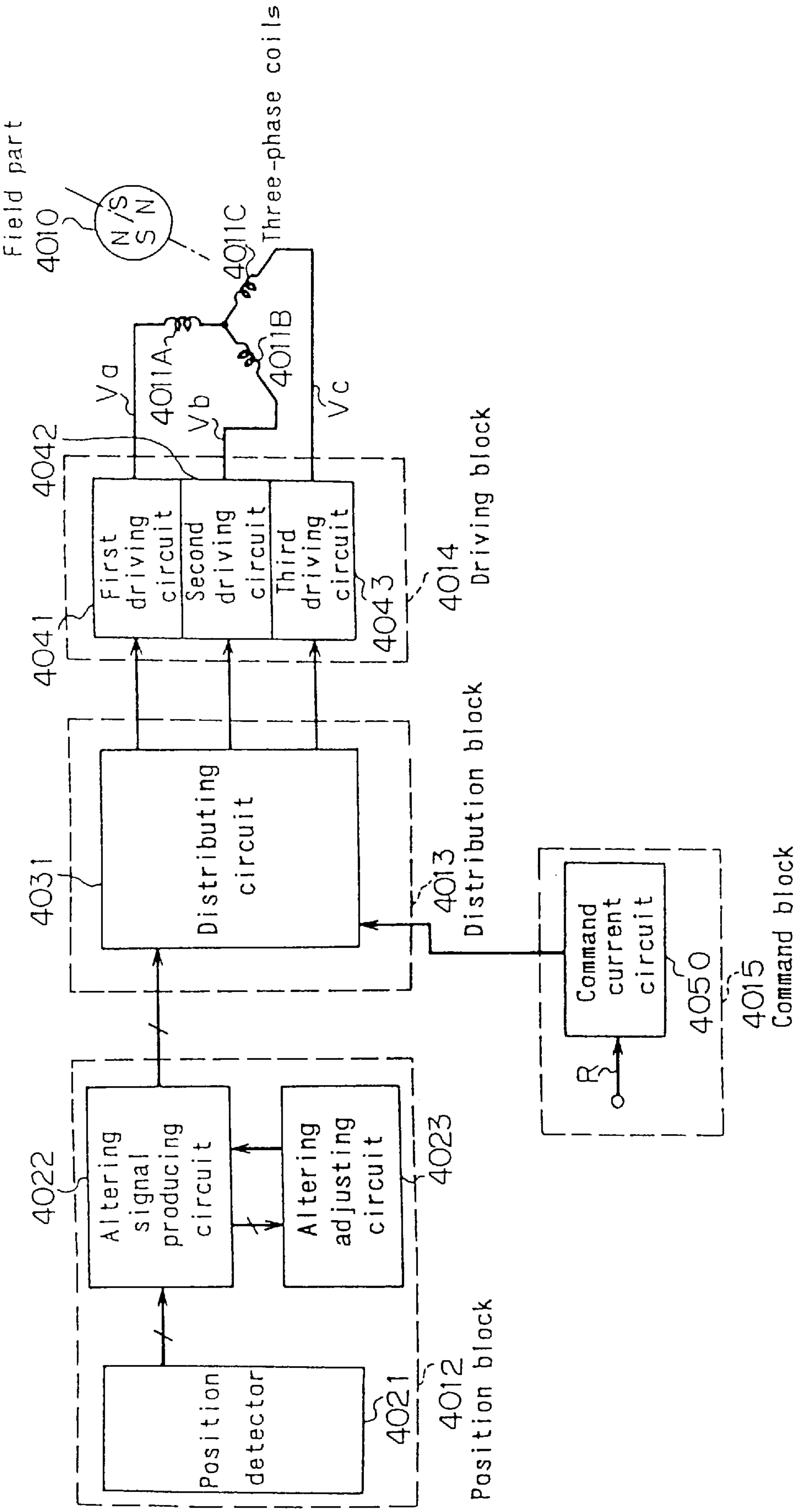
FIG. 55 is a block diagram of Embodiment 10 of the invention.

FIGS. 55 to 61 show a brushless motor of Embodiment 10 of the invention. FIG. 55 shows the whole configuration of the motor. In the circuit block diagrams, a connection line to or from circuit block with oblique short bar crossing therewith represents plural connection lines or a connection line for aggregate signals. A field part 4010 shown in FIG. 55 is mounted on the rotor or a movable body and forms plural magnetic field poles by means of magnetic fluxes generated by poles of a permanent magnet, thereby generating field magnetic fluxes. Three-phase coils 4011A, 4011B, and 4011C are mounted on the stator or a stationary body and arranged so as to be electrically separated from each other by a predetermined angle (corresponding to 120 deg.) with respect to intercrossing with the magnetic fluxes generated by the field part 4010.

Figure 56:
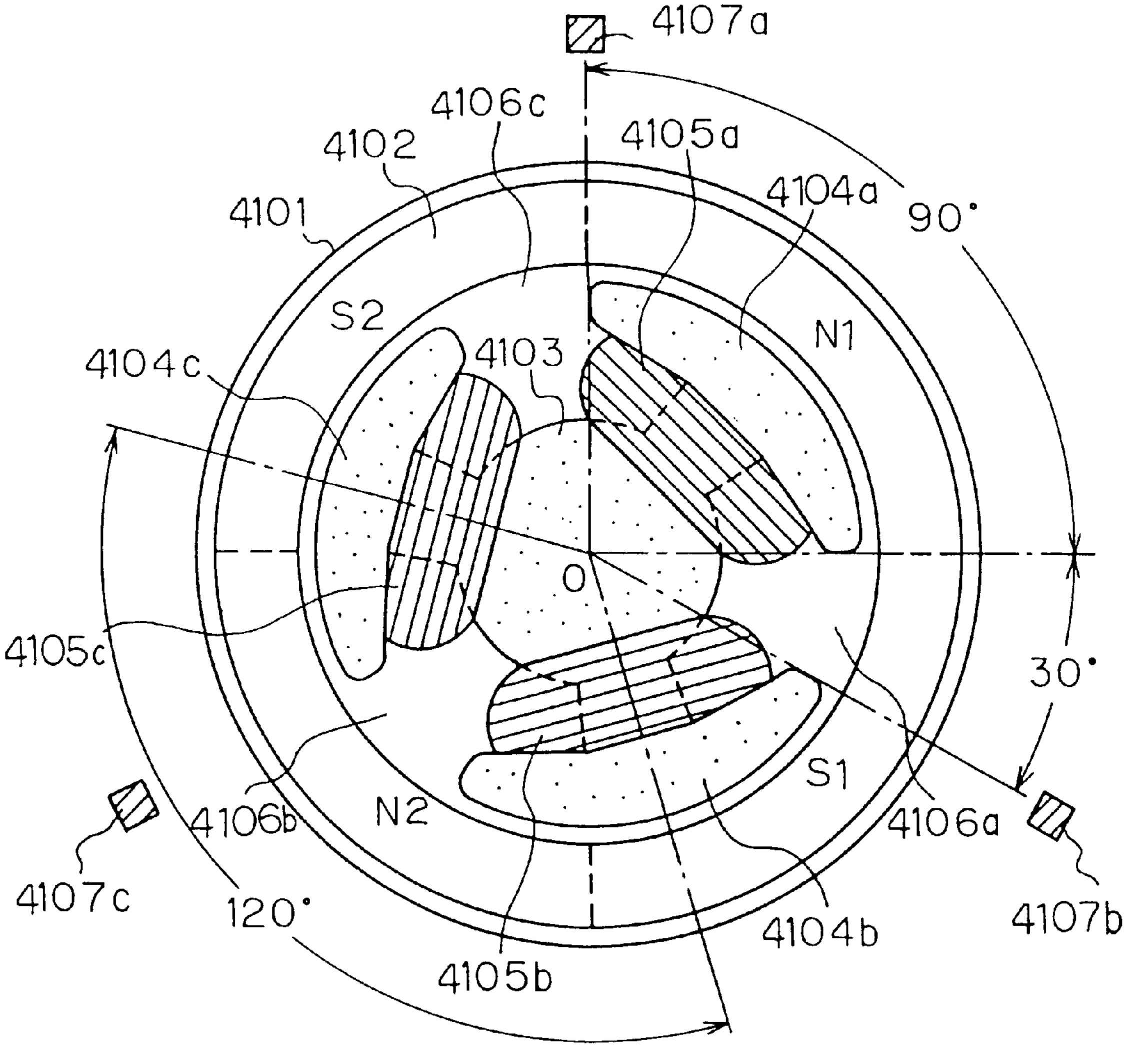
FIG. 56 is a diagram showing the structure of a motor of Embodiment 10.

FIG. 56 specifically shows the configuration of the field part 4010 and the three-phase coils 4011A, 4011B, and 4011C. In an annular permanent magnet 4102 attached to the inner side of the rotor 4101, the inner and end faces are magnetized so as to form four poles, thereby constituting the field part 4010 shown in FIG. 55. An armature core 4103 is placed at a position of the stator which opposes the poles of the permanent magnet 4102. Three salient poles 4104*a*, 4104*b*, and 4104*c* are disposed in the armature core 4103 so as to be positionally separated from each other at intervals of 120 deg. Three-phase coils 4105*a*, 4105*b*, and 4105*c* (corresponding to the three-phase coils 4011A, 4011B, and 4011C of FIG. 55) are wound on the salient poles 4104*a*, 4104*b*, and 4104*c* by using winding slots 4106*a*, 4106*b*, and 4106*c* formed between the salient poles, respectively. Among the coils 4105*a*, 4105*b*, and 4105*c*, phase differences of 120 deg. in electric angle are established with respect to intercrossing magnetic fluxes from the permanent magnet 4102. The mechanical angle of 180 deg. of one set of N and S poles corresponds to an electric angle of 360 deg. Three position detecting elements 4107*a*, 4107*b*, and 4107*c* (for example, Hall elements which are magnetoelectrical converting elements) are arranged on the stator and detect the poles of the end face of the permanent magnet 4102, thereby obtaining three-phase detection signals corresponding to relative position between the field part and the coils. The coils and the position detecting elements are shifted in phase by an electric angle of 90 deg. When driving signals which are in phase with the detection signals of the position detecting elements are applied to the coils, a rotation force in a predetermined direction can be obtained.

A command block 4015 shown in FIG. 55 comprises a command current circuit 4050, and outputs an output current signal corresponding to a command signal R. The output current signal is supplied to a distributing circuit 4031 of a distribution block 4013.

Figure 57:
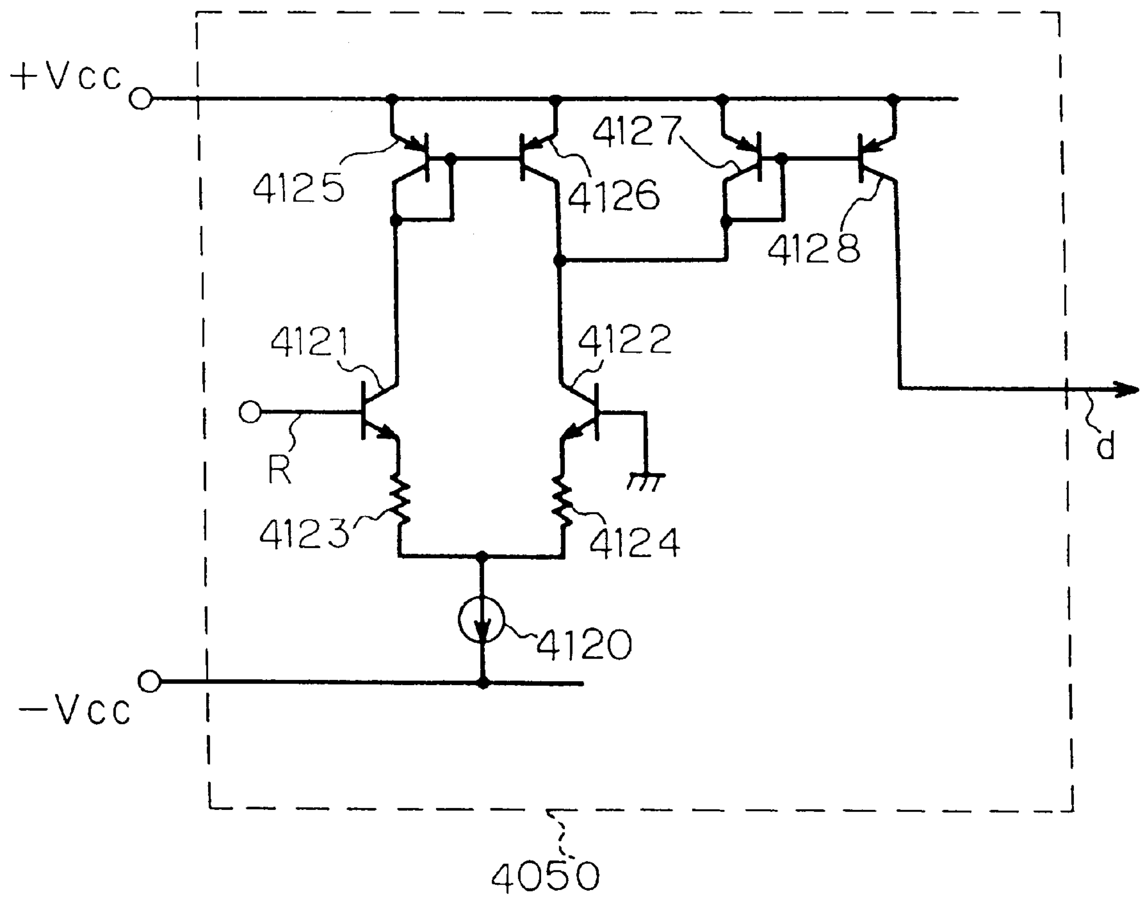
FIG. 57 is a circuit diagram showing a command current circuit 4050 of Embodiment 10.

FIG. 57 specifically shows the configuration of the command current circuit 4050. In the circuit to which +Vcc and −Vcc (+Vcc=9 V and −Vcc=−9 V) are applied, transistors 4121 and 4122, and resistors 4123 and 4124 constitute a differential circuit which operates in correspondence with the command signal R and distributes the value of the current of a constant current source 4120 to the collectors of the transistors 4121 and 4122. The collector currents of the transistors 4121 and 4122 are compared with each other by a current mirror circuit consisting of transistors 4125 and 4126, and the difference current is output through a current mirror circuit consisting of transistors 4127 and 4128, thereby obtaining an output current signal d. In the embodiment, as the command signal R becomes lower than the ground level or 0 V, the output current signal d is increased.

A position block 4012 shown in FIG. 55 comprises the position detector 4021, an altering signal producing circuit 4022, and an altering adjusting circuit 4023, produces altering signals from detection signals of position detecting elements of the position detector 4021, and supplies the altering signals to the distributing circuit 4031 of the distribution block 4013.

Figure 58:
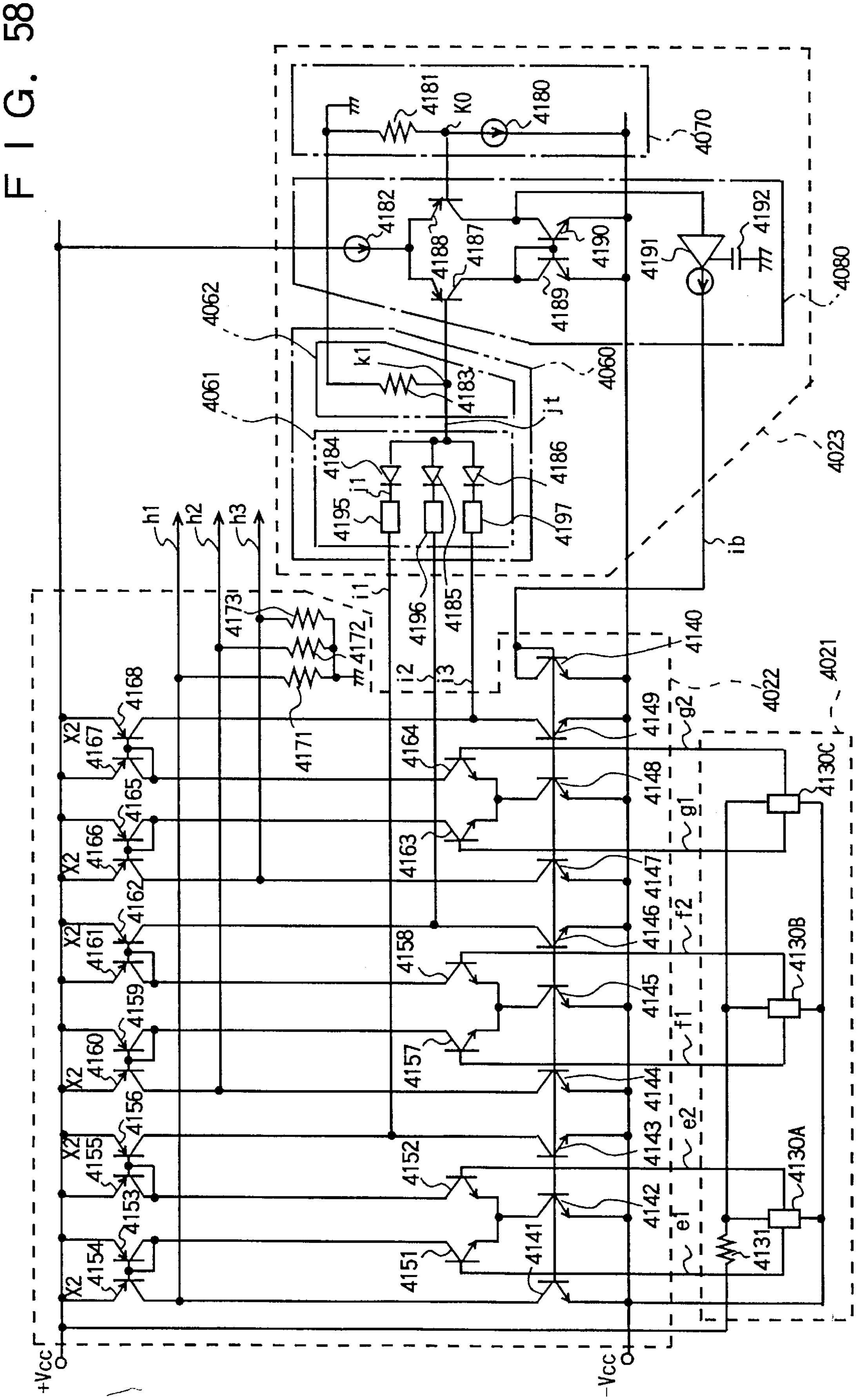
FIG. 58 is a circuit diagram showing a position detector 4021, an altering signal producing circuit 4022, and an altering adjusting circuit 4023 of Embodiment 10.

FIG. 58 specifically shows the configuration of the position detector 4021, the altering signal producing circuit 4022, and the altering adjusting circuit 4023. The position detecting elements 4130A, 4130B, and 4130C of the position detector 4021 correspond to the position detecting elements 4107*a*, 4107*b*, and 4107*c* of FIG. 56. A voltage is applied in parallel to the position detecting elements via a resistor 4131. Differential detection signals e1 and e2 corresponding to the detected magnetic field of the field part 4010 (corresponding to the permanent magnet 4102 of FIG. 56) are output from output terminals of the position detecting element 4130A and then supplied to the bases of differential transistors 4151 and 4152 of the altering signal producing circuit 4022. Differential detection signals f1 and f2 corresponding to the detected magnetic field of the field part 4010 are output from output terminals of the position detecting element 4130B and then supplied to the bases of differential transistors 4157 and 4158. Differential detection signals g1 and g2 corresponding to the detected magnetic field of the field part 4010 are output from output terminals of the position detecting element 4130C and then supplied to the bases of differential transistors 4163 and 4164. As the rotational movement of the field part 4010 proceeds, the detection signals e1, f1, and g1 and e2, f2, and g2 analoguely vary so as to function as three-phase signals which are electrically separated in phase from each other by 120 deg. The detection signals e1 and e2 vary in reversed phase relationships, f1 and f2 vary in reversed phase relationships, and g1 and g2 vary in reversed phase relationships. In the embodiment, the signals of reversed phase relationships are not counted in the number of phases.

Transistors 4140, 4141, 4142, 4143, 4144, 4145, 4146, 4147, 4148, and 4149 of the altering signal producing circuit 4022 constitute a current mirror circuit, and output (or receive) currents of a value proportional to a feedback current signal ib. In correspondence with the detection signals e1 and e2, the differential transistors 4151 and 4152 distribute the value of the current of the transistor 4142 to the collectors. The collector current of the transistor 4151 is amplified two times by a current mirror circuit consisting of transistors 4153 and 4154. A current flowing out from or into the junction of the transistors 4154 and 4141 is supplied to a resistor 4171, so that an altering signal h1 is produced at the terminal of the resistor 4171. The collector current of the transistor 4152 is amplified two times by a current mirror circuit consisting of transistors 4155 and 4156. A current signal i1 flowing out from or into the junction of the transistors 4156 and 4143 is supplied to the altering adjusting circuit 4023. Similarly, in correspondence with the detection signals f1 and f2, the differential transistors 4157 and 4158 distribute the value of the current of the transistor 4145 to the collectors. The collector current of the transistor 4157 is amplified two times by a current mirror circuit consisting of transistors 4159 and 4160. A current flowing out from or into the junction of the transistors 4160 and 4144 is supplied to a resistor 4172, so that an altering signal h2 is produced at the terminal of the resistor 4172. The collector current of the transistor 4158 is amplified two times by a current mirror circuit consisting of transistors 4161 and 4162. A current signal i2 flowing out from or into the junction of the transistors 4162 and 4146 is supplied to the altering adjusting circuit 4023. Furthermore, in correspondence with the detection signals g1 and g2, the differential transistors 4163 and 4164 distribute the value of the current of the transistor 4148 to the collectors. The collector current of the transistor 4163 is amplified two times by a current mirror circuit consisting of transistors 4165 and 4166. A current flowing out from or into the junction of the transistors 4166 and 4147 is supplied to a resistor 4173, so that an altering signal h3 is produced at the terminal of the resistor 4173. The collector current of the transistor 4164 is amplified two times by a current mirror circuit consisting of transistors 4167 and 4168. A current signal i3 flowing out from or into the junction of the transistors 4168 and 4149 is supplied to the altering adjusting circuit 4023.

The altering signals h1, h2, and h3 are three-phase voltage signals which analoguely vary responding with the detection signals, and supplied to the distributing circuit 4031. The current signals i1, i2, and i3 are three-phase current signals which analoguely vary responding with the detection signals, and supplied to the altering adjusting circuit 4023 (in the embodiment, the altering signals h1, h2, and h3, and the current signals i1, i2, and i3 change in reversed phase relationships, but alternatively the signals may change in phase).

The altering adjusting circuit 4023 comprises: an adjusting signal producing circuit 4060 which produces an adjusting signal k1; a setting producing circuit 4070 which produces a predetermined signal k0; and an adjusting comparator 4080 which compares the adjusting signal k1 with the predetermined signal k0. The adjusting signal producing circuit 4060 comprises: an amplitude current circuit 4061 which produces an amplitude current signal jt varying in proportion to the amplitudes of the detection signals; and an adjusting signal output circuit 4062 which produces the adjusting signal k1 proportional to the amplitude current signal jt. The amplitude current circuit 4061 comprises: current output circuits 4195, 4196, and 4197 to which the three-phase current signals i1, i2, and i3 are respectively input; and current composition diodes 4184, 4185, and 4186. The current output circuits 4195, 4196, and 4197 output current signals corresponding to the absolute values or the single polarity values of the current signals i1, i2, and i3, respectively.

Figure 59:
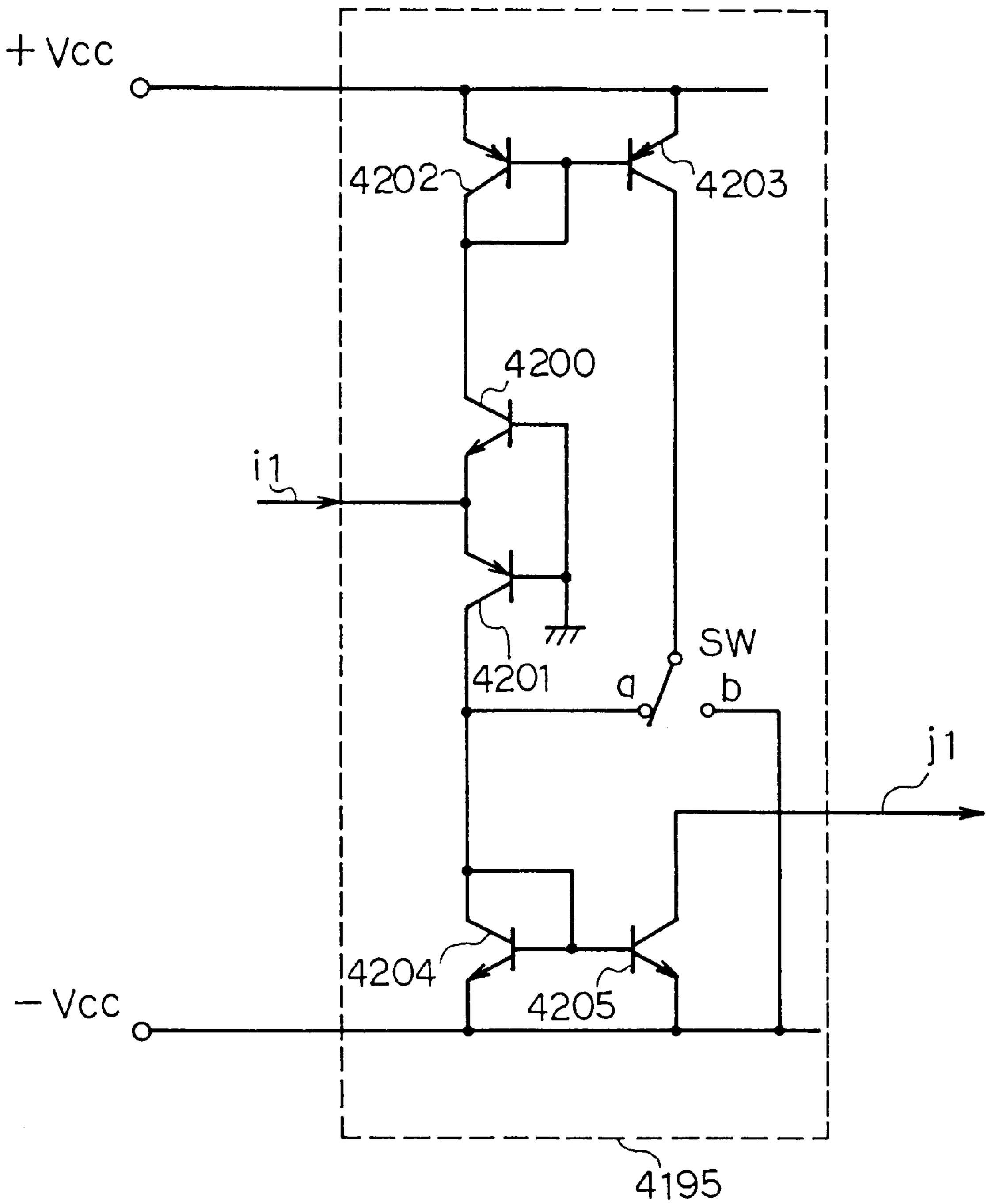
FIG. 59 is a circuit diagram showing a current output circuit 4195 of Embodiment 10.

FIG. 59 specifically shows the configuration of the current output circuit 4195. When a switch SW is in the side of a, the absolute value of the current signal i1 is produced by a combination of transistors 4200, 4201, 4202, and 4203, and a current signal j1 corresponding to the absolute value is output via a current mirror circuit consisting of transistors 4204 and 4205. When the switch SW is in the side of b, a current signal j1 corresponding to the single polarity value of the current signals i1 is output. The current output circuits 4196 and 4197 are similarly configured. Each of the current output circuits may have either of the configuration in which output current signal corresponding to the absolute value of the input current signal is obtained, and that in which output current signal corresponding to the single polarity value of the input current signal is obtained.

An output current signal corresponding to the single polarity value means an output current signal having a value which corresponds to one of the positive side and the negative side of a signal.

The output current signals of the current output circuits 4195, 4196, and 4197 of the amplitude current circuit 4061 are composed together via the diodes 4184, 4185, and 4186, thereby obtaining the amplitude current signal jt. The amplitude current signal jt is a current signal of a sum of the absolute values or the single polarity values of the three-phase current signals i1, i2, and i3, and hence vary in proportion to the amplitudes of the detection signals e1, f1, and g1. The adjusting signal output circuit 4062 supplies the amplitude current signal jt to a resistor 4183, so that the adjusting signal k1 is produced at the terminal of the resistor 4183. Therefore, the adjusting signal k1 varies in proportion to the amplitudes of the detection signals.

The setting producing circuit 4070 supplies the current of a current source 4180 to a resistor 4181, so that the predetermined signal k0 is produced at the terminal of the resistor 4181.

In the adjusting comparator 4080, the adjusting signal k1 is compared with the predetermined signal k0 by a combination of transistors 4187, 4188, 4189, and 4190, and the differential current corresponding to the difference of the signals is input to a current amplifier 4191 which in turn outputs the feedback current signal ib obtained by amplifying the input current.

In this way, the adjusting signal k1 corresponding to the amplitudes of the three-phase current signals i1, i2, and i3 which are proportional to the detection signals e1, f1, and g1 is produced, and the feedback current signal ib corresponding to a result of a comparison of the adjusting signal k1 with the predetermined signal k0 is produced. The output currents of the current mirror circuit consisting of the transistors 4140 to 4149 are varied in correspondence with the feedback current signal ib, thereby varying the amplitudes of the three-phase current signals i1, i2, and i3 and the three-phase altering signals h1, h2, and h3. As a result, a feedback loop which adjusts the amplitudes of the three-phase altering signals and the level of the adjusting signal in correspondence with a result of a comparison of the adjusting signal k1 with the predetermined signal k0 is configured. According to this configuration, irrespective of the amplitudes of the detection signals e1, f1, and g1 of the position detector 4021, the altering signals h1, h2, and h3 have an amplitude of a predetermined value corresponding to the predetermined signal k0. A capacitor 4192 stabilizes the feedback loop.

The distribution block 4013 of FIG. 55 comprises the distributing circuit 4031, and produces three-phase distributed signals corresponding to results of multiplications of the three-phase altering signals of the altering signal producing circuit 4022 by the output signal of the command current circuit 4050 of the command block 4015.

Figure 60:
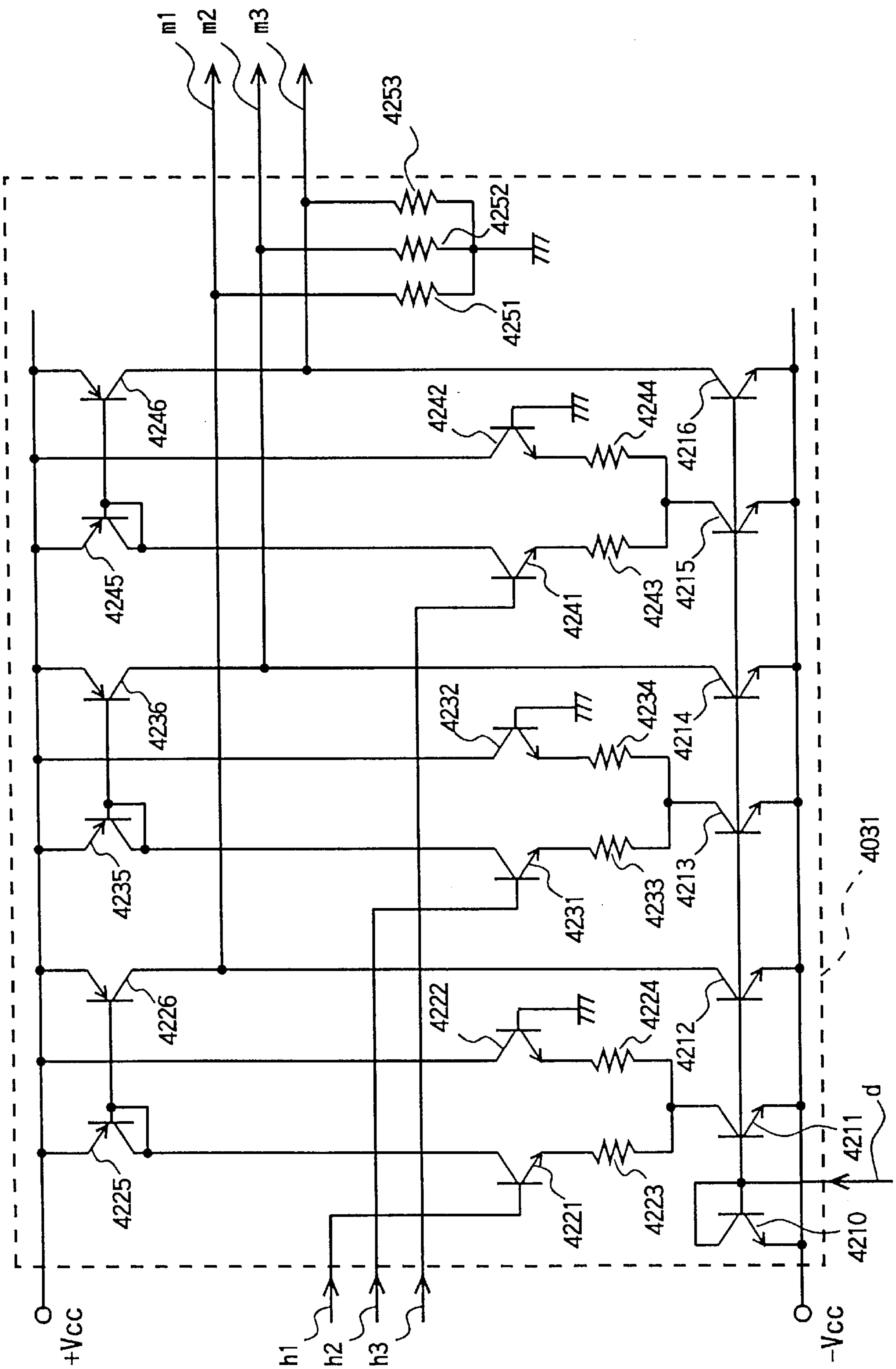
FIG. 60 is a circuit diagram showing a distributing composer 4031 of Embodiment 10.

FIG. 60 specifically shows the configuration of the distributing circuit 4031. The output current signal d of the command current circuit 4050 of the command block 4015 is supplied to a current mirror circuit consisting of transistors 4210, 4211, 4212, 4213, 4214, 4215, and 4216, and a current signal proportional to the output current signal d is output (or received). A combination of transistors 4221 and 4222, and resistors 4223 and 4224 multiplies the altering signal h1 of the altering signal producing circuit 4022 by the output current signal d of the command block 4015. The multiplied current is inverted and then output by a current mirror circuit consisting of transistors 4225 and 4226, and the difference current of the output current of the transistor 4226 and that of the transistor 4212 is produced. The difference current is supplied to a resistor 4251, so that a distributed signal m1 is obtained at the terminal of the resistor 4251. Therefore, the distributed signal m1 is a signal proportional to a result of a multiplication of the altering signal h1 by the output current signal d. Similarly, transistors 4231 and 4232, and resistors 4233 and 4234 multiply the altering signal h2 of the altering signal producing circuit 4022 by the output current signal d of the command block 4015. The multiplied current is inverted and then output by a current mirror circuit consisting of transistors 4235 and 4236, and the difference current of the output current of the transistor 4236 and that of the transistor 4214 is produced. The difference current is supplied to a resistor 4252, so that a distributed signal m2 is obtained at the terminal of the resistor 4252. Therefore, the distributed signal m2 is a signal proportional to a result of a multiplication of the altering signal h2 by the output current signal d. Furthermore, transistors 4241 and 4242, and resistors 4243 and 4244 multiply the altering signal h3 of the altering signal producing circuit 4022 by the output current signal d of the command block 4015. The multiplied current is inverted and then output by a current mirror circuit consisting of transistors 4245 and 4246, and the difference current of the output current of the transistor 4246 and that of the transistor 4216 is produced. The difference current is supplied to a resistor 4253, so that a distributed signal m3 is obtained at the terminal of the resistor 4253. Therefore, the distributed signal m3 is a signal proportional to a result of a multiplication of the altering signal h3 by the output current signal d.

The driving block 4014 of FIG. 55 comprises a first driving circuit 4041, a second driving circuit 4042, and a third driving circuit 4043, and supplies driving signals Va, Vb, and Vc, which are obtained by amplifying the distributed signals m1, m2, and m3 of the distribution block 4013, to the terminals of the three-phase coils 4011A, 4011B, and 4011C.

Figure 61:
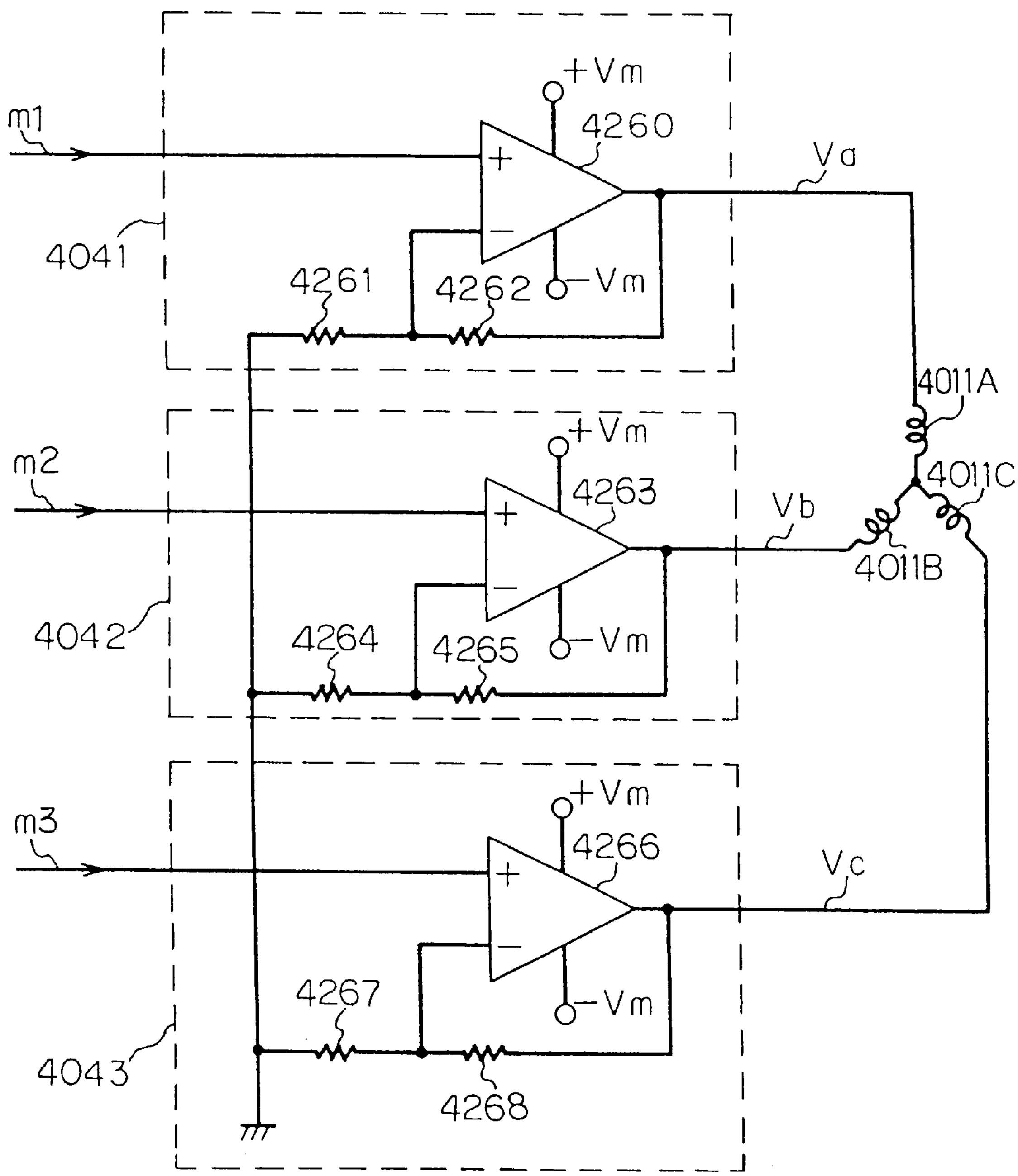
FIG. 61 is a circuit diagram showing a first driving circuit 4041, a second driving circuit 4042, and a third driving circuit 4043 of Embodiment 10.

FIG. 61 specifically shows the configuration of the first driving circuit 4041, the second driving circuit 4042, and the third driving circuit 4043 of the driving block 4014. The distributed signal m1 is input to the noninverting terminal of an amplifier 4260 of the first driving circuit 4041 and then amplified at an amplification factor defined by resistors 4261 and 4262, thereby producing the driving signal Va. The driving signal Va is supplied to the power input terminal of the coil 4011A. Similarly, the distributed signal m2 is input to the noninverting terminal of an amplifier 4263 of the second driving circuit 4042 and then amplified at an amplification factor defined by resistors 4264 and 4265, thereby producing the driving signal Vb. The driving signal Vb is supplied to the power input terminal of the coil 4011B. Furthermore, the distributed signal m3 is input to the noninverting terminal of an amplifier 4266 of the third driving circuit 4043 and then amplified at an amplification factor defined by resistors 4267 and 4268, thereby producing the driving signal Vc. The driving signal Vc is supplied to the power input terminal of the coil 4011C. The amplifiers 4260, 4263, and 4266 are supplied with power source voltages +Vm and −Vm (+Vm=15 V, −Vm=−15 V).

As a result of the supply of the driving signals Va, Vb, and Vc, three-phase driving currents are supplied to the three-phase coils 4011A, 4011B, and 4011C, so that a driving force is generated in a predetermined direction by electromagnetic interaction between the currents of the coils and the magnetic fluxes of the field part 4010.

Figure 62:
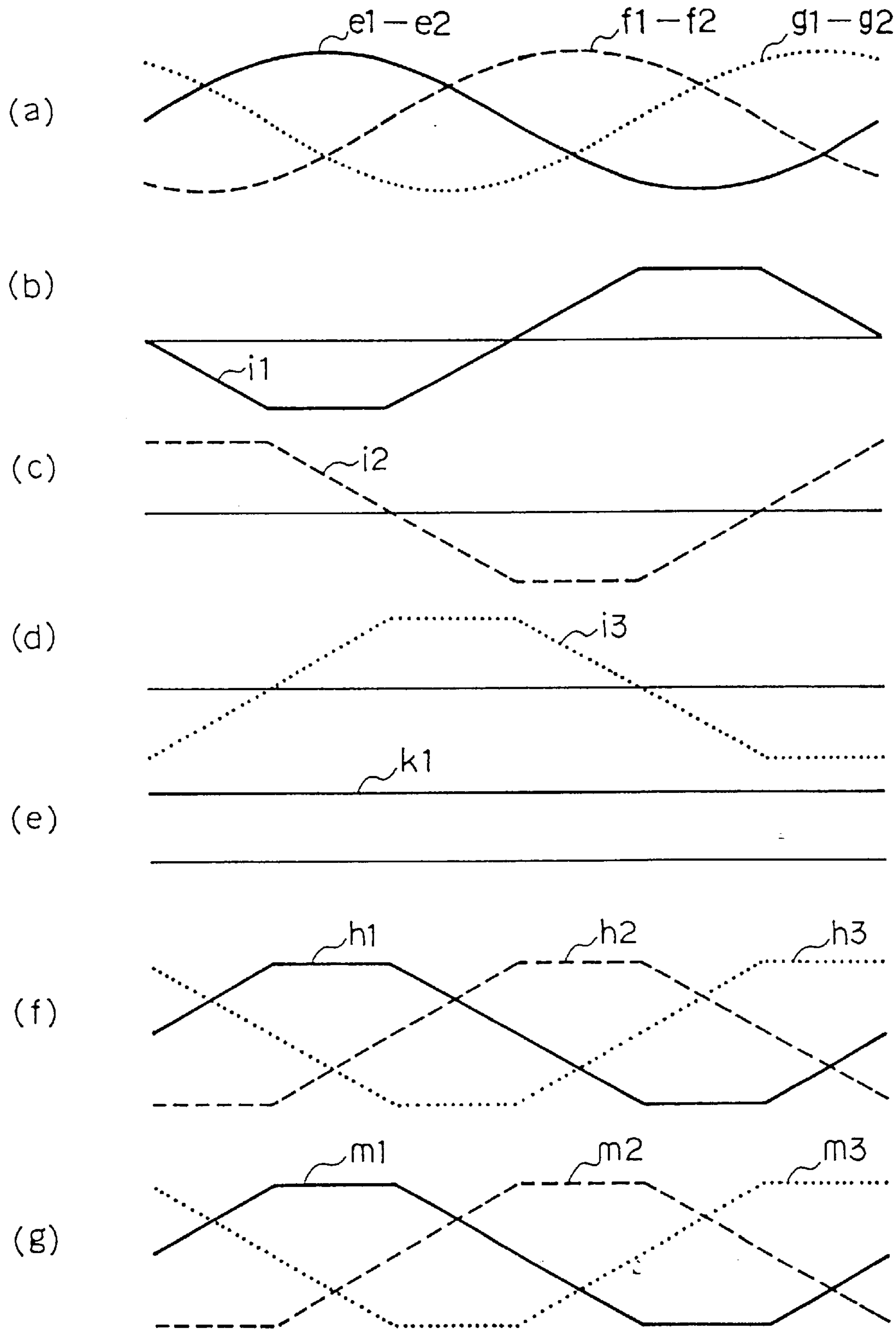
FIG. 62 is a waveform chart of signals of Embodiment 10.

FIG. 62 is a waveform chart illustrating the operation of the embodiment. As the rotational movement (or a relative movement with respect to the three-phase coils) of the field part 4010 proceeds, the position detecting elements 4130A, 4130B, and 4130C which detect the magnetic field of the field part 4010 produce sinusoidal detection signals e1−e2, f1−f2, and g1−g2 [see (a) of FIG. 62 wherein the horizontal axis indicates the rotational position]. The altering signal producing circuit 4022 and the altering adjusting circuit 4023 produce the three-phase current signals i1, i2, and i3 which analoguely vary responding with the detection signals [(b), (c), and (d) of FIG. 62] and the three-phase altering signals h1, h2, and h3, and obtains the adjusting signal k1 corresponding to a sum of the absolute values (or a sum of the single polarity values) of the three-phase current signals i1, i2, and i3 [(e) of FIG. 62 wherein the upper portion of the vertical axis corresponds to the negative side], thereby operating the feedback loop, so that the adjusting signal k1 coincides with the predetermined signal k0. As a result, in correspondence with a result of a comparison of the adjusting signal k1 and the predetermined signal k0, also the amplitudes of the altering signals h1, h2, and h3 are adjusted [(f) of FIG. 62]. The distributing circuit 4031 produces three-phase distributed signals m1, m2, and m3 corresponding to results of multiplications of the altering signals h1, h2, and h3 by the output current signal d of the command block 4015 [(g) of FIG. 62]. The first driving circuit 4041, the second driving circuit 4042, and the third driving circuit 4043 of the driving block 4014 supply the driving signals Va, Vb, and Vc, which are respectively obtained by amplifying the distributed signals m1, m2, and m3, to the three-phase coils 4011A, 4011B, and 4011C.

In the thus configured embodiment, the adjusting signal varying in proportion to the amplitudes of the detection signals is produced, and the amplitudes of the altering signals can be easily adjusted in correspondence with the adjusting signal. As a result, even when the detection signals of the position detector 4021 are large or small in amplitude, the amplitudes of the altering signals h1, h2, and h3 have a predetermined level corresponding to the predetermined signal k0. Therefore, the distributed signals m1, m2, and m3 corresponding to results of multiplications of the altering signals h1, h2, and h3 by the output current signal d of the command block 4015, and the driving signals Va, Vb, and Vc are not affected by the amplitudes of the detection signals of the position detector. In other words, the signals are free from influences due to variations in the sensitivities of the position detecting elements 4130A, 4130B, and 4130C of the position detector 4021, variations in the magnetic field of the field part 4010, and variations in the gain of the altering signal producing circuit 4022. When a speed control or a torque control of the brushless motor of the embodiment is made, variations of gains in speed control or torque control among motors are eliminated and hence the control properties of motors in mass production are extremely stabilized. Particularly, a phenomenon of control instability due to variations in the gains of motors does not occur.

When the altering signal producing circuit 4022 and the altering adjusting circuit 4023 produce an adjusting signal corresponding to a sum of single polarity values (for example, a value which is obtained by adding only positive values, or a value which is obtained by adding only negative values) or the absolute values of three-phase current signals, the adjusting signal which varies in proportion to the amplitudes of the detection signals can be always obtained by a simple circuit configuration, and hence correct adjustment is enabled. It is a matter of course that a circuit which obtains an adjusting signal corresponding to a sum of single polarity values can be configured more simply than that which obtains an adjusting signal corresponding to a sum of the absolute values.

In the embodiment, even when the detection signals of the position detector vary analoguely sinusoidally, the distributed signals and the driving signals are distorted into a trapezoidal shape. In many cases, such distortion is allowable. In order to realize higher performance, however, it is preferable to eliminate such distortion. Next, an embodiment which is improved in this point will be described.

Embodiment 11

Figure 63:
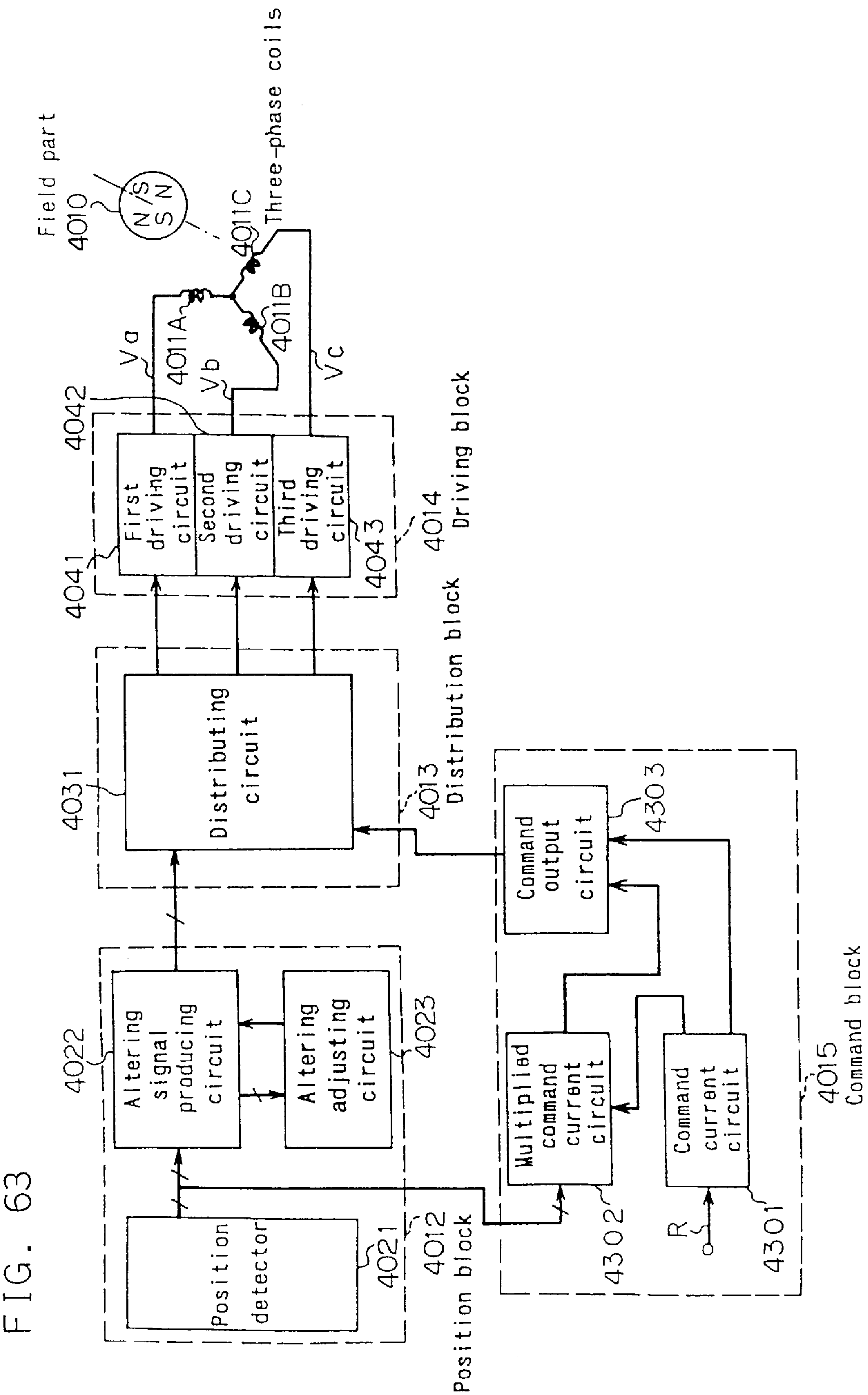
FIG. 63 is a block diagram of Embodiment 11 of the invention.

FIGS. 63 to 66 show a brushless motor of Embodiment 11 of the invention. FIG. 63 shows the whole configuration of the motor. In the circuit block diagrams, a connection line to or from circuit block with oblique short bar crossing therewith represents plural connection lines or a connection line for aggregate signals. In Embodiment 11, a command block 4015 of FIG. 63 comprises a command current circuit 4301, a multiplied command current circuit 4302, and a command output circuit 4303, and produces sinusoidal distributed signals and driving signals which vary analoguely. The components which are identical with those of Embodiment 10 described above are designated by the same reference numerals.

Figure 64:
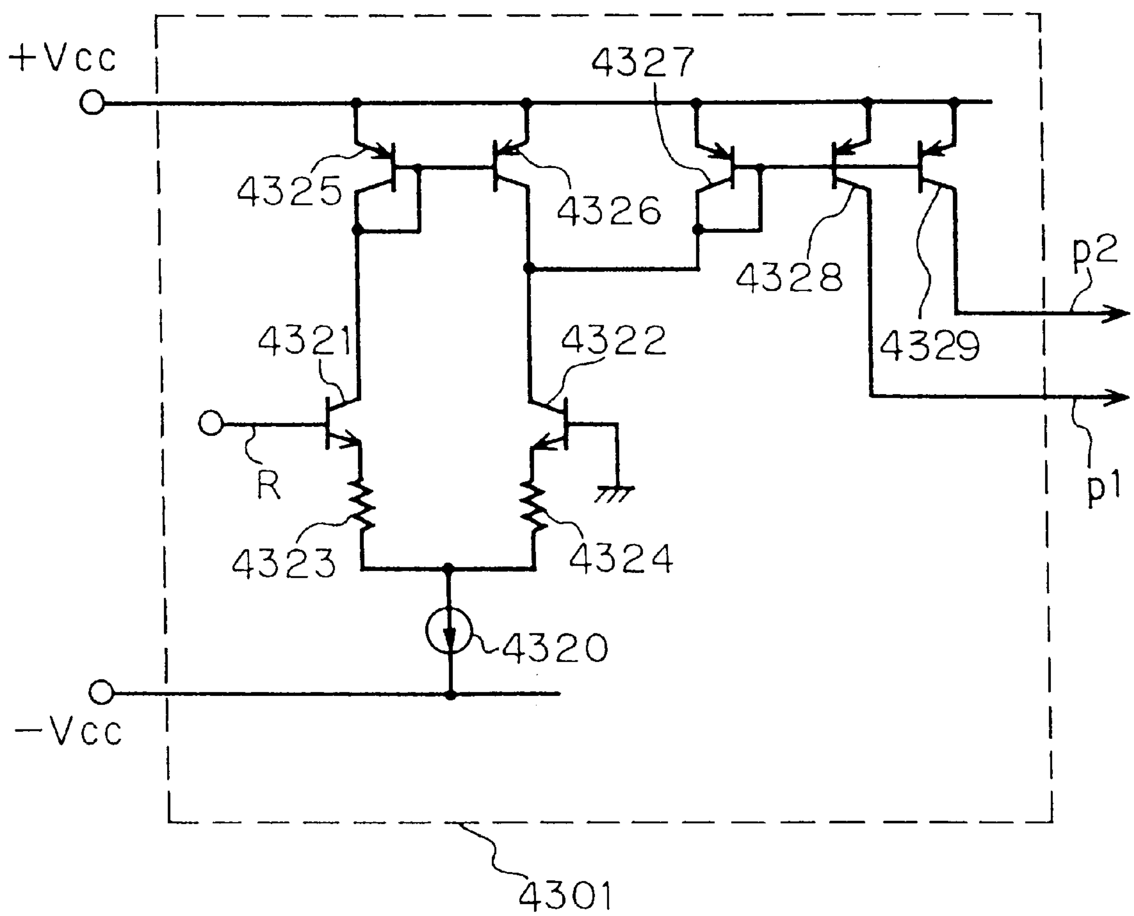
FIG. 64 is a circuit diagram showing a command current circuit 4301 of Embodiment 11.

FIG. 64 specifically shows the configuration of the command current circuit 4301 of the command block 4015. In correspondence with the command signal R, transistors 4321 and 4322, and resistors 4323 and 4324 distribute the value of the current of a constant current source 4320 to the collectors of the transistors 4321 and 4322. The collector currents are compared with each other by a current mirror circuit consisting of transistors 4325 and 4326, and the difference current is output as two command current signals p1 and p2 through a current mirror circuit consisting of transistors 4327, 4328, and 4329. Therefore, the command current circuit 4301 produces the two command current signals p1 and p2 (p1 and p2 are proportional to each other) corresponding to the command signal R. The first command current signal p1 is supplied to the command output circuit 4303, and the second command current signal p2 to the multiplied command current circuit 4302.

Figure 65:
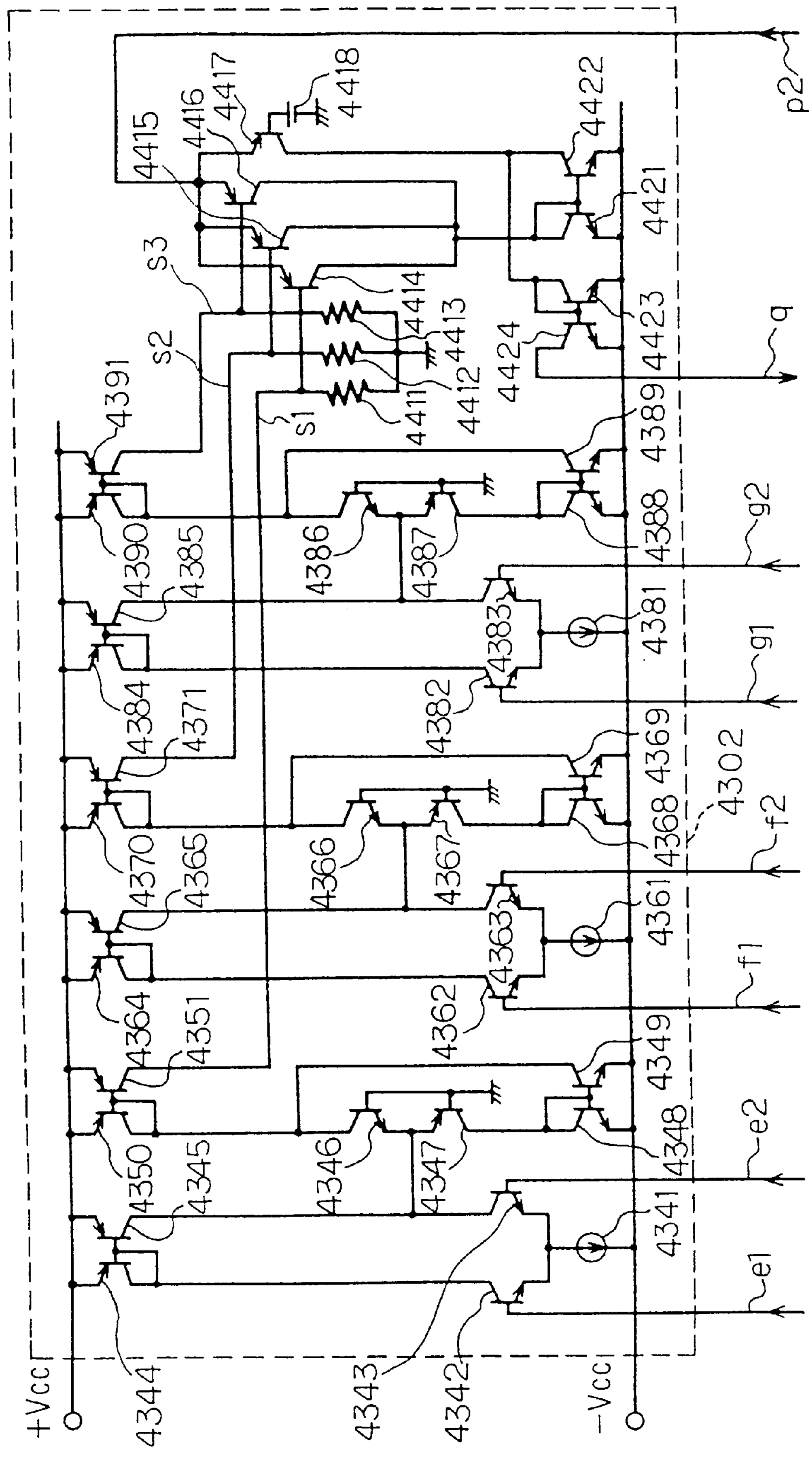
FIG. 65 is a circuit diagram showing a multiplied command current circuit 4302 of Embodiment 11.

FIG. 65 specifically shows the configuration of the multiplied command current circuit 4302 of the command block 4015. In correspondence with the detection signals e1 and e2 of the position detecting elements, transistors 4342 and 4343 distribute the value of the current of a constant current source 4341 to the collectors. The difference current is obtained by a current mirror circuit consisting of transistors 4344 and 4345, and a voltage signal s1 corresponding to the absolute value of the difference current is obtained by a combination of transistors 4346, 4347, 4348, 4349, 4350, and 4351, and a resistor 4411. In other words, the voltage signal s1 corresponding to the absolute value of the detection signal e1–e2 is produced. Similarly, a voltage signal s2 corresponding to the absolute value of the detection signal f1–f2 is produced at a resistor 4412, and a voltage signal s3 corresponding to the absolute value of the detection signal g1–g2 is produced at a resistor 4413. Transistors 4414, 4415, 4416, and 4417 compare the voltage signals s1, s2, and s3 with a predetermined voltage value (including 0 V) of a constant voltage source 4418. In correspondence with the difference voltages, the command current signal p2 of the command current circuit 4301 is distributed to the collectors of the transistors. The collector currents of the transistors 4414, 4415, and 4416 are composed together. A current mirror circuit consisting of transistors 4421 and 4422 compares the composed current with the collector current of the transistor 4417, and the difference current is output as a multiplied command current signal q (inflow current) via a current mirror circuit consisting of transistors 4423 and 4424. The multiplied command current signal q varies responding with results of multiplications of the voltage signals s1, s2, and s3 corresponding to the detection signals by the command current signal p2 corresponding to the command signal. Particularly, because of the configuration of the transistors 4414, 4415, 4416, and 4417, the multiplied command current signal q varies responding with a result of a multiplication of the minimum value of the voltage signals s1, s2, and s3 by the command current signal p2. The minimum value of the voltage signals s1, s2, and s3 corresponding to the absolute values of the detection signals is a higher harmonic signal which is synchronized with the detection signals and which varies 6 times for a change of every one period of the detection signals. Therefore, the multiplied command current signal q is a higher harmonic signal which has an amplitude proportional to the command current signal p2 and which varies 6 times every one period of the detection signals.

Figure 66:
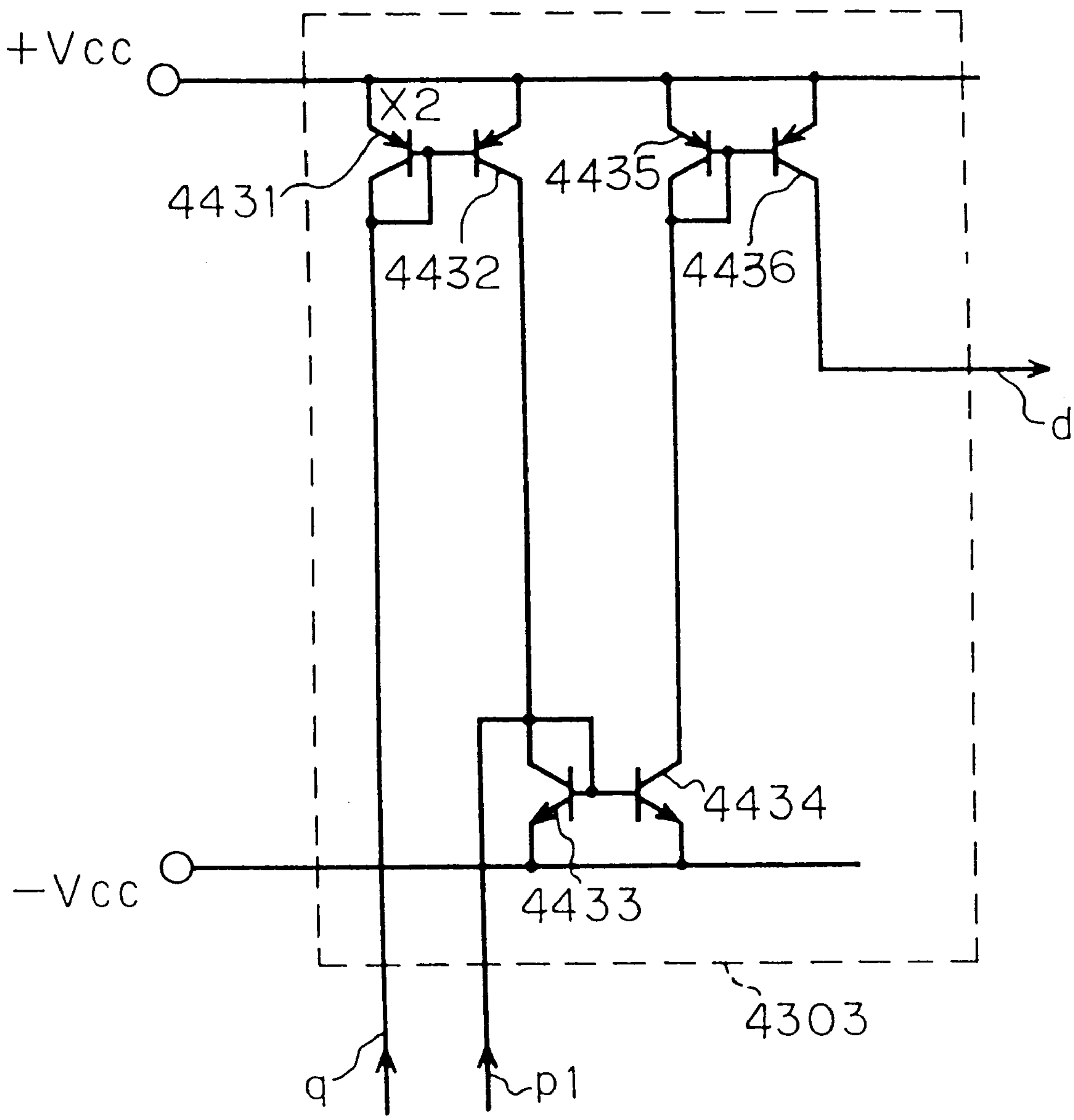
FIG. 66 is a circuit diagram showing a command output circuit 4303 of Embodiment 11.

FIG. 66 specifically shows the configuration of the command output circuit 4303 of the command block 4015. The multiplied command current signal q of the multiplied command output circuit 4302 is input to a current mirror circuit consisting of transistors 4431 and 4432 and reduced in current value to approximately one half. Thereafter, the resulting signal and the first command current signal p1 of the command current circuit 4301 are composed together by addition. The composed command current signal is output as an output current signal d via a current mirror circuit consisting of transistors 4433 and 4434, and that consisting of transistors 4435 and 4436. As a result, the output current signal d of the command block 4015 varies responding with the command signal and contains higher harmonic signal components at a predetermined percentage.

The configuration and operation of the position block 4012 (the position detector 4021, the altering signal producing circuit 4022, and the altering adjusting circuit 4023), the distribution block 4013 (the distributing circuit 4031), and the driving block 4014 (the first driving circuit 4041, the second driving circuit 4042, and the third driving circuit 4043) which are shown in FIG. 63 are the same as those shown in FIGS. 58, 60, and 61. Therefore, their detailed description is omitted.

Figure 67:
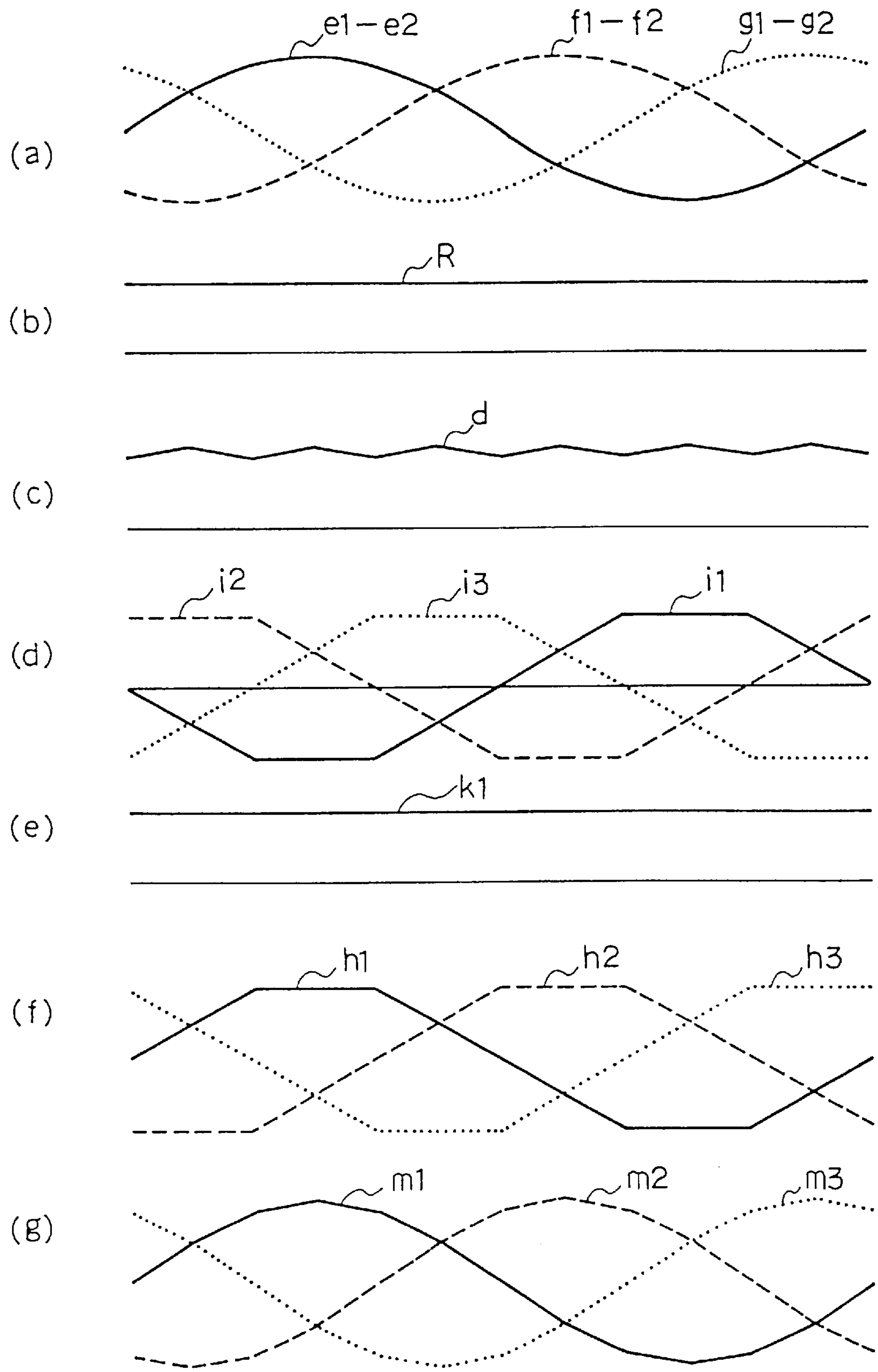
FIG. 67 is a waveform chart of signals of Embodiment 11.

FIG. 67 is a waveform chart illustrating the operation of the embodiment. As the rotational movement (or a relative movement with respect to the three-phase coils) of the field part 4010 proceeds, the position detecting elements 4130A, 4130B, and 4130C which detect the magnetic field of the field part 4010 produce sinusoidal detection signals e1–e2, f1–f2, and g1–g2 [see (a) of FIG. 67 wherein the horizontal axis indicates the rotational position]. In response to the command signal R of a predetermined value [(b) of FIG. 67 wherein the upper portion of the vertical axis corresponds to the negative side], the command current circuit 4301, the multiplied command current circuit 4302, and the command output circuit 4303 of the command block 4015 operate so as to cause the output current signal d of the command block

4015 to contain higher harmonic signal components corresponding to the detection signals, at a predetermined percentage [(c) of FIG. 67]. The altering signal producing circuit 4022 and the altering adjusting circuit 4023 produce three-phase current signals i1, i2, and i3 [(d) of FIG. 67] which analoguely vary responding with the detection signals of the position detector 4021, and three-phase altering signals h1, h2, and h3, and obtains the adjusting signal k1 corresponding to a sum of the absolute values or a sum of the single polarity values of the three-phase current signals i1, i2, and i3 [(e) of FIG. 67 wherein the upper portion of the vertical axis corresponds to the negative side], thereby operating the feedback loop, so that the adjusting signal k1 coincides with the predetermined signal k0. As a result, in correspondence with a result of a comparison of the adjusting signal k1 and the predetermined signal k0, also the amplitudes of the altering signals h1, h2, and h3 are adjusted [(f) of FIG. 67], resulting in that the amplitudes of the altering signals h1, h2, and h3 have a level corresponding to the predetermined signal k0 and hence are not affected by the amplitudes of detection signals. The distributing circuit 4031 produces three-phase distributed signals m1, m2, and m3 corresponding to results of multiplications of the altering signals h1, h2, and h3 by the output current signal d of the command block 4015 [(g) of FIG. 67]. The first driving circuit 4041, the second driving circuit 4042, and the third driving circuit 4043 of the driving block 4014 supply the driving signals Va, Vb, and Vc which are respectively obtained by amplifying the distributed signals m1, m2, and m3, to the three-phase coils 4011A, 4011B, and 4011C.

In the thus configured embodiment, the altering signals h1, h2, and h3, the distributed signals m1, m2, and m3, and the driving signals Va, Vb, and Vc are not affected by variations in the sensitivities of the position detecting elements 4130A, 4130B, and 4130C of the position detector 4021, variations in the magnetic field of the field part 4010, and variations in the gain of the altering signal producing circuit 4022.

In the command block, the output current signal which is proportional to the command signal and which contain higher harmonic signal components corresponding to a higher harmonic signal of the detection signals at a predetermined percentage is produced. When distributed signals which vary responding with a result of a multiplication of the output signal of the command block by the altering signals are produced, the distributed signals m1, m2, and m3, and the driving signals Va, Vb, and Vc can be formed as three-phase sinusoidal signals which analoguely vary responding with the detection signals. Therefore, distortions of the distributed signals and the driving signals are reduced to a very low level, and a uniform torque is generated, so that the motor is smoothly driven.

In the command block, furthermore, the command current circuit produces two command current signals corresponding to the command signal, the multiplied command current circuit produces the multiplied command current signal which is obtained by multiplying one of the command current signals with a higher harmonic signal of the detection signals, and the command output circuit produces the output current signal which is obtained by composing the other command current signal and the multiplied command current signal together. Even when the detection signals vary in amplitude, variations in amplitude of the multiplied command current signal q can be made small and variations in the percentages of higher harmonic signal components contained in the output current signal d of the command block can be reduced. This is because, in the multiplied command current circuit, the transistors 4414, 4415, and 4416 can be operated nonlinearly. In other words, the motor is very resistant to variations in the sensitivities of the position detecting elements and variations in the magnetic field of the field part.

Embodiment 12

FIGS. 68 to 75 show a brushless motor of Embodiment 12 of the invention. In the circuit block diagrams, a connection line to or from circuit block with oblique short bar crossing therewith represents plural connection lines or a connection line for aggregate signals. In Embodiment 12, the positional relationships between coils and position detecting elements are shifted from each other by an electric angle of about 30 deg. additionally, and the detecting elements are positioned between the coils, thereby facilitating the production of a small motor. In accordance with the phase relationships between the position detecting elements and the coils, driving signals which are shifted by 30 deg. as seen from the detection signals of the position detecting elements are applied to the coils, respectively.

Figure 68:
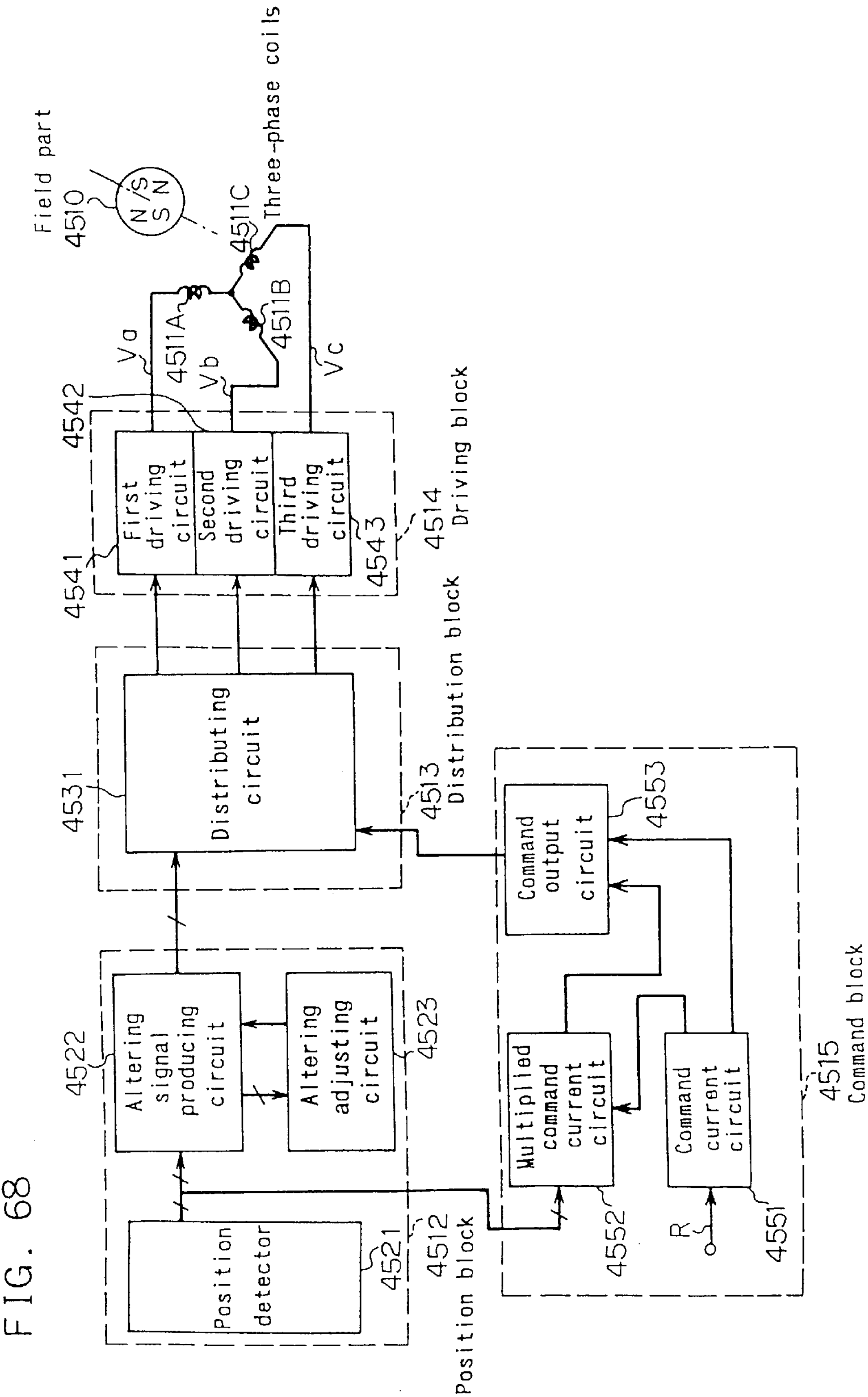
FIG. 68 is a block diagram of Embodiment 12 of the invention.

FIG. 68 shows the whole configuration of the motor. A field part 4510 shown in FIG. 68 is mounted on the rotor or a movable body and forms plural magnetic field poles by means of magnetic fluxes generated by poles of a permanent magnet, thereby generating field magnetic fluxes. Three-phase coils 4511A, 4511B, and 4511C are mounted on the stator or a stationary body and arranged so as to be electrically separated from each other by a predetermined angle (corresponding to 120 deg.) with respect to intercrossing with the magnetic fluxes generated by the field part 4510.

Figure 69:
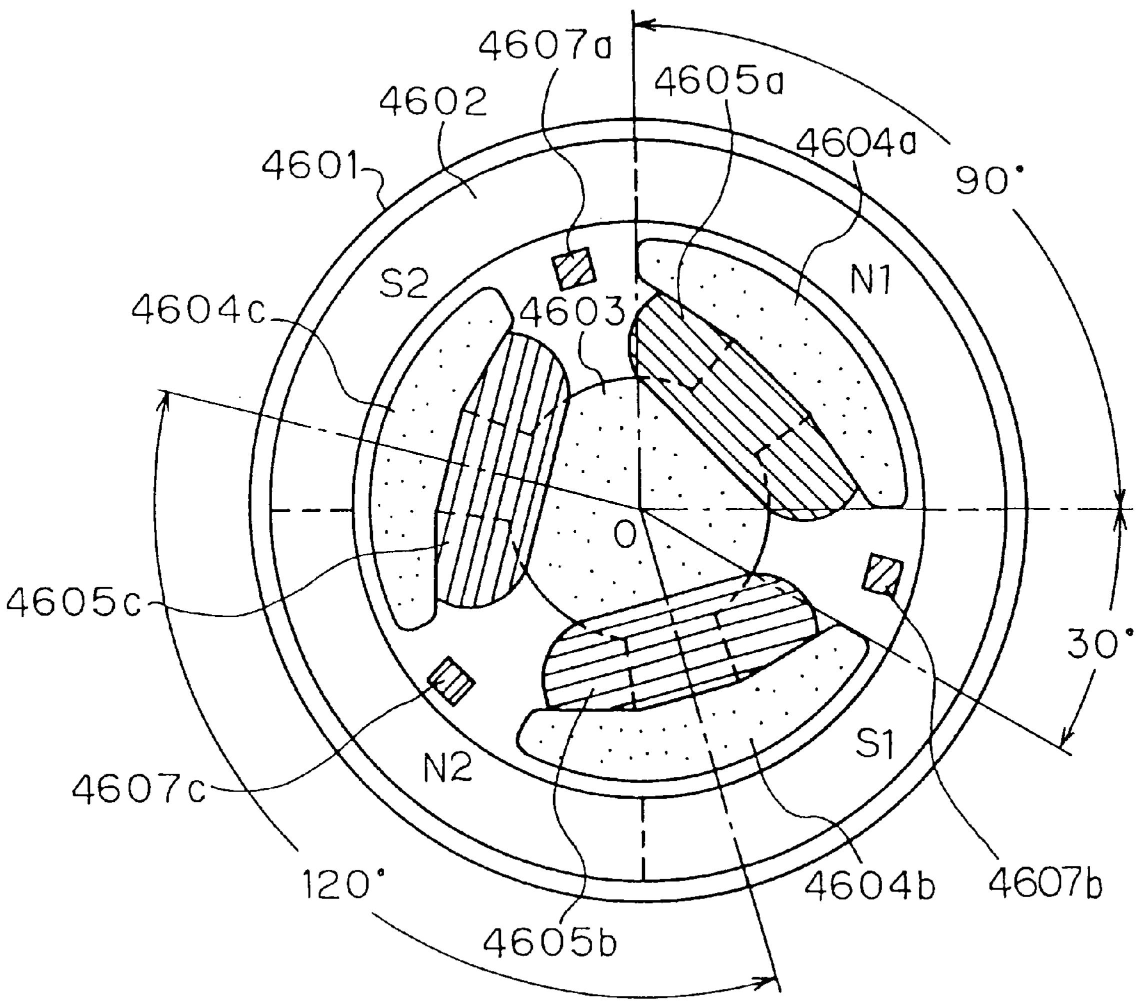
FIG. 69 is a diagram showing the structure of a motor of Embodiment 12.

FIG. 69 specifically shows the configuration of the field part 4510 and the three-phase coils 4511A, 4511B, and 4511C. In an annular permanent magnet 4602 attached to the inner side of the rotor 4601, the inner face is magnetized so as to form four poles, thereby constituting the field part 4510 shown in FIG. 68. An armature core 4603 is placed at a position of the stator which opposes the poles of the permanent magnet 4602. Three salient poles 4604*a*, 4604*b*, and 4604*c* are disposed in the armature core 4603 so as to be positionally separated from each other at intervals of 120 deg. Three-phase coils 4605*a*, 4605*b*, and 4605*c* (corresponding to the three-phase coils 4511A, 4111B, and 4511C of FIG. 68) are wound on the salient poles 4604*a*, 4604*b*, and 4604*c*, respectively. Among the coils 4605*a*, 4605*b*, and 4605*c*, phase differences of 120 deg. in electric angle are established with respect to intercrossing magnetic fluxes from the permanent magnet 4602. Three position detecting elements 4607*a*, 4607*b*, and 4607*c* are arranged on the stator and detect the poles of the permanent magnet 4602, thereby obtaining three-phase detection signals corresponding to relative position between the field part and the coils. In the embodiment, the coils and the position detecting elements are shifted in phase by an electric angle of 120 deg. According to this configuration, the position detecting elements can be disposed between the salient poles of the armature core so as to detect the magnetic field of the inner face portion of the permanent magnet, whereby the motor structure can be miniaturized.

A command block 4515 of FIG. 68 comprises a command current circuit 4551, a multiplied command current circuit 4552, and a command output circuit 4553, and produces an output current signal which contains higher harmonic signal components corresponding to the detection signals, at a predetermined percentage.

Figure 73:
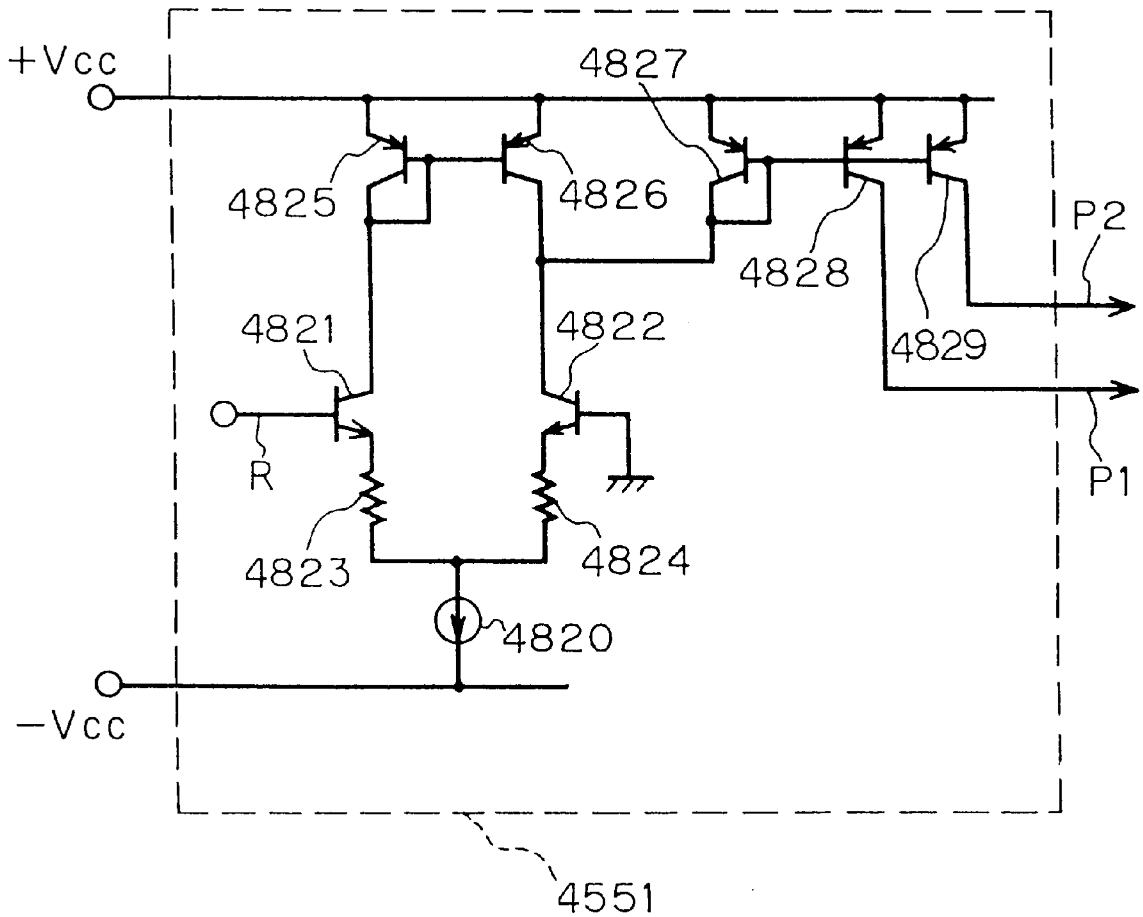
FIG. 73 is a circuit diagram showing a command current circuit 4551 of Embodiment 12.

FIG. 73 specifically shows the configuration of the command current circuit 4551 of the command block 4515. In correspondence with the command signal R, transistors 4821 and 4822, and resistors 4823 and 4824 distribute the value of the current of a constant current source 4820 to the collectors of the transistors 4821 and 4822. The collector currents are compared with each other by a current mirror circuit consisting of transistors 4825 and 4826, and the difference current is output as two command current signals P1 and P2 through a current mirror circuit consisting of transistors 4827, 4828, and 4829. Therefore, the command current circuit 4551 produces the two command current signals P1 and P2 (P1 and P2 are proportional to each other) corresponding to the command signal R. The first command current signal P1 is supplied to the command output circuit 4553, and the second command current signal P2 to the multiplied command current circuit 4552.

Figure 74:
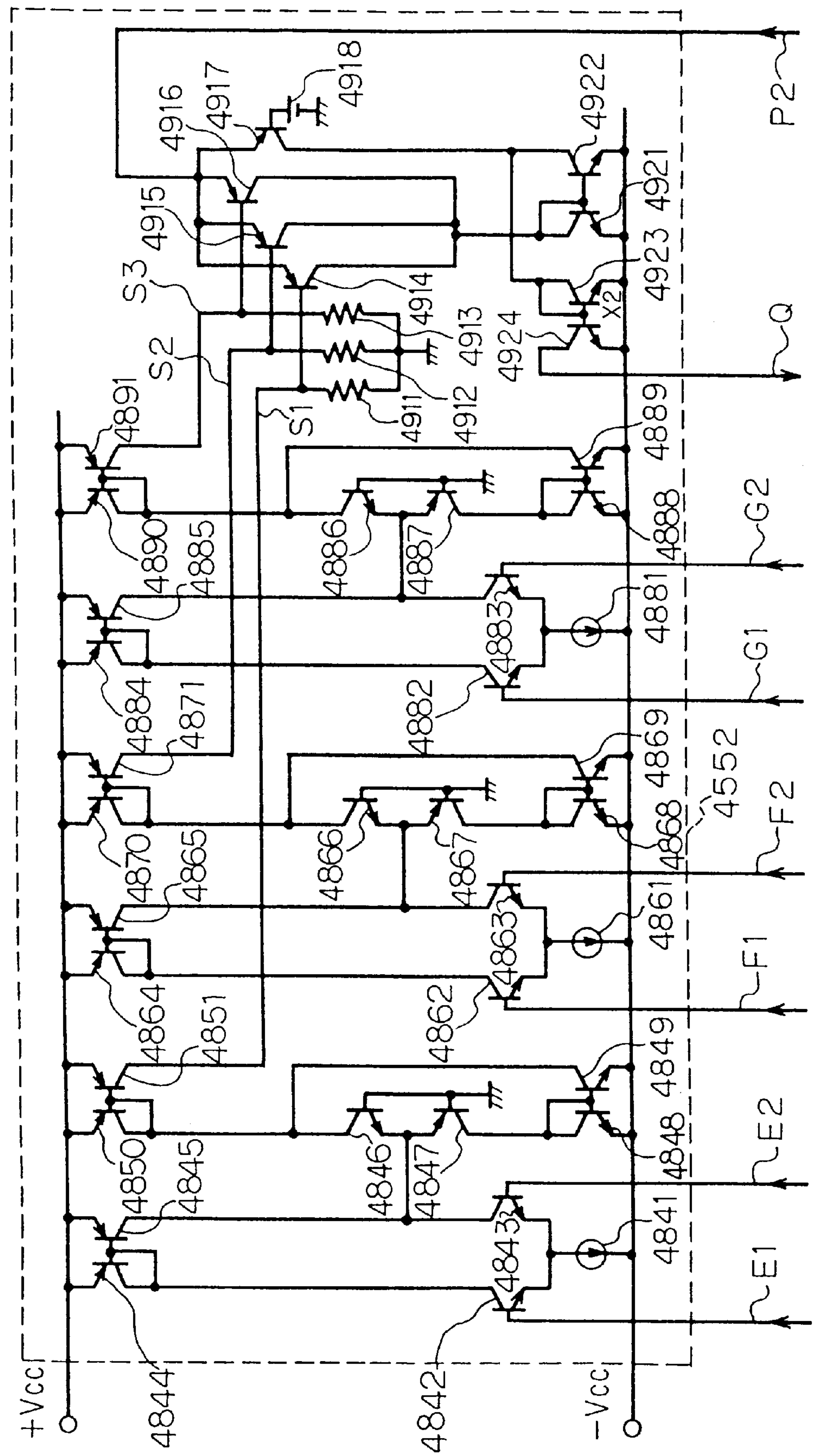
FIG. 74 is a circuit diagram showing a multiplied command current circuit 4552 of Embodiment 12.

FIG. 74 specifically shows the configuration of the multiplied command current circuit 4552 of the command block 4515. In correspondence with detection signals E1 and E2 of the position detecting elements, transistors 4842 and 4843 distribute the value of the current of a constant current source 4841 to the collectors. The difference current is obtained by a current mirror circuit consisting of transistors 4844 and 4845, and a voltage signal S1 corresponding to the absolute value of the difference current is obtained by a combination of transistors 4846, 4847, 4848, 4849, 4850, and 4851, and a resistor 4911. In other words, the voltage signal S1 corresponding to the absolute value of the detection signal E1−E2 is produced. Similarly, a voltage signal S2 corresponding to the absolute value of the detection signal F1−F2 is produced at a resistor 4912, and a voltage signal S3 corresponding to the absolute value of the detection signal G1−G2 is produced at a resistor 4913. Transistors 4914, 4915, 4916, and 4917 compare the three-phase voltage signals S1, S2, and S3 with a predetermined voltage value of a constant voltage source 4918. In correspondence with the difference voltages, the command current signal P2 of the command current circuit 4551 is distributed to the collectors of the transistors. The collector currents of the transistors 4914, 4915, and 4916 are composed together. A current mirror circuit consisting of transistors 4921 and 4922 compares the composed current with the collector current of the transistor 4917. The difference current is input to a current mirror circuit consisting of transistors 4923 and 4924 and reduced in current value to approximately one half. The resulting current is output as a multiplied command current signal Q (inflow current). The multiplied command current signal Q varies responding with results of multiplications of the voltage signals S1, S2, and S3 corresponding to the detection signals by the command current signal P2 corresponding to the command signal R. Particularly, because of the configuration of the transistors 4914, 4915, 4916, and 4917, the multiplied command current signal Q varies responding with a result of a multiplication of the minimum value of the voltage signals S1, S2, and S3 by the command current signal P2. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals.

Figure 75:
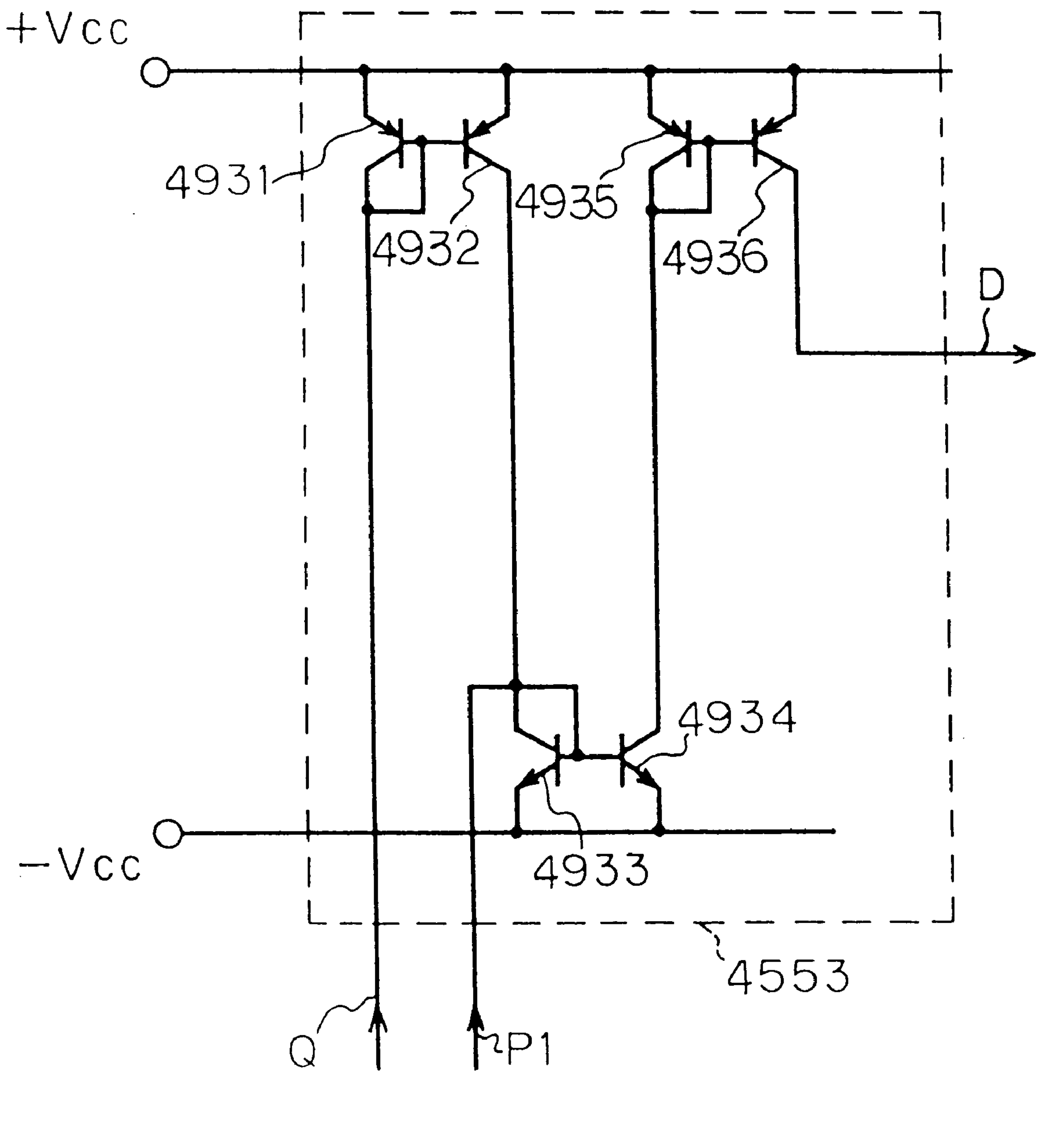
FIG. 75 is a circuit diagram showing a command output circuit 4553 of Embodiment 12.

FIG. 75 specifically shows the configuration of the command output circuit 4553 of the command block 4515. The multiplied command current signal Q of the multiplied command output circuit 4552 is input to a current mirror circuit consisting of transistors 4931 and 4932 and inverted in current direction. Thereafter, the resulting signal and the first command current signal P1 of the command current circuit 4551 are composed together by addition. The composed command current signal is output as an output current signal D via a current mirror circuit consisting of transistors 4933 and 4934, and that consisting of transistors 4935 and 4936. As a result, the output current signal D of the command block 4515 varies responding with the command signal and contains higher harmonic signal components at a predetermined percentage.

A position block 4512 shown in FIG. 68 comprises a position detector 4521, an altering signal producing circuit 4522, and an altering adjusting circuit 4523, produces altering signals from detection signals of position detecting elements of the position detector 4521, and supplies the altering signals to the distributing circuit 4531 of the distribution block 4513.

Figure 70:
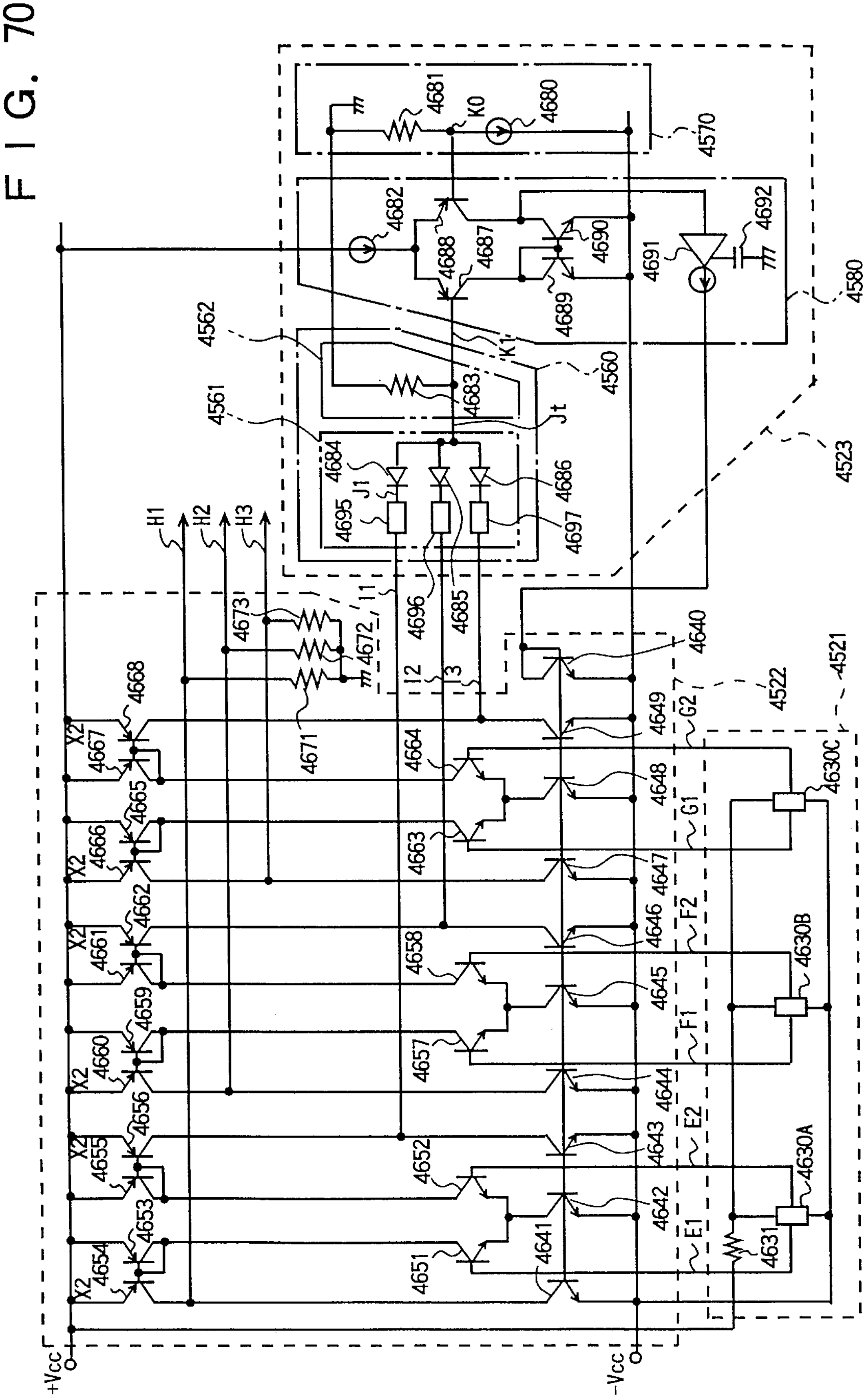
FIG. 70 is a circuit diagram showing a position detector 4521, an altering signal producing circuit 4522, and an altering adjusting circuit 4523 of Embodiment 12.

FIG. 70 specifically shows the configuration of the position detector 4521, the altering signal producing circuit 4522, and the altering adjusting circuit 4523. Position detecting elements 4630A, 4630B, and 4630C of the position detector 4521 correspond to the position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A and then supplied to the bases of differential transistors 4651 and 4652 of the altering signal producing circuit 4522. The differential detection signals F1 and F2 corresponding to the detected magnetic field of the field part 4510 are output from output terminals of the position detecting element 4630B and then supplied to the bases of differential transistors 4657 and 4658. The differential detection signals G1 and G2 corresponding to the detected magnetic field of the field part 4510 are output from output terminals of the position detecting element 4630C and then supplied to the bases of differential transistors 4663 and 4664. As the rotational movement of the field part 4510 proceeds, the detection signals E1, F1, and G1, and E2, F2, and G2 analoguely vary so as to function as three-phase signals which are electrically separated in phase from each other by 120 deg. The detection signals E1 and E2 vary in reversed phase relationships, F1 and F2 vary in reversed phase relationships, and G1 and G2 vary in reversed phase relationships.

Transistors 4640, 4641, 4642, 4643, 4644, 4645, 4646, 4647, 4648, and 4649 of the altering signal producing circuit 4522 constitute a current mirror circuit into which a current of a value proportional to a feedback current signal Ib flows. In correspondence with the detection signals E1 and E2, the differential transistors 4651 and 4652 distribute the value of the current of the transistor 4642 to the collectors. The collector current of the transistor 4651 is amplified two times by a current mirror circuit consisting of transistors 4653 and 4654. A current flowing out from or into the junction of the transistors 4654 and 4641 is supplied to a resistor 4671. An altering signal H1 is produced at the terminal of the resistor 4671. The collector current of the transistor 4652 is amplified two times by a current mirror circuit consisting of transistors 4655 and 4656. A current signal I1 flowing out from or into the junction of the transistors 4656 and 4643 is supplied to the altering adjusting circuit 4523. Similarly, in correspondence with the detection signals F1 and F2, the differential transistors 4657 and 4658 distribute the value of the current of the transistor 4645 to the collectors. The collector current of the transistor 4657 is amplified two times by a current mirror circuit consisting of transistors 4659 and 4660. A current flowing out from or into the junction of the transistors 4660 and 4644 is supplied to a resistor 4672. An altering signal H2 is produced at the terminal of the resistor 4672. The collector current of the transistor 4658 is amplified two times by a current mirror circuit consisting of transistors 4661 and 4662. A current signal I2 flowing out from or into the junction of the transistors 4662 and 4646 is supplied to the altering adjusting circuit 4523. Furthermore, in correspondence with the detection signals G1 and G2, the differential transistors 4663 and 4664 distribute the value of the current of the transistor 4648 to the collectors. The collector current of the transistor 4663 is amplified two times by a current mirror circuit consisting of transistors 4665 and 4666. A current flowing out from or into the junction of the transistors 4666 and 4647 is supplied to a resistor 4673. An altering signal H3 is produced at the terminal of the resistor 4673. The collector current of the transistor 4664 is amplified two times by a current mirror circuit consisting of transistors 4667 and 4668. A current signal I3 flowing out from or into the junction of the transistors 4668 and 4649 is supplied to the altering adjusting circuit 4523.

The altering signals H1, H2, and H3 are three-phase voltage signals which analoguely vary responding with the detection signals, and supplied to the distributing circuit 4531. The current signals I1, I2, and I3 are three-phase current signals which analoguely vary responding with the detection signals, and supplied to the altering adjusting circuit 4523 (in the embodiment, the altering signals H1, H2, and H3, and the current signals I1, I2, and I3 change in reversed phase relationships, but alternatively the signals may change in phase).

The altering adjusting circuit 4523 comprises: an adjusting signal producing circuit 4560 which produces an adjusting signal K1; a setting producing circuit 4570 which produces a predetermined signal K0; and an adjusting comparator 4580 which compares the adjusting signal K1 with the predetermined signal K0. The adjusting signal producing circuit 4560 comprises: an amplitude current circuit 4561 which produces an amplitude current signal Jt varying in proportion to the amplitudes of the detection signals; and an adjusting signal output circuit 4562 which produces the adjusting signal K1 proportional to the amplitude current signal Jt. The amplitude current circuit 4561 comprises: current output circuits 4695, 4696, and 4697 to which the three-phase current signals I1, I2, and I3 are respectively input; and current composition diodes 4684, 4685, and 4686. The current output circuits 4695, 4696, and 4697 output current signals corresponding to the absolute values or the single polarity values of the current signals I1, I2, and I3, respectively. The current output circuits are configured in the same manner as those shown in FIG. 59, and hence their detailed description is omitted.

The output current signals of the current output circuits 4695, 4696, and 4697 of the amplitude current circuit 4561 are composed together via the diodes 4684, 4685, and 4686, thereby obtaining the amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. The adjusting signal output circuit 4562 supplies the amplitude current signal Jt to a resistor 4683, so that the adjusting signal K1 is produced at the terminal of the resistor 4683. Therefore, the amplitude current signal Jt and the adjusting signal K1 vary in proportion to the amplitudes of the detection signals.

The setting producing circuit 4570 supplies the current of a current source 4680 to a resistor 4681, so that the predetermined signal K0 is produced at the terminal of the resistor 4681.

In the adjusting comparator 4580, the adjusting signal K1 is compared with the predetermined signal K0 by a combination of transistors 4687, 4688, 4689, and 4690, and the differential current corresponding to the difference of the signals is input to a current amplifier 4691 which in turn outputs the feedback current signal Ib obtained by amplifying the input current.

In this way, the adjusting signal K1 corresponding to the amplitudes of the three-phase current signals I1, I2, and I3 which are proportional to the detection signals E1, F1, and G1 is produced, and the feedback current signal Ib corresponding to a result of a comparison of the adjusting signal K1 with the predetermined signal K0 is produced. The output currents of the current mirror circuit consisting of the transistors 4640 to 4649 are varied in correspondence with the feedback current signal Ib, thereby varying the three-phase current signals I1, 12, and I3 and the three-phase altering signals H1, H2, and H3. As a result, a feedback loop which adjusts the levels of the three-phase current signals and the adjusting signal in correspondence with a result of a comparison of the adjusting signal with the predetermined signal is configured. According to this configuration, irrespective of the amplitudes of the detection signals E1, F1, and G1 of the position detector 4521, the altering signals H1, H2, and H3 have an amplitude of a predetermined value corresponding to the predetermined signal K0. A capacitor 4692 stabilizes the feedback loop.

The distribution block 4513 of FIG. 68 comprises the distributing circuit 4531, and produces three-phase distributed signals corresponding to results of multiplications of the altering signals of the altering signal producing circuit 4522 by the output signal of the command block 4515.

Figure 71:
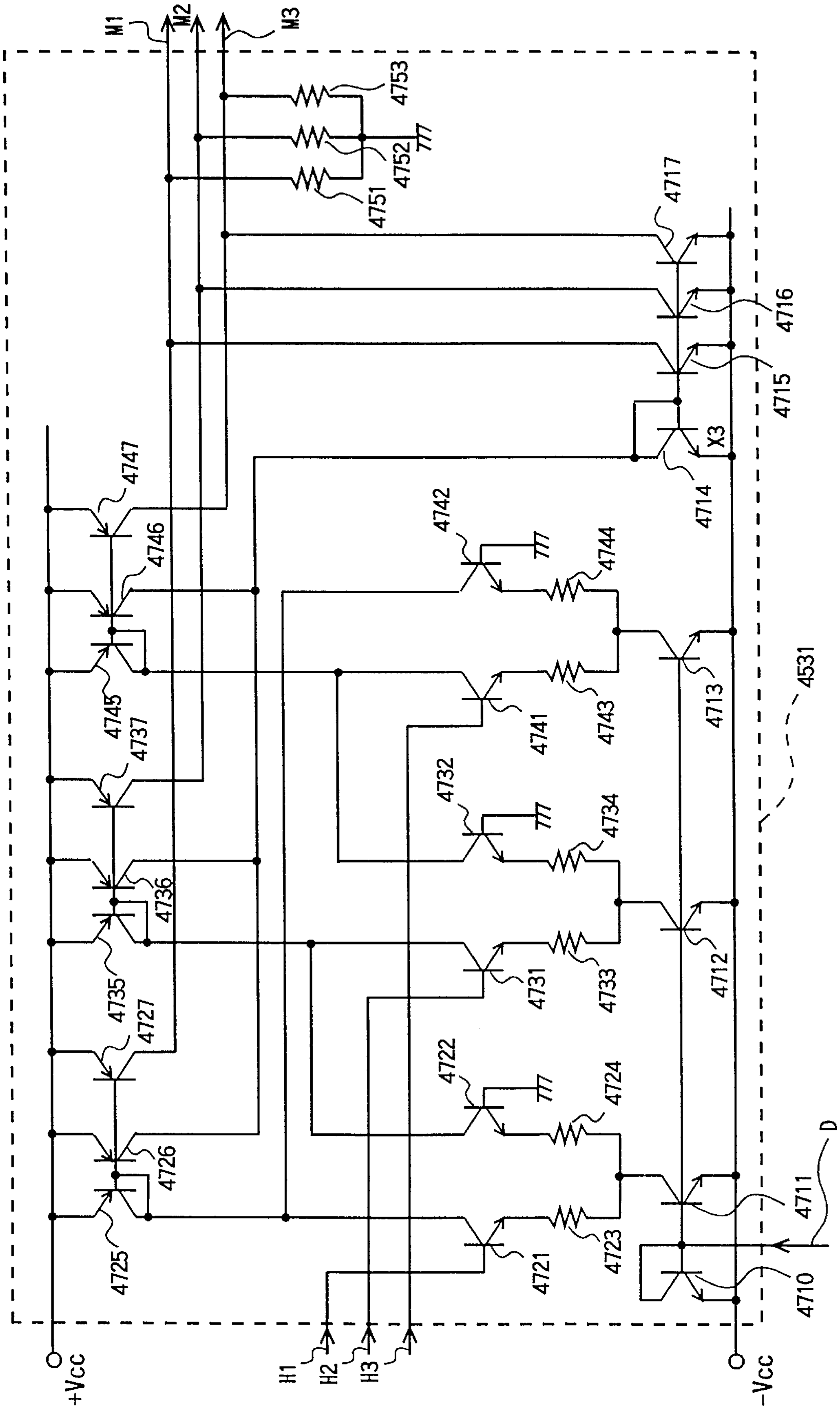
FIG. 71 is a circuit diagram showing a distributing composer 4531 of Embodiment 12.

FIG. 71 specifically shows the configuration of the distributing circuit 4531. The output current signal D of the command output circuit 4553 of the command block 4515 is supplied to a current mirror circuit consisting of transistors 4710, 4711, 4712, and 4713, and a current signal proportional to the output current signal D is output. A combination of transistors 4721 and 4722, and resistors 4723 and 4724 multiplies the altering signal H1 of the altering signal producing circuit 4522 by the output current signal D of the command block 4515. The multiplied current H1·D is output in reversed phase relationships from the collectors of the transistors 4721 and 4722. Similarly, a combination of transistors 4731 and 4732, and resistors 4733 and 4734 multiplies the altering signal H2 of the altering signal producing circuit 4522 by the output current signal D of the command block 4515. The multiplied current H2·D is output in reversed phase relationships from the collectors of the transistors 4731 and 4732. Furthermore, a combination of transistors 4741 and 4742, and resistors 4743 and 4744 multiplies the altering signal H3 of the altering signal producing circuit 4522 by the output current signal D of the command block 4515. The multiplied current H3·D is output in reversed phase relationships from the collectors of the transistors 4741 and 4742. The collector currents of the transistors 4721 and 4742 are composed together, so that a composed current in which the multiplied signals H1·D and H3·D for two phases are composed together by subtraction is produced. The composed current is output with being inverted via a current mirror circuit consisting of transistors 4725, 4726, and 4727. Similarly, the collector currents of the transistors 4731 and 4722 are composed together, so that a composed current in which the multiplied signals H2·D and H1·D for two phases are composed together by subtraction is produced. The composed current is output with being inverted via a current mirror circuit consisting of transistors 4735, 4736, and 4737. Furthermore, the collector currents of the transistors 4741 and 4732 are composed together, so that a composed current in which the multiplied signals H3·D and H2·D for two phases are composed together by subtraction is produced. The composed current is output with being inverted via a current mirror circuit consisting of transistors 4745, 4746, and 4747. The output currents of the transistors 4726, 4736, and 4746 are composed together. The composed current is supplied to a current mirror circuit consisting of transistors 4714, 4715, 4716, and 4717 and a current in which the level of the composed current is reduced to about one third is obtained. The difference current of the output current of the transistor 4727 and that of the transistor 4715 is produced. The difference current is supplied to a resistor 4751, so that a distributed signal M1 is obtained at the terminal of the resistor 4751. Similarly, the difference current of the output current of the transistor 4737 and that of the transistor 4716 is produced. The difference current is supplied to a resistor 4752, so that a distributed signal M2 is obtained at the terminal of the resistor 4752. Furthermore, the difference current of the output current of the transistor 4747 and that of the transistor 4717 is produced. The difference current is supplied to a resistor 4753, so that a distributed signal M3 is obtained at the terminal of the resistor 4753. In this way, the multiplied current signals of the altering signals and the output signal of the command block are obtained, and the distributed signals in which multiplied current signals for at least two phases are composed together are produced, whereby the distributed signals are shifted in phase by about 30 deg. from the detection signals of the position detector.

The driving block 4514 of FIG. 68 comprises a first driving circuit 4541, a second driving circuit 4542, and a third driving circuit 4543, and supplies driving signals Va, Vb, and Vc, which are obtained by amplifying the distributed signals M1, M2, and M3 of the distributing circuit 4531 of the distribution block 4513, to the terminals of the three-phase coils 4511A, 4511B, and 4511C.

Figure 72:
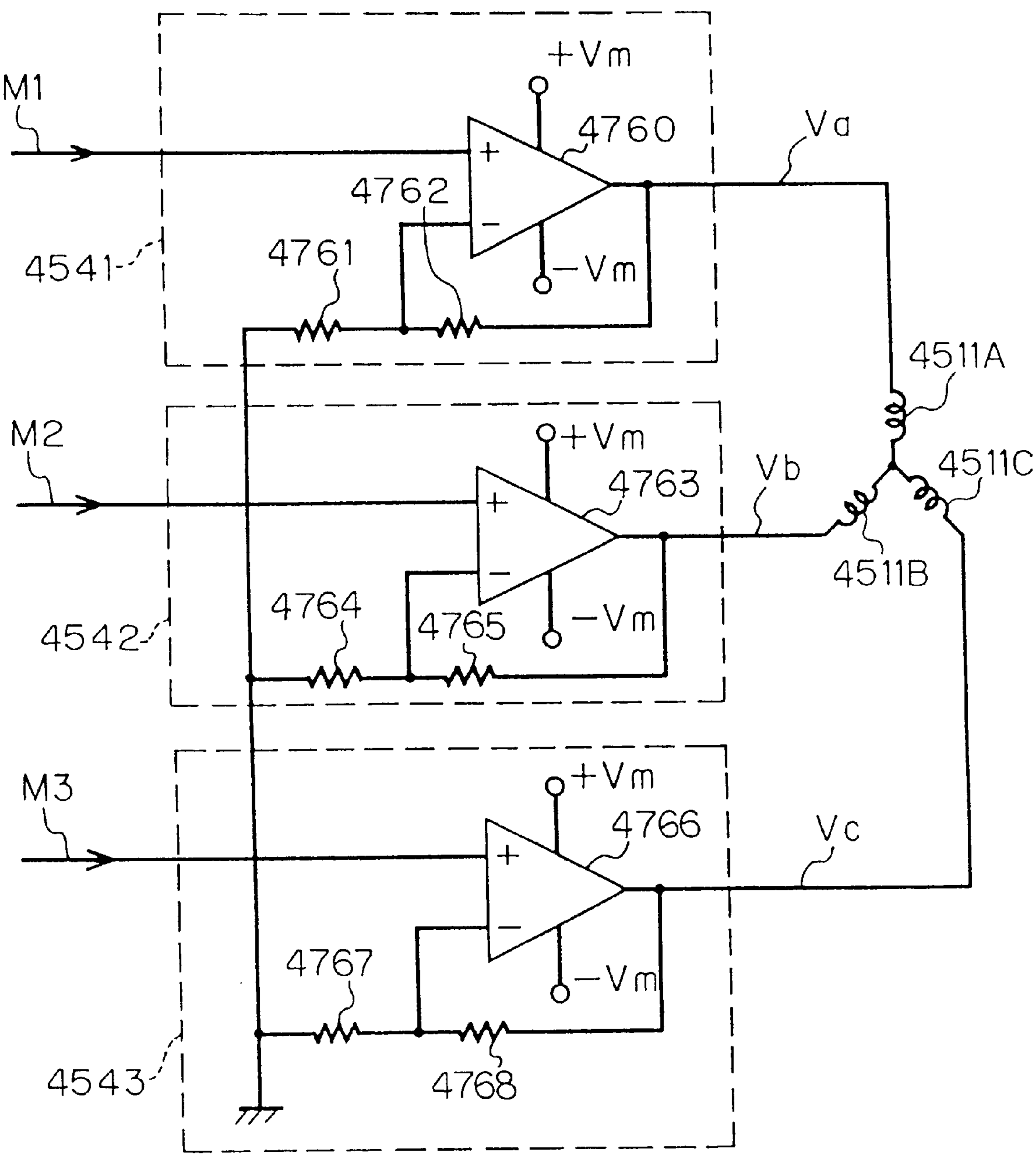
FIG. 72 is a circuit diagram showing a first driving circuit 4541; a second driving circuit 4542, and a third driving circuit 4543 of Embodiment 12.

FIG. 72 specifically shows the configuration of the first driving circuit 4541, the second driving circuit 4542, and the third driving circuit 4543 of the driving block 4514. The distributed signal M1 is input to the noninverting terminal of an amplifier 4760 of the first driving circuit 4541 and then amplified at an amplification factor defined by resistors 4761 and 4762, thereby producing the driving signal Va. The driving signal Va is supplied to the power input terminal of the coil 4511A. Similarly, the distributed signal M2 is input to the noninverting terminal of an amplifier 4763 of the second driving circuit 4542 and then amplified at an amplification factor defined by resistors 4764 and 4765, thereby producing the driving signal Vb. The driving signal Vb is supplied to the power input terminal of the coil 4511B. Furthermore, the distributed signal M3 is input to the noninverting terminal of an amplifier 4766 of the third driving circuit 4543 and then amplified at an amplification factor defined by resistors 4767 and 4768, thereby producing the driving signal Vc. The driving signal Vc is supplied to the power input terminal of the coil 4511C. The amplifiers 4760, 4763, and 4766 are supplied with power source voltages +Vm and −Vm (+Vm=15 V, −Vm=−15 V).

As a result of the supply of the driving signals Va, Vb, and Vc, three-phase driving currents are supplied to the three-phase coils 4511A, 4511B, and 4511C, so that a driving force is generated in a predetermined direction by electromagnetic interaction between the currents of the coils and the magnetic fluxes of the field part 4510.

Figure 76:
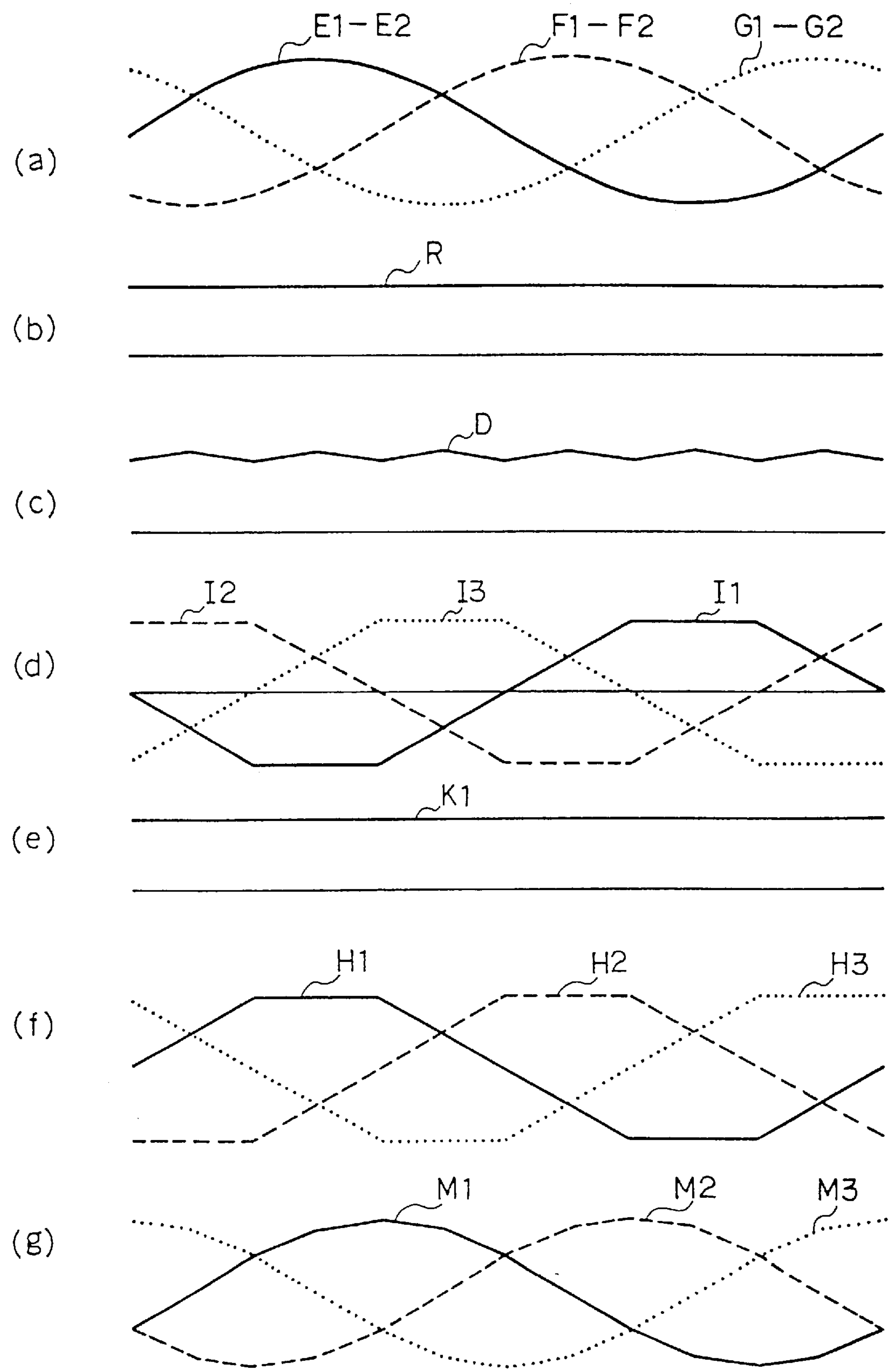
FIG. 76 is a waveform chart of signals of Embodiment 12.

FIG. 76 is a waveform chart illustrating the operation of the embodiment. As the rotational movement (or a relative movement with respect to the three-phase coils) of the field part 4510 proceeds, the position detecting elements 4630A, 4630B, and 4630C which detect the magnetic field of the field part 4510 produce sinusoidal detection signals E1–E2, F1–F2, and G1–G2 [see (a) of FIG. 80 wherein the horizontal axis indicates the rotational position]. In response to the command signal R of a predetermined value [(b) of FIG. 80 wherein the upper portion of the vertical axis corresponds to the negative side], the command current circuit 4551, the multiplied command current circuit 4552, and the command output circuit 4553 of the command block 4515 operate so as to cause the output current signal D of the command block 4515 to contain higher harmonic signal components corresponding to the detection signals, at a predetermined percentage [(c) of FIG. 80]. The altering signal producing circuit 4522 and the altering adjusting circuit 4523 produce three-phase current signals I1, I2, and I3 [(d) of FIG. 80] which analoguely vary responding with the detection signals of the position detector 4521, and three-phase altering signals H1, H2, and H3, and obtains the adjusting signal K1 corresponding to a sum of the absolute values or a sum of the single polarity values of the three-phase current signals I1, I2, and I3 [(e) of FIG. 80 wherein the upper portion of the vertical axis corresponds to the negative side], thereby operating the feedback loop, so that the adjusting signal K1 coincides with the predetermined signal K0. As a result, in correspondence with a result of a comparison of the adjusting signal K1 with the predetermined signal K0, also the amplitudes of the altering signals H1, H2, and H3 are adjusted [(f) of FIG. 80], resulting in that the amplitudes of the altering signals H1, H2, and H3 have a level corresponding to the predetermined signal K0 and hence are not affected by the amplitudes of detection signals. The distributing circuit 4531 produces three-phase distributed signals M1, M2, and M3 corresponding to results of multiplications of the altering signals H1, H2, and H3 by the output current signal D of the command block 4515. Particularly, the distributed signals are produced by composing multiplied current signals for at least two phases together, whereby the distributed signals M1, M2, and M3 are shifted in phase by about 30 deg. from the detection signals E1–E2, F1–F2, and G1–G2 [(g) of FIG. 80]. The first driving circuit 4541, the second driving circuit 4542, and the third driving circuit 4543 of the driving block 4514 supply the driving signals Va, Vb, and Vc which are respectively obtained by amplifying the distributed signals M1, M2, and M3, to the three-phase coils 4511A, 4511B, and 4511C.

In the thus configured embodiment, the adjusting signal which varies in proportion to the amplitudes of the detection signals is produced, and the amplitudes of the altering signals are adjusted in accordance with a result of a comparison of the adjusting signal with the predetermined signal. As a result, the altering signals H1, H2, and H3, the distributed signals M1, M2, and M3, and the driving signals Va, Vb, and Vc are not affected by variations in the sensitivities of the position detecting elements 4630A, 4630B, and 4630C of the position detector 4521, variations in the magnetic field of the field part 4510, and variations in the gain of the altering signal producing circuit 4522.

In the altering signal producing circuit 4522 and the altering adjusting circuit 4523, the adjusting signal in corresponding to a sum of single polarity values or absolute values of three-phase current signals is produced, and the amplitudes of the altering signals are adjusted in correspondence with the adjusting signal. Therefore, the adjusting signal which varies in proportion to the amplitudes of the detection signals can be always obtained by a simple circuit configuration, and thereby correct adjustment is enabled.

As required, the command block may be configured in the same manner as the embodiment, an output signal may be produced which is proportional to the command signal and which contains higher harmonic signal components corresponding to a higher harmonic signal of the detection signals at a predetermined percentage, and distributed signals which vary responding with results of multiplications of the output signal by the altering signals may be produced. According to this configuration, the distributed signals M1, M2, and M3, and the driving signals Va, Vb, and Vc can be formed as three-phase sinusoidal signals which analoguely vary responding with the detection signals. Therefore, distortions of the distributed signals and the driving signals are reduced to a very low level, and a uniform torque is generated, so that the motor is smoothly driven.

In the command block, furthermore, the command current circuit produces the two command current signals corresponding to the command signal, the multiplied command current circuit produces the multiplied command current signal which is obtained by multiplying one of the command current signals by a higher harmonic signal of the detection signals, and the command output circuit produces the output current signals which are obtained by composing the other command current signal and the multiplied command current signal together. Even when the detection signals vary in amplitude, variations in amplitude of the multiplied command current signal can be made small and variations in the percentages of higher harmonic signal components contained in the output current signal D of the command block can be reduced. This is because, in the multiplied command current circuit, the transistors 4914, 4915, and 4916 can be operated nonlinearly. In other words, the motor is very resistant to variations in the sensitivities of the position detecting elements and variations in the magnetic field of the field part.

In the thus configured embodiment, furthermore, the position detecting elements can be disposed between the salient poles of the armature core, and the motor structure can be miniaturized.

Embodiment 13

FIGS. 77 to 80 show a brushless motor of Embodiment 13 of the invention. Also in the embodiment, the positional relationships between coils and position detecting elements are shifted from each other by an electric angle of about 30 deg. additionally, and the detecting elements are positioned between the coils, thereby facilitating the production of a small motor.

Figure 77:
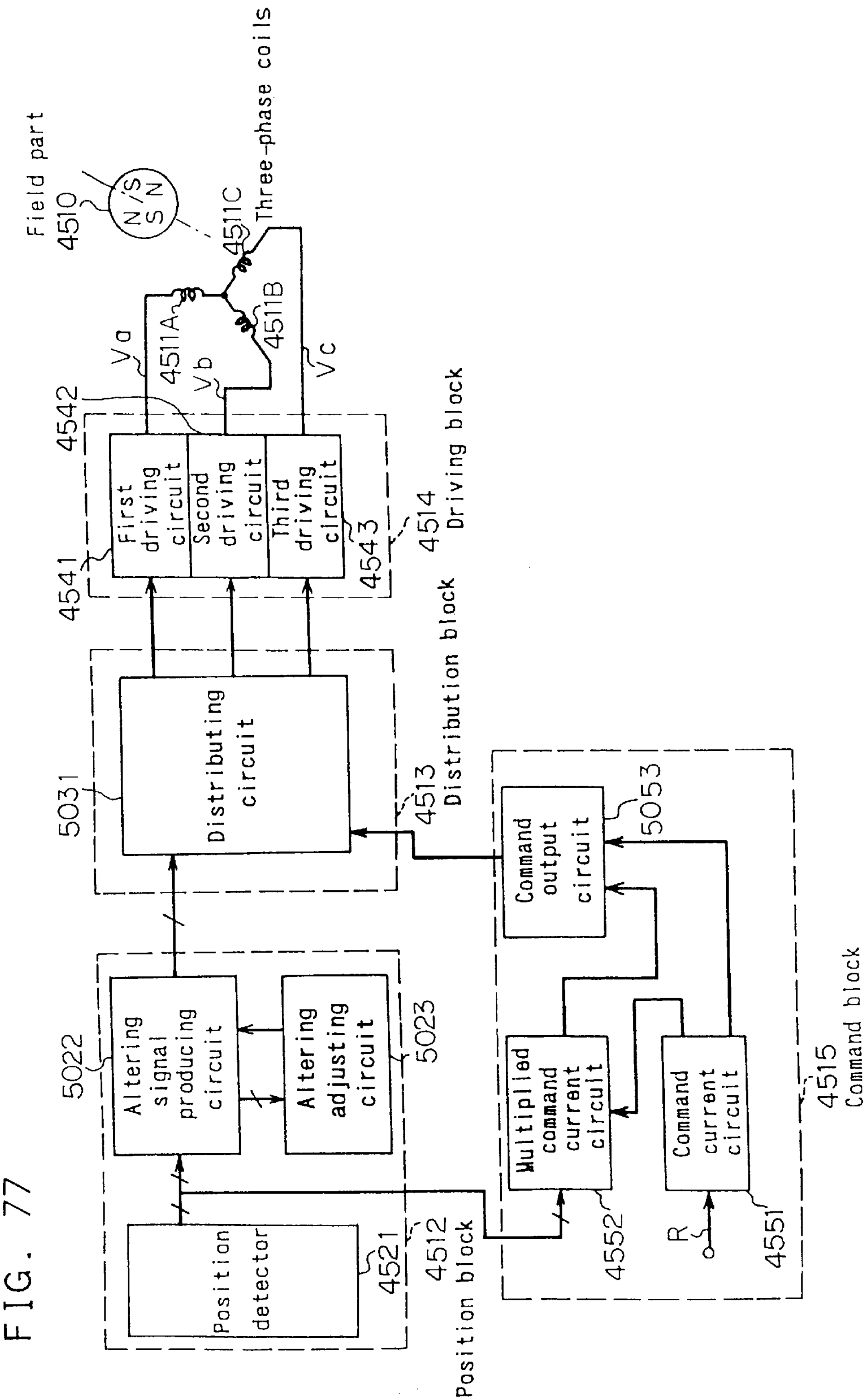
FIG. 77 is a block diagram of Embodiment 13 of the invention.

FIG. 77 shows the whole configuration of the motor. In the embodiment, altering signals which are shifted by about 30 deg. in electric angle from the detection signals of the position detecting elements are produced by an altering signal producing circuit 5022. So a distributing circuit 5031 of a distribution block 4513 does not shift the phases of the signals. A command output circuit 5053 of a command block 4515 is configured so as to compose a command current signal and a multiplied command current signal together by subtraction. The components which are identical with those of Embodiment 12 are designated by the same reference numerals.

Figure 78:
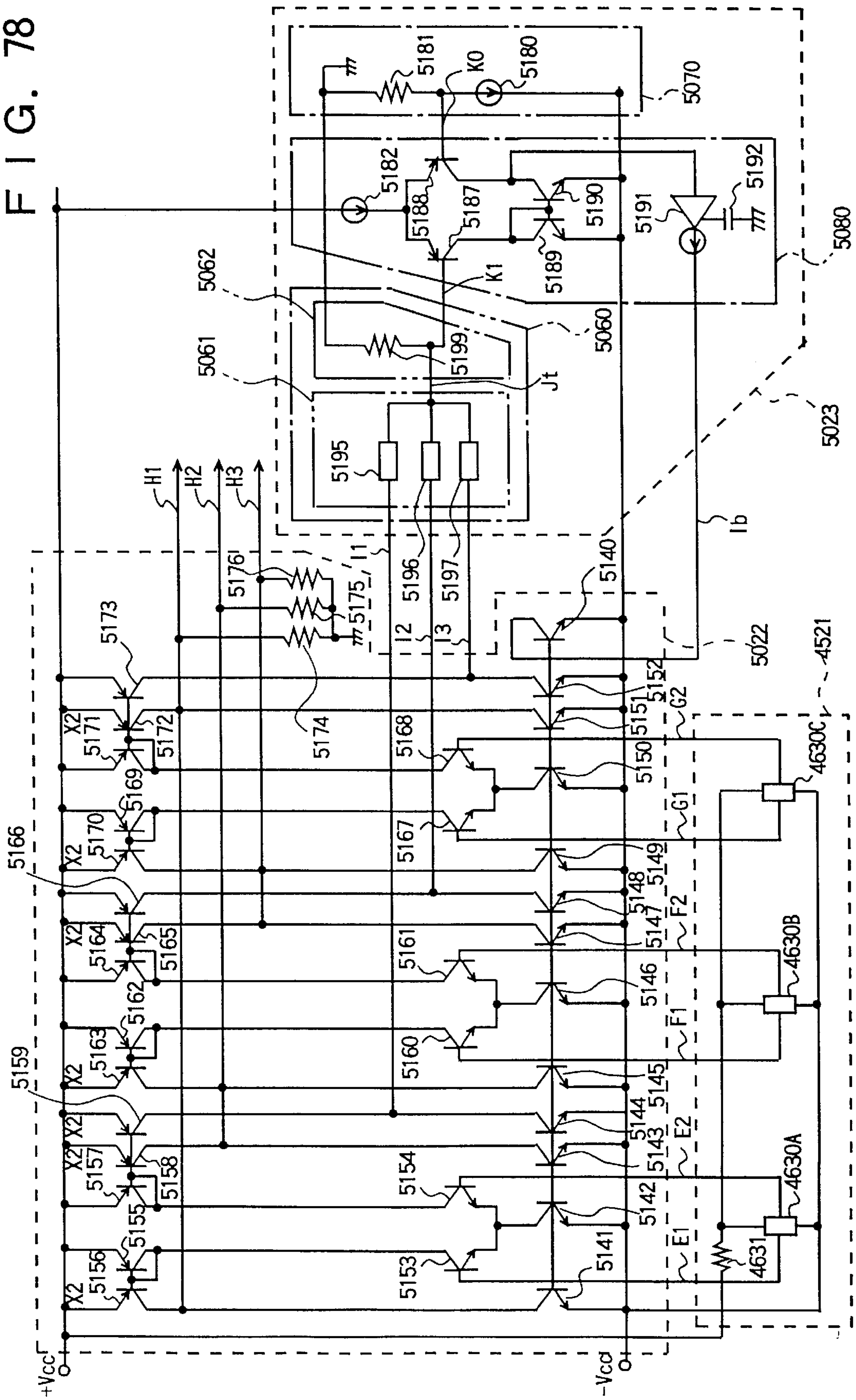
FIG. 78 is a circuit diagram showing a position detector 4521, an altering signal producing circuit 5022, and an altering adjusting circuit 5023 of Embodiment 13.

FIG. 78 specifically shows the configuration of the position detector 4521, the altering signal producing circuit 5022, and the altering adjusting circuit 5023 of the position block 4512. Position detecting elements 4630A, 4630B, and 4630C of the position detector 4521 correspond to the position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A and then supplied to the bases of differential transistors 5153 and 5154 of the altering signal producing circuit 5022. The differential detection signals F1 and F2 corresponding to the detected magnetic field are output from output terminals of the position detecting element 4630B and then supplied to the bases of differential transistors 5160 and 5161. The differential detection signals G1 and G2 corresponding to the detected magnetic field are output from output terminals of the position detecting element 4630C and then supplied to the bases of differential transistors 5167 and 5168. As the rotational movement of the field part 4510 proceeds, the detection signals E1, F1, and G1 analoguely vary so as to function as three-phase signals which are electrically separated in phase from each other by 120 deg.

Transistors 5140, 5141, 5142, 5143, 5144, 5145, 5146, 5147, 5148, 5149, 5150, 5151, and 5152 of the altering signal producing circuit 5022 constitute a current mirror circuit into which a current of a value proportional to a feedback current signal Ib flows. In correspondence with the detection signals E1 and E2, the differential transistors 5153 and 5154 distribute the value of the current of the transistor 5142 to the collectors. The collector current of the transistor 5153 is amplified two times by a current mirror circuit consisting of transistors 5155 and 5156. A current flowing out from or into the junction of the transistors 5156 and 5141 is supplied to a resistor 5174. The collector current of the transistor 5154 is amplified two times by a current mirror circuit consisting of transistors 5157, 5158, and 5159. A current flowing out from or into the junction of the transistors 5158 and 5143 is supplied to a resistor 5175. A current signal I1 flowing out from or into the junction of the transistors 5159 and 5144 is supplied to the altering adjusting circuit 5023. Similarly, in correspondence with the detection signals F1 and F2, the differential transistors 5160 and 5161 distribute the value of the current of the transistor 5146 to the collectors. The collector current of the transistor 5160 is amplified two times by a current mirror circuit consisting of transistors 5162 and 5163. A current flowing out from or into the junction of the transistors 5163 and 5145 is supplied to a resistor 5175. The collector current of the transistor 5161 is amplified two times by a current mirror circuit consisting of transistors 5164, 5165, and 5166. A current flowing out from or into the junction of the transistors 5165 and 5147 is supplied to a resistor 5176. A current signal I2 flowing out from or into the junction of the transistors 5166 and 5148 is supplied to the altering adjusting circuit 5023. Furthermore, in correspondence with the detection signals G1 and G2, the differential transistors 5167 and 5168 distribute the value of the current of the transistor 5150 to the collectors. The collector current of the transistor 5167 is amplified two times by a current mirror circuit consisting of transistors 5169 and 5170. A current flowing out from or into the junction of the transistors 5170 and 5149 is supplied to a resistor 5176. The collector current of the transistor 5168 is amplified two times by a current mirror circuit consisting of transistors 5171, 5172, and 5173. A current flowing out from or into the junction of the transistors 5172 and 5151 is supplied to a resistor 5174. A current signal I3 flowing out from or into the junction of the transistors 5173 and 5152 is supplied to the altering adjusting circuit 5023. An altering signal H1 is produced at the terminal of the resistor 5174 by composing the signals corresponding to two phases of the position signals E1 and G1. Another altering signal H2 is produced at the terminal of the resistor 5175 by composing the signals corresponding to two phases of the position signals F1 and E1. Still other altering signal H3 is produced at the terminal of the resistor 5176 by composing the signals corresponding to two phases of the position signals G1 and F1.

The altering signals H1, H2, and H3 are three-phase voltage signals which analoguely vary responding with the detection signals, and supplied to the distributing circuit 5031. The altering signals are signals in which at least two phases of the detection signals are composed together, and are shifted in phase by about 30 deg. from the detection signals. The current signals I1, I2, and I3 are three-phase current signals which analoguely vary responding with the detection signals, and supplied to the altering adjusting circuit 5023.

The altering adjusting circuit 5023 comprises: an adjusting signal producing circuit 5060 which produces an adjusting signal K1; a setting producing circuit 5070 which produces a predetermined signal K0; and an adjusting comparator 5080 which compares the adjusting signal K1 with the predetermined signal K0. The adjusting signal producing circuit 5060 comprises: an amplitude current circuit 5061 which produces an amplitude current signal Jt proportional to the amplitudes of the detection signals; and an adjusting signal output circuit 5062 which produces the adjusting signal K1 proportional to the amplitude current signal Jt. The amplitude current circuit 5061 comprises current output circuits 5195, 5196, and 5197 to which the three-phase current signals I1, I2, and I3 are respectively input. The current output circuits 5195, 5196, and 5197 output current signals corresponding to the absolute values or the single polarity values of the current signals I1, I2, and I3, respectively. The current output circuits are configured in the same manner as those shown in FIG. 59, and hence their detailed description is omitted.

The output current signals of the current output circuits 5195, 5196, and 5197 of the amplitude current circuit 5061 are composed together, thereby obtaining the amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. The adjusting signal output circuit 5062 supplies the amplitude current signal Jt to a resistor 5199, so that the adjusting signal K1 is produced at the terminal of the resistor 5199. Therefore, the adjusting signal K1 vary in proportion to the amplitudes of the detection signals.

The setting producing circuit 5070 supplies the current of a current source 5180 to a resistor 5181, so that the predetermined signal K0 is produced at the terminal of the resistor 5181.

In the adjusting comparator 5080, the adjusting signal K1 is compared with the predetermined signal K0 by a combination of transistors 5187, 5188, 5189, and 5190, and the differential current corresponding to the difference of the signals is input to a current amplifier 5191 which in turn outputs the feedback current signal Ib obtained by amplifying the input current.

In this way, the adjusting signal K1 corresponding to the amplitudes of the three-phase current signals I1, I2, and I3 which are proportional to the detection signals E1, F1, and G1 is produced, and the feedback current signal Ib corresponding to a result of a comparison of the adjusting signal K1 with the predetermined signal K0 is produced. The output currents of the current mirror circuit consisting of the transistors 5140 to 5152 are varied in correspondence with the feedback current signal Ib, thereby varying the amplitudes of the three-phase current signals I1, I2, and I3 and the three-phase altering signals H1, H2, and H3. As a result, a feedback loop which adjusts the amplitudes of the three-phase altering signals and the level of the adjusting signal in correspondence with a result of a comparison of the adjusting signal K1 with the predetermined signal K0 is configured. According to this configuration, irrespective of the amplitudes of the detection signals E1, F1, and G1 of the position detector 4521, the altering signals H1, H2, and H3 have an amplitude of a predetermined value corresponding to the predetermined signal K0. A capacitor 5192 stabilizes the feedback loop.

The distribution block 4513 of FIG. 77 comprises the distributing circuit 5031, and produces distributed signals corresponding to results of multiplications of the altering signals of the altering signal producing circuit 5022 by the output signal of the command block 4515.

Figure 79:
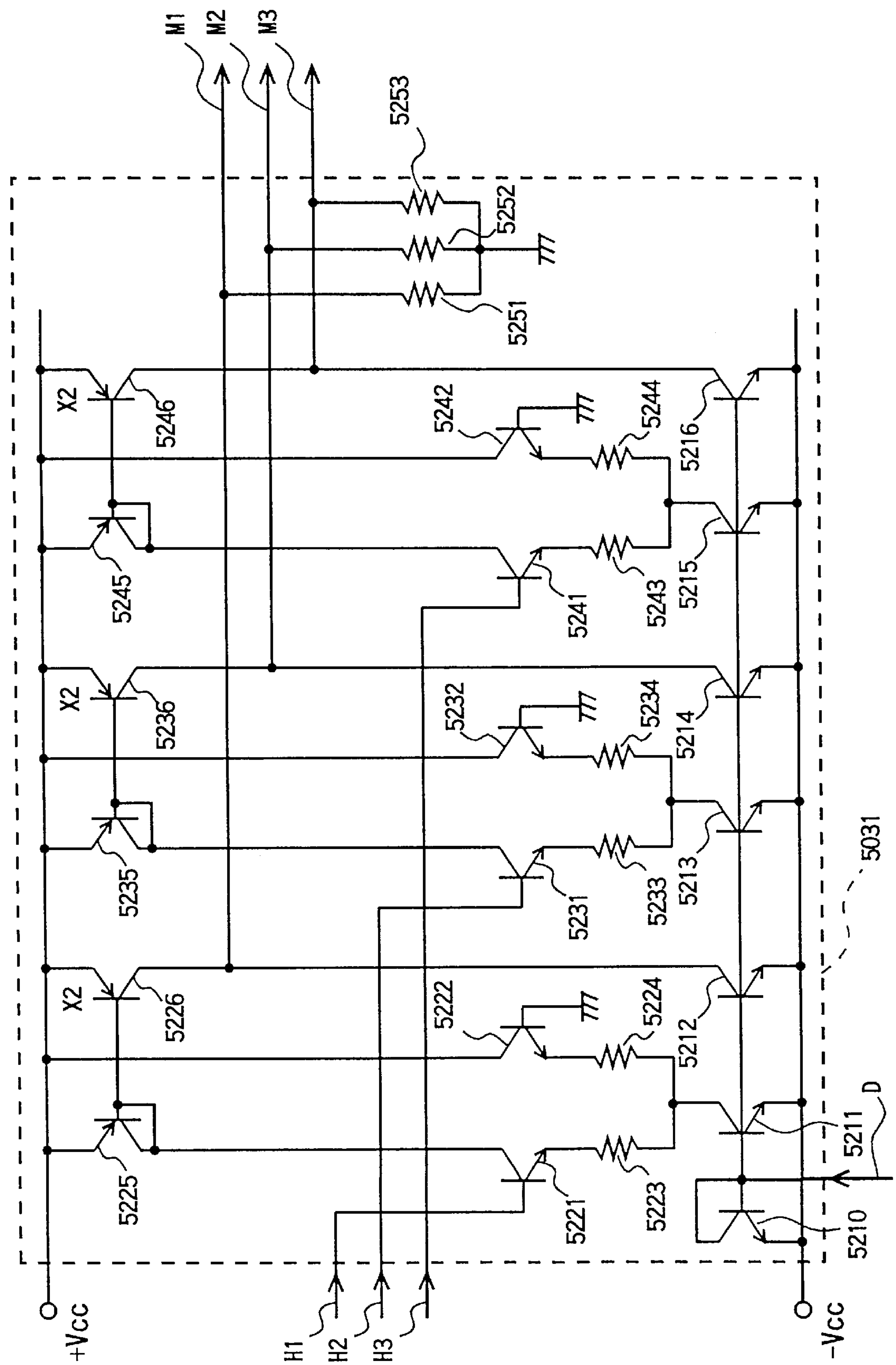
FIG. 79 is a circuit diagram showing a distributing composer 5031 of Embodiment 13.

FIG. 79 specifically shows the configuration of the distributing circuit 5031. The output current signal D of the command output circuit 5053 of the command block 4515 is supplied to a current mirror circuit consisting of transistors 5210, 5211, 5212, 5213, 5214, 5215, and 5216, and a current signal proportional to the output current signal D is output. A combination of transistors 5221 and 5222, and resistors 5223 and 5224 multiplies the altering signal H1 of the altering signal producing circuit 5022 by the output current signal D of the command block 4515. The multiplied current of H1·D is output from the collector of the transistor 5221. The collector current of the transistor 5221 is amplified two times by a current mirror circuit consisting of transistors 5225 and 5226. A current flowing out from or into the junction of the transistors 5226 and 5212 is supplied to a resistor 5251, so that a distributed signal M1 is obtained at the terminal of the resistor 5251. Therefore, the distributed signal M1 is proportional to the multiplied current H1·D. Similarly, a combination of transistors 5231 and 5232, and resistors 5233 and 5234 multiplies the altering signal H2 of the altering signal producing circuit 5022 by the output current signal D of the command block 4515. The multiplied current H2·D is output from the collector of the transistor 5231. The collector current of the transistor 5231 is amplified two times by a current mirror circuit consisting of transistors 5235 and 5236. A current flowing out from or into the junction of the transistors 5236 and 5214 is supplied to a resistor 5252, so that a distributed signal M2 is obtained at the terminal of the resistor 5252. Therefore, the distributed signal M2 is proportional to the multiplied current H2·D. Furthermore, a combination of transistors 5241 and 5242, and resistors 5243 and 5244 multiplies the altering signal H3 of the altering signal producing circuit 5022 by the output current signal D of the command block 4515. The multiplied current H3·D is output from the collector of the transistor 5241. The collector current of the transistor 5241 is amplified two times by a current mirror circuit consisting of transistors 5245 and 5246. A current flowing out from or into the junction of the transistors 5246 and 5216 is supplied to a resistor 5253, so that a distributed signal M3 is obtained at the terminal of the resistor 5253. Therefore, the distributed signal M3 is proportional to the multiplied current H3·D.

The driving block 4514 of FIG. 77 comprises a first driving circuit 4541, a second driving circuit 4542, and a third driving circuit 4543, and supplies driving signals Va, Vb, and Vc, which are obtained by amplifying the distributed signals M1, M2, and M3 of the distributing circuit 5031 of the distribution block 4513, to the terminals of the three-phase coils 4511A, 4511B, and 4511C. The configuration and operation of the first driving circuit 4541, the second driving circuit 4542, and the third driving circuit 4543 of the driving block 4514 are the same as those of FIG. 72, and hence their detailed description is omitted.

Figure 80:
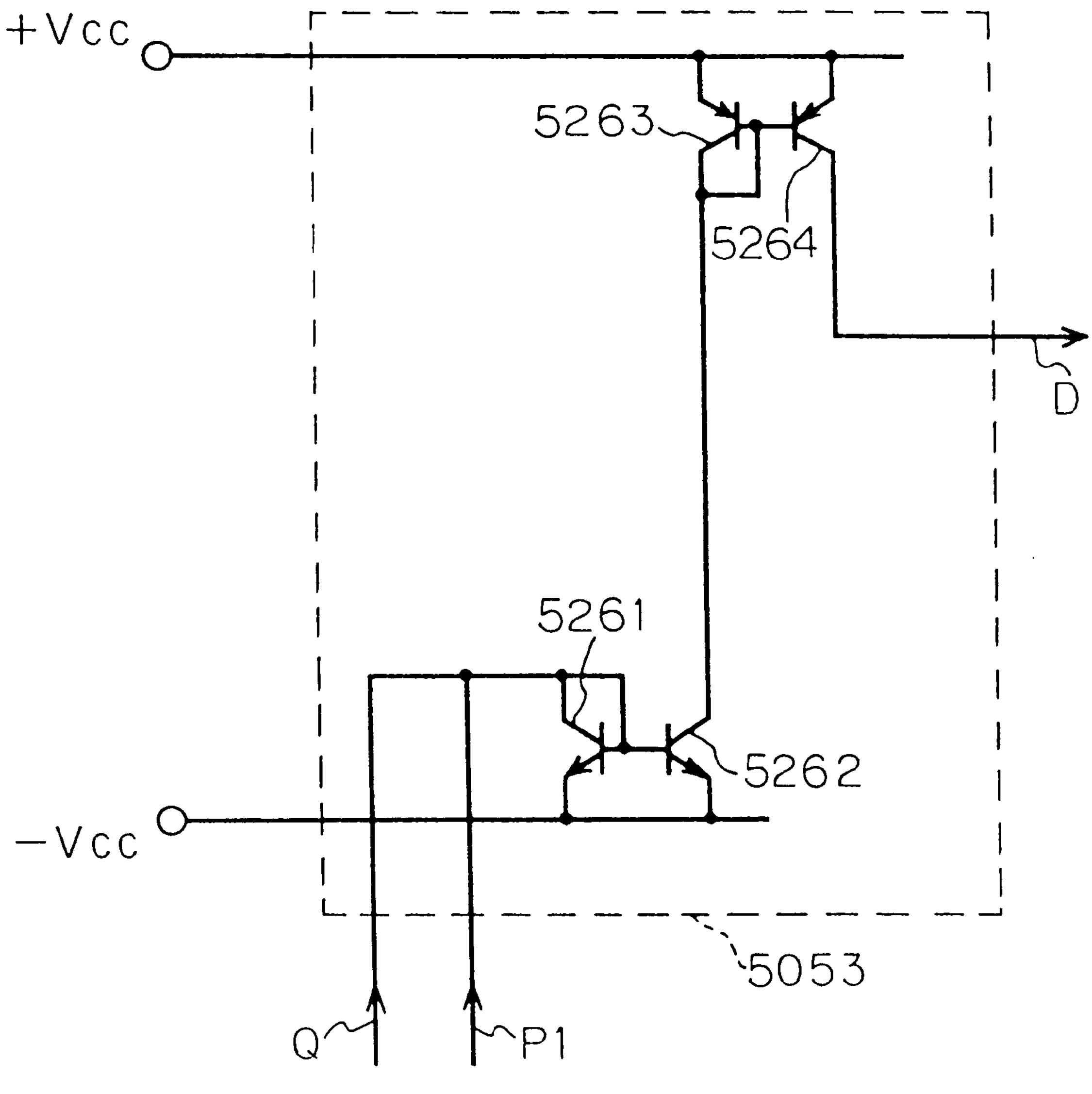
FIG. 80 is a circuit diagram showing a command output circuit 5053 of Embodiment 13.

FIG. 80 specifically shows the configuration of the command output circuit 5053 of the command block 4515. The first command current signal P1 of the command current circuit 4551, and the multiplied command current signal Q of the multiplied command output circuit 4552 are composed together, and an output current signal D corresponding to the composed command current signal is produced by a current mirror circuit consisting of transistors 5261 and 5262, and that consisting of transistors 5263 and 5264. The output current signal is supplied to a distributing circuit 5031. The configuration and operation of the command current circuit 4551 and the multiplied command output circuit 4552 are the same as those of FIGS. 73 and 74, and hence their detailed description is omitted.

Also in the thus configured embodiment, the altering signals H1, H2, and H3, the distributed signals M1, M2, and M3, and the driving signals Va, Vb, and Vc are not affected by the amplitudes of the detection signals. Furthermore, the distributed signals M1, M2, and M3, and the driving signals Va, Vb, and Vc sinusoidally analoguely vary responding with the detection signals. Therefore, it is possible to obtain the distributed signals and the driving signals of a reduced distortion level, and a uniform torque is generated, so that the motor is smoothly driven. Moreover, the position detecting elements can be disposed between the salient poles of the armature core, with the result that the motor structure can be miniaturized.

Embodiment 14

Figure 81:
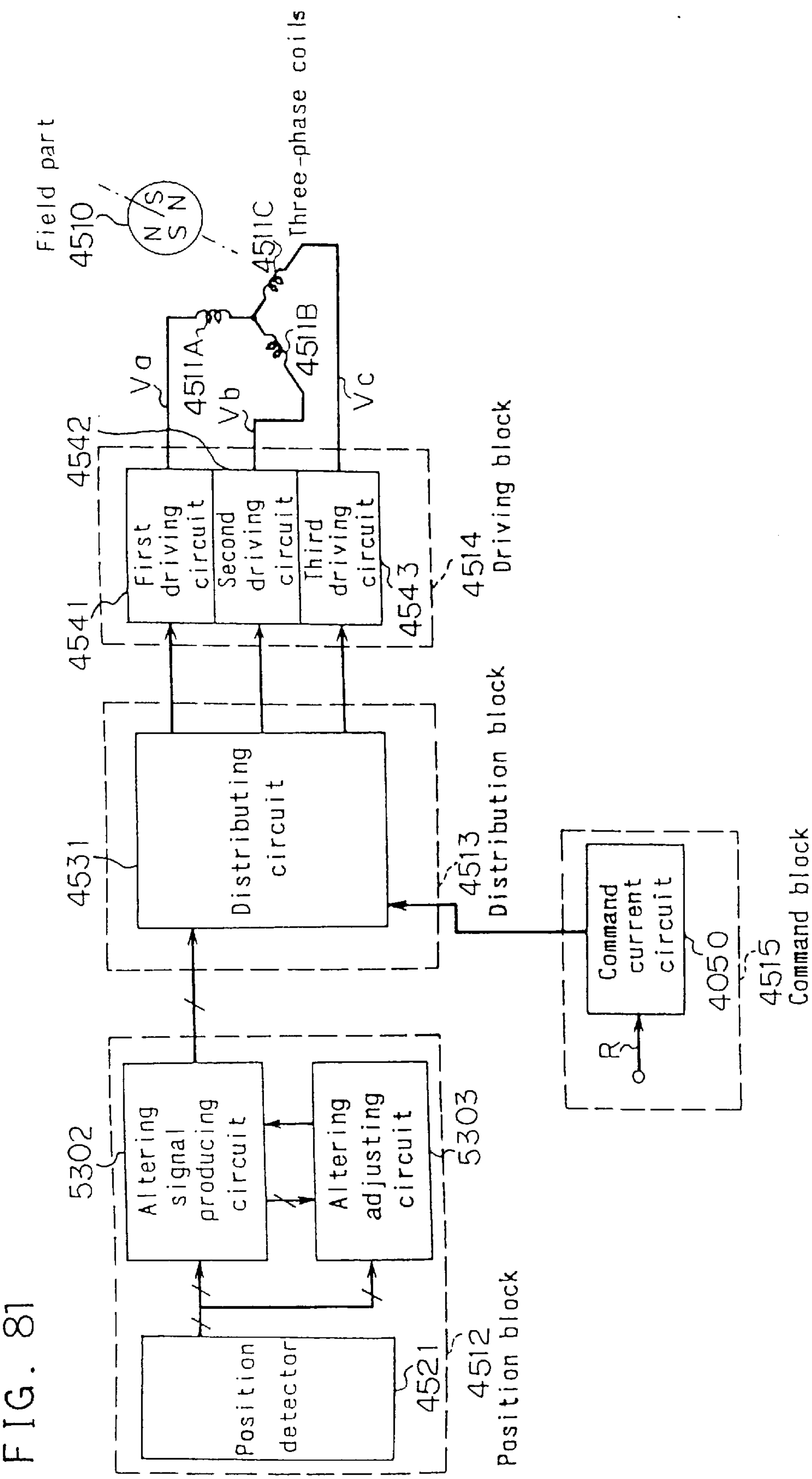
FIG. 81 is a block diagram of Embodiment 14 of the invention.
Figure 82:
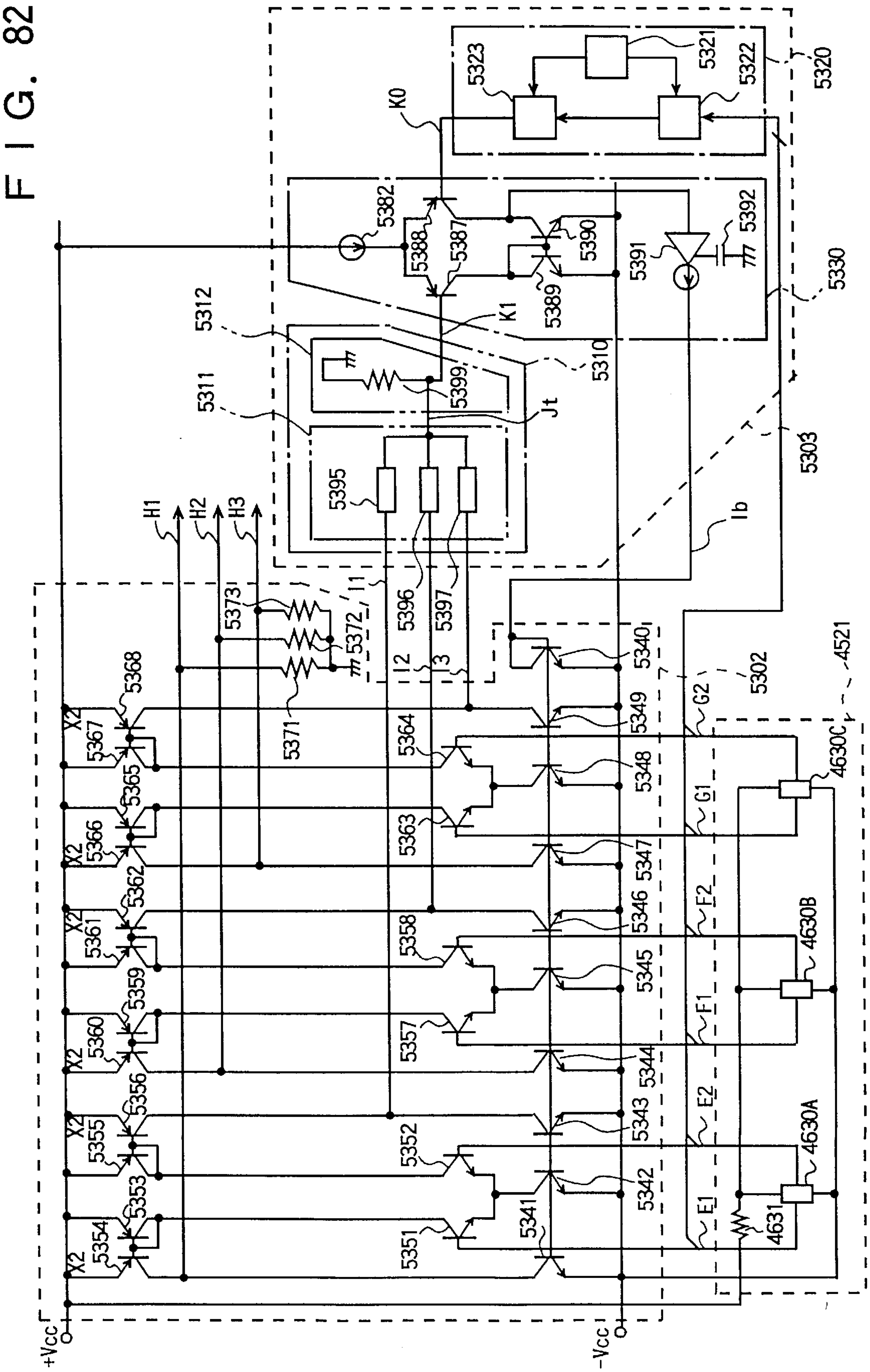
FIG. 82 is a circuit diagram showing a position detector 4521, an altering signal producing circuit 5302, and an altering adjusting circuit 5303 of Embodiment 14.
Figure 83:
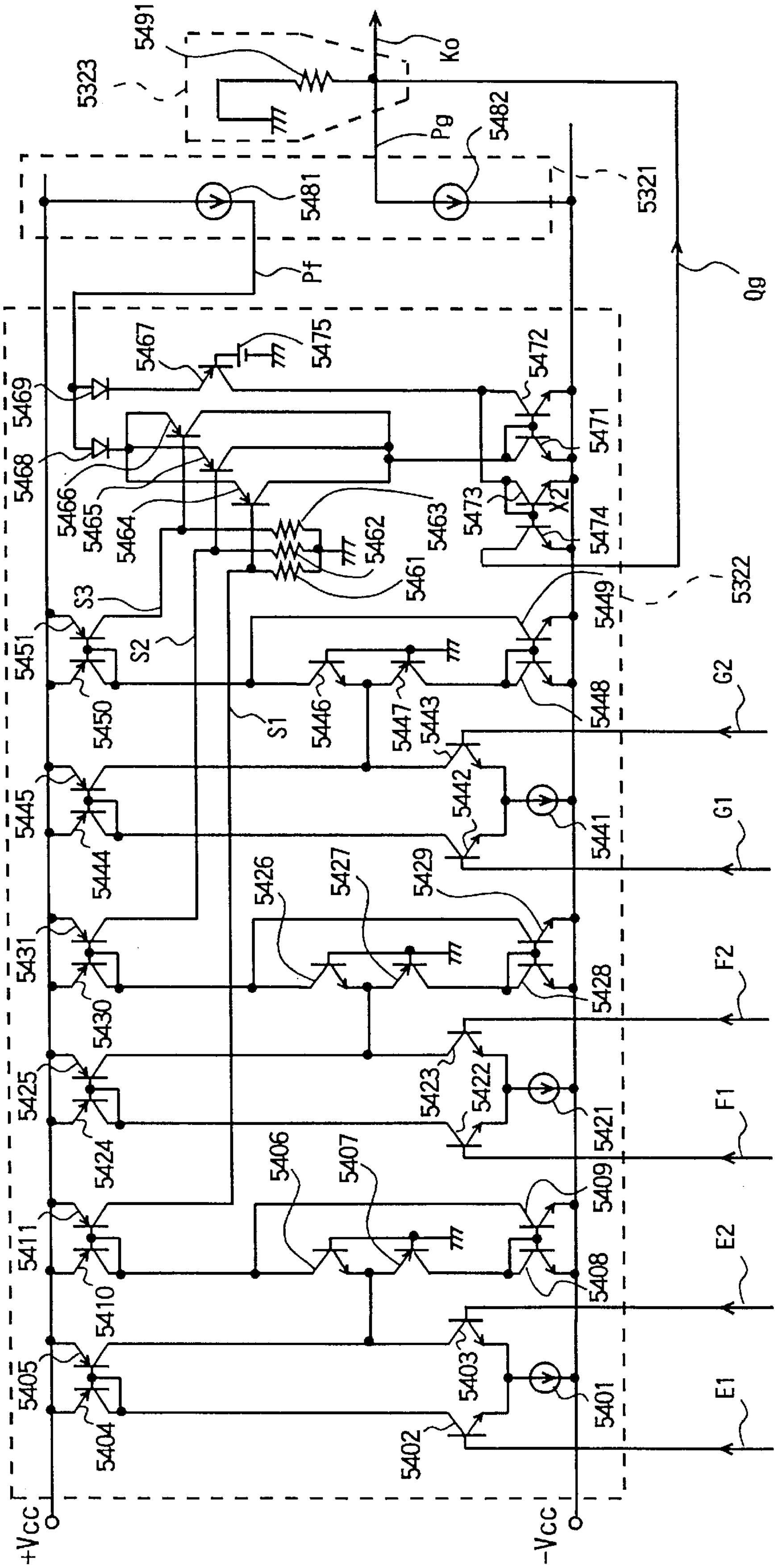
FIG. 83 is a circuit diagram showing a setting signal producing circuit 5320 as labeled in FIG. 82 of Embodiment 14.

FIGS. 81 to 83 show a brushless motor of Embodiment 14 of the invention. FIG. 81 shows the whole configuration of Embodiment 14. According to the embodiment, in an altering signal producing circuit 5302 and an altering adjusting circuit 5303, an adjusting signal which varies in proportion to the amplitudes of the detection signals of the position detector 4521 is produced, a predetermined signal containing higher harmonic signal components of the detection signals is produced, and amplitudes of altering signals of the altering signal producing circuit 5302 are adjusted in correspondence with a result of a comparison of the adjusting signal with the predetermined signal. The positional relationships between coils and position detecting elements are shifted from each other by an electric angle of about 30 deg. additionally, and the detecting elements are positioned between the coils, thereby facilitating the production of a small motor. The components which are identical with those of the embodiments described above are designated by the same reference numerals.

FIG. 82 specifically shows the configuration of the position detector 4521, the altering signal producing circuit 5302, and the altering adjusting circuit 5303. Position detecting elements 4630A, 4630B, and 4630C of the position detector 4521 correspond to the position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A and then supplied to the bases of differential transistors 5351 and 5352 of the altering signal producing circuit 5302. The differential detection signals F1 and F2 corresponding to the detected magnetic field are output from output terminals of the position detecting element 4630B and then supplied to the bases of differential transistors 5357 and 5358. The differential detection signals G1 and G2 corresponding to the detected magnetic field are output from output terminals of the position detecting element 4630C and then supplied to the bases of differential transistors 5363 and 5364. As the rotational movement of the field part 4510 proceeds, the detection signals E1, F1, and G1 analoguely vary so as to function as three-phase signals which are electrically separated in phase from each other by 120 deg.

Transistors 5340, 5341, 5342, 5343, 5344, 5345, 5346, 5347, 5348, and 5349 of the altering signal producing circuit 5302 constitute a current mirror circuit into which a current of a value proportional to a feedback current signal Ib flows. In correspondence with the detection signals E1 and E2, the differential transistors 5351 and 5352 distribute the value of the current of the transistor 5342 to the collectors. The collector current of the transistor 5351 is amplified two times by a current mirror circuit consisting of transistors 5353 and 5354. A current flowing out from or into the junction of the transistors 5354 and 5341 is supplied to a resistor 5371. An altering signal H1 is produced at the terminal of the resistor 5371. The collector current of the transistor 5352 is amplified two times by a current mirror circuit consisting of transistors 5355 and 5356. A current signal I1 flowing out from or into the junction of the transistors 5356 and 5343 is supplied to the altering adjusting circuit 5303. Similarly, in correspondence with the detection signals F1 and F2, the differential transistors 5357 and 5358 distribute the value of the current of the transistor 5345 to the collectors. The collector current of the transistor 5357 is amplified two times by a current mirror circuit consisting of transistors 5359 and 5360. A current flowing out from or into the junction of the transistors 5360 and 5344 is supplied to a resistor 5372. An altering signal H2 is produced at the terminal of the resistor 5372. The collector current of the transistor 5358 is amplified two times by a current mirror circuit consisting of transistors 5361 and 5362. A current signal I2 flowing out from or into the junction of the transistors 5362 and 5346 is supplied to the altering adjusting circuit 5303. Furthermore, in correspondence with the detection signals G1 and G2, the differential transistors 5363 and 5364 distribute the value of the current of the transistor 5348 to the collectors. The collector current of the transistor 5363 is amplified two times by a current mirror circuit consisting of transistors 5365 and 5366. A current flowing out from or into the junction of the transistors 5366 and 5347 is supplied to a resistor 5373. An altering signal H3 is produced at the terminal of the resistor 5373. The collector current of the transistor 5364 is amplified two times by a current mirror circuit consisting of transistors 5367 and 5368. A current signal I3 flowing out from or into the junction of the transistors 5368 and 5349 is supplied to the altering adjusting circuit 5303.

The altering signals H1, H2, and H3 are three-phase voltage signals which analoguely vary responding with the detection signals, and supplied to the distributing circuit 4531. The current signals I1, i2, and I3 are three-phase current signals which analoguely vary responding with the detection signals, and supplied to the altering adjusting circuit 5303.

The altering adjusting circuit 5303 comprises: an adjusting signal producing circuit 5310 which produces an adjusting signal K1; a setting signal producing circuit 5320 which produces a predetermined signal K0; and an adjusting comparator 5330 which compares the adjusting signal K1 with the predetermined signal K0. The adjusting signal producing circuit 5310 comprises: an amplitude current circuit 5311 which produces an amplitude current signal Jt varying in proportion to the amplitudes of the detection signals; and an adjusting signal output circuit 5312 which produces the adjusting signal K1 proportional to the amplitude current signal Jt. The amplitude current circuit 5311 comprises current output circuits 5395, 5396, and 5397 to which the three-phase current signals I1, I2, and I3 are respectively input. The current output circuits 5395, 5396, and 5397 output current signals corresponding to the absolute values or the single polarity values of the current signals I1, I2, and I3, respectively. The current output circuits are configured in the same manner as those shown in FIG. 59, and hence their detailed description is omitted.

The output current signals of the current output circuits 5395, 5396, and 5397 of the amplitude current circuit 5311 are composed together, thereby obtaining the amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. The adjusting signal output circuit 5312 converts the amplitude current signal Jt to the adjusting signal K1 by means of the resistor 5399. Therefore, the adjusting signal K1 vary in proportion to the amplitudes of the detection signals.

The setting signal producing circuit 5320 comprises: a setting current circuit 5321 which outputs two setting current signals; a multiplying setting circuit 5322 which produces a higher harmonic signal synchronized with the detection signals and which produces a multiplied setting current signal obtained by multiplying the higher harmonic signal by one of the setting current signals; and a setting output circuit 5323 which outputs the predetermined signal K0 proportional to a composed setting current signal obtained by multiplying the other setting current signal by the multiplied setting current signal.

FIG. 83 specifically shows the configuration of the setting signal producing circuit 5320. The setting current circuit 5321 comprises two current sources 5481 and 5482, and outputs the two setting current signals Pf and Pg.

In correspondence with the detection signals E1 and E2 of the position detecting elements, transistors 5402 and 5403 of the multiplying setting circuit 5322 distribute the value of the current of a constant current source 5401 to the collectors, and the difference current is obtained by a current mirror circuit consisting of transistors 5404 and 5405. Transistors 5406, 5407, 5408, 5409, 5410, and 5411, and a resistor 5461 obtain a voltage signal S1 corresponding to the absolute value of the difference current. Namely, the voltage signal S1 corresponding to the absolute value of the detection signal E1–E2 is produced. Similarly, a voltage signal S2 corresponding to the absolute value of the detection signal F1–F2 is produced at the terminal of a resistor 5462, and a voltage signal S3 corresponding to the absolute value of the detection signal G1–G2 is produced at the terminal of a resistor 5463. Transistors 5464, 5465, 5466, and 5467, and diodes 5468 and 5469 compare the voltage signals S1, S2, and S3 with a predetermined voltage value (including 0 V) of a constant voltage source 5475. In correspondence with the difference voltages, the setting current signal Pf is distributed to the collectors of the transistors. The collector currents of the transistors 5464, 5465, and 5466 are composed together into a composed current. A current mirror circuit consisting of transistors 5471 and 5472 compares the composed current with the collector current of the transistor 5467, and the difference current is input to a current mirror circuit consisting of transistors 5473 and 5474 and reduced in current value to approximately one half. The resulting current is output as a multiplied setting current signal Qg (inflow current).

In the setting output circuit 5323, a composed setting current signal in which the multiplied setting current signal Qg of the multiplying setting circuit 5322 and the other setting current signal Pg of the setting current circuit 5321 are composed together is supplied to a resistor 5491. The predetermined signal K0 is output from the terminal of the resistor 5491.

The multiplied setting current signal Qg of the multiplying setting circuit 5322 varies responding with results of multiplications of the voltage signals S1, S2, and S3 corresponding to the detection signals by the setting current signal Pf of the setting current circuit 5321. Because of the configuration of the transistors 5464, 5465, 5466, and 5467, the multiplied setting current signal Qg varies responding with a result of a multiplication of the minimum value of the voltage signals S1, S2, and S3 by the setting current signal Pf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied setting current signal Qg is a higher harmonic signal which has an amplitude proportional to the setting current signal Pf and which varies 6 times every one period of the detection signals. The predetermined signal K0 of the setting output circuit 5323 is proportional to the composed setting current signal of the multiplied setting current signal Qg and the setting current signal Pg, and hence contains higher harmonic signal components corresponding to the detection signals, at a predetermined percentage.

The adjusting comparator 5330 of FIG. 82 compares the adjusting signal K1 with the predetermined signal K0, and outputs the feedback current signal Ib of a current amplifier 5391 which varies responding with the difference of the signals.

According to this configuration, from the three-phase current signals I1, I2, and I3, the adjusting signal K1 proportional to the amplitudes of the detection signals is produced, and the feedback current signal Ib corresponding to a result of a comparison of the adjusting signal K1 with the predetermined signal K0 is produced. In correspondence with the feedback current signal Ib, the output currents of the current mirror circuit consisting of the transistors 5340 to 5349 vary, and the amplitudes of the three-phase current signals I1, I2, and I3 and the three-phase altering signals H1, H2, and H3 vary. In other words, a feedback loop which adjusts the amplitudes of the three-phase altering signals and the level of the adjusting signal in correspondence with a result of a comparison of the adjusting signal with the predetermined signal is configured. As a result, irrespective of the amplitudes of the detection signals E1, E2, F1, F2, G1, and G2 of the position detector 4521, the altering signals H1, H2, and H3 have an amplitude of a predetermined value corresponding to the predetermined signal K0. A capacitor 5392 stabilizes the feedback loop.

At this time, the predetermined signal K0 of the setting signal producing circuit 5320 is a voltage signal which contains higher harmonic signal components corresponding to a higher harmonic signal of the detection signals, at a predetermined percentage. Since the amplitudes of the altering signals H1, H2, and H3 vary responding with the predetermined signal K0, the altering signals H1, H2, and H3 become sinusoidal voltage signals which analoguely vary and have an amplitude corresponding to the predetermined signal K0.

The configuration and operation of the distributing circuit 4531 of the distribution block 4513 of FIG. 81, and the first driving circuit 4541, the second driving circuit 4542, and the third driving circuit 4543 of the driving block 4514 are the same as those of FIGS. 71 and 72, and hence their detailed description is omitted.

The command current circuit 4050 of the command block 4515 of FIG. 81 is configured in the same manner as that shown in FIG. 57. The output signal d of the command current circuit 4050 is coupled to the input signal D of the distributing circuit 4531. The command current circuit 4050 operates in the same manner as that shown in FIG. 57, and hence its detailed description is omitted.

Also in the thus configured embodiment, the adjusting signal K1 which varies in proportion to the amplitudes of the detection signals of the position detector is produced, and the amplitudes of the altering signals H1, H2, and H3 are adjusted in accordance with a result of a comparison of the adjusting signal K1 with the predetermined signal K0. As a result, the altering signals H1, H2, and H3, the distributed signals M1, M2, and M3, and the driving signals Va, Vb, and Vc are not affected by the amplitudes of the detection signals.

In the setting signal producing circuit 5320 of the altering adjusting circuit 5303, a higher harmonic signal corresponding to the detection signals is obtained, a multiplied setting current signal obtained by a multiplication of the higher harmonic signal is produced, and the predetermined signal K0 containing higher harmonic signal components corresponding to the multiplied setting current signal, at a predetermined percentage. The amplitudes of the altering signals H1, H2, and H3 are adjusted in accordance with a result of a comparison of the adjusting signal K1 with the predetermined signal K0, whereby altering signals which vary analoguely sinusoidally in correspondence with the detection signals are obtained. Since the distributed signals M1, M2, and M3 which vary responding with results of multiplications of the altering signals H1, H2, and H3 by the output signal of the command block are produced, the distributed signals M1, M2, and M3 and the driving signals Va, Vb, and Vc sinusoidally analoguely vary responding with the detection signals. Therefore, it is possible to obtain the distributed signals and the driving signals of a reduced distortion level, and a uniform torque is generated, so that the motor is smoothly driven.

Embodiment 15

Figure 84:
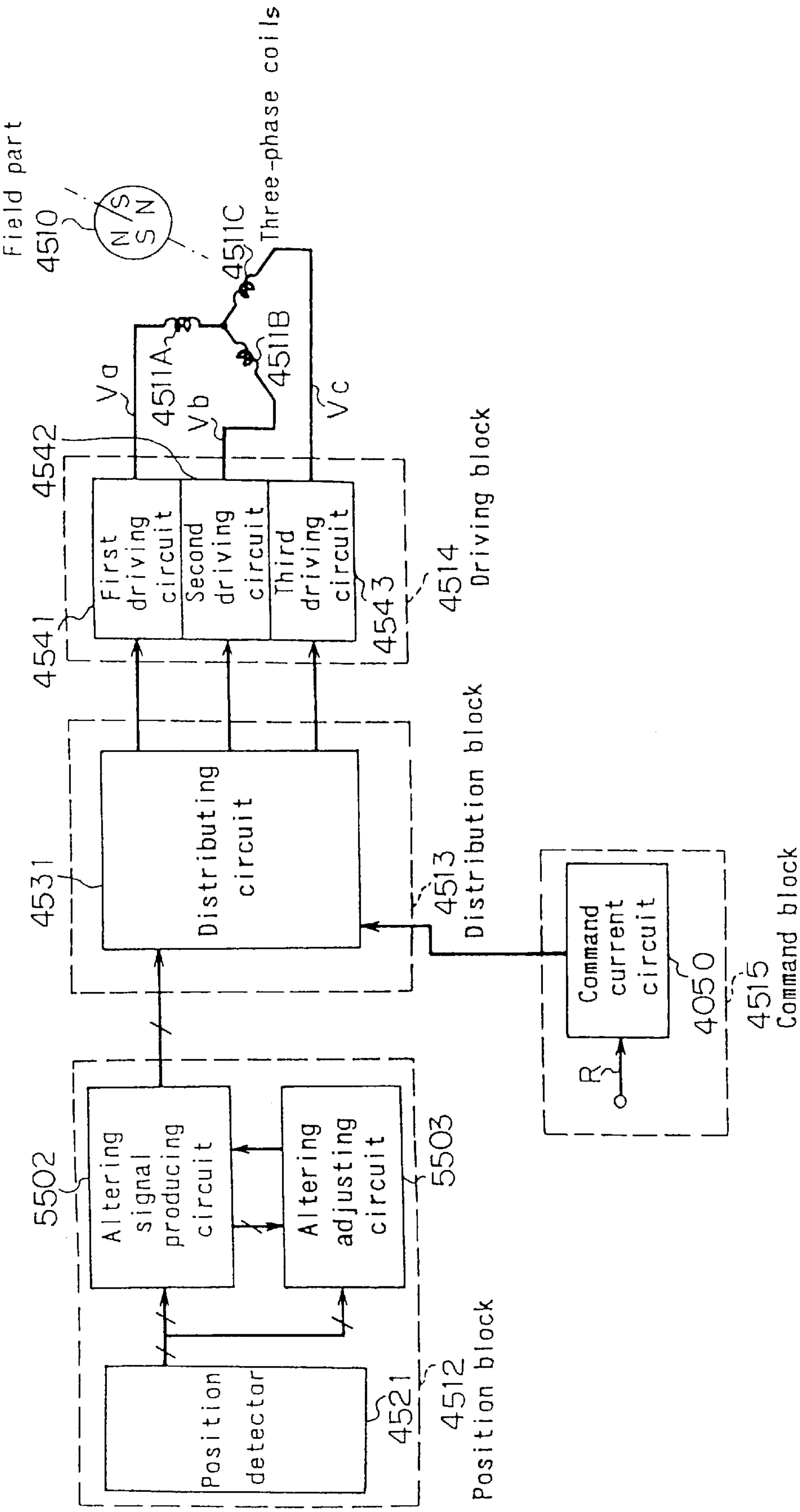
FIG. 84 is a block diagram of Embodiment 15 of the invention.
Figure 85:
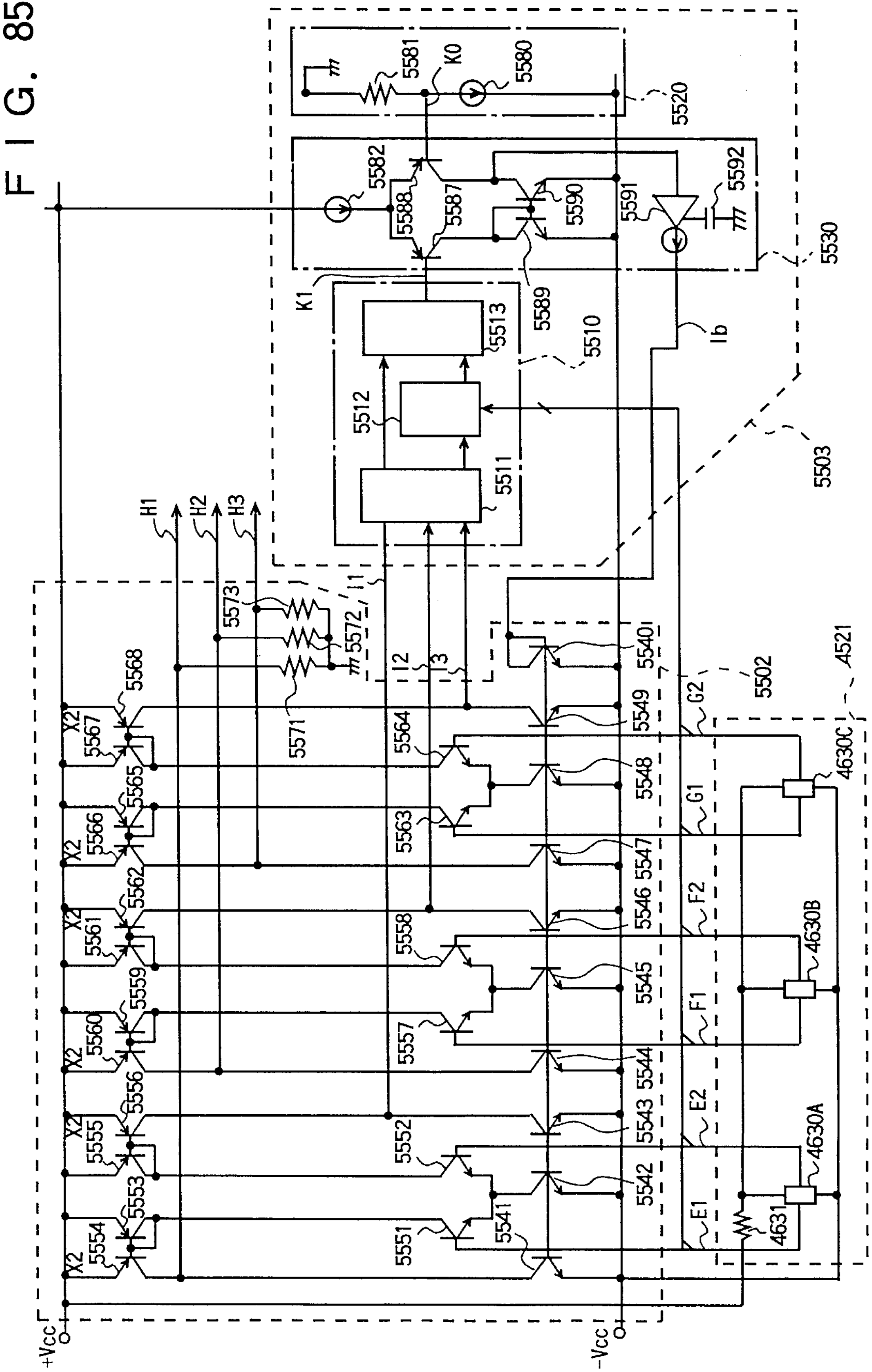
FIG. 85 is a circuit diagram showing a position detector 4521, an altering signal producing circuit 5502, and an altering adjusting circuit 5503 of Embodiment 15.
Figure 86:
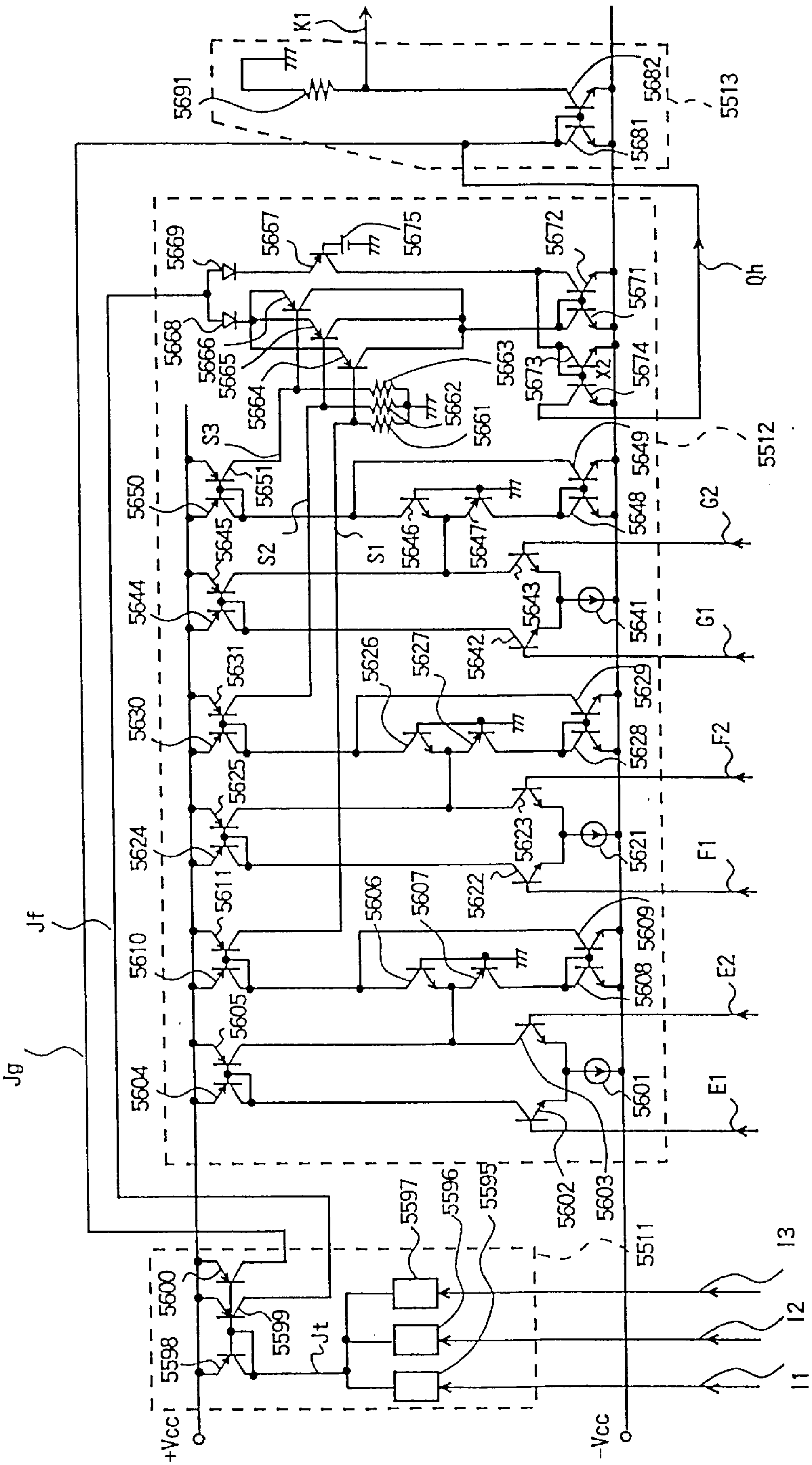
FIG. 86 is a circuit diagram showing an adjusting signal producing circuit 5510 as labeled in FIG. 85 of Embodiment 15.

FIGS. 84 to 86 show a brushless motor of Embodiment 15 of the invention. FIG. 84 shows the whole configuration of Embodiment 15. According to the embodiment, in an altering signal producing circuit 5502 and an altering adjusting circuit 5503, an adjusting signal which is proportional to the amplitudes of the detection signals of the position detector 4521 and which contains higher harmonic signal components of the detection signals is produced, and amplitudes of altering signals of the altering signal producing circuit 5502 are adjusted in correspondence with a result of a comparison of the adjusting signal with a predetermined signal. The positional relationships between coils and position detecting elements are shifted from each other by an electric angle of about 30 deg. additionally, and the detecting elements are positioned between the coils, thereby facilitating the production of a small motor. The components which are identical with those of the embodiments described above are designated by the same reference numerals.

FIG. 85 specifically shows the configuration of the position detector 4521, the altering signal producing circuit 5502, and the altering adjusting circuit 5503 of the position block 4512. Position detecting elements 4630A, 4630B, and 4630C of the position detector 4521 correspond to the position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A and then supplied to the bases of differential transistors 5551 and 5552 of the altering signal producing circuit 5502. The differential detection signals F1 and F2 corresponding to the detected magnetic field are output from output terminals of the position detecting element 4630B and then supplied to the bases of differential transistors 5557 and 5558. The differential detection signals G1 and G2 corresponding to the detected magnetic field are output from output terminals of the position detecting element 4630C and then supplied to the bases of differential transistors 5563 and 5564. As the rotational movement of the field part 4510 proceeds, the detection signals E1, F1, and G1 analoguely vary so as to function as three-phase signals which are electrically separated in phase from each other by 120 deg.

Transistors 5540, 5541, 5542, 5543, 5544, 5545, 5546, 5547, 5548, and 5549 of the altering signal producing circuit 5502 constitute a current mirror circuit into which a current of a value proportional to a feedback current signal Ib flows. In correspondence with the detection signals E1 and E2, the differential transistors 5551 and 5552 distribute the value of the current of the transistor 5542 to the collectors. The collector current of the transistor 5551 is amplified two times by a current mirror circuit consisting of transistors 5553 and 5554. A current flowing out from or into the junction of the transistors 5554 and 5541 is supplied to a resistor 5571. An altering signal H1 is produced at the terminal of the resistor 5571. The collector current of the transistor 5552 is amplified two times by a current mirror circuit consisting of transistors 5555 and 5556. A current signal I1 flowing out from or into the junction of the transistors 5556 and 5543 is supplied to the altering adjusting circuit 5503. Similarly, in correspondence with the detection signals F1 and F2, the differential transistors 5557 and 5558 distribute the value of the current of the transistor 5545 to the collectors. The collector current of the transistor 5557 is amplified two times by a current mirror circuit consisting of transistors 5559 and 5560. A current flowing out from or into the junction of the transistors 5560 and 5544 is supplied to a resistor 5572. An altering signal H2 is produced at the terminal of the resistor 5572. The collector current of the transistor 5558 is amplified two times by a current mirror circuit consisting of transistors 5561 and 5562. A current signal I2 flowing out from or into the junction of the transistors 5562 and 5546 is supplied to the altering adjusting circuit 5503. Furthermore, in correspondence with the detection signals G1 and G2, the differential transistors 5563 and 5564 distribute the value of the current of the transistor 5548 to the collectors. The collector current of the transistor 5563 is amplified two times by a current mirror circuit consisting of transistors 5565 and 5566. A current flowing out from or into the junction of the transistors 5566 and 5547 is supplied to a resistor 5573. An altering signal H3 is produced at the terminal of the resistor 5573. The collector current of the transistor 5564 is amplified two times by a current mirror circuit consisting of transistors 5567 and 5568. A current signal I3 flowing out from or into the junction of the transistors 5568 and 5549 is supplied to the altering adjusting circuit 5503.

The altering signals H1, H2, and H3 are three-phase voltage signals which analoguely vary responding with the detection signals, and supplied to the distributing circuit 4531. The current signals I1, I2, and I3 are three-phase current signals which analoguely vary responding with the detection signals, and supplied to the altering adjusting circuit 5303.

The altering adjusting circuit 5503 comprises: an adjusting signal producing circuit 5510 which produces an adjusting signal K1; a setting signal producing circuit 5520 which produces a predetermined signal K0; and an adjusting comparator 5530 which compares the adjusting signal K1 with the predetermined signal K0. The adjusting signal producing circuit 5510 comprises: an amplitude current circuit 5511 which produces two amplitude current signals varying in proportion to the amplitudes of the detection signals; a multiplying adjusting circuit 5512 which produces a higher harmonic signal synchronized with the detection signals and which produces a multiplied adjusting current signal obtained by multiplying the higher harmonic signal by one of the amplitude current signals; and an adjusting signal output circuit 5513 which produces the adjusting signal K1 proportional to a composed adjusting current signal obtained by composing the other amplitude current signal and the multiplied adjusting current signal together.

FIG. 86 specifically shows the configuration of the adjusting signal producing circuit 5510. Current output circuits 5595, 5596, and 5597 of the amplitude current circuit 5511 output current signals which correspond to the absolute values or the single polarity values of the current signals I1, I2, and I3, respectively. The current output circuits are configured in the same manner as those shown in FIG. 59, and hence their detailed description is omitted.

The output current signals of the current output circuits 5595, 5596, and 5597 of the amplitude current circuit 5511 are composed together so as to produce an amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. A current mirror circuit consisting of transistors 5598, 5599, and 5600 outputs two amplitude current signals Jf and Jg proportional to the amplitude current signal Jt.

In correspondence with the detection signals E1 and E2 of the position detecting elements, transistors 5602 and 5603 of the multiplying adjusting circuit 5512 distribute the value of the current of a constant current source 5601 to the collectors. The difference current is obtained by a current mirror circuit consisting of transistors 5604 and 5605, and a voltage signal S1 corresponding to the absolute value of the difference current is obtained by a combination of transistors 5606, 5607, 5608, 5609, 5610, and 5611, and a resistor 5661. Namely, the voltage signal S1 corresponding to the absolute value of the detection signal E1−E2 is produced. Similarly, a voltage signal S2 corresponding to the absolute value of the detection signal F1−F2 is produced at the terminal of a resistor 5662, and a voltage signal S3 corresponding to the absolute value of the detection signal G1−G2 is produced at the terminal of a resistor 5663. Transistors 5664, 5665, 5666, and 5667, and diodes 5668 and 5669 compare the voltage signals S1, S2, and S3 with a predetermined voltage value (including 0 V) of a constant voltage source 5675. In correspondence with the difference voltages, the amplitude current signal Jf is distributed to the collectors of the transistors. The collector currents of the transistors 5664, 5665, and 5666 are composed together into a composed current. A current mirror circuit consisting of transistors 5671 and 5672 compares the composed current with the collector current of the transistor 5667, and the difference current is input to a current mirror circuit consisting of transistors 5673 and 5674 and reduced in current value to approximately one half. The resulting current is output as a multiplied adjusting current signal Qh (inflow current).

The adjusting signal output circuit 5513 produces a composed adjusting current signal in which the multiplied adjusting current signal Qh of the multiplying adjusting circuit 5512 and the other amplitude current signal Jg of the amplitude current circuit 5511 are composed together. The current signal is supplied to a resistor 5691 via a current mirror circuit consisting of transistors 5681 and 5682. The adjusting signal K1 is output from the terminal of the resistor 5691.

The multiplied adjusting current signal Qh of the multiplying adjusting circuit 5512 varies responding with results of multiplications of the voltage signals S1, S2, and S3 corresponding to the detection signals by the amplitude current signal Jf of the amplitude current circuit 5511. Because of the configuration of the transistors 5664, 5665, 5666, and 5667, the multiplied adjusting current signal Qh varies responding with a result of a multiplication of the minimum value of the voltage signals S1, S2, and S3 by the amplitude current signal Jf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied adjusting current signal Qh is a higher harmonic signal which has an amplitude proportional to the amplitude current signal Jf and which varies 6 times every one period of the detection signals. The adjusting signal K1 of the adjusting signal output circuit 5513 is proportional to the composed adjusting current signal of the multiplied adjusting current signal Qh and the amplitude current signal Jg, and hence contains higher harmonic signal components corresponding to the detection signals, at a predetermined percentage.

The setting signal producing circuit 5520 of FIG. 85 comprises a constant current source 5580 and a resistor 5581, and outputs the predetermined signal K0. The adjusting comparator 5530 compares the adjusting signal K1 with the predetermined signal K0, and outputs the feedback current signal Ib of a current amplifier 5591 which varies responding with the difference of the signals.

According to this configuration, from the three-phase current signals I1, I2, and I3, the adjusting signal K1 proportional to the amplitudes of the detection signals is produced, and the feedback current signal Ib corresponding to a result of a comparison of the adjusting signal K1 with the predetermined signal K0 is produced. In correspondence with the feedback current signal Ib, the output currents of the current mirror circuit consisting of the transistors 5540 to 5549 vary, and the amplitudes of the three-phase current signals I1, I2, and I3 and the three-phase altering signals H1, H2, and H3 vary. In other words, a feedback loop which adjusts the amplitudes of the three-phase altering signals and the level of the adjusting signal in correspondence with a result of a comparison of the adjusting signal K1 with the predetermined signal K0 is configured. As a result, irrespective of the amplitudes of the detection signals E1, E2, F1, F2, G1, and G2 of the position detector 4521, the altering signals H1, H2, and H3 have an amplitude of a predetermined value corresponding to the predetermined signal K0. A capacitor 5592 stabilizes the feedback loop.

The adjusting signal K1 of the adjusting signal producing circuit 5510 is a voltage signal which contains higher harmonic signal components corresponding to a higher harmonic signal of the detection signals, at a predetermined percentage. Since the amplitudes of the altering signals H1, H2, and H3 vary responding with the difference of the adjusting signal K1 and the predetermined signal K0, the altering signals H1, H2, and H3 become sinusoidal voltage signals which analoguely vary and have an amplitude corresponding to the predetermined signal K0.

The configuration and operation of the distributing circuit 4531 of the distribution block 4513 of FIG. 84, and the first driving circuit 4541, the second driving circuit 4542, and the third driving circuit 4543 of the driving block 4514 are the same as those of FIGS. 71 and 72, and hence their detailed description is omitted.

The command current circuit 4050 of the command block 4515 of FIG. 84 is configured in the same manner as that shown in FIG. 57. The output signal d of the command current circuit 4050 is coupled to the input signal D of the distributing circuit 4531. The command current circuit 4050 operates in the same manner as that shown in FIG. 57, and hence its detailed description is omitted.

Also in the thus configured embodiment, the adjusting signal K1 which varies in proportion to the amplitudes of the detection signals of the position detector is produced, and the amplitudes of the altering signals H1, H2, and H3 are adjusted in accordance with a result of a comparison of the adjusting signal K1 with the predetermined signal K0. As a result, the altering signals H1, H2, and H3, the distributed signals M1, M2, and M3, and the driving signals Va, Vb, and Vc are not affected by the amplitudes of the detection signals.

In the adjusting signal producing circuit 5510 of the altering adjusting circuit 5503, a higher harmonic signal corresponding to the detection signals is obtained, a multiplied adjusting current signal obtained by a multiplication of the higher harmonic signal is produced, and the adjusting signal K1 containing higher harmonic signal components corresponding to the multiplied adjusting current signal at a predetermined percentage is produced. The amplitudes of the altering signals H1, H2, and H3 are adjusted in accordance with a result of a comparison of the adjusting signal K1 with the predetermined signal K0, whereby altering signals which vary analoguely sinusoidally in correspondence with the detection signals can be obtained. Since the distributed signals M1, M2, and M3 which vary responding with results of multiplications of the altering signals H1, H2, and H3 by the output signal of the command block are produced, the distributed signals M1, M2, and M3 and the driving signals Va, Vb, and Vc sinusoidally analoguely vary responding with the detection signals. Therefore, it is possible to obtain the distributed signals and the driving signals of a reduced distortion level, and a uniform torque is generated so that the motor is smoothly driven.

Embodiment 16

Figure 87:
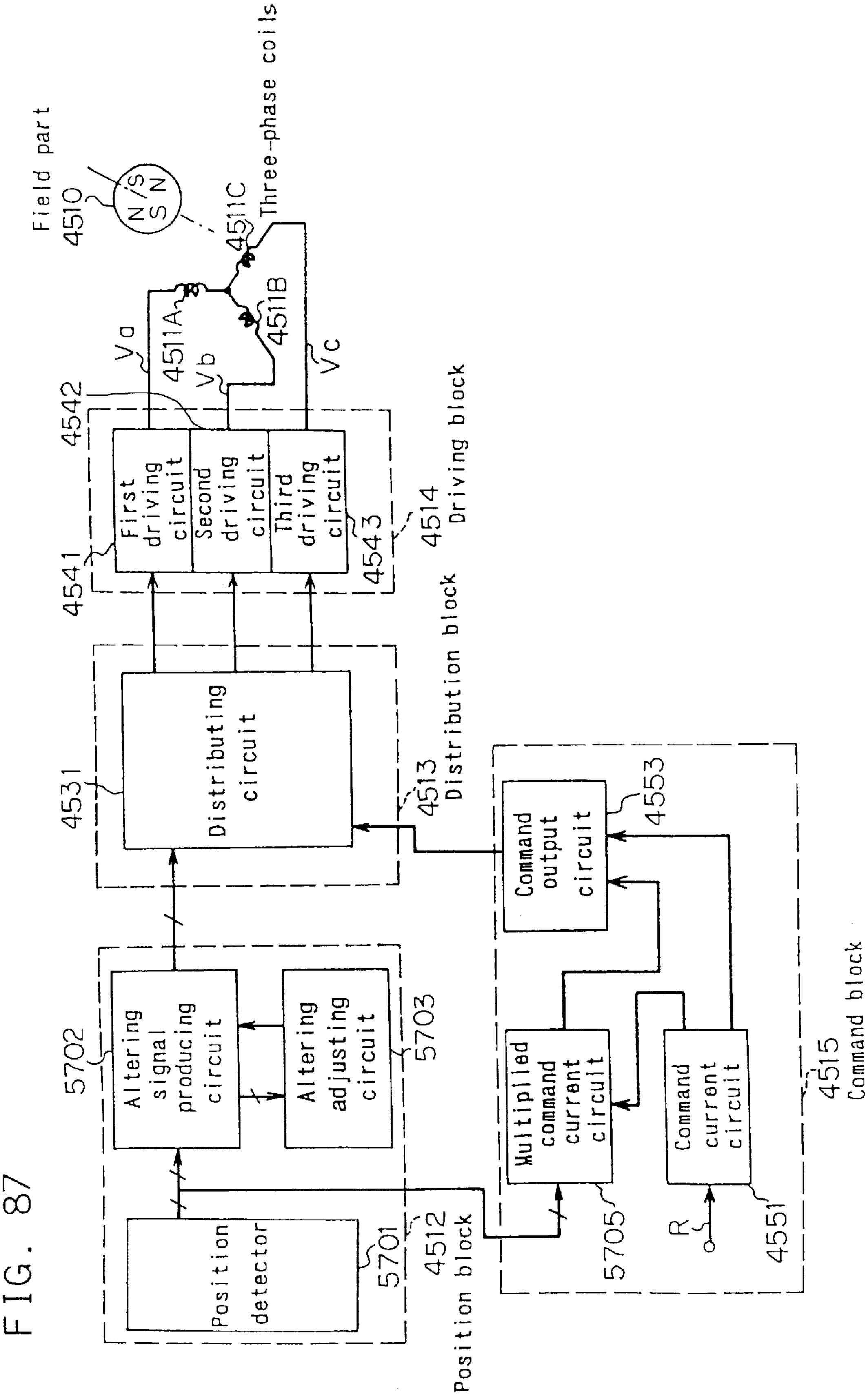
FIG. 87 is a block diagram of Embodiment 16 of the invention.
Figure 88:
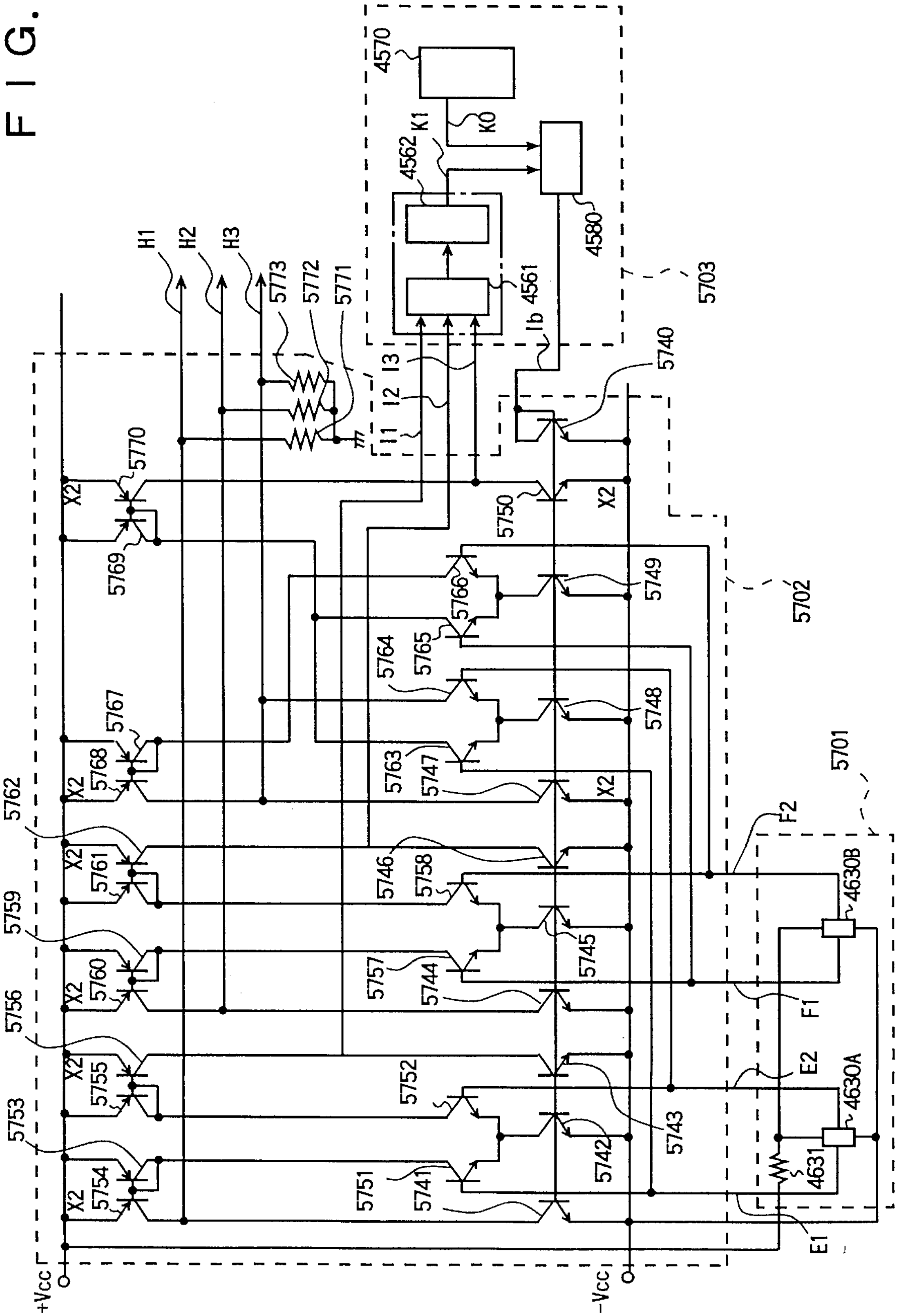
FIG. 88 is a circuit diagram showing a position detector 5701, an altering signal producing circuit 5702, and an altering adjusting circuit 5703 of Embodiment 16.
Figure 89:
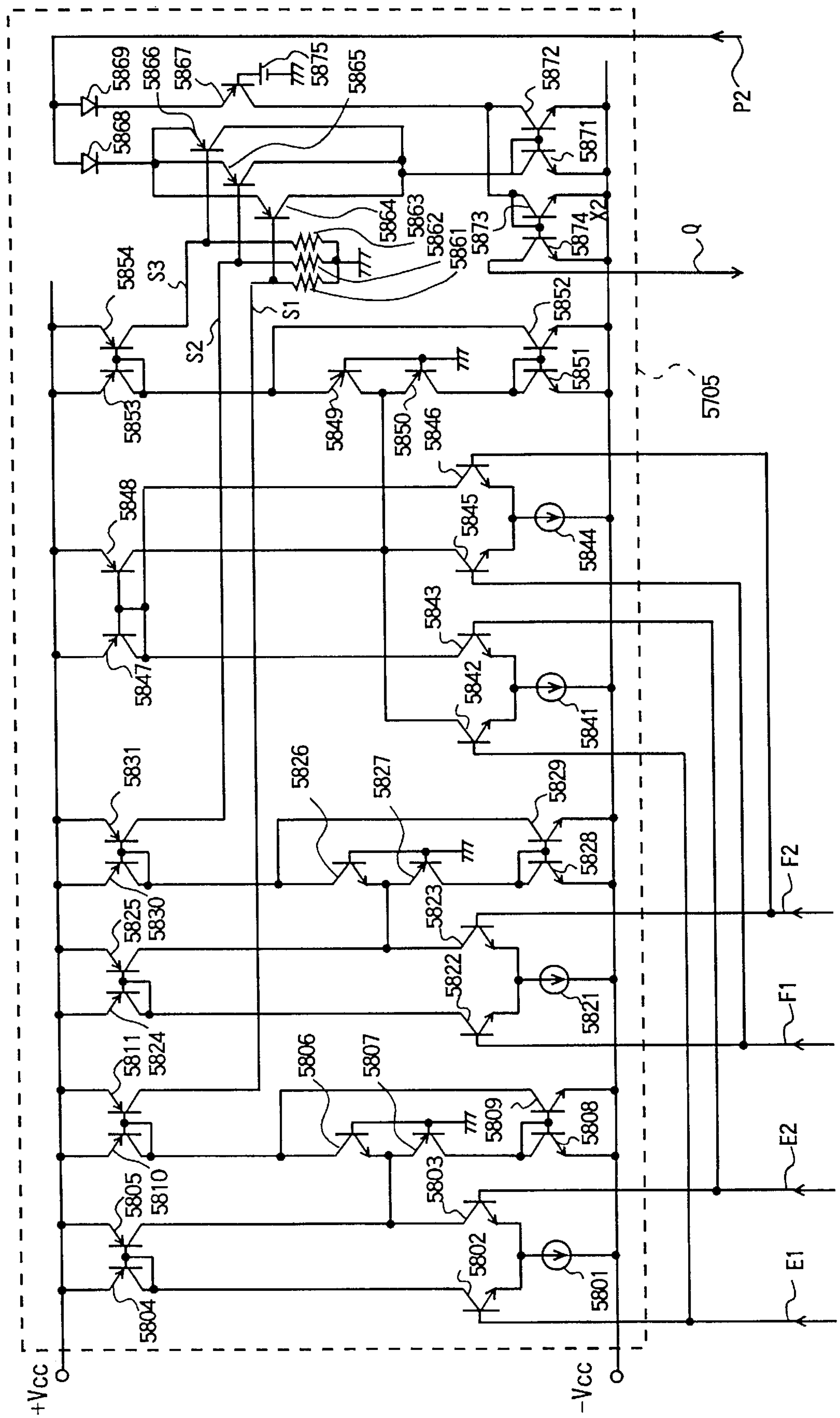
FIG. 89 is a circuit diagram showing a multiplied command current circuit 5705 of Embodiment 16.

FIGS. 87 to 89 show a brushless motor of Embodiment 16 of the invention. FIG. 87 shows the whole configuration of Embodiment 16. In the embodiment, Embodiment 12 (FIG. 68) described above is modified, so that the number of the position detecting elements of the position detector is reduced to two. According to this configuration, the number of components constituting the motor can be reduced, and hence the production of a small motor is further facilitated. The components which are identical with those of the Embodiment 12 are designated by the same reference numerals.

FIG. 88 specifically shows the configuration of a position detector 5701, an altering signal producing circuit 5702, and the altering adjusting circuit 5703 of the position block 4512. Position detecting elements 4630A and 4630B of the position detector 5701 correspond to two elements among the three position detecting elements 4607*a*, 4607*b*, and 4607*c* of FIG. 69. A voltage is applied in parallel to the position detecting elements via a resistor 4631. Namely, the number of the position detecting elements mounted on the stator is reduced to two. The differential detection signals E1 and E2 corresponding to the detected magnetic field of the field part 4510 (corresponding to the permanent magnet 4602 of FIG. 69) are output from output terminals of the position detecting element 4630A. Similarly, the differential detection signals F1 and F2 corresponding to the detected magnetic field are output from output terminals of the position detecting element 4630B. As the rotational movement of the field part 4510 proceeds, the detection signals E1 and F1 analoguely vary so as to function as two-phase signals which are electrically separated in phase from each other by 120 deg. The detection signals E1 and E2 vary in reversed phase relationships, and F1 and F2 vary in reversed phase relationships. In the embodiment, the detection signals E2 and F2 of reversed phase relationships are not counted in the number of phases.

Transistors 5740, 5741, 5742, 5743, 5744, 5745, 5746, 5747, 5748, 5749, and 5750 of the altering signal producing circuit 5702 constitute a current mirror circuit into which a current of a value proportional to a feedback current signal Ib flows. In correspondence with the detection signals E1 and E2, differential transistors 5751 and 5752 distribute the value of the current of the transistor 5742 to the collectors. The collector current of the transistor 5751 is amplified two times by a current mirror circuit consisting of transistors 5753 and 5754. A current flowing out from or into the junction of the transistors 5754 and 5741 is supplied to a resistor 5771. An altering signal H1 is produced at the terminal of the resistor 5771. The collector current of the transistor 5752 is amplified two times by a current mirror circuit consisting of transistors 5755 and 5756. A current signal I1 flowing out from or into the junction of the transistors 5756 and 5743 is supplied to the altering adjusting circuit 5703. Similarly, in correspondence with the detection signals F1 and F2, the differential transistors 5757 and 5758 distribute the value of the current of the transistor 5745 to the collectors. The collector current of the transistor 5757 is amplified two times by a current mirror circuit consisting of transistors 5759 and 5760. A current flowing out from or into the junction of the transistors 5760 and 5744 is supplied to a resistor 5772. An altering signal H2 is produced at the terminal of the resistor 5772. The collector current of the transistor 5758 is amplified two times by a current mirror circuit consisting of transistors 5761 and 5762. A current signal I2 flowing out from or into the junction of the transistors 5762 and 5746 is supplied to the altering adjusting circuit 5703. In correspondence with the detection signals E1 and E2, the differential transistors 5763 and 5764 distribute the value of the current of the transistor 5748 to the collectors. In correspondence with the detection signals F1 and F2, the differential transistors 5765 and 5766 distribute the value of the current of the transistor 5749 to the collectors. The collector currents of the transistors 5764 and 5766 are composed together, and the composed current is amplified two times by a current mirror circuit consisting of transistors 5767 and 5768. A current flowing out from or into the junction of the transistors 5768 and 5747 is supplied to a resistor 5773. An altering signal H3 is produced at the terminal of the resistor 5773. The collector currents of the transistors 5763 and 5765 are composed together, and the composed current is amplified two times by a current mirror circuit consisting of transistors 5769 and 5770. A current signal I3 flowing out from or into the junction of the transistors 5770 and 5750 is supplied to the altering adjusting circuit 5703. In this way, the two-phase detection signals E1 and F1 are composed together by calculation so as to produce three-phase signals.

The altering signals H1, H2, and H3 are three-phase voltage signals which analoguely vary responding with the two-phase detection signals and which substantially have a phase difference of 120 deg. in electric angle, and supplied to the distributing circuit 4531. The current signals I1, I2, and I3 are three-phase current signals which analoguely vary responding with the two-phase detection signals and which substantially have a phase difference of 120 deg. in electric angle, and supplied to the altering adjusting circuit 5703.

The altering adjusting circuit 5703 comprises: an adjusting signal producing circuit 4560 which produces an adjusting signal K1; a setting producing circuit 4570 which produces a predetermined signal K0; and an adjusting comparator 4580 which compares the adjusting signal K1 with the predetermined signal K0. The adjusting signal producing circuit 4560 comprises: an amplitude current circuit 4561 which produces an amplitude current signal proportional to the amplitudes of the detection signals; and an adjusting signal output circuit 4562 which produces the adjusting signal K1 proportional to the amplitude current signal. These circuits are configured in the same manner as those shown in FIG. 70, and hence their detailed description is omitted.

In the altering signal producing circuit 5702 and the altering adjusting circuit 5703, the three-phase current signals I1, I2, and I3 are produced by using the two-phase detection signals, the adjusting signal K1 proportional to the amplitudes of the detection signals is produced, and the feedback current signal Ib corresponding to a result of a comparison of the adjusting signal K1 with the predetermined signal K0 is produced. In correspondence with the feedback current signal Ib, the output currents of the current mirror circuit consisting of the transistors 5740 to 5750 vary, and the amplitudes of the three-phase current signals I1, I2, and I3 and the three-phase altering signals H1, H2, and H3 vary. Namely, a feedback loop which adjusts the amplitudes of the three-phase altering signals and the level of the adjusting signal in correspondence with a result of a comparison of the adjusting signal with the predetermined signal is configured. As a result, irrespective of the amplitudes of the two-phase detection signals E1, E2, F1, and F2 of the position detector 5701, the altering signals H1, H2, and H3 have an amplitude of a predetermined value corresponding to the predetermined signal K0.

A command block 4515 of FIG. 87 comprises a command current circuit 4551, a multiplied command current circuit 5705, and a command output circuit 4553. The command current circuit 4551 and the command output circuit 4553 are configured in the same manner as those shown in FIGS. 73 and 75, and hence their detailed description is omitted.

FIG. 89 specifically shows the configuration of the multiplied command current circuit 5705. In correspondence with detection signals E1 and E2 of the position detecting elements, transistors 5802 and 5803 of the multiplied command current circuit 5705 distribute the value of the current of a constant current source 5801 to the collectors. The difference current is obtained by a current mirror circuit consisting of transistors 5804 and 5805, and a voltage signal S1 corresponding to the absolute value of the difference current is obtained by a combination of transistors 5806, 5807, 5808, 5809, 5810, and 5811, and a resistor 5861. In other words, the voltage signal S1 corresponding to the absolute value of the detection signal E1−E2 is produced. Similarly, a constant current source 5821, transistors 5822 to 5831, and a resistor 5862 produce a voltage signal S2 corresponding to the absolute value of the detection signal F1−F2, at the terminal of the resistor 5862. In correspondence with detection signals E1 and E2, transistors 5842 and 5843 distribute the value of the current of a constant current source 5841 to the collectors. In correspondence with detection signals F1 and F2, transistors 5845 and 5846 distribute the value of the current of a constant current source 5844 to the collectors. A current mirror circuit consisting of transistors 5847 and 5848 obtains the difference current of a composed current of the collector currents of the transistors 5843 and 5846, and a composed current of the collector currents of the transistors 5842 and 5845. A voltage signal S3 corresponding to the absolute value of the difference current is obtained by a combination of transistors 5849, 5850, 5851, 5852, 5853, and 5854, and a resistor 5863. In other words, a signal for the third phase is produced from the two-phase detection signals, and the voltage signal S3 corresponding to the absolute value of the signal for the third phase is produced. Transistors 5864, 5865, 5866, and 5867, and diodes 5868 and 5869 compare the voltage signals S1, S2, and S3 with a predetermined voltage value (including 0 V) of a constant voltage source 5875. In correspondence with the difference voltages, the second command current signal P2 of the command current circuit 4551 is distributed to the collectors. The collector currents of the transistors 5864, 5865, and 5866 are composed together into a composed current. A current mirror circuit consisting of transistors 5871 and 5872 compares the composed current with the collector current of the transistor 5867, and the difference current is input to a current mirror circuit consisting of transistors 5873 and 5874 and reduced in current value to approximately one half. The resulting current is output as a multiplied command current signal Q (inflow current).

The multiplied command current signal Q of the multiplied command current circuit 5705 varies responding with results of multiplications of the voltage signals S1, S2, and S3 corresponding to the detection signals by the second command current signal P2 of the command current circuit 4551. Because of the configuration of the transistors 5864, 5865, 5866, and 5867, the multiplied command current signal Q varies responding with a result of a multiplication of the minimum value of the voltage signals S1, S2, and S3 by the command current signal P2. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals. The output current signal D of the command output circuit 4553 is proportional to the composed command current signal of the multiplied command current signal Q and the first command current signal P1, and hence contains higher harmonic signal components corresponding to the detection signals, at a predetermined percentage.

The output current signal D of the command block 4515 is a current signal which contains higher harmonic signal components corresponding to a higher harmonic signal of the detection signals, at predetermined percentage. Since the distributed signals M1, M2, and M3 and the driving signals Va, Vb, and Vc are produced in correspondence with results of multiplications of the output current signal D by the altering signals H1, H2, and H3, the distributed signals and the driving signals are three-phase voltage signals which sinusoidally analoguely vary.

The configuration and operation of the distributing circuit 4531 of the distribution block 4513 of FIG. 87, and the first driving circuit 4541, the second driving circuit 4542, and the third driving circuit 4543 of the driving block 4514 are the same as those of FIGS. 71 and 72, and hence their detailed description is omitted.

In the thus configured embodiment, the driving signals for the three-phase coils are produced by using the two-phase detection signals. As a result, the number of components of the position detecting elements can be reduced, so that the motor is simplified in configuration.

The adjusting signal K1 which varies in proportion to the amplitudes of the two-phase detection signals of the position detector is produced, and the amplitudes of the altering signals H1, H2, and H3 are adjusted in correspondence with a result of a comparison of the adjusting signal K1 with the predetermined signal K0. Therefore, the altering signals H1, H2, and H3, the distributed signals M1, M2, and M3, and the driving signals Va, Vb, and Vc are not affected by the amplitudes of the detection signals.

The command block is provided with the multiplied command current circuit, and therein: a higher harmonic signal corresponding to the two-phase detection signals is obtained; the multiplied adjusting current signal is obtained by a multiplication of the higher harmonic signal; and the output signal of the command block which contains higher harmonic signal components corresponding to the multiplied adjusting current signal at a predetermined percentage is produced. According to this configuration, the distributed signals M1, M2, and M3, and the driving signals Va, Vb, and Vc vary sinusoidally analoguely in correspondence with the detection signals. Accordingly, it is possible to obtain the distributed signals and the driving signals of a reduced distortion level, and a uniform torque is generated so that the motor is smoothly driven.

Embodiment 17

Figure 90:
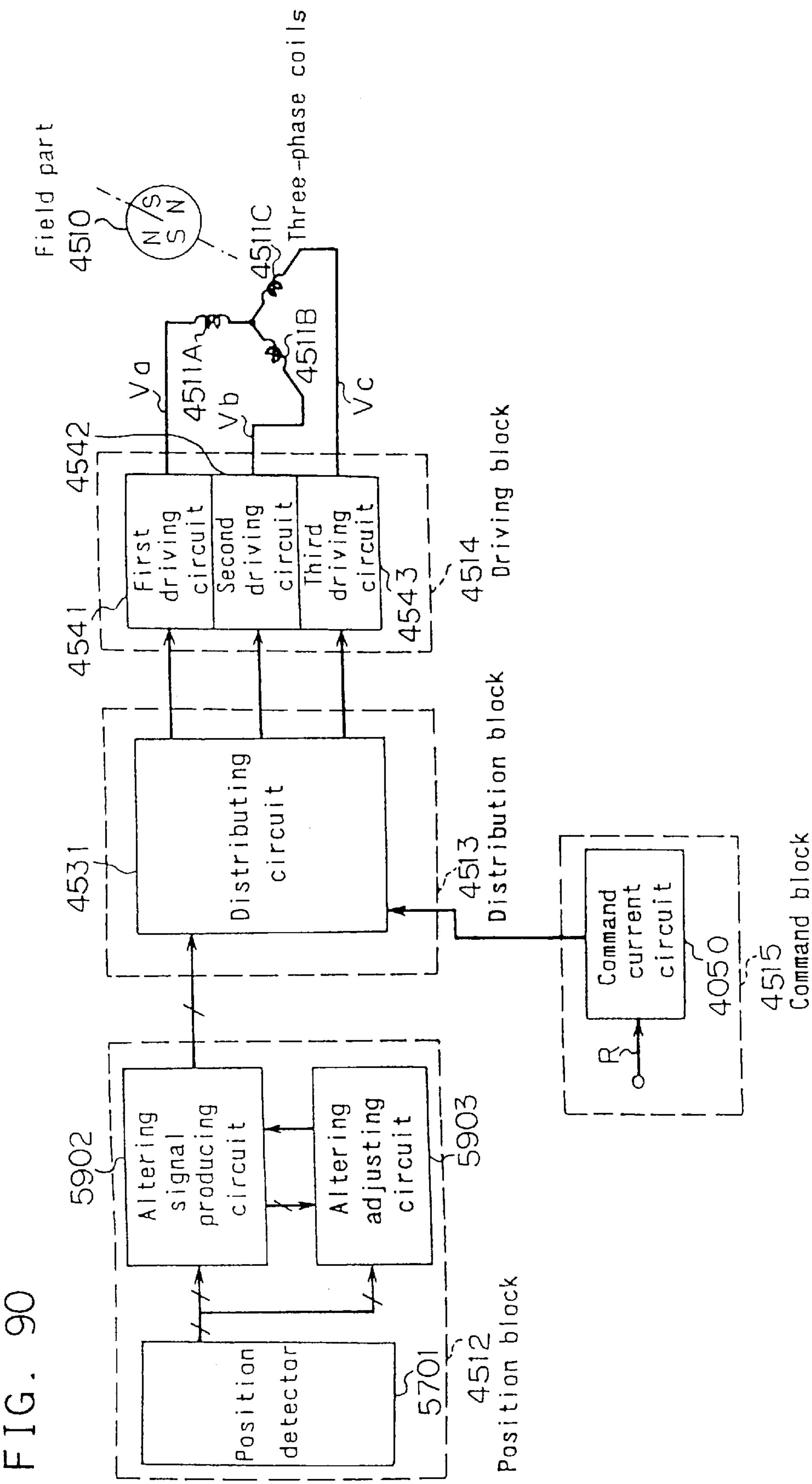
FIG. 90 is a block diagram of Embodiment 17 of the invention.
Figure 91:
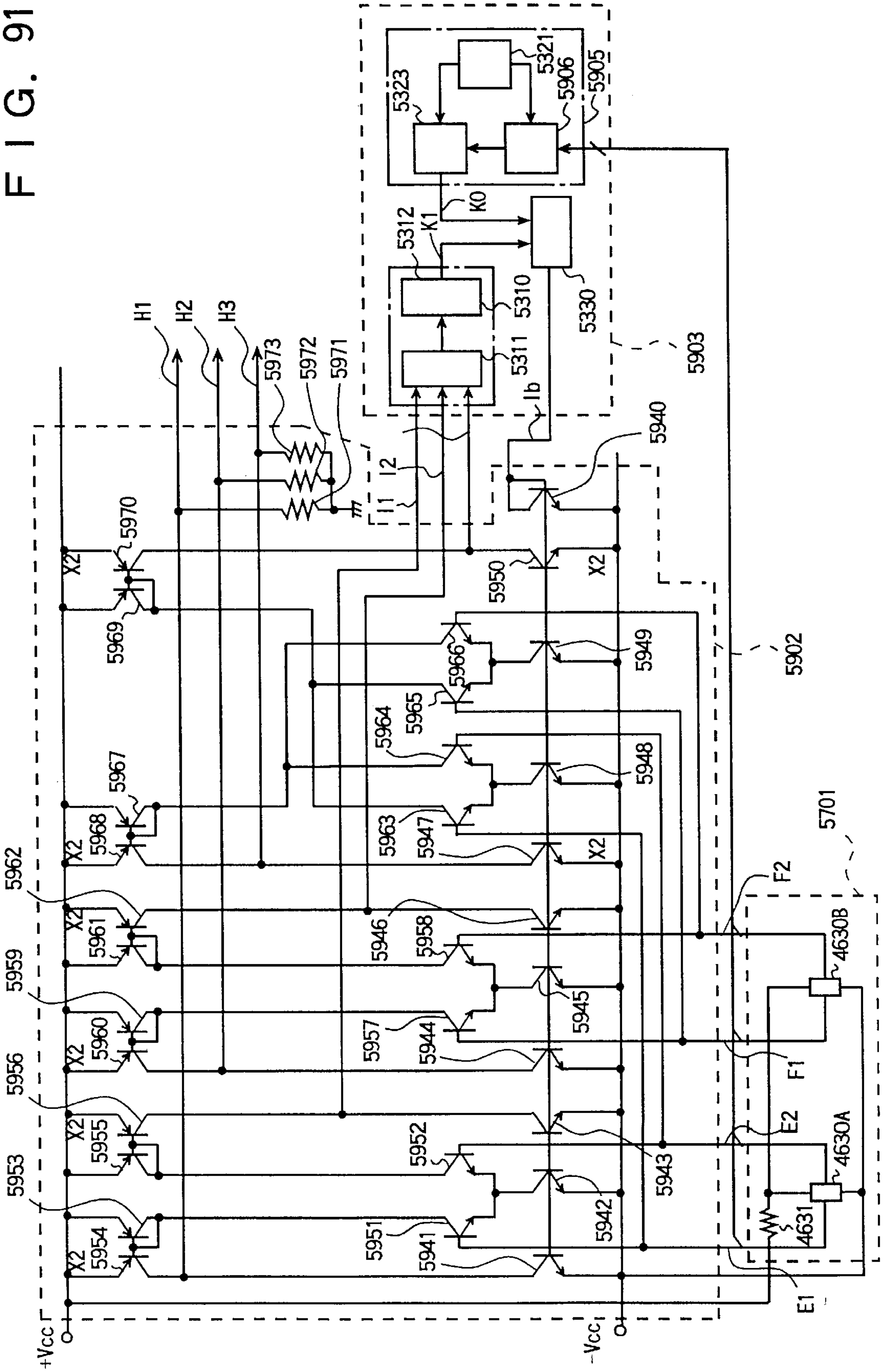
FIG. 91 is a circuit diagram showing a position detector 5701, an altering signal producing circuit 5902, and an altering adjusting circuit 5903 of Embodiment 17.
Figure 92:
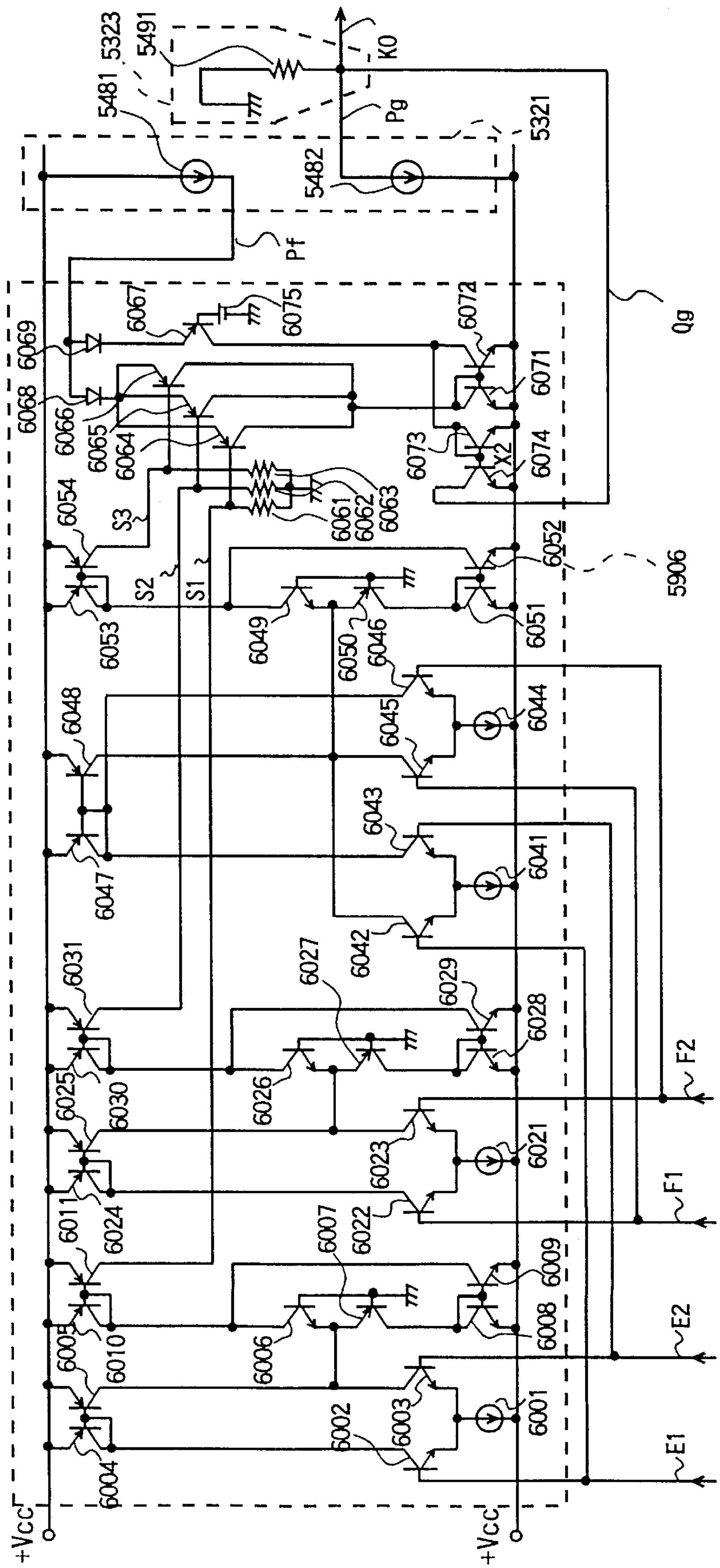
FIG. 92 is a circuit diagram showing a setting signal producing circuit 5905 as labeled in FIG. 91 of Embodiment 17.

FIGS. 90 to 92 show a brushless motor of Embodiment 17 of the invention. FIG. 90 shows the whole configuration of Embodiment 17. In the embodiment, Embodiment 14 (FIG. 81) described above is modified so that the number of the position detecting elements of the position detector is reduced to two. According to this configuration, the number of components constituting the motor can be reduced, and hence the production of a small motor is further facilitated. The components which are identical with those of the Embodiment 14 are designated by the same reference numerals.

FIG. 91 specifically shows the configuration of a position detector 5701, an altering signal producing circuit 5902, and the altering adjusting circuit 5903 of the position block 4512. Position detecting elements 4630A and 4630B of the position detector 5701 correspond to two elements among the three position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A. Similarly, the differential detection signals F1 and F2 corresponding to the detected magnetic field are output from output terminals of the position detecting element 4630B. As the rotational movement of the field part 4510 proceeds, the detection signals E1 and F1 analoguely vary so as to function as two-phase signals which are electrically separated in phase from each other by 120 deg.

Transistors 5940, 5941, 5942, 5943, 5944, 5945, 5946, 5947, 5948, 5949, and 5950 of the altering signal producing circuit 5902 constitute a current mirror circuit into which a current of a value proportional to a feedback current signal Ib flows. In correspondence with the detection signals E1 and E2, differential transistors 5951 and 5952 distribute the value of the current of the transistor 5942 to the collectors. The collector current of the transistor 5951 is amplified two times by a current mirror circuit consisting of transistors 5953 and 5954. A current flowing out from or into the junction of the transistors 5954 and 5941 is supplied to a resistor 5971. An altering signal H1 is produced at the terminal of the resistor 5971. The collector current of the transistor 5952 is amplified two times by a current mirror circuit consisting of transistors 5955 and 5956. A current signal I1 flowing out from or into the junction of the transistors 5956 and 5943 is supplied to the altering adjusting circuit 5903. Similarly, in correspondence with the detection signals F1 and F2, the differential transistors 5957 and 5958 distribute the value of the current of the transistor 5945 to the collectors. The collector current of the transistor 5957 is amplified two times by a current mirror circuit consisting of transistors 5959 and 5960. A current flowing out from or into the junction of the transistors 5960 and 5944 is supplied to a resistor 5972. An altering signal H2 is produced at the terminal of the resistor 5972. The collector current of the transistor 5958 is amplified two times by a current mirror circuit consisting of transistors 5961 and 5962. A current signal I2 flowing out from or into the junction of the transistors 5962 and 5946 is supplied to the altering adjusting circuit 5903. In correspondence with the detection signals E1 and E2, the differential transistors 5963 and 5964 distribute the value of the current of the transistor 5948 to the collectors. In correspondence with the detection signals F1 and F2, the differential transistors 5965 and 5966 distribute the value of the current of the transistor 5949 to the collectors. The collector currents of the transistors 5964 and 5966 are composed together, and the composed current is amplified two times by a current mirror circuit consisting of transistors 5967 and 5968. A current flowing out from or into the junction of the transistors 5968 and 5947 is supplied to a resistor 5973. An altering signal H3 is produced at the terminal of the resistor 5973. The collector currents of the transistors 5963 and 5965 are composed together, and the composed current is amplified two times by a current mirror circuit consisting of transistors 5969 and 5970. A current signal I3 flowing out from or into the junction of the transistors 5970 and 5950 is supplied to the altering adjusting circuit 5903. In this way, the two-phase detection signals E1 and F1 are composed together by calculation so as to produce three-phase signals.

The altering signals H1, H2, and H3 become three-phase voltage signals which analoguely vary responding with the two-phase detection signals and which substantially have a phase difference of 120 deg. in electric angle, and supplied to the distributing circuit 4531. The current signals I1, I2, and I3 are three-phase current signals which analoguely vary responding with the two-phase detection signals and which substantially have a phase difference of 120 deg. in electric angle, and supplied to the altering adjusting circuit 5903.

The altering adjusting circuit 5903 comprises: an adjusting signal producing circuit 5310 which produces an adjusting signal K1; a setting producing circuit 5905 which produces a predetermined signal K0; and an adjusting comparator 5330 which compares the adjusting signal K1 with the predetermined signal K0. The adjusting signal producing circuit 5310 comprises: an amplitude current circuit 5311 which produces an amplitude current signal proportional to the amplitudes of the detection signals; and an adjusting signal output circuit 5312 which produces the adjusting signal K1 proportional to the amplitude current signal. The adjusting signal producing circuit 5310 and the adjusting comparator 5330 are configured in the same manner as those shown in FIG. 82, and hence their detailed description is omitted.

The setting signal producing circuit 5905 comprises: a setting current circuit 5321 which outputs two setting current signals; a multiplying setting circuit 5906 which produces a higher harmonic signal synchronized with the detection signals and which produces a multiplied setting current signal obtained by multiplying the higher harmonic signal by one of the setting current signals; and a setting output circuit 5323 which outputs the predetermined signal K0 proportional to a composed setting current signal obtained by multiplying the other setting current signal by the multiplied setting current signal.

FIG. 92 specifically shows the configuration of the setting signal producing circuit 5905. The setting current circuit 5321 comprises two current sources 5481 and 5482, and outputs the two setting current signals Pf and Pg.

In correspondence with the detection signals E1 and E2 of the position detecting elements, transistors 6002 and 6003 of the multiplying setting circuit 5906 distribute the value of the current of a constant current source 6001 to the collectors, and the difference current is obtained by a current mirror circuit consisting of transistors 6004 and 6005. Transistors 6006, 6007, 6008, 6009, 6010, and 6011, and a resistor 6061 obtain a voltage signal S1 corresponding to the absolute value of the difference current. Namely, the voltage signal S1 corresponding to the absolute value of the detection signal E1−E2 is produced. Similarly, a voltage signal S2 corresponding to the absolute value of the detection signal F1−F2 is produced at the terminal of a resistor 6062 by a combination of a constant current source 6021, transistors 6022 to 6031, and the resistor 6062. In correspondence with detection signals E1 and E2, transistors 6042 and 6043 distribute the value of the current of a constant current source 6041 to the collectors. In correspondence with detection signals F1 and F2, transistors 6045 and 6046 distribute the value of the current of a constant current source 6044 to the collectors. A current mirror circuit consisting of transistors 6047 and 6048 obtains the difference current of a composed current of the collector currents of the transistors 6043 and 6046, and a composed current of the collector currents of the transistors 6042 and 6045. A voltage signal S3 corresponding to the absolute value of the difference current is obtained by a combination of transistors 6049, 6050, 6051, 6052, 6053, and 6054, and a resistor 6063. In other words, a signal for the third phase is produced from the two-phase detection signals, and the voltage signal S3 corresponding to the absolute value of the signal for the third phase is produced. Transistors 6064, 6065, 6066, and 6067, and diodes 6068 and 6069 compare the voltage signals S1, S2, and S3 with a predetermined voltage value (including 0 V) of a constant voltage source 6075. In correspondence with the difference voltages, the setting current signal Pf of the setting current circuit 5321 is distributed to the collectors. The collector currents of the transistors 6064, 6065, and 6066 are composed together into a composed current. A current mirror circuit consisting of transistors 6071 and 6072 compares the composed current with the collector current of the transistor 6067, and the difference current is input to a current mirror circuit consisting of transistors 6073 and 6074 and reduced in current value to approximately one half. The resulting current is output as a multiplied setting current signal Qg (inflow current).

In the setting output circuit 5323, a composed setting current signal in which the multiplied setting current signal Qg of the multiplying setting circuit 5906 and the other setting current signal Pg of the setting current circuit 5321 are composed together is supplied to a resistor 5491. The predetermined signal K0 is output from the terminal of the resistor 5491.

The multiplied setting current signal Qg of the multiplying setting circuit 5906 varies responding with results of multiplications of the voltage signals S1, S2, and S3 corresponding to the two-phase detection signals by the setting current signal Pf of the setting current circuit 5321. Because of the configuration of the transistors 6064, 6065, 6066, and 6067, the multiplied setting current signal Qg varies responding with a result of a multiplication of the minimum value of the voltage signals S1, S2, and S3 by the setting current signal Pf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied setting current signal Qg is a higher harmonic signal which has an amplitude proportional to the setting current signal Pf and which varies 6 times every one period of the detection signals. The predetermined signal K0 of the setting output circuit 5323 is proportional to the composed setting current signal of the multiplied setting current signal Qg and the setting current signal Pg, and hence contains higher harmonic signal components corresponding to the detection signals, at a predetermined percentage.

The adjusting comparator 5330 of FIG. 91 compares the adjusting signal K1 with the predetermined signal K0, and outputs the feedback current signal Ib of a current amplifier which varies responding with the difference of the signals.

According to this configuration, from the three-phase current signals I1, I2, and I3, the adjusting signal K1 proportional to the amplitudes of the two-phase detection signals is produced, and the feedback current signal Ib corresponding to a result of a comparison of the adjusting signal K1 with the predetermined signal K0 is produced. In correspondence with the feedback current signal Ib, the output currents of the current mirror circuit consisting of the transistors 5940 to 5950 vary, and the amplitudes of the three-phase current signals I1, I2, and I3 and the three-phase altering signals H1, H2, and H3 vary. In other words, a feedback loop which adjusts the amplitudes of the three-phase altering signals and the level of the adjusting signal in correspondence with a result of a comparison of the adjusting signal with the predetermined signal is configured. As a result, irrespective of the amplitudes of the two-phase detection signals E1, E2, F1, and F2 of the position detector 5701, the altering signals H1, H2, and H3 have an amplitude of a predetermined value corresponding to the predetermined signal K0.

The predetermined signal K0 of the setting signal producing circuit 5905 is a voltage signal which contains higher harmonic signal components corresponding to a higher harmonic signal of the detection signals, at a predetermined percentage. Since the amplitudes of the altering signals H1, H2, and H3 vary responding with the predetermined signal K0, the altering signals H1, H2, and H3 become sinusoidal voltage signals which analoguely vary and have an amplitude corresponding to the predetermined signal K0.

The configuration and operation of the distributing circuit 4531 of the distribution block 4513 of FIG. 90, and the first driving circuit 4541, the second driving circuit 4542, and the third driving circuit 4543 of the driving block 4514 are the same as those of FIGS. 71 and 72, and hence their detailed description is omitted.

The command current circuit 4050 of the command block 4515 of FIG. 90 is configured in the same manner as that shown in FIG. 57. The output signal d of the command current circuit 4050 is coupled to the input signal D of the distributing circuit 4531. The command current circuit 4050 operates in the same manner as that shown in FIG. 57, and hence its detailed description is omitted.

In the thus configured embodiment, the driving signals for the three-phase coils are produced by using the two-phase detection signals of the position detector. As a result, the number of components of the position detecting elements can be reduced, so that the motor is simplified in configuration.

The adjusting signal K1 which varies in proportion to the amplitudes of the two-phase detection signals of the position detector is produced, and the amplitudes of the altering signals H1, H2, and H3 are adjusted in accordance with a result of a comparison of the adjusting signal K1 with the predetermined signal K0. As a result, the altering signals H1, H2, and H3, the distributed signals M1, M2, and M3, and the driving signals Va, Vb, and Vc are not affected by the amplitudes of the detection signals.

The multiplying setting circuit 5906 is provided in the setting signal producing circuit 5905, and therein: a higher harmonic signal corresponding to the two-phase detection signals is obtained; a multiplied setting current signal is obtained by a multiplication of the higher harmonic signal; and the predetermined signal K0 containing higher harmonic signal components corresponding to the multiplied setting current signal at a predetermined percentage is produced. According to this configuration, the distributed signals M1, M2, and M3 and the driving signals Va, Vb, and Vc sinusoidally analoguely vary responding with the detection signals. Therefore, it is possible to obtain the distributed signals and the driving signals of a reduced distortion level, and a uniform torque is generated, so that the motor is smoothly driven.

Embodiment 18

Figure 93:
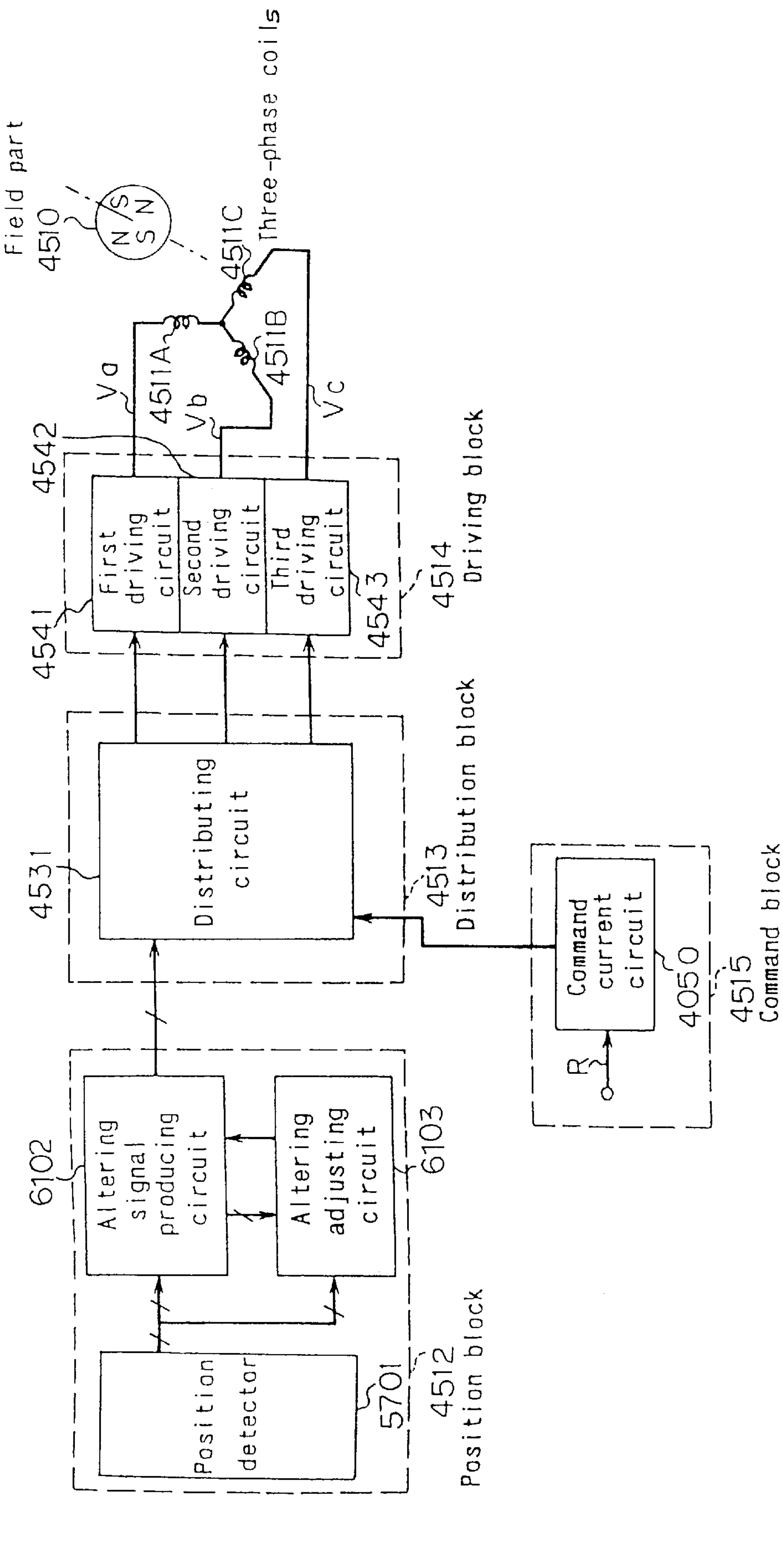
FIG. 93 is a block diagram of Embodiment 18 of the invention.
Figure 94:
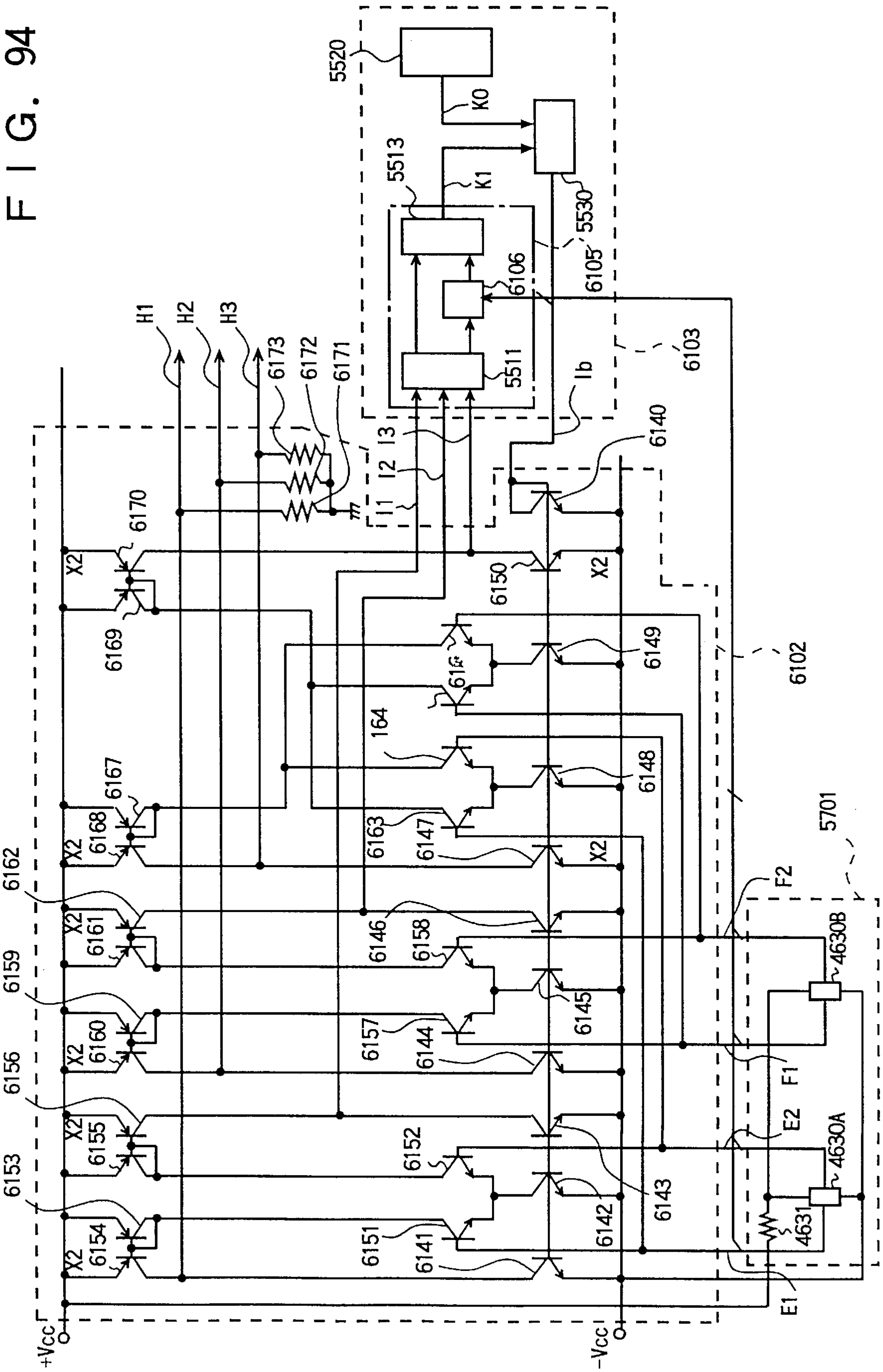
FIG. 94 is a circuit diagram showing a position detector 5701, an altering signal producing circuit 6102, and an altering adjusting circuit 6103 of Embodiment 18.
Figure 95:
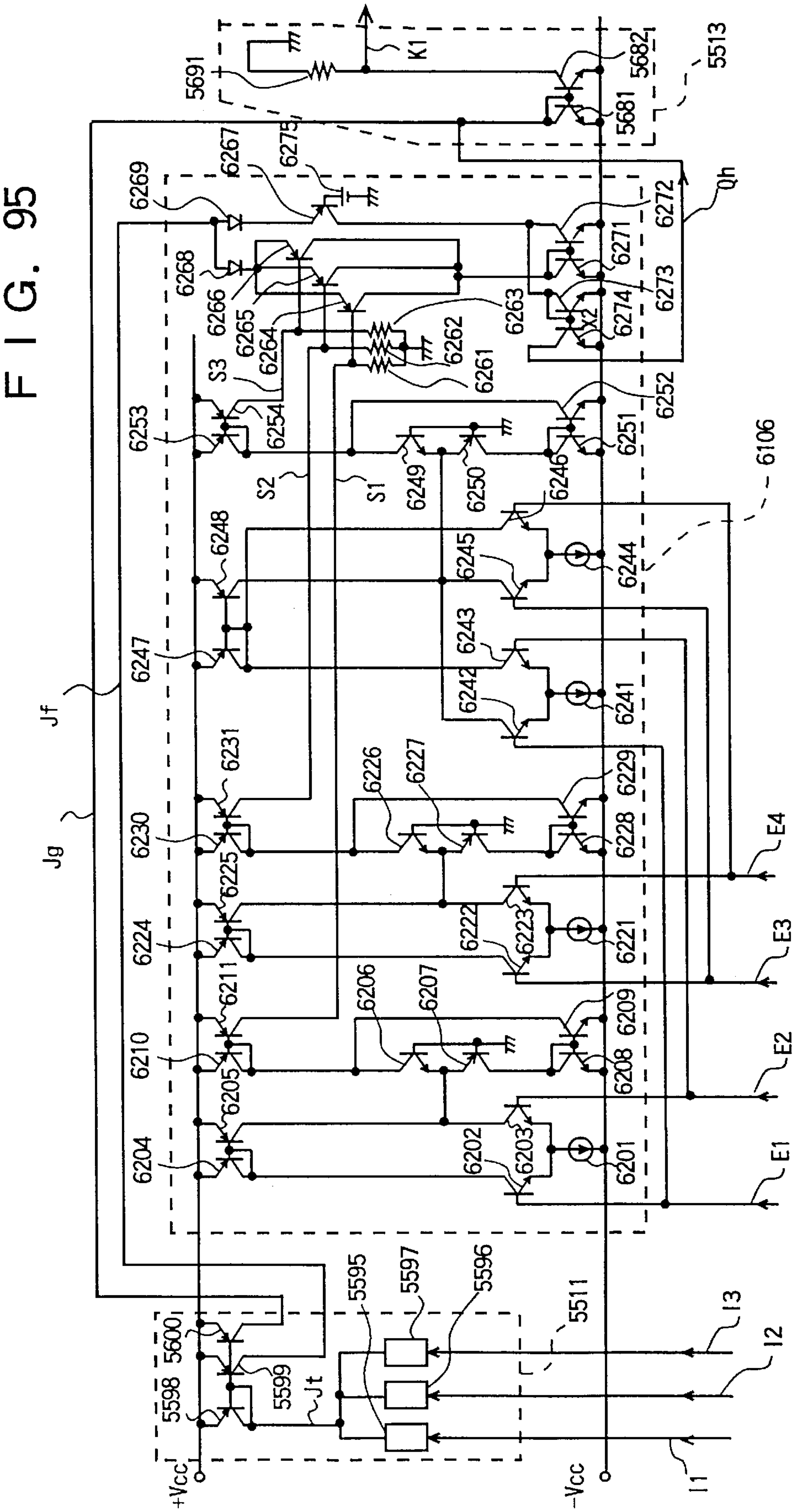
FIG. 95 is a circuit diagram showing an adjusting signal producing circuit 6105 as labeled in FIG. 94 of Embodiment 18.

FIGS. 93 to 95 show a brushless motor of Embodiment 18 of the invention. FIG. 93 shows the whole configuration of Embodiment 18. In the embodiment, Embodiment 15 (FIG. 84) described above is modified so that the number of the position detecting elements of the position detector is reduced to two. According to this configuration, the number of components constituting the motor can be reduced, and hence the production of a small motor is further facilitated. The components which are identical with those of the Embodiment 15 are designated by the same reference numerals.

FIG. 94 specifically shows the configuration of a position detector 5701, an altering signal producing circuit 6102, and the altering adjusting circuit 6103 of the position block 4512. Position detecting elements 4630A and 4630B of the position detector 5701 correspond to two elements among the three position detecting elements 4607*a*, 4607*b*, and 4607*c* of FIG. 69. A voltage is applied in parallel to the position detecting elements via a resistor 4631. The differential detection signals E1 and E2 corresponding to the detected magnetic field of the field part 4510 (corresponding to the permanent magnet 4602 of FIG. 69) are output from output terminals of the position detecting element 4630A. Similarly, the differential detection signals F1 and F2 corresponding to the detected magnetic field are output from output terminals of the position detecting element 4630B. As the rotational movement of the field part 4510 proceeds, the detection signals E1 and F1 analoguely vary so as to function as two-phase signals which are electrically separated in phase from each other by 120 deg.

Transistors 6140, 6141, 6142, 6143, 6144, 6145, 6146, 6147, 6148, 6149, and 6150 of the altering signal producing circuit 6102 constitute a current mirror circuit into which a current of a value proportional to a feedback current signal Ib flows. In correspondence with the detection signals E1 and E2, differential transistors 6151 and 6152 distribute the value of the current of the transistor 6142 to the collectors. The collector current of the transistor 6151 is amplified two times by a current mirror circuit consisting of transistors 6153 and 6154. A current flowing out from or into the junction of the transistors 6154 and 6141 is supplied to a resistor 6171, so that an altering signal H1 is produced at the terminal of the resistor 6171. The collector current of the transistor 6152 is amplified two times by a current mirror circuit consisting of transistors 6155 and 6156. A current signal I1 flowing out from or into the junction of the transistors 6156 and 6143 is supplied to the altering adjusting circuit 6103. Similarly, in correspondence with the detection signals F1 and F2, the differential transistors 6157 and 6158 distribute the value of the current of the transistor 6145 to the collectors. The collector current of the transistor 6157 is amplified two times by a current mirror circuit consisting of transistors 6159 and 6160. A current flowing out from or into the junction of the transistors 6160 and 6144 is supplied to a resistor 6172, so that an altering signal H2 is produced at the terminal of the resistor 6172. The collector current of the transistor 6158 is amplified two times by a current mirror circuit consisting of transistors 6161 and 6162. A current signal I2 flowing out from or into the junction of the transistors 6162 and 6146 is supplied to the altering adjusting circuit 6103. In correspondence with the detection signals E1 and E2, the differential transistors 6163 and 6164 distribute the value of the current of the transistor 6148 to the collectors. In correspondence with the detection signals F1 and F2, the differential transistors 6165 and 6166 distribute the value of the current of the transistor 6149 to the collectors. The collector currents of the transistors 6164 and 6166 are composed together, and the composed current is amplified two times by a current mirror circuit consisting of transistors 6167 and 6168. A current flowing out from or into the junction of the transistors 6168 and 6147 is supplied to a resistor 6173. An altering signal H3 is produced at the terminal of the resistor 6173. The collector currents of the transistors 6163 and 6165 are composed together, and the composed current is amplified two times by a current mirror circuit consisting of transistors 6169 and 6170. A current signal I3 flowing out from or into the junction of the transistors 6170 and 6150 is supplied to the altering adjusting circuit 6103. In this way, the two-phase detection signals E1 and F1 are composed together by calculation so as to produce three-phase signals.

The altering signals H1, H2, and H3 are three-phase voltage signals which analoguely vary responding with the two-phase detection signals and which substantially have a phase difference of 120 deg. in electric angle, and supplied to the distributing circuit 4531. The current signals I1, I2, and I3 are three-phase current signals which analoguely vary responding with the two-phase detection signals and which substantially have a phase difference of 120 deg. in electric angle, and supplied to the altering adjusting circuit 6103.

The altering adjusting circuit 6103 comprises: an adjusting signal producing circuit 6105 which produces an adjusting signal K1; a setting producing circuit 5520 which produces a predetermined signal K0; and an adjusting comparator 5530 which compares the adjusting signal K1 with the predetermined signal K0. The adjusting signal producing circuit 6105 comprises: an amplitude current circuit 5511 which produces two amplitude current signals proportional to the amplitudes of the detection signals; a multiplying adjusting circuit 6106 which produces a higher harmonic signal synchronized with the detection signals and which produces a multiplied adjusting current signal obtained by multiplying the higher harmonic signal by one of the amplitude current signals; and an adjusting signal output circuit 5513 which produces the adjusting signal K1 proportional to a composed adjusting current signal obtained by composing the other amplitude current signal and the multiplied adjusting current signal together.

FIG. 95 specifically shows the configuration of the adjusting signal producing circuit 6105. Current output circuits 5595, 5596, and 5597 of the amplitude current circuit 5511 output current signals which correspond to the absolute values or the single polarity values of the current signals I1, I2, and I3, respectively. The current output circuits are configured in the same manner as those shown in FIG. 59, and hence their detailed description is omitted. The output current signals of the current output circuits 5595, 5596, and 5597 of the amplitude current circuit 5511 are composed together so as to produce an amplitude current signal Jt. The amplitude current signal Jt is a current signal of a sum of the absolute values or the single polarity values of the three-phase current signals I1, I2, and I3, and hence vary in proportion to the amplitudes of the detection signals E1 and F1. A current mirror circuit consisting of transistors 5598, 5599, and 5600 outputs two amplitude current signals Jf and Jg proportional to the amplitude current signal Jt.

In correspondence with the detection signals E1 and E2 of the position detecting elements, transistors 6202 and 6203 of the multiplying adjusting circuit 6106 distribute the value of the current of a constant current source 6201 to the collectors. The difference current is obtained by a current mirror circuit consisting of transistors 6204 and 6205, and a voltage signal S1 corresponding to the absolute value of the difference current is obtained by a combination of transistors 6206, 6207, 6208, 6209, 6210, and 6211, and a resistor 6261. Namely, the voltage signal S1 corresponding to the absolute value of the detection signal E1-E2 is produced. Similarly, a voltage signal S2 corresponding to the absolute value of the detection signal F1-F2 is produced at the terminal of a resistor 6262 by a combination of a current source 6221, transistors 6222 to 6231, and the resistor 6262. In correspondence with detection signals E1 and E2, transistors 6242 and 6243 distribute the value of the current of a constant current source 6241 to the collectors. In correspondence with detection signals F1 and F2, transistors 6245 and 6246 distribute the value of the current of a constant current source 6244 to the collectors. A current mirror circuit consisting of transistors 6247 and 6248 obtains the difference current of a composed current of the collector currents of the transistors 6243 and 6246, and a composed current of the collector currents of the transistors 6242 and 6245. A voltage signal S3 corresponding to the absolute value of the difference current is obtained by a combination of transistors 6249, 6250, 6251, 6252, 6253, and 6254, and a resistor 6263. In other words, a signal for the third phase is produced from the two-phase detection signals, and the voltage signal S3 corresponding to the absolute value of the signal for the third phase is produced. Transistors 6264, 6265, 6266, and 6267, and diodes 6268 and 6269 compare the voltage signals S1, S2, and S3 with a predetermined voltage value (including 0 V) of a constant voltage source 6275. In correspondence with the difference voltages, the amplitude current signal Jf of the amplitude current circuit 5511 is distributed to the collectors. The collector currents of the transistors 6264, 6265, and 6266 are composed together into a composed current. A current mirror circuit consisting of transistors 6271 and 6272 compares the composed current with the collector current of the transistor 6267, and the difference current is input to a current mirror circuit consisting of transistors 6273 and 6274 and reduced in current value to approximately one half. The resulting current is output as a multiplied adjusting current signal Qh (inflow current).

The adjusting signal output circuit 5513 produces a composed adjusting current signal in which the multiplied adjusting current signal Qh of the multiplying adjusting circuit 6106 and the other amplitude current signal Jg of the amplitude current circuit 5511 are composed together. The composed adjusting current signal is supplied to a resistor 5691 via a current mirror circuit consisting of transistors 5681 and 5682. The adjusting signal K1 is output from the terminal of the resistor 5691.

The multiplied adjusting current signal Qh of the multiplying adjusting circuit 6106 varies responding with results of multiplications of the voltage signals S1, S2, and S3 corresponding to the two-phase detection signals by the amplitude current signal Jf of the amplitude current circuit 5511. Because of the configuration of the transistors 6264, 6265, 6266, and 6267, the multiplied adjusting current signal Qh varies responding with a result of a multiplication of the minimum value of the voltage signals S1, S2, and S3 by the amplitude current signal Jf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied adjusting current signal Qh is a higher harmonic signal which has an amplitude proportional to the amplitude current signal Jf and which varies 6 times every one period of the detection signals. The adjusting signal K1 of the adjusting signal output circuit 5513 is proportional to the composed adjusting current signal of the multiplied adjusting current signal Qh and the amplitude current signal Jg, and contains higher harmonic signal components corresponding to the detection signals, at a predetermined percentage.

In the setting signal producing circuit 5520 of FIG. 94, a predetermined signal K0 is produced by a combination of a constant current source which produces a setting current signal, and a resistor. The adjusting comparator 5530 compares the adjusting signal K1 with the predetermined signal K0, and supplies the feedback current signal Ib corresponding to the result of the comparison, to the altering signal producing circuit 6102. These components are configured in the same manner as those shown in FIG. 85, and hence their detailed description is omitted.

According to this configuration, from the three-phase current signals I1, I2, and I3, the adjusting signal K1 proportional to the amplitudes of the two-phase detection signals is produced, and the feedback current signal Ib corresponding to a result of a comparison of the adjusting signal K1 with the predetermined signal K0 is produced. In correspondence with the feedback current signal Ib, the output currents of the current mirror circuit consisting of the transistors 6140 to 6150 vary, and the amplitudes of the three-phase current signals I1, I2, and I3 and the three-phase altering signals H1, H2, and H3 vary. In other words, a feedback loop which adjusts the amplitudes of the three-phase altering signals and the level of the adjusting signal in correspondence with a result of a comparison of the adjusting signal with the predetermined signal is configured. As a result, irrespective of the amplitudes of the two-phase detection signals E1, E2, F1, and F2 of the position detector 5701, the altering signals H1, H2, and H3 have an amplitude of a predetermined value corresponding to the predetermined signal K0.

The adjusting signal K1 of an adjusting signal producing circuit 6105 is a voltage signal which contains higher harmonic signal components corresponding to a higher harmonic signal of the detection signals, at a predetermined percentage. Since the amplitudes of the altering signals H1, H2, and H3 vary responding with the difference of the adjusting signal K1 and the predetermined signal K0, the altering signals H1, H2, and H3 become sinusoidal voltage signals which analoguely vary and have an amplitude corresponding to the predetermined signal K0.

The configuration and operation of the distributing circuit 4531 of the distribution block 4513 of FIG. 93, and the first driving circuit 4541, the second driving circuit 4542, and the third driving circuit 4543 of the driving block 4514 are the same as those of FIGS. 71 and 72, and hence their detailed description is omitted.

The command current circuit 4050 of the command block 4515 of FIG. 93 is configured in the same manner as that shown in FIG. 57. The output signal d of the command current circuit 4050 is coupled to the input signal D of the distributing circuit 4531. The command current circuit 4050 operates in the same manner as that shown in FIG. 57, and hence its detailed description is omitted.

In the thus configured embodiment, the driving signals for the three-phase coils are produced by using the two-phase detection signals of the position detector. As a result, the number of components of the position detecting elements can be reduced, so that the motor is simplified in configuration.

The adjusting signal K1 which varies in proportion to the amplitudes of the two-phase detection signals of the position detector is produced, and the amplitudes of the altering signals H1, H2, and H3 are adjusted in accordance with a result of a comparison of the adjusting signal K1 with the predetermined signal K0. As a result, the altering signals H1, H2, and H3, the distributed signals M1, M2, and M3, and the driving signals Va, Vb, and Vc are not affected by the amplitudes of the detection signals.

The multiplying adjusting circuit 6106 is disposed in the adjusting signal producing circuit 6105, and therein: a higher harmonic signal corresponding to the two-phase detection signals is obtained; a multiplied adjusting current signal is obtained by multiplication of the higher harmonic signal; and the adjusting signal K1, which contains higher harmonic signal components corresponding to the multiplied adjusting current signal at a predetermined percentage is produced. According to this configuration, the distributed signals M1, M2, and M3 and the driving signals Va, Vb, and Vc sinusoidally analoguely vary responding with the detection signals. Therefore, it is possible to obtain the distributed signals and the driving signals of a reduced distortion level, and a uniform torque is generated, so that the motor is smoothly driven.

Embodiment 19

Figure 96:
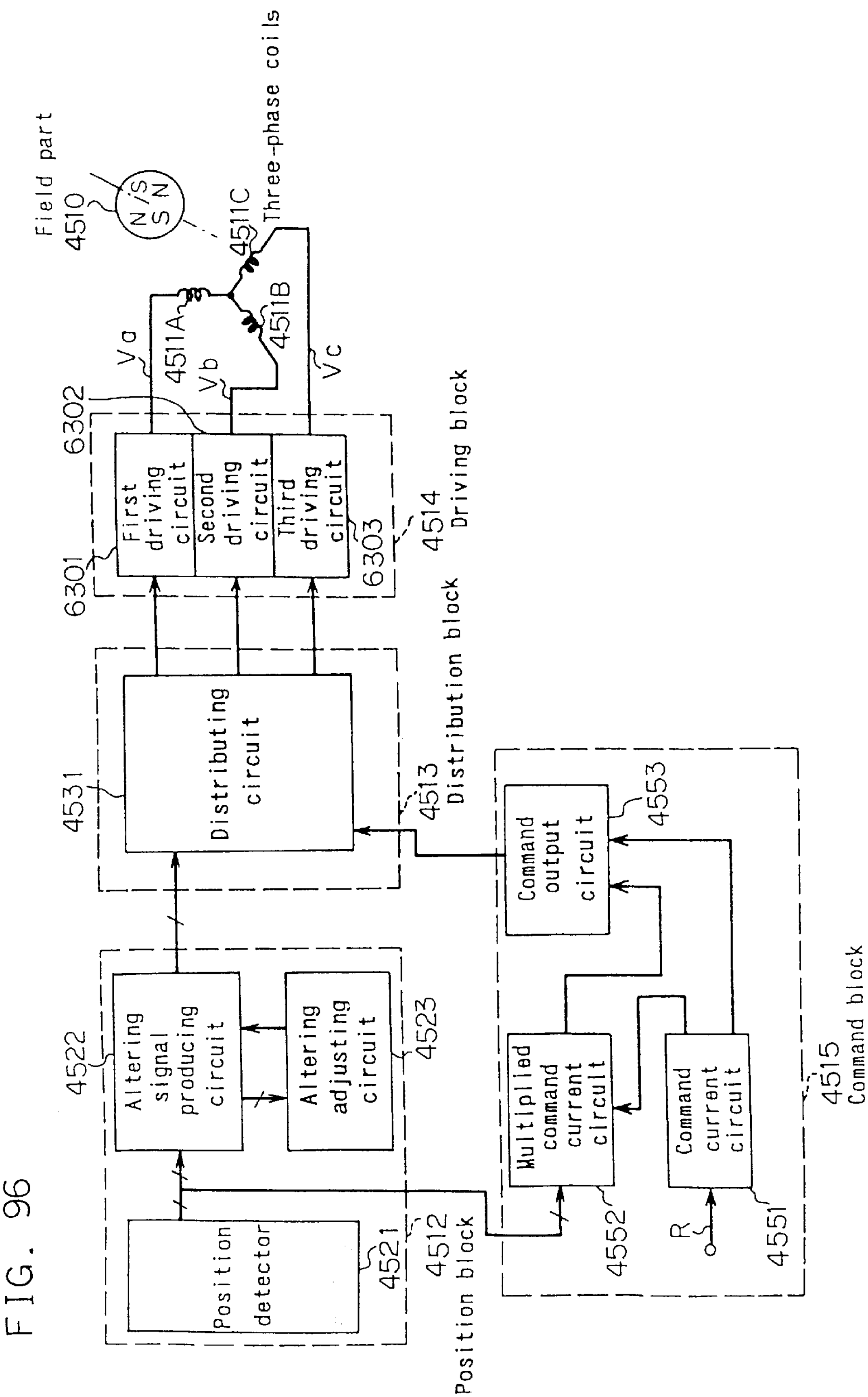
FIG. 96 is a block diagram of Embodiment 19 of the invention.
Figure 97:
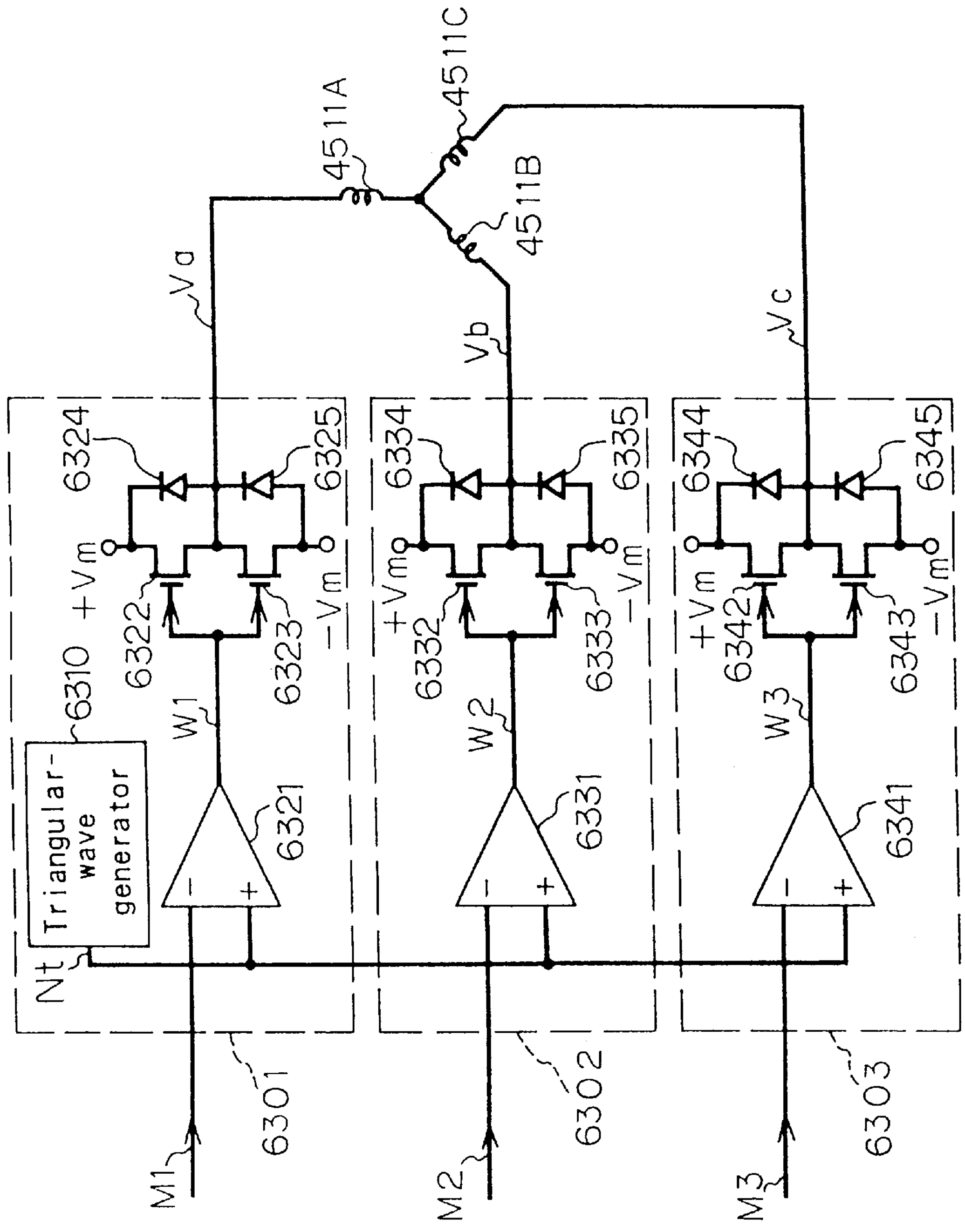
FIG. 97 is a circuit diagram showing a first driving circuit 6301, a second driving circuit 6302, and a third driving circuit 6303 of Embodiment 19.

FIGS. 96 and 97 show a brushless motor of Embodiment 19 of the invention. In Embodiment 19, Embodiment 12 (FIG. 68) described above is modified, so that a first driving circuit 6301, a second driving circuit 6302, and a third driving circuit 6303 of the driving block 4514 are configured to make PWM driving (Pulse-Width Modulation driving), thereby reducing the power consumption of the driving block 4514. The components which are identical with those of Embodiment 12 described above are designated by the same reference numerals.

FIG. 97 specifically shows the configuration of the first driving circuit 6301, the second driving circuit 6302, and the third driving circuit 6303 of the driving block 4514. A comparator 6321 of the first driving circuit 6301 compares a triangular wave signal Nt generated by a triangular wave generator 6310 with the distributed signal M1, and produces a PWM signal W1 of a pulse width corresponding to the distributed signal M1. In correspondence with the level of the PWM signal W1, driving transistors 6322 and 6323 are complementarily turned on or off. A driving signal Va which digitally varies responding with the PWM signal W1 is supplied to the power supply terminal of the coil 4511A by a combination of the driving transistors 6322 and 6323 and driving diodes 6324 and 6325. Similarly, a comparator 6331 of the second driving circuit 6302 compares the triangular wave signal Nt generated by the triangular wave generator 6310 with the distributed signal M2, and produces a PWM signal W2 of a pulse width corresponding to the distributed signal M2. In correspondence with the level of the PWM signal W2, driving transistors 6332 and 6333 are complementarily turned on or off. A driving signal Vb which digitally varies responding with the PWM signal W2 is supplied to the power supply terminal of the coil 4511B by a combination of the driving transistors 6332 and 6333 and driving diodes 6334 and 6335. Furthermore, a comparator 6341 of the third driving circuit 6303 compares the triangular wave signal Nt generated by the triangular wave generator 6310 with the distributed signal M3, and produces a PWM signal W3 of a pulse width corresponding to the distributed signal M3. In correspondence with the level of the PWM signal W3, driving transistors 6342 and 6343 are complementarily turned on or off. A driving signal Vc which digitally varies responding with the PWM signal W3 is supplied to the power supply terminal of the coil 4511C by a combination of the driving transistors 6342 and 6343 and driving diodes 6344 and 6345.

The configuration and operation of the position block 4512, the distribution block 4513, and the command block 4515 of FIG. 96 are identical with those of Embodiment 12 described above, and hence their detailed description is omitted.

In the embodiment, in correspondence with the distributed signal M1, M2, and M3, the first driving circuit 6301, the second driving circuit 6302, and the third driving circuit 6303 of the driving block 4514 conduct the PWM operation so that PWM driving signals Va, Vb, Vc are supplied to the three-phase coils 4511A, 4511B, and 4511C. According to this configuration, the power loss of the driving block 4514 can be greatly reduced while a sufficient driving power is supplied to the three-phase coils. In other words, the power losses of the driving transistors and the driving diodes are reduced to a very low level. As a result, it is possible to realize a brushless motor having an excellent power efficiency.

The first driving circuit 6301, the second driving circuit 6302, and the third driving circuit 6303 which are used in the embodiment may be used in the above-described embodiments, thereby reducing the power loss of the embodiments.

Embodiment 20

Figure 98:
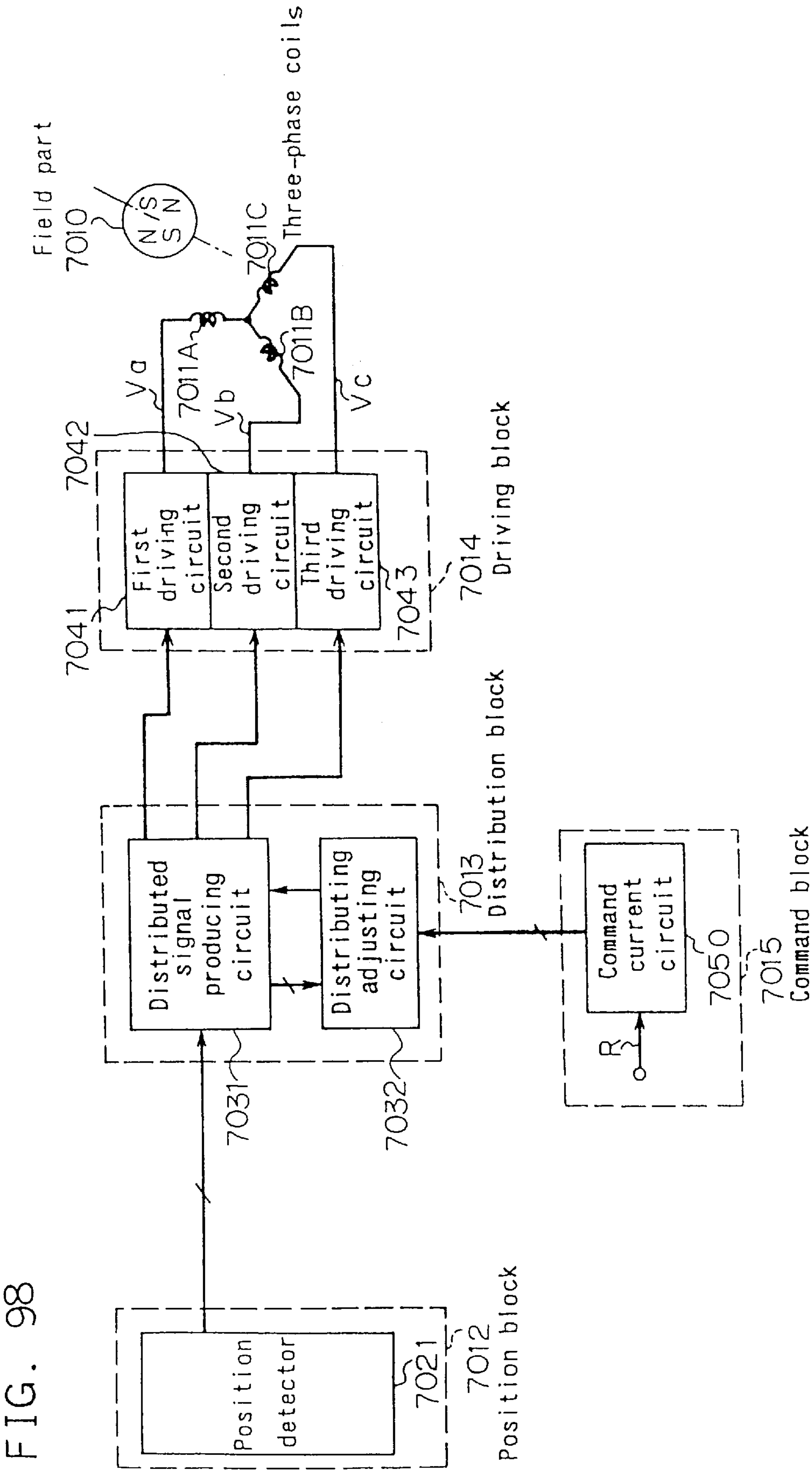
FIG. 98 is a block diagram of Embodiment 20 of the invention.

FIGS. 98 to 103 show a brushless motor of Embodiment 20 of the invention. In the circuit block diagrams, a connection line to or from circuit block with oblique short bar crossing therewith represents plural connection lines or a connection line for aggregate signals. FIG. 98 is a block diagram showing the whole configuration of the motor. A field part 7010 shown in FIG. 98 is mounted on the rotor or a movable body and forms plural magnetic field poles by means of magnetic fluxes generated by poles of a permanent magnet, thereby generating field magnetic fluxes. Three-phase coils 7011A, 7011B, and 7011C are mounted on the stator or a stationary body being electrically separated from each other by a given angle (corresponding to 120 deg.) with respect to intercrossing with the magnetic fluxes generated by the field part 7010.

Figure 99:
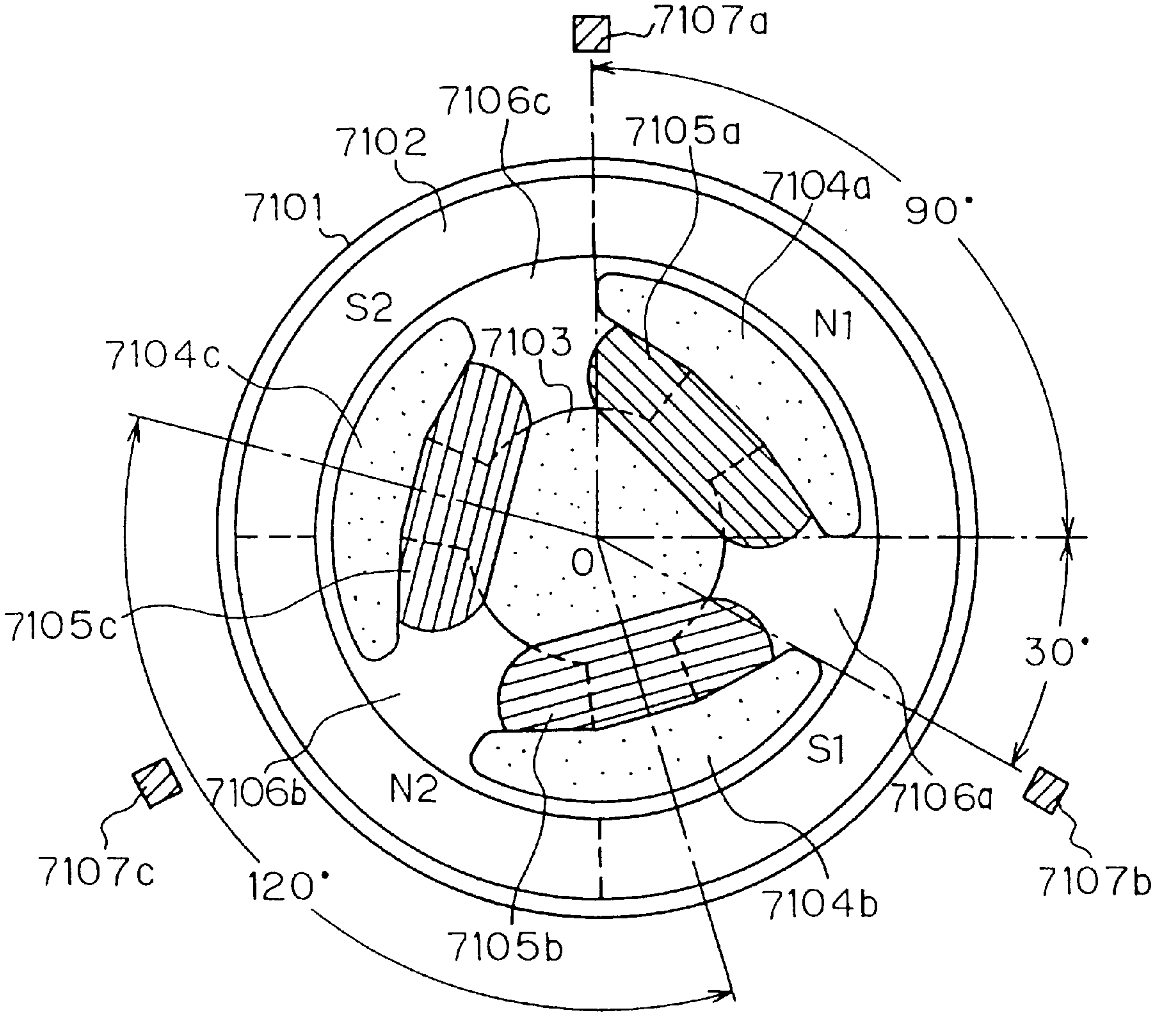
FIG. 99 is a diagram showing the structure of a motor of Embodiment 20.

FIG. 99 specifically shows the configuration of the field part 7010 and the three-phase coils 7011A, 7011B, and 7011C. In an annular permanent magnet 7102 attached to the inner side of the rotor 7101, the inner and end faces are magnetized so as to form four poles, thereby constituting the field part 7010 shown in FIG. 98. An armature core 7103 is placed at a position of the stator which opposes the poles of the permanent magnet 7102. Three salient poles 7104*a*, 7104*b*, and 7104*c* are disposed in the armature core 7103 at intervals of 120 deg. Three-phase coils 7105*a*, 7105*b*, and 7105*c* (corresponding to the three-phase coils 7011A, 7011B, and 7011C of FIG. 98) are wound on the salient poles 7104*a*, 7104*b*, and 7104*c* by using winding slots 7106*a*, 7106*b*, and 7106*c* formed between the salient poles, respectively. Among the coils 7105*a*, 7105*b*, and 7105*c*, phase differences of 120 deg. in electric angle are established with respect to intercrossing magnetic fluxes from the permanent magnet 7102. The mechanical angle of 180 deg. of one set of N and S poles corresponds to an electric angle of 360 deg. Three position detecting elements 7107*a*, 7107*b*, and 7107*c* (for example, Hall elements which are magnetoelectrical converting elements) are arranged on the stator and detect the poles of the end face of the permanent magnet 7102, thereby obtaining three-phase detection signals corresponding to relative position between the field part and the coils. The coils and the position detecting elements are shifted in phase by an electric angle of 90 deg. When driving signals which are in phase with the detection signals of the position detecting elements are applied to the coils, a rotation force in a predetermined direction can be obtained.

A command block 7015 shown in FIG. 98 comprises a command current circuit 7050, produces an output current signal corresponding to a command signal R, and supplies the output current signal to a distributing adjusting circuit 7032 of a distribution block 7013.

Figure 100:
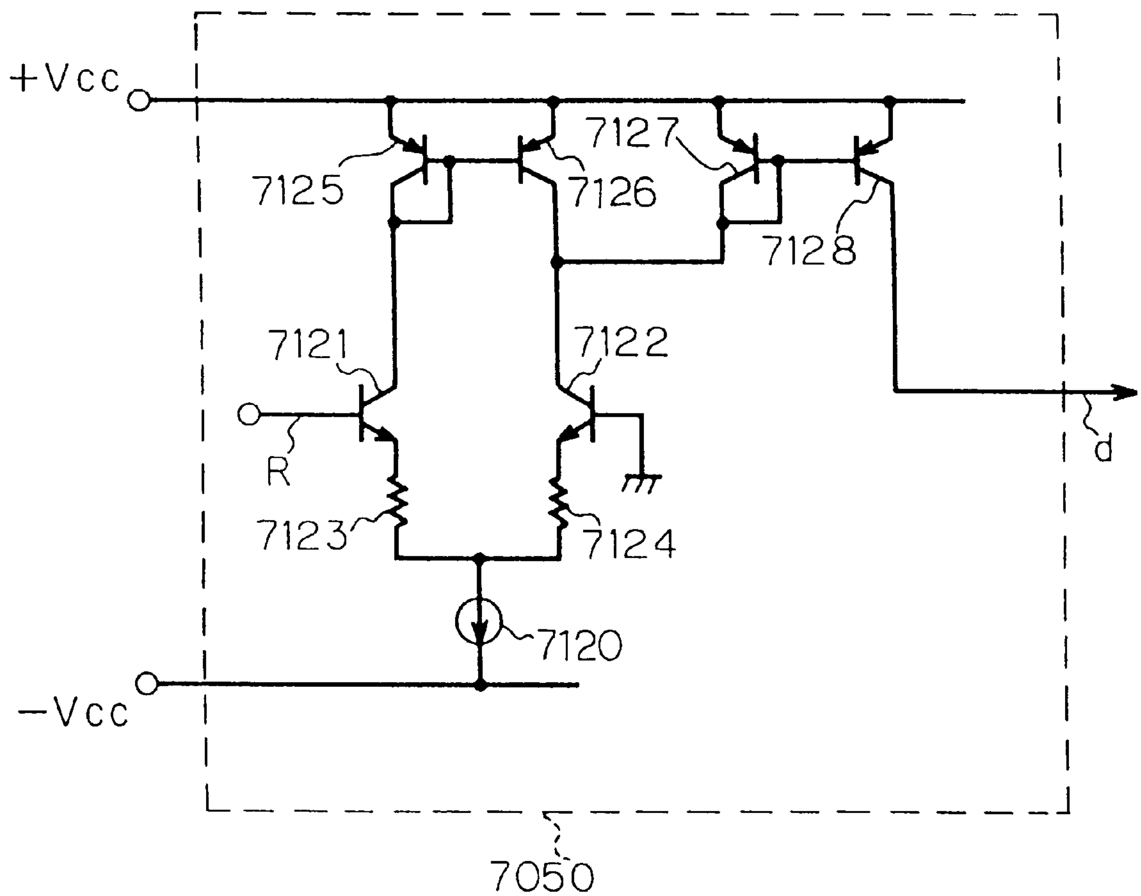
FIG. 100 is a circuit diagram showing a command current circuit 7050 of Embodiment 20.

FIG. 100 specifically shows the configuration of the command current circuit 7050. In the circuit to which +Vcc and −Vcc (+Vcc=9 V and −Vcc=−9 V) are applied, transistors 7121 and 7122, and resistors 7123 and 7124 constitute a differential circuit which operates in correspondence with the command signal R and distributes the value of the current of a constant current source 7120 to the collectors of the transistors 7121 and 7122. The collector currents of the transistors 7121 and 7122 are compared with each other by a current mirror circuit consisting of transistors 7125 and 7126, and the difference current is output through a current mirror circuit consisting of transistors 7127 and 7128 so as to obtain an output current signal d. In the embodiment, as the command signal R becomes lower than the ground level or 0 V, the output current signal d is increased.

A position block 7012 shown in FIG. 98 comprises the position detector 7021, and supplies the detection signals of position detecting elements of the position detector 7021 to a distributed signal producing circuit 7031 of the distribution block 7013.

Figure 101:
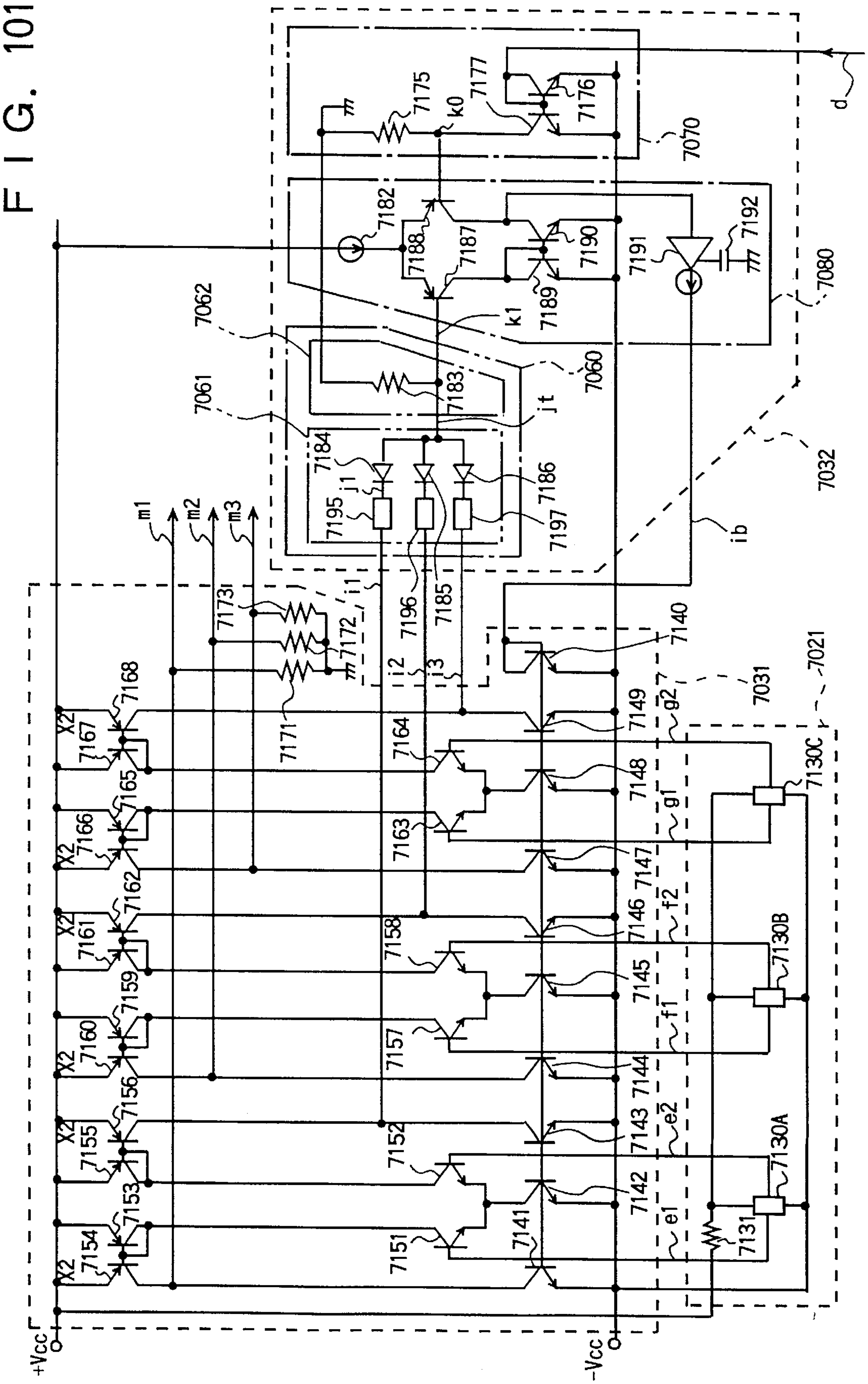
FIG. 101 is a circuit diagram showing a position detector 7021, a distributed signal producing circuit 7031, and a distributing adjusting circuit 7032 of Embodiment 20.

FIG. 101 specifically shows the configuration of the position detector 7021 of the position block 7012, the distributed signal producing circuit 7031 of the distribution block 7013, and the distributing adjusting circuit 7032. The position detecting elements 7130A, 7130B, and 7130C of the position detector 7021 correspond to the position detecting elements 7107*a*, 7107*b*, and 7107*c* of FIG. 99. A voltage is applied in parallel to the position detecting elements via a resistor 7131. Differential detection signals e1 and e2 corresponding to the detected magnetic field of the field part 7010 (corresponding to the permanent magnet 7102 of FIG. 99) are output from output terminals of the position detecting element 7130A and then supplied to the bases of differential transistors 7151 and 7152 of the distributed signal producing circuit 7031. Differential detection signals f1 and f2 corresponding to the detected magnetic field of the field part 7010 are output from output terminals of the position detecting element 7130B and then supplied to the bases of differential transistors 7157 and 7158. Differential detection signals g1 and g2 corresponding to the detected magnetic field of the field part 7010 are output from output terminals of the position detecting element 7130C and then supplied to the bases of differential transistors 7163 and 7164. As the rotational movement of the field part 7010 proceeds, the detection signals e1, f1, and g1 and e2, f2, and g2 analoguely vary so as to function as three-phase signals which are electrically separated in phase from each other by 120 deg. The detection signals e1 and e2 vary in reversed phase relationships, f1 and f2 vary in reversed phase relationships, and g1 and g2 vary in reversed phase relationships. In the embodiment, the signals of reversed phase relationships are not counted in the number of phases.

Transistors 7140, 7141, 7142, 7143, 7144, 7145, 7146, 7147, 7148, and 7149 of the distributed signal producing circuit 7031 constitute a current mirror circuit, and output (or receive) currents of a value proportional to a feedback current signal ib. In correspondence with the detection signals e1 and e2, the differential transistors 7151 and 7152 distribute the value of the current of the transistor 7142 to the collectors. The collector current of the transistor 7151 is amplified two times by a current mirror circuit consisting of transistors 7153 and 7154. A current flowing out from or into the junction of the transistors 7154 and 7141 is supplied to a resistor 7171, so that a distributed signal m1 is produced at the terminal of the resistor 7171. The collector current of the transistor 7152 is amplified two times by a current mirror circuit consisting of transistors 7155 and 7156. A current signal i1 flowing out from or into the junction of the transistors 7156 and 7143 is supplied to the distributing adjusting circuit 7032. Similarly, in correspondence with the detection signals f1 and f2, the differential transistors 7157 and 7158 distribute the value of the current of the transistor 7145 to the collectors. The collector current of the transistor 7157 is amplified two times by a current mirror circuit consisting of transistors 7159 and 7160. A current flowing out from or into the junction of the transistors 7160 and 7144 is supplied to a resistor 7172, so that a distributed signal m2 is produced at the terminal of the resistor 7172. The collector current of the transistor 7158 is amplified two times by a current mirror circuit consisting of transistors 7161 and 7162. A current signal i2 flowing out from or into the junction of the transistors 7162 and 7146 is supplied to the distributing adjusting circuit 7032. Furthermore, in correspondence with the detection signals g1 and g2, the differential transistors 7163 and 7164 distribute the value of the current of the transistor 7148 to the collectors. The collector current of the transistor 7163 is amplified two times by a current mirror circuit consisting of transistors 7165 and 7166. A current flowing out from or into the junction of the transistors 7166 and 7147 is supplied to a resistor 7173, so that a distributed signal m3 is produced at the terminal of the resistor 7173. The collector current of the transistor 7164 is amplified two times by a current mirror circuit consisting of transistors 7167 and 7168. A current signal i3 flowing out from or into the junction of the transistors 7168 and 7149 is supplied to the distributing adjusting circuit 7032.

The distributed signals m1, m2, and m3 are three-phase voltage signals which analoguely vary responding with the detection signals, and supplied to a first driving circuit 7041, a second driving circuit 7042, and a third driving circuit 7043 of a driving block 7014, respectively. The current signals i1, i2, and i3 are three-phase current signals which analoguely vary responding with the detection signals, and supplied to the distributing adjusting circuit 7032 (in the embodiment, the distributed signals m1, m2, and m3, and the current signals i1, i2, and i3 change in reversed phase relationships, but alternatively the signals may change in phase).

The distributing adjusting circuit 7032 comprises: an adjusting signal producing circuit 7060 which produces an adjusting signal k1; a command side signal producing circuit 7070 which produces a command side signal k0 corresponding to the output current signal d of the command block 7015; and an adjusting comparator 7080 which compares the adjusting signal k1 with the command side signal k0. The adjusting signal producing circuit 7060 comprises: an amplitude current circuit 7061 which produces an amplitude current signal jt varying in proportion to the amplitudes of the detection signals; and an adjusting signal output circuit 7062 which produces the adjusting signal k1 proportional to the amplitude current signal jt. The amplitude current circuit 7061 comprises: current output circuits 7195, 7196, and 7197 to which the three-phase current signals i1, i2, and i3 are respectively input; and current composition diodes 7184, 7185, and 7186. The current output circuits 7195, 7196, and 7197 output current signals corresponding to the absolute values or the single polarity values of the current signals i1, i2, and i3, respectively.

Figure 102:
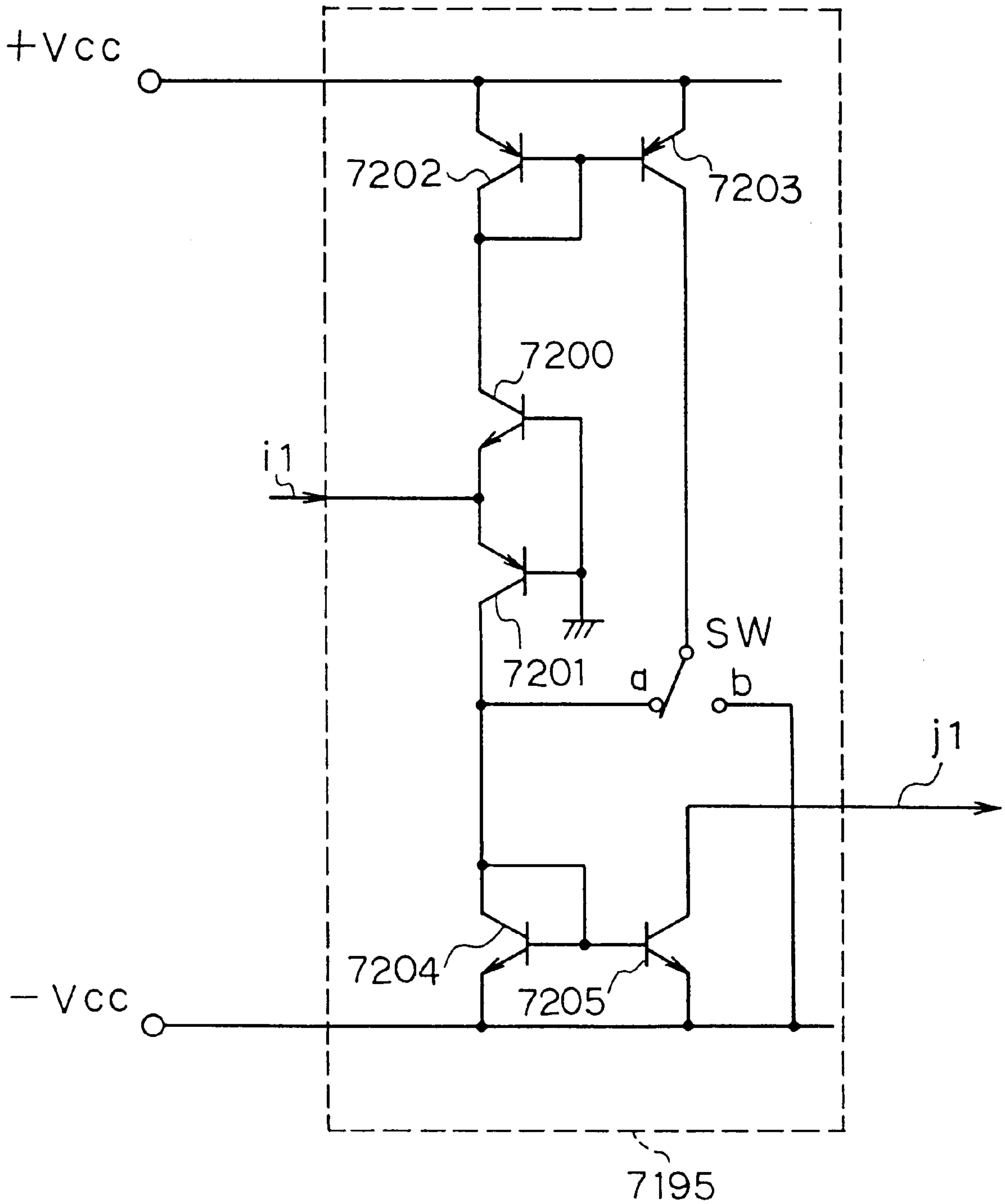
FIG. 102 is a circuit diagram showing a current output circuit 7195 of Embodiment 20.

FIG. 102 specifically shows the configuration of the current output circuit,7195. When a switch SW is in the side of a, the absolute value of the current signal i1 is produced by a combination of transistors 7200, 7201, 7202, and 7203, and a current signal j1 corresponding to the absolute value is output via a current mirror circuit consisting of transistors 7204 and 7205. When the switch SW is in the side of b, a current signal j1 corresponding to the single polarity value of the current signals i1 is output. The current output circuits 4196 and 4197 are similarly configured. Each of the current output circuits may have either of the configuration in which output current signal corresponding to the absolute value of the input current signal is obtained, and that in which output current signal corresponding to the single polarity value of the input current signal is obtained.

The output current signals of the current output circuits 7195, 7196, and 7197 of the amplitude current circuit 7061 are composed together via the diodes 7184, 7185, and 7186, thereby obtaining the amplitude current signal jt. The amplitude current signal jt is a current signal of a sum of the absolute values or the single polarity values of the three-phase current signals i1, i2, and i3, and hence vary in proportion to the amplitudes of the detection signals e1, f1, and g1. The adjusting signal output circuit 7062 supplies the amplitude current signal jt to a resistor 7183, so that the adjusting signal k1 is produced at the terminal of the resistor 7183. Therefore, the adjusting signal k1 varies in proportion to the amplitudes of the detection signals.

The command side signal producing circuit 7070 supplies the output current signal d of the command block 7015 to a resistor 7175 via a current mirror circuit consisting of transistors 7176 and 7177, so that the command side signal k0 is produced at the terminal of the resistor 7175. In other words, the command side signal k0 is produced by converting the output current signal d of the command block 7015 into a voltage. Therefore, the command side signal k0 is proportional to the output current signal d and substantially corresponds to the output signal of the command block 7015.

In the adjusting comparator 7080, the adjusting signal k1 is compared with the command side signal k0 by a combination of transistors 7187, 7188, 7189, and 7190, and the differential current corresponding to the difference of the signals is input to a current amplifier 7191 which in turn outputs the feedback current signal ib obtained by amplifying the input current. In other words, the adjusting comparator 7080 substantially compares the adjusting signal k1 with the output signal of the command block 7015, and outputs the feedback current signal ib corresponding to a result of the comparison.

In this way, the adjusting signal k1 corresponding to the amplitudes of the three-phase current signals i1, i2, and i3 which are proportional to the detection signals e1, f1, and g1 is produced, and the feedback current signal ib corresponding to a result of the comparison of the adjusting signal k1 and the command side signal k0 is produced. The output currents of the current mirror circuit consisting of the transistors 7140 to 7149 are varied in correspondence with the feedback current signal ib, thereby varying the amplitudes of the three-phase current signals i1, i2, and i3 and the three-phase distributed signals m1, m2, and m3. As a result, a feedback loop which adjusts the amplitudes of the three-phase distributed signals and the level of the adjusting signal in correspondence with a result of a comparison of the adjusting signal k1 with the command side signal k0 is configured. According to this configuration, irrespective of the amplitudes of the detection signals e1, f1, and g1 of the position detector 7021, the distributed signals m1, m2, and m3 have an amplitude of a predetermined value corresponding to the command side signal k0. A capacitor 7192 stabilizes the feedback loop.

The driving block 7014 of FIG. 98 comprises the first driving circuit 7041, the second driving circuit 7042, and the third driving circuit 7043, and supplies driving signals Va, Vb, Vc having a voltage waveform, which is obtained by amplifying the distributed signals m1, m2, and m3 of the distribution block 7013, to the three-phase coils 7011A, 7011B, and 7011C.

Figure 103:
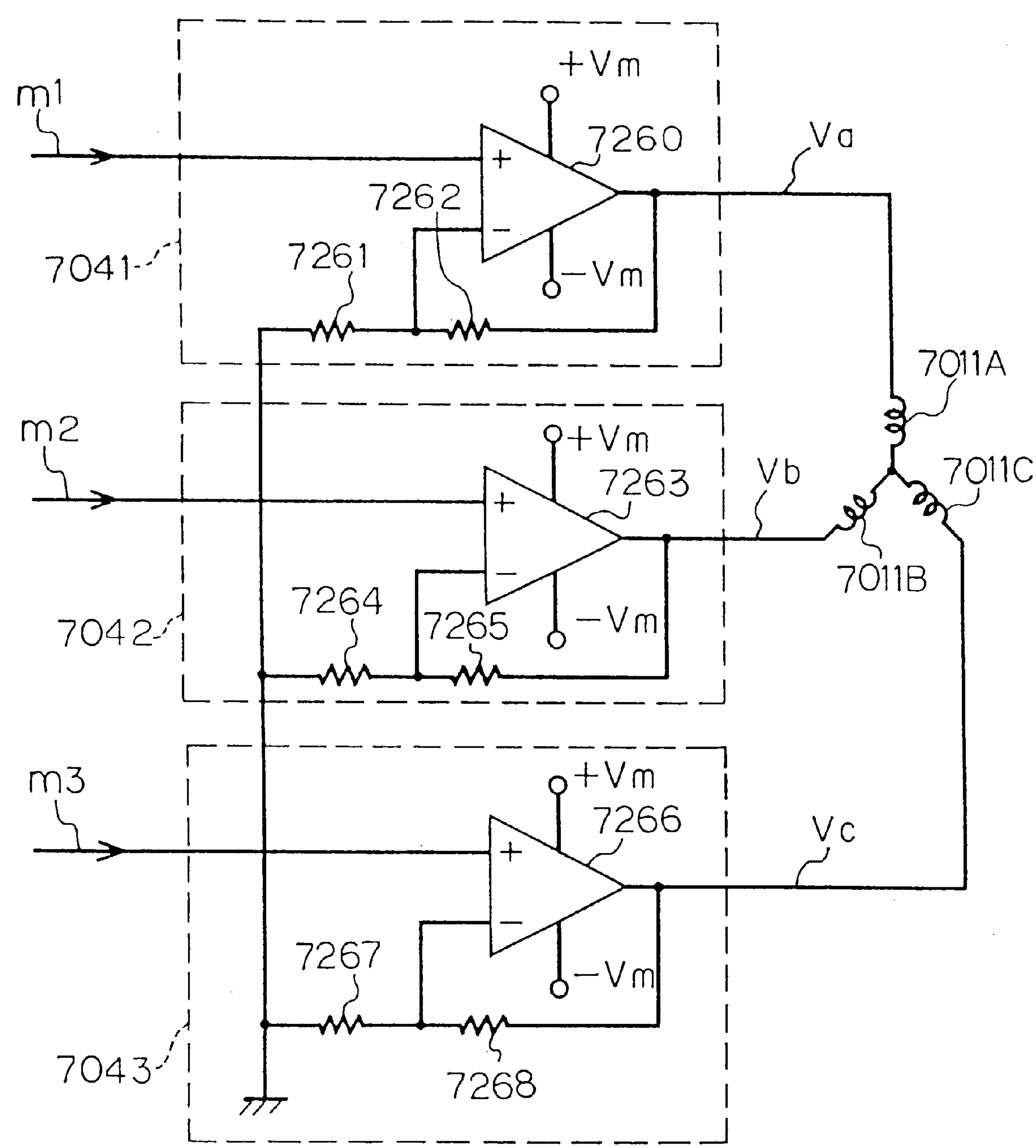
FIG. 103 is a circuit diagram showing a first driving circuit 7041, a second driving circuit 7042, and a third driving circuit 7043 of Embodiment 20.

FIG. 103 specifically shows the first driving circuit 7041, the second driving circuit 7042, and the third driving circuit 7043 of the driving block 7014. The distributed signal m1 is input to the noninverting terminal of an amplifier 7260 of the first driving circuit 7041 and then amplified at an amplification factor defined by resistors 7261 and 7262, thereby producing the driving signal Va. The driving signal Va is supplied to the power input terminal of the coil 7011A. Similarly, the distributed signal m2 is input to the noninverting terminal of an amplifier 7263 of the second driving circuit 7042 and then amplified at an amplification factor defined by resistors 7264 and 7265, thereby producing the driving signal Vb. The driving signal Vb is supplied to the power input terminal of the coil 7011B. Furthermore, the distributed signal m3 is input to the noninverting terminal of an amplifier 7266 of the third driving circuit 7043 and then amplified at an amplification factor defined by resistors 7267 and 7268, thereby producing the driving signal Vc. The driving signal Vc is supplied to the power input terminal of the coil 7011C. The amplifiers 7260, 7263, and 7266 are supplied with power source voltages +Vm and −Vm (+Vm=15 V, −Vm=−15 V).

As a result of the supply of the driving signals Va, Vb, and Vc, three-phase driving currents are supplied to the three-phase coils 7011A, 7011B, and 7011C so that a driving force is generated in a predetermined direction by electromagnetic interaction between the currents of the coils and the magnetic fluxes of the field part 7010.

Figure 104:
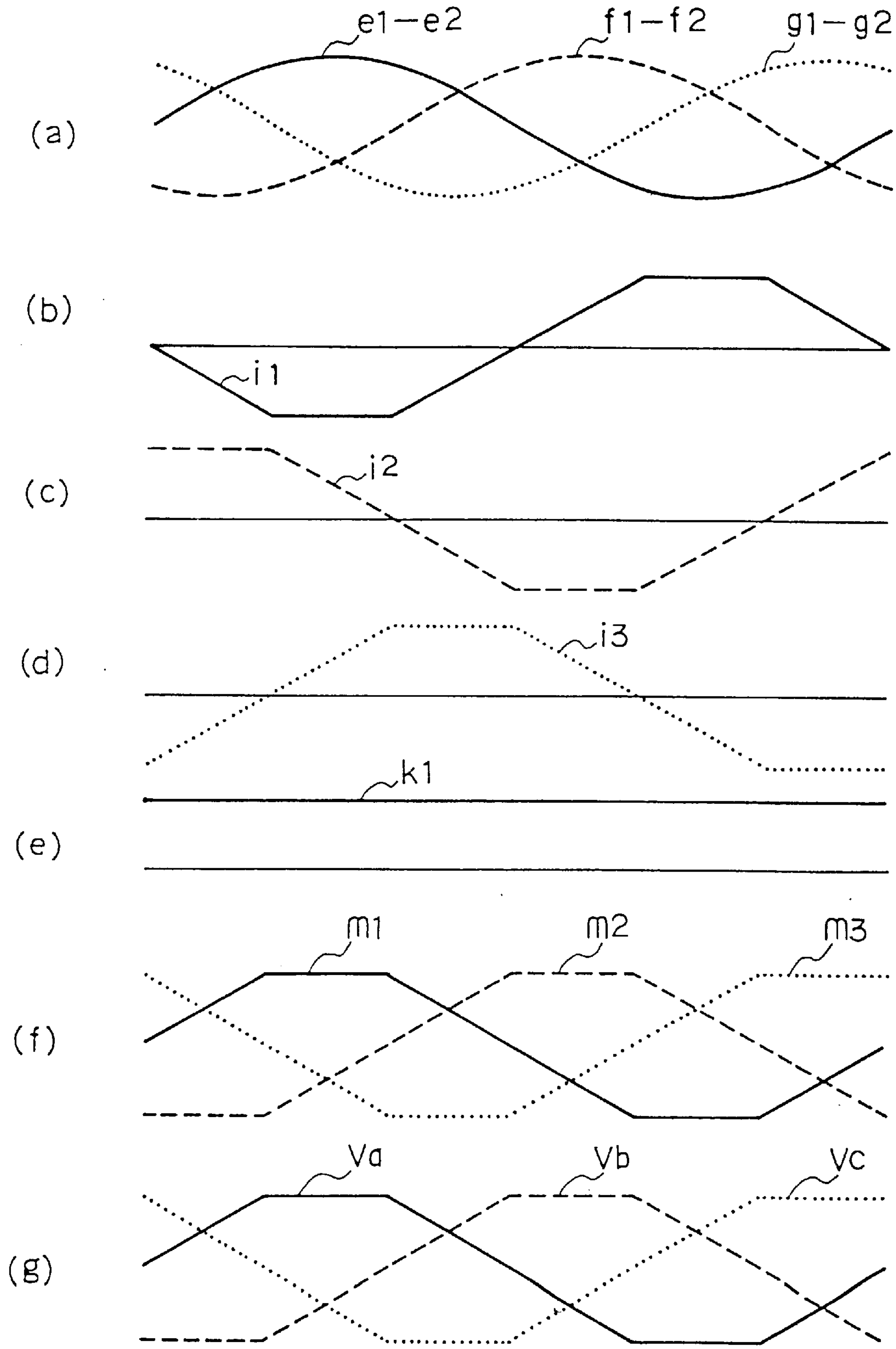
FIG. 104 is a waveform chart of signals of Embodiment mode 20.

FIG. 104 is a waveform chart illustrating the operation of the embodiment. As the rotational movement (or a relative movement with respect to the three-phase coils) of the field part 7010 proceeds, the position detecting elements 7130A, 7130B, and 7130C which detect the magnetic field of the field part 7010 produce sinusoidal detection signals e1-e2, f1-f2, and g1-g2 [see (a) of FIG. 104 wherein the horizontal axis indicates the rotational position]. The distributed signal producing circuit 7031 and the distributing adjusting circuit 7032 produce the three-phase current signals i1, i2, and i3 [(b), (c), and (d) of FIG. 104] which analoguely vary responding with the detection signals and the three-phase distributed signals m1, m2, and m3, and obtains the adjusting signal k1 corresponding to a sum of the absolute values or a sum of the single polarity values of the three-phase current signals i1, i2, and i3 [(e) of FIG. 104 wherein the upper portion of the vertical axis corresponds to the negative side], thereby operating the feedback loop, so that the adjusting signal k1 coincides with the command side signal k0. As a result, in correspondence with a result of a comparison of the adjusting signal k1 with the command side signal k0, also the amplitudes of the distributed signals m1, m2, and m3 are adjusted [(f) of FIG. 104]. The first driving circuit 7041, the second driving circuit 7042, and the third driving circuit 7043 of the driving block 7014 supply the driving signals Va, Vb, and Vc, which are respectively obtained by amplifying the distributed signals m1, m2, and m3, to the three-phase coils 7011A, 7011B, and 7011C [(g) of FIG. 104].

In the thus configured embodiment, an adjusting signal varying in proportion to the amplitudes of the detection signals is produced, and the amplitudes of the distributed signals can be easily adjusted in correspondence with the adjusting signal. As a result, even when the amplitudes of the detection signals of the position detector 7021 are large or small, the amplitudes of the distributed signals m1, m2, and m3 have a predetermined level corresponding to the command side signal k0. Therefore, the distributed signals m1, m2, and m3, and the driving signals Va, Vb, and Vc are not affected by the amplitudes of the detection signals of the position detector. In other words, the signals are free from influences due to variations in the sensitivities of the position detecting elements 7130A, 7130B, and 7130C of the position detector 7021, variations in the magnetic field of the field part 7010, and variations in the gain of the distributed signal producing circuit 7031. When a speed control or a torque control of the brushless motor of the embodiment is made, variations of gains in speed control or torque control among motors are eliminated and hence the control properties of motors in mass production are extremely stabilized. Particularly, a phenomenon of control instability due to variations in the gains of motors does not occur.

When the distributed signal producing circuit 7031 and the distributing adjusting circuit 7032 produce an adjusting signal corresponding to a sum of single polarity values or the absolute values of three-phase current signals, the adjusting signal which varies in proportion to the amplitudes of the detection signals can be always obtained by a simple circuit configuration, and thereby correct adjustment is enabled. It is a matter of course that a circuit which obtains an adjusting signal corresponding to a sum of single polarity values can be configured more simply than that which obtains an adjusting signal corresponding to a sum of the absolute values.

In the embodiment, even when the detection signals of the position detector vary analoguely sinusoidally, the distributed signals and the driving signals are distorted into a trapezoidal shape. In many cases, such distortion is allowable. In order to realize higher performance, however, it is preferable to eliminate such distortion. Next, an embodiment which is improved in this point will be described.

Embodiment 21

Figure 105:
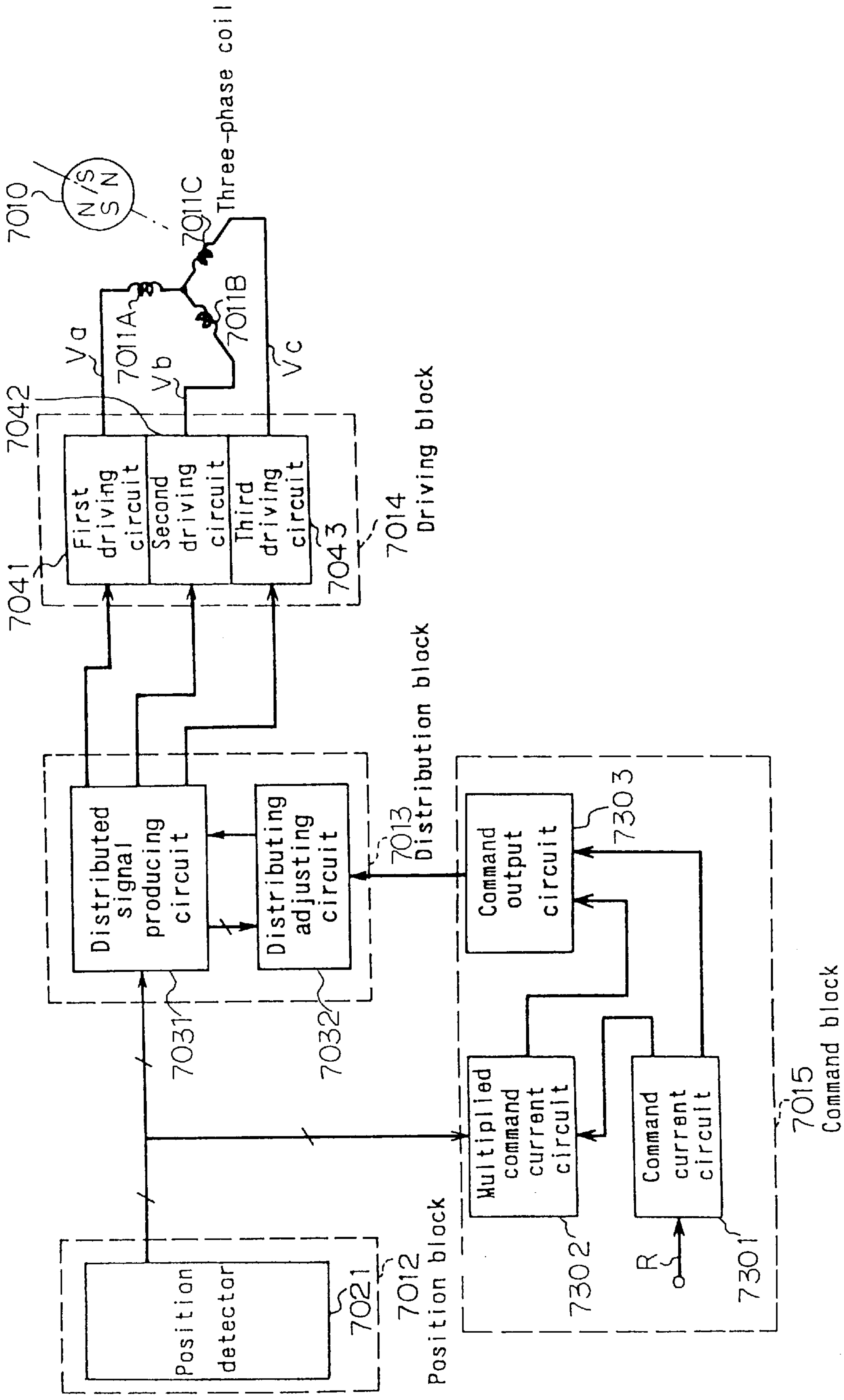
FIG. 105 is a block diagram of Embodiment 21 of the invention.

FIGS. 105 to 108 show a brushless motor of Embodiment 21 of the invention. FIG. 105 shows the whole configuration of the motor. In Embodiment 21, a command block 7015 of FIG. 105 comprises a command current circuit 7301, a multiplied command current circuit 7302, and a command output circuit 7303, and produces sinusoidal distributed signals and driving signals which vary analoguely. The components which are identical with those of the Embodiment 20 described above are designated by the same reference numerals.

Figure 106:
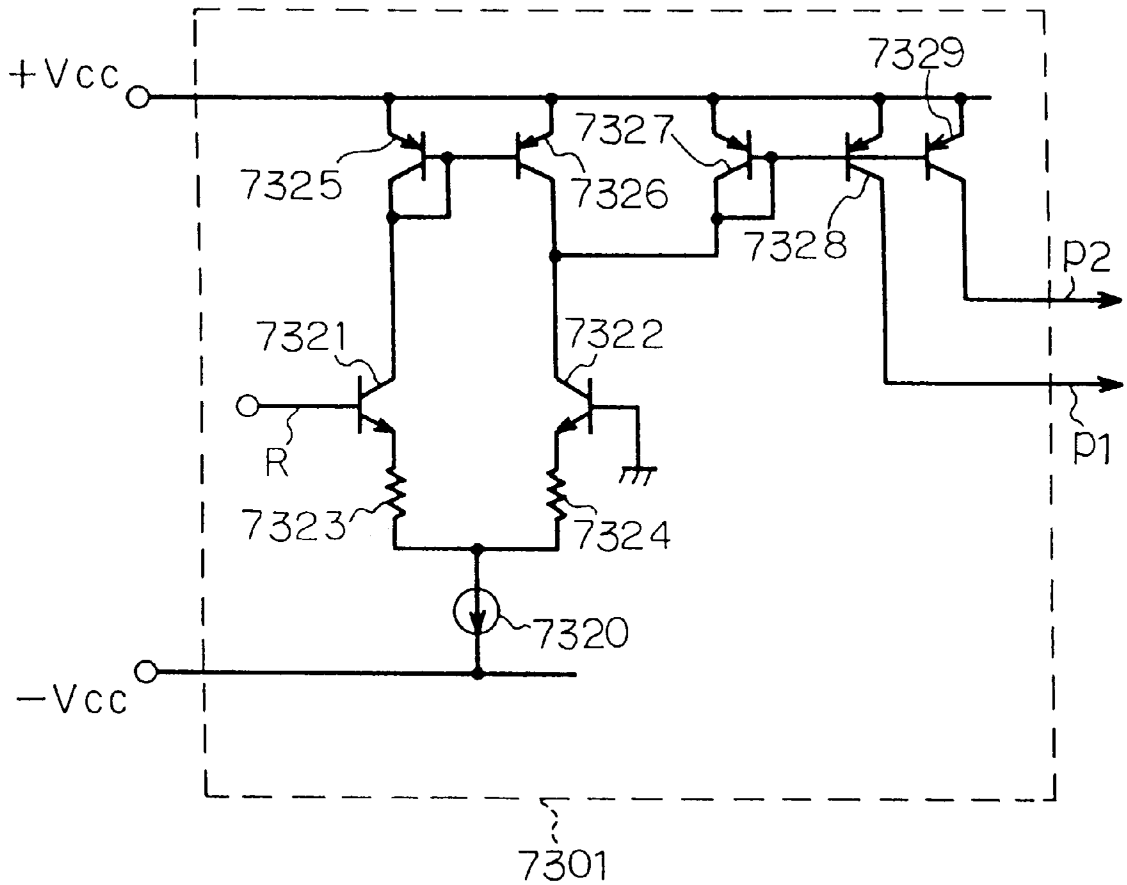
FIG. 106 is a circuit diagram showing a command current circuit 7301 of Embodiment 21.

FIG. 106 specifically shows the configuration of the command current circuit 7301 of the command block 7015. In correspondence with the command signal R, transistors 7321 and 7322, and resistors 7323 and 7324 distribute the value of the current of a constant current source 7320 to the collectors of the transistors 7321 and 7322. The collector currents are compared with each other by a current mirror circuit consisting of transistors 7325 and 7326, and the difference current is output as two command current signals p1 and p2 through a current mirror circuit consisting of transistors 7327, 7328, and 7329. Therefore, the command current circuit 7301 produces the two command current signals p1 and p2 (p1 and p2 are proportional to each other) corresponding to the command signal R. The first command current signal p1 is supplied to the command output circuit 7303, and the second command current signal p2 to the multiplied command current circuit 7302.

Figure 107:
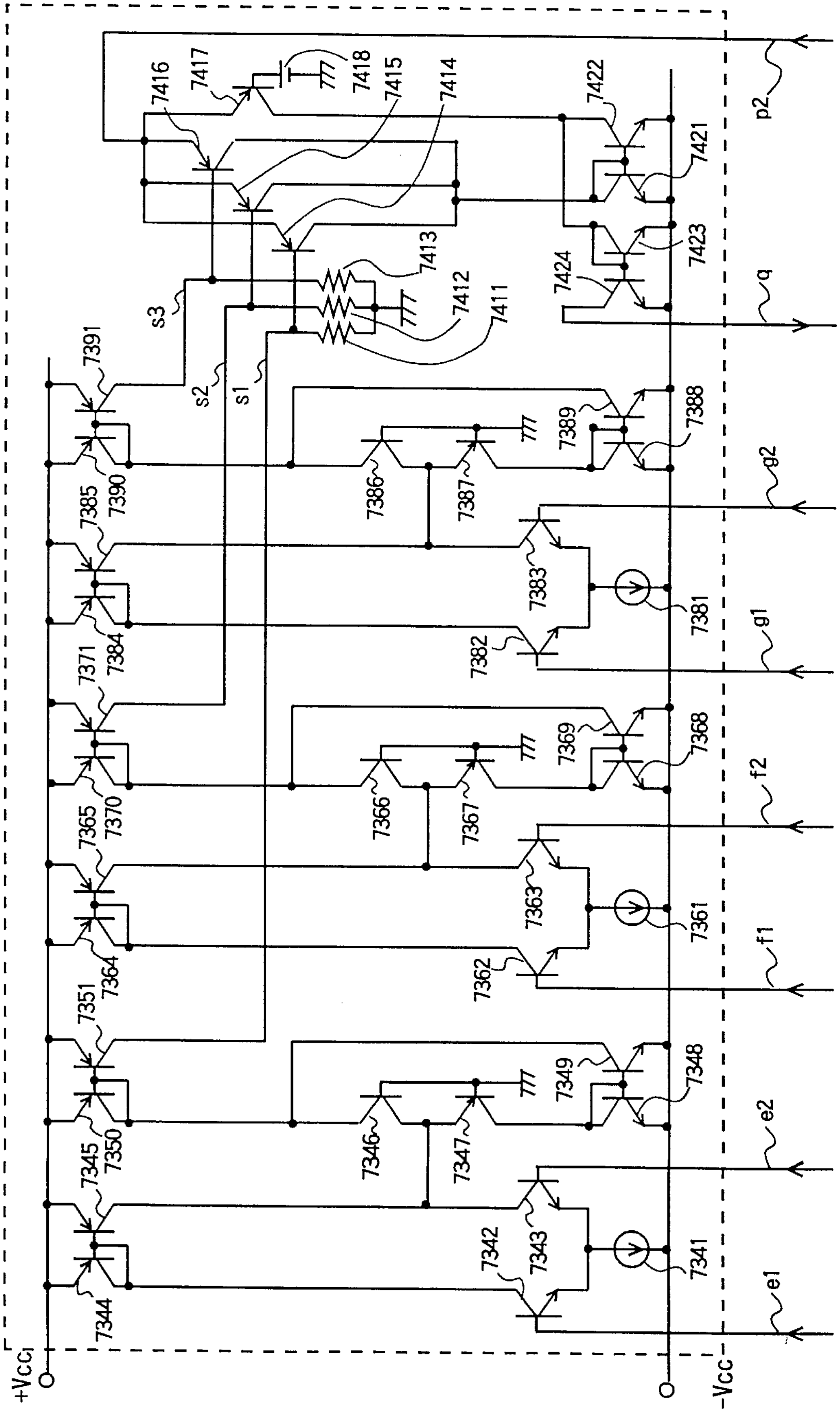
FIG. 107 is a circuit diagram showing a multiplied command current circuit 7302 of Embodiment 21.

FIG. 107 specifically shows the configuration of the multiplied command current circuit 7302 of the command block 7015. In correspondence with the detection signals e1 and e2 of the position detecting elements, transistors 7342 and 7343 distribute the value of the current of a constant current source 7341 to the collectors. The difference current is obtained by a current mirror circuit consisting of transistors 7344 and 7345, and a voltage signal s1 corresponding to the absolute value of the difference current is obtained by a combination of transistors 7346, 7347, 7348, 7349, 7350, and 7351, and a resistor 7411. In other words, the voltage signal s1 corresponding to the absolute value of the detection signal e1−e2 is produced. Similarly, a voltage signal s2 corresponding to the absolute value of the detection signal f1−f2 is produced at a resistor 7412, and a voltage signal s3 corresponding to the absolute value of the detection signal g1−g2 is produced at a resistor 7413. Transistors 7414, 7415, 7416, and 7417 compare the voltage signals s1, s2, and s3 with a predetermined voltage value (including 0 V) of a constant voltage source 7418. In correspondence with the difference voltages, the command current signal p2 of the command current circuit 7301 is distributed to the collectors of the transistors. The, collector currents of the transistors 7414, 7415, and 7416 are composed together. A current mirror circuit consisting of transistors 7421 and 7422 compares the composed current with the collector current of the transistor 7417, and the difference current is output as a multiplied command current signal q (inflow current) via a current mirror circuit consisting of transistors 7423 and 7424. The multiplied command current signal q varies responding with results of multiplications of the voltage signals s1, s2, and s3 corresponding to the detection signals by the command current signal p2 corresponding to the command signal. Particularly, because of the configuration of the transistors 7414, 7415, 7416, and 7417, the multiplied command current signal q varies responding with a result of a multiplication of the minimum value of the voltage signals s1, s2, and s3 by the command current signal p2. The minimum value of the voltage signals s1, s2, and s3 corresponding to the absolute values of the detection signals is a higher harmonic signal which is synchronized with the detection signals and which varies 6 times for a change of every one period of the detection signals. Therefore, the multiplied command current signal q is a higher harmonic signal which has an amplitude proportional to the command current signal p2 and which varies 6 times every one period of the detection signals.

Figure 108:
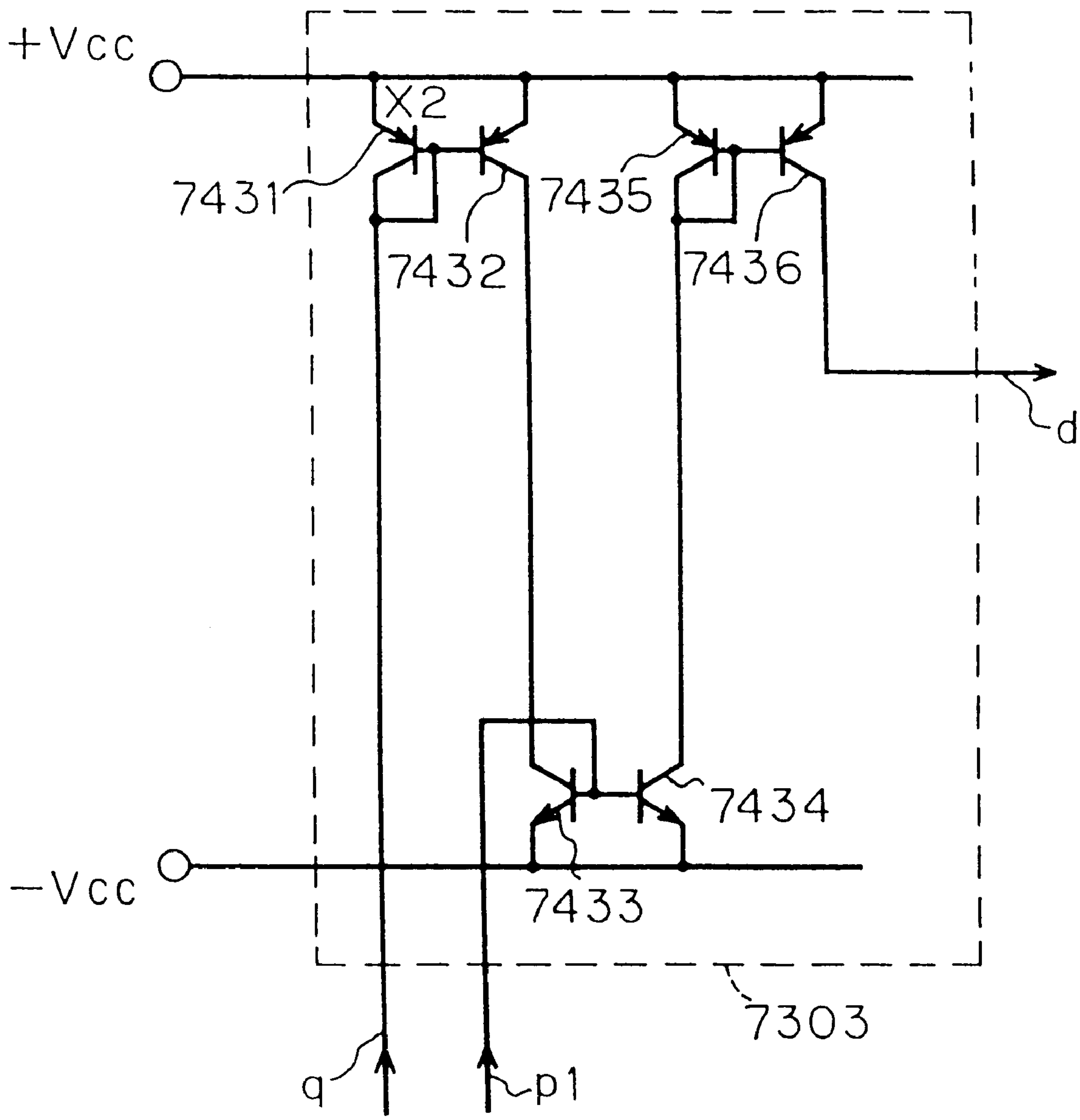
FIG. 108 is a circuit diagram showing a command output circuit 7303 of Embodiment 21.

FIG. 108 specifically shows the configuration of the command output circuit 7303 of the command block 7015. The multiplied command current signal q of the multiplied command output circuit 7302 is input to a current mirror circuit consisting of transistors 7431 and 7432 and reduced in current value to approximately one half. Thereafter, the resulting signal and the first command current signal p1 of the command current circuit 7301 are composed together by addition. The composed command current signal is output as an output current signal d via a current mirror circuit consisting of transistors 7433 and 7434, and that consisting of transistors 7435 and 7436. As a result, the output current signal d of the command block 7015 varies responding with the command signal and contains higher harmonic signal components at a predetermined percentage.

The configuration and operation of the position block 7012 (the position detector 7021), the distribution block 7013 (the distributed signal producing circuit 7031 and the distributing adjusting circuit 7032), and the driving block 7014 (the first driving circuit 7041, the second driving circuit 7042, and the third driving circuit 7043) which are shown in FIG. 105 are the same as those shown in FIGS. 101 and 103. Therefore, their detailed description is omitted.

Figure 109:
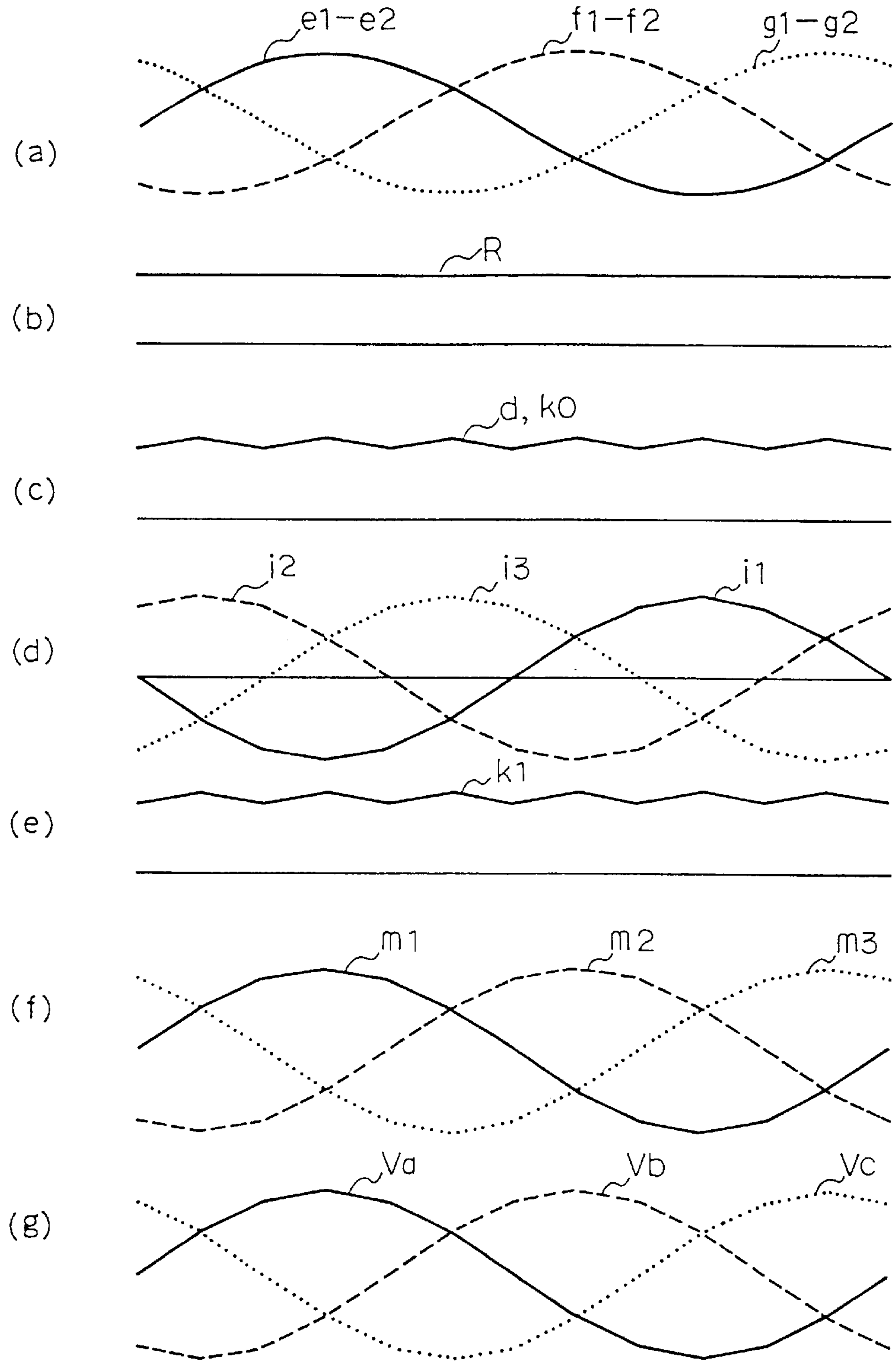
FIG. 109 is a waveform chart of signals of Embodiment 21.

FIG. 109 is a waveform chart illustrating the operation of the embodiment. As the rotational movement (or a relative movement with respect to the three-phase coils) of the field part 7010 proceeds, the position detecting elements 7130A, 7130B, and 7130C which detect the magnetic field of the field part 7010 produce sinusoidal detection signals e1−e2, f1−f2, and g1−g2 [see (a) of FIG. 109 wherein the horizontal axis indicates the rotational position]. In response to the command signal R of a predetermined value [(b) of FIG. 109 wherein the upper portion of the vertical axis corresponds to the negative side], the command current circuit 7301, the multiplied command current circuit 7302, and the command output circuit 7303 of the command block 7015 operate so as to cause the output current signal d of the command block 7015 to contain higher harmonic signal components corresponding to the detection signals, at a predetermined percentage [(c) of FIG. 109]. Since the command side signal k0 is proportional to the output current signal d, also the command side signal k0 contains higher harmonic signal components corresponding to the detection signals. The distributed signal producing circuit 7031 and the distributing adjusting circuit 7032 produce three-phase current signals i1, i2, and i3 [(d) of FIG. 109] which analoguely vary responding with the detection signals of the position detector 7021, and the three-phase distributed signals m1, m2, and m3, and obtains the adjusting signal k1 corresponding to a sum of the absolute values or a sum of the single polarity values of the three-phase current signals i1, i2, and i3 [(e) of FIG. 109 wherein the upper portion of the vertical axis corresponds to the negative side], thereby operating the feedback loop, so that the adjusting signal k1 coincides with the command side signal k0. As a result, in correspondence with a result of a comparison of the adjusting signal k1 with the command side signal k0, also the amplitudes of the distributed signals m1, m2, and m3 are adjusted [(f) of FIG. 109], resulting in that the amplitudes of the distributed signals m1, m2, and m3 have a level corresponding to the command side signal k0 and hence are not affected by the amplitudes of detection signals. The first driving circuit 7041, the second driving circuit 7042, and the third driving circuit 7043 of the driving block 7014 supply the driving signals Va, Vb, and Vc which are respectively obtained by amplifying the distributed signals m1, m2, and m3, to the three-phase coils 7011A, 7011B, and 7011C [(g) of FIG. 109].

In the thus configured embodiment, the distributed signals m1, m2, and m3, and the driving signals Va, Vb, and Vc are not affected by variations in the sensitivities of the position detecting elements 7130A, 7130B, and 7130C of the position detector 7021, variations in the magnetic field of the field part 7010, and variations in the gain of the distributed signal producing circuit 7031.

In the command block, the output signal which is proportional to the command signal and which contain higher harmonic signal components corresponding to a higher harmonic signal of the detection signals at a predetermined percentage is produced. When distributed signals which vary responding with a result of a comparison of the command side signal k0 with the adjusting signal k1 proportional to the output signal are produced, the distributed signals m1, m2, and m3, and the driving signals Va, Vb, and Vc can be formed as three-phase sinusoidal signals which analoguely vary responding with the detection signals. Therefore, distortions of the distributed signals and the driving signals are reduced to a very low level, and a uniform torque is generated, so that the motor is smoothly driven.

In the command block, furthermore, the command current circuit produces two command current signals corresponding to the command signal, the multiplied command current circuit produces the multiplied command current signal which is obtained by multiplying one of the command current signals with a higher harmonic signal of the detection signals, and the command output circuit produces the output current signal (and the command side signal) which is obtained by composing the other command current signal and the multiplied command current signal together. Even when the detection signals vary in amplitude, variations in amplitude of the multiplied command current signal q can be made small and variations in the percentages of higher harmonic signal components contained in the output current signal d (and the command side signal k0) of the command block can be reduced. Because, in the multiplied command current circuit, the transistors 7414, 7415, and 7416 can be operated nonlinearly. In other words, the motor is very resistant to variations in the sensitivities of the position detecting elements and variations in the magnetic field of the field part.

Embodiment 22

FIGS. 110 to 116 show a brushless motor of Embodiment 22 of the invention. In Embodiment 22, the positional relationships between coils and attached positions of position detecting elements are shifted from each other by an electric angle of about 30 deg. additionally, and the detecting elements are positioned between the coils, thereby facilitating the production of a small motor. In accordance with the phase relationships between the position detecting elements and the coils, driving signals which are shifted by 30 deg. as seen from the detection signals of the position detecting elements are applied to the coils, respectively.

Figure 110:
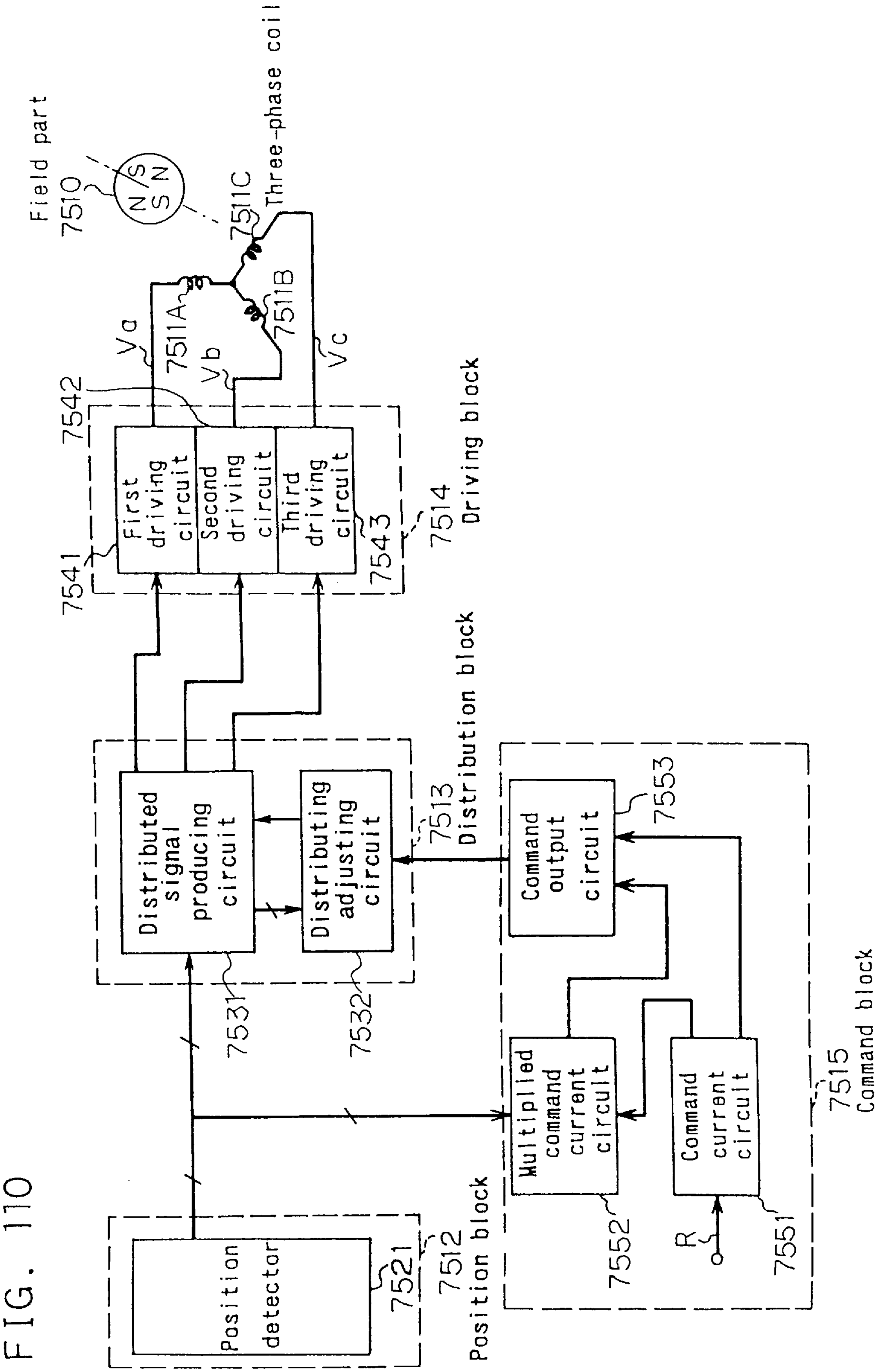
FIG. 110 is a block diagram of Embodiment 22 of the invention.

FIG. 110 shows the whole configuration of the motor. A field part 7510 shown in FIG. 110 is mounted on the rotor or a movable body and forms plural magnetic field poles by means of magnetic fluxes generated by poles of a permanent magnet, thereby generating field magnetic fluxes. Three-phase coils 7511A, 7511B, and 7511C are mounted on the stator or a stationary body and arranged so as to be electrically separated from each other by a predetermined angle (corresponding to 120 deg.) with respect to intercrossing with the magnetic fluxes generated by the field part 7510.

Figure 111:
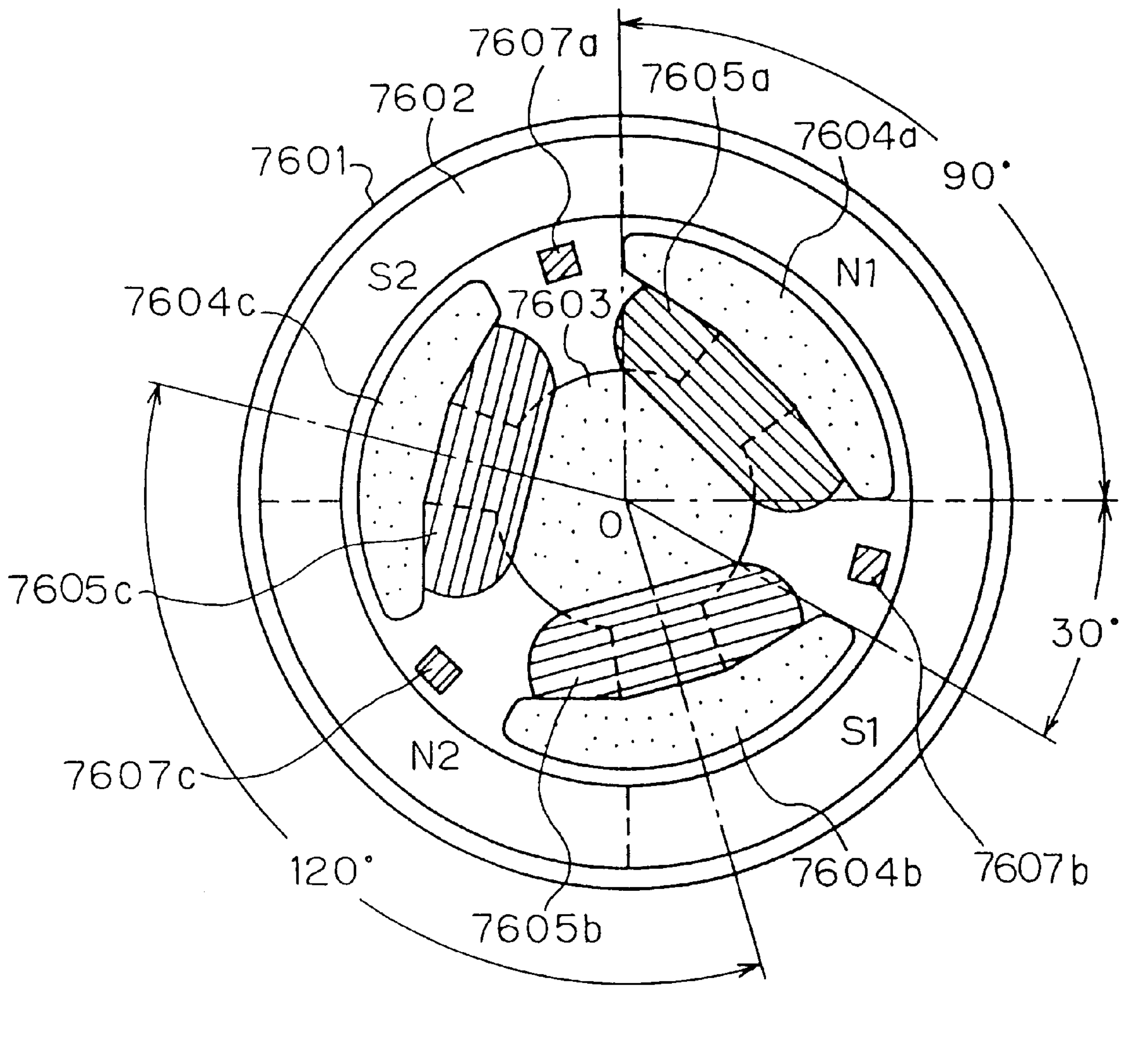
FIG. 111 is a diagram showing the structure of a motor of Embodiment 22.

FIG. 111 specifically shows a field part 7510, and three-phase coils 7511A, 7511B, and 7511C. In an annular permanent magnet 7602 attached to the inner side of the rotor 7601, the inner face is magnetized so as to form four poles, thereby constituting the field part 7510 shown in FIG. 110. An armature core 7603 is placed at a position of the stator which opposes the poles of the permanent magnet 7602. Three salient poles 7604*a*, 7604*b*, and 7604*c* are disposed in the armature core 7603 at intervals of 120 deg. Three-phase coils 7605*a*, 7605*b*, and 7605*c* (corresponding to the three-phase coils 7511A, 7511B, and 7511C of FIG. 110) are wound on the salient poles 7604*a*, 7604*b*, and 7604*c*, respectively. Among the coils 7605*a*, 7605*b*, and 7605*c*, phase differences of 120 deg. in electric angle are established with respect to intercrossing magnetic fluxes from the permanent magnet 7602. Three position detecting elements 7607*a*, 7607*b*, and 7607*c* are arranged on the stator and detect the poles of the permanent magnet 7602, thereby obtaining three-phase detection signals corresponding to relative position between the field part and the coils. In the embodiment, the coils and the position detecting elements are shifted in phase by an electric angle of 120 deg. According to this configuration, the position detecting elements can be disposed between the salient poles of the armature core so as to detect the magnetic field of the inner face portion of the permanent magnet, whereby the motor structure can be miniaturized.

A command block 7515 of FIG. 110 comprises a command current circuit 7551, a multiplied command current circuit 7552, and a command output circuit 7553, and produces an output current signal which contains higher harmonic signal components at a predetermined percentage.

Figure 114:
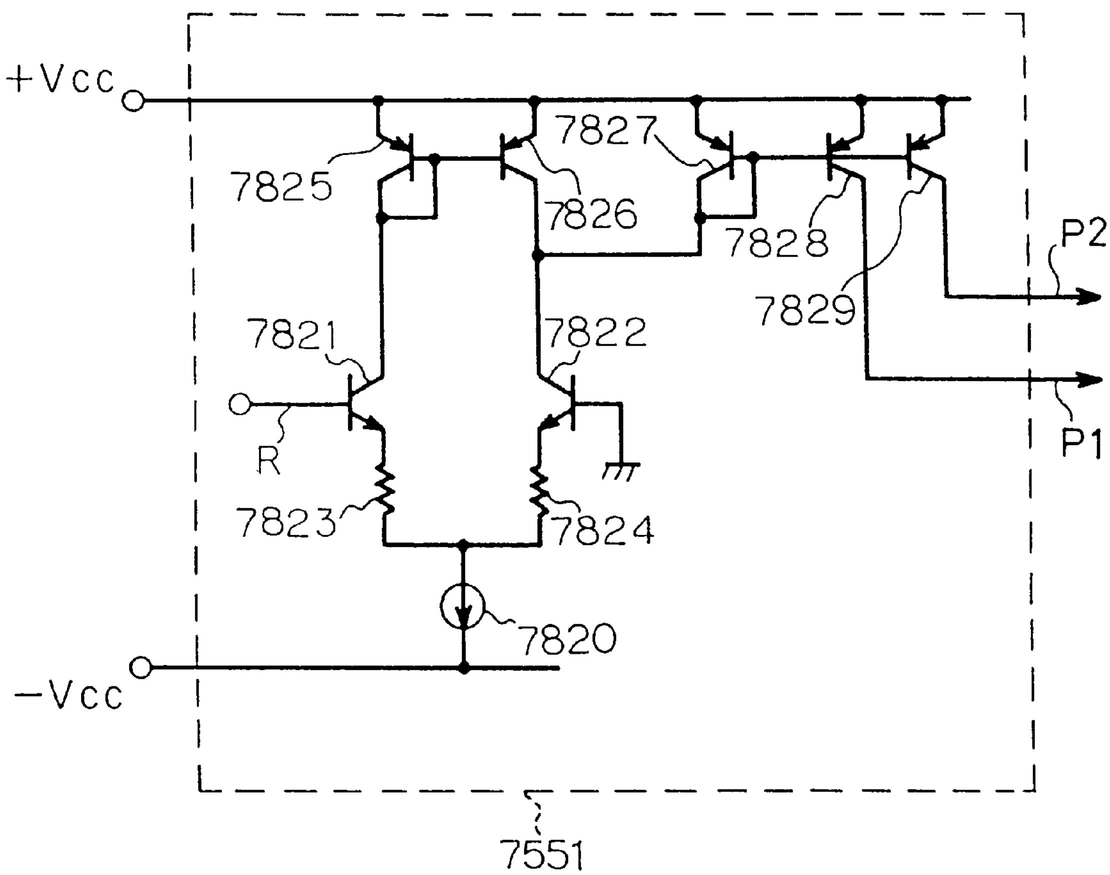
FIG. 114 is a circuit diagram showing a command current circuit 7551 of Embodiment 22.

FIG. 114 specifically shows the configuration of the command current circuit 7551 of the command block 7515. In correspondence with the command signal R, transistors 7821 and 7822, and resistors 7823 and 7824 distribute the value of the current of a constant current source 7820 to the collectors of the transistors 7821 and 7822. The collector currents are compared with each other by a current mirror circuit consisting of transistors 7825 and 7826, and the difference current is output as two command current signals P1 and P2 through a current mirror circuit consisting of transistors 7827, 7828, and 7829. Therefore, the command current circuit 7551 produces the two command current signals P1 and P2 (P1 and P2 are proportional to each other) corresponding to the command signal R. The first command current signal P1 is supplied to the command output circuit 7553, and the second command current signal P2 to the multiplied command current circuit 7552.

Figure 115:
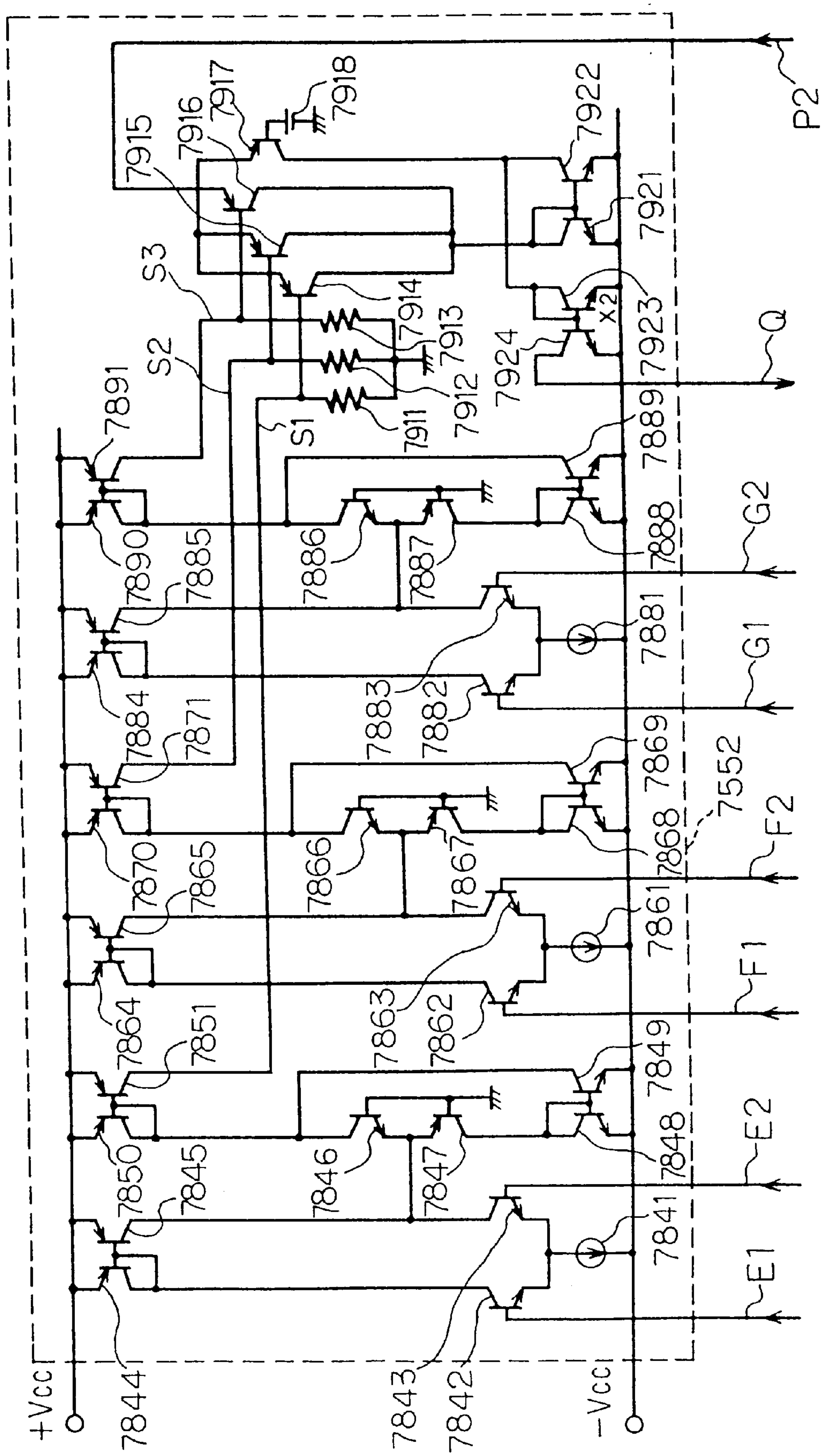
FIG. 115 is a circuit diagram showing a multiplied command current circuit 7552 of Embodiment 22.

FIG. 115 specifically shows the configuration of the multiplied command current circuit 7552 of the command block 7515. In correspondence with detection signals E1 and E2 of the position detecting elements, transistors 7842 and 7843 distribute the value of the current of a constant current source 7841 to the collectors. The difference current is obtained by a current mirror circuit consisting of transistors 7844 and 7845, and a voltage signal S1 corresponding to the absolute value of the difference current is obtained by a combination of transistors 7846, 7847, 7848, 7849, 7850, and 7851, and a resistor 7911. In other words, the voltage signal S1 corresponding to the absolute value of the detection signal E1−E2 is produced. Similarly, a voltage signal S2 corresponding to the absolute value of the detection signal F1−F2 is produced at a resistor 7912, and a voltage signal S3 corresponding to the absolute value of the detection signal G1−G2 is produced at a resistor 7913. Transistors 7914, 7915, 7916, and 7917 compare the three-phase absolute signals S1, S2, and S3 with a predetermined voltage value of a constant voltage source 7918. In correspondence with the difference voltages, the command current signal P2 of the command current circuit 7551 is distributed to the collectors of the transistors. The collector currents of the transistors 7914, 7915, and 7916 are composed together. A current mirror circuit consisting of transistors 7921 and 7922 compares the composed current with the collector current of the transistor 7917. The difference current is input to a current mirror circuit consisting of transistors 7923 and 7924 and reduced in current value to approximately one half. The resulting current is output as a multiplied command current signal Q (inflow current). The multiplied command current signal Q varies responding with results of multiplications of the voltage signals S1, S2, and S3 corresponding to the detection signals by the command current signal P2 corresponding to the command signal R. Particularly, because of the configuration of the transistors 7914, 7915, 7916, and 7917, the multiplied command current signal Q varies responding with a result of a multiplication of the minimum value of the voltage signals S1, S2, and S3 by the command current signal P2. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals.

Figure 116:
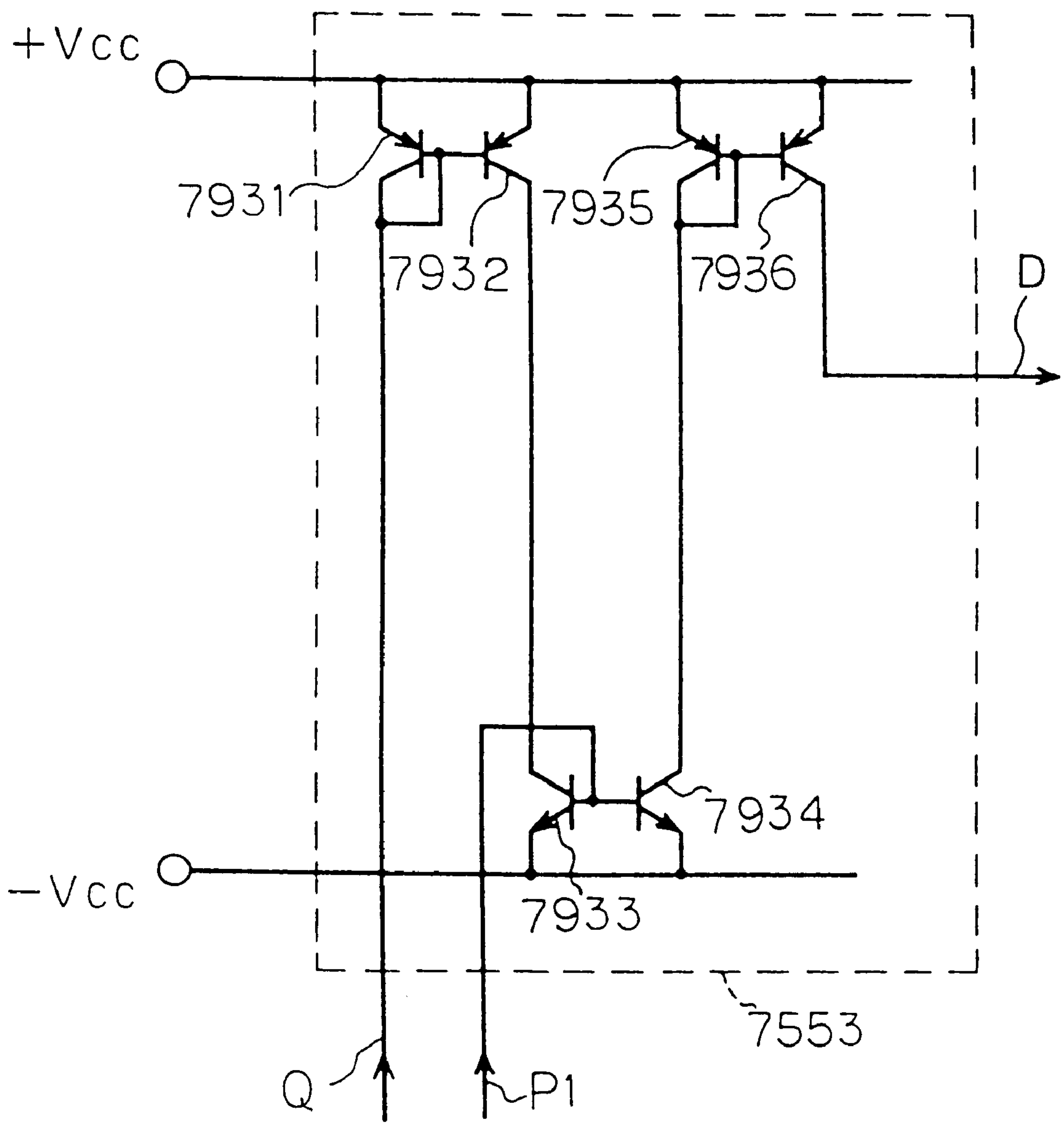
FIG. 116 is a circuit diagram showing a command output circuit 7533 of Embodiment 22.

FIG. 116 specifically shows the configuration of the command output circuit 7553 of the command block 7515. The multiplied command current signal Q of the multiplied command output circuit 7552 is input to a current mirror circuit consisting of transistors 7931 and 7932 and inverted in current direction. Thereafter, the resulting signal and the first command current signal P1 of the command current circuit 7551 are composed together by addition. The composed command current signal is output as an output current signal D via a current mirror circuit consisting of transistors 7933 and 7934, and that consisting of transistors 7935 and 7936. As a result, the output current signal D of the command block 7515 varies responding with the command signal and contains higher harmonic signal components at a predetermined percentage.

A position block 7512 shown in FIG. 110 comprises a position detector 7521. A distribution block 7513 comprises a distributed signal producing circuit 7531 and a distributing adjusting circuit 7532, produces distributed signals which analoguely vary responding with detection signals of position detecting elements of the position detector 7521, and supplies the distributed signals to a driving block 7514.

Figure 112:
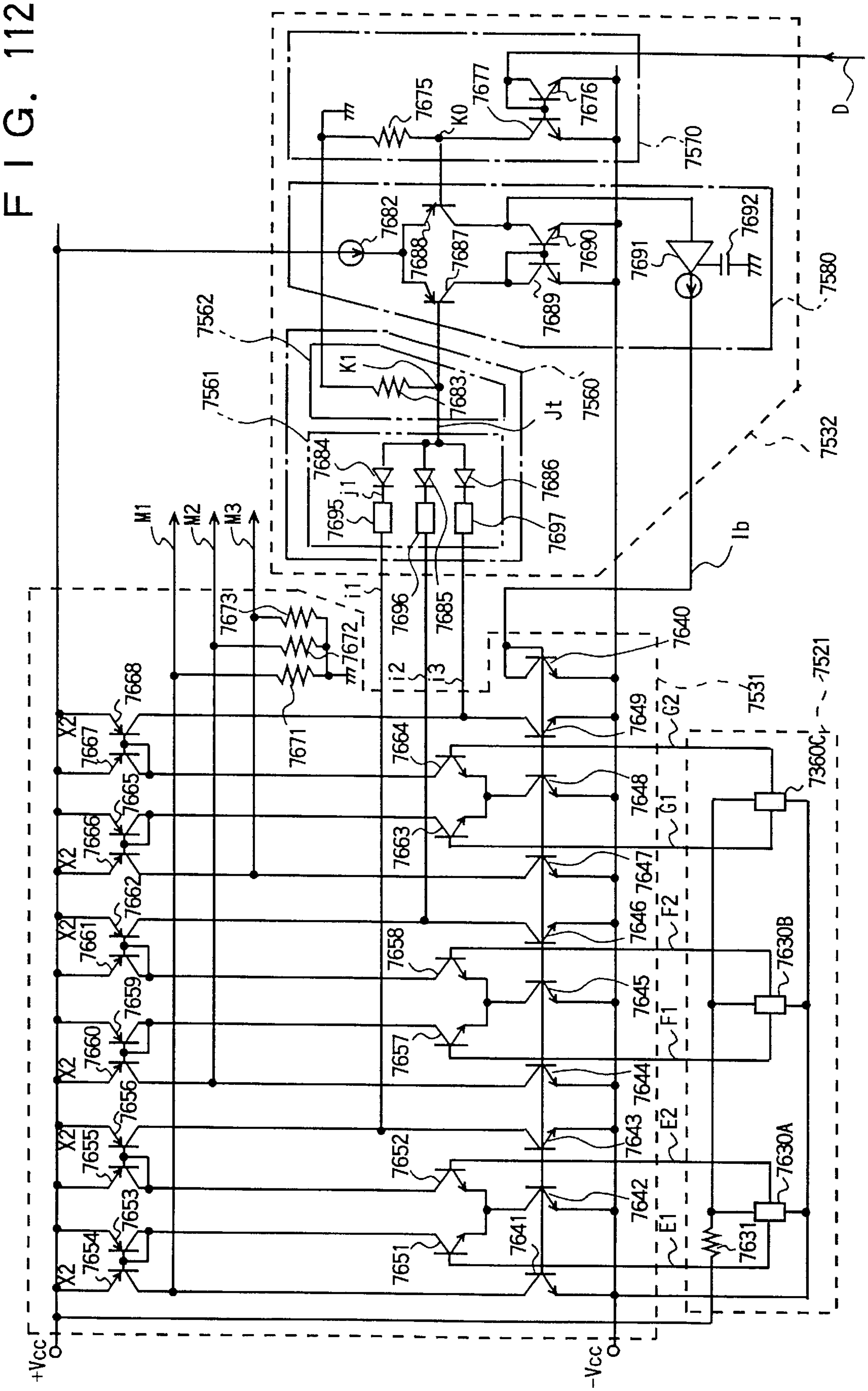
FIG. 112 is a circuit diagram showing a position detector 7521, a distributed signal producing circuit 7531, and a distributing adjusting circuit 7532 of Embodiment 22.

FIG. 112 specifically shows the configuration of the position detector 7521, the distributed signal producing circuit 7531, and the distributing adjusting circuit 7532. The position detecting elements 7630A, 7630B, and 7630C of the position detector 7521 correspond to the position detecting elements 7607*a*, 7607*b*, and 7607*c* of FIG. 111. A voltage is applied in parallel to the position detecting elements via a resistor 7631. Differential detection signals E1 and E2 corresponding to the detected magnetic field of the field part 7510 (corresponding to the permanent magnet 7602 of FIG. 111) are output from output terminals of the position detecting element 7630A and then supplied to the bases of differential transistors 7651 and 7652 of the distributed signal producing circuit 7531. Differential detection signals F1 and F2 corresponding to the detected magnetic field of the field part 7510 are output from output terminals of the position detecting element 7630B and then supplied to the bases of differential transistors 7657 and 7658. Differential detection signals G1 and G2 corresponding to the detected magnetic field of the field part 7510 are output from output terminals of the position detecting element 7630C and then supplied to the bases of differential transistors 7663 and 7664. As the rotational movement of the field part 7510 proceeds, the detection signals E1, F1, and G1 and E2, F2, and G2 analoguely vary so as to function as three-phase signals which are electrically separated in phase from each other by 120 deg. The detection signals E1 and E2 vary in reversed phase relationships, F1 and F2 vary in reversed phase relationships, and G1 and G2 vary in reversed phase relationships.

Transistors 7640, 7641, 7642, 7643, 7644, 7645, 7646, 7647, 7648, and 7649 of the distributed signal producing circuit 7531 constitute a current mirror circuit into which a current of a value proportional to a feedback current signal Ib flows. In correspondence with the detection signals E1 and E2, the differential transistors 7651 and 7652 distribute the value of the current of the transistor 7642 to the collectors. The collector current of the transistor 7651 is amplified two times by a current mirror circuit consisting of transistors 7653 and 7654. A current flowing out from or into the junction of the transistors 7654 and 7641 is supplied to a resistor 7671. A distributed signal M1 is produced at the terminal of the resistor 7671. The collector current of the transistor 7652 is amplified two times by a current mirror circuit consisting of transistors 7655 and 7656. A current signal I1 flowing out from or into the junction of the transistors 7656 and 7643 is supplied to the distributing adjusting circuit 7532. Similarly, in correspondence with the detection signals F1 and F2, the differential transistors 7657 and 7658 distribute the value of the current of the transistor 7645 to the collectors. The collector current of the transistor 7657 is amplified two times by a current mirror circuit consisting of transistors 7659 and 7660. A current flowing out from or into the junction of the transistors 7660 and 7644 is supplied to a resistor 7672, so that a distributed signal M2 is produced at the terminal of the resistor 7672. The collector current of the transistor 7658 is amplified two times by a current mirror circuit consisting of transistors 7661 and 7662. A current signal I2 flowing out from or into the junction of the transistors 7662 and 7646 is supplied to the distributing adjusting circuit 7532. Furthermore, in correspondence with the detection signals G1 and G2, the differential transistors 7663 and 7664 distribute the value of the current of the transistor 7648 to the collectors. The collector current of the transistor 7663 is amplified two times by a current mirror circuit consisting of transistors 7665 and 7666. A current flowing out from or into the junction of the transistors 7666 and 7647 is supplied to a resistor 7673, so that a distributed signal M3 is produced at the terminal of the resistor 7673. The collector current of the transistor 7664 is amplified two times by a current mirror circuit consisting of transistors 7667 and 7668. A current signal I3 flowing out from or into the junction of the transistors 7668 and 7649 is supplied to the distributing adjusting circuit 7532.

The distributed signals M1, M2, and M3 are three-phase voltage signals which analoguely vary responding with the detection signals, and supplied to the driving block 7514. The current signals I1, I2, and I3 are three-phase current signals which analoguely vary responding with the detection signals, and supplied to the distributing adjusting circuit 7532 (in the embodiment, the distributed signals M1, M2, and M3, and the current signals I1, I2, and I3 change in reversed phase relationships, but alternatively the signals may change in phase).

The distributing adjusting circuit 7532 comprises: an adjusting signal producing circuit 7560 which produces an adjusting signal K1; a command side signal producing circuit 7570 which produces a command side signal K0 corresponding to the output current signal of the command block 7515; and an adjusting comparator 7580 which compares the adjusting signal K1 with the command side signal K0. The adjusting signal producing circuit 7560 comprises:

an amplitude current circuit 7561 which produces an amplitude current signal Jt varying in proportion to the amplitudes of the detection signals; and an adjusting signal output circuit 7562 which produces the adjusting signal K1 proportional to the amplitude current signal Jt. The amplitude current circuit 7561 comprises: current output circuits 7695, 7696, and 7697 to which the three-phase current signals I1, I2, and I3 are respectively input; and current composition diodes 7684, 7685, and 7686. The current output circuits 7695, 7696, and 7697 output current signals corresponding to the absolute values or the single polarity values of the current signals I1, I2, and I3, respectively. The current output circuits are configured in the same manner as those of FIG. 102, and hence their detailed description is omitted.

The output current signals of the current output circuits 7695, 7696, and 7697 of the amplitude current circuit 7561 are composed together via the diodes 7684, 7685, and 7686, thereby obtaining the amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. The adjusting signal output circuit 7562 supplies the amplitude current signal Jt to a resistor 7683, so that the adjusting signal K1 is produced at the terminal of the resistor 7683. Therefore, the adjusting signal K1 varies in proportion to the amplitudes of the detection signals.

The command side signal producing circuit 7570 supplies the output current signal D of the command block 7515 to a resistor 7675 via a current mirror circuit consisting of transistors 7676 and 7677, so that the command side signal K0 is produced at the terminal of the resistor 7675. In other words, the command side signal K0 is produced by converting the output current signal D of the command block 7515 into a voltage. Therefore, the command side signal K0 is proportional to the output current signal D and substantially corresponds to the output signal of the command block 7515.

In the adjusting comparator 7580, the adjusting signal K1 is compared with the command side signal K0 by a combination of transistors 7687, 7688, 7689, and 7690, and the differential current corresponding to the difference of the signals is input to a current amplifier 7691 which in turn outputs the feedback current signal Ib obtained by amplifying the input current. In other words, the adjusting comparator 7580 substantially compares the adjusting signal K1 with the output signal of the command block 7515, and outputs the feedback current signal Ib corresponding to a result of the comparison.

In this way, the adjusting signal K1 corresponding to the amplitudes of the three-phase current signals I1, I2, and I3 which are proportional to the detection signals E1, F1, and G1 is produced, and the feedback current signal Ib corresponding to a result of a comparison of the adjusting signal K1 with the command side signal K0 is produced. The output currents of the current mirror circuit consisting of the transistors 7640 to 7649 are varied in correspondence with the feedback current signal Ib, thereby varying the three-phase current signals I1, I2, and I3 and the three-phase distributed signals M1, M2, and M3. As a result, a feedback loop which adjusts the levels of the three-phase current signals and the adjusting signal in correspondence with a result of a comparison of the adjusting signal K1 with the command side signal K0 is configured. According to this configuration, irrespective of the amplitudes of the detection signals E1, F1, and G1 of the position detector 7521, the distributed signals M1, M2, and M3 have an amplitude of a predetermined value corresponding to the command side signal K0. A capacitor 7692 stabilizes the feedback loop.

The driving block 7514 of FIG. 110 comprises the first driving circuit 7541, the second driving circuit 7542, and the third driving circuit 7543, and supplies driving signals Va, Vb, Vc, which are obtained by amplifying the distributed signals M1, M2, and M3 of the distributed signal producing circuit 7531 of the distribution block 7513, to the three-phase coils 7511A, 7511B, and 7511C.

Figure 113:
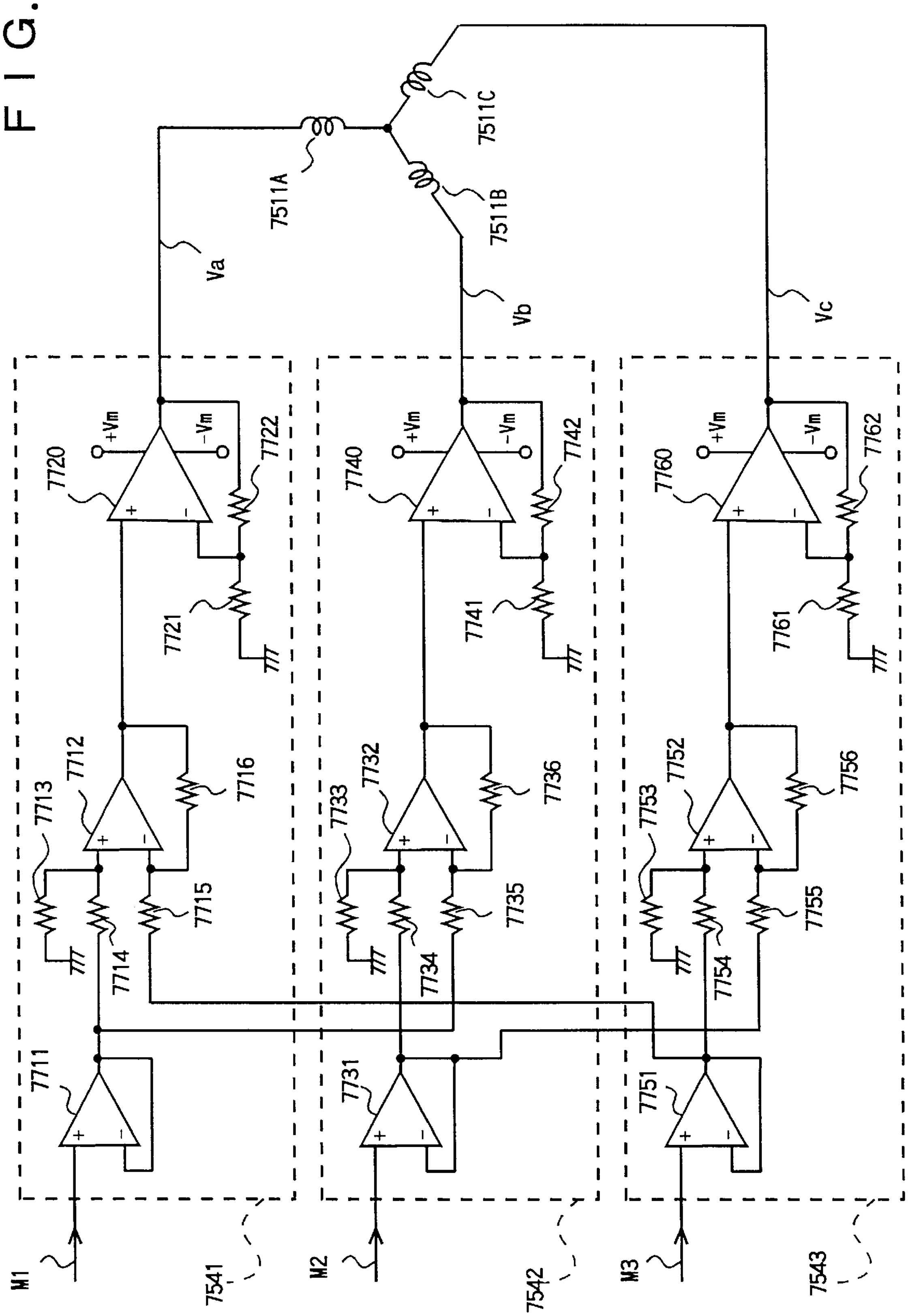
FIG. 113 is a circuit diagram showing a first driving circuit 7541, a second driving circuit 7542, and a third driving circuit 7543 of Embodiment 22.

FIG. 113 specifically shows the first driving circuit 7541, the second driving circuit 7542, and the third driving circuit 7543 of the driving block 7514. The distributed signal M1 is input to a buffer amplifier 7711 of the first driving circuit 7541, the distributed signal M2 is input to a buffer amplifier 7731 of the second driving circuit 7542, and the distributed signal M3 is input to a buffer amplifier 7751 of the third driving circuit 7543. An amplifier 7712 of the first driving circuit 7541, and resistors 7713, 7714, 7715, and 7716 cooperate so as to obtain the difference of the output signals of the buffer amplifiers 7711 and 7751, and produce the difference signal of the distributed signals M1 and M2. A combination of an amplifier 7720, and resistors 7721 and 7722 amplifies the power of the output signal of the amplifier 7712 so as to produce the driving signal Va, and supplies the driving signal Va to the power input terminal of the coil 7511A. Similarly, an amplifier 7732 of the second driving circuit 7542, and resistors 7733, 7734, 7735, and 7736 cooperate so as to obtain the difference of the output signals of the buffer amplifiers 7731 and 7711, and produce the difference signal of the distributed signals M2 and M1. A combination of an amplifier 7740, and resistors 7741 and 7742 amplifies the power of the output signal of the amplifier 7732 so as to produce the driving signal Vb, and supplies the driving signal Vb to the power input terminal of the coil 7511B. Furthermore, an amplifier 7752 of the third driving circuit 7543, and resistors 7753, 7754, 7755, and 7756 cooperate so as to obtain the difference of the output signals of the buffer amplifiers 7751 and 7731, and produce the difference signal of the distributed signals M3 and M2. A combination of an amplifier 7760, and resistors 7761 and 7762 amplifies the power of the output signal of the amplifier 7752 so as to produce the driving signal Vc, and supplies the driving signal Vc to the power input terminal of the coil 7511C. The amplifiers 7720, 7740, and 7760 are supplied with power source voltages +Vm and −Vm (+Vm=15 V, −Vm=−15 V).

As a result of the supply of the driving signals Va, Vb, and Vc, three-phase driving currents are supplied to the three-phase coils 7511A, 7511B, and 7511C, so that a driving force is generated in a predetermined direction by electromagnetic interaction between the currents of the coils and the magnetic fluxes of the field part 7510.

Figure 117:
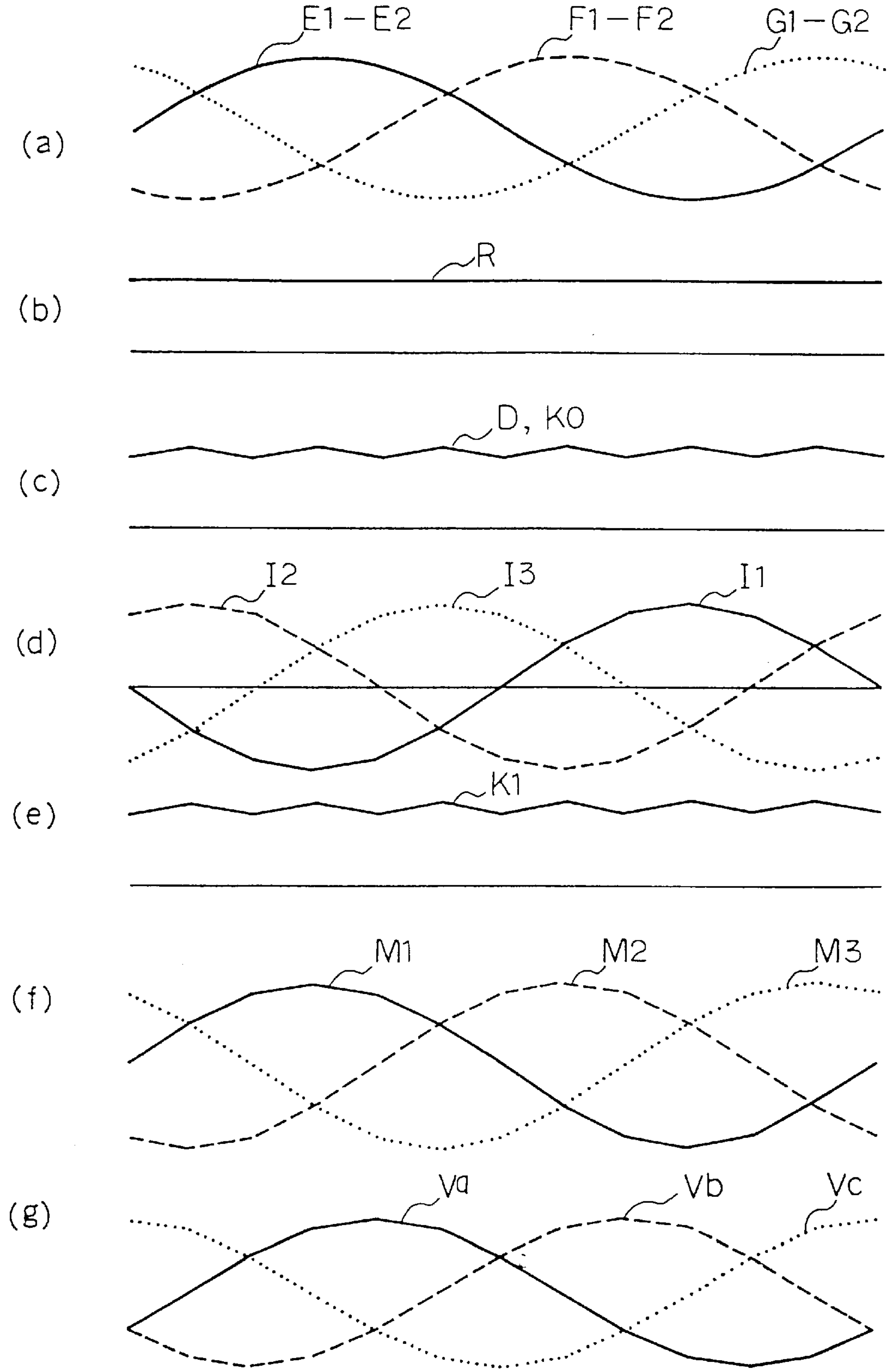
FIG. 117 is a waveform chart of signals of Embodiment 22.

FIG. 117 is a waveform chart illustrating the operation of the embodiment. As the rotational movement (or a relative movement with respect to the three-phase coils) of the field part 7510 proceeds, the position detecting elements 7630A, 7630B, and 7630C which detect the magnetic field of the field part 7510 produce sinusoidal detection signals E1–E2, F1–F2, and G1–G2 [see (a) of FIG. 117 wherein the horizontal axis indicates the rotational position]. In response to the command signal R of a predetermined value [(b) of FIG. 117 wherein the upper portion of the vertical axis corresponds to the negative side], the command current circuit 7551, the multiplied command current circuit 7552, and the command output circuit 7553 of the command block 7515 operate so as to cause the output current signal D of the command block 7515 to contain higher harmonic signal components corresponding to the detection signals at a predetermined percentage [(c) of FIG. 117]. Since the command side signal K0 is proportional to the output current signal D, also the command side signal K0 contains higher harmonic signal components corresponding to the detection signals. The distributed signal producing circuit 7531 and the distributing adjusting circuit 7532 produce three-phase current signals I1, I2, and I3 [(d) of FIG. 117] which analoguely vary responding with the detection signals of the position detector 7521, and the three-phase distributed signals M1, M2, and M3, and obtains the adjusting signal K1 corresponding to a sum of the absolute values or a sum of the single polarity values of the three-phase current signals I1, I2, and I3 [(e) of FIG. 117 wherein the upper portion of the vertical axis corresponds to the negative side], thereby operating the feedback loop, so that the adjusting signal K1 coincides with the command side signal K0. As a result, in correspondence with a result of a comparison of the adjusting signal K1 with the command side signal K0, also the amplitudes of the distributed signals M1, M2, and M3 are adjusted [(f) of FIG. 117], resulting in that the amplitudes of the distributed signals M1, M2, and M3 have a level corresponding to the command side signal K0 and hence are not affected by the amplitudes of detection signals. The first driving circuit 7541, the second driving circuit 7542, and the third driving circuit 7543 of the driving block 7514 produce the driving signals Va, Vb, and Vc by composing distributed signals for at least two phases together, whereby the driving signals Va, Vb, and Vc are shifted in phase by about 30 deg. from the distributed signals M1, M2, and M3, and the detection signals E1–E2, F1–F2, and G1–G2 [(g) of FIG. 117]. The first driving circuit 7541, the second driving circuit 7542, and the third driving circuit 7543 supply the driving signals Va, Vb, and Vc, which vary responding with the distributed signals M1, M2, and M3 to the three-phase coils 7511A, 7511B, and 7511C.

In the embodiment, the adjusting signal varying in proportion to the amplitude of a detection signal is produced, and the amplitudes of the distributed signals can be easily adjusted in correspondence with a result of a comparison of the adjusting signal with the command side signal. As a result, the distributed signals M1, M2, and M3, and the driving signals Va, Vb, and Vc are not affected by variations in the sensitivities of the position detecting elements 7630A, 7630B, and 7630C of the position detector 7521, variations in the magnetic field of the field part 7510, and variations in the gain of the distributed signal producing circuit 7531 (influences are very small).

In the distributed signal producing circuit 7531 and the distributing adjusting circuit 7532, the adjusting signal corresponding to a sum of the absolute values or a sum of the single polarity values of three-phase current signals is produced, and the amplitudes of the distributed signals are adjusted in correspondence with the adjusting signal. Therefore, the adjusting signal which varies in proportion to the amplitudes of the detection signals can be always obtained by a simple circuit configuration, thereby correct adjustment is enabled.

When the command block may be configured in the same manner as the embodiment as required, an output signal may be produced which is proportional to the command signal and which contains higher harmonic signal components corresponding to a higher harmonic signal of the detection signals at a predetermined percentage. When distributed signals which vary responding with a result of a comparison of the command side signal K0 with the adjusting signal K1 proportional to the output signal is produced, the distributed signals M1, M2, and M3, and the driving signals Va, Vb, and Vc can be formed as three-phase sinusoidal signals which analoguely vary responding with the detection signals. Therefore, distortions of the distributed signals and the driving signals are reduced to a very low level, and a uniform torque is generated, so that the motor is smoothly driven.

In the command block, furthermore, the command current circuit produces the two command current signals corresponding to the command signal, the multiplied command current circuit produces the multiplied command current signal which is obtained by multiplying one of the command current signals with a higher harmonic signal of the detection signals, and the command output circuit produces the output current signal which is obtained by composing the other command current signal and the multiplied command current signal together. Even when the detection signals vary in amplitude, variations in amplitude of the multiplied command current signal can be made small and variations in the percentages of higher harmonic signal components contained in the output current signal D and the command side signal K0 of the command block can be reduced. This is because, in the multiplied command current circuit, the transistors 7914, 7915, and 7916 can be operated nonlinearly. In other words, the motor is very resistant to variations in the sensitivities of the position detecting elements and variations in the magnetic field of the field part.

In the thus configured embodiment, furthermore, the position detecting elements can be disposed between the salient poles of the armature core, and the motor structure can be miniaturized.

Embodiment 23

Figure 118:
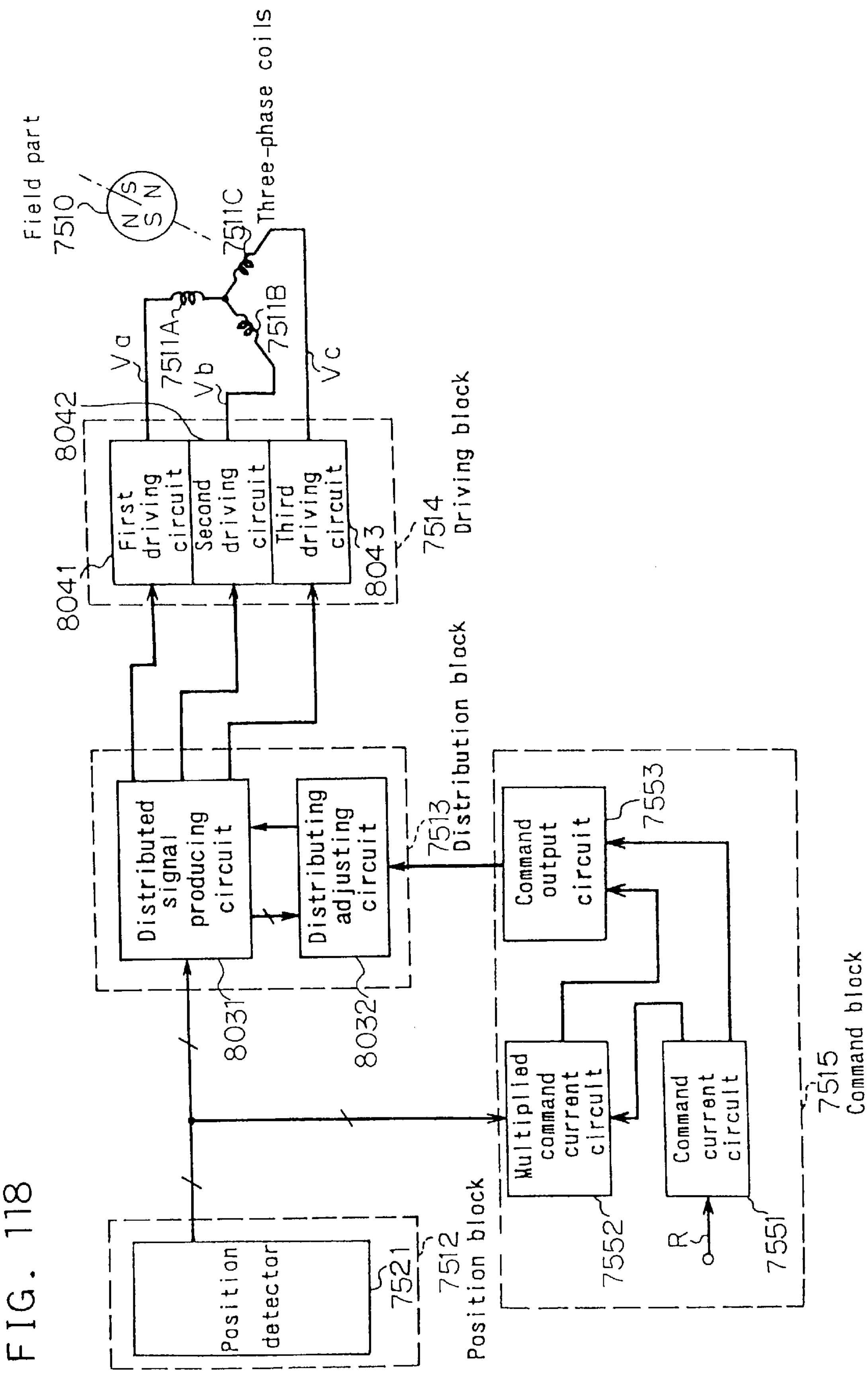
FIG. 118 is a block diagram of Embodiment 23 of the invention.
Figure 119:
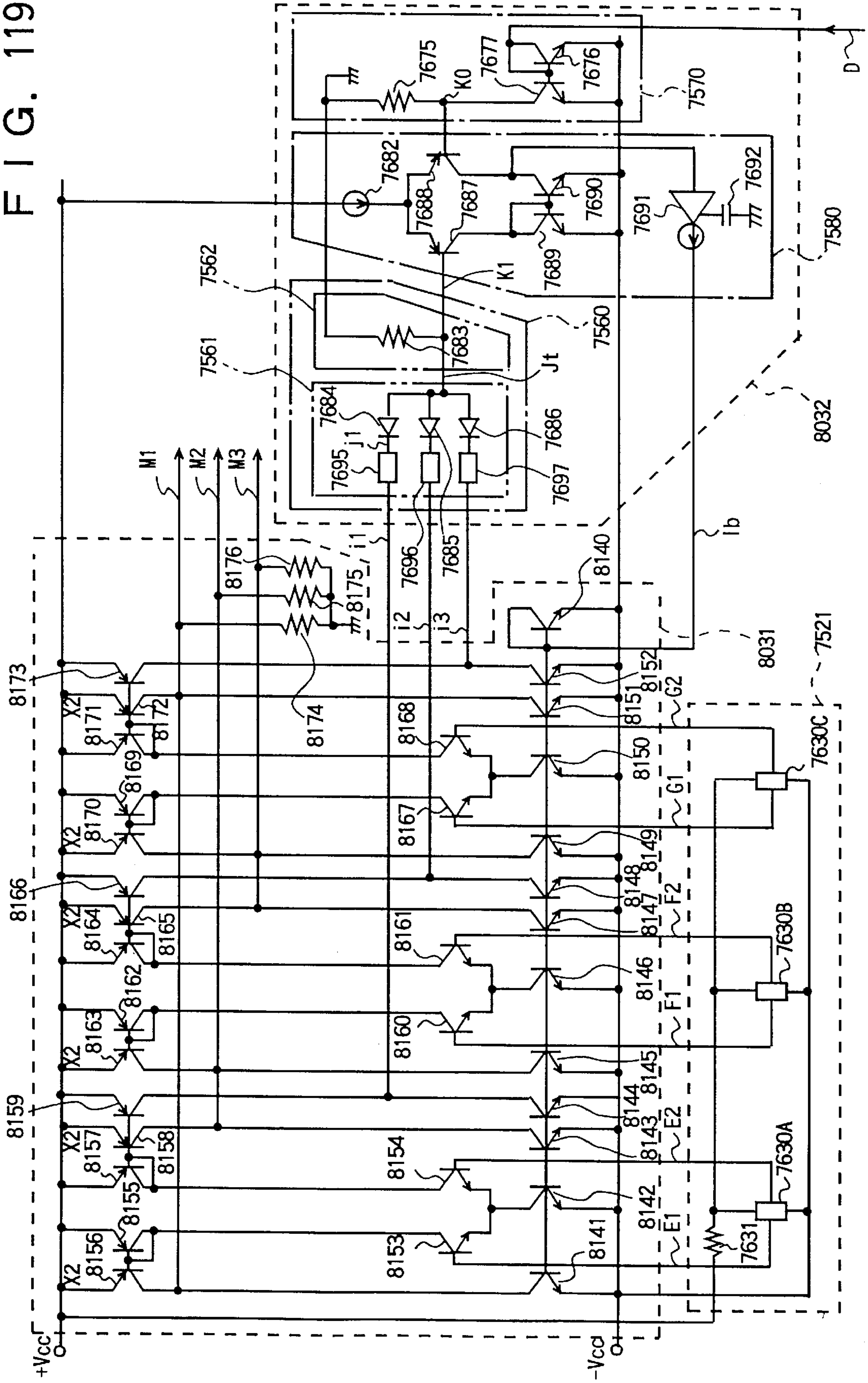
FIG. 119 is a circuit diagram showing a position detector 7521, a distributed signal producing circuit 8031, and a distributing adjusting circuit 8032 of Embodiment 23.
Figure 120:
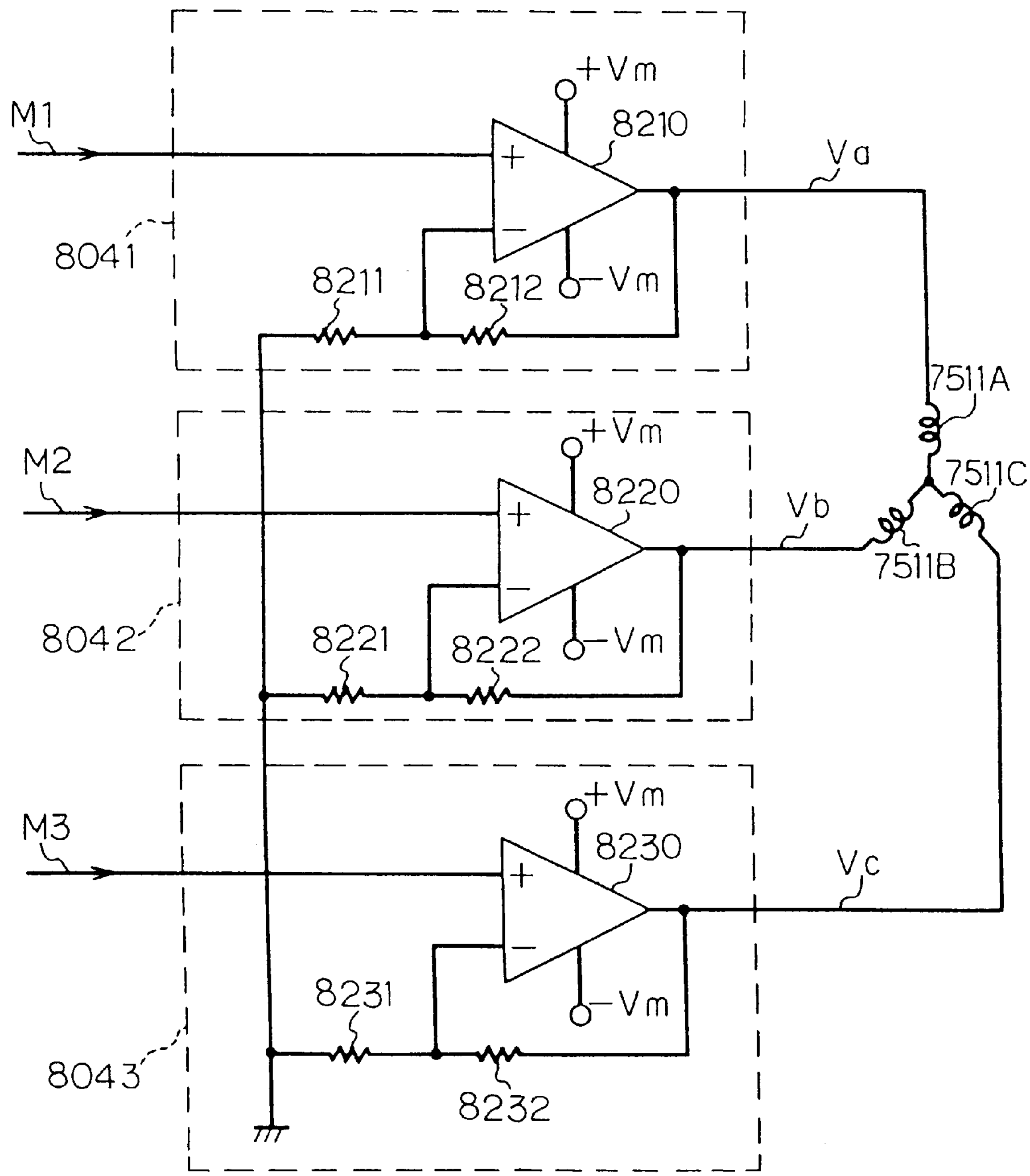

FIGS. 118 to 120 show a brushless motor of Embodiment 23 of the invention. Also in the embodiment, the positional relationships between coils and position detecting elements are shifted from each other by an electric angle of about 30 deg. additionally, and the detecting elements are positioned between the coils, thereby facilitating the production of a small motor.

FIG. 118 shows the whole configuration of the motor. In the embodiment, altering signals which are shifted in phase by an electric angle of about 30 deg. from the detection signals of the position detecting elements are produced by a distributed signal producing circuit 8031, and a first driving circuit 8041, a second driving circuit 8042, and a third driving circuit 8043 of a driving block 7514 do not shift the phases of the signals. The components which are identical with those of the Embodiment 22 described above are designated by the same reference numerals.

FIG. 119 specifically shows the configuration of the position detector 7521 of the position block 7512, and a distributed signal producing circuit 8031 and a distributing adjusting circuit 8032 of the distribution block 7513. The position detecting elements 7630A, 7630B, and 7630C of the position detector 7521 correspond to the position detecting elements 7607*a*, 7607*b*, and 7607*c* of FIG. 111. A voltage is applied in parallel to the position detecting elements via a resistor 7631. Differential detection signals E1 and E2 corresponding to the detected magnetic field of the field part 7510 (corresponding to the permanent magnet 7602 of FIG. 111) are output from output terminals of the position detecting element 7630A and then supplied to the bases of differential transistors 8153 and 8154 of the distributed signal producing circuit 8031. Differential detection signals F1 and F2 corresponding to the detected magnetic field are output from output terminals of the position detecting element 7630B and then supplied to the bases of differential transistors 8160 and 8161. Differential detection signals G1 and G2 corresponding to the detected magnetic field are output from output terminals of the position detecting element 7630C and then supplied to the bases of differential transistors 8167 and 8168. As the rotational movement of the field part 7510 proceeds, the detection signals E1, F1, and G1 analoguely vary so as to function as three-phase signals which are electrically separated in phase from each other by 120 deg.

Transistors 8140, 8141, 8142, 8143, 8144, 8145, 8146, 8147, 8148, 8149, 8150, 8151, and 8152 of the distributed signal producing circuit 8031 constitute a current mirror circuit into which a current of a value proportional to a feedback current signal Ib flows. In correspondence with the detection signals E1 and E2, the differential transistors 8153 and 8154 distribute the value of the current of the transistor 8142 to the collectors. The collector current of the transistor 8153 is amplified two times by a current mirror circuit consisting of transistors 8155 and 8156. A current flowing out from or into the junction of the transistors 8156 and 8141 is supplied to a resistor 8174. The collector current of the transistor 8154 is amplified two times by a current mirror circuit consisting of transistors 8157, 8158, and 8159. A current flowing out from or into the junction of the transistors 8158 and 8143 is supplied to a resistor 8175, and a current signal I1 flowing out from or into the junction of the transistors 8159 and 8144 is supplied to the distributing adjusting circuit 8032. Similarly, in correspondence with the detection signals F1 and F2, the differential transistors 8160 and 8161 distribute the value of the current of the transistor 8146 to the collectors. The collector current of the transistor 8160 is amplified two times by a current mirror circuit consisting of transistors 8162 and 8163. A current flowing out from or into the junction of the transistors 8163 and 8145 is supplied to a resistor 8175. The collector current of the transistor 8161 is amplified two times by a current mirror circuit consisting of transistors 8164, 8165, and 8166. A current flowing out from or into the junction of the transistors 8165 and 8147 is supplied to a resistor 8176, and a current signal I2 flowing out from or into the junction of the transistors 8166 and 8148 is supplied to the distributing adjusting circuit 8032. Furthermore, in correspondence with the detection signals G1 and G2, the differential transistors 8167 and 8168 distribute the value of the current of the transistor 8150 to the collectors. The collector current of the transistor 8167 is amplified two times by a current mirror circuit consisting of transistors 8169 and 8170. A current flowing out from or into the junction of the transistors 8170 and 8149 is supplied to a resistor 8176. The collector current of the transistor 8168 is amplified two times by a current mirror circuit consisting of transistors 8171, 8172, and 8173. A current flowing out from or into the junction of the transistors 8172 and 8151 is supplied to the resistor 8174, and a current signal I3 flowing out from or into the junction of the transistors 8173 and 8152 is supplied to the distributing adjusting circuit 8032.

The distributed signals M1, M2, and M3 are three-phase voltage signals which analoguely vary responding with the detection signals, and supplied to the driving block-7514. The distributed signals are signals in which at least two phases of the detection signals are composed together, and are shifted in phase by about 30 deg. from the detection signals. The current signals I1, I2, and I3 are three-phase current signals which analoguely vary responding with the detection signals, and supplied to the distributing adjusting circuit 8032.

The distributing adjusting circuit 8032 comprises: an adjusting signal producing circuit 7560 which produces an adjusting signal K1; a command side signal producing circuit 7570 which produces a command side signal K0; and an adjusting comparator 7580 which compares the adjusting signal K1 with the command side signal K0. The adjusting signal producing circuit 7560 comprises: an amplitude current circuit 7561 which produces an amplitude current signal Jt varying in proportion to the amplitudes of the detection signals; and an adjusting signal output circuit 7562 which produces the adjusting signal K1 proportional to the amplitude current signal Jt. The amplitude current circuit 7561 comprises current output circuits 7695, 7696, and 7697 to which the three-phase current signals I1, I2, and I3 are respectively input. The current output circuits 7695, 7696, and 7697 output current signals corresponding to the absolute values or the single polarity values of the current signals I1, I2, and I3, respectively. The current output circuits are configured in the same manner as those of FIG. 102, and hence their detailed description is omitted.

The output current signals of the current output circuits 7695, 7696, and 7697 of the amplitude current circuit 7561 are composed together so as to obtain the amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. The adjusting signal output circuit 7562 supplies the amplitude current signal Jt to a resistor 7683 so that the adjusting signal K1 is produced at the terminal of the resistor 7683. Therefore, the adjusting signal K1 varies in proportion to the amplitudes of the detection signals.

The command side signal producing circuit 7570 supplies the output current signal D of the command block 7515 to a resistor 7675 via a current mirror circuit consisting of transistors 7676 and 7677, so that the command side signal K0 is produced at the terminal of the resistor 7675. In other words, the command side signal K0 is produced by converting the output current signal D of the command block 7515 into a voltage. Therefore, the command side signal K0 is proportional to the output current signal D and substantially corresponds to the output signal of the command block 7515.

In the adjusting comparator 7580, the adjusting signal K1 is compared with the command side signal K0 by a combination of transistors 7687, 7688, 7689, and 7690, and the differential current corresponding to the difference of the signals is input to a current amplifier 7691 which in turn outputs the feedback current signal Ib obtained by amplifying the input current. In other words, the adjusting comparator 7580 substantially compares the adjusting signal with the output signal of the command block, and outputs the feedback current signal Ib corresponding to a result of the comparison.

In this way, the adjusting signal K1 corresponding to the amplitudes of the three-phase current signals I1, I2, and I3 which are proportional to the detection signals E1, F1, and G1 is produced, and the feedback current signal Ib corresponding to a result of a comparison of the adjusting signal K1 with the command side signal K0 is produced. The output currents of the current mirror circuit consisting of the transistors 8140 to 8152 are varied in correspondence with the feedback current signal Ib, thereby varying the amplitudes of the three-phase current signals I1, I2, and I3 and the three-phase distributed signals M1, M2, and M3. As a result, a feedback loop which adjusts the amplitudes of the three-phase distributed signals and the level of the adjusting signal in correspondence with a result of a comparison of the adjusting signal K1 with the command side signal K0 is configured. According to this configuration, irrespective of the amplitudes of the detection signals E1, F1, and G1 of the position detector 7521, the distributed signals M1, M2, and M3 have an amplitude of a predetermined value corresponding to the command side signal K0. A capacitor 7692 stabilizes the feedback loop.

The driving block 7514 of FIG. 118 comprises the first driving circuit 8041, the second driving circuit 8042, and the third driving circuit 8043, and supplies driving signals Va, Vb, Vc which are obtained by amplifying the distributed signals M1, M2, and M3 of the distributed signal producing circuit 8031 of the distribution block 7513, to the three-phase coils 7511A, 7511B, and 7511C.

FIG. 120 specifically shows the first driving circuit 8041, the second driving circuit 8042, and the third driving circuit 8043 of the driving block 7514. The voltage of the distributed signal M1 is amplified by a required amplification factor by a combination of an amplifier 8210 of the first driving circuit 8041, and resistors 8211 and 8212, thereby producing the driving signal Va. The driving signal Va is supplied to the power input terminal of the coil 7511A. Similarly, the voltage of the distributed signal M2 is amplified by a required amplification factor by a combination of an amplifier 8220 of the second driving circuit 8042, and resistors 8221 and 8222, thereby producing the driving signal Vb. The driving signal Vb is supplied to the power input terminal of the coil 7511B. Furthermore, the voltage of the distributed signal M3 is amplified by a required amplification factor by a combination of an amplifier 8230 of the third driving circuit 8043, and resistors 8231 and 8232, thereby producing the driving signal Vc. The driving signal Vc is supplied to the power input terminal of the coil 7511C. The amplifiers 8210, 8220, and 8230 are supplied with power source voltages +Vm and −Vm (+Vm=15 V, −Vm=−15 V).

The command block 7515 of FIG. 118 comprises the command current circuit 7551, the multiplied command current circuit 7552, and the command output circuit 7553. The configuration and operation of these circuits are the same as those shown in FIGS. 114, 115, and 116. Therefore, their detailed description is omitted.

Also in the thus configured embodiment, the distributed signals M1, M2, and M3, and the driving signals Va, Vb, and Vc are not affected by the amplitudes of the detection signals. Furthermore, the distributed signals M1, M2, and M3, and the driving signals Va, Vb, and Vc sinusoidally analoguely vary responding with the detection signals. Therefore, it is possible to obtain the distributed signals and the driving signals of a reduced distortion level, and a uniform torque is generated, so that the motor is smoothly driven. Moreover, the position detecting elements can be disposed between the salient poles of the armature core, and the motor structure can be miniaturized.

Embodiment 24

Figure 121:
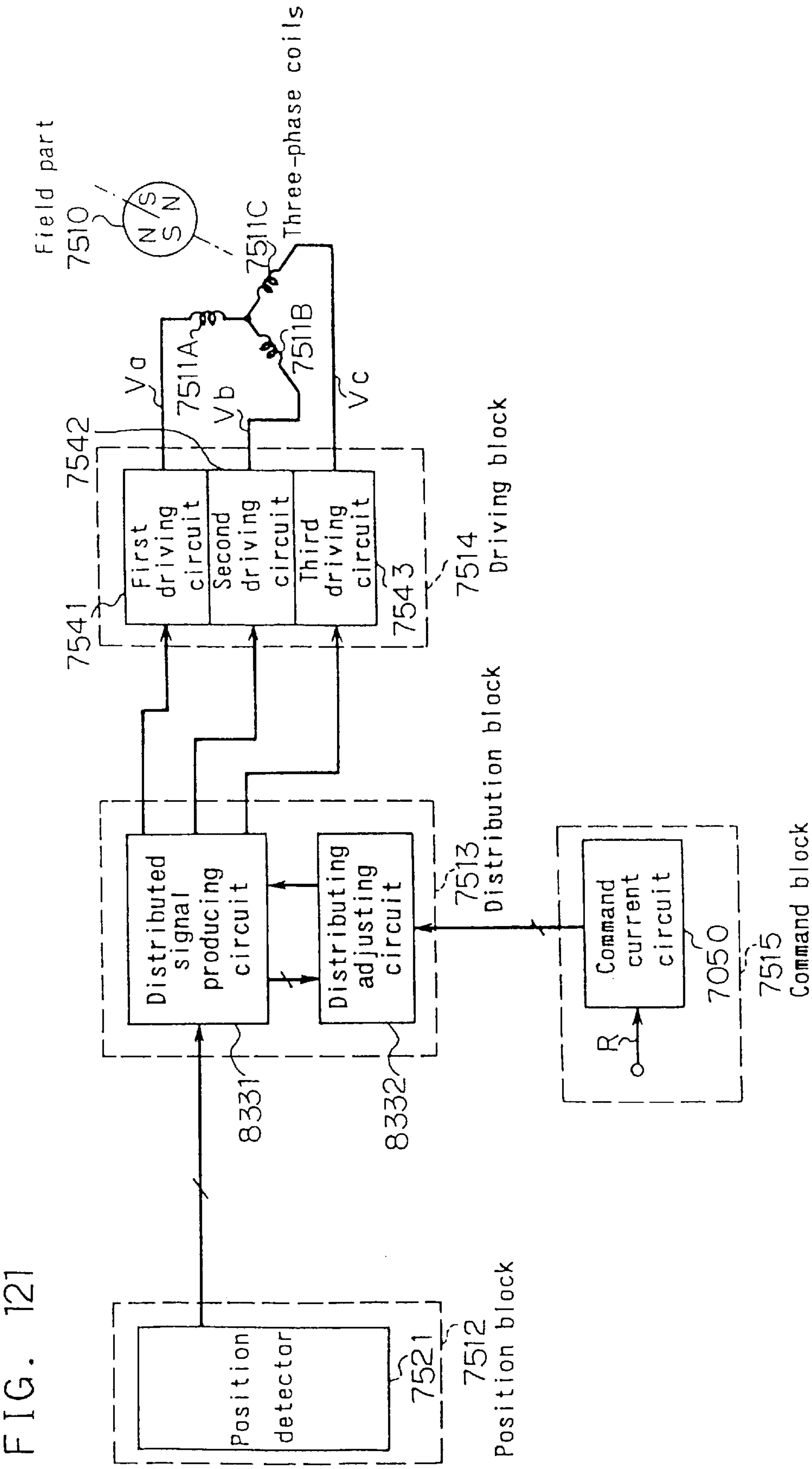
Figure 122:
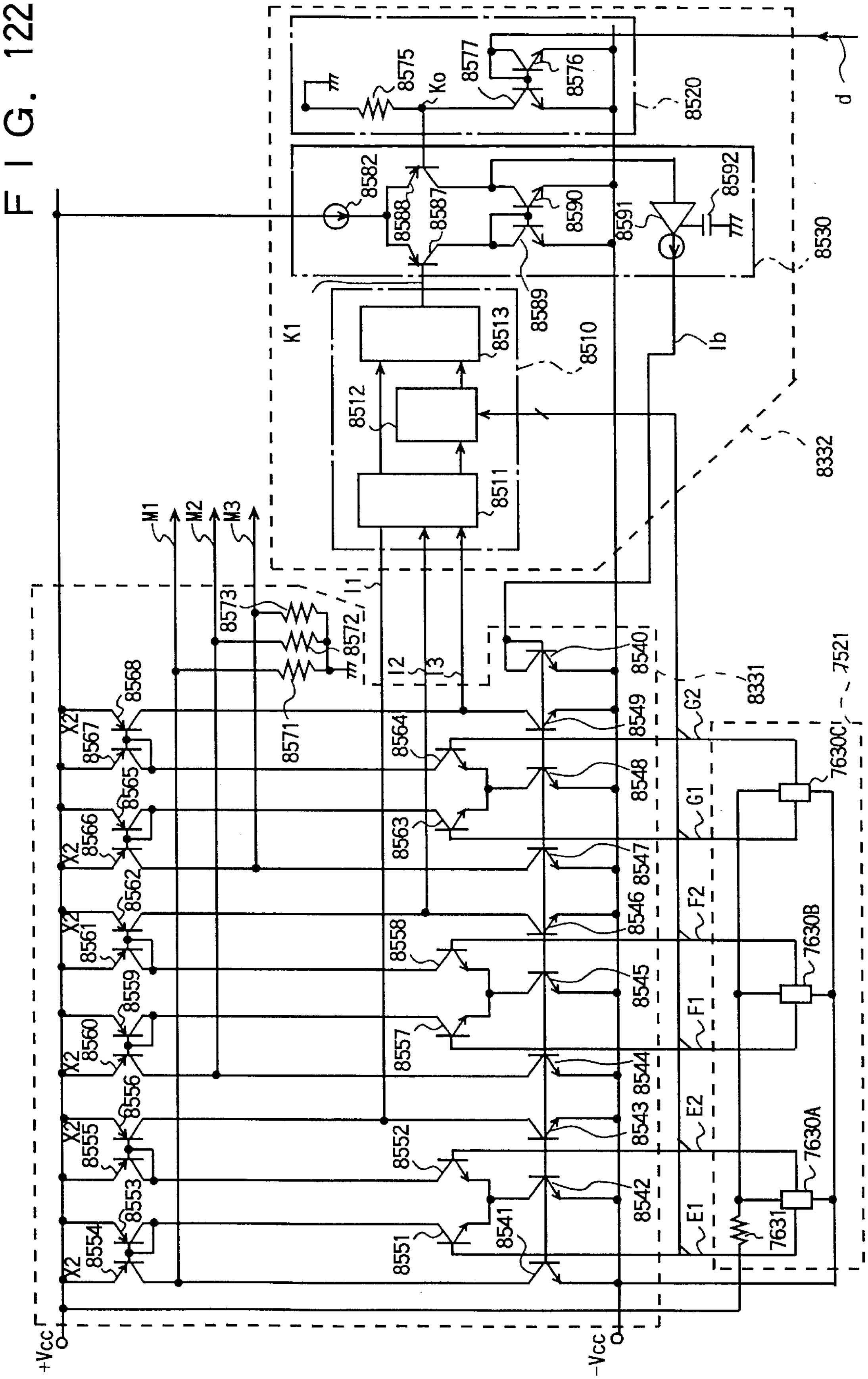
Figure 123:
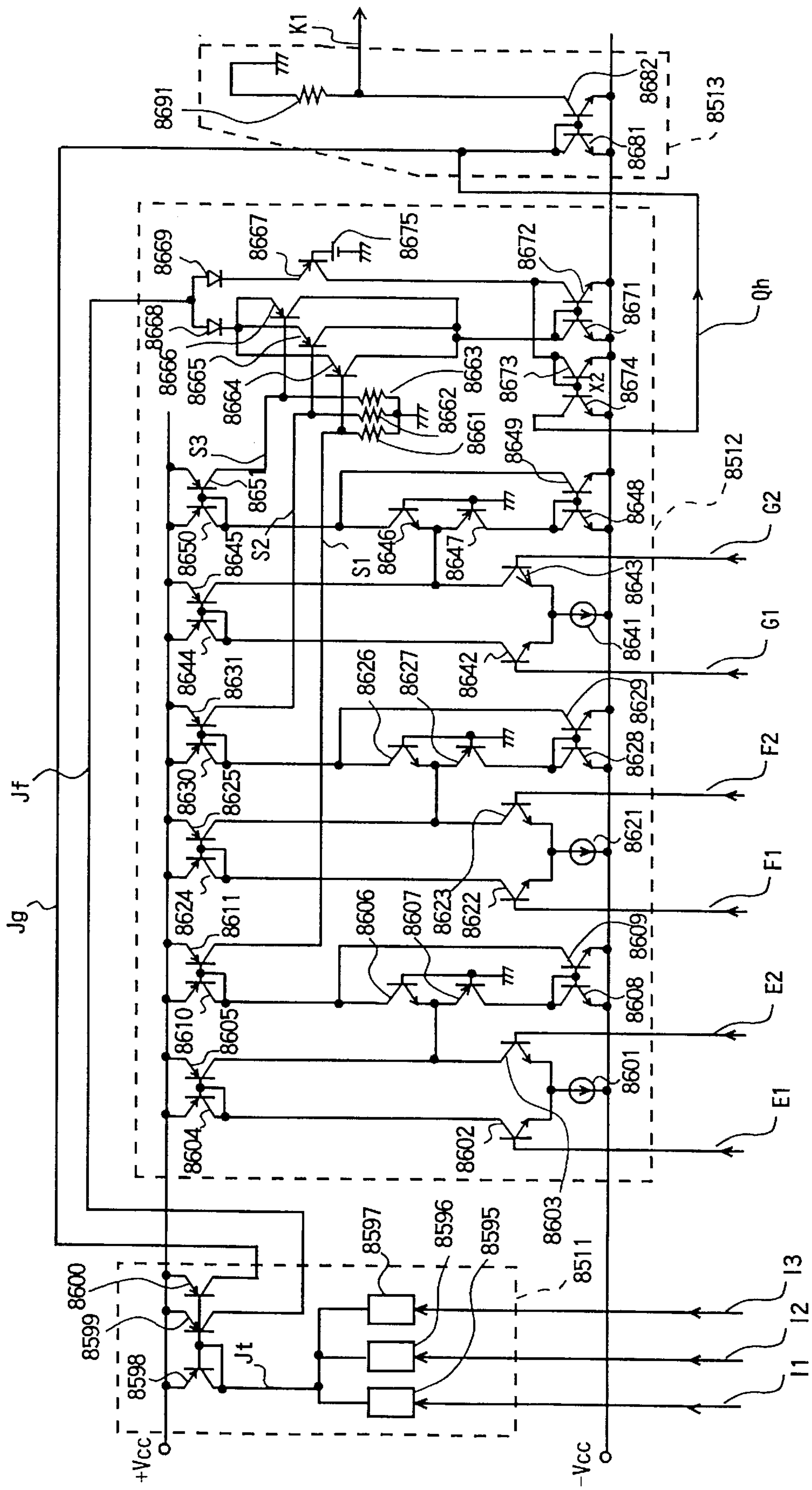

FIGS. 121 to 123 show a brushless motor of Embodiment 24 of the invention. FIG. 121 shows the whole configuration of Embodiment 24. According to the embodiment, in the distributed signal producing circuit 8331 and the distributing adjusting circuit 8332, an adjusting signal which varies in proportion to the amplitudes of the detection signals of the position detector 7521 and which contains higher harmonic signal components of the detection signals is produced, and the amplitudes of the distributed signals of the distributed signal producing circuit 8331 are adjusted in correspondence with a result of a comparison of the adjusting signal with the command side signal. The positional relationships between coils and attached positions of position detecting elements are shifted from each other by an electric angle of about 30 deg. additionally, and the detecting elements are positioned between the coils, thereby facilitating the production of a small motor. The components which are identical with those of the embodiments described above are designated by the same reference numerals.

FIG. 122 specifically shows the configuration of the position detector 7521 of the position block 7512, and a distributed signal producing circuit 8331 and a distributing adjusting circuit 8332 of the distribution block 7513. The position detecting elements 7630A, 7630B, and 7630C of the position detector 7521 correspond to the position detecting elements 7607*a*, 7607*b*, and 7607*c* of FIG. 111. A voltage is applied in parallel to the position detecting elements via a resistor 7631. Differential detection signals E1 and E2 corresponding to the detected magnetic field of the field part 7510 (corresponding to the permanent magnet 7602 of FIG. 111) are output from output terminals of the position detecting element 7630A and then supplied to the bases of differential transistors 8551 and 8452 of the distributed signal producing circuit 8331. Differential detection signals F1 and F2 corresponding to the detected magnetic field are output from output terminals of the position detecting element 7630B and then supplied to the bases of differential transistors 8557 and 8558. Differential detection signals G1 and G2 corresponding to the detected magnetic field are output from output terminals of the position detecting element 7630C and then supplied to the bases of differential transistors 8563 and 8564. As the rotational movement of the field part 7510 proceeds, the detection signals E1, F1, and G1 analoguely vary so as to function as three-phase signals which are electrically separated in phase from each other by 120 deg.

Transistors 8540, 8541, 8542, 8543, 8544, 8545, 8546, 8547, 8548, and 8549 of the distributed signal producing circuit 8331 constitute a current mirror circuit into which a current of a value proportional to a feedback current signal Ib flows. In correspondence with the detection signals E1 and E2, the differential transistors 8551 and 8552 distribute the value of the current of the transistor 8542 to the collectors. The collector current of the transistor 8551 is amplified two times by a current mirror circuit consisting of transistors 8553 and 8554. A current flowing out from or into the junction of the transistors 8554 and 8541 is supplied to a resistor 8571. A distributed signal M1 is produced at the terminal of the resistor 8571. The collector current of the transistor 8552 is amplified two times by a current mirror circuit consisting of transistors 8555 and 8556. A current signal I1 flowing out from or into the junction of the transistors 8556 and 8543 is supplied to the distributing adjusting circuit 8332. Similarly, in correspondence with the detection signals F1 and F2, the differential transistors 8557 and 8558 distribute the value of the current of the transistor 8545 to the collectors. The collector current of the transistor 8557 is amplified two times by a current mirror circuit consisting of transistors 8559 and 8560. A current flowing out from or into the junction of the transistors 8560 and 8544 is supplied to a resistor 8572, so that a distributed signal M2 is produced at the terminal of the resistor 8572. The collector current of the transistor 8558 is amplified two times by a current mirror circuit consisting of transistors 8561 and 8562. A current signal I2 flowing out from or into the junction of the transistors 8562 and 8546 is supplied to the distributing adjusting circuit 8332. Furthermore, in correspondence with the detection signals G1 and G2, the differential transistors 8563 and 8564 distribute the value of the current of the transistor 8548 to the collectors. The collector current of the transistor 8563 is amplified two times by a current mirror circuit consisting of transistors 8565 and 8566. A current flowing out from or into the junction of the transistors 8566 and 8547 is supplied to a resistor 8573, so that a distributed signal M3 is produced at the terminal of the resistor 8573. The collector current of the transistor 8564 is amplified two times by a current mirror circuit consisting of transistors 8567 and 8568. A current signal I3 flowing out from or into the junction of the transistors 8568 and 8549 is supplied to the distributing adjusting circuit 8332.

The distributed signals M1, M2, and M3 are three-phase voltage signals which analoguely vary responding with the detection signals, and supplied to the driving block 7514. The current signals I1, I2, and I3 are three-phase current signals which analoguely vary responding with the detection signals, and supplied to the distributing adjusting circuit 8332.

The distributing adjusting circuit 8332 comprises: an adjusting signal producing circuit 8510 which produces an adjusting signal K1; a command side signal producing circuit 8520 which produces a command side signal K0; and an adjusting comparator 8530 which compares the adjusting signal K1 with the command side signal K0. The adjusting signal producing circuit 8510 comprises: an amplitude current circuit 8511 which produces two amplitude current signals varying in proportion to the amplitudes of the detection signals; a multiplying adjusting circuit 8512 which produces a higher harmonic signal synchronized with the detection signals and which produces a multiplied adjusting current signal obtained by multiplying the higher harmonic signal by one of the amplitude current signals; and an adjusting signal output circuit 8513 which produces the adjusting signal K1 proportional to a composed adjusting current signal obtained by composing the other amplitude current signal and the multiplied adjusting current signal together.

FIG. 123 specifically shows the configuration of the adjusting signal producing circuit 8510. Current output circuits 8595, 8596, and 8597 of the amplitude current circuit 8511 output current signals which correspond to the absolute values or the single polarity values of the current signals I1, I2, and I3, respectively. The current output circuits are configured in the same manner as those shown in FIG. 102, and hence their detailed description is omitted.

The output current signals of the current output circuits 8595, 8596, and 8597 of the amplitude current circuit 8511 are composed together so as to produce an amplitude current signal Jt. The amplitude current signal Jt is a current signal of a sum of the absolute values or the single polarity values of the three-phase current signals I1, I2, and I3, and hence vary in proportion to the amplitudes of the detection signals E1, F1, and G1. A current mirror circuit consisting of transistors 8598, 8599, and 8600 outputs two amplitude current signals Jf and Jg proportional to the amplitude current signal Jt.

In correspondence with the detection signals E1 and E2 of the position detecting elements, transistors 8602 and 8603 of the multiplying adjusting circuit 8512 distribute the value of the current of a constant current source 8601 to the collectors. The difference current is obtained by a current mirror circuit consisting of transistors 8604 and 8605, and a voltage signal S1 corresponding to the absolute value of the difference current is obtained by a combination of transistors 8606, 8607, 8608, 8609, 8610, and 8611, and a resistor 8661. Namely, the voltage signal S1 corresponding to the absolute value of the detection signal E1–E2 is produced. Similarly, a voltage signal S2 corresponding to the absolute value of the detection signal F1–F2 is produced at the terminal of a resistor 8662, and a voltage signal S3 corresponding to the absolute value of the detection signal G1–G2 is produced at the terminal of a resistor 8663. Transistors 8664, 8665, 8666, and 8667, and diodes 8668 and 8669 compare the voltage signals S1, S2, and S3 with a predetermined voltage value (including 0 V) of a constant voltage source 8675. In correspondence with the difference voltages, the amplitude current signal Jf is distributed to the collectors of the transistors. The collector currents of the transistors 8664, 8665, and 8666 are composed together into a composed current. A current mirror circuit consisting of transistors 8671 and 8672 compares the composed current with the collector current of the transistor 8667, and the difference current is input to a current mirror circuit consisting of transistors 8673 and 8674 and reduced in current value to approximately one half. The resulting current is output as a multiplied adjusting current signal Qh (inflow current).

The adjusting signal output circuit 8513 produces a composed adjusting current signal in which the multiplied adjusting current signal Qh of the multiplying adjusting circuit 8512 and the other amplitude current signal Jg of the amplitude current circuit 8511 are composed together. The current signal is supplied to a resistor 8691 via a current mirror circuit consisting of transistors 8681 and 8682. The adjusting signal K1 is output from the terminal of the resistor 8691.

The multiplied adjusting current signal Qh of the multiplying adjusting circuit 8512 varies responding with results of multiplications of the voltage signals S1, S2, and S3 corresponding to the detection signals by the amplitude current signal Jf of the amplitude current circuit 8511. Because of the configuration of the transistors 8664, 8665, 8666, and 8667, the multiplied adjusting current signal Qh varies responding with a result of a multiplication of the minimum value of the voltage signals S1, S2, and S3 by the amplitude current signal Jf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied adjusting current signal Qh is a higher harmonic signal which has an amplitude proportional to the amplitude current signal Jf and which varies 6 times every one period of the detection signals. The adjusting signal K1 of the adjusting signal output circuit 8513 is proportional to the composed adjusting current signal of the multiplied adjusting current signal Qh and the amplitude current signal Jg, and hence contains higher harmonic signal components corresponding to the detection signals, at a predetermined percentage.

The command side signal producing circuit 8520 of FIG. 122 supplies the output current signal d of a command current circuit 7050 of the command block 7515 to a resistor 8575 via a current mirror circuit consisting of transistors 8576 and 8577, so that the command side signal K0 is produced at the terminal of the resistor 8575. In other words, the command side signal K0 is produced by converting the output current signal d of the command current circuit 7050 of the command block 7515 into a voltage. Therefore, the command side signal K0 is proportional to the output current signal d and substantially corresponds to the output signal of the command block 7515. The configuration and operation of the command current circuit 7050 of the command block 7515 of FIG. 121 are the same as those shown in FIG. 100. Therefore, their detailed description is omitted.

In the adjusting comparator 8530, the adjusting signal K1 is compared with the command side signal K0, and the differential current corresponding to the difference of the signals is input to a current amplifier 8591 which in turn outputs the feedback current signal Ib obtained by amplifying the input current. In other words, the adjusting comparator 8530 substantially compares the adjusting signal K1 with the output signal of the command block 7515, and outputs the feedback current signal Ib corresponding to a result of the comparison.

Thereby, the adjusting signal K1 varying in correspondence with the amplitudes of the detection signals E1, F1, and G1 is produced from the three-phase current signals I1, I2, and I3, and the feedback current signal Ib corresponding to a result of a comparison of the adjusting signal K1 with the command side signal K0 is produced. The output currents of the current mirror circuit consisting of the transistors 8540 to 8549 are varied in correspondence with the feedback current signal Ib, thereby varying the amplitudes of the three-phase current signals I1, I2, and I3 and the three-phase distributed signals M1, M2, and M3. As a result, a feedback loop which adjusts the amplitudes of the three-phase distributed signals and the level of the adjusting signal in correspondence with a result of a comparison of the adjusting signal with the command side signal is configured. According to this configuration, irrespective of the amplitudes of the detection signals E1, E2, F1, F2, G1, and G2 of the position detector 7521, the distributed signals M1, M2, and M3 have an amplitude of a predetermined value corresponding to the command side signal K0. A capacitor 8592 stabilizes the feedback loop.

The adjusting signal K1 of the adjusting signal producing circuit 8510 is a voltage signal which contains higher harmonic signal components corresponding to a higher harmonic signal of the detection signals, at a predetermined percentage. Since the amplitudes of the distributed signals M1, M2, and M3 vary responding with the difference of the adjusting signal K1 and the command side signal K0, the distributed signals M1, M2, and M3 become sinusoidal voltage signals which analoguely vary and have an amplitude corresponding to the command side signal K0.

The configuration and operation of the first driving circuit 7541, the second driving circuit 7542, and the third driving circuit 7543 of the driving block 7514 of FIG. 121 are the same as those of FIG. 113, and hence their detailed description is omitted.

Also in the thus configured embodiment, the adjusting signal K1 which varies in proportion to the amplitudes of the detection signals of the position detector is produced, and the amplitudes of the distributed signals M1, M2, and M3 are adjusted in accordance with a result of a comparison of the adjusting signal K1 with the command side signal K0. As a result, the distributed signals M1, M2, and M3, and the driving signals Va, Vb, and Vc are not affected by the amplitudes of the detection signals.

In the adjusting signal producing circuit 8510 of the distributing adjusting circuit 8332, a higher harmonic signal corresponding to the detection signals is produced, a multiplied adjusting current signal is produced by multiplication of the higher harmonic signal, and the adjusting signal K1 containing the higher harmonic signal components corresponding to the multiplied adjusting current signal at a predetermined percentage is produced thereby. The amplitudes of the distributed signals M1, M2, and M3 are adjusted in correspondence with a result of a comparison of the adjusting signal K1 with the command side signal K0, thereby obtaining distributed signals which sinusoidally analoguely vary responding with the detection signals. In other words, the distributed signals M1, M2, and M3, and the driving signals Va, Vb, and Vc sinusoidally analoguely vary responding with the detection signals. Therefore, distortions of the distributed signals and the driving signals are reduced to a very low level, and a uniform torque is generated, so that the motor is smoothly driven.

Embodiment 25

Figure 124:
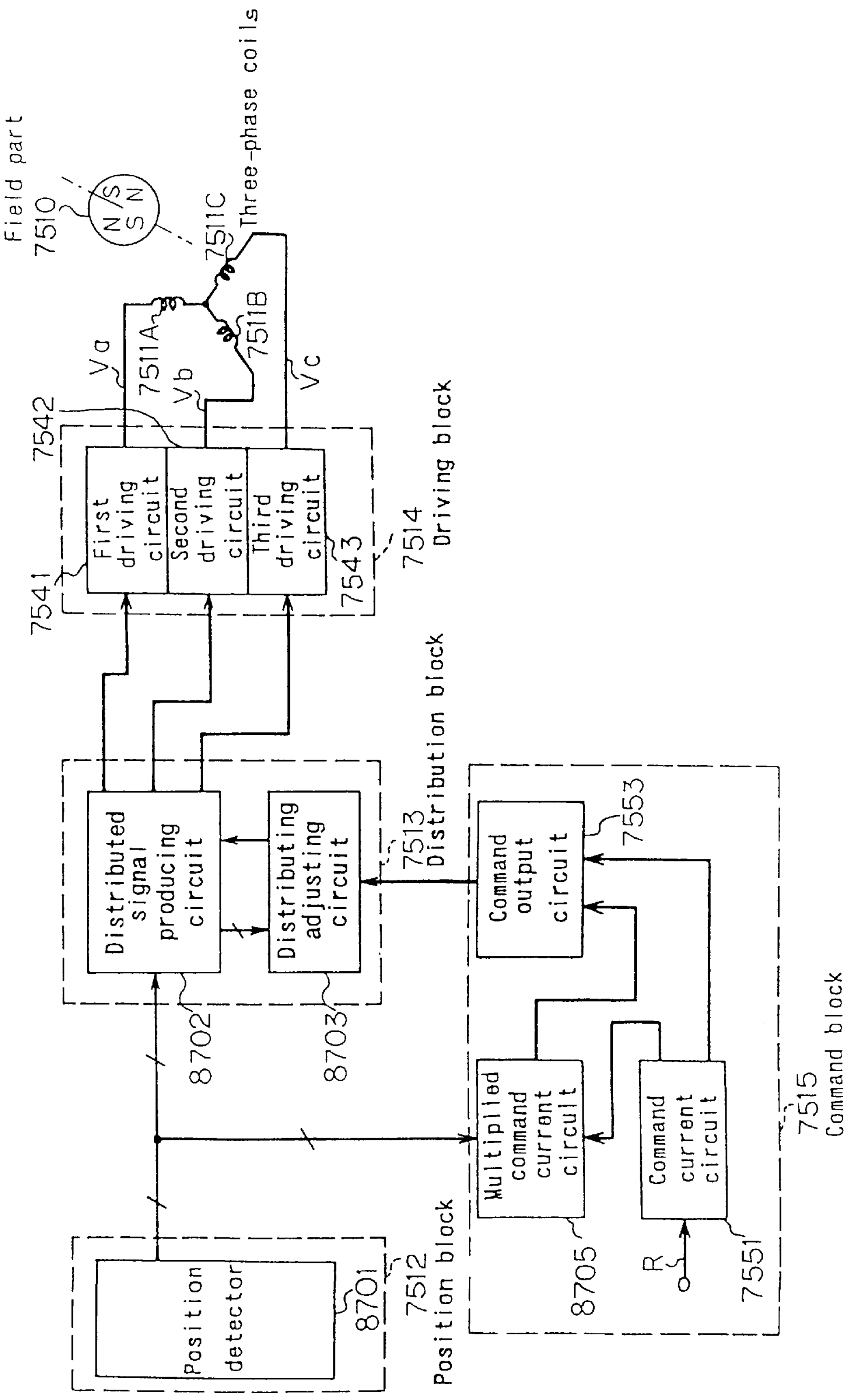
Figure 125:
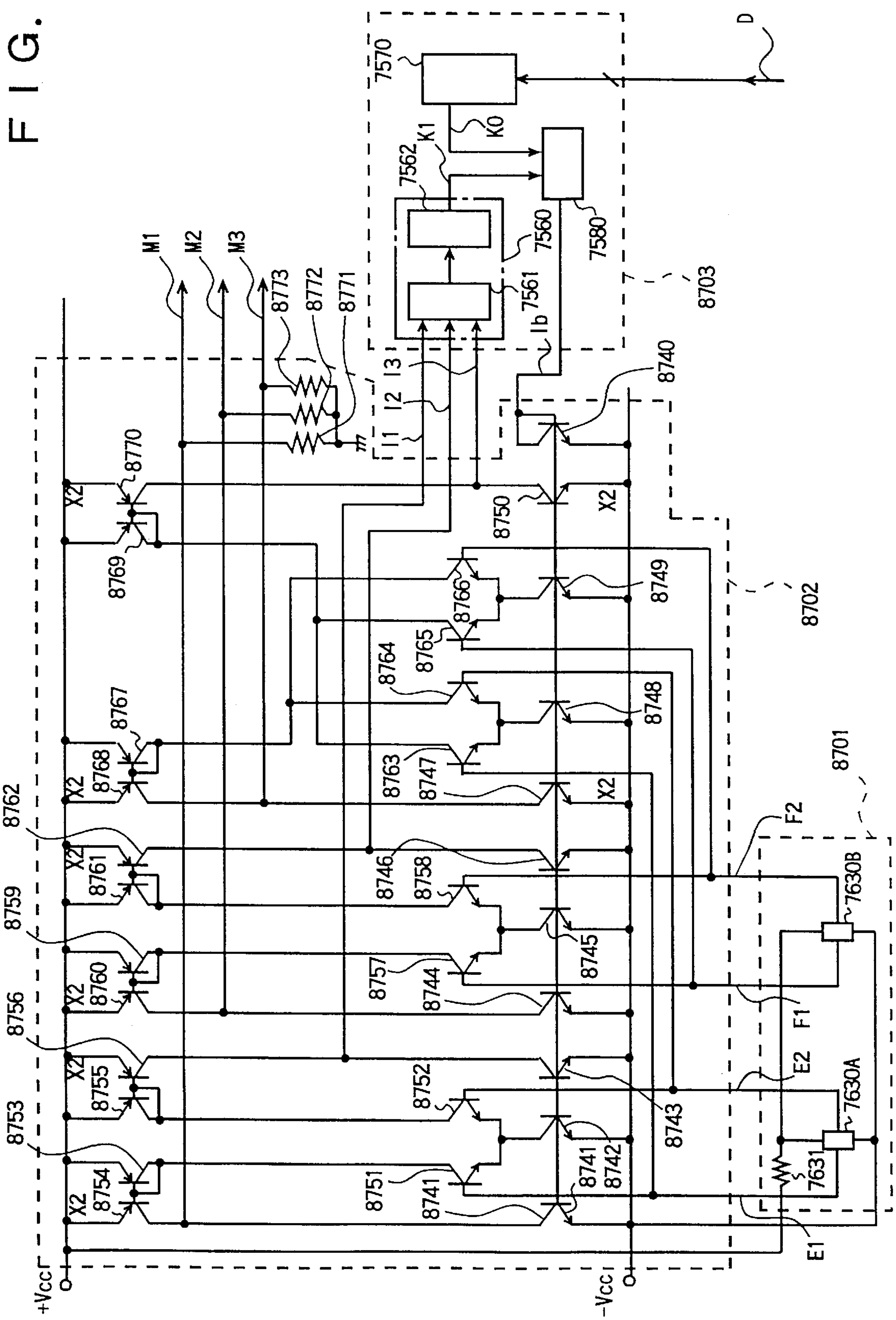
Figure 126:
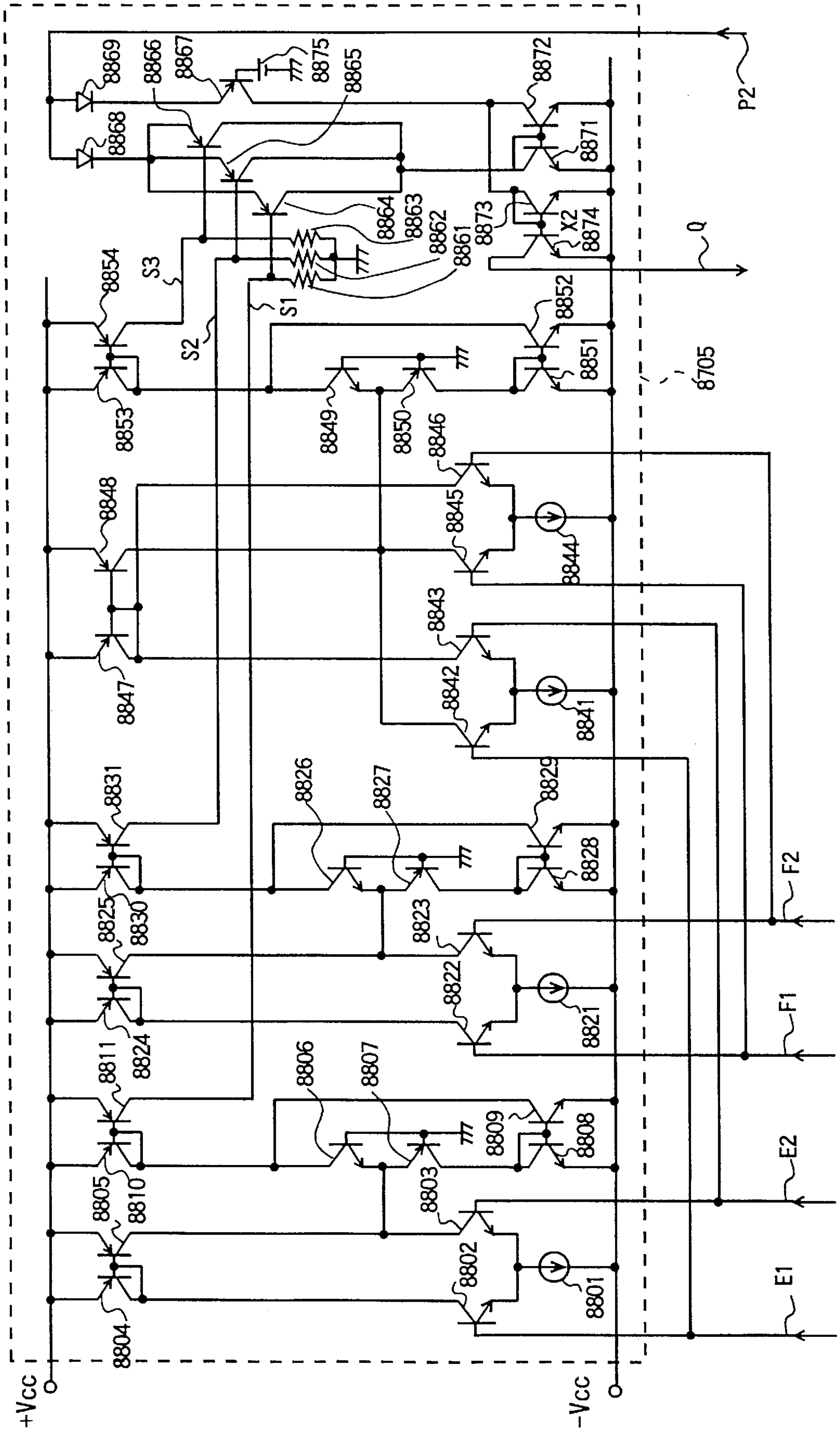

FIGS. 124 to 126 show a brushless motor of Embodiment 25 of the invention. FIG. 124 shows the whole configuration of Embodiment 25. In the embodiment, Embodiment 22 (FIG. 110) described above is modified, so that the number of the position detecting elements of the position detector is reduced to two. According to this configuration, the number of components constituting the motor can be reduced, and hence the production of a small motor is further facilitated. The components which are identical with those of the Embodiment 22 described above are designated by the same reference numerals.

FIG. 125 specifically shows the configuration of a position detector 8701 of the position block 7512, and a distributed signal producing circuit 8702 and a distributing adjusting circuit 8703 of the distribution block 7513. Position detecting elements 7630A and 7630B of the position detector 8701 correspond to two elements among the three position detecting elements 7607*a*, 7607*b*, and 7607*c* of FIG. 111. A voltage is applied in parallel to the position detecting elements via a resistor 7631. Namely, the number of the position detecting elements mounted on the stator is reduced to two. The differential detection signals E1 and E2 corresponding to the detected magnetic field of the field part 7510 (corresponding to the permanent magnet 7602 of FIG. 111) are output from output terminals of the position detecting element 7630A. Similarly, the differential detection signals F1 and F2 corresponding to the detected magnetic field are output from output terminals of the position detecting element 7630B. As the rotational movement of the field part 7510 proceeds, the detection signals E1 and F1 analoguely vary so as to function as two-phase signals which are electrically separated in phase from each other by 120 deg. The detection signals E1 and E2 vary in reversed phase relationships, and F1 and F2 vary in reversed phase relationships. In the embodiment, the detection signals E2 and F2 of reversed phase relationships are not counted in the number of phases.

Transistors 8740, 8741, 8742, 8743, 8744, 8745, 8746, 8747, 8748, 8749, and 8750 of the distributed signal producing circuit 8702 constitute a current mirror circuit into which a current of a value proportional to a feedback current signal Ib flows. In correspondence with the detection signals E1 and E2, differential transistors 8751 and 8752 distribute the value of the current of the transistor 8742 to the collectors. The collector current of the transistor 8751 is amplified two times by a current mirror circuit consisting of transistors 8753 and 8754. A current flowing out from or into the junction of the transistors 8754 and 8741 is supplied to a resistor 8771. A distributed signal M1 is produced at the terminal of the resistor 8771. The collector current of the transistor 8752 is amplified two times by a current mirror circuit consisting of transistors 8755 and 8756. A current signal I1 flowing out from or into the junction of the transistors 8756 and 8743 is supplied to the distributing adjusting circuit 8703. Similarly, in correspondence with the detection signals F1 and F2, the differential transistors 8757 and 8758 distribute the value of the current of the transistor 8745 to the collectors. The collector current of the transistor 8757 is amplified two times by a current mirror circuit consisting of transistors 8759 and 8760. A current flowing out from or into the junction of the transistors 8760 and 8744 is supplied to a resistor 8772. A distributed signal M2 is produced at the terminal of the resistor 8772. The collector current of the transistor 8758 is amplified two times by a current mirror circuit consisting of transistors 8761 and 8762. A current signal I2 flowing out from or into the junction of the transistors 8762 and 8746 is supplied to the distributing adjusting circuit 8703. In correspondence with the detection signals E1 and E2, the differential transistors 8763 and 8764 distribute the value of the current of the transistor 8748 to the collectors. In correspondence with the detection signals F1 and F2, the differential transistors 8765 and 8766 distribute the value of the current of the transistor 8749 to the collectors. The collector currents of the transistors 8764 and 8766 are composed together, and the composed current is amplified two times by a current mirror circuit consisting of transistors 8767 and 8768. A current flowing out from or into the junction of the transistors 8768 and 8747 is supplied to a resistor 8773. A distributed signal M3 is produced at the terminal of the resistor 8773. The collector currents of the transistors 8763 and 8765 are composed together, and the composed current is amplified two times by a current mirror circuit consisting of transistors 8769 and 8770. A current signal I3 flowing out from or into the junction of the transistors 8770 and 8750 is supplied to the distributing adjusting circuit 8703. In this way, the two-phase detection signals E1 and F1 are composed together so as to produce three-phase signals.

The distributed signals M1, M2, and M3 are three-phase voltage signals which analoguely vary responding with the two-phase detection signals and which substantially have a phase difference of 120 deg. in electric angle, and supplied to the driving block 7514. The current signals I1, I2, and I3 are three-phase current signals which analoguely vary responding with the two-phase detection signals and which substantially have a phase difference of 120 deg. in electric angle, and supplied to the distributing adjusting circuit 8703.

The distributing adjusting circuit 8703 comprises: an adjusting signal producing circuit 7560 which produces an adjusting signal K1; a command side circuit 7570 which produces a command side signal K0; and an adjusting comparator 7580 which compares the adjusting signal K1 with the predetermined signal K0. The adjusting signal producing circuit 7560 comprises: an amplitude current circuit 7561 which produces an amplitude current signal varying in proportion to the amplitudes of the detection signals; and an adjusting signal output circuit 7562 which produces the adjusting signal K1 proportional to the amplitude current signal. These circuits are configured in the same manner as those of the distributing adjusting circuit 7532 of FIG. 112, and hence their description is omitted.

In the distributed signal producing circuit 8702 and the distributing adjusting circuit 8703, the three-phase current signals I1, I2, and I3 are produced by using the two-phase detection signals, the adjusting signal K1 varying in proportion to the amplitudes of the detection signals is produced, and the feedback current signal Ib corresponding to a result of a comparison of the adjusting signal K1 with the command side signal K0 is produced. In correspondence with the feedback current signal Ib, the output currents of the current mirror circuit consisting of the transistors 8740 to 8750 vary, and the amplitudes of the three-phase current signals I1, I2, and I3 and the three-phase distributed signals M1, M2, and M3 vary. Namely, a feedback loop which adjusts the amplitudes of the three-phase distributed signals and the level of the adjusting signal in correspondence with a result of a comparison of the adjusting signal with the command side signal is configured. As a result, irrespective of the amplitudes of the two-phase detection signals E1, E2, F1, and F2 of the position detector 8701, the distributed signals M1, M2, and M3 have an amplitude of a predetermined value corresponding to the command side signal K0.

A command block 7515 of FIG. 124 comprises a command current circuit 7551, a multiplied command current circuit 8705, and a command output circuit 7553. The command current circuit 7551 and the command output circuit 7553 are configured in the same manner as those shown in FIGS. 114 and 116, and hence their detailed description is omitted.

FIG. 126 specifically shows the configuration of the multiplied command current circuit 8705. In correspondence with detection signals E1 and E2 of the position detecting elements, transistors 8802 and 8803 of the multiplied command current circuit 8705 distribute the value of the current of a constant current source 8801 to the collectors. The difference current is obtained by a current mirror circuit consisting of transistors 8804 and 8805, and a voltage signal Si corresponding to the absolute value of the difference current is obtained by a combination of transistors 8806, 8807, 8808, 8809, 8810, and 8811, and a resistor 8861. In other words, the voltage signal S1 corresponding to the absolute value of the detection signal E1–E2 is produced. Similarly, a constant current source 8821, transistors 8822 to 8831, and a resistor 8862 produce a voltage signal S2 corresponding to the absolute value of the detection signal F1–F2, at the terminal of the resistor 8862. In correspondence with detection signals E1 and E2, transistors 8842 and 8843 distribute the value of the current of a constant current source 8841 to the collectors. In correspondence with detection signals F1 and F2, transistors 8845 and 8846 distribute the value of the current of a constant current source 8844 to the collectors. A current mirror circuit consisting of transistors 8847 and 8848 compares a composed current of the collector currents of the transistors 8843 and 8846 with a composed current of the collector currents of the transistors 8842 and 8845, so as to obtain the difference current. A voltage signal S3 corresponding to the absolute value of the difference current is obtained by a combination of transistors 8849, 8850, 8851, 8852, 8853, and 8854, and a resistor 8863. In other words, a signal for the third phase is produced from the two-phase detection signals, and the voltage signal S3 corresponding to the absolute value of the signal for the third phase is produced. Transistors 8864, 8865, 8866, and 8867, and diodes 8868 and 8869 compare the voltage signals S1, S2, and S3 with a predetermined voltage value (including 0 V) of a constant voltage source 8875. In correspondence with the difference voltages, the second command current signal P2 of the command current circuit 7551 is distributed to the collectors. The collector currents of the transistors 8864, 8865, and 8866 are composed together into a composed current. A current mirror circuit consisting of transistors 8871 and 8872 compares the composed current with the collector current of the transistor 8867, and the difference current is input to a current mirror circuit consisting of transistors 8873 and 8874 and reduced in current value to approximately one half. The resulting current is output as a multiplied command current signal Q (inflow current).

The multiplied command current signal Q of the multiplied command current circuit 8705 varies responding with results of multiplications of the voltage signals S1, S2, and S3 corresponding to the detection signals by the second command current signal P2 of the command current circuit 7551. Because of the configuration of the transistors 8864, 8865, 8866, and 8867, the multiplied command current signal Q varies in responding with a result of a multiplication of the minimum value of the voltage signals S1, S2, and S3 by the command current signal P2. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied command current signal Q is a higher harmonic signal which has an amplitude proportional to the command current signal P2 and which varies 6 times every one period of the detection signals. The output current signal D of the command output circuit 7553 is proportional to the composed command current signal of the multiplied command current signal Q and the first command current signal P1, and hence contains higher harmonic signal components corresponding to the detection signals, at a predetermined percentage.

Since the command side signal K0 of the command side circuit 7570 is proportional to the output current signal D of the command block 7515, the command side signal K0 is a signal which contains higher harmonic signal components corresponding to a higher harmonic signal of the detection signals, at a predetermined percentage. Since the amplitudes of the distributed signals are adjusted in correspondence with a result of a comparison of the command side signal K0 with the adjusting signal K1, the distributed signals M1, M2, and M3 are three-phase sinusoidal voltage signals which analoguely vary.

The configuration and operation of the first driving circuit 7541, the second driving circuit 7542, and the third driving circuit 7543 of the driving block 7514 of FIG. 124 are the same as those of FIG. 113, and hence their detailed description is omitted. According to this configuration, it is possible to obtain the three-phase driving signals Va, Vb, and Vc which sinusoidally analoguely vary responding with the distributed signals M1, M2, and M3.

In the thus configured embodiment, the three-phase driving signals for the three-phase coils are produced by using the two-phase detection signals of the position detector. As a result, the number of components of the position detecting elements can be reduced, so that the motor is simplified in configuration.

The adjusting signal K1 which varies in proportion to the amplitudes of the two-phase detection signals of the position detector is produced, and the amplitudes of the distributed signals M1, M2, and M3 are adjusted in correspondence with a result of a comparison of the adjusting signal K1 with the command side signal K0. Therefore, the distributed signals M1, M2, and M3, and the driving signals Va, Vb, and Vc are not affected by the amplitudes of the detection signals.

The command block has a multiplied command current circuit, and therein: a higher harmonic signal corresponding to the two-phase detection signals is produced, the multiplied adjusting current signal is obtained by multiplication of the higher harmonic signal; and the output current signal D of the command block, which contains higher harmonic signal components responding to the multiplied adjusting current signal at a predetermined percentage, is obtained so as to produce the command side signal K0 proportional to the output current signal D. According to this configuration, the distributed signals M1, M2, and M3, and the driving signals Va, Vb, and Vc vary sinusoidally analoguely in correspondence with the detection signals. Accordingly, it is possible to obtain the distributed signals and the driving signals of a reduced distortion level, and a uniform torque is generated so that the motor is smoothly driven.

Embodiment 26

Figure 127:
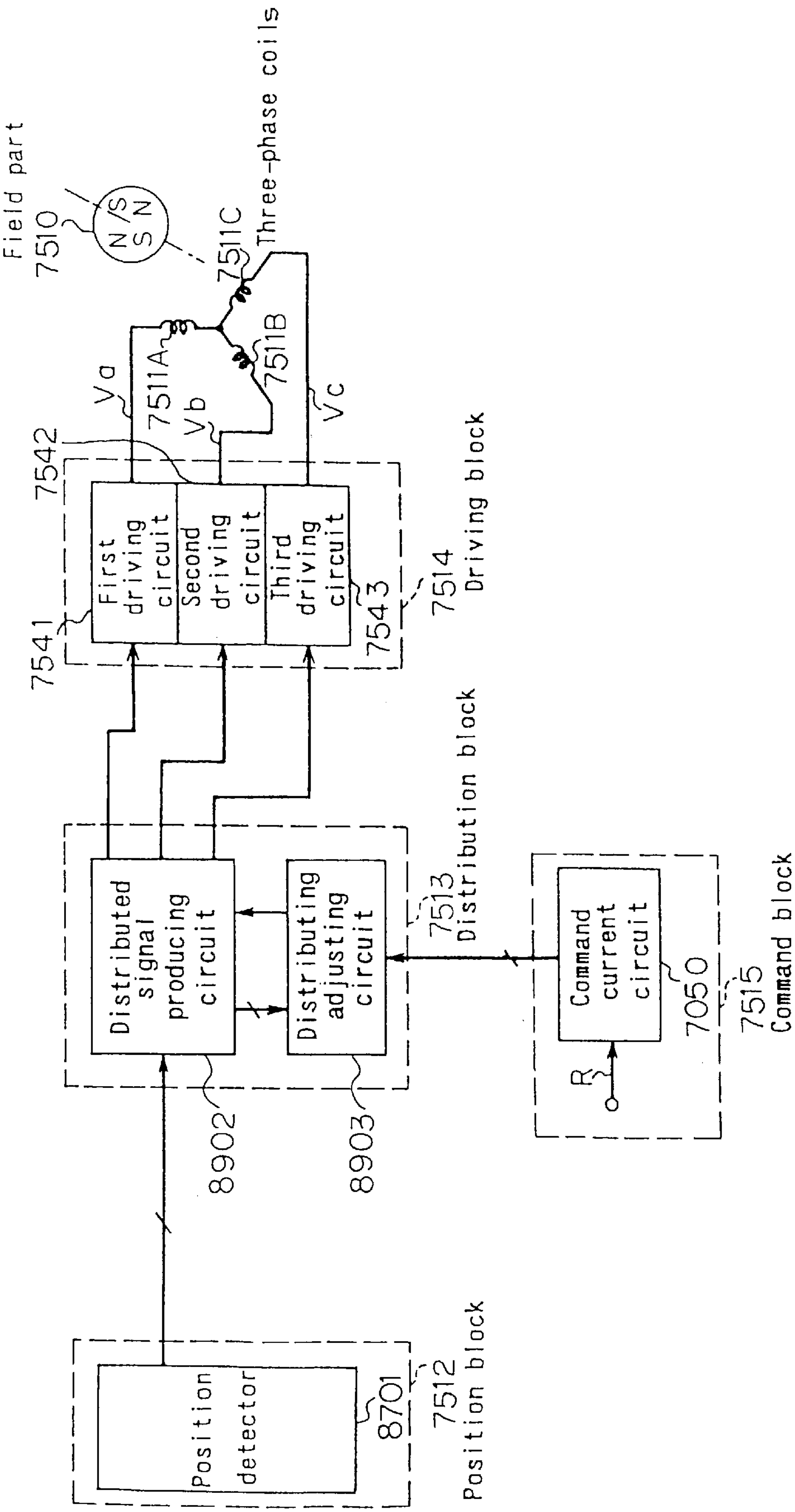
Figure 128:
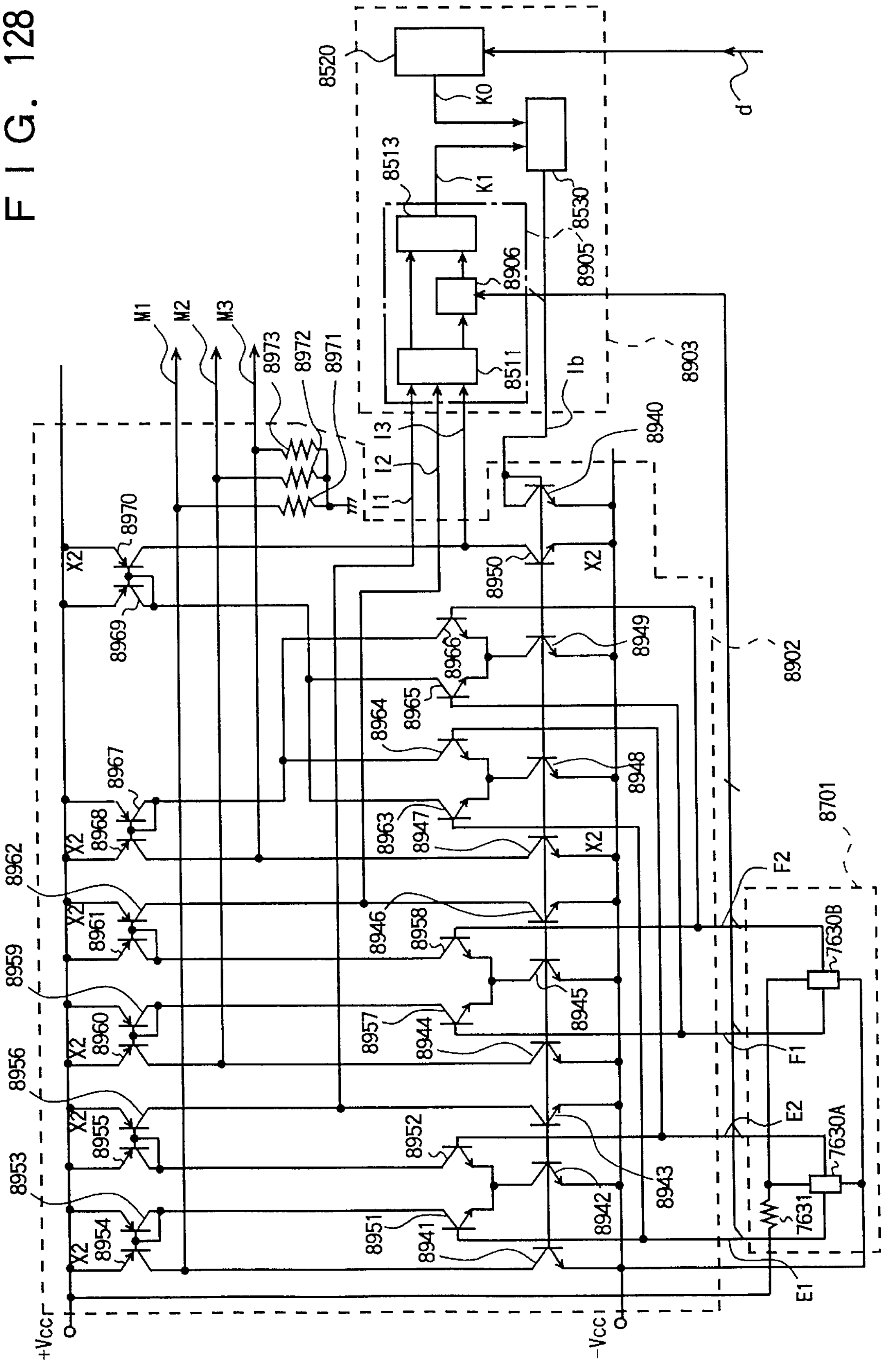

FIGS. 127 to 129 show a brushless motor of Embodiment 26 of the invention. FIG. 127 shows the whole configuration of Embodiment 26. In the embodiment, Embodiment 24 (FIG. 121) described above is modified so that the number of the position detecting elements of the position detector is reduced to two. According to this configuration, the number of components constituting the motor can be reduced, and hence the production of a small motor is further facilitated. The components which are identical with those of the Embodiment 24 are designated by the same reference numerals.

FIG. 128 specifically shows the configuration of a position detector 8701 of the position block 7512, and a distributed signal producing circuit 8902 and a distributing adjusting circuit 8903 of the distribution block 7513. Position detecting elements 7630A and 7630B of the position detector 8701 correspond to two elements among the three position detecting elements 7607*a*, 7607*b*, and 7607*c* of FIG. 111. A voltage is applied in parallel to the position detecting elements via a resistor 7631. The differential detection signals E1 and E2 corresponding to the detected magnetic field of the field part 7510 (corresponding to the permanent magnet 7602 of FIG. 111) are output from output terminals of the position detecting element 7630A. Similarly, the differential detection signals F1 and F2 corresponding to the detected magnetic field are output from output terminals of the position detecting element 7630B. As the rotational movement of the field part 7510 proceeds, the detection signals E1 and F1 analoguely vary so as to function as two-phase signals which are electrically separated in phase from each other by 120 deg.

Transistors 8940, 8941, 8942, 8943, 8944, 8945, 8946, 8947, 8948, 8949, and 8950 of the distributed signal producing circuit 8902 constitute a current mirror circuit into which a current of a value proportional to a feedback current signal Ib flows. In correspondence with the detection signals E1 and E2, differential transistors 8951 and 8952 distribute the value of the current of the transistor 8942 to the collectors. The collector current of the transistor 8951 is amplified two times by a current mirror circuit consisting of transistors 8953 and 8954. A current flowing out from or into the junction of the transistors 8954 and 8941 is supplied to a resistor 8971. A distributed signal M1 is produced at the terminal of the resistor 8971. The collector current of the transistor 8952 is amplified two times by a current mirror circuit consisting of transistors 8955 and 8956. A current signal I1 flowing out from or into the junction of the transistors 8956 and 8943 is supplied to the distributing adjusting circuit 8903. Similarly, in correspondence with the detection signals F1 and F2, the differential transistors 8957 and 8958 distribute the value of the current of the transistor 8945 to the collectors. The collector current of the transistor 8957 is amplified two times by a current mirror circuit consisting of transistors 8959 and 8960. A current flowing out from or into the junction of the transistors 8960 and 8944 is supplied to a resistor 8972. A distributed signal M2 is produced at the terminal of the resistor 8972. The collector current of the transistor 8958 is amplified two times by a current mirror circuit consisting of transistors 8961 and 8962. A current signal I2 flowing out from or into the junction of the transistors 8962 and 8946 is supplied to the distributing adjusting circuit 8903. In correspondence with the detection signals E1 and E2, the differential transistors 8963 and 8964 distribute the value of the current of the transistor 8948 to the collectors. In correspondence with the detection signals F1 and F2, the differential transistors 8965 and 8966 distribute the value of the current of the transistor 8949 to the collectors. The collector currents of the transistors 8964 and 8966 are composed together, and the composed current is amplified two times by a current mirror circuit consisting of transistors 8967 and 8968. A current flowing out from or into the junction of the transistors 8968 and 8947 is supplied to a resistor 8973. A distributed signal M3 is produced at the terminal of the resistor 8973. The collector currents of the transistors 8963 and 8965 are composed together, and the composed current is amplified two times by a current mirror circuit consisting of transistors 8969 and 8970. A current signal I3 flowing out from or into the junction of the transistors 8970 and 8950 is supplied to the distributing adjusting circuit 8903. In this way, the two-phase detection signals E1 and F1 are composed together by calculation so as to produce three-phase signals.

The distributed signals M1, M2, and M3 are three-phase voltage signals which analoguely vary responding with the two-phase detection signals and which substantially have a phase difference of 120 deg. in electric angle, and supplied to the driving block 7514. The current signals I1, I2, and I3 are three-phase current signals which analoguely vary responding with the two-phase detection signals and which substantially have a phase difference of 120 deg. in electric angle, and supplied to the distributing adjusting circuit 8903.

The distributing adjusting circuit 8903 comprises: an adjusting signal producing circuit 8905 which produces an adjusting signal K1; a command side circuit 8520 which produces a command side signal K0; and an adjusting comparator 8530 which compares the adjusting signal K1 with the command side signal K0. The adjusting signal producing circuit 8905 comprises: an amplitude current circuit 8511 which produces two amplitude current signals varying in proportion to the amplitudes of the detection signals; a multiplied adjusting circuit 8906 which produces a higher harmonic signal synchronized with the detection signals and which produces a multiplied adjusting current signal obtained by multiplying the higher harmonic signal by one of the amplitude current signals; and an adjusting signal output circuit 8513 which produces the adjusting signal K1 proportional to a composed adjusting current signal obtained by composing the other amplitude current signal and the multiplied adjusting current signal together.

FIG. 129 specifically shows the adjusting signal producing circuit 8905. The current output circuits 8595, 8596, and 8597 of the amplitude current circuit 8511 output current signals corresponding to the absolute values or the single polarity values of the current signals I1, I2, and I3, respectively. The current output circuits are configured in the same manner as those of FIG. 102, and hence their detailed description is omitted. The output current signals of the current output circuits 8595, 8596, and 8597 of the amplitude current circuit 8511 are composed together so as to produce an amplitude current signal Jt. The amplitude current signal Jt is a current signal of a sum of the absolute values or the single polarity values of the three-phase current signals I1, I2, and I3, and hence vary in proportion to the amplitudes of the detection signals E1 and F1. A current mirror circuit consisting of transistors 8598, 8599, and 8600 outputs two amplitude current signals Jf and Jg proportional to the amplitude current signal Jt.

In correspondence with the detection signals E1 and E2 of the position detecting elements, transistors 9002 and 9003 of the multiplying adjusting circuit 8906 distribute the value of the current of a constant current source 9001 to the collectors. The difference current is obtained by a current mirror circuit consisting of transistors 9004 and 9005, and a voltage signal S1 corresponding to the absolute value of the difference current is obtained by a combination of transistors 9006, 9007, 9008, 9009, 9010, and 9011, and a resistor 9061. Namely, the voltage signal S1 corresponding to the absolute value of the detection signal E1–E2 is produced. Similarly, a voltage signal S2 corresponding to the absolute value of the detection signal F1–F2 is produced at the terminal of a resistor 9062 by a combination of a constant current source 9021, transistors 9022 to 9031, and the resistor 9062. In correspondence with detection signals E1 and E2, transistors 9042 and 9043 distribute the value of the current of a constant current source 9041 to the collectors. In correspondence with detection signals F1 and F2, transistors 9045 and 9046 distribute the value of the current of a constant current source 9044 to the collectors. A current mirror circuit consisting of transistors 9047 and 9048 compares a composed current of the collector currents of the transistors 9043 and 9046 with a composed current of the collector currents of the transistors 9042 and 9045, and obtains the difference current. A voltage signal S3 corresponding to the absolute value of the difference current is produced by a combination of transistors 9049, 9050, 9051, 9052, 9053, and 9054, and a resistor 9063. In other words, a signal for the third phase is produced from the two-phase detection signals, and the voltage signal S3 corresponding to the absolute value of the signal for the third phase is produced. Transistors 9064, 9065, 9066, and 9067, and diodes 9068 and 9069 compare the voltage signals S1, S2, and S3 with a predetermined voltage value (including 0 V) of a constant voltage source 9075. In correspondence with the difference voltages, the amplitude current signal Jf of the amplitude current circuit 8511 is distributed to the collectors. The collector currents of the transistors 9064, 9065, and 9066 are composed together into a composed current. A current mirror circuit consisting of transistors 9071 and 9072 compares the composed current with the collector current of the transistor 9067, and the difference current is input to a current mirror circuit consisting of transistors 9073 and 9074 and reduced in current value to approximately one half. The resulting current is output as a multiplied adjusting current signal Qh (inflow current).

The adjusting signal output circuit 8513 produces a composed adjusting current signal in which the multiplied adjusting current signal Qh of the multiplying adjusting circuit 8906 and the other amplitude current signal Jg of the amplitude current circuit 8511 are composed together. The composed adjusting current signal is supplied to a resistor 8691 via a current mirror circuit consisting of transistors 8681 and 8682. The adjusting signal K1 is output from the terminal of the resistor 8691.

The multiplied adjusting current signal Qh of the multiplying adjusting circuit 8906 varies responding with results of multiplications of the voltage signals S1, S2, and S3 corresponding to the two-phase detection signals by the amplitude current signal Jf of the amplitude current circuit 8511. Because of the configuration of the transistors 9064, 9065, 9066, and 9067, the multiplied adjusting current signal Qh varies responding with a result of a multiplication of the minimum value of the voltage signals S1, S2, and S3 by the amplitude current signal Jf. The minimum value of the voltage signals S1, S2, and S3 corresponding to the absolute values of the detection signals is a higher harmonic signal which is synchronized with the detection signals and which varies 6 times for a change of every one period of the detection signals. Therefore, the multiplied adjusting current signal Qh is a higher harmonic signal which has an amplitude proportional to the amplitude current signal Jf and which varies 6 times every one period of the detection signals. The adjusting signal K1 of the adjusting signal output circuit 8513 is proportional to the composed adjusting current signal of the multiplied adjusting current signal Qh and the amplitude current signal Jg, and contains higher harmonic signal components corresponding to the detection signals, at a predetermined percentage.

The command side signal producing circuit 8520 of FIG. 128 produces the command side signal K0 which is obtained by converting the output current signal d of the command current circuit 7050 of the command block 7515 into a voltage. Therefore, the command side signal K0 is proportional to the output current signal d and substantially corresponds to the output signal of the command block 7515. The adjusting comparator 8530 compares the adjusting signal K1 with the command side signal K0, and outputs the feedback current signal Ib corresponding to the difference of the signals. In other words, the adjusting comparator 8530 substantially compares the adjusting signal K1 with the output signal of the command block 7515, and outputs the feedback current signal Ib corresponding to a result of the comparison. The command side signal producing circuit 8520 and the adjusting comparator 8530 are configured in the same manner as those shown in FIG. 122, and hence their detailed description is omitted. The configuration and operation of the command current circuit 7050 of the command block 7515 of FIG. 127 are the same as those shown in FIG. 100. Therefore, their detailed description is omitted.

In this way, the adjusting signal K1 varying in proportion to the amplitudes of the two-phase detection signals is produced from the three-phase current signals I1, I2, and I3, and the feedback current signal Ib corresponding to a result of a comparison of the adjusting signal K1 with the command side signal K0 is produced. The output currents of the current mirror circuit consisting of the transistors 8940 to 8950 are varied in correspondence with the feedback current signal Ib, thereby varying the amplitudes of the three-phase current signals I1, I2, and I3 and the three-phase distributed signals M1, M2, and M3. As a result, a feedback loop which adjusts the amplitudes of the three-phase distributed signals and the level of the adjusting signal in correspondence with a result of a comparison of the adjusting signal with the command side signal is configured. According to this configuration, irrespective of the amplitudes of the two-phase detection signals E1, E2, F1, and F2 of the position detector 8701, the distributed signals M1, M2, and M3 have an amplitude of a predetermined value corresponding to the command side signal K0.

The adjusting signal K1 of the adjusting signal producing circuit 8905 is a voltage signal which contains higher harmonic signal components corresponding to a higher harmonic signal of the detection signals, at a predetermined percentage. Since the amplitudes of the distributed signals M1, M2, and M3 vary responding with a result of a comparison of the adjusting signal K1 with the command side signal K0, the distributed signals M1, M2, and M3 become sinusoidal voltage signals which analoguely vary and have an amplitude corresponding to the command side signal K0.

The configuration and operation of the first driving circuit 7541, the second driving circuit 7542, and the third driving circuit 7543 of the driving block 7514 of FIG. 127 are the same as those of FIG. 113, and hence their detailed description is omitted. According to this configuration, it is possible to obtain the three-phase driving signals Va, Vb, and Vc which sinusoidally analoguely vary responding with the distributed signals M1, M2, and M3.

In the thus configured embodiment, the driving signals for the three-phase coils are produced by using the two-phase detection signals of the position detector. As a result, the number of components of the position detecting elements can be reduced, so that the motor is simplified in configuration.

The adjusting signal K1 which varies in proportion to the amplitudes of the two-phase detection signals of the position detector is produced, and the amplitudes of the distributed signals M1, M2, and M3 are adjusted in accordance with a result of a comparison of the adjusting signal K1 with the command side signal K0. As a result, the distributed signals M1, M2, and M3, and the driving signals Va, Vb, and Vc are not affected by the amplitudes of the detection signals.

The multiplying adjusting circuit 8906 is provided in the adjusting signal producing circuit 8905 of the distributing adjusting circuit 8903, and therein: a higher harmonic signal corresponding to the two-phase detection signals is obtained, a multiplied adjusting current signal is obtained by multiplication of the higher harmonic signal; and the adjusting signal K1 containing higher harmonic signal components corresponding to the multiplied adjusting current signal at a predetermined percentage is produced. According to this configuration, the distributed signals M1, M2, and M3 and the driving signals Va, Vb, and Vc sinusoidally analoguely vary responding with the detection signals. Therefore, it is possible to obtain the distributed signals and the driving signals of a reduced distortion level, and a uniform torque is generated so that the motor is smoothly driven.

Embodiment 27

Figure 130:
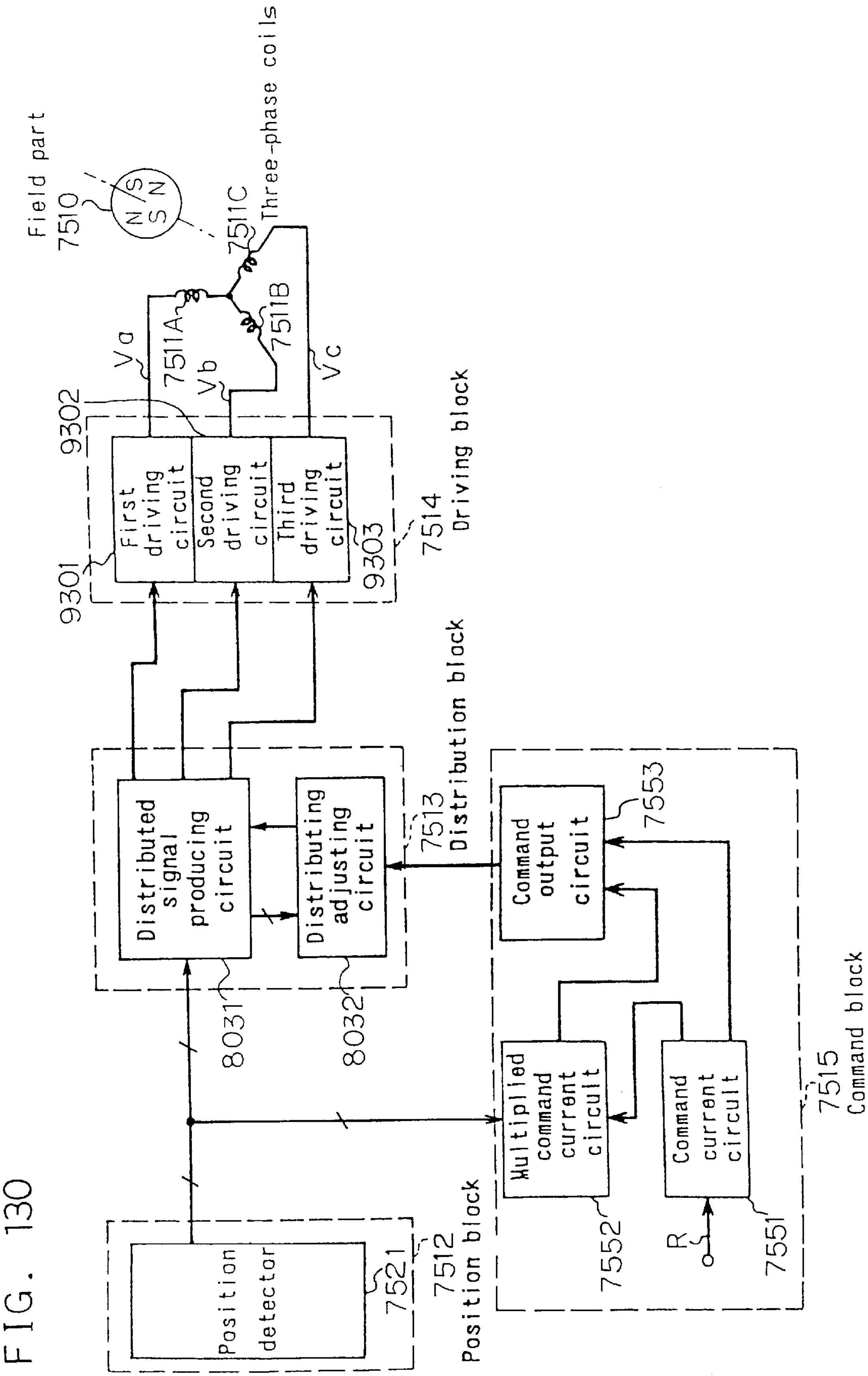

FIGS. 130 and 131 show a brushless motor of Embodiment 27 of the invention. In Embodiment 27, Embodiment 23 (FIG. 118) described above is modified so that a first driving circuit 9301, a second driving circuit 9302, and a third driving circuit 9303 of the driving block 7514 are configured so as to operate the PWM driving (Pulse-Width Modulation driving), thereby reducing the power consumption of the driving block 7514. The components which are identical with those of Embodiment 23 described above are designated by the same reference numerals.

FIG. 131 specifically shows the configuration of the first driving circuit 9301, the second driving circuit 9302, and the third driving circuit 9303 of the driving block 7514. A comparator 9321 of the first driving circuit 9301 compares a triangular wave signal Nt generated by a triangular wave generator 9310 with the distributed signal M1, and produces a PWM signal W1 of a pulse width corresponding to the distributed signal M1. In correspondence with the level of the PWM signal W1, driving transistors 9322 and 9323 are complementarily turned on or off. A driving signal Va which digitally varies responding with the PWM signal W1 is supplied to the power supply terminal of the coil 7511A by a combination of the driving transistors 9322 and 9323 and driving diodes 9324 and 9325. Similarly, a comparator 9331 of the second driving circuit 9302 compares the triangular wave signal Nt generated by the triangular wave generator 9310 with the distributed signal M2, and produces a PWM signal W2 of a pulse width corresponding to the distributed signal M2. In correspondence with the level of the PWM signal W2, driving transistors 9332 and 9333 are complementarily turned on or off. A driving signal Vb which digitally varies responding with the PWM signal W2 is supplied to the power supply terminal of the coil 7511B by a combination of the driving transistors 9332 and 9333 and driving diodes 9334 and 9335. Furthermore, a comparator 9341 of the third driving circuit 9303 compares the triangular wave signal Nt generated by the triangular wave generator 9310 with the distributed signal M3, and produces a PWM signal W3 of a pulse width corresponding to the distributed signal M3. In correspondence with the level of the PWM signal W3, driving transistors 9342 and 9343 are complementarily turned on or off. A driving signal Vc which digitally varies responding with the PWM signal W3 is supplied to the power supply terminal of the coil 7511C by a combination of the driving transistors 9342 and 9343 and driving diodes 9344 and 9345.

The configuration and operation of the position block 7512, the distribution block 7513, and the command block 7515 of FIG. 130 are identical with those of Embodiment 23 described above, and hence their detailed description is omitted.

In the embodiment, in correspondence with the distributed signal M1, M2, and M3, the first driving circuit 9301, the second driving circuit 9302, and the third driving circuit 9303 of the driving block 7514 conduct the PWM operation, so that PWM driving signals Va, Vb, Vc, which have been power-amplified, are supplied to the three-phase coils 7511A, 7511B, and 7511C. According to this configuration, the power loss of the driving block 7514 can be greatly reduced while a sufficient driving power is supplied to the three-phase coils. In other words, the power losses of the driving transistors and the driving diodes are reduced to a very low level. As a result, it is possible to realize a brushless motor having an excellent power efficiency.

The first driving circuit 9301, the second driving circuit 9302, and the third driving circuit 9303 which are used in the embodiment may be used in the above-described embodiments, thereby reducing the power loss of the embodiments.

The configurations of the embodiments described above may be modified in various manners. The coil for each phase may be configured by connecting a plurality of coils in series or in parallel. Each coil may consist of a concentrated winding, or a distributed winding, or may be an air-core coil having no salient pole. The connection of the three-phase coils is not restricted to the Y-connection and the coils may be Δ-connected. The position detecting elements are not restricted to Hall elements and other magnetoelectrical converting elements. In the embodiments, the phase shifting operation is conducted as required by one of the distributing composer and the altering signal producing circuit. The manner of executing the phase shifting operation is not restricted to the above, and may be shared by both the composer and the circuit. The structure of the motor is not restricted to the above-described one wherein the field part has a plurality of poles (the number of poles is not limited to four), and may have anyone as far as magnetic field fluxes generated by a permanent magnet cross a coil and the intercrossing magnetic fluxes of the coil vary as the relative movement of the field part and the coil proceeds. For example, the motor may have a structure in which a bias magnetic field is applied by a permanent magnet and rotation or movement is realized while tooth of a field unit oppose those of salient poles on which coils are wound. The motor is not restricted to a rotary brushless motor, and may be a linear brushless motor in which the field part or the coils are linearly moved.

The altering signal producing circuit and the altering adjusting circuit constitute a feedback loop so that the amplitudes of the altering signals accurately coincide with a predetermined value corresponding to the predetermined signal. In the embodiments described above, a current feedback signal is used. The invention is not restricted to the above, and may have a configuration in which, for example, a voltage feedback signal is used and the voltage supplied to a position detecting element is varied. Furthermore, the invention is not restricted to the configuration using a feedback loop. For example, the amplitudes of the altering signals may be adjusted by feedforward correction in correspondence with a result of a comparison of the adjusting signal with the predetermined signal.

The distributed signal producing circuit and the distributing adjusting circuit constitute a feedback loop, so that the amplitudes of the distributed signals accurately coincide with a predetermined value corresponding to the command side signal. In the embodiments described above, a current feedback signal is used. The invention is not restricted to the above, and may have a configuration in which, for example, a voltage feedback signal is used and the voltage supplied to a position detecting element is varied. Furthermore, the invention is not restricted to the configuration using a feedback loop. For example, the amplitudes of the altering signals may be adjusted by feedforward correction in correspondence with a result of a comparison of the adjusting signal with the command side signal. In the embodiments described above, the command side signal producing circuit is in the distributing adjusting circuit. The invention is not restricted to the above. The command side signal producing circuit may be in the command block. It is a matter of course that such a configuration is within the scope of the invention.

In the embodiments described above, the adjusting signal varying in proportion to the detection signals of the position detector is easily produced in the form of a sum of the absolute value or the single polarity values of the three-phase current signals. The invention is not restricted to the above.

The driving circuits of the driving block may be variously modified as far as the distributed signals are amplified and then supplied to the three-phase coils. It is a matter of course that the invention may be variously modified without departing from the spirit of the invention, and such modifications are within the scope of the invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A brushless motor comprising:

field permanent-magnet means for obtaining field magnetic fluxes;

three-phase coils which cross the field magnetic fluxes;

position detecting means for detecting a relative position between said field permanent-magnet means and said three-phase coils;

altering signal producing means for obtaining altering signals which vary analogously with output signals of said position detecting means;

first distributing means for distributing a first current to three-phase first distributed current signals which vary analogously with output signals of said altering signal producing means;

second distributing means for distributing a second current to three-phase second distributed current signals which vary analogously with output signals of said altering signal producing means;

composing means for composing said first distributed current signals of said first distributing means and the second distributed current signals of said second distributing means, thereby obtaining three-phase distributed signals; and driving means for supplying driving signals corresponding to the three-phase distributed signals of said composing means, to said three-phase coils.

2. A brushless motor in accordance with claim 1, wherein said composing means produces said three-phase distributed signals which have phases shifted from those of said first distributed current signals of said first distributing means and also from those of said second distributing means.

3. A brushless motor in accordance with claim 1, wherein said composing means comprises:

means for producing three-phase difference signals by composing said first distributed current signals of said first distributing means and the second distributed current signals of said second distributing means, and means for producing said three-phase distributed signals by composing said three-phase difference signals, so as to shift the phases of said three-phase distributed signals from those of said first distributed current signals of said first distributing means and also from those of said second distributing means.

4. A brushless motor in accordance with claim 1, wherein the driving means supplies pulsive driving signals with pulse-widths modulated corresponding to the three-phase distributed signals of said distributing means, to said three-phase coils.

5. A brushless motor comprising:

field permanent-magnet means for obtaining field magnetic fluxes;

three-phase coils which cross the field magnetic fluxes;

position detecting means for detecting a relative position between said field permanent-magnet means and said three-phase coils;

altering signal producing means for obtaining altering signals which vary analogously with output signals of said position detecting means;

distributing means having at least means for distributing a current to three-phase distributed current signals which vary analogously with output signals of said altering signal producing means, so as to produce three-phase distributed signals corresponding to said three-phase distributed current signals; and driving means for supplying pulsive driving signals corresponding to the three-phase distributed signals of said distributing means, to said three-phase coils, wherein said distributing means comprises:

first distributing means for distributing a first current to three-phase first distributed current signals which vary analogously with output signals of said altering signal producing means;

second distributing means for distributing a second current to three-phase second distributed current signals which vary analogously with output signals of said altering signal producing means; and composing means for composing said first distributed current signals of said first distributing means and the second distributed current signals of said second distributing means, thereby obtaining three-phase distributed signals.

6. A brushless motor in accordance with claim 5, wherein the driving means supplies pulsive driving signals with pulse-widths modulated corresponding to the three-phase distributed signals of said distributing means, to said three-phase coils.

* * * * *